US007103460B1

(12) United States Patent
Breed

(10) Patent No.: US 7,103,460 B1

(45) Date of Patent: Sep. 5, 2006

(54) SYSTEM AND METHOD FOR VEHICLE DIAGNOSTICS

(75) Inventor: David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 11/220,139

(22) Filed: Sep. 6, 2005

Related U.S. Application Data

(63) Continuation-in-part of application No. 11/120,065, filed on May 2, 2005, now abandoned, and a continuation-in-part of application No. 11/082,739, filed (Continued)

(60) Provisional application No. 60/592,838, filed on Jul. 30, 2004, provisional application No. 60/461,648, filed on Apr. 8, 2003, provisional application No. 60/423,613, filed on Nov. 4, 2002, provisional application No. 60/415,862, filed on Oct. 3, 2002, provisional application No. 60/304,013, filed on Jul. 9, 2001, provisional application No. 60/291,511, filed on May 16, 2001, provisional application No. 60/269,415, filed on Feb. 16, 2001, provisional application No. 60/231,378, filed on Sep. 8, 2000, provisional application No. 60/170,973, filed on Dec. 15, 1999, provisional application No. 60/028,046, filed on Oct. 9, 1996.

(51) Int. Cl.
*G06F 7/00* (2006.01)

(52) U.S. Cl. ............................ 701/29; 701/33; 701/34; 702/183; 706/15

(58) Field of Classification Search .................. 701/29, 701/30, 33, 34, 36; 714/25; 706/15, 20; 702/127, 182, 183; 73/116
See application file for complete search history.

(56) References Cited

U.S. PATENT DOCUMENTS 4,128,005 A 12/1978 Arnston et al.

(Continued)

FOREIGN PATENT DOCUMENTS

| | | |
|---|---|---|
| GB | 2383635 A | 7/2003 |
| WO | WO 2005/003698 A1 | 1/2005 |

*Primary Examiner*—Yonel Beaulieu
(74) *Attorney, Agent, or Firm*—Brian Roffe

(57) ABSTRACT

Method and system for diagnosing whether vehicular components are operating abnormally based on data obtained from sensors arranged on a vehicle. In a training stage, output from the sensors during normal operation of the components is obtained, each component is adjusted to induce abnormal operation thereof and output from the sensors is obtained during the induced abnormal operation. A determination is made as to which sensors provide data about abnormal operation of each component based on analysis of the output from the sensors during normal operation and during induced abnormal operation of the components. During operation of the vehicle, the output from the sensors is obtained and analyzed, e.g., by inputting it into a pattern recognition algorithm or neural network generated during the training stage, in order to output an indication of abnormal operation of any components being diagnosed.

29 Claims, 60 Drawing Sheets

Related U.S. Application Data on Mar. 17, 2005, which is a continuation-in-part of application No. 11/039,129, filed on Jan. 19, 2005, which is a continuation-in-part of application No. 10/701,361, filed on Nov. 4, 2003, now Pat. No. 6,988,026, said application No. 11/082,739 , said application No. 10/701,361 and a continuation-in-part of application No. 10/642,028, filed on Aug. 15, 2003, and a continuation-in-part of application No. 10/638, 743, filed on Aug. 11, 2003, and a continuation-in-part of application No. 10/613,453, filed on Jul. 3, 2003, now Pat. No. 6,850,824, and a continuation-in-part of application No. 10/330,938, filed on Dec. 27, 2002, now Pat. No. 6,823,244, and a continuation of application No. 10/188,673, filed on Jul. 3, 2002, now Pat. No. 6,738,697, is a continuation-in-part of application No. 09/753,186, filed on Jan. 2, 2001, now Pat. No. 6,484,080, which is a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437, said application No. 10/701,361 is a continuation-in-part of application No. 10/174,709, filed on Jun. 19, 2002, now Pat. No. 6,735,506, which is a continuation-in-part of application No. 10/079,065, filed on Feb. 19, 2002, now Pat. No. 6,662,642, and a continuation-in-part of application No. 10/043,557, filed on Jan. 11, 2002, now Pat. No. 6,905,135, and a continuation-in-part of application No. 09/925,062, filed on Aug. 8, 2001, now Pat. No. 6,733,036, which is a continuation-in-part of application No. 09/767,020, filed on Jan. 23, 2001, now Pat. No. 6,533,316, and a continuation-in-part of application No. 09/356,314, filed on Jul. 16, 1999, now Pat. No. 6,326,704, which is a continuation-in-part of application No. 08/947,661, filed on Oct. 9, 1997, now abandoned, said application No. 09/356,314 is a continuation-in-part of application No. 09/073,403, filed on May 6, 1998, now Pat. No. 6,179,326, which is a continuation-in-part of application No. 08/571,247, filed on Dec. 12, 1995, now Pat. No. 5,772,238, and a continuation-in-part of application No. 08/550,217, filed on Oct. 30, 1995, now abandoned, said application No. 09/767,020 and a continuation-in-part of application No. 09/765,558, filed on Jan. 19, 2001, now Pat. No. 6,748,797, and a continuation-in-part of application No. 09/645,709, filed on Aug. 24, 2000, , said application No. 11/082, 739 is a continuation-in-part of application No. 10/658,750, filed on Sep. 9, 2003, now Pat. No. 6,892,572, which is a continuation-in-part of application No. 08/819,609, filed on Mar. 17, 1997, now Pat. No. 6,615,656, which is a continuation-in-part of application No. 08/239,977, filed on May 9, 1994, now abandoned.

(56) References Cited

U.S. PATENT DOCUMENTS

| | | | | |
|---|---|---|---|---|
| 4,418,388 | A | 11/1983 | Allgor et al. | |
| 4,817,418 | A | 4/1989 | Asami et al. | |
| 4,989,146 | A | 1/1991 | Imajo | |
| 5,041,976 | A | 8/1991 | Marko et al. | |
| 5,056,023 | A | 10/1991 | Abe | |
| 5,123,017 | A | 6/1992 | Simpkins et al. | |
| 5,164,901 | A | 11/1992 | Blackburn et al. | |
| 5,313,407 | A | 5/1994 | Tiernan et al. | |
| 5,325,082 | A | 6/1994 | Rodriguez | |
| 5,333,240 | A | 7/1994 | Matsumoto et al. | |
| 5,400,018 | A | 3/1995 | Scholl et al. | |
| 5,406,502 | A | 4/1995 | Haramaty et al. | |
| 5,420,794 | A | 5/1995 | James | |
| 5,442,553 | A | 8/1995 | Parrillo | |
| 5,481,906 | A | 1/1996 | Nagayoshi et al. | |
| 5,581,464 | A | 12/1996 | Woll et al. | |
| 5,594,740 | A | 1/1997 | LaDue | |
| 5,614,676 | A | 3/1997 | Dutt et al. | |
| 5,754,965 | A | 5/1998 | Hagenbuch | |
| 5,809,437 | A | 9/1998 | Breed | |
| 5,829,782 | A | 11/1998 | Breed et al. | |
| 5,845,232 | A | 12/1998 | Shively et al. | |
| 5,955,942 | A | 9/1999 | Slifkin et al. | |
| 6,028,537 | A | 2/2000 | Suman et al. | |
| 6,144,859 | A | 11/2000 | LaDue | |
| 6,175,787 | B1 | 1/2001 | Breed | |
| 6,263,268 | B1 | 7/2001 | Nathanson | |
| 6,295,492 | B1 | 9/2001 | Lang et al. | |
| 6,330,499 | B1 | 12/2001 | Chou et al. | |
| 6,339,736 | B1 | 1/2002 | Moskowitz et al. | |
| 6,356,822 | B1 | 3/2002 | Diaz et al. | |
| 6,381,547 | B1 | 4/2002 | Heirtzler et al. | |
| 6,484,080 | B1 | 11/2002 | Breed | |
| 6,636,790 | B1 | 10/2003 | Lightner et al. | |
| 6,735,506 | B1 * | 5/2004 | Breed et al. | 701/36 |
| 6,738,697 | B1 | 5/2004 | Breed | |
| 6,766,232 | B1 | 7/2004 | Klausner | |
| 6,823,244 | B1 | 11/2004 | Breed | |
| 6,850,824 | B1 * | 2/2005 | Breed | 701/36 |
| 6,879,894 | B1 | 4/2005 | Lightner et al. | |

* cited by examiner

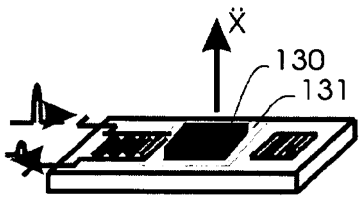
FIG. 17A
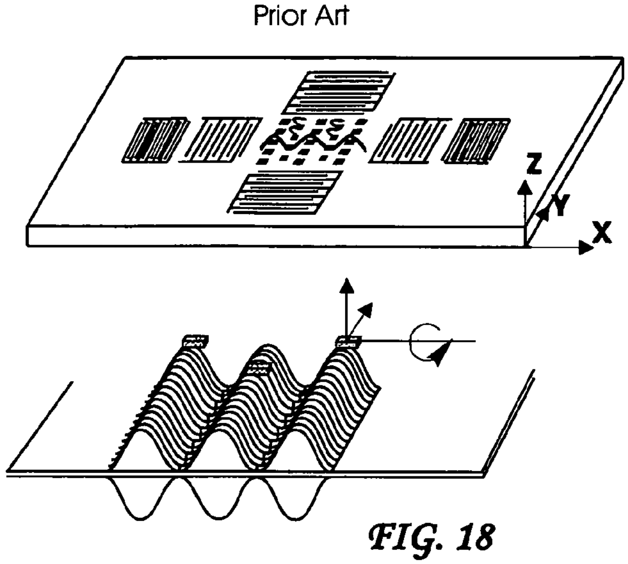
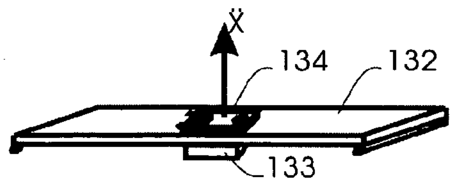
FIG. 17B
FIG. 18
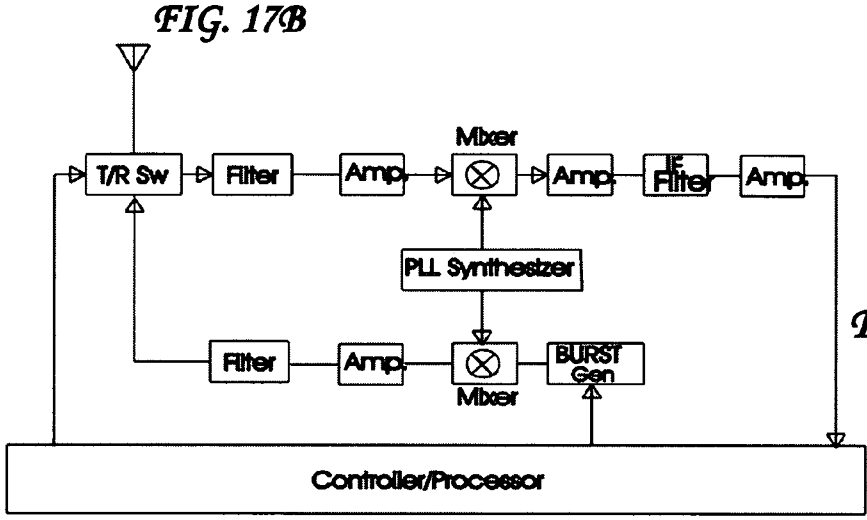
FIG. 19A
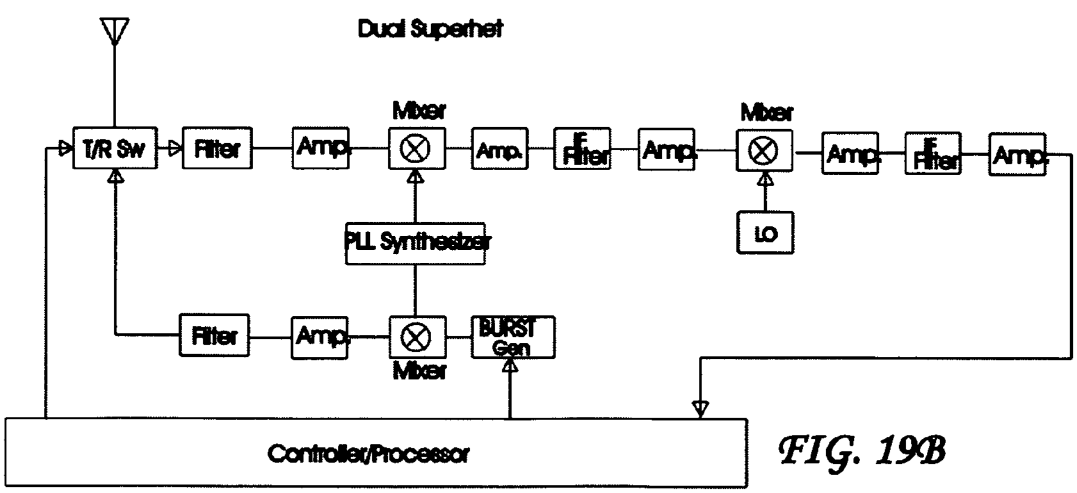
FIG. 19B SAW 50 Ohm
Antenna 50 Ohm

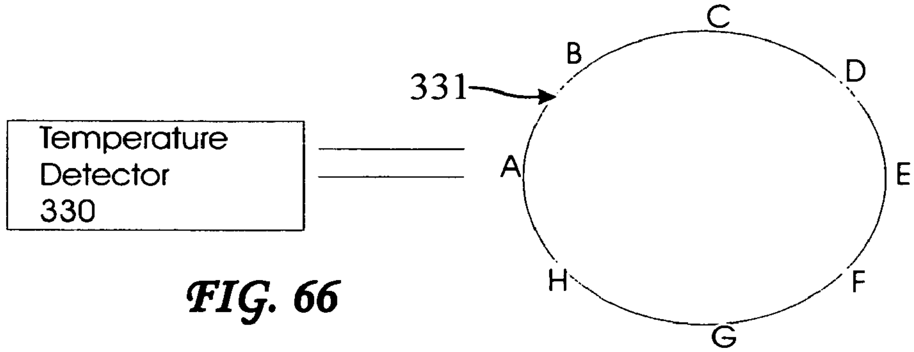
FIG. 66
| Circumferential Location on Tire | Detected Temperature (degrees) | Deviation from average (degrees) | Comparison to threshold of 70 degrees |
|---|---|---|---|
| A | 60 | 1 | Below |
| B | 61 | 0 | Below |
| C | 62 | 1 | Below |
| D | 61 | 0 | Below |
| E | 61 | 0 | Below |
| F | 75 | 14 | Above |
| G | 62 | 1 | Below |
| H | 60 | 1 | Below |
FIG. 67
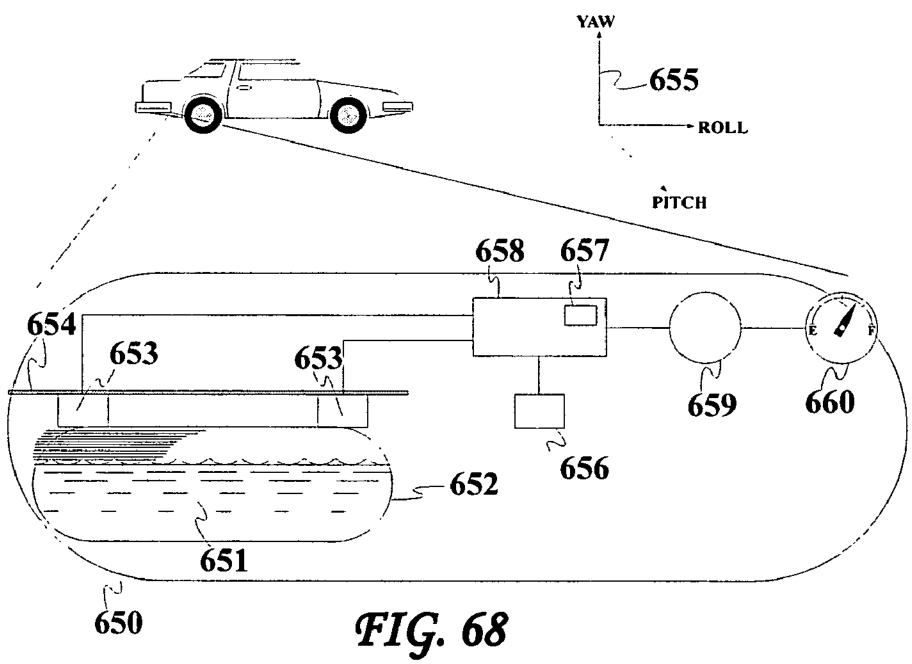
FIG. 68

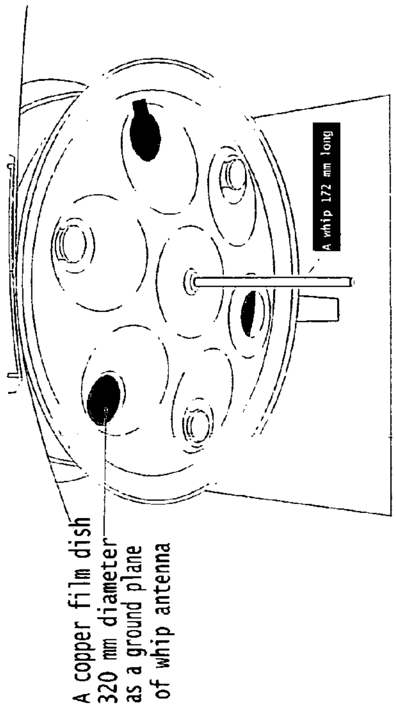
FIG. 134
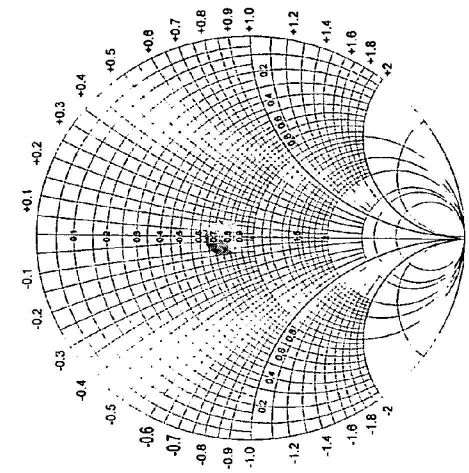
FIG. 135
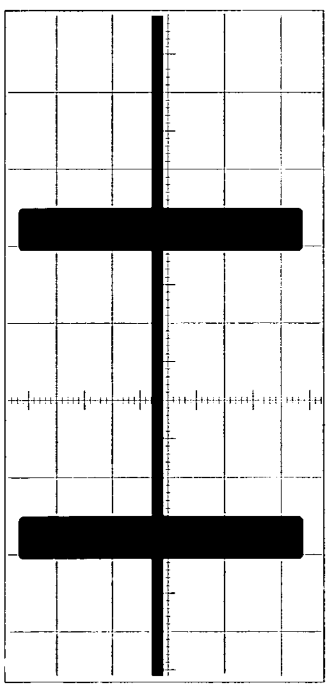
FIG. 131
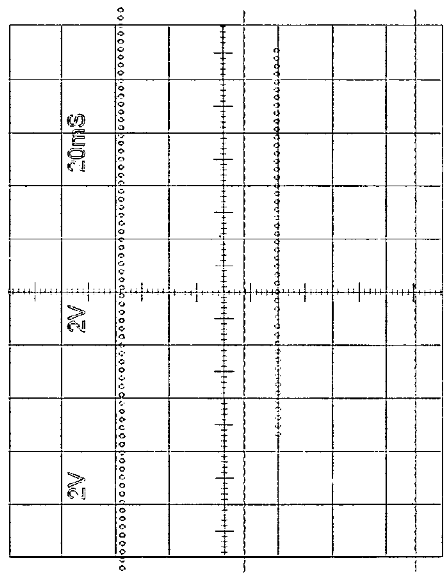
FIG. 133
FIG. 132
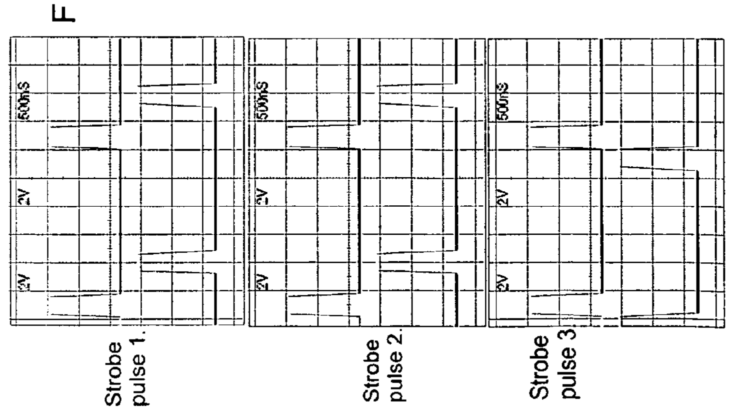
Strobe pulse 1.
Strobe pulse 2.
Strobe pulse 3.

| Rotation angle of tire (deg.) | Relative amplitude of SAW sensor echo (dB) | |
|---|---|---|
| | Sensor on wheel rim without tire | Sensor on wheel rim covered by tire |
| -180 | Echo signal is under noise | -10 |
| -170 | | -11 |
| -160 | | -13 |
| -150 | | -16 |
| -140 | | -19 |
| -130 | | -22 |
| -120 | | -24 |
| -110 | | -24 |
| -100 | -20 | -23 |
| -90 | - | -22 |
| -80 | - | -18 |
| -70 | -18 | -16 |
| -60 | - | -12 |
| -50 | -16 | -8 |
| -40 | -14 | -4 |
| -30 | -10 | -2 |
| -20 | -6 | Nearly 0 |
| -10 | -2 | 0 |
| 0* | 0 | 0 |
| 10 | -2 | Nearly 0 |
| 20 | -4 | -2 |
| 30 | -8 | -6 |
| 40 | -12 | -10 |
| 50 | -14 | -14 |
| 60 | -16 | -16 |
| 70 | -18 | -21 |
| 80 | - | -22 |
| 90 | - | -24 |
| 100 | -20 | -24 |
| 110 | Echo signal is under noise | -23 |
| 120 | | -21 |
| 130 | | -18 |
| 140 | | -15 |
| 150 | | -12 |
| 160 | | -12 |
| 170 | | -11 |
| 180 | | -10 |
* Actually, the tire inserts the additional loss of 6 db at any angle of the wheel rotation.
FIG. 156
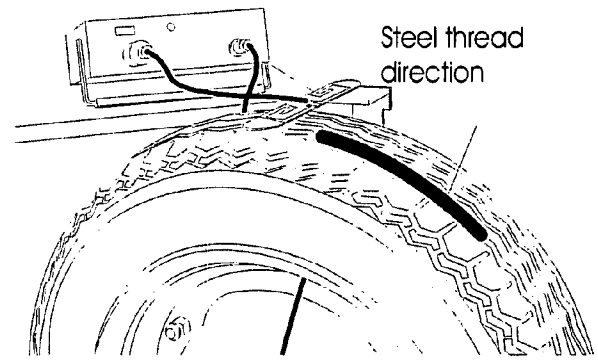
FIG. 157
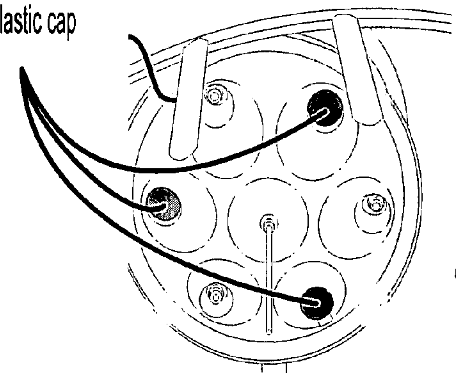
FIG. 158a
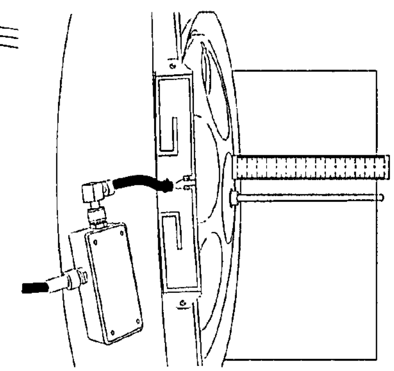
FIG 158 b
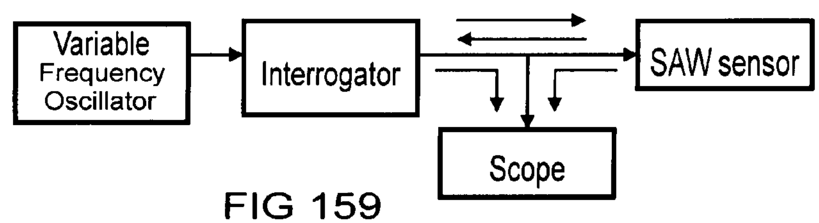
FIG 159

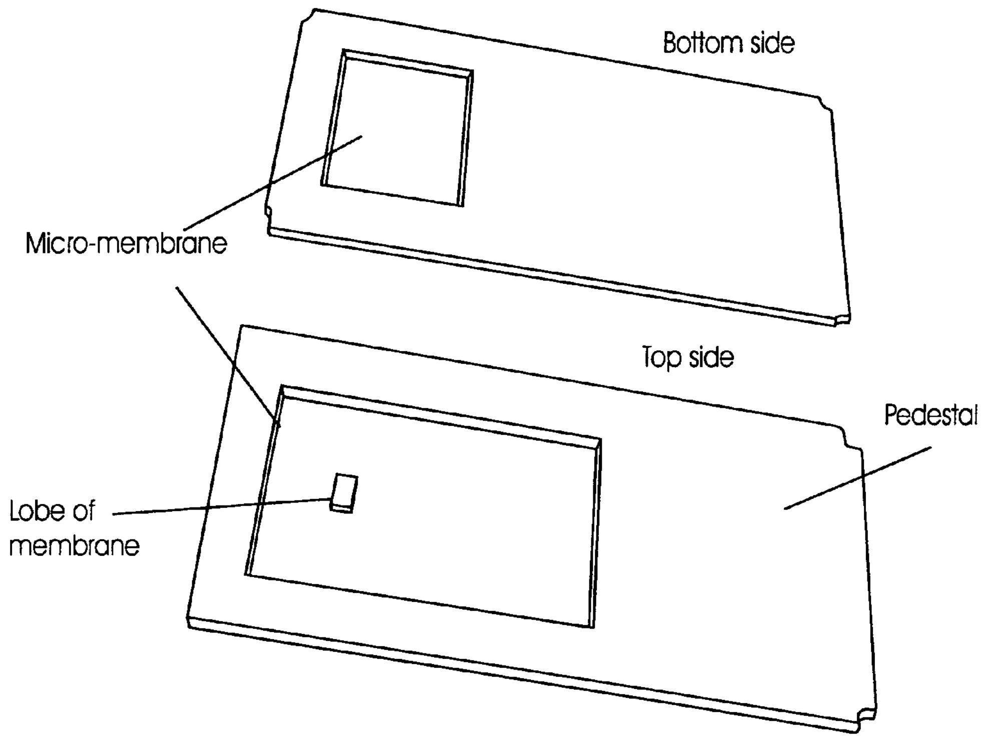
FIG. 162
FIG. 185
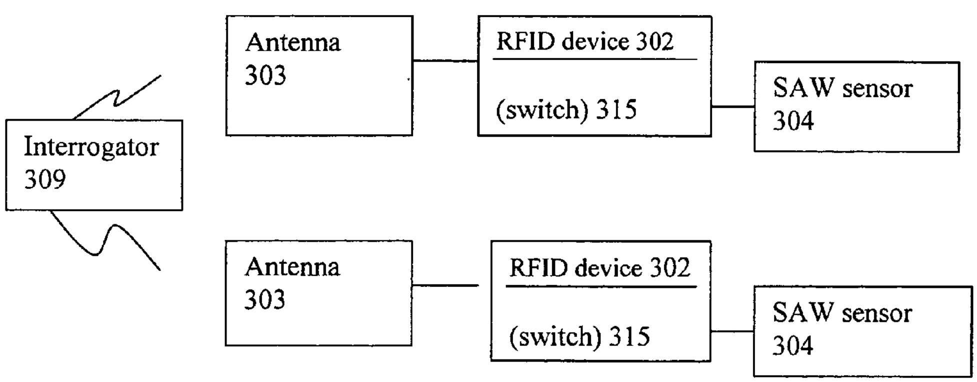

SYSTEM AND METHOD FOR VEHICLE DIAGNOSTICS

CROSS REFERENCE TO RELATED APPLICATIONS

This application is a continuation-in-part of U.S. patent application Ser. No. 11/120,065 filed May 2, 2005 now abandoned which claims priority under 35 U.S.C. § 119(e) of U.S. provisional patent application Ser. No. 60/592,838 filed Jul. 30, 2004 and is:

1) a continuation-in-part of U.S. patent application Ser. No. 11/082,739 filed Mar. 17, 2005 which is:

A) a continuation-in-part of U.S. patent application Ser. No. 10/701,361 filed Nov. 4, 2003 now U.S. Pat. No. 6,988,026 which claims priority under 35 U.S.C. §119 (e) of U.S. provisional patent application Ser. No. 60/423,613 filed Nov. 4, 2002 and U.S. provisional patent application Ser. No. 60/461,648 filed Apr. 8, 2003, and is 1) a continuation of U.S. patent application Ser. No. 10/188,673 filed Jul. 3, 2002, now U.S. Pat. No. 06,738,697, which is a continuation-in-part of U.S. patent application Ser. No. 09/753,186 filed Jan. 2, 2001, now U.S. Pat. No. 06,484,080, which is a continuation-in-part of U.S. patent application Ser. No. 09/137,918 filed Aug. 20, 1998, now U.S. Pat. No. 06,175,787, which is a continuation-in-part of U.S. patent application Ser. No. 08/476,077 filed Jun. 7, 1995, now U.S. Pat. No. 05,809,437;

2) a continuation-in-part of U.S. patent application Ser. No. 10/174,709 filed Jun. 19, 2002, now U.S. Pat. No. 06,735,506;

3) a continuation-in-part of U.S. patent application Ser. No. 10/330,938 filed Dec. 27, 2002, now U.S. Pat. No. 06,823,244;

4) a continuation-in-part of U.S. patent application Ser. No. 10/613,453 filed Jul. 3, 2003, now U.S. Pat. No. 06,850,824;

5) a continuation-in-part of U.S. patent application Ser. No. 09/925,062 filed Aug. 8, 2001, now U.S. Pat. No. 06,733,036 which is a continuation in part of U.S. patent application Ser. No. 09/767,020 filed Jan. 23, 2001, now U.S. Pat. No. 06,533,316, which is:

a) a continuation-in-part of U.S. patent application Ser. No. 09/073,403 filed May 6, 1998, now U.S. Pat. No. 06,179,326, which is 1) a continuation-in-part of U.S. patent application Ser. No. 08/571,247 filed Dec. 12, 1995, now U.S. Pat. No. 05,772,238; and 2) a continuation-in-part of U.S. patent application Ser. No. 08/550,217 filed Oct. 30, 1995, now abandoned;

b) a continuation-in-part of U.S. patent application Ser. No. 09/356,314 filed Jul. 16, 1999, now U.S. Pat. No. 06,326,704, which is 1) a continuation-in-part of U.S. patent application Ser. No. 08/947,661 filed Oct. 9, 1997, now abandoned, which claims priority under 35 U.S.C. § 119(e) of U.S. provisional patent application Ser. No. 60/028,046, filed Oct. 9, 1996; and 2) a continuation-in-part of U.S. patent application Ser. No. 09/137,918 filed Aug. 20, 1998, now U.S. Pat. No. 06,175,787 which is a continuation-in-part of U.S. patent application Ser. No. 08/476,077 filed Jun. 7, 1995, now U.S. Pat. No. 05,809,437;

6) a continuation-in-part of U.S. patent application Ser. No. 09/765,558 filed Jan. 19, 2001, now U.S. Pat. No. 06,748,797, which claims priority under 35 U.S.C. §119(e) of U.S. provisional patent application Ser. No. 60/231,378 filed Sep. 8, 2000;

7) a continuation-in-part of U.S. patent application Ser. No. 10/079,065 filed Feb. 19, 2002, now U.S. Pat. No. 06,662,642, which claims priority under 35 U.S.C. § 119(e) of U.S. provisional patent application Ser. No. 60/269,415 filed Feb. 16, 2001, U.S. provisional patent application Ser. No. 60/291,511 filed May 16, 2001 and U.S. provisional patent application Ser. No. 60/304,013 filed Jul. 9, 2001;

8) a continuation-in-part of U.S. patent application Ser. No. 10/642,028 filed Aug. 15, 2003, which claims priority under 35 U.S.C. §119(e) of U.S. provisional patent application Ser. No. 60/415,862 filed Oct. 3, 2002;

9) a continuation-in-part of U.S. patent application Ser. No. 10/638,743 filed Aug. 11, 2003.

10) a continuation-in-part of U.S. patent application Ser. No. 10/043,557 filed Jan. 11, 2002, now U.S. Pat. No. 06,905,135; and 11) a continuation-in-part of U.S. patent application Ser. No. 09/645,709 filed Aug. 24, 2000, which claims priority under 35 U.S.C. §119(e) of U.S. provisional patent application Ser. No. 60/170,973 filed Dec. 15, 1999; and B) a continuation-in-part of U.S. patent application Ser. No. 11/039,129 filed Jan. 19, 2005 which is a divisional of the '361 application, the file history of which is set forth above; and 2) a continuation-in-part of U.S. patent application Ser. No. 10/658,750 filed Sep. 9, 2003, now U.S. Pat. No. 06,892,572, which is a continuation-in-part of U.S. patent application Ser. No. 08/819,609 filed Mar. 17, 1997, now U.S. Pat. No. 06,615,656, which is a continuation-in-part of U.S. patent application Ser. No. 08/239,977 filed May 9, 1994, now abandoned.

All of the references, patents and patent applications that are referred to herein are incorporated by reference in their entirety as if they had each been set forth herein in full. Note that this application is one in a series of applications covering safety and other systems for vehicles and other uses. The disclosure herein goes beyond that needed to support the claims of the particular invention set forth herein. This is not to be construed that the inventor is thereby releasing the unclaimed disclosure and subject matter into the public domain. Rather, it is intended that patent applications have been or will be filed to cover all of the subject matter disclosed below and in the current assignee's granted and pending applications. Also please note that the terms frequently used below "the invention" or "this invention" is not meant to be construed that there is only one invention being discussed. Instead, when the terms "the invention" or "this invention" are used, it is referring to the particular invention being discussed in the paragraph where the term is used.

FIELD OF THE INVENTION

This invention relates to monitoring components, systems or subsystems of a vehicle by obtaining a measurement of a physical quantity related to the component, system or subsystem and more particularly to monitoring the tires of a vehicle by measuring the temperature of the tires. This invention also relates to obtaining and processing information from or related to one or more components, systems or subsystems of a vehicle wirelessly.

The invention also relates to the application of a wireless power system for controlling power transfer and communication between sensors and transducers mounted on the vehicle, such as tire monitoring sensors, and other systems or devices in the vehicle.

There are numerous methods and components described and disclosed herein. Many combinations of these methods and components are described but in order to conserve space the inventor has not described all combinations and permutations of these methods and components, however, the inventor intends that each and every such combination and permutation is an invention to be considered disclosed by this disclosure. The inventor further intends to file continuation and continuation-in-part applications to cover many of these combinations and permutations, if necessary.

BACKGROUND OF THE INVENTION

1. Diagnostics 1.1 General Diagnostics

When a vehicle component begins to fail, the repair cost is frequently minimal if the impending failure of the component is caught early, but increases as the repair is delayed. Sometimes, if a component in need of repair is not caught in a timely manner, the component, and particularly the impending failure thereof, can cause other components of the vehicle to deteriorate. One example is where the water pump fails gradually until the vehicle overheats and blows a head gasket. Another example is when a tire gradually loses air until it heats up, fails and causes an accident. It is desirable, therefore, to determine that a vehicle component is about to fail as early as possible so as to minimize the probability of a breakdown and the resulting consequences.

There are various gages on an automobile which alert the driver to various vehicle problems. For example, if the oil pressure drops below some predetermined level, the driver is warned to stop his vehicle immediately. Similarly, if the coolant temperature exceeds some predetermined value, the driver is also warned to take immediate corrective action. In these cases, the warning often comes too late as most vehicle gages alert the driver after he or she can conveniently solve the problem. Thus, what is needed is a component failure warning system that alerts the driver to an impending failure of a component sufficiently in advance of the time when the problem gets to a catastrophic point.

Some astute drivers can sense changes in the performance of their vehicle and correctly diagnose that a problem with a component is about to occur. Other drivers can sense that their vehicle is performing differently but they don't know why or when a component will fail or how serious that failure will be, or possibly even what specific component is the cause of the difference in performance. There is a need therefore for a system which predicts component failures in time to permit maintenance and thus prevent vehicle breakdowns.

Presently, automobile sensors in use are based on specific predetermined or set levels, such as the coolant temperature or oil pressure, whereby an increase above the set level or a decrease below the set level will activate the sensor, rather than being based on changes in this level over time. The rate at which coolant heats up, for example, can be an important clue that some component in the cooling system is about to fail. There are no systems currently on automobiles to monitor the numerous vehicle components over time and to compare component performance with normal performance. For example, nowhere in the vehicle is the vibration signal of a normally operating front wheel stored or for that matter, any normal signal from any other vehicle component. Additionally, there is no system currently existing on a vehicle to look for erratic behavior of a vehicle component and to warn the driver, manufacturer or the dealer that a component is misbehaving and is therefore likely to fail in the very near future. In order to minimize breakdowns on the road, there is therefore a need for such a system.

Basically, operation of an automobile should be a process not a project. To accomplish this, there is a need to eliminate breakdowns by identifying potential component failures before they occur so that they can be repaired in a timely manner. Another need is to notify the operator and a service facility of the pending failure so that it can be prevented.

Sometimes, when a component fails, a catastrophic accident results. In the Firestone tire case, for example, over 100 people were killed when a tire of a Ford Explorer blew out which caused the Ford Explorer to rollover. Similarly, other component failures can lead to loss of control of the vehicle and a subsequent accident. Therefore, there is a need to accurately forecast that such an event will take place but furthermore, for those cases where the event takes place suddenly without warning, there is also a need to diagnose the state of the entire vehicle, which in some cases can lead to automatic corrective action to prevent unstable vehicle motion or rollovers resulting in an accident.

Finally, an accurate diagnostic system for the entire vehicle can, determine much more accurately the severity of an automobile crash once it has begun by knowing where the accident is taking place on the vehicle (e.g., the part of or location on the vehicle which is being impacted by an object) and what is colliding with the vehicle based on a knowledge of the force deflection characteristics of the vehicle at that location. Since no such system currently exists, therefore, in addition to a component diagnostic, there is also a need to provide a diagnostic system for the entire vehicle prior to and during accidents. In particular, to minimize the events described above, there is a need for the simultaneous monitoring of multiple sensors on the vehicle so that the best possible determination of the state of the vehicle can be determined. Current crash sensors operate independently or at most one sensor may influence the threshold at which another sensor triggers a deployable restraint as taught in the current assignee's U.S. patent application Ser. No. 10/638,743 filed Aug. 11, 2003 and related patents and pending applications. In the teachings of this invention, two or more sensors, frequently accelerometers, are monitored simultaneously and the outputs of these sensors can be combined continuously in making the crash severity analysis.

U.S. Pat. No. 05,754,965 (Hagenbuch) describes an apparatus for diagnosing the state of health of a construction vehicle and providing the operator of the vehicle with a substantially real-time indication of the efficiency of the vehicle in performing an assigned task with respect to a predetermined goal. A processor in the vehicle monitors sensors that provide information regarding the state of health of the vehicle and the amount of work the vehicle has done. The processor records information that describes events leading up to the occurrence of an anomaly for later analysis. The sensors are also used to prompt the operator to operate the vehicle at optimum efficiency. The system of this patent does not predict or warn the operator or the home base of a pending problem.

Asami et al. (U.S. Pat. No. 04,817,418) is directed to a failure diagnosis system for a vehicle including a failure display for displaying failure information to a driver. This system only reports failures after they have occurred and does not predict them.

Tiernan et al. (U.S. Pat. No. 05,313,407) is directed, inter alia, to a system for providing an exhaust active noise control system, i.e., an electronic muffler system, including an input microphone 60 which senses exhaust noise at a first location 61 in an exhaust duct 58. An engine has exhaust manifolds 56, 57 feeding exhaust air to the exhaust duct 58. The exhaust noise sensed by the microphone 60 is processed to obtain an output from an output speaker 65 arranged downstream of the input microphone 61 in the exhaust path in order to cancel the noise in the exhaust duct 58. No attempt is made to diagnose system faults nor predict them.

Haramaty et al. (U.S. Pat. No. 05,406,502) describes a system that monitors a machine in a factory and notifies maintenance personnel remote from the machine (not the machine operator) that maintenance should be scheduled at a time when the machine is not in use. Haramaty et al. does not expressly relate to vehicular applications.

NASA Technical Support Package MFS-26529 "Engine Monitoring Based on Normalized Vibration Spectra", describes a technique for diagnosing engine health using a neural network based system but does not suggest that this system can or should be used on land vehicles.

A paper "Using acoustic emission signals for monitoring of production processes" by H. K. Tonshoff et al. also provides a good description of how acoustic signals can be used to predict the state of machine tools. Again no suggestion is made that this can be used for diagnosing components of land vehicles.

As also pointed out in U.S. Pat. No. 06,330,499, after the filing of the current assignee's fundamental patents on the subject, " . . . vehicles perform such monitoring typically only for the vehicle driver and without communication of any impending results, problems and/or vehicle malfunction to a remote site for trouble-shooting, diagnosis or tracking for data mining."

"Systems that provide for remote monitoring do not have a means for automated analysis and communication of problems or potential problems and recommendations to the driver."

"As a result, the vehicle driver or user is often left stranded, or irreparable damage occurs to the vehicle as a result of neglect or driving the vehicle without the user knowing the vehicle is malfunctioning until it is too late."

U.S. Pat. No. 06,611,740 provides a good summary of OBD-II diagnostic systems as follows:

"The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic buss in the vehicle. The buss effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The presence of a DTC in the memory of a vehicle's ECU typically results in illumination of the 'Service Engine Soon' light present on the dashboard of most vehicles."

"Data from the above-mentioned systems are made available through a standardized, serial 16-cavity connector referred to herein as an 'OBD-II connector'. The OBD-II connector typically lies underneath the vehicle's dashboard. When a vehicle is serviced, data from the vehicle's ECM and/or PCM is typically queried using an external engine-diagnostic tool (commonly called a 'scan tool') that plugs into the OBD-IL connector. The vehicle's engine is turned on and data are transferred from the engine computer, through the OBD-II connector, and to the scan tool. The data are then displayed and analyzed to service the vehicle. Scan tools are typically only used to diagnose stationary vehicles or vehicles running on a dynamometer."

"Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured."

"The web pages also support a wide range of algorithms that can be used to analyze data once it is extracted from the data packets. For example, the above-mentioned alert messages are sent out in response to a DTC or when a vehicle approaches a pre-specified odometer reading. Alternatively, the message could be sent out when a data parameter (e.g. engine coolant temperature) exceeded a predetermined value. In some cases, multiple parameters (e.g., engine speed and load) can be analyzed to generate an alert message. In general, an alert message can be sent out after analyzing one or more data parameters using any type of algorithm. These algorithms range from the relatively simple (e.g., determining mileage values for each vehicle in a fleet) to the complex (e.g., predictive engine diagnoses using 'data mining' techniques). Data analysis may be used to characterize an individual vehicle as described above, or a collection of vehicles, and can be used with a single data set or a collection of historical data. Algorithms used to characterize a collection of vehicles can be used, for example, for remote vehicle or parts surveys, to characterize emission performance in specific geographic locations, or to characterize traffic." Again the OBD systems provide a diagnostic after a problem has occurred and no attempt is made to forecast that a problem will occur sometime in the future. Similarly, the data sent over OnStar™ is data stating that a failure or problem has occurred.

Other related patents include U.S. Pat. No. 06,636,790 and U.S. Pat. No. 06,879,894 to some of the same inventors as U.S. Pat. No. 06,611,740 discussed above. In addition to failing to do any prognostics, the determination of what is wrong with the vehicle and its seriousness is performed on a host computer which resides at a service center. In contrast, some of the inventions disclosed herein perform this analysis on a vehicle or network resident computer as discussed below.

Recent patent applications to Todd, GB2383635A and WO2005003698A1, discuss the use of acoustic emissions from tires to monitor the condition of tires and roads. Todd uses the Garbor transform to perform chromatic analysis to determine the onset of failures. This is a subset of the concepts disclosed in the above-referenced patents and patent applications assigned to ATI.

Another recent patent U.S. Pat. No. 06,330,499 to Chou et al. deserves mention. In this patent, as in '740 patent and related patents, the determination of the fault is accomplished on a service center-resident computer. To accurately forecast that a failure is about to occur, the vehicle would have to send substantial data to the service center since the change in the parameters is frequently necessary to accurately forecast a failure. In many cases, by the time the component emits a signal indicative of a failure, it is too late. Thus, for a service center to properly monitor even a single vehicle could require a wireless connection having significant bandwidth to permit all significant operating data to be transferred frequently. Furthermore, when hundreds or thousands of vehicles are trying to communicate to the service center, the available bandwidth can easily be exceeded, or the amount of data transferred curtailed, resulting in less information from which to make the diagnostics and thus a degradation in the service. In contrast, if the calculations are performed either on the vehicle or on a network-based general purpose processor, these problems essentially disappear. This of course does not even address the fact that the service center could have to load and run different software for each vehicle model monitored resulting in a very complicated computational setup in contrast to the situation where the analysis is performed on the vehicle or network. A comment is in order concerning the network computation model. In line with Cisco, Inc.'s concept that "the network is the computer", as an alternate to having each vehicle run its own software, it could be performed on a general network such as the Internet. The advantage is that the network would always have the latest hardware and software whereas the vehicle would have to operate with what might be obsolete equipment and programs. This is different from a service center operation where the network would operate seamlessly with the vehicle performing the calculations on any available processor that could be located anywhere. Thus, the bandwidth problem as discussed above substantially disappears since the data would not have to be transferred to a service center. As in the '499 patent and '740 patent, when diagnostic trouble codes (DTCs) or malfunction indicator lights (MIL) exist, this information can be treated along with any other information indicating the state of a vehicle component. In fact, the MIL is a good example of where existing warning systems are insufficient. In many vehicles when the MIL is illuminated, the driver does not have any idea as to whether there is in fact a problem and if so whether he or she should stop the vehicle, drive to the nearest service center or ignore it. The fact that the light even went on indicates a failure in the vehicle system, or the dealer system, in that vehicle failures should not occur without substantial warning to the driver. A common experience is to have a MIL illuminate and even the dealer does not know why and in some cases, the repair facility cannot extinguish the light.

General diagnostics have been somewhat developed for industrial machines and large naval ships as reported in Hadden, G. D., P. Bergstrom, T. Samad, B. H. Bennett, G. J. Vachtsevanos, and J. Van Dyke. 2000. "Application Challenges: System Health Management for Complex Systems." Parallel and Distributed Processing Proceedings. *Lecture Notes in Computer Science*, Vol. 1800 pp 784–791 and in Busch, D. et al., "The Application of MEMS-Based Devices for Autonomous Equipment Health Monitoring Systems". The first paper discusses fault detection and identification, failure prediction, modeling and tracking degradation, maintenance scheduling and error correction for shipboard applications. The Wavelet Neural Network diagnostics and prognostics system developed by Professor George Vachtsevanos and colleagues of Georgia Tech. is also disclosed. No mention is made of applying these methods to diagnostics and prognostics of automobiles and trucks. In the second paper, the autonomous Equipment Health Monitoring System (EHMS) is disclosed also for the use on naval ships and again no mention is made of applying this system to automobiles or trucks. Various MEMS sensors are disclosed as is wireless communication. The "MEMS-based sensors under development at Honeywell have resulted in a family of sensors for measuring temperature, pressure, acoustic emission, strain, and acceleration. The devices are based on precision resonant microbeam force sensing technology. Coupled with a precision silicon microstructure, the resonant microbeams provide a high sensitivity pickoff for measuring inertial acceleration, inclination, and low frequency vibrations." The MEMS-based sensors described in this paper are applicable to the inventions described below in the description of the referenced embodiments.

Another viewpoint illustrating the dire need for a general vehicle diagnostics system is reported in T. Moran "What's Bugging the High-Tech Car", New York Times, Feb. 5, 2005. This article tells of a series of problems that car owners have experienced due to software and sensor failures. Diagnostic systems that rely on the output of one sensor to make a decision will fail if that sensor fails. A general diagnostic system that compares the output of several sensors that would not be fooled by a single failure of a sensor and also since the software could also be independent it is less likely to be subject to the same failure mode as the dedicated vehicle system software.

1.2 Pattern Recognition

Marko et al. (U.S. Pat. No. 05,041,976) is directed to a diagnostic system using pattern recognition for electronic automotive control systems and particularly for diagnosing faults in the engine of a motor vehicle after they have occurred. For example, Marko et al. is interested in determining cylinder specific faults after the cylinder is operating abnormally. More specifically, Marko et al. is directed to detecting a fault in a vehicular electromechanical system directly, i.e., by means of the measurement of parameters of sensors which are designed to be affected only by that system, and after that fault has already manifested itself in the system. In order to form the fault detecting system, the parameters from these sensors are input to a pattern recognition system for training thereof. Then, known faults are introduced and the parameters from the sensors are input into the pattern recognition system with indicia of the known fault. Thus, during subsequent operation, the pattern recognition system can determine the fault of the electromechanical system based on the parameters of the sensors, assuming that the fault was "trained" into the pattern recognition system and has already occurred.

When the electromechanical system is an engine, the parameters input into the pattern recognition system for training thereof, and used for fault detection during operation, all relate to the engine. In other words, each parameter will be affected by the operation of the engine and depend thereon and changes in the operation of the engine will alter the parameter, e.g., the manifold absolute pressure is an indication of the airflow into the engine. In this case, the signal from the manifold absolute pressure sensor may be indicative of a fault in the intake of air into the engine, e.g., the engine is drawing in too much or too little air, and is thus affected by the operation of the engine. Similarly, the mass air flow is the airflow into the engine and is an alternative to the manifold absolute pressure. It is thus a parameter that is directly associated with, related to and dependent on the engine. The exhaust gas oxygen sensor is also affected by the operation of the engine, and thus directly associated therewith, since during normal operation, the mixture of the exhaust gas is neither rich or lean whereas during abnormal engine operation, the sensor will detect an abrupt change indicative of the mixture being too rich or too lean.

Thus, the system of Marko et al. is based on the measurement of sensors which affect or are affected by, i.e., are directly associated with, the operation of the electromechanical system for which faults are to be detected. However, the system of Marko et al. does not detect faults in the sensors that are conducting the measurements, e.g., a fault in the exhaust gas oxygen sensor, or faults that are only developing but have not yet manifested themselves or faults in other systems. Rather, the sensors are used to detect a fault in the system after it has occurred. Marko does not attempt to forecast or predict that a fault will occur.

Aside from the references above of assignee's patents and patent applications and the one example of an engine control system, pattern recognition has not been applied to the diagnosis of any faults on a vehicle. In the referenced examples, the engine controller, for example, only sensors directly associated with the component have been used. No attempt has been made to forecast that a failure will occur and no system has been disclosed other than by the assignee for transmitting such diagnostic information to a site off of the vehicle.

1.3 SAW, RFID and Other Wireless Sensors

Surface Acoustic Wave (SAW), Radio Frequency Identification (RFID) and other wireless sensors have particular advantages in sensing vehicle and component parameters as will now be discussed.

One of the first significant SAW sensor patents is U.S. Pat. No. 04,534,223. This patent describes the use of SAW devices for measuring pressure and also a variety of methods for temperature compensation but does not mention wireless transmission.

One method of measuring pressure that is applicable to this invention is disclosed in V. V. Varadan, Y. R. Roh and V. K. Varadan "Local/Global SAW Sensors for Turbulence", IEEE 1989 Ultrasonics Symposium p. 591–594. This method makes use of a polyvinylidene fluoride (PVDF) piezoelectric film to measure pressure. This article discloses that other piezoelectric materials can also be used. Experimental results are given where the height of a column of oil is measured based on the pressure measured by the piezoelectric film used as a SAW device. In particular, the speed of the surface acoustic wave is determined by the pressure exerted by the oil on the SAW device. For the purposes herein, air pressure can also theoretically be measured in a similar manner by first placing a thin layer of a rubber material onto the surface of the SAW device which serves as a coupling agent from the air pressure to the SAW surface. In this manner, the absolute pressure of a tire, for example, can be measured without the need for a diaphragm and reference pressure greatly simplifying the pressure measurement. Tests however using lithium niobate have not been successful. PVDF has not yet been attempted. Other examples of the use of PVDF film as a pressure transducer can be found in U.S. Pat. No. 04,577,510 and U.S. Pat. No. 05,341,687, which are incorporated by reference herein, although they are not used as SAW devices.

In recent years, SAW devices have been used as sensors in a broad variety of applications. Compared with sensors utilizing alternative technologies, SAW sensors possess important properties such as high sensitivity, high resolution, and ease of manufacturing by microelectronic technologies. However, the most attractive feature of SAW sensors is that they can be interrogated wirelessly and that they can be operated without a battery or other source of power except for the RF signal that is captured by the antenna. SAW devices, however, have a very low signal strength which will now be discussed.

A SAW Pressure Sensor can also be used for many pressure sensing applications such as bladder weight sensors permitting that device to be interrogated wirelessly and without the need to supply power. This also can use the boosting techniques as disclosed herein. Similarly, a SAW device can be used as a general switch in a vehicle and in particular as a seatbelt buckle switch indicative of seatbelt use. None of these useful concepts are believed to have been previously disclosed other than by the current assignee.

The operating frequency of SAW devices has been limited to less than about 500 MHz due to manufacturing problems. However, recent advances in lithography and in the manufacture of diamond films that can be combined with a piezoelectric material such as lithium niobate now permit higher frequencies to be used.

Most TPM (tire pressure monitor) systems use batteries in the tire-mounted devices. Batteries pose disposal and life problems and there is a need therefore to provide a replacement system that does not use batteries. The use of a SAW-based TPM and particularly a boosted SAW-based TPM permits the after-market replacement for other battery powered TPM systems such as those manufactured by Schrader with the replacement product removing the need for a battery and thus periodic replacement and solving the disposal problems.

There is also a need to measure the footprint of a vehicle tire since the footprint is a good measure of the load that the vehicle is carrying. The use of a piezoelectric generator attached to the tire tread also enables a measurement of the tire footprint and thus a determination of the load on the car and truck tires. This can also be accomplished by the system that is powered by the change in distance between the tread and the rim as the tire rotates coupled with a measurement of the pressure within the tire. There appears to be no prior art for either concept.

In a different but related invention disclosed below for the first time, the driver is provided with a keyless entry device that can be powerless in the form of an RFID or similar device, that can also be boosted as described herein, and the vehicle mounted interrogator determines the proximity of the driver to the vehicle door. If the driver remains within 1 meter from the door, for example, for a time period of 5 seconds, for example, then the door automatically unlocks and even can open in some implementations. Thus, as the driver approaches the trunk with his or her arms filled with groceries and pauses, the trunk can automatically open. Such a system would be especially valuable for older people. Naturally, this system can also be used for other systems in addition to vehicle doors and trunk lids. No such systems appear to have been disclosed previously in the prior art.

People frequently lock their keys inside the vehicle. There is a need to prevent this from occurring. Another novel implementation is to place a SAW or RFID transponder in the vehicle key and prevent the doors from locking if the keys are inside unless the engine is running or a driver is present. This would eliminate the accidental locking of the keys inside the vehicle that has been one of the main uses of the OnStar™ system by subscribers.

1.4 Tire Monitoring

In August, 2000, Bridgestone/Firestone Inc. recalled approximately 6.5 million Firestone ATX, ATX II and Wilderness AT tires used primarily on Ford Motor Co. light trucks and sport utility vehicles, including Ford's best-selling Explorer. The National Highway Traffic Safety Administration (NHTSA) is investigating Firestone tires in connection with approximately 150 U.S. traffic deaths and more than about 400 injuries. Most of the Firestone tire deaths occurred when the tires came apart while on Ford Explorers, causing the vehicles to roll over.

Bridgestone/Firestone has been criticized for not ordering a recall sooner, even though the company's data on claims for injuries and property damage indicated problems with the tires at least as early as 1997. Ford received harsh criticism after the Firestone recall because it acknowledged ordering its own recall of the same tires in 16 other countries after receiving reports of problems. The foreign recalls began more than a year before the U.S. recall, but Ford never alerted NHTSA. Ford was not required by law to report the foreign recalls.

Spurred in particular by the recent problems with Firestone tires, the U.S. House of Representatives passed a bill requiring vehicle rollover testing and installation of systems to warn of under-inflated tires. It allows for stiff prison sentences for automotive industry executives who hide safety problems. According to the bill, there could be a 15-year sentence for officials who withhold information on defective products from government investigators. It also includes a safe harbor provision that would allow whistle-blowers to report defects within a reasonable amount of time without being punished. Moreover, companies would have to tell NHTSA about tire recalls overseas.

The House bill also requires that all vehicles have warning indicators for low tire pressure and it includes a provision requiring NHTSA to develop driving tests to determine vehicle rollover risk instead of the simple mathematical formula the agency plans to use.

It is known to use internal-to-vehicle mechanisms for monitoring the air pressure of the tires of a vehicle. These mechanisms have a stationary device which interacts with a device that co-moves with the respective wheel of the vehicle in such a way that monitoring of the air pressure can take place during operation of the vehicle. The co-moving device uses suitable means to sense the air pressure, and transmits an output-related signal to the stationary device if the air pressure falls below a certain value. A prerequisite for operation of these systems is that the co-moving device has an energy supply, for example a small battery rotating along with the wheel being monitored. This configuration must therefore be included in ongoing maintenance cycles so that a battery exchange is performed at the proper time. The battery exchange leads to additional costs. Moreover, the mass of the rotating wheel is influenced by the requisite battery device; in particular, an asymmetrical mass distribution results, which requires additional counterweights. Overall wheel balance is therefore degraded.

Tire monitoring is now extremely important since NHTSA (National Highway Traffic Safety Administration) has recently linked 148 deaths and more than 525 injuries in the United States to separations, blowouts and other tread problems in Firestone's ATX, ATX II and Wilderness AT tires, 5 million of which were recalled in 2000. Many of the tires were standard equipment on the Ford Explorer. Ford recommends that the Firestone tires on the Explorer sport utility vehicle be inflated to 26 psi, while Firestone recommends 30 psi. It is surprising that a tire can go from a safe condition to an unsafe condition based on an under inflation of 4 psi as suggested by Firestone.

According to a NHTSA research survey, 27 percent of passenger cars on U.S. roadways are driven with one or more substantially under-inflated tires. In addition, the survey found that 33 percent of light trucks (including sport utility vehicles, vans and pickup trucks) are driven with one or more substantially under-inflated tires.

Recent studies in the United States conducted by the Society of Automotive Engineers show that low tire pressure causes about 260,000 accidents annually. Another finding is that about 75% of tire failures each year are preceded by slow air leaks or inadequate tire inflation. Nissan, for example, warns that incorrect tire pressures can compromise the stability and overall handling of a vehicle and can contribute to an accident. Additionally, most non-crash auto fatalities occur while drivers are changing flat tires. Thus, tire failures are clearly a serious automobile safety problem that requires a solution.

About 16% of all car accidents are a result of incorrect tire pressure. Thus, effective pressure and wear monitoring is extremely important. Motor Trend magazine stated that one of the most overlooked maintenance areas on a car is tire pressure. An estimated 40 to 80 percent of all vehicles on the road are operating with under-inflated tires. When under-inflated, a tire tends to flex its sidewall more, increasing its rolling resistance which decreases fuel economy. The extra flex also creates excessive heat in the tire that can shorten its service life.

The Society of Automotive Engineers reports that about 87 percent of all flat tires have a history of under-inflation. About 85% of pressure loss incidents are slow punctures caused either by small-diameter objects trapped in the tire or by larger diameter nails. The leak will be minor as long as the nail is trapped. If the nail comes out, pressure can decrease rapidly. Incidents of sudden pressure loss are potentially the most dangerous for drivers and account for about 15% of all cases. Thus, there is a need to detect nails and other objects that have penetrated a tire prior to a sudden pressure loss incident.

A properly inflated tire loses approximately 1 psi per month. A defective time can lose pressure at a more rapid rate. About 35 percent of the recalled Bridgestone tires had improper repairs.

Research from a variety of sources suggests that under-inflation can be significant to both fuel economy and tire life. Industry experts have determined that tires under-inflated by a mere 10% wear out about 15% faster. An average driver with an average set of tires can drive an extra 5,000 to 7,000 miles before buying new tires by keeping the tire properly inflated.

The American Automobile Association has determined that under inflated tires cut a vehicle's fuel economy by as much as 2% per psi below the recommended level. If each of a car's tires is supposed to have a pressure of 30 psi and instead has a pressure of 25 psi, the car's fuel efficiency drops by about 10%. Depending on the vehicle and miles driven that could cost from $100 to $500 a year.

The ability to control a vehicle is strongly influenced by tire pressure. When the tire pressure is kept at proper levels, optimum vehicle braking, steering, handling and stability are accomplished. Low tire pressure can also lead to damage to both the tires and wheels.

A Michelin study revealed that the average driver doesn't recognize a low tire until it is 14 psi too low. One of the reasons is that today's radial tire is hard to judge visually because the sidewall flexes even when properly inflated.

Despite all the recent press about keeping tires properly inflated, new research shows that most drivers do not know the correct inflation pressure. In a recent survey, only 45 percent of respondents knew where to look to find the correct pressure, even though 78 percent thought they knew. Twenty-seven percent incorrectly believed the sidewall of the tire carries the correct information and did not know that the sidewall only indicates the maximum pressure for the tire, not the optimum pressure for the vehicle. In another survey, about 60% of the respondents reported that they check tire pressure but only before going on a long trip. The National Highway Traffic Safety Administration estimates that at least one out of every five tires is not properly inflated.

The problem is exacerbated with the new run-flat tires where a driver may not be aware that a tire is flat until it is destroyed. Run-flat tires can be operated at air pressures below normal for a limited distance and at a restricted speed (125 miles at a maximum of 55 mph). The driver must therefore be warned of changes in the condition of the tires so that she can adapt her driving to the changed conditions.

From the above discussion, there is clearly a need to monitor vehicle tire pressures. One solution is to continuously monitor the pressure and perhaps the temperature in the tire. Pressure loss can be automatically detected in two ways: by directly measuring air pressure within the tire or by indirect tire rotation methods. Various indirect methods are based on the number of revolutions each tire makes over an extended period of time through the ABS system and others are based on monitoring the frequency changes in the sound emitted by the tire. In the direct detection case, a sensor is mounted into each wheel or tire assembly, each with its own identity. An on-board computer collects the signals, processes and displays the data and triggers a warning signal in the case of pressure loss.

Under-inflation isn't the only cause of sudden tire failure. A variety of mechanical problems including a bad wheel bearing or a "dragging" brake can cause the tire to heat up and fail. In addition, as may have been a contributing factor in the Firestone case, substandard materials can lead to intra-tire friction and a buildup of heat. The use of re-capped truck tires is another example of heat caused failure as a result by intra-tire friction. An overheated tire can fail suddenly without warning. Thus, there is also a need to monitor tire temperature.

The *Transportation Recall Enhancement. Accountability, and Documentation Act*, (H.R. 5164, or Public Law No. 106–414) known as the TREAD Act, was signed by President Clinton on Nov. 1, 2000. Section 12, TIRE PRESSURE WARNING, states that: "Not later than one year after the date of enactment of this Act, the Secretary of Transportation, acting through the National Highway Traffic Safety Administration, shall complete a rulemaking for a regulation to require a warning system in a motor vehicle to indicate to the operator when a tire is significantly under-inflated. Such requirement shall become effective not later than 2 years after the date of the completion of such rulemaking." Thus, it is expected that a rule requiring continuous tire monitoring will take effect for the 2004 model year.

This law will dominate the first generation of such systems as automobile manufacturers move to satisfy the requirement. This however will not solve all of the problems discussed above and thus the need will still exist for more sophisticated systems that in addition to pressure, monitor temperature, tire footprint, wear, vibration, etc. Although the Act requires that the tire pressure be monitored, it is believed by the inventor that other parameters are as important as the tire pressure or even more important than the tire pressure as described in more detail below.

It is interesting to note that consumers also recognize the need for tire monitors. Johnson Controls' market research showed that about 80 percent of consumers believe a low tire pressure warning system is an important or extremely important vehicle feature.

Although, as with most other safety products, the initial introductions will be in the United States, speed limits in the United States and Canada are sufficiently low that tire pressure is not as critical an issue as in Europe, for example, where the drivers often drive much faster. Thus, the need is even greater in Europe for tire monitors.

To solve some of the above needs, the advent of micro-electromechanical (MEMS) pressure sensors, especially those based on surface acoustical wave (SAW) technology, has now made the wireless and powerless monitoring of tire pressure feasible. This is the basis of the tire pressure monitors described below. According to a Frost and Sullivan report on the U.S. Micromechanical Systems (MEMS) market (June 1997): "A MEMS tire pressure sensor represents one of the most profound opportunities for MEMS in the automotive sector."

There are many wireless tire temperature and pressure monitoring systems disclosed in the prior art patents such as for example, U.S. Pat. No. 04,295,102, U.S. Pat. No. 04,296,347, U.S. Pat. No. 04,317,372, U.S. Pat. No. 04,534,223, U.S. Pat. No. 05,289,160, U.S. Pat. No. 05,612,671, U.S. Pat. No. 05,661,651, U.S. Pat. No. 05,853,020 and U.S. Pat. No. 05,987,980 and International Publication No. WO 01/07271(A1), all of which are illustrative of the state of the art of tire monitoring.

Devices for measuring the pressure and/or temperature within a vehicle tire directly can be categorized as those containing electronic circuits and a power supply within the tire, those which contain electronic circuits and derive the power to operate these circuits either inductively, from a generator or through radio frequency radiation, and those that do not contain electronic circuits and receive their operating power only from received radio frequency radiation. For the reasons discussed above, the discussion herein is mainly concerned with the latter category. This category contains devices that operate on the principles of surface acoustic waves (SAW) and Radio Frequency Identification (RFID) tags and the disclosure below is concerned primarily with such SAW and RFID devices.

International Publication No. WO 01/07271 describes a tire pressure sensor that replaces the valve and valve stem in a tire.

U.S. Pat. No. 05,231,827 contains a good description and background of the tire-monitoring problem. The device disclosed, however, contains a battery and electronics and is not a SAW or RFID device. Similarly, the device described in U.S. Pat. No. 05,285,189 contains a battery as do the devices described in U.S. Pat. No. 05,335,540 and U.S. Pat.

No. 05,559,484. U.S. Pat. No. 05,945,908 applies to a stationary tire monitoring system and does not use SAW devices.

U.S. Pat. No. 05,987,980 describes a tire valve assembly using a SAW pressure transducer in conjunction with a sealed cavity. This patent does disclose wireless transmission. The assembly includes a power supply and thus this also distinguishes it from a preferred system of this invention. It is not a powerless SAW system and thus a battery or other power supply is required. A piezo bimorph system is disclosed but not illustrated for charging the battery or other storage device.

U.S. Pat. No. 05,698,786 relates to the sensors and is primarily concerned with the design of electronic circuits in an interrogator. U.S. Pat. No. 05,700,952 also describes circuitry for use in the interrogator to be used with SAW devices. In neither of these patents is the concept of using a SAW device in a wireless tire pressure monitoring system described. These patents also do not describe including an identification code with the temperature and/or pressure measurements in the sensors and devices.

U.S. Pat. No. 05,804,729 describes circuitry for use with an interrogator in order to obtain more precise measurements of the changes in the delay caused by the physical or chemical property being measured by the SAW device. Similar comments apply to U.S. Pat. No. 05,831,167. Other related prior art includes U.S. Pat. No. 04,895,017.

Other patents disclose the placement of an electronic device in the sidewall or opposite the tread of a tire but they do not disclose either an accelerometer or a surface acoustic wave device. In most cases, the disclosed system has a battery and electronic circuits.

The following additional U.S. patents may provide relevant information to this invention: U.S. Pat. No. 04,361,026, U.S. Pat. No. 04,620,191, U.S. Pat. No. 04,703,327, U.S. Pat. No. 04,724,443, U.S. Pat. No. 04,725,841, U.S. Pat. No. 04,734,698, U.S. Pat. No. 05,691,698, U.S. Pat. No. 05,841,214, U.S. Pat. No. 06,060,815, U.S. Pat. No. 06,107,910, U.S. Pat. No. 06,114,971 and U.S. Pat. No. 06,144,332.

U.S. Pat. No. 05,228,337 to Sharpe, et al. describes a tire pressure and temperature measurement system in which the vehicle wheel tire inflation pressure is measured in real time by a sensor assembly mounted on a rotary part of the wheel. The assembly includes a piezoresistive cell exposed to inflation gas pressure and an electronics module comprising an assembly of three printed circuit boards (PCB). A power signal transmitted from the vehicle to the electronics module via a rotary transformer is conditioned by PCB to provide an energizing signal for the cell. Pressure and temperature signals output by the cell are received by the PCB and converted to digital form before being applied to address locations in a look-up table of PCB which holds pre-calibrated cell outputs. Data from the look-up table is processed to obtain a corrected real time pressure value which is transmitted to the vehicle. If desired, a temperature value may also be transmitted.

U.S. Pat. No. 05,600,301 and U.S. Pat. No. 05,838,229 to Robinson, III describe a remote tire pressure monitoring system employing coded tire identification and radio frequency transmission, and enabling recalibration upon tire rotation or replacement. The system indicates low tire pressure in vehicles, in which each vehicle wheel has a transmitter with a unique code, i.e., the transmitter is internal of the tire. A central receiver in the vehicle is taught, at manufacture, to recognize the codes for the respective transmitters for the vehicle, and also a common transmitter code, in the event one of the transmitters needs to be replaced. During vehicle operation and maintenance, when the tires are rotated, the system can be recalibrated to relearn the locations of the transmitters. The transmitters employ surface acoustic wave devices. An application specific integrated circuit encoder in each transmitter is programmed at manufacture, in accordance with its unique code, to send its information at different intervals, to avoid clash between two or more transmitters on the vehicle. The transmitters are powered by long-life batteries.

U.S. Pat. No. 05,880,363 to Meyer, et al. describes a method for checking air pressure in vehicle wheel tires wherein a pressure signal characteristic for the air pressure in the tire is picked up as a measured signal by a measurement device located in or on the tire of each motor vehicle wheel. A data signal containing a measured air pressure value derived from the pressure signal as well as an identification value characteristic for the respective transmitter device is generated and output by a transmitter device located in or on the tire of each motor vehicle wheel. The data signal output by the transmitter devices will be received by a reception device located at a distance to the motor vehicle wheels. The identification value of the transmitter device contained in the data signal will be compared by a control unit to identification comparison values assigned to the respective transmitter devices such that further processing of the data signal by the control unit will be effected only, if the identification value and the identification comparison value meet a specified assignment criterion. A drawback of this device is that it also uses a battery.

U.S. Pat. No. 05,939,977 to Monson describes a method and apparatus for remotely measuring the pressure and temperature of the gas in a vehicle wheel. The vehicle includes a frame member, a vehicle wheel mounted for rotation relative to the frame member about a rotation axis, and a modulator mounted on the vehicle wheel for movement therewith. The modulator generates a carrier signal including a first component encoding a plurality of consecutive data signals corresponding to a physical characteristic of the vehicle wheel, and the carrier signal including a second component identifying a portion of the respective one of the data signals U.S. Pat. No. 05,963,128 to McClelland describes a remote tire pressure monitoring system which monitors a vehicle's tire pressures and displays real-time pressure values on a dashboard display while the vehicle is on the road. An electronic unit with pressure sensor, roll switch, reed switch, tilt switch, battery and control electronic, mounted to the valve stem inside each tire uses the pressure sensor to periodically measure the tire pressure, and uses a transmitter to transmit the measured pressure values, via RF transmission, to a dashboard mounted receiver. The receiver controls a display which indicates to the driver the real-time tire pressure in each wheel. The display also indicates an alarm condition when the tire pressure falls below certain predefined thresholds. The pressure values are compensated for temperature changes inside the tire, and also may be compensated for altitude changes.

U.S. Pat. No. 06,005,480 to Banzhof, et al. describes a snap-in tire valve including a valve body surrounded in part by a resilient element that forms an annular sealing surface configured to snap in place into a valve opening of a wheel. A tire pressure radio-frequency sending unit is mounted to the valve body, and a column extends from the sending unit. The region between the resilient element and the pressure sending unit defines an expansion volume that receives displaced portions of the resilient element during snap-in insertion of the valve body into a wheel opening, thereby facilitating insertion. Preferably the column defines a central passageway to facilitate insertion using standard insertion tools. In one version, two batteries are included in the sending unit, disposed on opposite sides of the column.

U.S. Pat. No. 06,034,597 to Normann, et al. describes a method for processing signals of a tire pressure monitoring system on vehicles in which a transmitter is mounted on each wheel of the vehicle and a reception antenna allocated to each transmitter is connected to the input of a common receiver. The transmitters transmit, at time intervals, data telegrams which contain an individual identifier and a data portion following the latter. The signals received simultaneously from the reception antennas and having the same identifier are conveyed in summed fashion to the receiver in a set manner.

U.S. Pat. No. 06,043,738 to Stewart, et al. describes a remote tire pressure monitoring system includes a sending unit for each monitored tire, and the sending units transmit RF signals, each including an identifier and a pressure indicator. A receiver operates in a learn mode in which the receiver associates specific identifiers either with the vehicle or with specific tires. During the learn mode the vehicle is driven at a speed above a threshold speed, such as thirty miles an hour, and identifiers are associated with either the vehicle or the respective tires of the vehicle only if they persist for a selected number of signals or frames during the learning period. In one example, the tires are inflated with different pressures according to a predetermined pattern, and the pressure indicators of the receive signals are used to associate individual tire positions with the respective sending units.

U.S. Pat. No. 06,046,672 to Pearman describes a tire condition indicating device having a detector for detecting the condition of a tire on a wheel of a vehicle rotatable about a wheel axis, preferably for detecting pressure of the tire. A signal emitter emits a signal when the detector detects the condition and a power supply device provides power to the signal emitter. The power supply device has an electric power generator including first and second parts that are relatively rotatable about a generator axis, the first part connected to the wheel to rotate.

U.S. Pat. No. 06,053,038 to Schramm, et al. describes an internal-to-vehicle mechanism for monitoring the air pressure of a tire of a vehicle. The mechanism includes a sensor, detecting the tire pressure, which rotates, together with an electrotechnical first device, synchronously with the wheel and which, as a function of the tire air pressure that is determined, modifies parameters of the first device, namely the energy uptake of the first device. A stationary electrotechnical second device radiates an electric and/or magnetic, in particular electromagnetic, field through which the first device passes at, preferably, each wheel rotation with an uptake of energy from the field. A monitoring device detects the energy uptake and/or energy release of the second device.

U.S. Pat. No. 06,101,870 to Kato, et al. describes a device for monitoring the air pressure of a wheel. The device prevents a decrease in the transmission level of radio waves caused by impedance mismatch between an antenna, which radiates the radio waves, and a circuit, which produces signals that are to be radiated as the radio waves. The device includes a valve stem through which air is charged. The valve stem extends through a vehicle wheel. A transmitter is secured to the wheel to transmit a signal representing the air pressure of the wheel to a receiver installed in the vehicle. The device further includes a case attached to the wheel. The case is connected to the valve stem. An electric circuit is accommodated in the case to detect the air pressure and convert the detected pressure to an electric signal. An antenna radiates the signal produced by the electric circuit and is arranged about the valve stem. A conveying mechanism conveys the signals produced by the electric circuit to the antenna.

U.S. Pat. No. 06,112,585 to Schrottle, et al. describes a tire pressure monitoring device for a vehicle having several wheels comprises a central receiving and evaluation device at the vehicle. A receiving antenna is arranged stationarily at the vehicle structure adjacent to at least each active wheel and thus attributed to that specific wheel. All receiving antennas are connected via a distinctive connecting line with a single receiver means. The receiver means comprises a multiplexer-circuit connecting per time interval only one single selected receiving antenna or several selected receiving antennas with the receiving means. Further, the receiver means sense a field strength of each specific radiogram and thus select the specific receiving antenna comprising the highest field strength of a received radiogram during the specific time interval. Thus, central evaluation means may attribute a specific radiogram to the specific wheel arranged adjacent to the receiving antenna comprising the highest field strength of a received radiogram during the specific time interval.

Finally, U.S. Pat. No. 05,641,902, U.S. Pat. No. 05,819,779 and U.S. Pat. No. 04,103,549 illustrate a valve cap pressure sensor where a visual output is provided. Other related prior art includes U.S. Pat. No. 04,545,246.

None of these patents show a temperature sensor mounted entirely at a location external of and apart from the tire and coupling the temperature sensor with a unit capable of receiving power either inductively or through radio frequency energy transfer in order to enable the temperature sensor to conduct a temperature measurement. Also, many other features of the inventions disclosed herein are absent from the above-mentioned related art. Rather, all of the tire monitoring systems entail the use of a sensor or other device mounted on the tire or formed in connection with the tire.

The reader is referred to a recent publication that provides an excellent summary of the state of the art of tire monitoring systems as of 2003: "APOLLO IST-2001-34372 "Intelligent Tyre for Accident-free Traffic, Intelligent Tyre Systems—State of the Art and Potential Technologies Deliverable D7", May 22, 2003. This project was funded by, and this report is available from, the European Community under the "Information Society Technology" Programme (1998–2002).

1.4.1 Antenna Considerations 1.4.1.1 Tire Location Determination

There is much concern about determining the location of a tire that has a pressure sensor so that the driver can be made aware of which tire has low pressure. U.S. Pat. No. 06,571,617 (and associated U.S. Pat. No. 06,463,798, and U.S. applications 20020092345, 20020092346 and 20020092347) attempts to solve this problem by looking at the variation in amplitude of the signals coming from the tires and correlating this to a rotation frequency of each tire as the vehicle turns since each wheel will rotate at a different frequency as a vehicle is going around a corner, for example. This requires that each tire pressure monitor transmit many times per revolution which for conventional battery-operated systems is not practical as it would soon deplete the battery charge. Such a system could also be used for SAW-based systems but such battery-less systems are not disclosed in the '617 patent. One system that does not use a battery is disclosed in the '617 patent using an RFID but the inventors recognize that RFID systems have limited range and require that an antenna be placed in each wheel well. A permanent magnetic and coil charging system is briefly disclosed but no mention is made of this possibility being used to solve the battery discharging problem that renders the rotation solution impractical. In particular, no mention is made of the use of multiple antennas to determine the direction that a particular tire is from a centralized antenna location. A directional antenna is mentioned but not described as to how it works. Since essentially all antennas are directional, it must be assumed that, consistent with the earlier disclosure, the relative magnitude of the received pulses is used to determine tire location.

Disclosed below and in the parent patent applications is thus the first such disclosure of the use of multiple antennas or of smart antennas for determining the location of a transmitting source on or in the vicinity of a vehicle.

1.4.1.2 Smart Antennas

Smart antenna technology is disclosed by Motia in "enhancing 802.11 WLANs through Smart Antennas", January 2004, and elsewhere. This white paper is available from the Motia web site (motia.com). This technology has not been applied to vehicles and in particular to finding the location of transmitters on or in the vicinity of vehicles as disclosed herein.

1.4.1.3 Distributed Load Dipole

The distributed load dipole antenna, as developed at the University of Rhode Island, also has application to intra-vehicle and vehicle-to-infrastructure communications although it has not been used for this purpose.

1.4.1.4 Plasma Antenna

The plasma antenna, as developed by Markland Technologies, also has application to intra-vehicle and vehicle-to-infrastructure communications although it has also not been used for this purpose.

1.4.1.5 Dielectric Antenna

A great deal of work is ongoing in the development of dielectric antennas which also has application to intra-vehicle and vehicle-to-infrastructure communications although it has not been used for this purpose.

1.4.1.6 Nanotube Antenna

Nanotube technology is now beginning to be applied to antenna which also will have application to intra-vehicle and vehicle-to-infrastructure communications although it has not been used for this purpose.

1.4.2 Signal Boosting

In the use of SAW sensors for vehicles, one problem arises from vehicle vibrations that can interfere with or create excessive noise in the signals provided by the SAW sensor due to the generally low strength of the signal from the SAW sensor. In many cases for SAW tire monitors, for example, an adequate return signal can be obtained while the vehicle is stationary but the signal degrades as the vehicle moves. Thus, whereas the device can operate without power in the stationary mode it is desirable to have a source of power when the vehicle is moving. However, when the vehicle is moving there is a significant amount of energy available in the vehicle tire, and elsewhere in the environment, to permit the powered operation of the SAW device. This is known herein as using energy harvesting for signal boosting. Such signal boosting, as described below, can increase the gain by as much as 6 db in both directions, or a total of 12 db, or more. The energy generated can be stored on a capacitor, or ultracapacitor, or on a rechargeable battery as appropriate. U.S. Pat. No. 05,987,980 describes that a bimorph can be used to generate a trickle current to recharge a battery for a powered electronic circuit TPM. The device is not illustrated and the disclosure is minimal. No mention is made of the dual mode of operation where the device can run either with or without power.

Previously, RF MEMS switches have not been used in the tire, RFID or SAW sensor environment such as for TPM power and antenna switching as disclosed herein. Such RF-MEMS switches can be advantageously used with a booster circuit. International Application No. WO03047035A1 "GPS equipped cellular phone using a SPDT MEMS switch and single shared antenna" describes such a use for cell phones. One example of an RF MEMS switch is manufactured by Teravicta Technologies Inc. The company's initial product, the TT612, is a 0 to 6 GHz RF MEMS single-pole, double-throw (SPDT) switch. It has a loss of 0.14-dB at 2-GHz, good linearity and a power handling capability of three watts continuous, all enclosed within a surface mount package.

Teravicta claims the RF performance of its switch is superior to that of conventional solid-state alternatives such as gallium arsenide FETs and PIN diodes that are used in today's wireless voice and data products.

1.4.3 Energy Generation

Several prior art patents describe various non-battery power sources for use with tire monitors. These include inductive, capacitive and generator systems using a moving weight. Other systems that are disclosed herein and in the current assignee's patent applications to charge an energy storage device use an RFID circuit, the earth's magnetic field with a coil, a solar sensor, a MEMS or other energy generator that uses the vibrations in the tire and a generator that uses the bending deflection of tread or the deflection of the tire itself relative to the tire rim as sources of energy. This is sometimes known as Energy Harvesting. See for example C. Brown "Energy-harvesting component runs wireless nets", EE Times, Dec. 30, 2003, or as appearing at the URL http:/www.eetimes.com/article/showArticle.jhtml?articleId=18,310,200. By using single-crystal piezoelectric fibers such as are being used to damp the vibrations in sports equipment, the energy-conversion efficiency has increased to from 60% to 90% making this material ideal for forming energy harvesting mats of other structures for converting the flexure or vibration energy in a tire, for example, to electricity as disclosed herein. Naturally energy harvesting can be used for other sensors in the system and this is disclosed for the first time below for use with vehicles and particularly automobiles, trucks, and containers such as shipping containers. Also see P. Mannion "Energy Harvesting Brings Power to Wireless Nets", EE Times, Oct. 27, 2003. Patents and patent applications related to energy harvesting include U.S. Pat. No. 06,433,465 and U.S. Pat. No. 06,700,310, and U.S. applications 20020070635, 20020074898, 20040078662, 20040124741 and 20040135554.

These can be used with the boosting circuit with or without a MEMS RF or other appropriate mechanical or electronic switch.

1.4.4 Communication, ID

Several U.S. patent applications to Witkowski et al., publication numbers 20040110472, 20040048622, 20030228879, 20020197955, discuss communications between smart systems such as a vehicle-mounted transceiver and a portable device such as a PDA or laptop computer. "In one exemplary embodiment, a wireless communication system makes use of the Bluetooth communications standard for establishing a wireless communications link between two devices, where each device is equipped with a RF transceiver operating in accordance with the Bluetooth communications standard. This enables two or more devices to be connected via high speed, wireless communications links to permit voice and/or data information to be exchanged between the various devices. The devices communicate on the 2.4 GHz ISM frequency band and employ encryption and authentication schemes, in addition to frequency hopping, to provide a high measure of security to the transmission of data between the devices. Advantageously, the wireless communications link is created automatically as soon as the two devices come into proximity with each other."

This rather sophisticated system would be cost prohibitive for use in a tire pressure and temperature monitoring system, for example, and is certainly not applicable for communication with passive RFID or SAW devices.

Additionally, although there is considerable discussion about use of a wireless communication system for retail transactions, there is no mention of the use of a mouse pad or switches, such as those on a steering wheel, that can be operated by a driver in conjunction with the display that provides, e.g., a fast food menu.

The combination of an RFID with a SAW device has also not been reported in the prior art. This combination in addition to providing energy to boost the SAW system can also provide a tire identification to the interrogator. The ID portion of the RFID can be in the form of a SAW Polyvinylidene Fluoride RFID Tag that can be manufactured at low cost or using a conventional memory. The use of such a PVDF SAW RFID tag has not previously been reported.

RFID tags generally suffer from limited range requiring the placement of the interrogator antenna within a fraction of a meter from the tag itself. When RFID tag technology has been used for tire monitoring, for example, the antenna is generally placed within the wheel well near to the tire. Recent developments have extended the reading range of RFID tags to approaching 10 meters thus permitting a centrally mounted antenna to be used for tire monitoring, for example. See, for example, U. Karthaus, and M. Fischer, "Fully Integrated Passive UHF RFID Transponder IC with 16.7-μW Minimum RF Input Power", IEEE Journal of Solid-State Circuits, Vol. 38, No. 10, October 2003. This technology has not been applied to vehicles and particularly to monitoring RFID tags mounted on vehicles or on objects within vehicles as is contemplated herein. It satisfies the need for an RFID system with a centrally mounted antenna.

The Karthaus et al. technology as described in their abstract is: "This paper presents a novel fully integrated passive transponder IC with 4.5- or 9.25-m reading distance at 500-mW ERP or 4-W EIRP base-station transmit power, respectively, operating in the 868/915-MHz ISM band with an antenna gain less than 0.5 dB. Apart from the printed antenna, there are no external components. The IC is implemented in a 0.5-m digital two-poly two-metal digital CMOS technology with EEPROM and Schottky diodes. The IC's power supply is taken from the energy of the received RF electromagnetic field with help of a Schottky diode voltage multiplier. The IC includes dc power supply generation, phase shift keying backscatter modulator, pulse width modulation demodulator, EEPROM, and logic circuitry including some finite state machines handling the protocol used for wireless write and read access to the IC's EEPROM and for the anti-collision procedure. The IC outperforms other reported radio-frequency identification ICs by a factor of three in terms of required receive power level for a given base-station transmit power and tag antenna gain."

1.5 Fuel Gage

The present invention is an improvement on the invention disclosed in U.S. Pat. No. 05,133,212 to Grills et al. Grills et al. describe a weighing system utilizing a plurality of load cells supporting the fuel tank and a reference weight and load cell which, in combination with the tank load cells, corrects automatically for the external forces acting on the tank to give an accurate average measure of the quantity of liquid in the tank. Although this system is quite accurate and finds its best use where the cost of such a system can be justified, such as in measuring the quantity of fuel in an airplane fuel tank, the complexity of such a system is not justified where cost is of relatively greater importance such as in the determination of the amount of fuel in an automotive fuel tank.

Another tank weighing system which does not use load cells is described in Kitagawa et al. (U.S. Pat. No. 04,562,732) where the tank is supported on one side by a torsion bar system. In contrast to Grills et al., although the Kitagawa et al. device is quite complicated and consequently quite expensive, it contains no system for correcting for roll or pitch motions of the vehicle other than to average the tank readings over an extended period of time.

The external forces acting on an automobile fuel tank due to turning, roll and pitch, although significant, are much less severe in an automobile than in an airplane. Forces due to pitch generally arise when a vehicle is climbing or descending a hill, which in North America rarely exceeds 15 degrees and only occasionally exceeds 5 degrees. Roll angles of more than 5 degrees are similarly uncommon. Even when steep angles are encountered, it is usually only for a short time. This is not generally the case in aircraft, especially high performance military aircraft, where turning pitch and roll related forces are not only greater in magnitude but can last for an extended period of time.

The most common systems of measuring the quantity of fuel in an automobile fuel tank use a variable resistance rheostat which is controlled by a float within the gas tank. This system makes no attempt to correct for external forces acting on the tank or for the angle of the vehicle. Modem gas tanks have a convoluted shape and the level of fuel is frequently a poor indicator of the amount of fuel within the tank. In many implementations, for example, the gage continues to register full even after several gallons have been consumed. Similarly, the gage will usually register empty when there are several gallons remaining. It is then a guessing game for the driver to know how far he can go before running out of gas.

The problem is compounded with the implementation of a digital fuel gage display where the driver now gets an inaccurate display, with seemingly great precision, of the amount of fuel used and amount remaining in the tank. If, for example, the gage states that 14.5 gallons have been consumed and the driver has the tank filled and notices that it takes 15.3 gallons to fill it he wonders if he is being cheated by the service station or, as a minimum, he begins to doubt the accuracy of the other gages on the instrument panel. The inaccuracy of the fuel gage is now a common complaint received by at least one vehicle manufacturer from its customers. Similar but less severe problems occur with other fluid containers or reservoirs on a vehicle.

These prior art float systems are also vulnerable to errors due to fouling of the resistor induced by the necessity to operate the sensing elements in direct contact with the mixture held in the tank. These errors can cause the system to become inoperative or to change its calibration over time.

U.S. Pat. No. 04,890,491 (Vetter et al.) describes a system for indicating the level of fuel in an automobile tank (FIG. 4) which includes a fuel level detector 1, a detector 24 for detecting the longitudinal inclination of the vehicle, a detector 25 for detecting the transverse inclination of the vehicle and a microcomputer 26 containing a table providing an “immersion characteristic curve”. In operation, the microcomputer 26 receives input from the fuel level detector 1 and inclination detectors 24, 25 and corrects the level of fuel as measured by the fuel level detector 1 in light of the transverse and longitudinal inclination of the vehicle as measured by the detectors 24, 25 by the application of the immersion characteristic curve to avoid false readings caused by inclination of the vehicle. Vetter et al. does not take any readings during periods of inclination of the vehicle during operation thereof nor provide a corrected level of liquid.

U.S. Pat. No. 04,815,323 (Ellinger et al.) describes a fuel quantity measuring system having ultrasonic transducers for measuring volume of fuel in a tank. In the embodiment shown in FIG. 1 (but not the embodiment shown in FIG. 2), the system includes ultrasonic tank sensor units which provide a signal representative of the round-trip time between each sensor to the surface of the fuel, a processor unit (CPU) which receives the round-trip time (which is proportional to the height level of fuel in the tank) and a display to display the volume of fuel in the tank. In this embodiment, the processor is described as performing height-volume calculations and then correcting for attitude, i.e., the pitch and roll of the vehicle. As such, it is clear that for this embodiment, the measured round-trip time is applied to the height-volume table to obtain a volume corresponding to that round-trip time. This volume estimation is thereafter corrected based on the attitude, i.e., the measured pitch and roll. Note that rather inaccurate attitude gages are used and there is no mention of the use of an inertial measurement unit (IMU) or other accurate angular measurement system. An IMU usually contains three accelerometers and three gyroscopes. The errors in an IMU can be corrected if GPS or other absolute data is available through the use of a Kalman Filter as discussed in the current assignee’s U.S. provisional patent application Ser. No. 60/461,648.

In the embodiment in Ellinger et al. (FIG. 3), the tank 12 includes three ultrasonic transducers 14,16,18 which send a respective signal representative of the round-trip time to the surface of the fuel 10 in a respective stillwell 22 each surrounding that transducer to a computer 28 through a multiplexer 34. Only one transducer is related to fuel level (see FIG. 2) and the other two transducers are related to reference purposes and fuel density. The computer 28 has a memory 30 which it appears contains height-volume tables specific to each location of the transducer so that the measured round-trip time representative of the height level of fuel at that sensor location can be converted into a volume measurement. Thus, in this Ellinger et al. embodiment, the height of the level of fuel in the tank at each different location is converted to a volume measurement based on the height-volume tables. However, in this embodiment, there is no disclosure of the converted volume measurements being corrected by an attitude correction factor, i.e., the pitch and roll angles of the vehicle.

In an attempt to gain accuracy, prior art systems use frequently multiple fluid level measuring transducers or pitch and/or roll angle measurement devices. Future vehicles are expected to come equipped with an accurate IMU that is expected to be at least an order of magnitude more accurate than the mentioned attitude measurement devices. The information from the IMU should be generally available on a vehicle bus and therefore it can be used with the liquid level systems at no significant additional cost. This will permit the use of a single level measuring device and still result in greater accuracy than previously available.

Also, there is not believed to be anything in the prior art cited above that suggests the use of wireless transducers for level measurement such as devices based on surface acoustic wave technology (SAW). If the vehicle has a SAW-based tire pressure monitor, then to add additional devices is not only very inexpensive but reduces the number of wires that need to be placed in a vehicle further reducing costs and improving reliability.

These and other problems associated with the prior art fuel gages are solved by the present invention as disclosed below.

1.6 Occupant Sensing

It is now generally recognized that it is important to monitor the occupancy of a passenger compartment of a vehicle. For example see U.S. Pat. No. 05,653,462, U.S. Pat. No. 05,694,320, U.S. Pat. No. 05,822,707, U.S. Pat. No. 05,829,782, U.S. Pat. No. 05,835,613, U.S. Pat. No. 05,485,000, U.S. Pat. No. 05,488,802, U.S. Pat. No. 05,901,978, U.S. Pat. No. 05,943,295, U.S. Pat. No. 06,309,139, U.S. Pat. No. 06,078,854, U.S. Pat. No. 06,081,757, U.S. Pat. No. 06,088,640, U.S. Pat. No. 06,116,639, U.S. Pat. No. 06,134,492, U.S. Pat. No. 06,141,432, U.S. Pat. No. 06,168,198, U.S. Pat. No. 06,186,537, U.S. Pat. No. 06,234,519, U.S. Pat. No. 06,234,520, U.S. Pat. No. 06,242,701, U.S. Pat. No. 06,253,134, U.S. Pat. No. 06,254,127, U.S. Pat. No. 06,270,116, U.S. Pat. No. 06,279,946, U.S. Pat. No. 06,283,503, U.S. Pat. No. 06,324,453, U.S. Pat. No. 06,325,414, U.S. Pat. No. 06,330,501, U.S. Pat. No. 06,331,014, RE37260, U.S. Pat. No. 06,393,133, U.S. Pat. No. 06,397,136, U.S. Pat. No. 06,412,813, U.S. Pat. No. 06,422,595, U.S. Pat. No. 06,452,870, U.S. Pat. No. 06,442,504, U.S. Pat. No. 06,445,988, U.S. Pat. No. 06,442,465 (Breed et al.) which describe several vehicle interior monitoring systems that utilize pattern recognition techniques and wave-receiving sensors to obtain information about the occupancy of the passenger compartment and uses this information to affect the operation of one or more systems in the vehicle, including an occupant restraint device, an entertainment system, a heating and air-conditioning system, a vehicle communication system, a distress notification system, a light filtering system and a security system.

Of particular interest, Breed et al. mentions that the presence of a child in a rear facing child seat placed on the right front passenger seat may be detected as this has become an industry-wide concern to prevent deployment of an occupant restraint device in these situations. The U.S. automobile industry is continually searching for an easy, economical solution, which will prevent the deployment of the passenger side airbag if a rear facing child seat is present.

1.7 Vehicle or Component Control

Based on the monitoring of vehicular components, systems and subsystems as well as to the measurement of physical and chemical characteristics relating to the vehicle or its components, systems and subsystems, it becomes possible to control and/or affect one or more component, vehicular system or the vehicle itself as discussed below.

2.0 Telematics 2.1 Transmission of Vehicle and Occupant Information

Every automobile driver fears that his or her vehicle will break down at some unfortunate time, e.g., when he or she is traveling at night, during rush hour, or on a long trip away from home. To help alleviate that fear, certain luxury automobile manufacturers provide roadside service in the event of a breakdown. Nevertheless, unless the vehicle is equipped with OnStar® or an equivalent service, the vehicle driver must still be able to get to a telephone to call for service. It is also a fact that many people purchase a new automobile out of fear of a breakdown with their current vehicle. The inventions described herein are primarily concerned with preventing breakdowns and with minimizing maintenance costs by predicting component failure that would lead to such a breakdown before it occurs.

Another important aspect disclosed in the Breed et al. patents relates to the operation of the cellular communications system in conjunction with the vehicle interior monitoring system. Vehicles can be provided with a standard cellular phone as well as the Global Positioning System (GPS), an automobile navigation or location system with an optional connection to a manned assistance facility. In the event of an accident, the phone may automatically call 911 for emergency assistance and report the exact position of the vehicle. If the vehicle also has a system as described below for monitoring each seat location, the number and perhaps the condition of the occupants could also be reported. In that way, the emergency service (EMS) would know what equipment and how many ambulances to send to the accident site. Moreover, a communication channel can be opened between the vehicle and a monitoring facility/emergency response facility or personnel to determine how badly people are injured, the number of occupants in the vehicle, and to enable directions to be provided to the occupant(s) of the vehicle to assist in any necessary first aid prior to arrival of the emergency assistance personnel.

Communications between a vehicle and a remote assistance facility are also important for the purpose of diagnosing problems with the vehicle and forecasting problems with the vehicle, called prognostics. Motor vehicles contain complex mechanical systems that are monitored and regulated by computer systems such as electronic control units (ECUs) and the like. Such ECUs monitor various components of the vehicle including engine performance, carburetion/fuel injection, speed/acceleration control, transmission, exhaust gas recirculation (EGR), braking systems, etc. However, vehicles perform such monitoring typically only for the vehicle driver and without communication of any impending results, problems and/or vehicle malfunction to a remote site for trouble-shooting, diagnosis or tracking for data mining.

In the past, systems that provide for remote monitoring did not provide for automated analysis and communication of problems or potential problems and recommendations to the driver. As a result, the vehicle driver or user is often left stranded, or irreparable damage occurs to the vehicle as a result of neglect or driving the vehicle without the user knowing the vehicle is malfunctioning until it is too late, such as low oil level and a malfunctioning warning light, fan belt about to fail, failing radiator hose etc.

U.S. Pat. No. 05,400,018 (Scholl et al.) describes a system for relaying raw sensor output from an off road work site relating to the status of a vehicle to a remote location over a communications data link. The information consists of fault codes generated by sensors and electronic control modules indicating that a failure has occurred rather than forecasting a failure. The vehicle does not include a system for performing diagnosis. Rather, the raw sensor data is processed at an off-vehicle location in order to arrive at a diagnosis of the vehicle's operating condition. Bi-directional communications are described in that a request for additional information can be sent to the vehicle from the remote location with the vehicle responding and providing the requested information but no such communication takes place with the vehicle operator and not of an operator of a vehicle traveling on a road. Also, Scholl et al. does not teach the diagnostics of the problem or potential problem on the vehicle itself nor does it teach the automatic diagnostics or any prognostics. In Scholl et al. the determination of the problem occurs at the remote site by human technicians.

U.S. Pat. No. 05,955,942 (Slitkin et al.) describes a method for monitoring events in vehicles in which electrical outputs representative of events in the vehicle are produced, the characteristics of one event are compared with the characteristics of other events accumulated over a given period of time and departures or variations of a given extent from the other characteristics are determined as an indication of a significant event. A warning is sent in response to the indication, including the position of the vehicle as determined by a global positioning system on the vehicle. For example, for use with a railroad car, a microprocessor responds to outputs of an accelerometer by comparing acceleration characteristics of one impact with accumulated acceleration characteristics of other impacts and determines departures of a given magnitude from the other characteristics as a failure indication which gives rise of a warning.

Of course there are many areas of the country where cell phone reception is not available and thus a system that relies on the availability of such a system for diagnostics will not always be available and thus has a significant failure mode. Furthermore, it would be difficult if not impossible for such a location to have all of the information to diagnose problems with all vehicle models that are on the road and to be able to retrieve that information and act on raw data on a continuous basis to keep track of whether all vehicles on the roadways are operating properly and to forecast all potential problems with each vehicle. Thus, there is a need to have this function resident on the vehicle. Additionally, if a human operator is required then the system quickly becomes unmanageable.

2.2 Docking Stations and PDAs

For related art in this area, see N. Tredennick "031201 Go Reconfigure", IEEE Spectrum Magazine, pp. 37–40, December 2003 and D. Verkest "Machine Cameleon" ibid pp. 41–46, which describe some of the non-vehicle related properties envisioned here for the PID. Also for some automotive applications, see P. Hansen "Portable electronics threaten embedded electronics", Automotive Industries Magazine, December 2004.

2.3 Satellite and Wi-Fi Internet

For related art in this area, see U.S. Pat. No. 06,611,740, U.S. Pat. No. 06,751,452, U.S. Pat. No. 06,615,186 and U.S. Pat. No. 06,389,337.

3.0 Wiring and Busses

It is not uncommon for an automotive vehicle today to have many motors, other actuators, lights etc., controlled by one hundred or more switches and fifty or more relays and connected together by almost five hundred meters of wire, and close to one thousand pin connections grouped in various numbers into connectors. It is not surprising therefore that the electrical system in a vehicle is by far the most unreliable system of the vehicle and the probable cause of most warranty repairs.

Unfortunately, the automobile industry is taking a piecemeal approach to solving this problem when a revolutionary approach is called for. Indeed, the current trend in the automotive industry is to group several devices of the vehicle's electrical system together which are located geometrically or physically in the same area of the vehicle and connect them to a zone module which is then connected by communication and power buses to the remainder of the vehicle's electrical system. The resulting hybrid systems still contain substantially the same number and assortment of connectors with only about a 20% reduction in the amount of wire in the vehicle.

3.1 Wireless Switches

One example of related art in wireless switches is illustrated in U.S. patent application Ser. No. 2004/0012362 which shows a SAW device with a MEMS deflectable membrane or beam above the active SAW surface of the device. When electrically activated the MEMS beam or membrane deflects so as to contact the SAW surface and prevent the SAW wave from reaching the output electrodes thereby effectually switching off the SAW device. Assignee's patents listed above disclose a similar effect where the motion of a SAW absorbing member into contact with the SAW device is accomplished by non electrical means such as through the action of acceleration or through being mechanically depressed by a finger or other manner.

Below an alternative method of switching on or off of a SAW device will be disclosed where the command can be send wirelessly through an RF signal to an RFID activated switch. This method lends itself to accomplishing many of the same functions desired by the patent application 2004/0012362 and in some cases can serve as a substitution for it.

3.2 Other Miscellaneous Sensors

Electronic license plates are described in U.S. patents U.S. Pat. No. 03,781,879, U.S. Pat. No. 03,984,835, U.S. Pat. No. 04,001,822, U.S. Pat. No. 05,579,008, U.S. Pat. No. 05,608,391, U.S. Pat. No. 05,657,008 and U.S. Pat. No. 06,239,757 and U.S. patent application publication Nos. 20020021210 and 20040189493 among others. Infrared scanning of license plates is reported in Vance, J. "Trendlines, Infrared Scanning—Highway Helper", CIO Magazine, Apr. 1, 2005.

4.0 Displays and Inputs to Displays

In an existing heads-up display, information is projected onto a specially treated portion of the windshield and reflected into the eyes of the driver. An important component of a head-up display system is known as the combiner. The combiner is positioned forward of the driver and extends partly across his or her view of the real world scene. It is usually either on the interior surface of or laminated inside of the windshield. It is constructed to permit light from the real world scene ahead of the vehicle to pass through the combiner and to reflect light information of one or more particular wavelengths propagating from a source within the vehicle. The information is projected onto the combiner using suitable optical elements. The light rays reflected by the combiner are typically collimated to present an image of the information focused at optical infinity permitting the driver to simultaneously view the real world scene and the displayed information without changing eye focus.

Some combiners are simply semi-reflecting mirrors while a particularly effective combiner can be constructed using a hologram or a holographic optical element. In a currently used heads-up display in motor vehicles, the motorist views the forward outside real world scene through the windshield. Information pertaining to the operational status of the vehicle is displayed on a heads-up display system providing vehicle information, such as fuel supply and vehicle speed, positioned within the motorist's field of view through the windshield thereby permitting the motorist to safely maintain eye contact with the real world scene while simultaneously viewing the display of information. However, such heads-up displays are not interactive.

Heads-up displays are widely used on airplanes particularly military airplanes. Although many attempts have been made to apply this technology to automobiles, as yet few heads-up display systems are on production vehicles. One reason that heads-up displays have not been widely implemented is that vehicle operators have not been willing to pay the cost of such a system merely to permit the operator to visualize his speed or the vehicle temperature, for example, without momentarily taking his eyes from the road. In other words, the service provided by such systems is not perceived to be worth the cost. There is thus a need for a low cost heads-up display.

There are functions other than viewing the vehicle gages that a driver typically performs that require significantly more attention than a momentary glance at the speedometer. Such functions have heretofore not been considered for the heads-up display system. These functions are primarily those functions that are only occasionally performed by the vehicle operator and yet require significant attention. As a result, the vehicle operator must remove his eyes from the road for a significant time period while he performs these other functions creating a potential safety problem. One example of such a function is the adjustment of the vehicle entertainment system. The vehicle entertainment system has become very complex in modern automobiles and it is now very difficult for a vehicle driver to adjust the system for optimum listening pleasure while safely operating the vehicle.

Other similar functions include the adjustment of the heating, ventilation, air conditioning and defrosting system, the dialing and answering of cellular phone calls, as well as other functions which are contemplated for future vehicles such as navigational assistance, Internet access, in-vehicle messaging systems, traffic congestion alerts, weather alerts, etc. Each of these functions, if performed by a driver while operating the vehicle, especially under stressful situations such as driving on congestion highways or in bad weather, contributes an unnecessary risk to the driving process. While a driver is attempting to operate the vehicle in a safe manner, he or she should not be required to remove his or her eyes from the road in order to adjust the radio or make a phone call. Therefore, there is a need to minimize this risky behavior by permitting the operator to perform these functions without taking his or her eyes off of the road. As discussed in greater detail below, this can be accomplished through the use of a heads-up display system combined with a touch pad or other driver operated input device located, for example, on the steering wheel within easy reach of the driver, a gesture recognition input system, or a voice input system.

4.1 Prior Art Related to Heads-up Display Systems

There are many patents and much literature that describe the prior art of heads-up displays. Among the most significant of the patents are:

U.S. Pat. No. 04,218,111 which describes a lens system for one of the early holographic heads-up display units.

U.S. Pat. No. 04,309,070 which describes an aircraft head up display system for pilots.

U.S. Pat. No. 04,613,200 which describes a system for using narrow wavelength bands for the heads-up display system. It describes a rather complicated system wherein two sources of information are combined. This patent is believed to be the first patent teaching a heads-up display for automobiles.

U.S. Pat. No. 04,711,544 which describes a heads-up display for an automobile and clearly describes the process by which the focal length of the display is projected out front of the automobile windshield. In this manner, the driver does not have to focus on a display which is close by as, for example, on the instrument panel. Thus, the driver can continue to focus on the road and other traffic while still seeing the heads-up display.

U.S. Pat. No. 04,763,990 which describes a method for reducing flare or multiple images resulting in a substantially aberration free display. This is a problem also discussed by several of the other prior art patents.

U.S. Pat. No. 04,787,040 which describes another type display system for automobiles which is not a heads-up display. This patent shows the use of an infrared touch panel or Mylar(™) touch switch matrix mounted over the face of the display". This display requires the driver to take his or her eyes off of the road.

U.S. Pat. No. 04,787,711 which describes and solves problems of double reflection or binocular parallax that results from conventional heads-up displays for use in automobiles.

U.S. Pat. No. 04,790,613 which presents a low-cost heads-up display with fixed indicia. The message is fixed but displayed only as needed.

U.S. Pat. No. 04,886,328 which shows a heads-up display device and describes a method for preventing damage to the optics of the system caused by sunlight.

U.S. Pat. No. 04,973,132 which describes a polarized holographic heads-up display which provides for increased reflectivity and image contrast.

U.S. Pat. No. 05,013,135 which describes a heads-up display using Fresnel lenses to reduce the space required for installation of the system.

U.S. Pat. No. 05,157,549 which describes another method of reducing the damage to the heads-up display optics by restricting the wavelengths of external light which are reflected into the heads-up display optics.

U.S. Pat. No. 05,210,624 which describes a heads-up display wherein all light from the environment is allowed to pass through the combiner except light having a frequency equal to the frequency generated by the heads-up display. The alleged improvement is to also filter out light from the environment that is of a complementary color to the light from the heads-up display.

U.S. Pat. No. 05,212,471 which describes a method for reducing the reflections from the outside windshield surface which produces ghost images.

U.S. Pat. No. 05,229,754 which describes apparatus for increasing the path length of the heads-up display using a reflecting plate. This improves the quality of the heads-up display while maintaining a compact apparatus design. This added travel of the light rays is needed since in this system the virtual image is located as far in front of the vehicle windshield as the distance from the information source to the heads-up display reflector.

U.S. Pat. No. 05,231,379 which describes a method for compensating for the complex aspheric curvature of common windshields. It also provides means of adjusting the vertical location of the reflection off the windshield to suit the size of a particular driver or his preferences.

U.S. Pat. No. 05,243,448 which describes a low-cost heads-up display for automobiles.

U.S. Pat. No. 05,289,315 which describes apparatus for displaying a multicolored heads-up display. The technique uses two films having different spectral reflectivities.

U.S. Pat. No. 05,313,292 which describes a method for manufacturing a windshield containing a holographic element. This patent presents a good description of a heads-up display unit including mechanisms for reducing the heat load on the LCD array caused by the projection lamp and means for automatically adjusting the intensity of the heads-up display so that the contrast ratio between the heads-up display and the real world is maintained as a constant.

U.S. Pat. No. 05,313,326 which describes a heads-up display and various methods of improving the view to drivers looking at the heads-up display from different vertical and lateral positions. The inventor points out that " . . . the affective eye box presented to the driver, i.e. the area within which he will be able to see the image is inherently limited by the effective aperture of the optical projection unit".

The inventor goes on to teach that the eye box should be as large as possible to permit the greatest tolerance of the system to driver height variation, driver head movement, etc. It is also desirable to have a compact optical projection system as possible since available space in the car is limited. There are, however, limitations on the length of the projection unit and the size of the eye box that is achievable.

While the use of more powerful optics will permit a shorter physical length unit for a fixed image projection distance, this will give a higher display magnification. The higher the magnification, the smaller the actual display source for a specific image size. Display resolution then becomes a critical factor. A second limitation of optical systems is that for a given eye box a shorter focal length system cannot achieve as good an image quality as a long focal length system.

U.S. Pat. No. 05,329,272, as well as many of the other patents cited above, which describes the use of a heads-up display to allow the operator or driver to watch the speedometer, revolution counter, directional indicators, etc. while keeping his or her eyes on the road. This patent is concerned with applying or adapting a large bulky optical system to the vehicle and solves problem by placing the main elements of this optical system in a direction parallel to the transverse axis of the vehicle. This patent also describes a method for adjusting the heads-up display based on the height of the driver. It mentions that using the teachings therein that the size of the driver's binocular or eye box is 13 cm horizontal by 7 cm vertical.

U.S. Pat. No. 05,379,132 which attempts to solve the problem of the limited viewing area provided to a driver due to the fact that the size of the driver is not known. A primary object of the invention is to provide a display having an enlarged region of observation. This is done by reducing the image so that more information can be displayed on the heads-up display.

U.S. Pat. No. 05,414,439 which states that such heads-up displays have been quite small relative to the roadway scene due to the limited space available for the required image source and projection mirrors.

U.S. Pat. No. 05,422,812 which describes an in route vehicle guidance system using a heads-up display, but not one that is interactive.

U.S. Pat. No. 05,486,840 which describes a heads-up display which purportedly eliminate the effect where sunlight or street lights travel down the path of the heads-up display optics and illuminate the projection surface and thereby cause false readings on the heads-up display. This problem is solved by using circularly polarized light.

U.S. Pat. No. 05,473,466 describes a miniature high resolution display system for use with heads-up displays for installation into the helmets of fighter pilots. This system, which is based on a thin garnet crystal, requires very little power and maintains a particular display until display is changed. Thus, for example, if there is a loss of power the display will retain the image that was last displayed. This technology has the capability of producing a very small heads-up display unit as will be described more detail below.

U.S. Pat. No. 05,812,332 which describes a windshield for a head up display system that reduces the degree of double imaging that occurs when a laminated windshield is used as the combiner in the display system.

U.S. Pat. No. 05,859,714 which describes a method for making the combiner such that a colored heads-up display can be created.

Finally, U.S. Pat. No. 05,724,189 which describes methods and apparatus for creating aspheric optical elements for use in a heads-up display.

4.2 Summary of Heads-up Prior Art

All of the heads-up display units described are for providing an alternate to viewing the gages on the instrument panel or at most the displaying of a map. That is, all are passive systems. Nowhere has it been suggested in the above-mentioned prior art to use the heads-up display as a computer screen for interactive use by the vehicle operator where the driver can operate a cursor and/or otherwise interact with the display.

No mention is made in the above-mentioned prior art of the use of a heads-up display for: the Internet; making or receiving phone calls; compartment temperature control; control of the entertainment system; active route guidance with input from an external source such as OnStar™ in vehicle signage; in vehicle signage with language translation; safety alerts; weather alerts; traffic and congestion alerts; video conferencing; TV news broadcasts; display of headlines, sports scores or stock market displays; or of switches that can be activated orally, by gesture or by a touch pad or other devices on the steering wheel or elsewhere.

Furthermore, there does not appear to be any examples of where a heads-up display is used for more than one purpose, that is, where a variety of different pre-selectable images are displayed.

Although the primary focus above has been to develop a heads-up display and interactive input devices for location on the steering wheel, in many cases it will be desirable to have other input devices of a similar nature located at other places within the vehicle. For example, an input device location for a passenger may be on the instrument panel, the armrest or attached in an extension and retraction arrangement from any surface of the passenger compartment including the seats, floor, instrument panel, headliner and door. In some cases, the device may be removable from a particular storage location and operated as a hand-held device by either the passenger or the driver. The interface thus can be by hard wire or wireless.

Voice recognition systems are now being applied more and more to vehicles. Such systems are frequently trained on the vehicle operator and can recognize a limited vocabulary sufficient to permit the operator to control many functions of the vehicle by using voice commands. These voice systems are not 100% accurate and there has not been any effective means to provide feedback to the operator of the vehicle indicating what the voice system understood. When used with the heads-up display interactive system described herein, a voice-input system can be used either separately or in conjunction with the touch pad systems described herein. In this case, for example, the vehicle operator would see displayed on the heads-up display the results of voice commands. If the system misinterpreted the driver's command, a correction can be issued and the process repeated. For example, let us say that the vehicle operator gave a command to the vehicle phone system to dial a specific number. Let us assume that the system misunderstood one of the digits of the number. Without feedback, the driver may not know that he had dialed a wrong number. With feedback, he would see the number as it is being dialed displayed on the heads-up display and if he or she sees that an error occurred, he or she can issue a command to correct the error. In this manner, the interactive heads-up display can function along with a voice command data input system as well as the touch pad systems described herein. In another example, the driver may say "call Pete" The display can also be used as feedback for a gesture recognition system.

U.S. Pat. No. 05,829,782 (Breed) describes, among other things, the use of an occupant location system to find the approximate location of the mouth of a vehicle operator. Once the location of the mouth has been determined, a directional microphone can focus in on that location and thereby significantly improve the accuracy of voice command systems. Thus there is a need to find the mouth of the occupant.

In a similar manner also as described in U.S. Pat. No. 05,822,707 (Breed) the location of the driver's eyes can be approximately determined and either the seat can be adjusted to place the operator's eyes into the eye ellipse, which would be the ideal location for viewing a heads-up display or, alternately, the heads-up display projection system can be adjusted based on the sensed location of the eyes of the occupant. Although several prior art patents have disclosed the capability of adjusting the heads-up display, none of them have done so based on a determination of the location of the eyes of the occupant. Thus there is a need to adjust the location of the eyes of the occupant or the projection system of the heads-up display.

One of the problems with heads-up displays as described in the related art patents is that sometimes the intensity of light coming in from the environment makes it difficult to see the information on the heads-up display. In U.S. Pat. No. 05,829,782 (Breed), a filter is disclosed that can be placed between the eyes of the vehicle operator and the source of external light, headlights or sun, and the windshield can be darkened in an area to filter out the offending light. This concept can be carried further when used with a heads-up display to darken the area of the windshield where the heads-up display is mounted, or even darken the entire windshield, in order to maintain a sufficient contrast ratio between the light coming from the automatically adjusted heads-up display optical system and the light coming from the real world scene. This darkening can be accomplished using electrochromic glass, a liquid crystal system or equivalent. Thus there is a need to block the glare from the sun or vehicle lights.

Although the discussion herein is not limited to a particular heads-up display technology, one technology of interest is to use the garnet crystal heads-up system described in U.S. Pat. No. 05,473,466. Although the system has never been applied to automobiles, it has significant advantages over other systems particularly in the resolution and optical intensity areas. The resolution of the garnet crystals as manufactured by Revtek is approximately 600 by 600 pixels. The size of the crystal is typically 1 cm square. Using a laser projection system, a sufficiently large heads-up display can be obtained while the system occupies a volume considerably smaller than any system described the prior art. By using a monochromatic laser as the optical source, the energy absorbed by the garnet crystal is kept to a minimum.

An alternate technology that can be used for a heads-up display is based on OLED (organic light emitting diode) technology whereby the projection system is no longer needed and a film that can be sandwiched between the sheets of glass that make up the windshield can be made to emit light. Naturally other locations for the OLED can be used including a visor or any other window in the vehicle.

4.3 Background on Touch Pad Technologies

Touch pads are closely related to their "cousins", touch screens. Both use the operator's fingers as the direct link between the operator and the computer. In some cases, a stylus is used but probably not for the cases to be considered here. In simple cases, touch pads can be used to operate virtual switches and, in more complicated cases, the movement of the operator's finger controls a cursor, which can be used to select from a range of very simple to very complicated functions. Several technologies have evolved which will now be described along with some of their advantages and shortcomings.

Capacitive touch pads use the electrical (conductive and dielectric) properties of the user's finger as it makes contact with the surface of the pad. This capacitive technology provides fast response time, durability and a tolerance for contamination. Generally, grease, water and dirt will not interfere with the operation of the capacitive touch pad. Unfortunately, this technology will not work well when the driver is wearing gloves.

Projected capacitive touch pads sense changes in the electrical field adjacent the touch pad. This technology will work with a driver wearing gloves but does not have as high a resolution as the standard capacitive touch pads.

Infrared touch pads contain a grid of light beams across the surface of the pad and check for interruptions in that grid. This system is somewhat sensitive to contamination that can block the transmitters or receivers.

Surface acoustic wave (SAW) touch pads send sound waves across the surface of the touch pad and look for interruptions or damping caused by the operator's fingers. This technology requires the use of a rigid substrate such as glass that could interfere with the operation of the airbag deployment door if used on the center of the steering wheel. It is also affected by contaminants which can also absorb the waves.

Guided acoustic wave technology is similar to SAW except that it sends the waves through the touch pad substrate rather than across the surface. This technology also requires a rigid substrate such as glass. It is additionally affected by contamination such as water condensation.

Force sensing touch pads measure the actual force placed on the pad and is measured where the pad is attached. Typically, strain gages or other force measuring devices are placed in the corners of a rigid pad. This technology is very robust and would be quite applicable to steering wheel type applications, however, it generally has less resolution than the other systems. Force sensing touch pads are either strain gage or platform types. The strain gage touch pad measures the stresses at each corner that a touch to the pad creates. The ratio of the four readings indicates the touch point coordinates. The platform touch pad instead rests on a platform with force measurement sensors at the supports. A touch onto the touch pad translates to forces at the supports.

Resistive touch pads use a flexible resistive membrane, a grid of insulators and a secondary conducting pad to locate the touch point. This pad generally has higher resolution than the force sensing touch pads and is equally applicable to steering wheel type applications. A further advantage is that it can be quite thin and does not generally require a rigid substrate which can interfere with the deployment of the airbag door for steering wheel center applications. Resistive technology touch screens are used in more applications than any other because of the high accuracy fast response and trouble-free performance in a variety of harsh applications.

There are many U.S. patents and other publications that describe touch pad technologies primarily as they relate to inputting data into a computer. Among the significant patents are:

U.S. Pat. No. 04,190,785 describes a touch pad using a piezoelectric layer. When a finger pressure is placed on the piezoelectric, a voltage is generated. The touch pad actually consists of an array of sensors rather than a continuously varying sensing element. One advantage of the system is that it can be passive. The piezoelectric coating is disclosed to be approximately 0.005 inches thick.

U.S. Pat. No. 04,198,539 describes a touch pad based on resistance. Through a novel choice of resistors and uniform resistive pad properties, the inventor is able to achieve a uniform electric field in the resistance layer of the touch pad.

U.S. Pat. No. 04,328,441 describes a "piezoelectric polymer pressure sensor that can be used to form a pressure sensitive matrix keyboard having a plurality of keyboard switch positions arranged in a plurality of rows and columns". The piezoelectric electric polymer film is made from polyvinylidene fluoride (PVDF). This is only one example of the use of the piezoelectric polymer and some others are referenced in this patent. This touch pad is set up as a series of switches rather than a continuous function.

U.S. Pat. No. 04,448,837 describes the use of a silicone rubber elastic sheet which has been partially filled with conductive particles of various sizes as part of a resistive touch pad.

U.S. Pat. No. 04,476,463 describes a touch pad system for use as an overlay on a display that can detect and locate a touch at any location anywhere on the display screen. In other words, it is a continuously variable system. This system is based on a capacitive system using an electrically conductive film overlaying the display screen.

U.S. Pat. No. 04,484,179 describes a touch sensitive device which is at least partially transparent to light. A flexible membrane is suspended over a CRT display and when pushed against the display it traps light emitted at the contact point by the scanning system. This trapped light can be sensed by edge mounted sensors and the position of the touch determined based on the known position of the scan when the light was detected.

U.S. Pat. No. 04,506,354 describes an ultrasonic touch pad type device wherein two ultrasonic transducers transmit ultrasound through the air and receive echoes based on the position of a finger on the touch pad.

U.S. Pat. No. 04,516,112 describes another implementation of a touch pad using a piezoelectric film.

U.S. Pat. No. 04,633,123 describes another piezoelectric polymer touch screen, in this case used as a keyboard apparatus.

U.S. Pat. No. 04,745,301 and U.S. Pat. No. 04,765,930 describe a deformable pressure sensitive electro-conductive switch using rubber which is loaded with conductive particles and which could be used in a touch switch or touch pad configuration. U.S. Pat. No. 04,904,857 describes a touch screen based on light emitting diodes (LEDs) and receptors wherein light beams are sent parallel to and across the top of the video screen and the interruption of these light beams is sensed.

U.S. Pat. No. 04,963,417 describes a touch pad consisting of a conductive layer and a layer of deformable insulating particles and a conductive film layer. Pressure on the conductive film layer causes the insulating deformable particles to deform and permits contact between the conductive film and the conductive substrate that can be sensed by resistant measurements.

U.S. Pat. No. 04,964,302 describes a tactile sensor which can be used by robots for example. The tactile sensor consists of a series of ultrasonic pads and a deformable top layer. When the deformable layer is compressed, the compression can be sensed by the time of flight of the ultrasonic waves by the ultrasonic sensor and therefore both the location of the compression can be determined as well as the amount compression or force. Such an arrangement is applicable to the touch pads of the current invention as described below. This permits an analog input to be used to control the radio volume, heating or air conditioning temperature, etc.

U.S. Pat. No. 05,008,497 describes an accurate means for measuring the touch position and pressure on a resistive membrane.

U.S. Pat. No. 05,060,527 is another example of the tactile sensor that is capable of measuring variable force or pressure. This patent uses an electrically conductive foam as the variable resistance that permits force to be measured.

U.S. Pat. No. 05,159,159 is another example of a touch pad that is based on resistance and provides the X and Y position of the finger and the pressure at the touch point.

U.S. Pat. No. 05,164,714 is another system using light emitters and detectors creating a field of light beams going across the surface of the touch pad in both X and Y directions.

U.S. Pat. No. 05,374,449 describes a monolithic piezoelectric structural element for keyboards which can be used to form discrete switching elements on the pad.

U.S. Pat. No. 05,376,946 describes a touch screen made of two transparent conductive members which when caused to contract each other change the resistance of the circuit such that, by alternately applying a voltage to the X and Y edges, the location of the touch point can be determined.

A capacitive based touch screen is illustrated in U.S. Pat. No. 05,386,219.

U.S. Pat. No. 05,398,962 describes a horn activator for steering wheels with airbags. This horn activator switch can be made part of the touch pad as discussed below whereby when the pressure exceeds a certain amount, a horn blows rather than or in addition to activating the heads-up display.

U.S. Pat. No. 05,404,443 describes a CRT display with a touch pad overlay for use in an automobile.

U.S. Pat. No. 05,453,941 describes a touch pad of the resistive type which also measures pressure as well as location of the touch. This patent uses two separate boards, one for the X coordinate and one for the Y coordinate. A pressure applied against the point located on the X coordinate resistance board causes the X coordinate resistance board to make contact with the Y coordinate resistance board at a point located on the Y coordinate resistance board. The contact is through a contact resistance the magnitude of which is inversely proportional to the pressure applied.

U.S. Pat. No. 05,518,078 is another example were separate films are used for the X and Y direction. Voltages are selectively applied to the film for measuring the X coordinate and then to the film for measuring the Y coordinate. The pressure of the touch is determined by the contact resistance between the X and Y films.

Most of the prior art devices described above have an analog input, that is, the resistance or capacitance is continuously varying as the pressure point moves across the pad. U.S. Pat. No. 05,521,336, on the other hand, describes a touch pad which provides a digital input device by using sets of parallel strips in one layer orthogonal to another set of parallel strips in another layer. Upon depressing the surface, the particular strips which make contact are determined. These are known as high-density switch closure type touch pad sensors.

U.S. Pat. No. 05,541,372 describes the use of strain gages to detect deformation of the touch panel itself as result of force being applied. Strain gages are physically integrated with the panel and measure the strain on the panel. An important feature of the invention of this patent is that it measures the deformation of panel itself instead of the deformation of the suspension members of the panel as in the prior art.

U.S. Pat. No. 05,541,570 describes a force sensing ink that is used in U.S. Pat. No. 05,563,354 to form a thin film force sensors to be used, for example, for horn activation.

U.S. Pat. No. 05,673,041 describes a reflective mode ultrasonic touch sensitive switch. A touch changes the reflectivity of a surface through which the ultrasound is traveling and changes the impedance of the transducer assembly. This switch can be multiplied to form a sort of digital touch pad. A piezoelectric polymer film is used presumably to maintain the transparency of the switch.

U.S. Pat. No. 05,673,066 relates to a coordinate input device based on the position of a finger or pen to a personal computer. This patent provides various means for controlling the motion of a cursor based on the motion of a finger and also of providing a reliable switching function when an item has been selected with the cursor. The invention describes the use of touch pressure to indicate the speed with which the cursor should move. A light touch pressure provides for a rapid movement of cursor whereas a strong touch pressure signifies a slow movement. The pressure on the touch pad is determined using four piezoelectric elements for converting pressures to voltages that are arranged on the four corners of the back surface of the rigid plate.

U.S. Pat. No. 05,686,705 describes a touch pad consisting of a conductive surface containing three electrodes, a compressible insulating layer and a top conductive layer such that when the top conductive layer is depressed it will receive signals from the three electrodes. These signals are transmitted in pairs thereby permitting the location of the contact point on a line bisecting the two electrodes, then by using another pair, a second line can be determined and the intersection of those two lines fixes the point. The determination is based on the level of signal that is inversely proportional to the resistance drop between the contact point in the transmission point.

U.S. Pat. No. 05,917,906 describes an alternate input system with tactile feedback employing the use of snap domes arranged in the predetermined spaced apart arrangement.

U.S. Pat. No. 05,933,102 describes an array of capacitive touch switches.

U.S. Pat. No. 05,942,733 describes a capacitive touch pad sensor capable of being actuated with a stylus input. The pad consists of a plurality of first parallel conductive traces running in the X direction and a plurality of second parallel conductive traces running in the Y direction. A layer of pressure conductive material is disposed over one of the faces of the substrate which in turn is covered with a protective layer. As the conductive later is moved toward the arrays of substrates the capacitance between the conductive later and each of the substrates is changed which is measurable. A capacitive touch pad has the advantage that it requires much less force than a resistive touch pad. The traces are actually put on both sides of substrate with the X traces going one way and Y traces the other way. An alternative would be to use a flex circuit.

International Publication No. WO98/43202 describes a button wheel pointing device for use with notebook personal computers.

International Publication No. WO98/37506 reserves various parts of the touch pad for command bar or scroll bar functions.

U.S. Pat. No. 05,374,787 describes a two-dimensional capacitive sensing system equipped with a separate set of drive and sense electronics for each row and column of the capacitive tablet. The device capacitively senses the presence of the finger and determines its location. This concept is further evolved in U.S. Pat. No. 05,841,078, U.S. Pat. No. 05,861,583, U.S. Pat. No. 05,914,465, U.S. Pat. No. 05,920, 310 and U.S. Pat. No. 05,880,411. U.S. Pat. No. 05,841,078 makes use in one embodiment of a neural network to interpret situations when more than one finger is placed on the touch pad. This allows the operator to use multiple fingers, coordinated gestures etc. for complex interactions. The traces can be placed on a printed circuit board or on a flex circuit. The sensor also measures finger pressure.

U.S. Pat. No. 05,861,583 provides a two-dimensional capacitive sensing system that cancels out background capacitance effects due to environmental conditions such as moisture Other capacitive prior art U.S. patents include U.S. Pat. No. 05,305,017, U.S. Pat. No. 05,339,213, U.S. Pat. No. 05,349,303 and U.S. Pat. No. 05,565,658. These patents also cover associated apparatus for capacitive touch pads sensors.

U.S. Pat. No. 05,565,658 describes a system that can be used with gloves since the finger need not contact the surface of the touch pad and also describes a technique of making the touch pad using silk screening and a variety of inks, some conducting some non-conducting. The resulting array is both thin and flexible that allows it to be formed into curved surfaces such as required for a steering wheel mounted touch pad.

U.S. Pat. No. 05,940,065 describes a mapping method of how to compensate for systematic and manufacturing errors which appear in a resistive touch sensor pad.

U.S. Pat. No. 05,694,150 provides a graphical user interface system to permit multiple users of the same system. Such a system would be applicable when both the driver and passenger are viewing the same output on different heads-up or other displays. This could also be useful, for example, when the passenger is acting as the navigator indicating to the driver on the heads-up display where he is now and where he should go. Alternately, the navigator could be a remote access operator giving directions to the driver as to how to get to a specific location.

Touch pads that are commercially available include, for example, model TSM946 as supplied by Cirque Corporation and others supplied by the Elo and Synaptics corporations.

Normally a touch pad or other input device is attached by wires to the heads-up display or a controller. An alternate method of communicating with a touch pad or other input device is to do so by passive wireless means. In one implementation of this approach, a cable can be placed around the vehicle and used to inductively charge a circuit located on the touch pad or other input device. The device itself can be totally free of wires since the information that it sends can also be transmitted wirelessly to the loop, which now acts as an antenna. The device can now be placed anywhere in the vehicle and in fact, it can be moved from place to place without concern for wires. Thus, there is a need for a wireless connection to the heads-up display input device A human factors study has shown that the ideal size of the square target for the 95 percentile male population should be about 2.4 cm by 2.4 cm as reported in "A Touch Screen Comparison Study: Examination Of Target Size And Display Type On Accuracy And Response Time" by S. Gregory Michael and Michael E. Miller, Eastman Kodak Co. Rochester, N.Y. Naturally as the functions of the heads-up display are increased the size may also have to increase. For navigational purposes, for example, a substantial portion of the windshield may be used by the display.

4.4 Summary of the Touch Pad Prior Art

As can be appreciated from the sampling of touch pad patents and publications listed above, many technologies and many variations are available for touch pad technology. In particular, most of these designs are applicable for use, for example, as a touch pad mounted on a steering wheel. In general, the resolution required for a touch pad for a steering wheel application probably does not have to be as high as the resolution required for entering drawing or map data to a computer database, for example. A vehicle driver is not going to be able to focus intently on small features of the display. For many cases, a few switch choices are all that will be necessary. This would allow the driver to use the first screen to select among the major function groups that he or she is interested in, which might comprise the entertainment system, navigation system, Internet, telephone, instrument panel cluster, and perhaps one or two additional subsystems. Once he or she selects the system of interest by pressing a virtual button (or even an actual button on the perimeter of the steering wheel), he or she would then be presented with a new display screen with additional options. If the entertainment system had been chosen, for example, the next series of what choices would include radio, satellite radio, Internet radio. TV, CD, etc. Once the choice among these alternatives has been selected the new screen of button choices would appear.

For other more involved applications, actual control of cursor might be required in much the same way that a mouse is used to control the cursor on a personal computer. In fact, the heads-up display coupled with the steering wheel mounted touch pad can in fact be a personal computer display and control device. The particular choice of system components including the heads-up display technology and the touch pad technology will therefore depend on the sophistication of the particular system application and the resulting resolution required. Therefore, essentially all of the technologies described in the above referenced related art touch pad patents are applicable to the invention to be described herein. Naturally, these systems can be made available to the passenger as well as the driver and perhaps other vehicle occupants. The displays for the passenger and driver can be the same or different. As mentioned above, the passenger can use a commonly viewed display (two separate displays) to indicate to the driver that he or she should make a right turn at the next corner, for example. The heads-up display can also become a computer monitor (at least for the passenger) for internet surfing, for example.

Generally, the steering wheel mounted touch pad, or similar input device, and heads-up display system will result in safer driving for the vehicle operator. This is because many functions that are now performed require the driver to take his or her eyes from the road and focus on some other control system within the vehicle. There is a need therefore to make this shift of gaze unnecessary. On the other hand, the potential exists for adding many more functions, some of which may become very distracting. It is envisioned, therefore, that implementation of the system will be in stages and to a large degree will be concomitant with the evolution of other safety systems such as autonomous vehicles. The first to be adopted systems will likely be relatively simple with low resolution screens and minimum choices per screen. Eventually, full-length movies may someday appear on the heads-up display for the entertainment of the vehicle operator while his vehicle is being autonomously guided.

The preferred touch pad technologies of those listed above include capacitance and resistance technologies. Most of the capacitance technologies described require the conductivity of the operator's finger and therefore will not function if the driver is wearing gloves. Some of the patents have addressed this issue and with some loss of resolution, the standard capacitive systems can be modified to sense through thin driving gloves. For thicker gloves, the projected capacitive systems become necessary with an additional loss of resolution. It is contemplated in the invention described herein, that a combination of these technologies is feasible coupled with a detection system that allows the driver to adjust the sensitivity and thus the resolution of the capacitance system.

Resistance sensitive systems are also applicable and may also require the resolution adjustment system to account for people wearing heavy gloves.

Both the capacitance and resistance systems described in the above patents and publications usually have at least one rigid surface that forms the touch pad base or support. For applications on the center of the steering wheel, provision must be made for the airbag cover to open unimpeded by either the mass or strength of the touch pad. This is a different set of requirements than experienced in any of the prior art. This may require, for example, with the use of the capacitive system, that thin flexible circuits be used in place of rigid printed circuit boards. In the case of the resistive system, thin resistive pressure sensitive inks will generally be used in place of thicker variable resistance pads. Thin metal oxide films on thin plastic films can also be used, however, the durability of this system can be a problem.

Force sensing systems also require that the member upon which the force is applied be relatively rigid so that the force is transmitted to the edges of the touch pad where strain gages are located or where the supporting force can be measured. This requirement may also be incompatible with an airbag deployment doors unless the pad is placed wholly on one flap of the deployment door or multiple pads are used each on a single flap. Naturally, other solutions are possible.

The use of a thin piezoelectric polymer film, especially in a finger tapping switch actuation mode, is feasible where the electrical resistance of the film can be controlled and where the signal strength resulting from a finger tap can be measured at the four corners of the touch path. Aside from this possible design, and designs using a matrix or tube structure described below, it is unlikely that surface acoustic wave or other ultrasonic systems will be applicable.

It should be noted that the capacitive touch pad, when a touch pad has been selected as the input device, is a technology of choice primarily because of its high resolution in the glove-less mode and the fact that it requires a very light touch to activate.

Although the discussion here has concentrated on the use of touch pad technologies, there are other input technologies that may be usable in some particular applications. In particular, in addition to the touch pad, it will be frequently desirable to place a variety of switches at various points outside of the sensitive area of the touch pad. These switches can be used in a general sense such as buttons that are now on a computer mouse, or they could have dedicated functions such as honking of the horn. Additionally functions of the switches can be set based on the screen that is displayed on the heads-up display. A matrix of switches can of course replace the touch pad and they need not be places on the center of the steering wheel but could also be placed on the rim.

For some implementations, a trackball, joystick, button wheel, or other pointing device such as a gesture recognition system may be desirable. Thus, although a preferred embodiment herein contemplates using a capacitive or resistance touch pad as the input device, all other input devices, including a keyboard, could be used either in conjunction with the touch pad or, in some cases, as a replacement for the touch pad depending on the particular application or desires of the system designer.

These patents are meant to be representative of prior art and not exhaustive. Many other patents that make up the prior art are referenced by the patents reference herein. All prior art touch systems are active continuously. Herein, it is contemplated that the heads-up display system may only be active or visible when in use. There is no known combination of the prior art that is applicable to this invention.

As the number of functions which the operator must perform while driving the vehicle is increasing, there is a need for a system which will permit the operator to perform various functions related to operating other vehicle systems without requiring him or her to take his or her eyes off of the road.

Such a system will not add undue additional burden to the driver. On the contrary, it will lessen the work load since the driver will not need to take his or her eyes off of the road to control many functions now being performed. On the same basis that people can read road signs while they are driving, people will not have a problem reading messages that are displayed on the heads-up display with the focal point out in front of the vehicle while they are driving, as long as the messages are kept simple. More complicated messages become possible when vehicles are autonomously driven.

5.0 Definitions

As used herein, a diagnosis of the "state of the vehicle" means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

As used herein, a "part" of the vehicle includes any component, sensor, system or subsystem of the vehicle such as the steering system, braking system, throttle system, navigation system, airbag system, seatbelt retractor, air bag inflation valve, air bag inflation controller and airbag vent valve, as well as those listed below in the definitions of "component" and "sensor".

As used herein, a "sensor system" includes any of the sensors listed below in the definition of "sensor" as well as any type of component or assembly of components which detect, sense or measure something.

The term "vehicle" shall mean any means for transporting or carrying something including automobiles, airplanes, trucks, vans, containers, trailers, boats, railroad cars and railroad engines.

The term "gage" as used herein interchangeably with the terms "gauge", "sensor" and "sensing device".

The "A-pillar" of a vehicle and specifically of an automobile is defined as the first roof supporting pillar from the front of the vehicle and usually supports the front door. It is also known as the hinge pillar.

The "B-Pillar" is the next roof support pillar rearward from the A-Pillar.

The "C-Pillar" is the final roof support usually at or behind the rear seats.

The windshield header as used herein includes the space above the front windshield including the first few inches of the roof. The headliner is the roof interior cover that extends back from the header.

The term "squib" represents the entire class of electrically initiated pyrotechnic devices capable of releasing sufficient energy to cause a vehicle window to break, for example. It is also used to represent the mechanism which starts the burning of an initiator which in turn ignites the propellant within an inflator.

The term "airbag module" generally connotes a unit having at least one airbag, gas generator means for producing a gas, attachment or coupling means for attaching the airbag(s) to and in fluid communication with the gas generator means so that gas is directed from the gas generator means into the airbag(s) to inflate the same, initiation means for initiating the gas generator means in response to a crash of the vehicle for which deployment of the airbag is desired and means for attaching or connecting the unit to the vehicle in a position in which the deploying airbag(s) will be effective in the passenger compartment of the vehicle. In the instant invention, the airbag module may also include occupant sensing components, diagnostic and power supply electronics and components which are either within or proximate to the module housing.

The term "occupant protection device" or "occupant restraint device" as used herein generally includes any type of device which is deployable in the event of a crash involving the vehicle for the purpose of protecting an occupant from the effects of the crash and/or minimizing the potential injury to the occupant. Occupant restraint or protection devices thus include frontal airbags, side airbags, seatbelt tensioners, knee bolsters, side curtain airbags, externally deployable airbags and the like.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identify of that object. A number of different objects are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult can be a different object than a normally seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to the instant invention. In the above-cited prior art, except in that assigned to the current assignee, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A pattern recognition algorithm will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized.

A "combination neural network" as used herein will generally apply to any combination of two or more neural networks that are either connected together or that analyze all or a portion of the input data A combination neural network can be used to divide up tasks in solving a particular occupant problem. For example, one neural network can be used to identify an object occupying a passenger compartment of an automobile and a second neural network can be used to determine the position of the object or its location with respect to the airbag, for example, within the passenger compartment. In another case, one neural network can be used merely to determine whether the data is similar to data upon which a main neural network has been trained or whether there is something radically different about this data and therefore that the data should not be analyzed. Combination neural networks can sometimes be implemented as cellular neural networks.

ATI shall mean Automotive Technologies International Inc. and ITI shall mean Intelligent Technologies International, Inc., Both are incorporated in Delaware.

Polyvinylidene fluoride (PVDF) is referred to several places below. There are developments now underway to achieve piezoelectric effects in a plastic material in addition to PVDF. One such development is reported in S. Bauer, R. Gerhard-Multhaupt, G. M. Sessler, "Ferroelectrets: Soft electroactive foams for transducers," Physics Today 58, 37 (2004). Rather than repeat the various alternatives that exist now or that are in development, when PVDF is used below, it will include all such materials that are plastic and have a piezoelectric effect including the plastic foams referred to in this article.

Preferred embodiments of the invention are described below and unless specifically noted, it is the applicants' intention that the words and phrases in the specification and claims be given the ordinary and accustomed meaning to those of ordinary skill in the applicable art(s). If the applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. §112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

OBJECTS AND SUMMARY OF THE INVENTION

It is an object of the present invention to provide a new and improved method and system for diagnosing vehicular components.

It is another object of the present invention to provide a new and improved method and systems for diagnosing vehicular components using on-board diagnostics.

In order to achieve these objects and others, a method for diagnosing whether one or more components of a vehicle are operating abnormally comprises arranging a plurality of sensors on a vehicle, and in a training stage, obtaining output from the sensors during normal operation of the components, adjusting each component to induce abnormal operation thereof and obtaining output from the sensors during the induced abnormal operation, and determining which sensors provide data about abnormal operation of each component based on analysis of the output from the sensors during normal operation and during induced abnormal operation of the component. During operation of the vehicle, the method entails receiving output from the sensors and determining whether any of the components are operating abnormally by analyzing the output from those sensors which have been determined to provide data about abnormal operation of that component. Further, a driver of the vehicle, a vehicle manufacturer, a vehicle dealer and/or a vehicle repair facility may be alerted upon a determination of abnormal operation of a component.

The determination of which sensors provide data about abnormal operation of each component may entail analyzing differences between signals from the sensors during normal operation or absence thereof and signals from the sensors during induced abnormal operation of the component. The determination of whether any of the components are operating abnormally can then entail deriving numerical time series data from the signals from the sensors, entering the numerical time series data into a processor, applying at least one pattern recognition algorithm to identify and classify patterns in the numerical time series indicative of abnormal operation of a component and provide an output indicative of abnormal component operation. Mathematical transformations may be applied on the numerical time series data prior to application of the pattern recognition algorithm(s), and/or a feature extraction technique or a Fourier transformation. Both the raw output from the sensors and the pre-processed output can be used to determine whether any of the components are operating abnormally.

The determination of whether any of the components are operating abnormally may comprise comparing patterns of data derived from the output from those sensors which have been determined to provide data about abnormal operation of that component with patterns derived from the output of the same sensors during normal operation of the component and abnormal operation of the component.

Additions to the method include, in the training stage, generating a neural network which operatively determines abnormal operation of the components, the neural network being generated from output from sensors during normal operation and output from the sensors during induced abnormal operation of the component, and then inputting the output from the sensors into the neural network which, for each component, considers the output from those sensors which have been determined to provide data about abnormal operation of that component and outputs an indication of normal or abnormal operation of the component. The neural network may be a combination neural network as defined above.

In the training stage, a plurality of components can be adjusted simultaneously to induce abnormal operation thereof and output obtained from the sensors during the induced abnormal operation of the components. A determination as to which sensors provide data about abnormal operation of the components is made based on analysis of the output from the sensors during normal operation and during induced abnormal operation of the components.

A vehicle including a system for diagnosing whether one or more components of a vehicle are operating abnormally in accordance with the invention includes a plurality of sensors arranged on the vehicle and a processor coupled to the sensors and including a pattern recognition algorithm which receives output from the sensors and determines whether each component is operating abnormally by analyzing output from specific ones of the sensors determined to provide data about abnormal operation of that component. The pattern recognition algorithm is generated by analyzing output from the sensors during normal operation of the components and during induced abnormal operation of the components, and in a more specific embodiment, in consideration of which specific sensors provide data about abnormal operation of each component based on the output from the sensors. An alert, warning and/or notification device is coupled to the processor to notifying a driver of the vehicle, vehicle dealer, repair facility, manufacturer and other interested entities, of abnormal operation of one of the components being diagnosed.

Another method for diagnosing whether one or more components of a vehicle are operating abnormally comprise in the training stage, generating a neural network which operatively determines abnormal operation of the components, the neural network being generated from the output from sensors during normal operation and the output from the sensors during induced abnormal operation of the components. Thus, during operation of the vehicle, output from the sensors is obtained and data derived from the output from the sensors is provided to the neural network which outputs an indication of abnormal operation of any of the components.

When the neural network is a combination neural network, data can be provided to a first neural network which determines whether the data corresponds to data obtained during normal operation of the components, and when the data does not correspond to data obtained during normal operation of the components, the data is provided to a second neural network which determines whether any of the components are operating abnormally. Further, when the second neural network determines that one of the components is operating abnormally, all of the data or a subset of the data can be provided to any one of a plurality of different third neural networks each of which determines the particular manner in which a respective one of the components is operating abnormally. That is, once the abnormally operating component is identified, the specific "third" neural network trained to determine the particular abnormality is provided with data. In this case, each of the "third" neural networks is trained using output from sensors and inducing abnormal operation in the specific component it is being trained to determine abnormal operation of Alternative constructions of multiple neural networks constituting a modular or combination neural network can also be applied in the invention with the determination of each subsequent neural network being more focused than the preceding neural network(s). In another embodiment, a combination neural network can include a first neural network which outputs an indication of the normal or abnormal operation of the components and when an indication of abnormal operation of a component is output, a subset of the sensors based on the component is determined (from a memory in which each component is associated with the sensor(s) which provide data for use in determining the component's normal or abnormal operation) and the data derived from the output of these sensors is input into one of a plurality of different "second" neural networks to determine the particular manner in which that component is operating abnormally. That is, once the abnormally operating component is identified, the specific "second" neural network trained to determine the particular abnormality is provided with data.

OBJECTS OF OTHER DISCLOSED INVENTIONS

1. Diagnostics 1.1 General Diagnostics

Further objects of inventions disclosed herein are:

1. To prevent vehicle breakdowns.

2. To alert the driver of the vehicle that a component of the vehicle is functioning differently than normal and might be in danger of failing.

3. To provide an early warning of a potential component failure and to thereby minimize the cost of repairing or replacing the component.

4. To provide a device which will capture available information from signals emanating from vehicle components for a variety of uses such as current and future vehicle diagnostic purposes.

5. To provide a device that uses information from existing sensors for new purposes thereby increasing the value of existing sensors and, in some cases, eliminating the need for sensors that provide redundant information.

6. To provide a device which analyzes vibrations from various vehicle components that are transmitted through the vehicle structure and sensed by existing vibration sensors such as vehicular crash sensors used with airbag systems or by special vibration sensors, accelerometers, or gyroscopes.

1.2 Pattern Recognition

Further objects of inventions disclosed herein are:

1. To provide a device which is trained to recognize deterioration in the performance of a vehicle component, or of the entire vehicle, based on information in signals emanating from the component or from vehicle angular and linear accelerations.

2. To apply pattern recognition techniques based on training to diagnosing potential vehicle component failures.

3. To apply trained pattern recognition techniques using multiple sensors to provide an early prediction of the existence and severity of an accident.

1.3 SAW and Other Wireless Sensors in General

Further objects of inventions disclosed herein are:

1. To provide new and improved apparatus and methods for boosting signals to signal-receiving and signal-activated sensors, and boosting signals from signal-generating sensors, exemplifying sensors being a SAW device and an RFID tag, or to and/or from a radar, a GPS or other antenna.

2. To provide a new and improved arrangement including a SAW device which provides a boost for a signal to and/or from a signal-generating, signal-receiving, or signal-activated sensor such as a SAW device or RFID tag.

3. To provide a new and improved two-port circulator for boosting electronic signals, such as signals to and from a SAW device or RFID tag.

4. To provide an energy-supply module for supplying energy to an electricity-requiring component derived from movement, such as a sensor on a vehicle whereby energy is provided by motion of the vehicle or a part or component thereof.

The invention is also concerned with wireless devices that contain transducers. An example is a temperature transducer coupled with appropriate circuitry which is capable of receiving energy either inductively, through radio frequency, capacitively or through energy harvesting. Such temperature sensors may be used to measure the temperature inside the passenger compartment or outside of the vehicle. It also can be used to measure the temperature of some component in the vehicle, for example, a tire. The distinctive feature of this invention is that such temperature transducers are not hard-wired into the vehicle and do not rely solely on batteries. Such temperature sensors have been used in other environments such as the monitoring of the temperature of domestic and farm animals for health monitoring purposes.

Upon receiving energy inductively or through the radio frequency energy transfer, for example, the temperature transducer conducts its temperature measurement and transmits the detected temperature to a processor or central control module in the vehicle.

The wireless communication within a vehicle can be accomplished in several ways. The communication can be through the same path that supplies energy to the device, or it can involve the transmission of waves that are received by another device in the vehicle. These waves can be either electromagnetic (microwave, infrared, etc) or ultrasonic.

Many other types of transducers or sensors can be used in this manner. The distance to an object a vehicle can be measured using a radar reflector such as a backscatter RFID tag which permits the distance to the tag to be determined by the time of flight of radio waves. Another method of determining distance to an object can be through the use of ultrasound wherein the device is commanded to emit an ultrasonic burst and the time required for the waves to travel to a receiver is an indication of the displacement of the device from the receiver.

Although in most cases the communication will take place within the vehicle, and some cases such as external temperature transducers or tire pressure transducers, the source of transmission will be located outside of the compartment of the vehicle.

A discussion of RFID technology including its use for distance measurement is included in the RFID Handbook, by Klaus Finkenzeller, John Wiley & Sons, New York 1999.

In some cases, the sensing device may be purely passive and require no power. One such example is when an infrared or optical beam of energy is reflected off of a passive reflector to determine the distance to that reflector. Another example is a passive reflective RFID tag or a SAW sensor.

1.4 Tire Monitoring and Monitoring of Other Vehicle Components and Vehicular Environments Further objects of inventions disclosed herein are:

1. To provide new and improved sensors for measuring the pressure, temperature and/or acceleration of tires with the data obtained by the sensors being transmittable via a telematics link to a remote location.

2. To provide new and improved sensors for detecting the condition or friction of a road surface which utilize wireless data transmission, wireless power transmission, and/or surface acoustic wave technology with the data obtained by the sensors being transmittable via a telematics link to a remote location.

3. To provide a mechanism to measure the temperature of the tire from a device that is external from the tire.

4. To provide a device to boost the signal received from an antenna before inserting into a SAW device and again to boost the signal after it comes out of the SAW device prior to inserting the signal into an antenna.

5. To provide an apparatus and method for combining an RFID and a SAW device in a wireless monitoring system.

6. To provide an apparatus and method for sensing tire failures before they occur.

7. To provide new and improved method and apparatus for monitoring tires.

8. To provide a new and improved method and apparatus for monitoring tires using a sensor mounted entirely at a location external of an apart from the tires.

9. To provide a new and improved wireless system for controlling power transfer and communication between a tire monitoring sensor and other systems or devices in the vehicle.

10. To provide a new and improved method and apparatus for monitoring tires using a sensor mounted entirely at a location external of an apart from the tires.

In order to achieve these objects and others, a vehicle including an arrangement for monitoring a tire mounted to the vehicle comprises a thermal radiation detecting system for detecting the temperature of the tire at different circumferential locations along the circumference of the tires, a processor coupled to the thermal radiation detecting system for receiving the detected temperatures of the tire and analyzing the detected temperatures of the tire, and a response system or unit coupled to the processor for responding to the analysis of the detected temperatures of the tire.

The analysis performed by the processor may be a determination of whether a difference in thermal radiation is present between the circumferential locations of the tire in which case, the response system would respond to the determined difference in thermal radiation between the circumferential locations of the tire. The processor could be designed to determine whether the difference between the temperatures of the tire at different circumferential locations exceeds a threshold. The analysis may also be conducted relative to a fixed or variable threshold in which case, the response system responds to the analysis of the detected temperatures of the tire relative to the threshold. The analysis could also be of the detected temperature of the tire at each circumferential location relative to the temperature of the tire at the other circumferential locations. The processor could also be programmed to average the detected temperatures of the tire during one revolution, compare the temperature of the tire at each circumferential location to the average temperature and determine whether the temperature of the tire at any circumferential location is above the average by a threshold difference.

Various modifications of this basic embodiment include arranging the thermal radiation detecting system external of and apart from the tires, power supply constructions wherein the thermal radiation detecting system is supplied power by a power receiving system coupled thereto which in turn may receive power wirelessly. For example, the vehicle may include a source of inductive coupled power proximate the power receiving system and through which current flows so that the power receiving system receives power inductively therefrom.

The thermal radiation detecting system is coupled to the processor, e.g., by a transmitter mounted in connection therewith and a receiver mounted in connection with or integrated into the processor such that the detected temperature of the different circumferential locations of the tire is transmitted wirelessly from the thermal radiation detecting system to the processor.

The response system may be one or more of a display for displaying an indication or representation of the analysis of the detected temperatures of the tire, a warning light for emitting light into the passenger compartment from a specific location and/or a telecommunications unit for sending a signal to a remote vehicle service facility. The response system could also be an alarm for emitting noise into the passenger compartment.

One embodiment of the thermal radiation detecting system includes one or more detectors for generating an output signal responsive to thermal emitted radiation, a structure which defines first and second fields of view relative to the detector(s) whereby the first field of view encompassing a first circumferential location of the tire and the second field of view encompassing a second circumferential location of the tire, and a switch for switching the field of view detected to generate a combined output signal. The processor derives an indication of a difference in thermal radiation between the first and second circumferential locations of the tire. The switch may comprise a shutter operable between first and second positions corresponding to allowing respective first and second fields of view to be detected. The shutter may include an opaque panel pivotally mounted between the detector(s) and the structure defining first and second fields of view, a spring biasing the panel to the first position and an electromagnet for attracting the panel to the second position.

A vehicle including an arrangement for monitoring tires in accordance with the invention comprises a thermal radiation detecting mechanism arranged external of and apart from the tires for detecting the temperature of the tires, a processor coupled to the thermal radiation detecting mechanism for receiving the detected temperature of the tires and determining whether a difference in thermal radiation is present between associated mated pairs of the tires, and a responsive system coupled to the processor for responding to the determined difference in thermal radiation between mated pairs of the tires. Instead of determining whether a difference in thermal radiation is present between associated mated pairs of tires, a comparison or analysis may be made between the temperature of the tires individually and a predetermined value or threshold to determine the status of the tires, e.g., properly inflated, under inflated or delaminated, and appropriate action by the response system is undertaken in light of the comparison or analysis. The analysis may be in the form of a difference between the absolute temperature and the threshold temperature. Even more simpler, an analysis of the detected temperature of each tire may be used and considered in a determination of whether the tire is experiencing or is about to experience a problem. Such an analysis would not necessarily entail comparison to a threshold.

The determination of which tires constitute mated pairs is made on a vehicle-by-vehicle basis and depends on the location of the tires on the vehicle. It is important to determine which tires form mated pairs because such tires should ideally have the same pressure and thus the same temperature. As a result, a difference in temperature between tires of a mated pair will usually be indicative of a difference in pressure between the tires. Such a pressure difference might be the result of under-inflation of the tire or a leak. One skilled in the art of tire inflation and maintenance would readily recognize which tires must be inflated to the same pressure and carry substantially the same load so that such tires would form mated pairs.

For example, for a conventional automobile with four tires, the mated pairs of tires would be the front tires and the rear tires. The front tires should be inflated to the same tire pressure and carry the same load so that they would have the same temperature, or have different temperatures within an allowed tolerance. Similarly, the rear tires should be inflated to the same tire pressure and carry the same load so that they would have the same temperature, or have different temperatures within an allowed tolerance.

It is also conceivable that three or more tires on the vehicle should be at the same temperature and thus form a plurality of mated pairs, i.e., the designation of one tire as being part of one mated pair does not exclude the tire from being part of another mated pair. Thus, if three tires should be at the same temperature and they each have a different temperature, this would usually be indicative of different pressures and thus would give rise to a need to check each tire.

The thermal radiation detecting mechanism is coupled to the processor, preferably in a wireless manner, however wires can also be used alone or in combination with a wireless technique. For example, a suitable coupling may include a transmitter mounted in connection with the thermal radiation detecting device and a receiver mounted in connection with or integrated into the processor. Any of the conventions for wirelessly transmitting data from a plurality of tire pressure-measuring sensors to a common receiver or multiple receivers associated with a single processor, as discussed in the U.S. patents above, may be used in accordance with the invention.

The thermal radiation detecting mechanism may comprise infrared radiation receivers each arranged to have a clear field of view of at least one tire. The receivers may be arranged in any location on the vehicle from which a view of at least a part of the tire surface can be obtained. For example, the receivers may be arranged in the tire wells around the tires, on the side of the vehicle and on side mounted rear view mirrors.

In order to supply power to the thermal radiation detecting mechanism or devices, several innovative approaches are possible in addition to directly connected wires. Preferably, power is supplied wirelessly, e.g., inductively, through radio frequency energy transfer or capacitively. In the inductive power supply arrangement, the vehicle is provided with a pair of looped wires arranged to pass within a short distance from a power receiving system electrically coupled to the thermal radiation detecting devices, i.e., the necessary circuitry and electronic components to enable an inductive current to develop between the pair of looped wires and a wire of the power receiving system such as described in U.S. Pat. No. 05,293,308, U.S. Pat. No. 05,450,305, U.S. Pat. No. 05,528,113, U.S. Pat. No. 05,619,078, U.S. Pat. No. 05,767,592, U.S. Pat. No. 05,821,638, U.S. Pat. No. 05,839,554, U.S. Pat. No. 05,898,579 and U.S. Pat. No. 06,031,737.

Current flows through the pair of looped wires and is transferred through inductance to the wire of the power receiving system which then energizes the thermal radiation detecting component of the thermal radiation detecting devices. Instead of a circuit for receiving power through inductance from the pair of looped wires, the power receiving system can be a circuit designed to receive power through radio frequency energy transfer. As such, when the set radio frequency is transmitted and then received by the power receiving system, it is actuated to energize the thermal radiation detecting component.

The responsive system may include an alarm for emitting noise into the passenger compartment, a warning light for emitting light into the passenger compartment from a specific location and/or a telecommunications unit for sending a signal to a remote vehicle service facility.

In one exemplifying embodiment disclosed herein, the thermal radiation detecting mechanism comprises detectors for generating an output signal responsive to thermal emitted radiation, a structure which defines first and second fields of view relative to the detectors, the first field of view encompassing a first one of the mated pair of tires and the second field of view encompassing a second one of the mated pair of tires, a switch for switching the field of view detected to generate a combined output signal and an arrangement for deriving an indication of a proximate object from the combined output signal. Switching between the first and second fields of view generates a difference in thermal emitted radiation at the detectors when the temperature of the first and second tires differ from one another. The detectors may comprise one or more differential thermal emitted radiation detectors.

The switch may comprise a shutter operable between first and second positions corresponding to allowing respective first and second fields of view to be detected. The shutter includes an opaque panel pivotally disposed between the detector and the optics, a spring biasing the panel to the first position and an electromagnet for attracting the panel to second position.

The structure which defines the first and second fields of view may comprise optics having first and second optical elements, e.g., Fresnel lenses, or optics having a single optical element capable of movement between a first position and a second position corresponding to respective first and second fields of view. In the latter case, the switch may comprise a vibrator for effecting movement of the optics between first and second positions corresponding to allowing respective first and second fields of view to be detected.

A method for monitoring tires mounted to a vehicle in accordance with the invention comprises the steps of detecting the temperature of the tires from locations external of and apart from the tires, determining whether a difference in temperature is present between associated mated pairs of the tires, and responding to the determined difference in thermal radiation between mated pairs of the tires. The temperature of the tires may be detected by at least one thermal radiation detecting device and/or transmitted from the locations external of and apart from the tires to a processor remote from the transmitters. The difference in temperature between associated mated pairs of tires is thus determined in the processor. To detect the temperature of the tires, infrared radiation-receivers may be arranged on the vehicle so that each has a clear field of view of at least one of the tires. The receivers could thus be mounted in tire wells around each tire. The response to the determined difference in temperature may be provided only if the difference is above the predetermined threshold.

Power is preferably supplied to the thermal radiation detecting devices wirelessly, although a battery or capacitor may also be wired in circuit with the thermal radiation detecting devices for backup or a direct wire connection to the vehicle power system can be used. Inductively powering the thermal radiation detecting devices entails using an inductive power arrangement such as a pair of looped wires arranged in the vehicle and passing proximate the thermal radiation detecting devices. The thermal radiation detecting devices are coupled to circuitry capable of receiving power inductively from the pair of looped wires. Powering the thermal radiation detecting devices through radio frequency energy transfer entails arranging a radio frequency energy transfer device in connection with the thermal radiation detecting device. This energy transfer device would be similar to circuitry in RFID tags.

As noted above, several U.S. patents describe arrangements for monitoring the pressure inside a rotating tire and to transmit this information to a display or monitor inside the vehicle. A preferred approach for monitoring the pressure within a tire is to instead monitor the temperature of the tire using a temperature sensor and associated power supplying circuitry and to compare that temperature to the temperature of other tires on the vehicle, as discussed above. When the pressure within a tire decreases, this generally results in the tire temperature rising if the vehicle load is being carried by that tire. When two tires are operating together at the same location such as on a truck trailer, just the opposite occurs. That is, the temperature of the fully inflated tire increases since it is now carrying more load than the partially deflated tire.

In order to achieve other objects of the disclosed inventions, an arrangement for providing a boosted signal from a signal-generating device such as a SAW device comprises an antenna and a circulator having a first port connected to the antenna to receive a signal from the antenna and a second port adapted to be connected to the SAW device to provide a signal to the SAW device and receive a signal from the SAW device. The circulator amplifies the signal from the antenna such that the amplified signal is directed to the SAW device and amplifies the signal received from the SAW device such that a twice-amplified signal is directed to the antenna. A receiving and processing module is provided to transmit a signal to the antenna causing the antenna to generate its signal and receive a signal from the antenna derived from the twice-amplified signal.

The circulator may be arranged to provide a signal gain of 6 dB at 400 MHz, for example, so that a round-trip gain of 12 db or more can be provided.

The circulator may comprise a first signal splitter arranged in connection with the first port and a second signal splitter arranged in connection with the second port. A first gain component amplifies the signal being directed from the antenna to the SAW device and a second gain component amplifies the signal being directed from the SAW device to the antenna.

An energy-supply module may optionally be provided to supply energy to operate the circulator, or another vehicular component. The energy-supply module may comprise a charging capacitor, at least one movable mass, a mechanical-electrical converter coupled to each mass to convert the movement of the mass into electric signals and a bridge rectifier coupled to each converter. The capacitor is coupled to each bridge rectifier to enable charging of the capacitor during movement of the mass(es). Other alternate energy-supply modules may be optionally provided.

The energy-supply module may also comprise an over-charge protector to prevent overcharging of the capacitor, such as a Zener diode arranged in a parallel with the capacitor.

If two masses are provided, they may be arranged in perpendicular directions.

Although tire monitoring is discussed above, a more general sensor assembly capable of obtaining and providing a measurement of a physical quantity in accordance with the invention includes an antenna capable of receiving a radio frequency signal, a radio frequency identification (RFID) device coupled to the antenna, a sensor coupled to the RFID device arranged to generate a measurement of the physical quantity, and a switch coupled to the RFID device and arranged to connect or disconnect the sensor from a circuit with the antenna dependent on whether the antenna receives a particular signal associated with the RFID device. When the antenna receives the particular signal associated with the RFID device, the RFID device causes the switch to close and connect the sensor in the circuit with the antenna to enable the measurement generated by the sensor to be directed to and transmitted by the antenna. The RFID device may include the switch or the switch may be external of the RFID device and interposed between the RFID device and the sensor. The RFID device optionally has a programmable address. The sensor generates a measurement of the physical quantity when an interrogation signal is received while the sensor is in the circuit with the antenna. The sensor may comprise a SAW device.

A method for obtaining a measurement of at least one physical quantity from a remote sensor assembly on a vehicle includes the steps of arranging an interrogator on the vehicle, arranging at least one sensor assembly on the vehicle, each including an antenna capable of receiving a radio frequency signal, a radio frequency identification (RFID) device coupled to the antenna, a sensor coupled to the RFID device and arranged to generate a measurement of at least one physical quantity and a switch coupled to the RFID device and arranged to connect or disconnect the sensor from a circuit with the antenna dependent on whether the antenna receives a particular signal associated with the RFID device, transmitting via the interrogator the particular signal associated with the RFID device to cause the RFID device to close the switch and connect the sensor in the circuit with the antenna, subsequently transmitting a sensor interrogation signal to cause the sensor to generate the measurement of the physical quantity, and directing the measurement generated by the sensor to the antenna to be transmitted thereby back to the interrogator. When plurality of sensor assemblies are arranged on the vehicle, the RFID devices of the sensor assemblies each having a unique signal to which the RFID device reacts. In this case, the measurement from each sensor assembly is obtained by separately transmitting the particular signal associated with each sensor assembly, transmitting a signal to cause the sensor of all of the sensor assemblies to be disconnected from the circuit after each transmission, and spacing the transmission to allow each transmission to dissipate prior to transmission of a subsequent signal. The sensor is optionally disconnected from the antenna when the power reaching the sensor is below a threshold. An RFID tag may be coupled to each sensor and an interrogation signal transmitted to ascertain the presence of any sensors on the vehicle. The same enhancements of the sensor assembly described above can be applied in the method.

A method for obtaining a measurement of multiple physical quantities of components on a vehicle from remote sensor assemblies on the vehicle in accordance with the invention includes the steps of arranging an interrogator on the vehicle, arranging a plurality of sensor assemblies on the vehicle, each including an antenna capable of receiving a radio frequency signal, a radio frequency identification (RFID) device coupled to the antenna, a sensor coupled to the RFID device and arranged to generate a measurement of a physical quantity and a switch arranged to connect or disconnect the sensor from a circuit with the antenna dependent on whether the antenna receives a particular signal associated with the RFID device, transmitting via the interrogator the particular signals associated with the RFID devices at different times to cause each RFID device to close the respective switch and connect the respective sensor in the respective circuit with the respective antenna, transmitting sensor interrogation signals to cause the sensors to generate the measurements of the physical quantity, and directing the measurements generated by the sensors to the respective antennas to be transmitted thereby back to the interrogator. The same enhancements of the sensor assembly and method described above can be applied in this method.

1.5 Fuel Gage

Fluid level gages of the present invention uses a combination of (i) one or more load cells or fuel level measuring devices, plus in some cases other sensors which measure the pitch or roll angle of the vehicle or the fuel density, to approximately measure the quantity of the liquid in a tank, and (ii) a processor and algorithm to correct for the inaccuracies arising from the pitch and roll angles of the vehicle, other external forces or from variations in fuel density. Although several weighing systems are disclosed for illustrative purposes, the invention applies to any method of making an approximate measurement of the fuel quantity and then using analytical techniques to improve on the measurement.

Principle objects of this invention are:

1. To provide a measuring system for determining the quantity of liquid in a reservoir of an automotive vehicle operating on land that is subject to accelerations and pitch and roll rotations.

2. To provide analytical methods using a processor and algorithm and the output from one or more transducers for accurately determining the quantity of liquid in an automobile reservoir when the reservoir has a complicated geometry.

3. To provide a simple, low cost system using a capacitance with a liquid as a dielectric to determine the level of liquid in a reservoir.

4. To provide for a simple correction for the effects of pitch and roll in a reservoir liquid level measurement system through use of an empirically or analytically-derived relationship between individual transducer readings and the quantity of liquid in the reservoir.

5. To correct for the effects of pitch and roll through the use of pitch and roll angle sensors, and particularly an IMU, and an empirically or analytically-derived relationship between transducer readings and the quantity of liquid in the reservoir.

6. To eliminate the errors on automobile tank weighing systems caused by the accumulation of mud or ice on an exposed tank.

7. To eliminate the errors on automobile tank weighing systems caused by the variations in fuel density.

8. To provide a variety of low cost load cell designs for use in tank weighing or pressure measuring systems.

9. To provide a method of increasing the accuracy of the currently used float fuel gages.

10. To provide for more accurate liquid level gages.

11. To provide for wireless transmission of liquid level measurement transducers information to an interrogator.

12. To provide for transducers used in determining the level of a liquid in a reservoir that do not require power to be supplied by the vehicle power system or a battery.

Among the potentially novel aspects embodied in the present invention is that a system, constructed in accordance with the present invention, can use a variety of different liquid level measuring transducers which by themselves give an inaccurate measurement of the quantity of a liquid in a reservoir but when combined with an empirically-derived algorithm results in a highly accurate liquid quantity measurement system. These transducers can be weight measuring load cells, vehicle angle measuring transducers, or liquid level measuring devices based on either float, ultrasonic or capacitive measurement technologies.

When load cells are used, they are aligned to be sensitive generally parallel along an axis substantially normal to a horizontal plane and generally parallel to the yaw or vertical axis of the vehicle. A microprocessor with analog-to-digital converters converts the analog signals into output information representative of the volume or level of the liquid in the reservoir by a variety of techniques but all employing the use of an algorithm which is based on empirical or analytical approximation techniques to relate the quantity of liquid in the reservoir to the measured quantities.

Although a number of the systems disclosed and illustrated below make use of a number of weight measuring devices for illustration, the invention is not the use of weighing per se but the use of one or more of a variety of transducers including load cells, angle gages, IMU, and level gages in combination with an algorithm and processor to determine the quantity of liquid in the reservoir with greater accuracy than can be obtained from a single transducer alone.

In addition, in order to achieve one or more of the above objects, an apparatus for measuring the volume of a liquid in a fuel tank in a vehicle subject to varying external forces caused by movement or changes in the roll and pitch angles of the vehicle includes a fuel tank mounted to the vehicle and subject to forces along the yaw axis of the vehicle and SAW pressure sensors mounted on the tank whereby each SAW pressure sensor provides an output signal representative of pressure applied thereto by material in an interior of the tank (the fuel or air). A processor or other computational device is coupled to the SAW pressure sensors, receives output signals therefrom and processes the output signals to obtain a volume of fuel in the tank. More specifically, the processor is associated with a memory unit that stores an algorithm representative of a derived relationship between the parameters corresponding to the output signals from the SAW pressure sensors and the volume of fuel in the tank and applies the algorithm using the instantaneous output signals from the SAW pressure sensors as input to obtain the volume of fuel in the tank. The algorithm may be obtained by conducting a plurality of measurements, each including the known volume of the tank and output signals from the SAW pressure sensors for that known volume of fuel in the tank.

In other embodiments, a number of SAW pressure sensors are arranged each at a different location on a bottom of the tank and a SAW pressure sensor is arranged at a top of the tank. The algorithm considers output signals from the SAW pressure sensor arranged at a top of the tank to eliminate effects of vapor pressure within the tank. The algorithm may be a neural network.

In another embodiment, a fluid storage tank for a vehicle subject to varying external forces caused by movement or changes in the roll and pitch angles of the vehicle in accordance with the invention includes a container having a sidewall defining in part an interior and a SAW sensor arranged on the sidewall and including a pressure sensor arranged on an inside of the container and a temperature sensor arranged on an outside of the container. The pressure sensor measures deflection of the sidewall and the temperature sensor measures temperature of the fluid. Pressure and temperature readings from the tank may thus be obtained in a wireless and powerless manner.

Another disclosed method for measuring the volume of a liquid in a fuel tank in a vehicle subject to varying external forces caused by movement or changes in the roll and pitch angles of the vehicle entails conducting a plurality of measurements, each measurement including the known volume of the tank and the value of at least three parameters concerning the tank, at least one of the parameters being the pitch or roll angle of the vehicle as determined by an inertial measurement unit (IMU), generating an algorithm from the plurality of measurements for determining the volume of fuel in the tank upon the receipt of current values of the parameters, inputting the algorithm into a processor arranged in connection with the vehicle, measuring the parameters during operation of the vehicle, and inputting the measured parameters into the algorithm in the processor means whereby the algorithm provides the volume of fuel in the tank. Aside from the pitch and/or roll angle, the remaining parameters may be the load of the tank on a load cell arranged at a first location, the load of the tank on a load cell arranged at a second location, the load of the tank at a load cell arranged at a third location, the height of the fuel at a first location in the tank, the height of the fuel at a second location in the tank and the height of the fuel at a third location in the tank.

The novel features of construction and operation of the invention will be more clearly apparent during the course of the following description referencing the accompanying drawings where a few preferred forms of the device of the invention are illustrated and wherein like characters of reference designate like parts throughout the drawings.

1.6 Occupant Sensing

Further objects of inventions disclosed herein are:

1. To simultaneously monitor several sensors, primarily accelerometers, gyroscopes and strain gages, to determine the state of the vehicle and optionally its occupants and to determine that a vehicle is out of control and possibly headed for an accident, for example. If so, then a signal can be sent to a part of the vehicle control system to attempt to re-establish stability. If this is unsuccessful, then the same system of sensors can monitor the early stages of a crash to make an assessment of the severity of the crash and what occupant protection systems should be deployed and how such occupant protection systems should be deployed.

2. To provide new and improved methods and apparatus for controlling an occupant restraint device based on information provided by various sensors.

1.7 Vehicle or Component Control

Further objects of inventions disclosed herein are:

1. To utilize pattern recognition techniques and the output from multiple sensors to determine at an early stage that a vehicle rollover might occur and to take corrective action through control of the vehicle acceleration, brakes and steering to prevent the rollover or if it is not preventable, to deploy side head protection airbags to reduce the injuries.

2. To apply component diagnostic techniques in combination with intelligent or smart highways wherein vehicles may be automatically guided without manual control in order to permit the orderly exiting of the vehicle from a restricted roadway prior to a breakdown of the vehicle.

3. To use the output from multiple sensors to determine that the vehicle is skidding or sliding and to send messages to the various vehicle control systems to activate the throttle, brakes and/or steering to correct for the vehicle sliding or skidding motion.

Accordingly to achieve one or more of the above objects, a control system and method for controlling an occupant restraint system in accordance with the invention comprise a plurality of electronic sensors mounted at different locations on the vehicle, each sensor providing a measurement related to a state thereof or a measurement related to a state of the mounting location, and a processor coupled to the sensors and arranged to diagnose the state of the vehicle based on the measurements of the sensors. The processor controls the occupant restraint system based at least in part on the diagnosed state of the vehicle in an attempt to minimize injury to an occupant. Various sensors may be used including one or more single axis acceleration sensors, double axis acceleration sensors, triaxial acceleration sensors, high dynamic range accelerometers and gyroscopes such as gyroscopes including a surface acoustic wave resonator which applies standing waves on a piezoelectric substrate. One or more sensors may include an RF response unit in which case, an RF interrogator device causes the RF response unit of to transmit a signal representative of the measurement of the sensor to the processor. A weight sensor may be coupled to a seat in the vehicle for sensing the weight of an occupying item of the seat and to the processor so that the processor controls the occupant restraint system based on the state of the vehicle and the weight of the occupying item of the seat sensed by the weight sensor.

The state of the vehicle diagnosed by the processor includes angular motion of the vehicle, the acceleration of the vehicle, a determination of a location of an impact between the vehicle and another object and/or angular acceleration. In the latter case, several sensors may be accelerometers and/or gyroscopes such that the processor determines the angular acceleration of the vehicle based on the acceleration measured by the accelerometers or determined from the gyroscopes.

The processor may be designed to forecast the severity of the impact using the force/crush properties of the vehicle at the impact location and control the occupant restraint system based at least in part on the severity of the impact. The processor may also include a pattern recognition system for diagnosing the state of the vehicle. A display may be coupled to the processor for displaying an indication of the state of the vehicle. A warning device, alarm or other audible or visible signal indicator may be coupled to the processor for relaying or conveying a warning to an occupant of the vehicle relating to the state of the vehicle. A transmission device may also be coupled to the processor for transmitting a signal to a remote site relating to the state of the vehicle.

Another embodiment of a control system for controlling an occupant restraint system comprises a plurality of sensors mounted at different locations on the vehicle, each sensor providing a measurement related to a state thereof or a measurement related to a state of the mounting location and a processor coupled to the sensors and arranged to diagnose the state of the vehicle based on the measurements of the sensors. The processor is arranged to control the occupant restraint system based at least in part on the diagnosed state of the vehicle. At least two of the sensors are a single axis acceleration sensor, a double axis acceleration sensor, a triaxial acceleration sensor or a gyroscope.

The sensors can be used in a control system for controlling a navigation system wherein the state of the vehicle diagnosed by the processor includes angular motion of the vehicle whereby angular position or orientations are derivable from the angular motion. The processor then controls the navigation system based on the angular acceleration of the vehicle.

2.0 Telematics

Further objects of the inventions disclosed herein are:

1. To provide new and improved weight or load measuring sensors, switches, temperature sensors, acceleration sensors, angular position sensors, angular rate sensors, angular acceleration sensors, proximity sensors, rollover sensors, occupant presence and position sensors, strain sensors and humidity sensors which utilize wireless data transmission, wireless power transmission, and/or surface acoustic wave and/or RFID technology with the data obtained by the sensors being transmittable via a telematics link to a remote location.

2. To provide new and improved sensors for detecting the presence of fluids or gases which utilize wireless data transmission, wireless power transmission, and/or surface acoustic wave and/or RFID technology with the data obtained by the sensors being transmittable via a telematics link to a remote location.

3. To provide new and improved sensors for detecting chemicals which utilize wireless data transmission, wireless power transmission, and/or surface acoustic wave technology with the data obtained by the sensors being transmittable via a telematics link to a remote location.

4. To utilize any of the foregoing sensors for a vehicular component control system in which a component, system or subsystem in the vehicle is controlled based on the information provided by the sensor. Additionally, the information provided by the sensor can be transmitted via a telematics link to one or more remote facilities for further analysis.

5. To provide a new and improved method and system for diagnosing components in a vehicle and the operating status of the vehicle and alerting the vehicle's manufacturer, agent or dealer, or another repair facility, via a telematics link that a component of the vehicle is functioning abnormally and may be in danger of failing.

6. To provide a new and improved method and apparatus for obtaining information about a vehicle system and components in the vehicle in conjunction with failure of the component or the vehicle and sending this information to the vehicle manufacturer or agent.

7. To provide a new and improved method and system for diagnosing components in a vehicle by monitoring the patterns of signals emitted from the vehicle components and, through the use of pattern recognition technology, forecasting component failures before they occur. Vehicle component behavior is thus monitored over time in contrast to systems that wait until a serious condition occurs. The forecast of component failure can be transmitted to a remote location via a telematics link.

8. To provide a new and improved on-board vehicle diagnostic module utilizing pattern recognition technologies which are trained to differentiate normal from abnormal component behavior. The diagnosis of component behavior can be transmitted to a remote location via a telematics link.

9. To provide a diagnostic module that determines whether a component is operating normally or abnormally based on a time series of data from a single sensor or from multiple sensors that contain a pattern indicative of the operating status of the component. The diagnosis of component operation can be transmitted to a remote location via a telematics link.

10. To provide a diagnostic module that determines whether a component is operating normally or abnormally based on data from one or more sensors that are not directly associated with the component, i.e., do not depend on the operation of the component. The diagnosis of component operation can be transmitted to a remote location via a telematics link.

11. To incorporate surface acoustic wave and/or RFID technology into sensors on a vehicle with the data obtained by the sensors being transmittable via a telematics link to a remote location.

12. To provide new and improved sensors which obtain and provide information about the vehicle, about individual components, systems, vehicle occupants, subsystems, or about the roadway, ambient atmosphere, travel conditions and external objects with the data obtained by the sensors being transmittable via a telematics link to a remote location.

13. To alert the dealer, or other repair facility, that a component of the vehicle is functioning differently than normal and is in danger of failing.

14. To provide a device that provides information to the vehicle manufacturer of the events leading to a component failure.

15. To provide new and improved sensors for a vehicle that wirelessly transmit information about a state measured or detected by the sensor.

3.0 Wiring and Busses

Further objects of the inventions disclosed herein are:

1. To provide a new and improved electrical wiring system for coupling sensors and actuators in a motor vehicle in order to reduce the amount of wire in the motor vehicle and improve system reliability.

2. To provide a vehicle safety wiring system including a network comprising various safety devices such as crash sensors and airbag inflator igniters.

3. To associate much of the airbag electronics with the airbag module so as to improve the reliability of the system.

In the teachings of this invention, two or more sensors, frequently accelerometers and/or gyroscopes, can be monitored simultaneously and the combination of the outputs of these multiple sensors are combined continuously in making the crash severity analysis. Also, according to the teachings of this invention, all such devices can communicate on a single safety bus that connects the various safety related electronics, sensors and actuators such as airbag modules, seatbelt retractors, and vehicle control systems.

More particularly, an electrical system in a vehicle comprises a plurality of devices used in the operation of the vehicle including at least one crash sensor and at least one airbag module and at least one electrical bus each coupling at least a portion of the devices and conveying power and/or information to or from the devices coupled to the bus. A first bus couples the crash sensor and the airbag module. Each crash sensor generates signals relating to an impact of the vehicle and each airbag module preferably comprises a module housing, an airbag associated with the housing, an inflator assembly arranged in the housing for inflating the airbag and an electronic controller arranged in or adjacent the housing and coupled to the first bus. The controller controls inflation of the airbag by the inflator assembly in consideration of the signals generated by the crash sensor(s). Each crash sensor is arranged separate and at a location apart from the housing of each airbag module. The bus can consist of a single pair of wires.

A sensor and diagnostic module may be coupled to the first bus for monitoring the controller of each airbag module. One or more of the crash sensors can be designed to generate coded signals when deployment of the airbag of at least one airbag module is desired and the controller is structured and arranged to receive the coded signals and control inflation of the airbag by the inflator assembly based thereon.

The controller may include a power supply for enabling initiation of the inflator assembly and/or be arranged to acknowledge receipt of a communication via the first bus and indicative operability of the airbag module.

An occupant position sensor may be provided to detect the position of the occupant to be protected by the airbag of the airbag module(s) and coupled to the first bus. The controller is thus arranged to control inflation of the airbag by the inflator assembly in consideration of the detected position of the occupant. The occupant position sensor may be arranged in the housing.

When several airbag modules are present, each controller in the airbag modules can be assigned a unique address whereby information conveyed over the first bus includes an address of a respective one of the controllers such that only the respective one of the controllers assigned to the address is responsive to the information including the address. The controllers thus preferably include a system for determining whether the information conveyed over the first bus includes the address assigned to the controller, e.g., a microprocessor.

Another embodiment of an electrical system in a vehicle comprises a plurality of sensors each detecting a physical characteristic of the vehicle, at least one of the sensors being a crash sensor which detects a physical characteristic, such as the acceleration, of the vehicle affected by a crash involving the vehicle, at least one airbag module each comprising an airbag, an inflator assembly for inflating the airbag and an electronic controller for controlling inflation of the airbag by the inflator assembly, and an electrical bus coupling the crash sensor and the airbag module(s) and conveying power and/or information to or from the crash sensor(s) and the airbag module(s). A module is also coupled to the bus and arranged to receive signals from the crash sensor based on the detected physical characteristic of the vehicle and process the signals to provide a control signal to the controller such that inflation of the airbag is controlled by the controller in consideration of the physical characteristic detected by the crash sensor. The crash sensor may be a crush-detecting sensor.

An airbag module may comprise a housing with which the airbag is associated, with the inflator assembly being arranged in the housing and the electronic controller being arranged in or adjacent the housing. The bus may consist of a single pair of wires.

If the module is a sensor and diagnostic module, it would monitor the controller and performs a diagnostic function of the controller. The controller can also include a power supply for enabling initiation of the inflator assembly.

In its simplest form the invention can involve a single transducer and system for providing power and receiving information. An example of such a device would be an exterior temperature monitor which is placed outside of the vehicle and receives its power and transmits its information through the windshield glass. At the other extreme, a pair of parallel wires carrying high frequency alternating current can travel to various parts of the vehicle where electric power is needed. In this case every device could be located within a few inches of this wire pair and through an appropriately designed inductive pickup system, each device receives the power for operation inductively from the wire pair. A system of this type which is designed for use in powering vehicles is described in several U.S. patents listed above.

In this case, all sensors and actuators on the vehicle could be powered by the inductive power transfer system. The communication with these devices could either be over the same system or, alternately, could be take place via RF or other similar communication system. If the communication takes place either by RF or over a modulated wire system, a protocol such as the Bluetooth or IEEE 802.11 (Wi-Fi) protocol can be used. Other options include the Ethernet and token ring protocols.

The above system technology is frequently referred to as loosely coupled inductive systems. Such systems have heretofore been used for powering a vehicle down a track or roadway but have not been used within the vehicle. The loosely coupled inductive system makes use of high frequency (typically 10,000 Hz) and resonant circuits to achieve a power transfer approaching 99 percent efficiency. The resonant system is driven using a switching amplifier. As discussed herein, this would be the first example of a high frequency power system for use within vehicles. Additionally, the inductive transfer system can be used to recharge an electric or hybrid vehicle as it sits in a garage or other location thus removing the need to physically plug the vehicle into a power source for recharging.

Every device that utilizes the loosely coupled inductive system could contain a microprocessor and thus could be considered a smart device. This can includes every light, switch, motor, transducer, sensor etc. Each device could thus have an address and could respond only to information containing its address.

It is now contemplated that the power systems for next generation automobiles and trucks will change from the current standard of 12 volts to a new standard of 42 volts. The power generator or alternator in such vehicles will produce alternating current and thus will be compatible with the system described herein wherein all power within the vehicle will be transmitted using AC.

It is contemplated that some devices will require more power than can be obtained instantaneously from the inductive, capacitive or radio frequency source. In such cases, batteries, capacitors or ultra-capacitors may be used directly associated with a particular device to handle peak power requirements. Such a system can also be used when the device is safety critical and there is a danger of disruption of the power supply during a vehicle crash, for example. In general the battery or capacitor would be charged when the device is not being powered.

4.0 Displays and Inputs to Displays

At least one invention herein is a system that permits the vehicle operator to control various vehicle systems that may be unrelated to the steering and speed control of the vehicle in such a manner that the operator does not need to take his or her eyes off of the road. This is accomplished, in a preferred embodiment, by placing a touch sensitive device in the steering wheel that is used in combination with a heads-up display system to control various vehicle systems. Generally, the heads-up display system will be turned off, that is not visible to the driver, until the driver places his hand on or near the steering wheel mounted touch device. The action of the driver to place his hand onto the device will activate the heads-up display device. This device then provides a map of the switch functions or services available on the steering wheel, for example, for the driver and elsewhere for other vehicle occupants. When the driver touches the touch pad with one finger, the location of his touch point may also be illustrated on the heads-up display as a cursor. The driver can therefore observe where his or her finger is touching the touch pad and simultaneously what function will be performed if the driver presses the steering wheel pad at that point. Then, through a combination of varying displays which are activated by choices made by the driver and implemented through finger pressure on various portions of the steering wheel mounted touch device, the driver is able to control various functions of other systems, or select various services, in the vehicle. This invention also contemplates the use of other inputs devices and systems in addition to or in place of a touch device to control the interactive heads-up display. These input devices include voice or gesture input, mouse inputs, switch inputs, joy stick inputs and others.

Further objects of the inventions disclosed herein are:

1. To provide a system for a vehicle that permits the vehicle operator to operate various vehicle systems without taking his eyes from the road.

2. To permit the vehicle operator to control the vehicle entertainment system through touching various portions of the steering wheel mounted touch device(s) and to thereby change stations or volume, as well as other functions of the entertainment system.

3. To provide a system to multiplex information created on the steering wheel and transmit that information to a control module either through wire or by wireless transmission.

4. To provide a heads-up display system for a vehicle that provides more information to the vehicle driver them heretofore possible and where the nature of the information displayed changes.

5. To provide a heads-up display that is only illuminated when it is in use.

6. To provide a heads-up display which provides a variety of uses and services and which can be easily changed from one display to another through the use of touch sensitive or other user activated devices.

7. To provide a heads-up display for a vehicle that is automatically activated to warn the driver of the vehicle of a potential problem.

8. To provide a heads-up display and touch pad or voice or gesture input system for a vehicle to permit the vehicle operator to dial a phone number on a cellular phone without taking his or her eyes from the road.

9. To provide a messaging system for a vehicle which permits the vehicle operator to receive and send messages without taking his eyes from the road.

10. To provide a touch sensitive device mounted on the steering wheel of a vehicle for controlling the contents of the heads-up display and for interaction with a personal computer.

11. To provide a heads-up display system for a motor vehicle having greater resolution and contrast than heretofore available.

12. To provide a projection system for a heads of display that utilizes a minimum space.

13. To provide a touch sensitive system for a motor vehicle that senses the finger of an occupant to activate a system; senses and displays the location of the finger to determine the selection from a group of alternatives; then senses a force from the finger to register the selection of the occupant.

14. To provide a system for a vehicle that senses the proximity of an occupant's finger to a surface of the vehicle.

15. To provide an ultrasonic system for a vehicle that senses the proximity or a force exerted by the finger of an occupant of the vehicle.

16. To provide a force sensing system for a vehicle that senses the force exerted by the finger of an occupant of the vehicle onto the sensing pad of the system.

17. To provide a capacitive system for a vehicle that senses the proximity or a force exerted by the finger of an occupant of the vehicle.

18. To provide a resistive system for a vehicle that senses the proximity or a force exerted by the finger of an occupant of the vehicle.

19. To provide an interactive heads-up display system for a vehicle.

20. To provide a heads-up display system for in-vehicle signage.

21. To provide a heads-up display system for a vehicle to be used in conjunction with assisted route guidance from an external operator.

22. To provide an interactive heads-up display system with a multi-user capability.

23. To provide a heads-up display system capable of displaying television.

24. To provide an interactive heads-up display system with internet capability.

25. To provide a directional voice canceling microphone system to allow accurate voice inputs to the system.

26. To provide an apparatus and method for locating the eyes of the occupant of a vehicle and adjusting the occupant's seat to place the occupant's eyes at the proper location for viewing a heads-up display.

27. To provide an apparatus and method for locating the mouth of the occupant and adjusting the occupant's seat to place the occupant's mouth at the proper location for operating a directional microphone.

28. To provide an apparatus and method for locating the eyes of the occupant and adjusting a heads-up display to place the occupant's eyes at the proper location for viewing the heads-up display.

29. To provide an apparatus and method for locating the mouth of the occupant and adjusting a directional microphone to place the occupant's mouth at the proper location for operating the directional microphone.

Accordingly, to achieve some of these objects, an interactive display system for a vehicle in accordance with a basic embodiment of the invention comprises a projector for projecting text and/or graphics into a field of view of a forward-facing occupant of the vehicle, i.e., heads-up display system, and an interacting system coupled to the projector for enabling the occupant to interact with the projector to change the text and/or graphics projected by the projector or direct another vehicular system to perform an operation. The interacting system may comprise a touch sensitive device arranged on a steering wheel of the vehicle (possibly a pad over a cover of an airbag module in the steering wheel) or at another location accessible to the occupant of the vehicle, e.g., on the armrest or extendible from below or within the instrument panel. A correlation system is provided, e.g., a processor and associated electrical architecture, for correlating a location on the touch device which has been touched by the occupant to the projected text and/or graphics and causing the projector to change the projected text and/or graphics based on the location on the touch device which has been touched by the occupant. Also, the vehicular system can be caused to perform the operation based on the location on the touch sensitive device that has been touched by the occupant. Alternately, the occupant can move the curser to a location on the display and then push a switch or tap on the touch device surface to indicate his or her choice. The interacting system may also comprise a microphone, joystick or any other known device which converts motion by an occupant or a part of an occupant, e.g., arm, mouth (which provides speech), eye, into an electrical signal.

Possible vehicular systems, among others, which can be operated by the combination of the projector and interacting system therewith include a communication system, navigation system, entertainment system, a microprocessor capable of providing e-mail functions and Internet access, and a heating and air-conditioning system.

The vehicle can also include a determining system for determining a desired location of the eyes of the occupant relative to the projected text and/or graphics (possibly via a determination of the position of the occupant's head and then using tables to approximate the location of the eyes) and an adjustment system coupled to a seat of the vehicle on which the occupant is situated for adjusting the seat based on the determined desired location of the eyes of the occupant to thereby move the occupant and thus the occupant's eyes and enable the occupant's view of the projected text and/or graphics to be improved. The determining system may comprise at least one receiver for receiving waves from a space above a seat in the vehicle in which the occupant is likely to be situated and for example, a pattern recognition system for determining the position of the occupant based on the waves received by the receiver(s) in order to enable the desired position of the eyes of the occupant to be determined from the position of the occupant. The determining system can also include one or more transmitters for transmitting waves into the space above a seat in the vehicle which are then received by the receiver(s) after passing at least partially through the space above the seat.

Instead of adjusting the seat, the projector can be adjusted based on the desired location of the occupant's eyes relative to the text and/or graphics. That is, an adjustment system is coupled to the projector for adjusting the projection direction based on the determined desired location of the eyes of the occupant relative to the projected text and/or graphics to thereby enable the occupant's view of the projected text and/or graphics to be improved.

The invention also encompasses a vehicle including the above-described determining system, adjustment system and projector with the interacting system being an optional modification. In this case, the projector and/or seat would be adjusted to ensure that the eyes of the occupant are in the eye-ellipse and thereby provide optimum viewing of the text and/or graphics projected by the projector.

Instead of or in addition to a touch sensitive device, the interacting system may comprise a microphone. To optimize the reception of the voice of the occupant by the microphone, the vehicle can include a determining system for determining a probable location of the mouth of the occupant, and an adjustment system for adjusting the sensitive direction of the microphone to aim the microphone toward the probable location of the mouth of the occupant. Instead of adjusting the microphone, the vehicle can include an adjustment system for adjusting a seat on which the occupant is situated to decrease the difference between the sensitive direction of the microphone and the probable location of the mouth of the occupant.

The invention also encompasses a vehicle including the above-described determining system, adjustment system and projector with the interacting system being an optional modification. In this case, the projector and/or seat would be adjusted to ensure that the mouth of the occupant is positioned optimally relative to the sensitive direction of the microphone to thereby provide optimum reception of the occupant's voice by the microphone.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the systems developed or adapted using the teachings of these inventions and are not meant to limit the scope of the invention as encompassed by the claims.

FIG. 17A is a detailed perspective view of a polymer and mass on SAW accelerometer for use in crash sensors, vehicle navigation, etc.

FIG. 17B is a detailed perspective view of a normal mass on SAW accelerometer for use in crash sensors, vehicle navigation, etc.

FIG. 18 is a view of a prior art SAW gyroscope that can be used with this invention.

FIGS. 19A, 19B and 19C are a block diagrams of three interrogators that can be used with this invention to interrogate several different devices.

FIG. 66 is a schematic of another embodiment of the invention for detecting problems with a tire.

FIG. 67 is a table showing temperatures for the different circumferential locations of the tire shown in FIG. 63.

FIG. 68 is an idealized schematic showing a system in accordance with the present invention using load cell transducers.

FIG. 80A is a planar cross section view with parts cutaway and removed of the load cell of FIG. 80 shown mounted onto the vehicle floor-pan and attached to the fuel tank.

FIG. 81 is a perspective view of a torsional beam load cell for use with the fuel gage system of this invention.

FIG. 81A is a planar cross section view with parts cutaway and removed of the load cell of FIG. 81 shown mounted onto the vehicle floor-pan and attached to the fuel tank.

FIG. 82 is a perspective view with portions cut away of an automobile fuel tank supported by one load cell, located at the approximate center of gravity of the fuel tank when full, shown before attachment to the tank and using one analog to digital converter shown schematically with additional lateral supports for the fuel tank.

FIG. 83 is a perspective view with portions cut away of an automobile fuel tank with a conventional float and variable resistor mechanism used in combination with pitch and roll angle measuring transducers and associated analog to digital converters and associated electronic circuitry.

FIG. 84 is a perspective view with portions cut away of an automobile fuel tank with a rod-in-tube capacitive fuel level measuring device used in combination with pitch and roll angle measuring transducers and associated analog to digital converters and electronic circuitry shown schematically.

FIG. 84A is a cross-section view with portions cutaway and removed of the rod-in-tube capacitor fuel level measuring device of FIG. 84.

FIG. 85 is a perspective view with portions cut away of an automobile fuel tank with a parallel plate capacitive fuel level measuring device, where the plates are integral with the top and bottom of the fuel tank, used in combination with pitch and roll angle measuring transducers and associated analog to digital converters and electronic circuitry shown schematically.

FIG. 85A is a circuit diagram showing the capacitance circuit between the plates of the capacitor of FIG. 85 illustrating a source of errors caused by a shunt capacitance to the earth.

FIG. 86 is a perspective view with portions cut away of an automobile fuel tank with an ultrasonic fuel level measuring device located at the bottom of the tank, used in combination with pitch and roll angle measuring transducers and associated analog to digital converters and electronic circuitry shown schematically.

FIG. 86A is similar to FIG. 86 but includes a plurality of ultrasonic transducers FIG. 87 is a partial cutaway view of a section of a fluid reservoir with a SAW fluid pressure and temperature sensor for monitoring fuel, oil, water or other fluid pressure.

FIG. 88 is a perspective view with portions cutaway of a SAW-based vehicle fuel gage.

Figure 88:
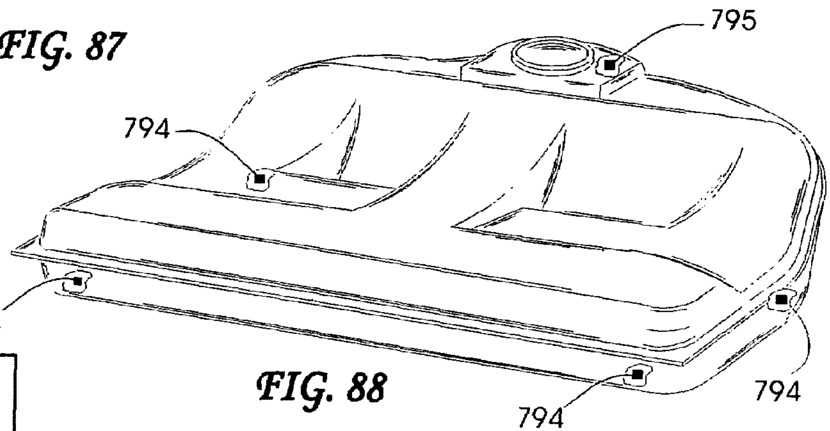
Figure 88A:
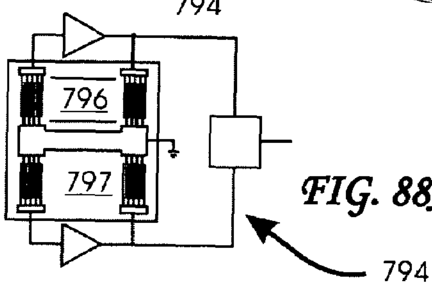

FIG. 88A is a top detailed view of a SAW pressure and temperature monitor for use in the system of FIG. 88.

Figure 89:
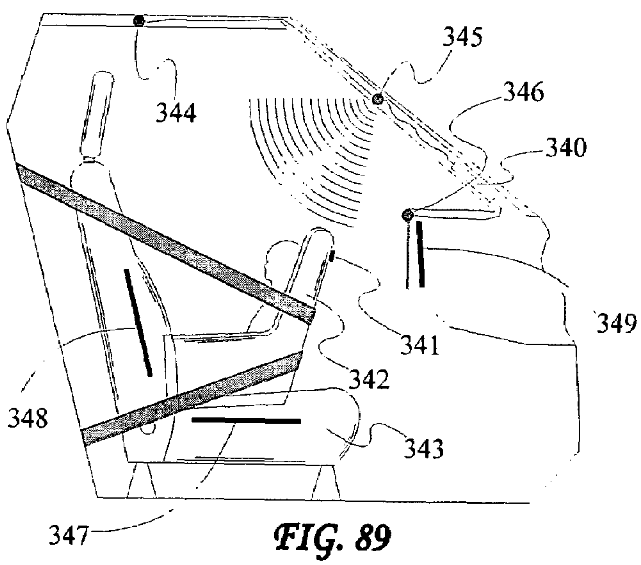

FIG. 89 is a side view with parts cutaway and removed of a vehicle showing the passenger compartment containing a rear facing child seat on the front passenger seat and a preferred mounting location for an occupant and rear facing child seat presence detector.

Figure 90:
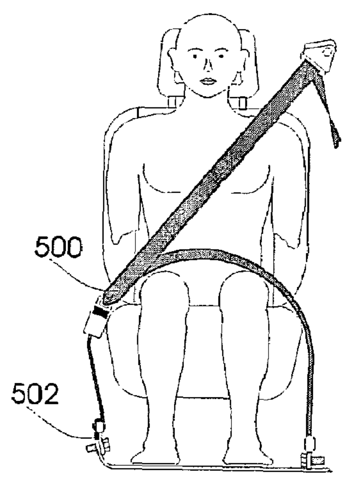

FIG. 90 is a partial cutaway view of a vehicle driver wearing a seatbelt with SAW force sensors.

Figure 91:
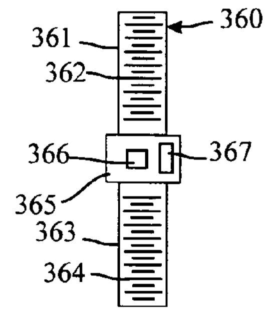

FIG. 91 illustrates a strain gage on a bolt weight sensor.

FIGS. 92A, 92B, 92C, 92D and 92E are views of occupant seat weight sensors using a slot spanning SAW strain gage and other strain concentrating designs.

Figure 93:
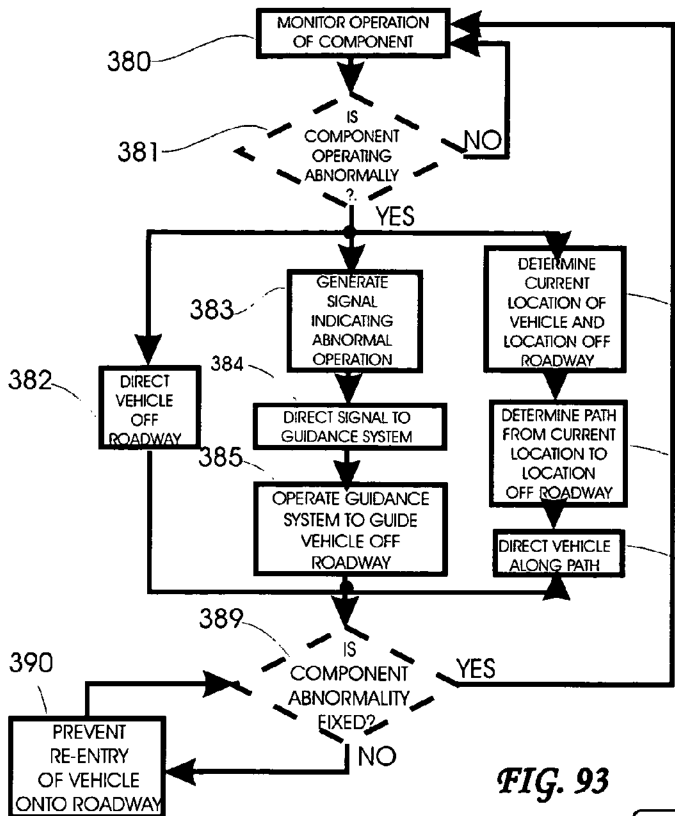

FIG. 93 is a flow chart of the methods for automatically monitoring a vehicular component in accordance with the invention.

Figure 94:
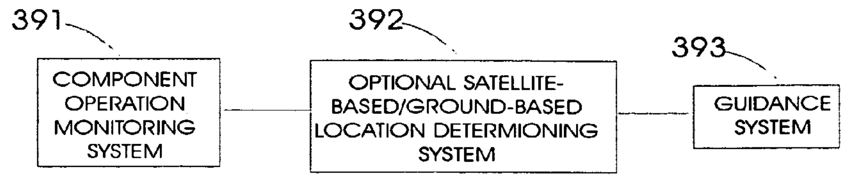

FIG. 94 is a schematic illustration of the components used in the methods for automatically monitoring a vehicular component.

Figure 95:
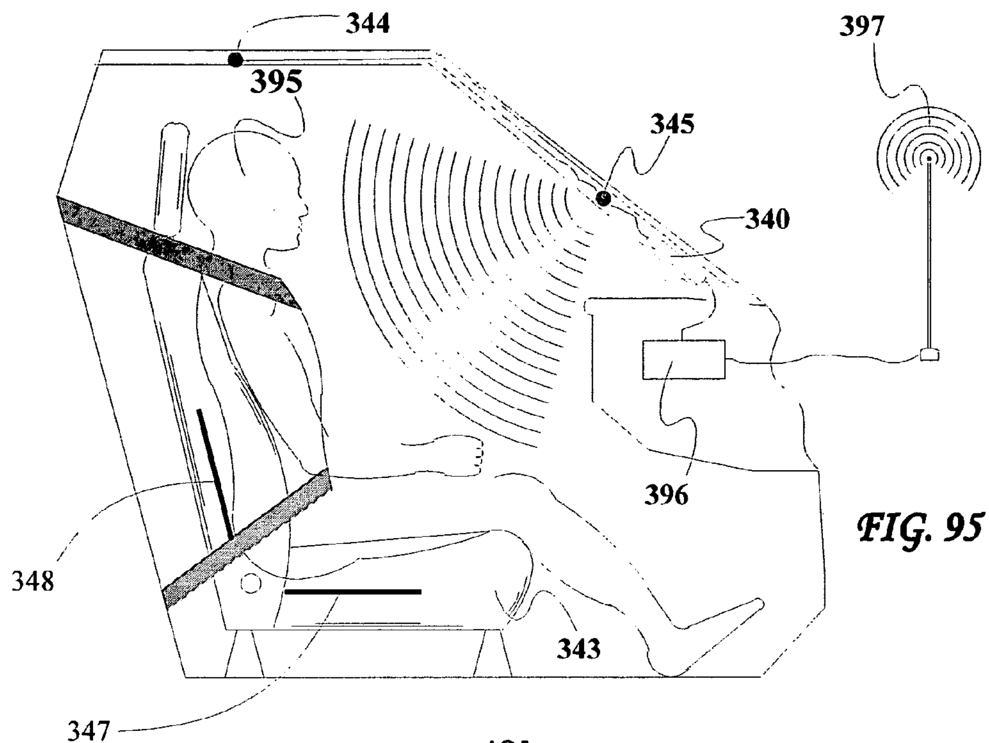

FIG. 95 is a side view with parts cutaway and removed showing schematically the interface between the vehicle interior monitoring system of this invention and the vehicle cellular communication system.

Figure 96:
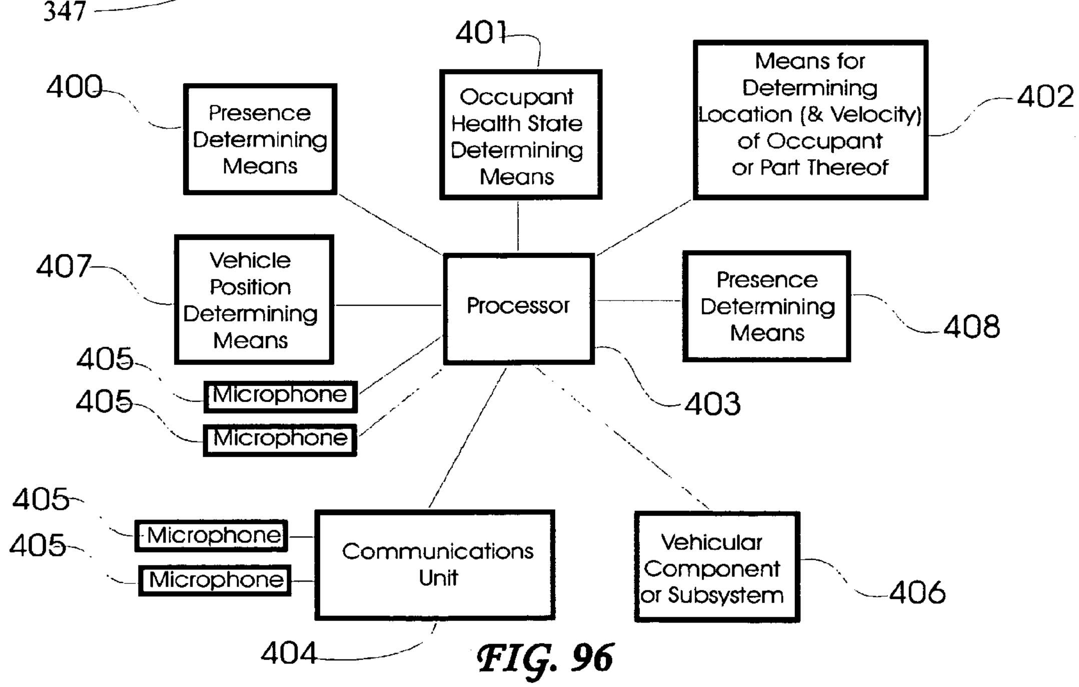

FIG. 96 is a diagram of one exemplifying embodiment of the invention.

Figure 97:
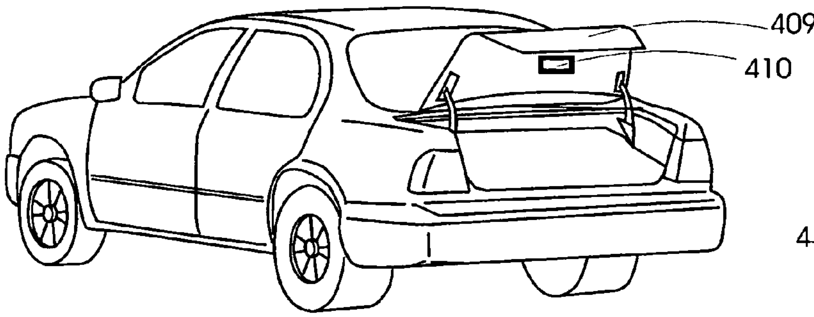

FIG. 97 is a perspective view of a carbon dioxide SAW sensor for mounting in the trunk lid for monitoring the inside of the trunk for detecting trapped children or animals.

Figure 97A:
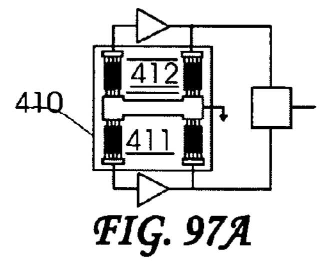

FIG. 97A is a detailed view of the SAW carbon dioxide sensor of FIG. 97.

Figure 98:
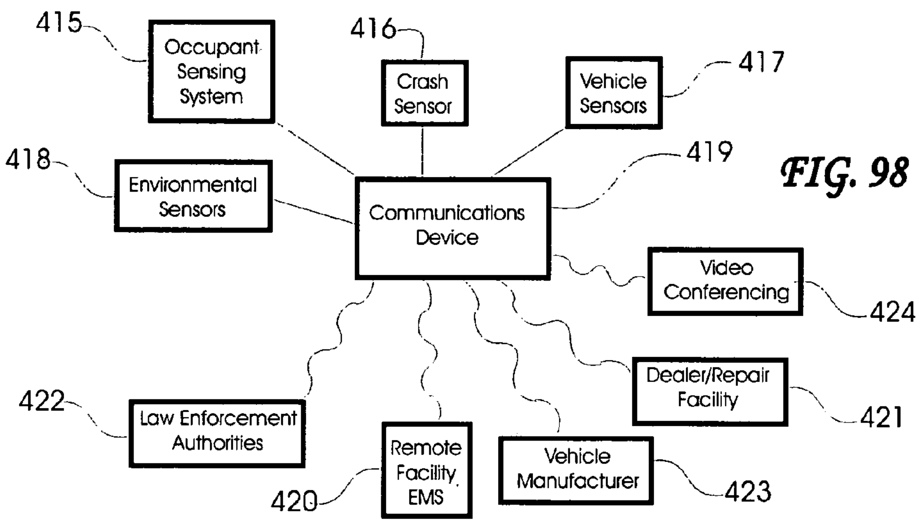

FIG. 98 is a schematic view of overall telematics system in accordance with the invention.

Figure 99:
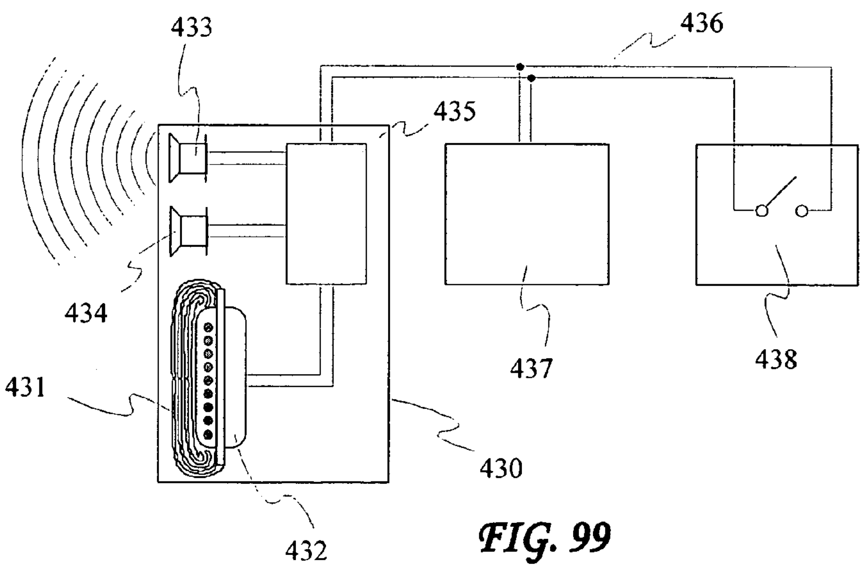

FIG. 99 is a perspective view of the combination of an occupant position sensor, diagnostic electronics and power supply and airbag module designed to prevent the deployment of the airbag if the seat is unoccupied.

Figure 100:
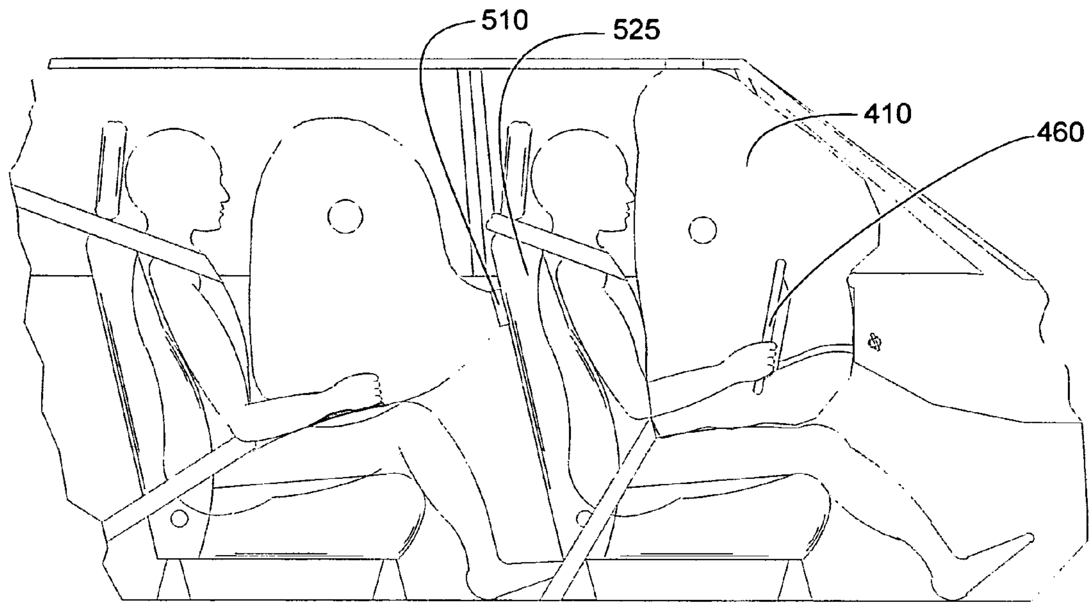

FIG. 100 shows the application of a preferred implementation of the invention for mounting on the rear of front seats to provide protection for rear seat occupants.

Figure 101:
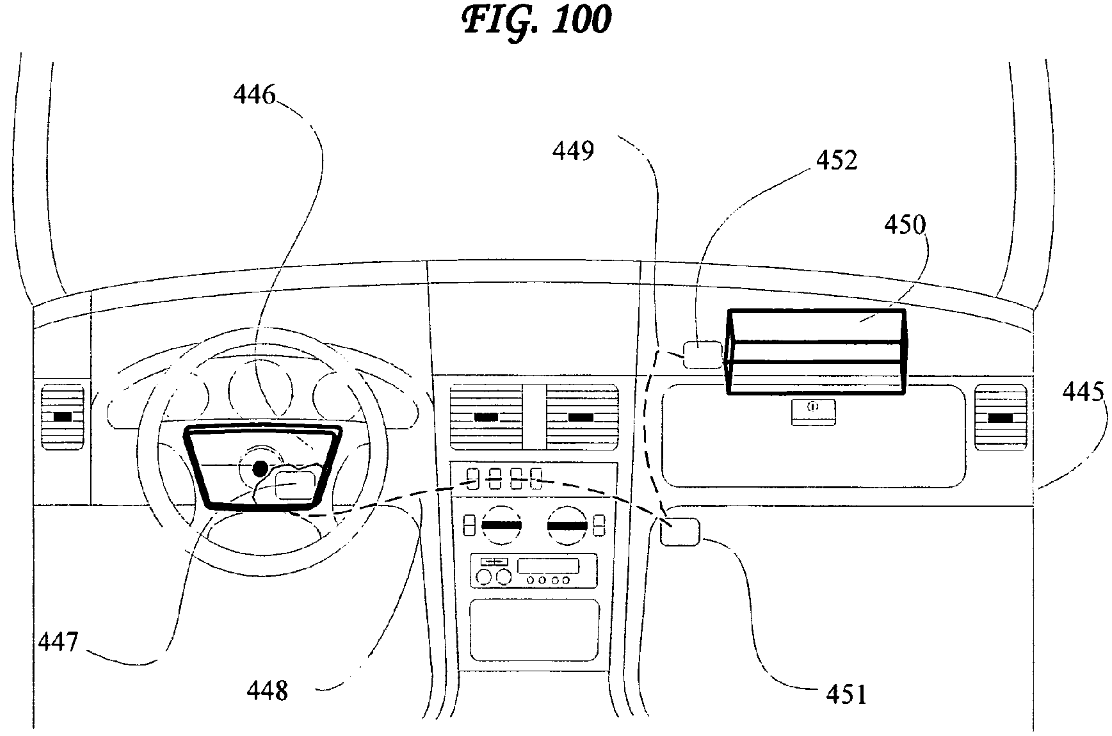

FIG. 101 is another implementation of the invention incorporating the electronic components into and adjacent the airbag module.

FIGS. 102A, 102B, 102C and 102D are different views of an automotive connector for use with a coaxial electrical bus for a motor vehicle illustrating the teachings of this invention.

Figure 103:
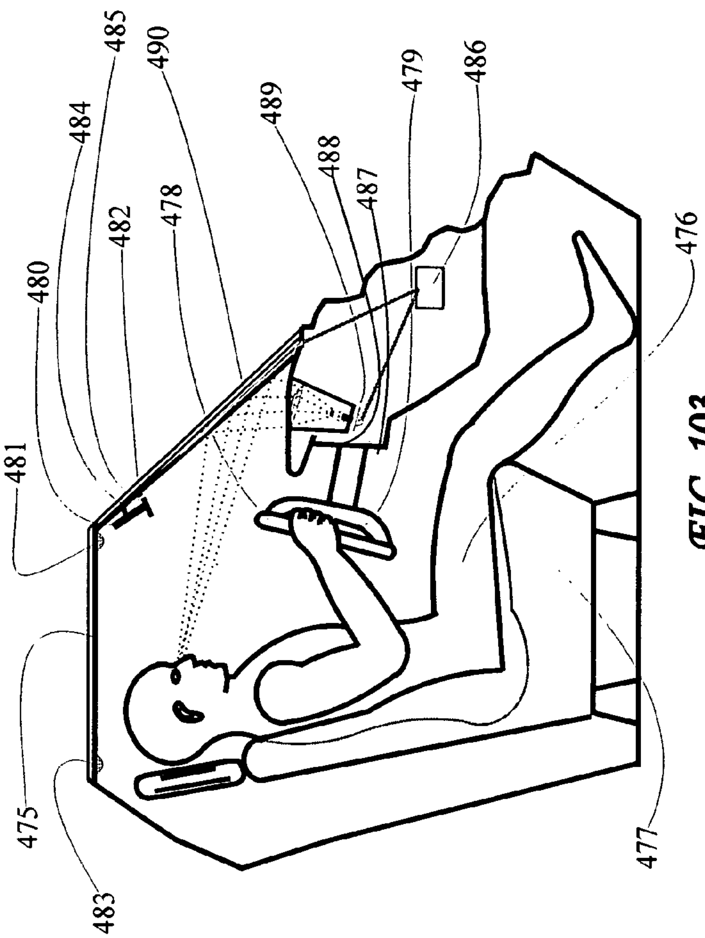
Figure 102A:
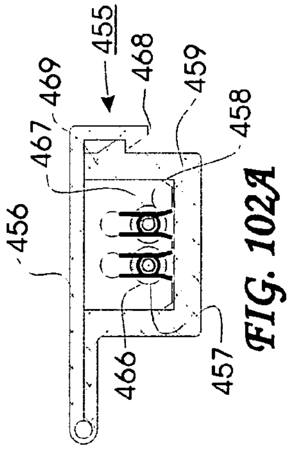
Figure 102D:
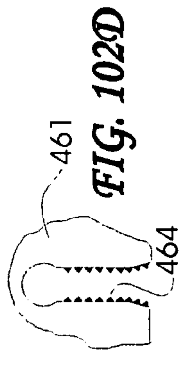
Figure 102B:
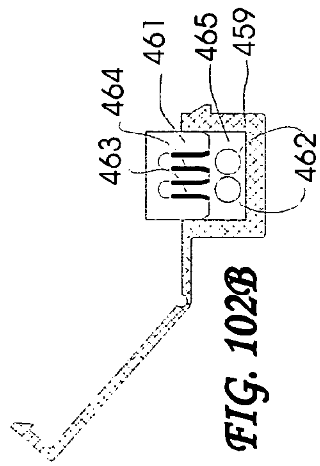
Figure 102C:
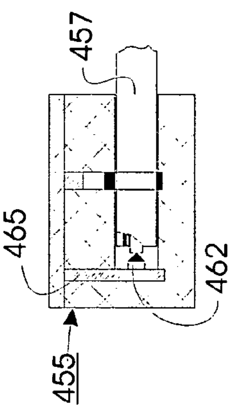

FIG. 103 is a cross section view of a vehicle with heads-up display and steering wheel having a touch pad.

Figure 104:
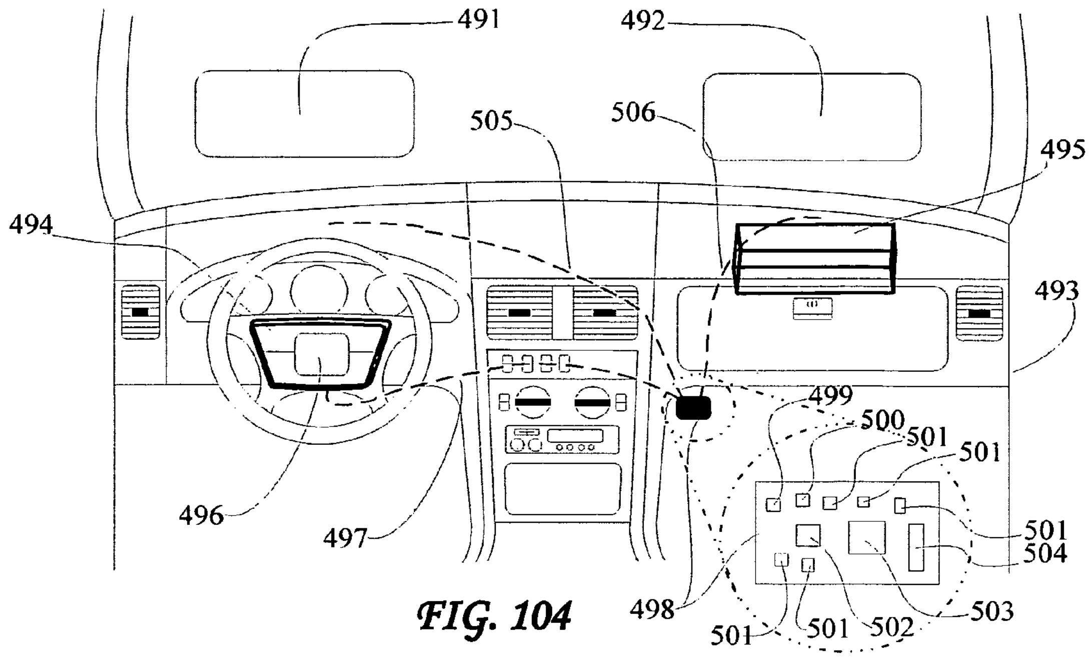

FIG. 104 is a view of the front of a passenger compartment of an automobile with portions cut away and removed showing driver and passenger heads-up displays and a steering wheel mounted touch pad.

Figure 105A:
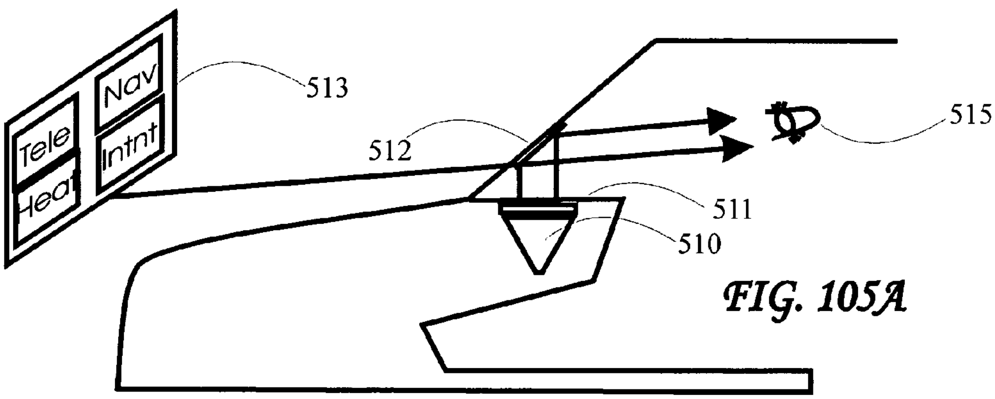

FIG. 105A is a view of a heads-up display shown on a windshield but seen by a driver projected in front of the windshield.

FIGS. 105B–105G show various representative interactive displays that can be projected on to the heads-up display.

Figure 106:
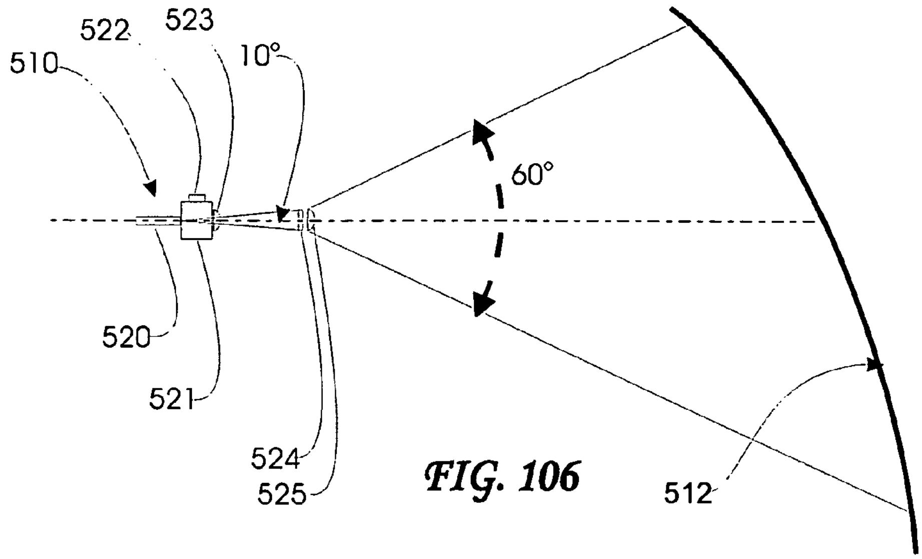

FIG. 106 is a diagram of advantages of small heads-up display projection screen such as described in U.S. Pat. No. 05,473,466.

Figure 107:
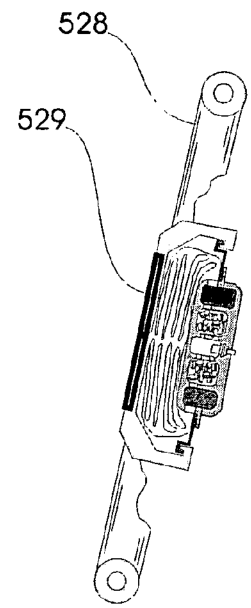

FIG. 107 is a cross section view of an airbag-equipped steering wheel showing a touch pad.

Figure 108A:
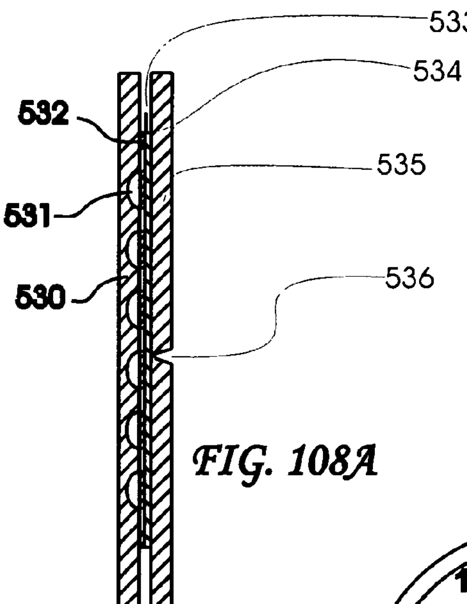
Figure 108:
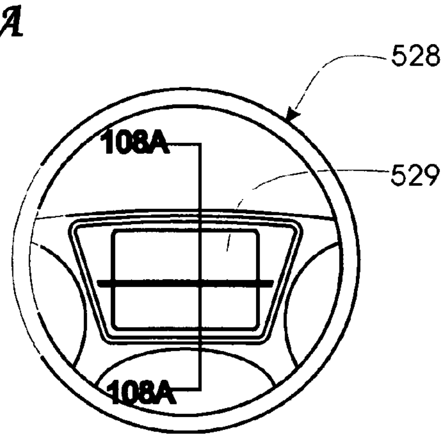

FIG. 108 is a front view of a steering wheel having a touch pad arranged in connection therewith.

FIG. 108A is a cross sectional view of the steering wheel shown in FIG. 108 taken along the line 108A—108A of FIG. 108.

Figure 109A:
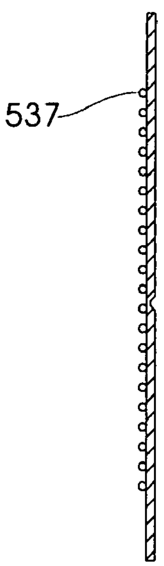
Figure 109:
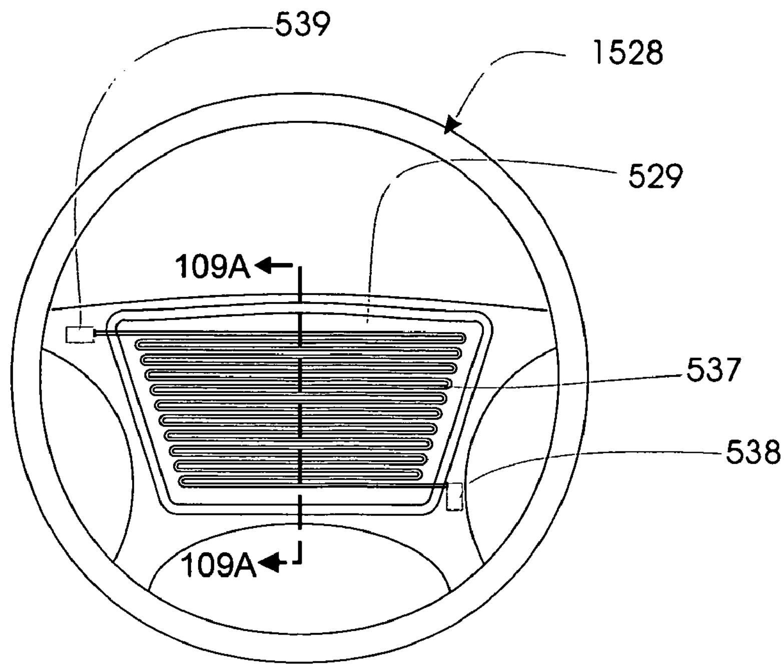

FIG. 109 is a front view of an ultrasound-in-a-tube touch pad arranged in connection with a steering wheel.

FIG. 109A is a cross sectional view of the steering wheel shown in FIG. 109 taken along the line 109A—109A of FIG. 109.

Figure 110:
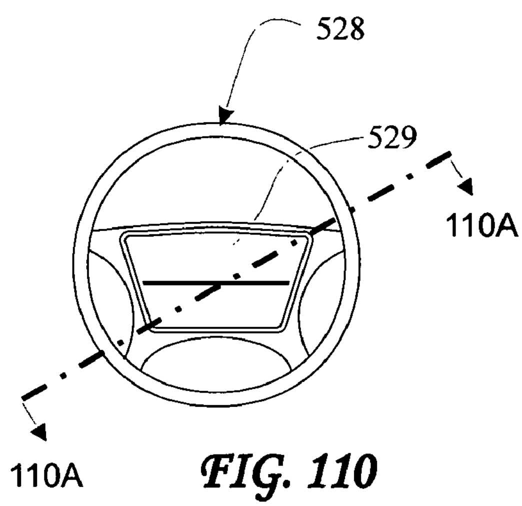

FIG. 110 is a front view of a force sensitive touch pad arranged in connection with a steering wheel.

Figure 110A:
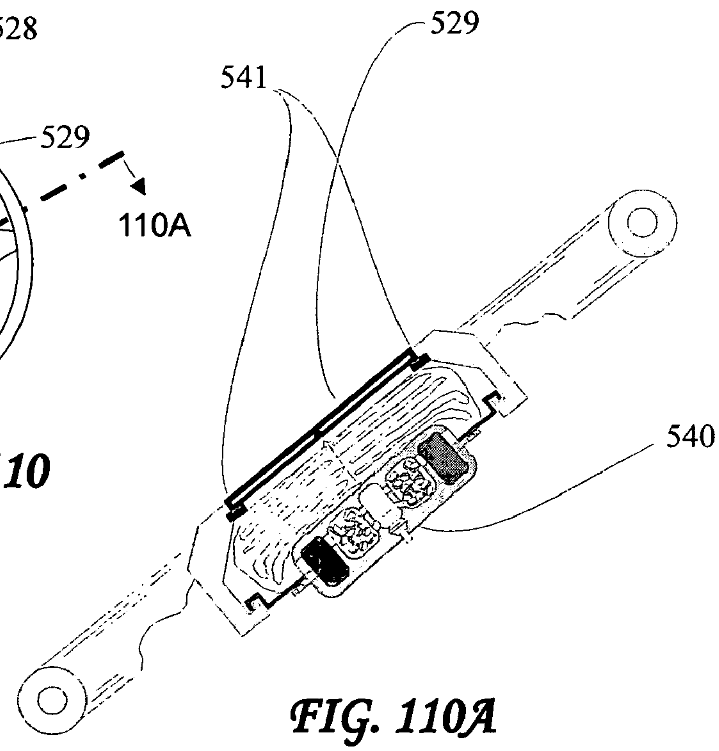

FIG. 110A is a cross sectional view of the steering wheel shown in FIG. 110 taken along the line 110A—110A of FIG. 110.

Figure 111A:
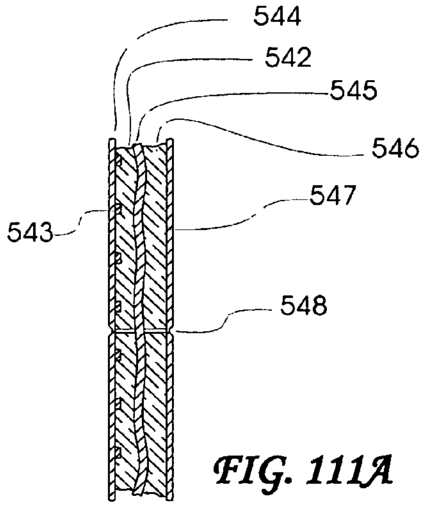
Figure 111:
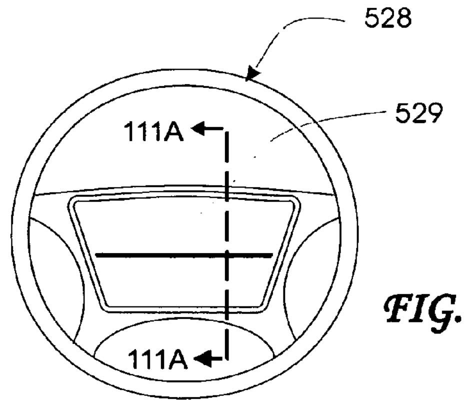

FIG. 111 is a front view of a capacitance touch pad arranged in connection with a steering wheel.

FIG. 111A is part of a cross sectional view of the steering wheel shown in FIG. 101 taken along the line 111A—111A of FIG. 101.

Figure 112A:
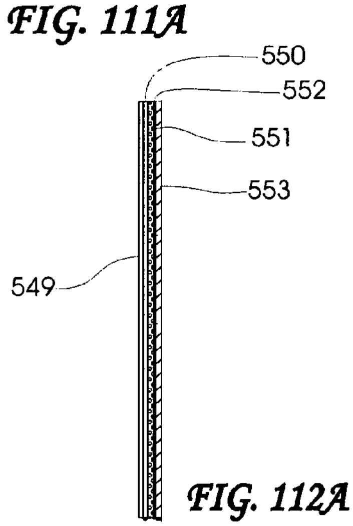
Figure 112:
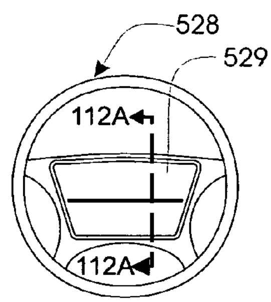

FIG. 112 is a front view of a resistance touch pad arranged in connection with a steering wheel.

FIG. 112A is a cross sectional view of the steering wheel shown in FIG. 112 taken along the line 112A—112A of FIG. 112.

Figure 113A:
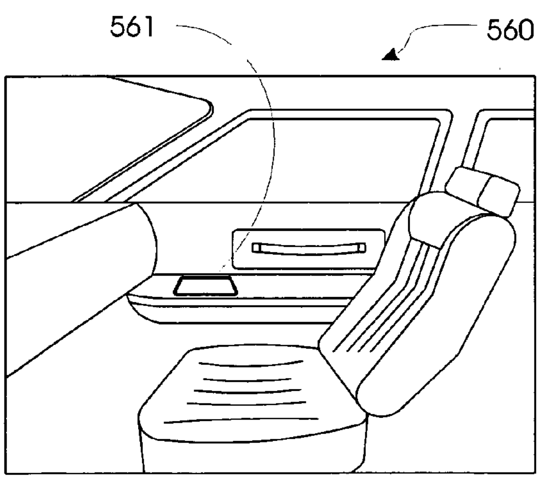
Figure 113B:
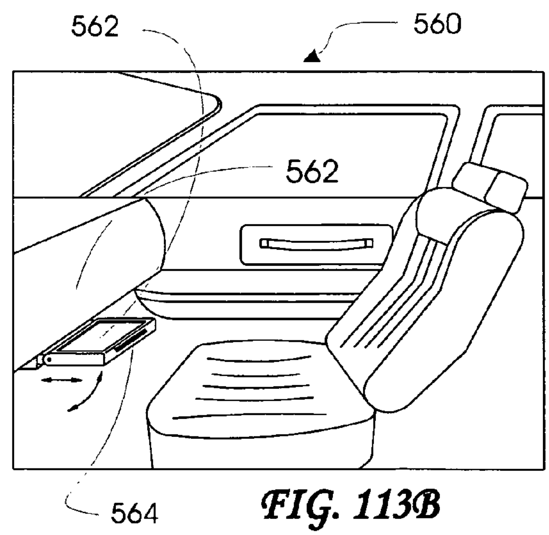

FIG. 113A and FIG. 113B show other interior surfaces where touch pads can be placed such as on the armrest (FIG. 113A) or projecting out of the instrument panel (FIG. 113B).

Figure 114:
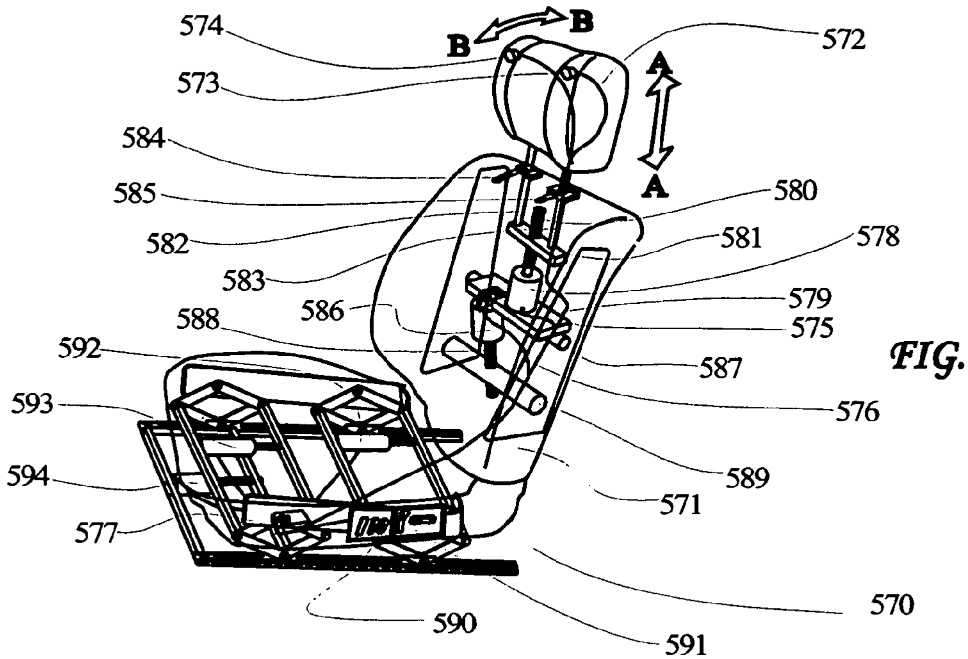

FIG. 114 is a perspective view of an automatic seat adjustment system, with the seat shown in phantom, with a movable headrest and sensors for measuring the height of the occupant from the vehicle seat showing motors for moving the seat and a control circuit connected to the sensors and motors.

Figure 115:
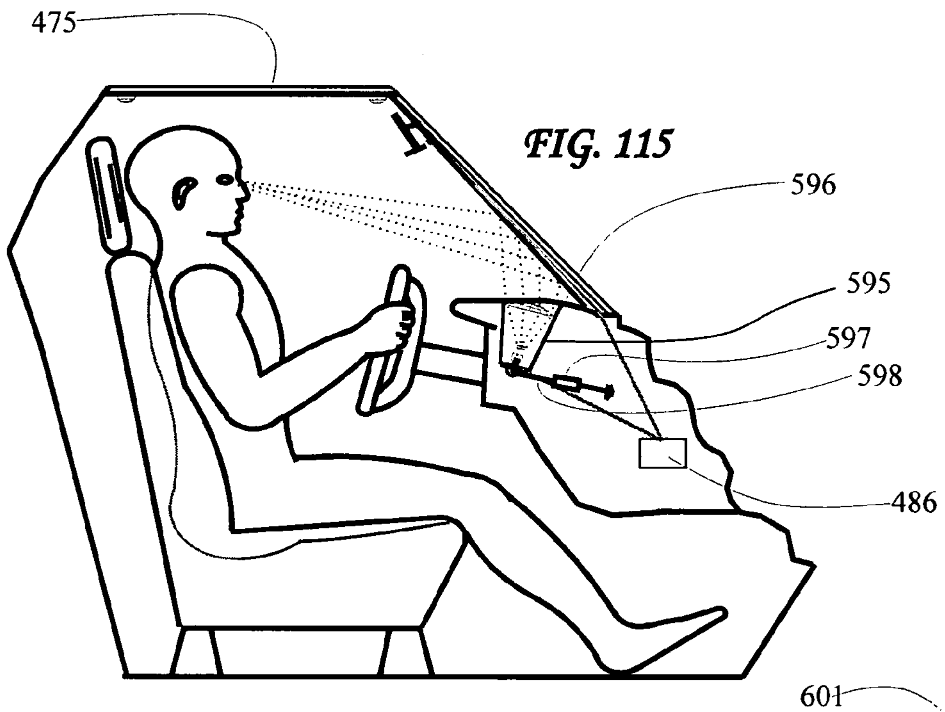

FIG. 115 illustrates how the adjustment of heads-up display can be done automatically.

Figure 116:
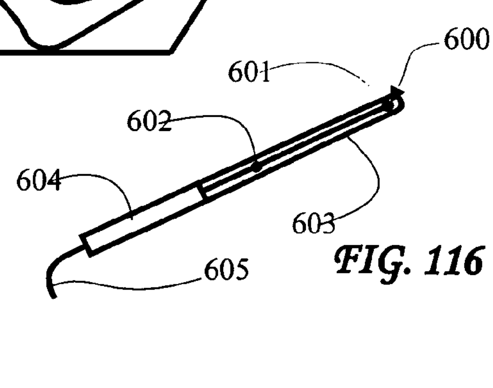

FIG. 116 is a view of a directional microphone.

Figure 117:
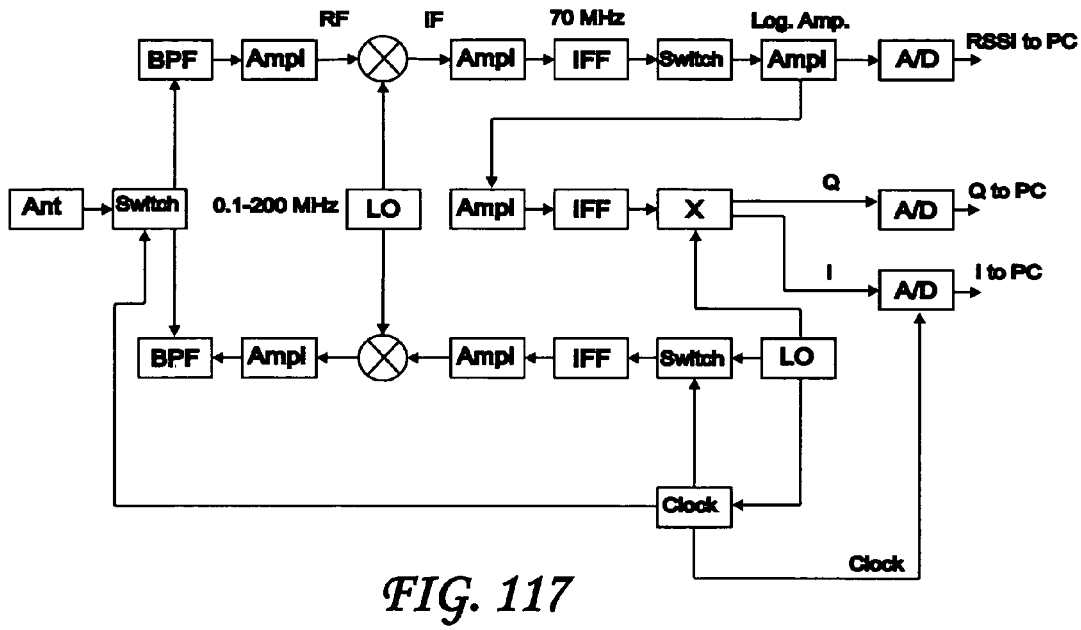

FIG. 117 is a design of a pulse radar utilizing a heterodyne receiver architecture with IF stage and a limiter amplifier with the radio signal strength indicator output.

Figure 118:
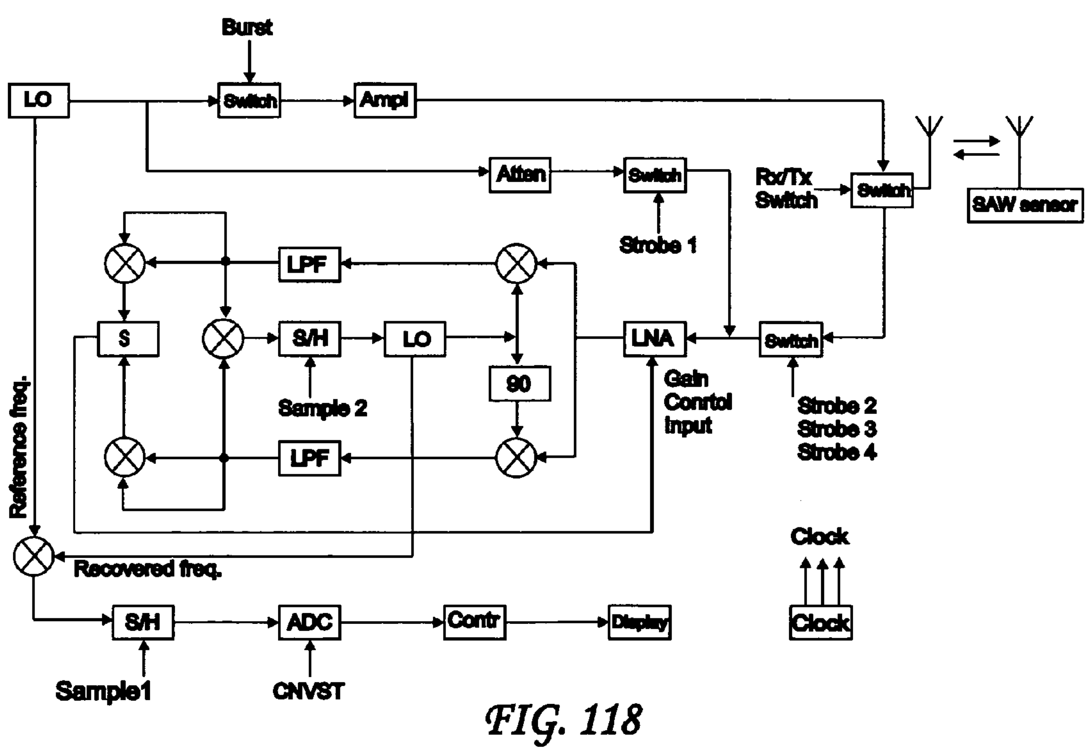

FIG. 118 is the SAW TPM System configuration developed at Stage 1 POC.

Figure 119:
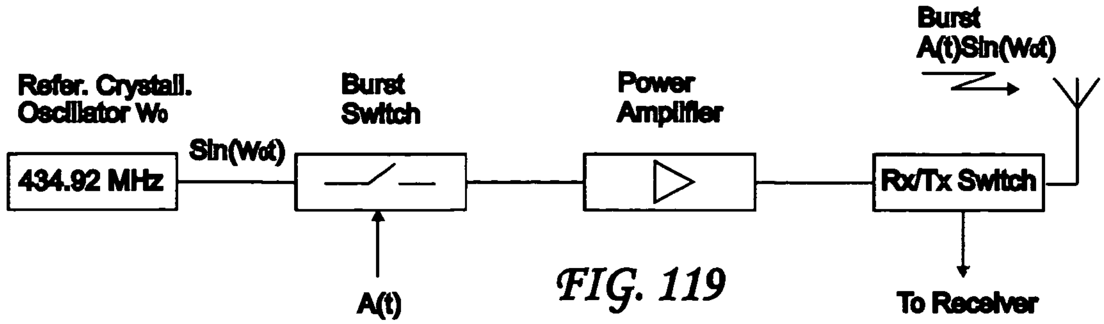

FIG. 119 is a circuit diagram of the transmitter part of the circuit diagram of FIG. 118.

Figure 120:
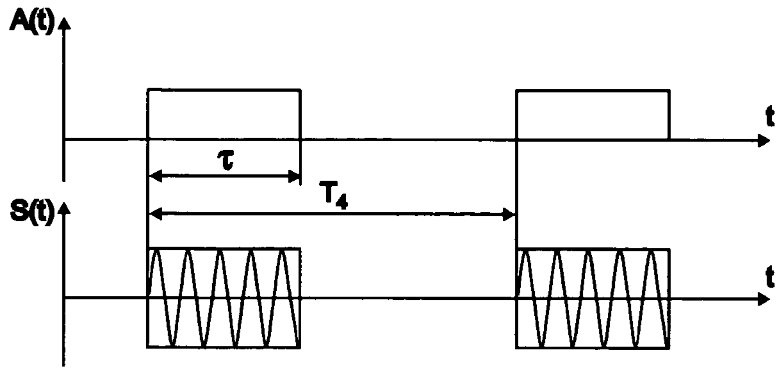

FIG. 120 shows a sequence of rectangular RF pulses S(t) with duration $\tau$, which follow with period $T_4$.

Figure 121:
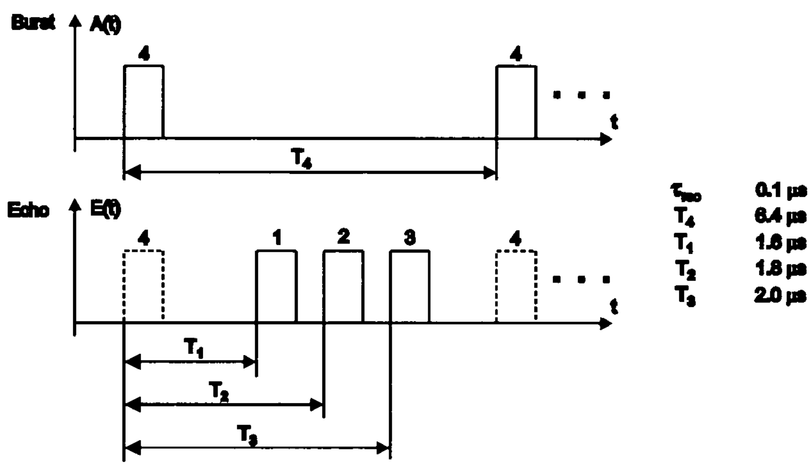

FIG. 121 shows a sequence of retransmitted echo RF pulses from SAW sensor.

Figure 122:
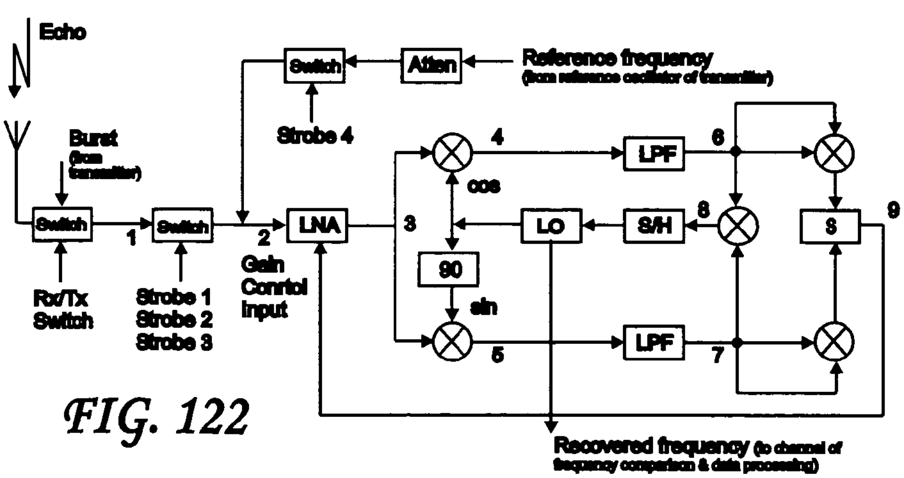

FIG. 122 is a block diagram of the interrogator's receiver RF signal processing unit.

Figure 123:
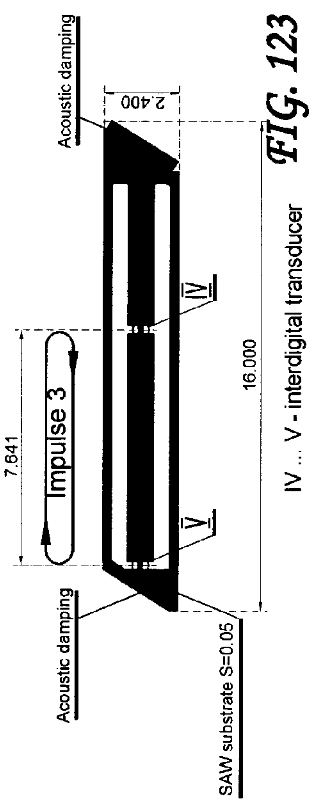

FIG. 123 shows the SAW substrate of the pressure sensor.

Figure 124:
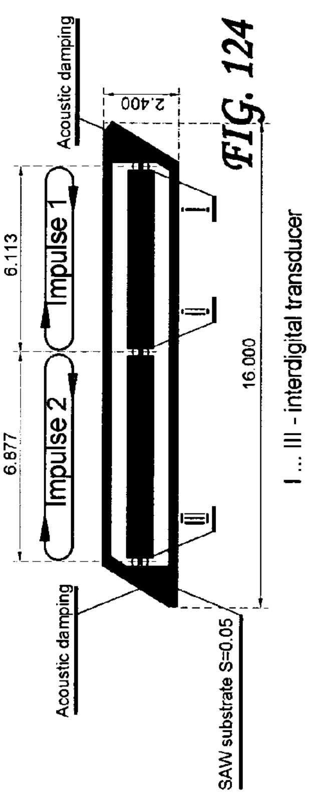

FIG. 124 shows the SAW substrate of the temperature sensor.

Figure 125:
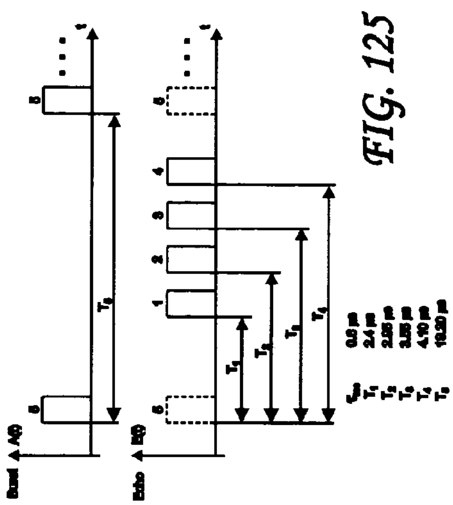

FIG. 125 shows a diagram of the SAW sensor four-pulse echo.

Figure 126:
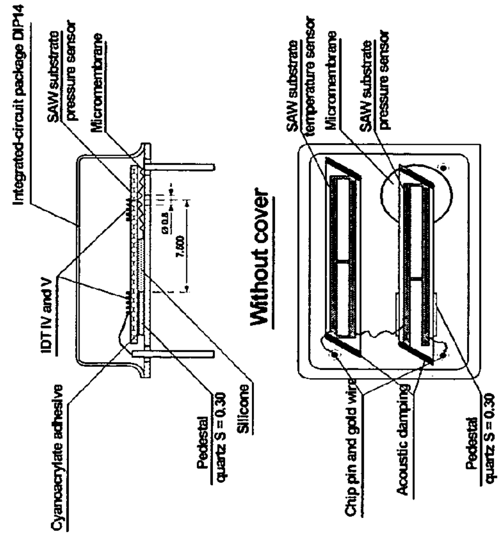

FIG. 126 illustrates a design of the double substrate SAW sensor.

Figure 127:
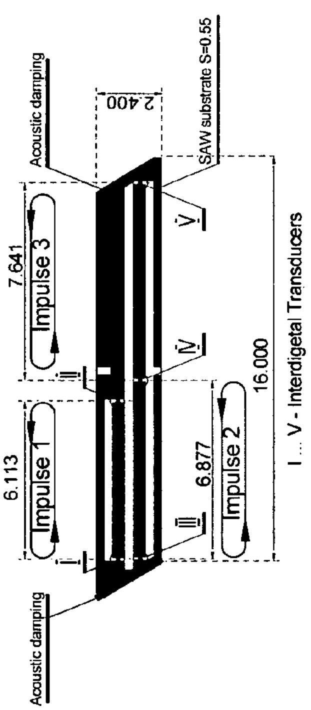

FIG. 127 illustrates a design of a single substrate SAW sensor.

Figure 128:
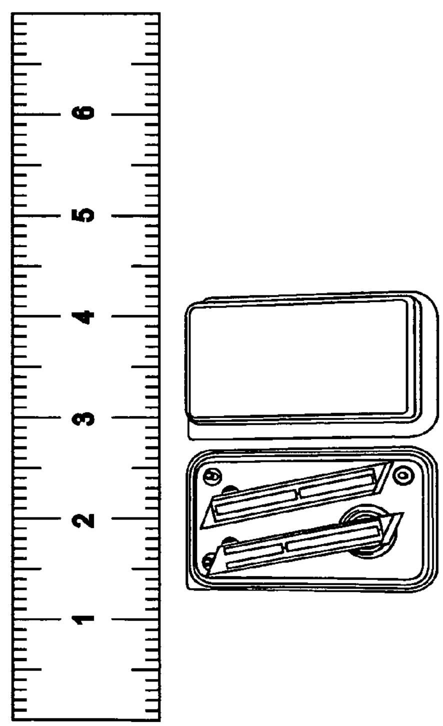

FIG. 128 is a picture of the interior of a double substrate SAW sensor.

Figure 129:
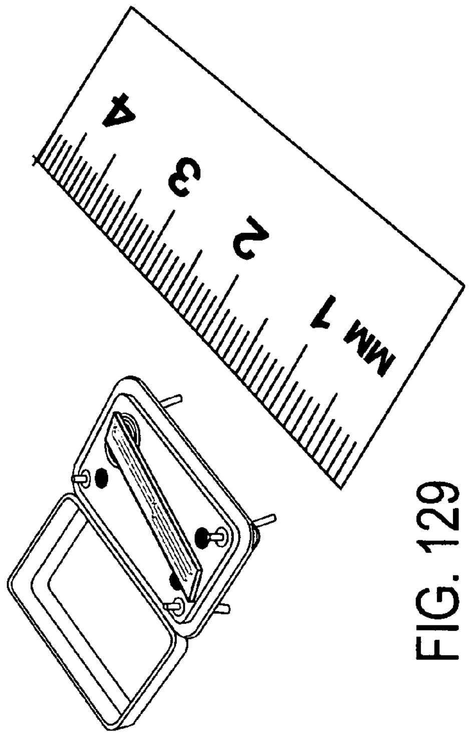

FIG. 129 is a picture of the interior of a single substrate SAW sensor.

Figure 130:
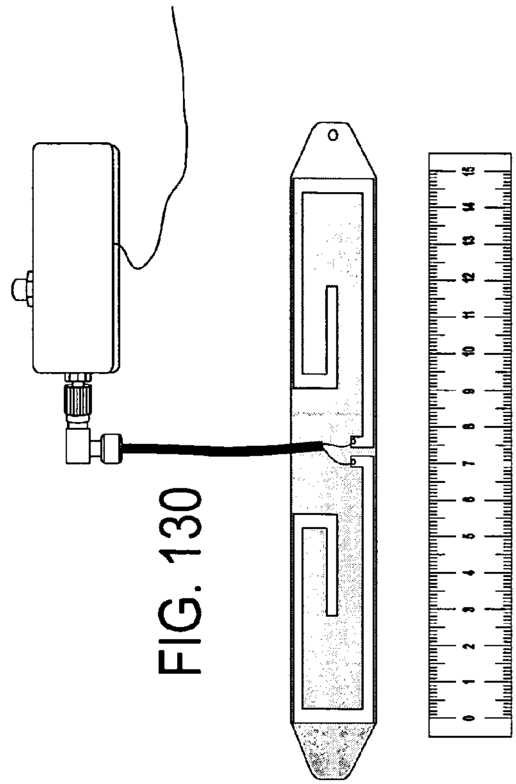

FIG. 130 is a picture of the transmitter module and the modified dipole antenna.

FIG. 131 is an oscilloscope trace of the transmitter's output RF pulses.

FIG. 132 shows oscilloscope traces of the strobe pulse time positions (down traces).

FIG. 133 is an oscilloscope trace of the strobe pulse time positions in a compressed time scale.

FIG. 134 is a picture illustrating a whip sensor antenna installed on the wheel.

FIG. 135 is a picture of a diagram of whip antenna impedance at 434 MHz.

Figure 136:
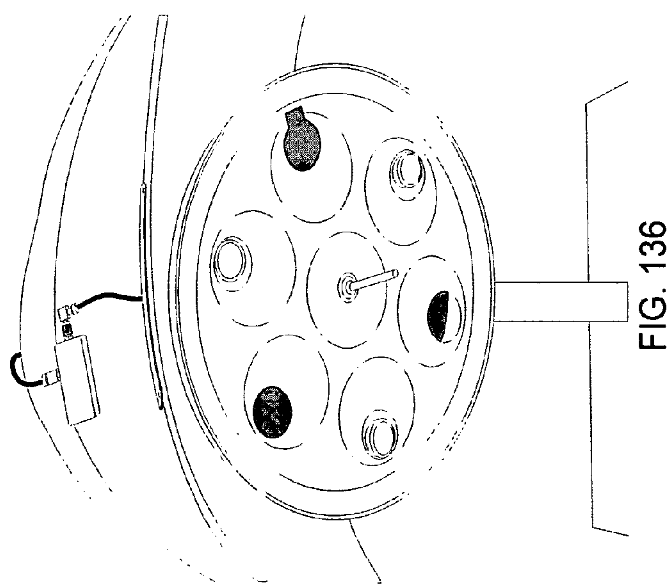

FIG. 136 is a picture of RF units of an interrogator installed on lab simulator.

Figure 137:
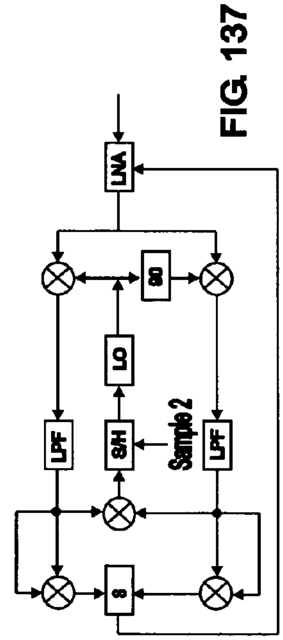

FIG. 137 is a block diagram of the quadrature demodulator.

Figure 138:
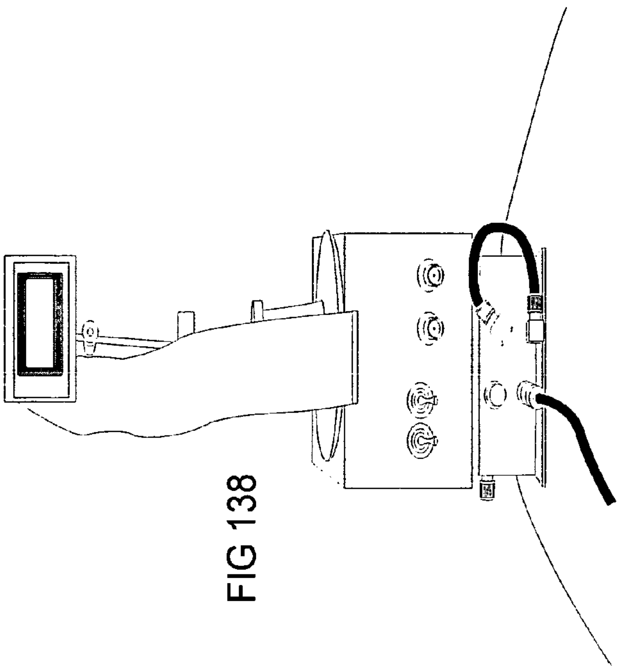

FIG. 138 is a picture of a SAW TPM interrogator.

Figure 139:
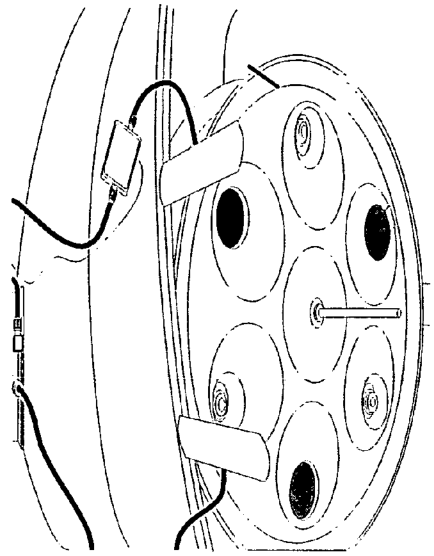

FIG. 139 is a picture of a SAW TPM Antenna System.

Figure 140:
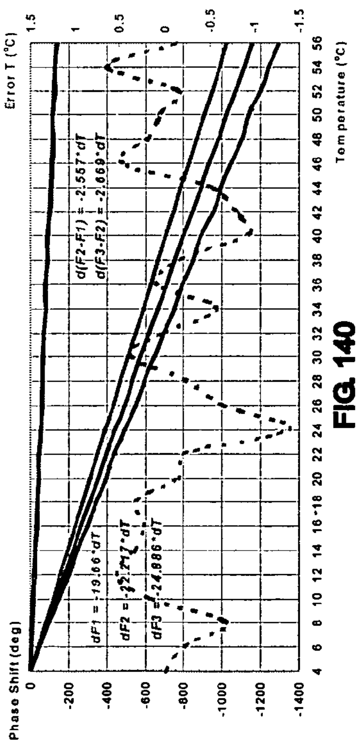

FIG. 140 is a plot of typical temperature sensitivities of the developed sensors under constant pressure.

Figure 141:
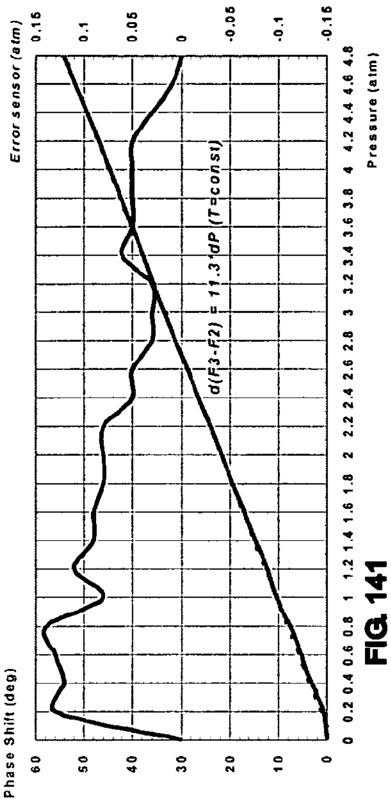

FIG. 141 is a plot of typical pressure sensitivities of the developed sensors under constant temperature.

Figure 142:
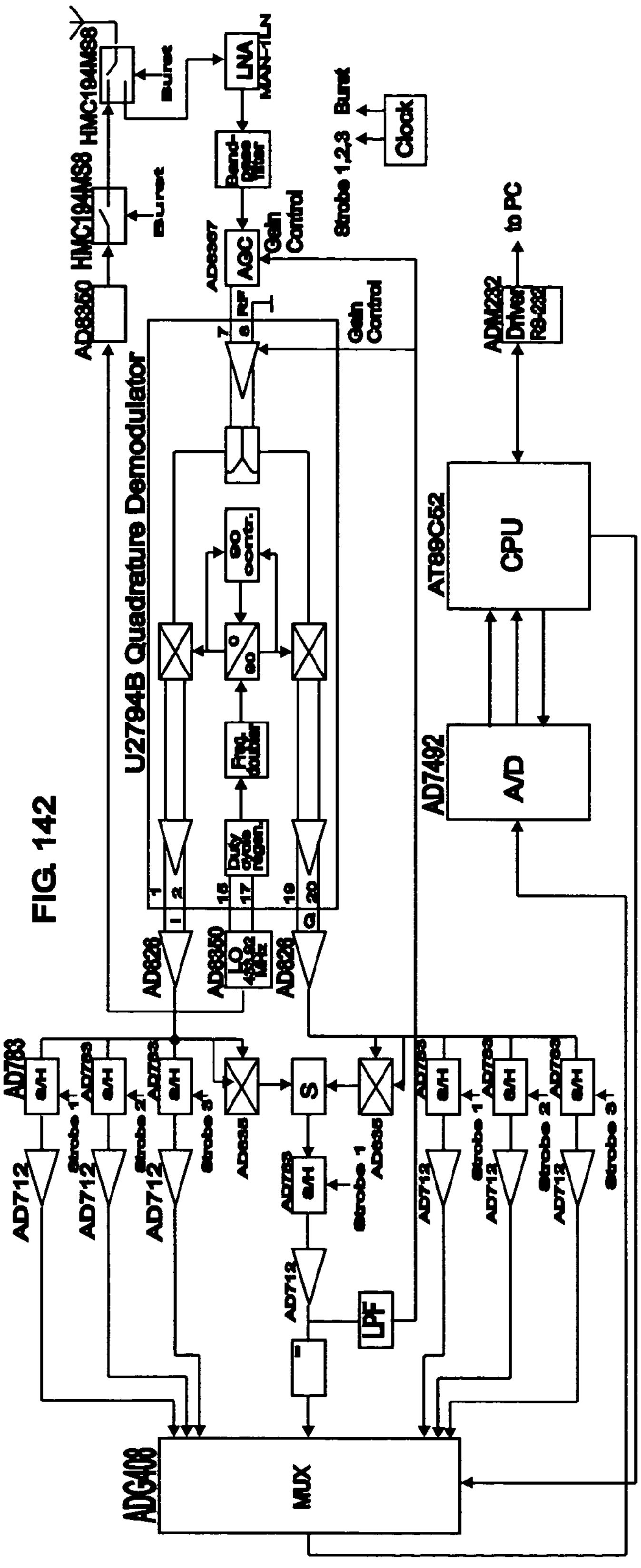

FIG. 142 is a block diagram of the Interrogator based on single shot readings.

Figure 143:
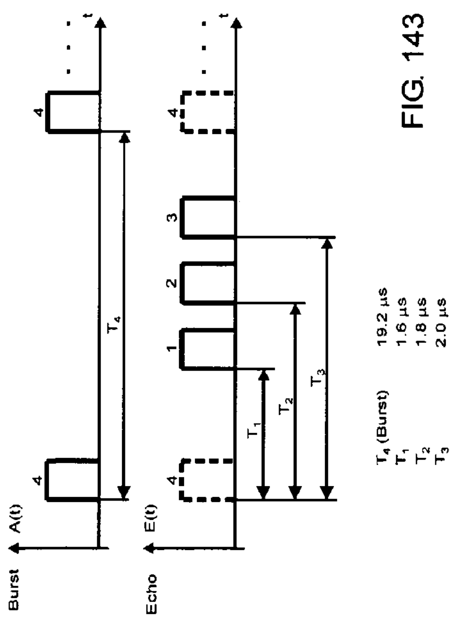

FIG. 143 is a plot of the echo of the sensor in the single shot readings protocol.

Figure 144:
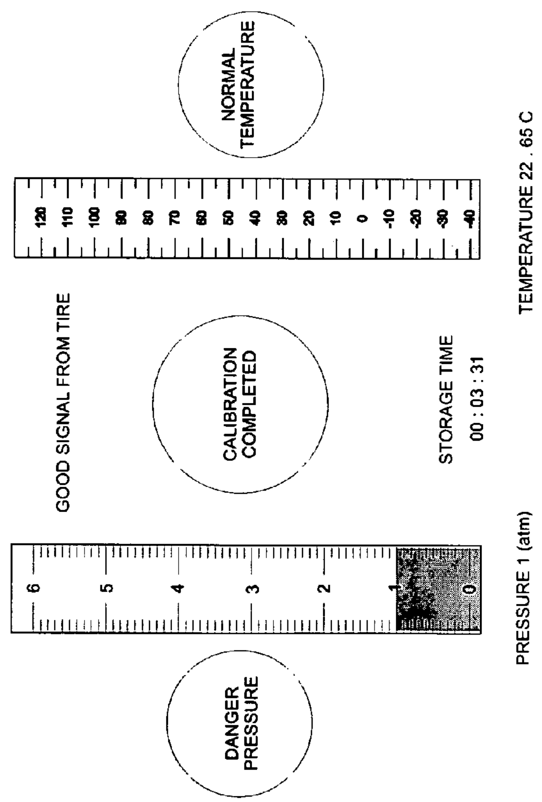

FIG. 144 is a picture of a PC screen showing a preferred display for the vehicle operator.

Figure 145:
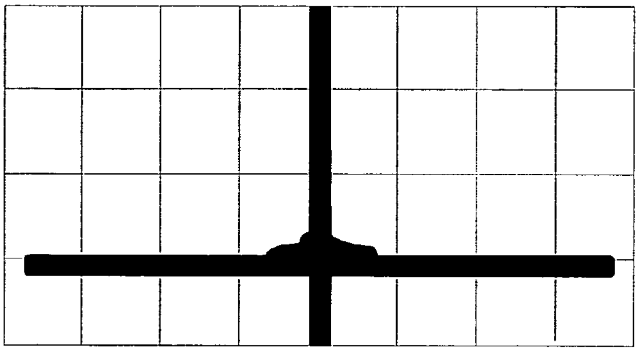

FIG. 145 is a picture of an oscilloscope trace of an RF burst on the transmitter output Time scale: 500 ns/div.

Figure 146:
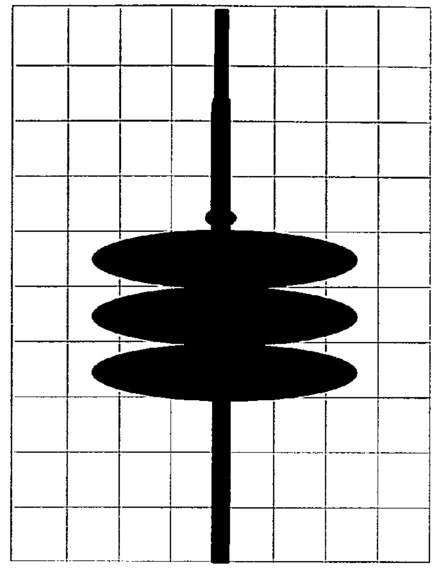

FIG. 146 is a picture of an oscilloscope trace of an RF SAW sensor echo. Time scale: 200 ns/div.

Figure 147:
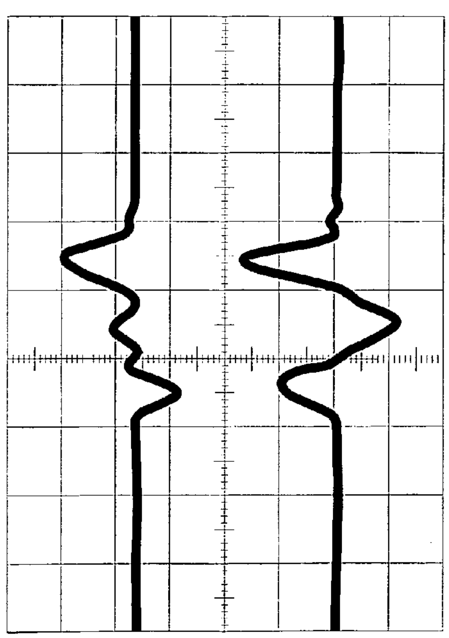

FIG. 147 is a picture of an oscilloscope trace of the I (above) and Q (below) quadrature components of the received and processed SAW echo.

Figure 148:
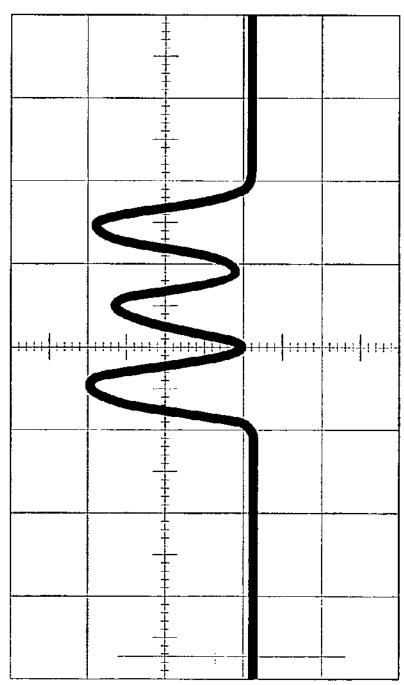

FIG. 148 shows an RSSI output signal of the transformed ($I^2+Q^2$) signal. Time scale: 200 ns/div.

Figure 149:
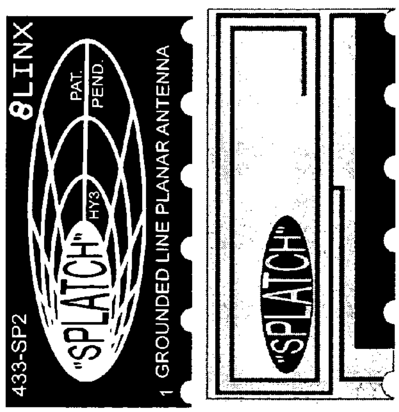

FIG. 149 is a picture of a planar "SPLATCH" antenna of 433-SP type used in SAW transponder.

Figure 150:
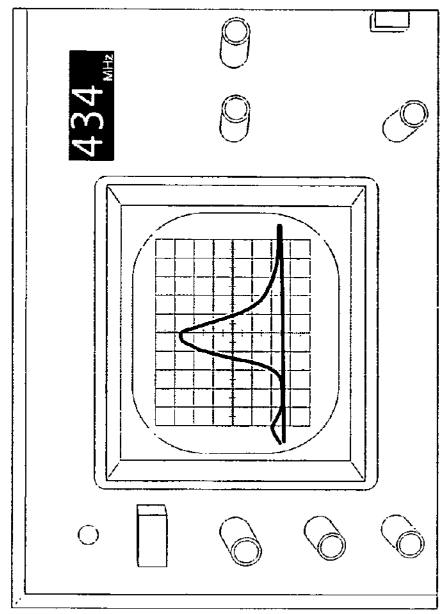

FIG. 150 is a picture of the transfer frequency response of SAW TPM antennas.

Figure 151:
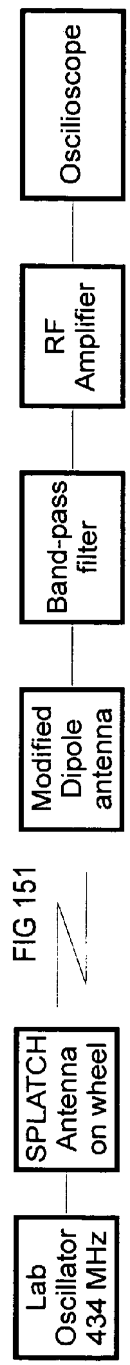

FIG. 151 is a block diagram of the measurement bench system used.

Figure 152:
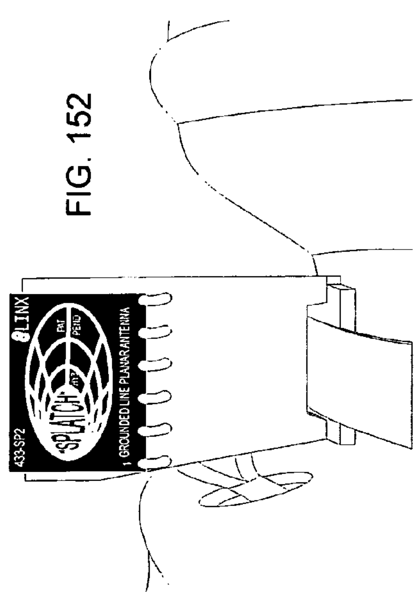

FIG. 152 is a picture of the transmitter part on the wheel rim of the TPM.

Figure 153:
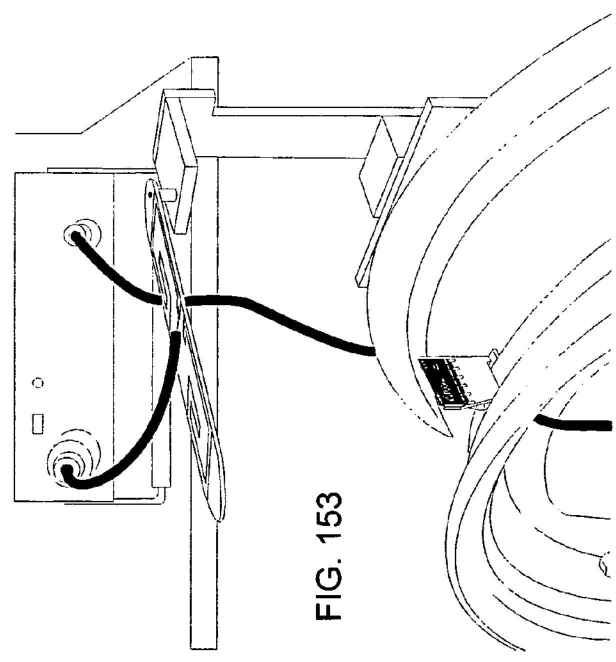

FIG. 153 is a picture of a prototype of the SAW TPM RF link under laboratory testing.

Figure 154:
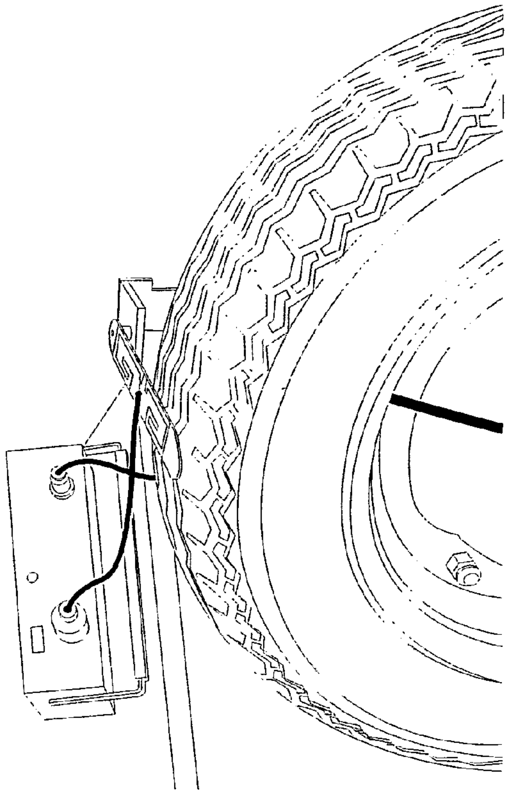

FIG. 154 is a picture of a prototype of the interrogator's RF link under laboratory testing.

Figure 155:
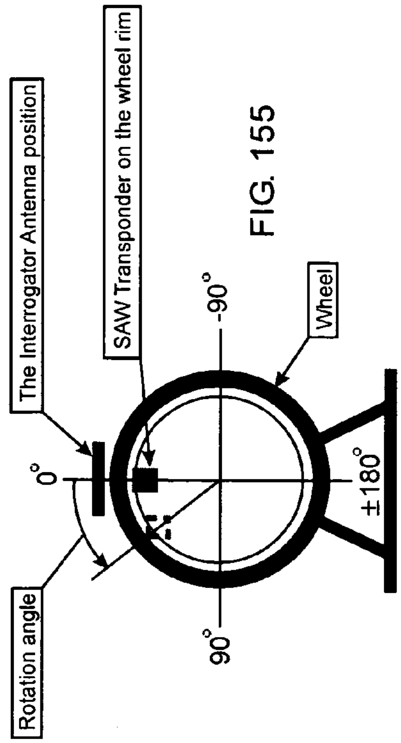

FIG. 155 is a schematic of the laboratory tire rotation bench tests.

FIG. 156 is a table showing the amplitude of the received signal for different tire rotational positions.

FIG. 157 is a picture showing the direction of the steel treads of the cord woven inside a tire.

FIGS. 158A and 158B are pictures showing a whip quarter wave antenna and ground plane location.

FIG. 159 is a block diagram.

Figure 160:
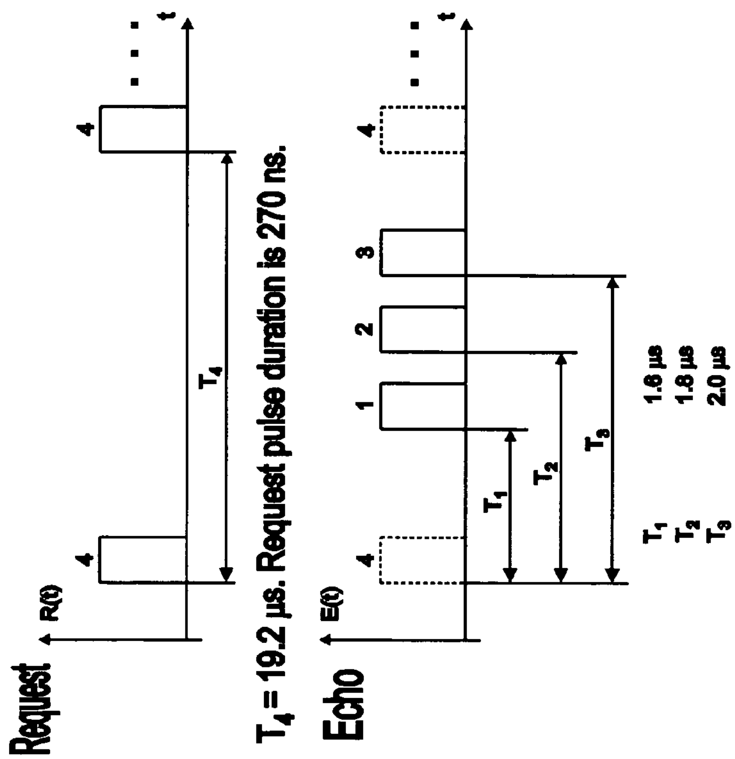

FIG. 160 illustrates the timing of the single substrate SAW sensor that was used in vehicle testing.

Figure 161:
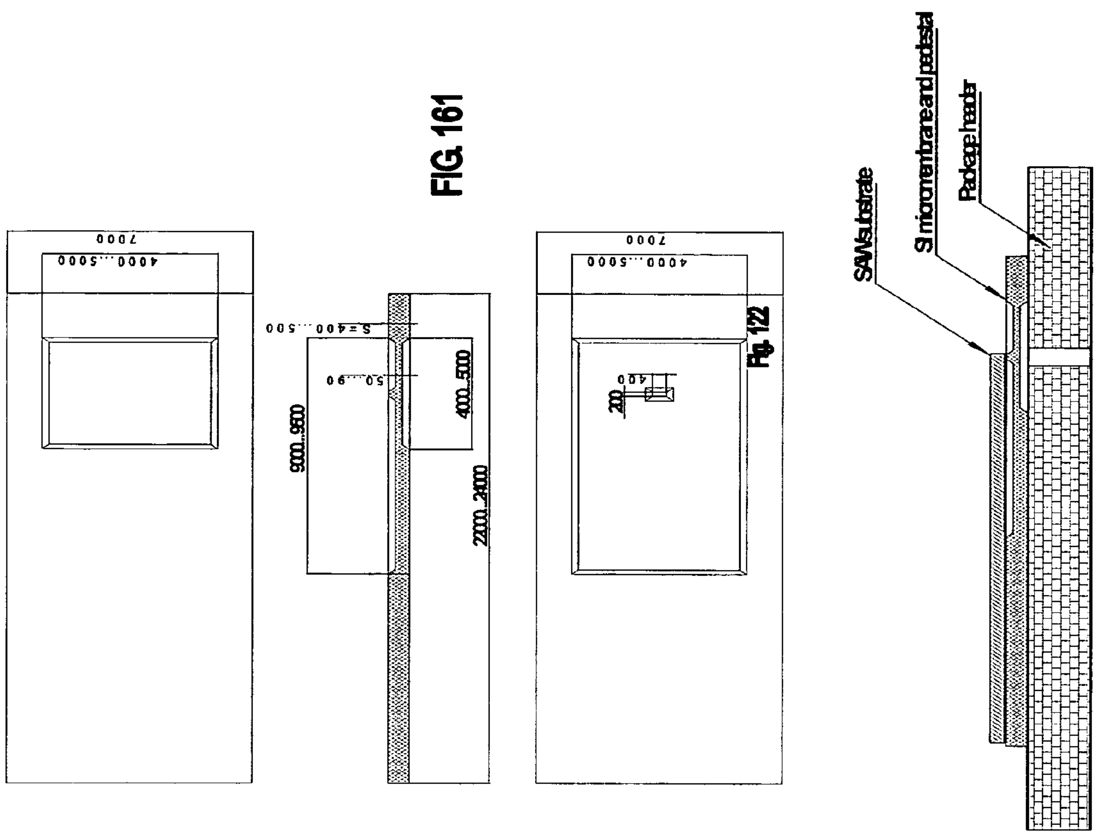

FIG. 161 is a schematic of a design of the silicon micromembrane and the pedestal.

FIG. 162 is a picture of a manufactured Si micro-membrane.

Figure 163:
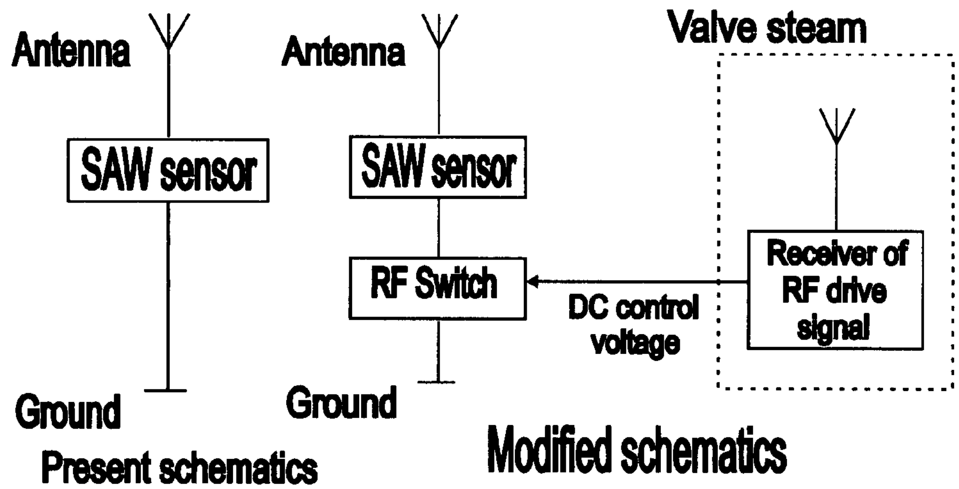

FIG. 163 is a block diagram of a SAW Transponder system.

Figure 164:
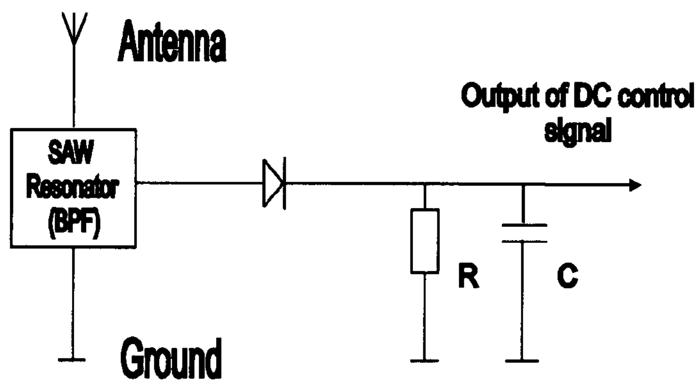

FIG. 164 is a simplified block diagram of the RF control signal receiver.

Figure 165:
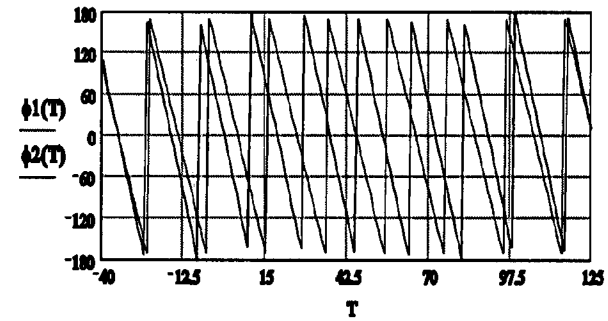

FIG. 165 is a plot showing the phase of the first and second signals.

Figure 166:
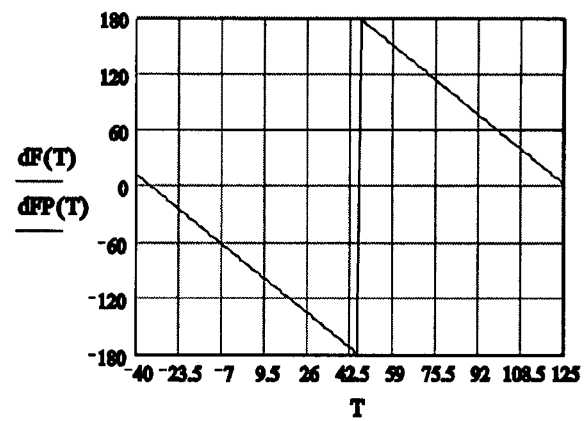

FIG. 166 is a plot showing the calculated phase shift caused by pressure.

Figure 167:
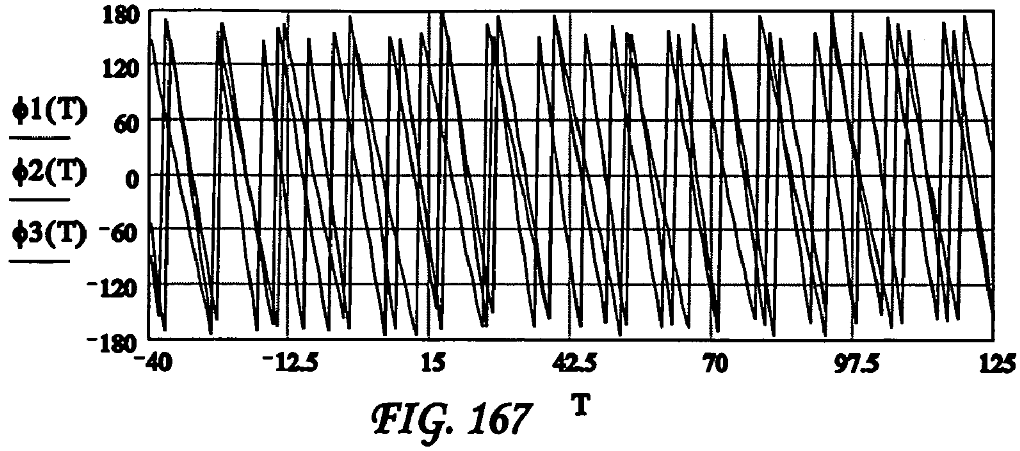

FIG. 167 is a plot showing the phase of the first, second and third signals.

Figure 168:
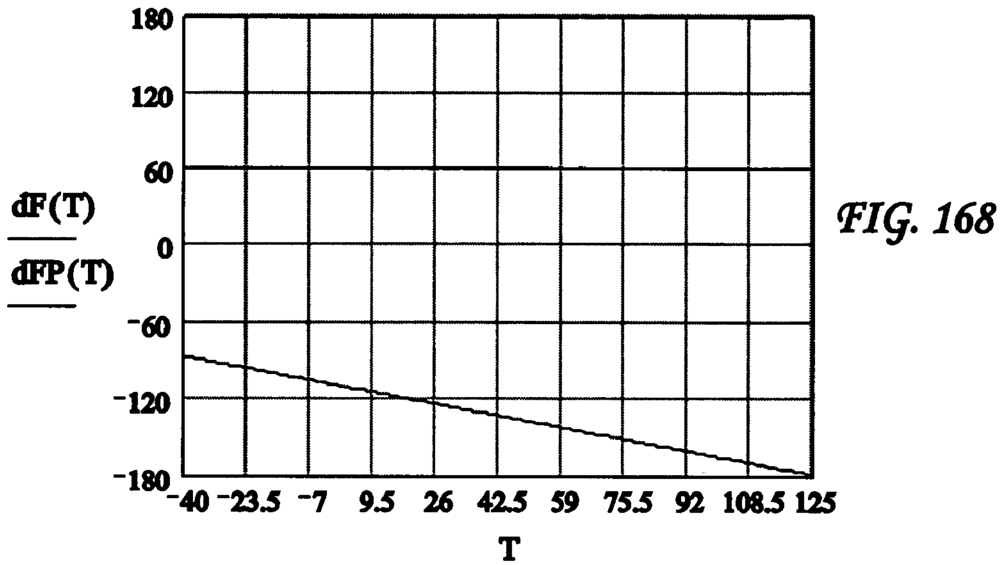

FIG. 168 is a plot showing the calculated phase shift caused by pressure.

Figure 169:
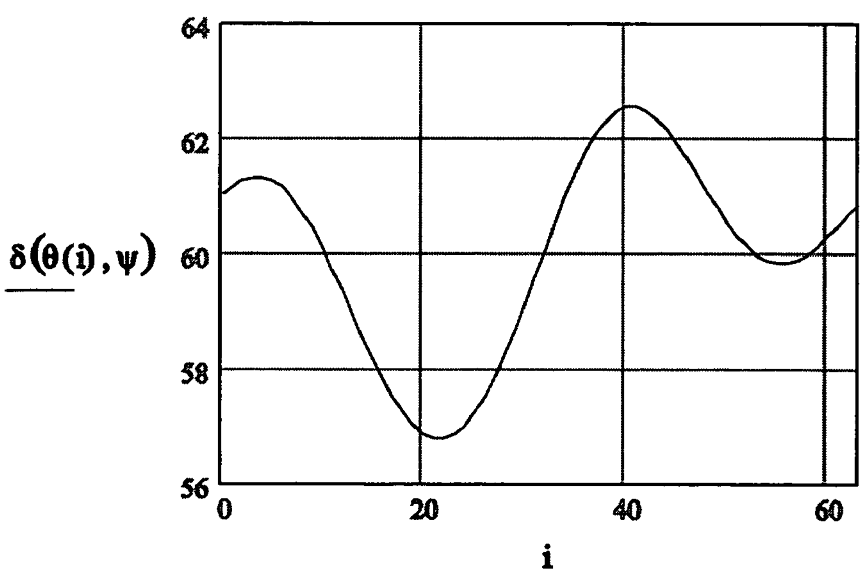

FIG. 169 is a plot showing the calculated phase shift error in the quadrature demodulator.

Figure 170A:
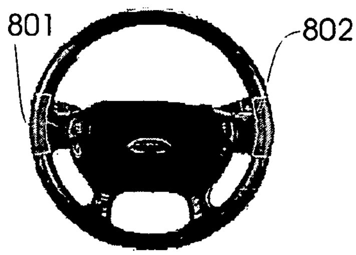

FIG. 170A is a front view of a steering wheel having two generalized switches located at 3 and 9 o'clock of the steering wheel rim.

Figure 170B:
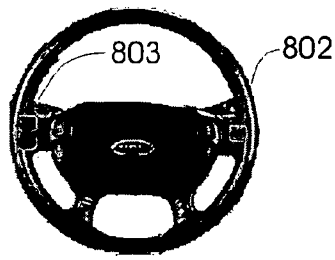

FIG. 170B is a view similar to FIG. 170A with the addition of a thumb switch option.

Figure 170C:
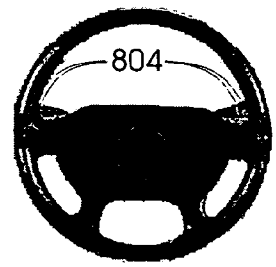

FIG. 170C is a rear view of the steering wheel of FIG. 170B with a finger trigger option.

Figure 171:
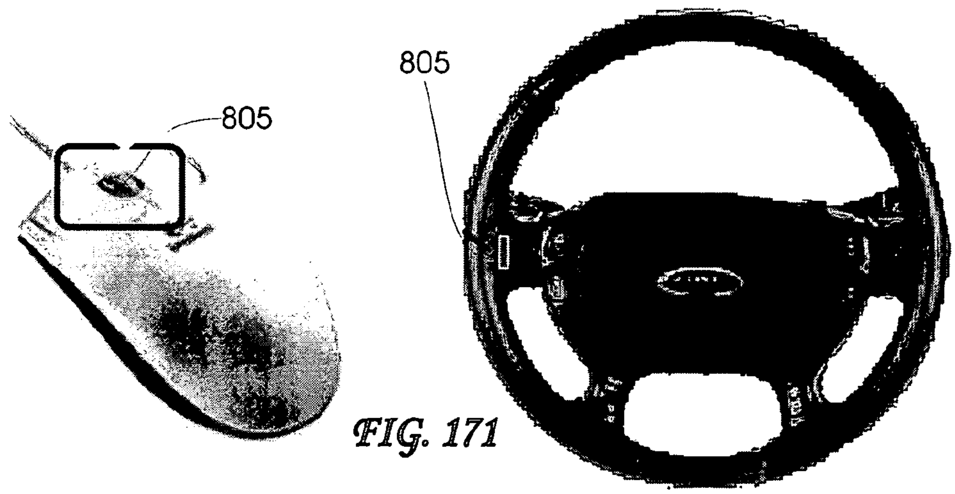

FIG. 171 illustrates the addition of a mouse type scroll wheel for the left hand.

Figure 172A:
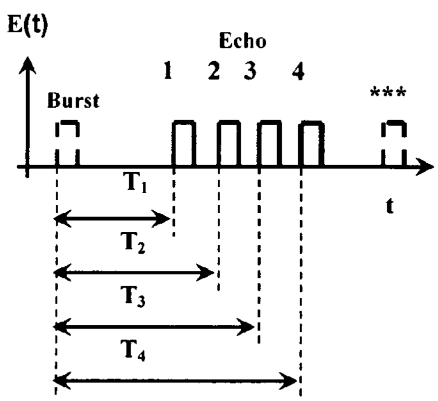
Figure 172B:
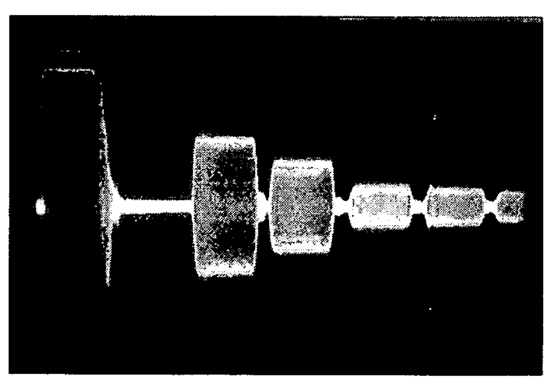

FIG. 172A illustrates plot and FIG. 172B an oscilloscope picture of the burst pulse and four echo pulses of the new shortened sensor, with a Time scale of 1.00 μs/division.

Figure 173:
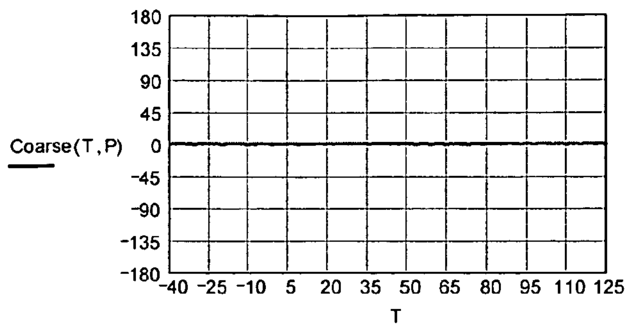

FIG. 173 illustrates the phase shift for coarse measurement of temperature in the shortened SAW tire pressure and temperature sensor.

Figure 174:
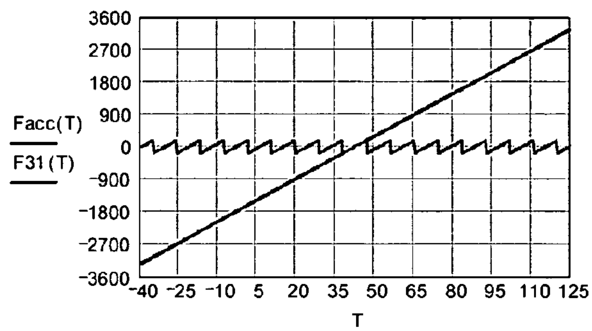

FIG. 174 illustrates the phase shift for accurate measurement of temperature and for temperature compensation in the shortened SAW tire pressure and temperature sensor.

Figure 175:
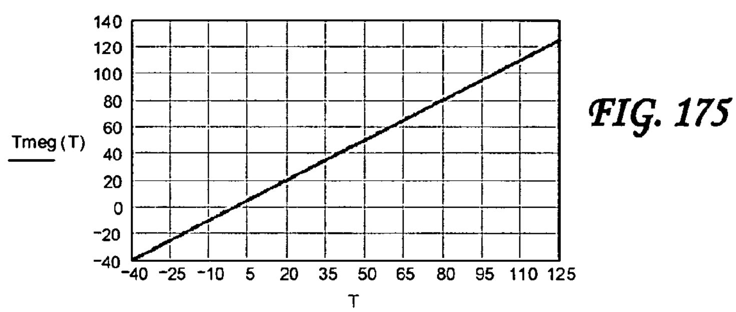

FIG. 175 illustrates the measured temperature in the shortened SAW tire pressure and temperature sensor.

Figure 176:
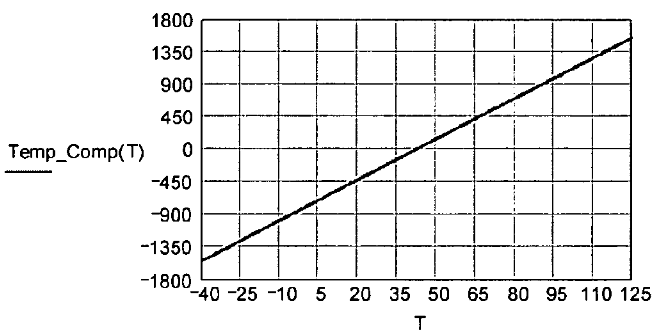

FIG. 176 illustrates the phase shift for compensation of temperature in measuring the temperature in the shortened SAW tire pressure and temperature sensor.

Figure 177:
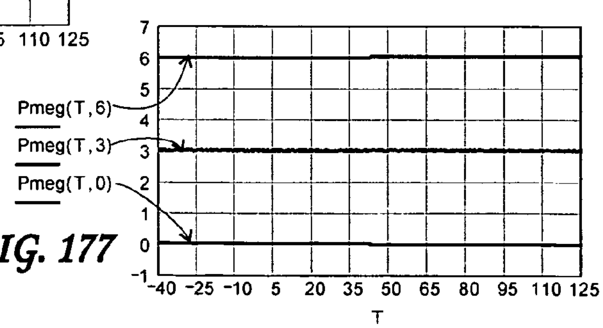

FIG. 177 illustrates the measured pressure in the shortened SAW tire pressure and temperature sensor.

Figure 178:
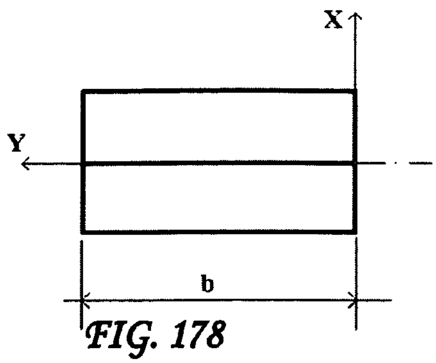
Figure 178A:
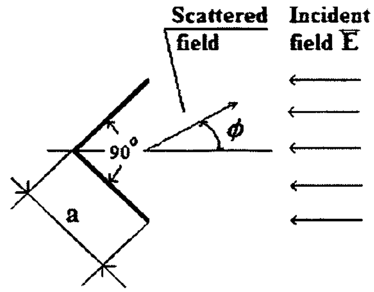

FIGS. 178 and 178A illustrate a dihedral reflector.

Figure 179:
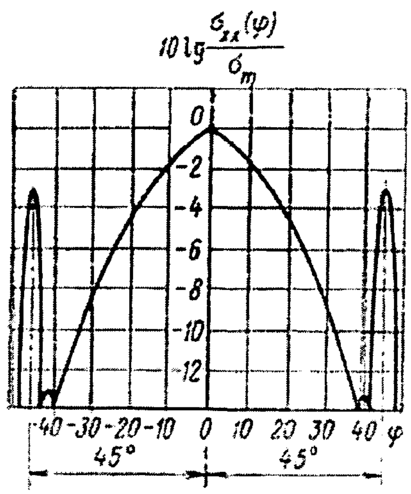

FIG. 179 illustrates the reflection pattern from a dihedral reflector in the azimuth plane.

Figure 180:
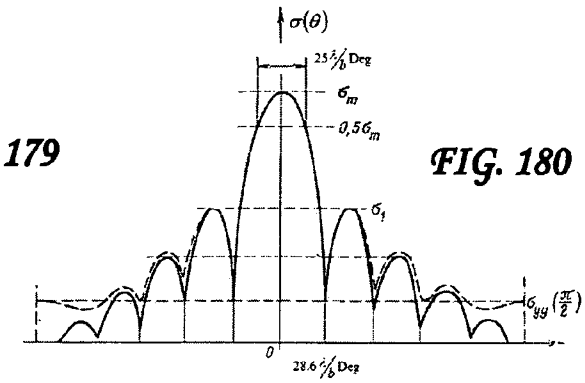

FIG. 180 illustrates the reflection pattern from a dihedral reflector in the vertical plane.

Figure 181:
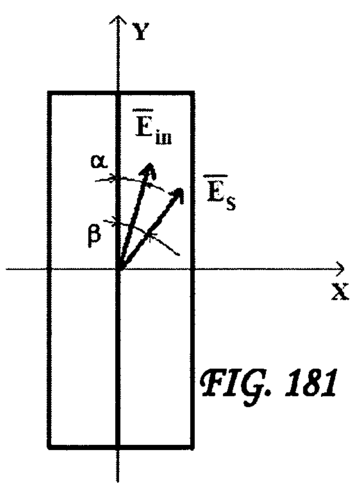

FIG. 181 illustrates the angle doubling effect of a dihedral reflector when a polarized wave impinges at an angle.

Figure 182:
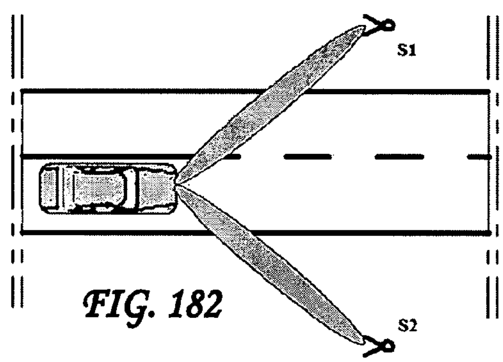

FIG. 182 is an example of the use of a dihedral reflector for determining the position of a vehicle on a roadway.

Figure 183:
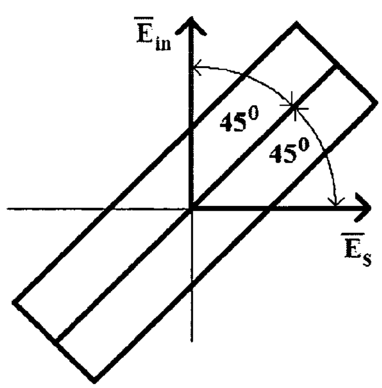

FIG. 183 shows a dihedral reflector set at 45 degrees to an incident polarized radar beam to achieve a 90 degree rotation during reflection.

Figure 184A:
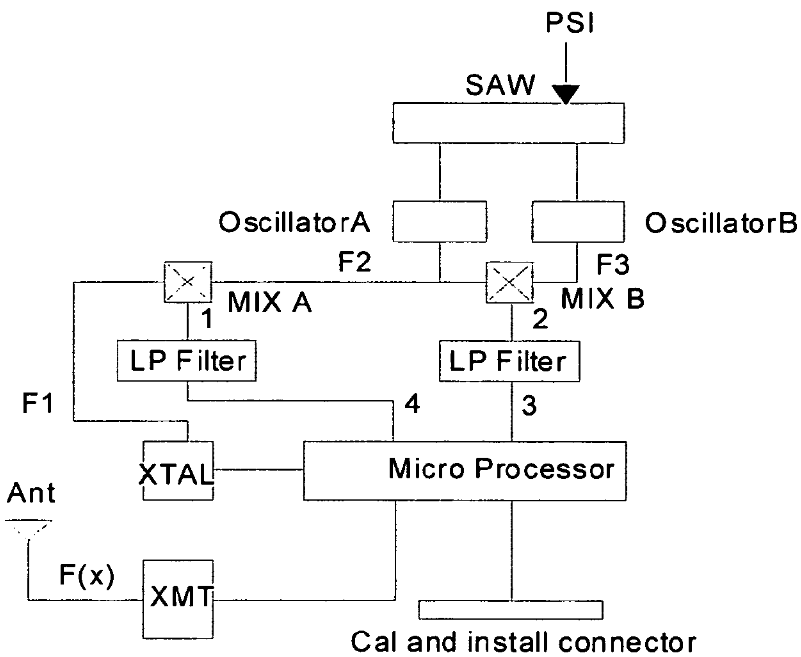

FIG. 184A is a block diagram of an alternate very low cost low power method of making a tire pressure and temperature monitor where the electronics resides in the tire mounted transceiver.

Figure 184B:
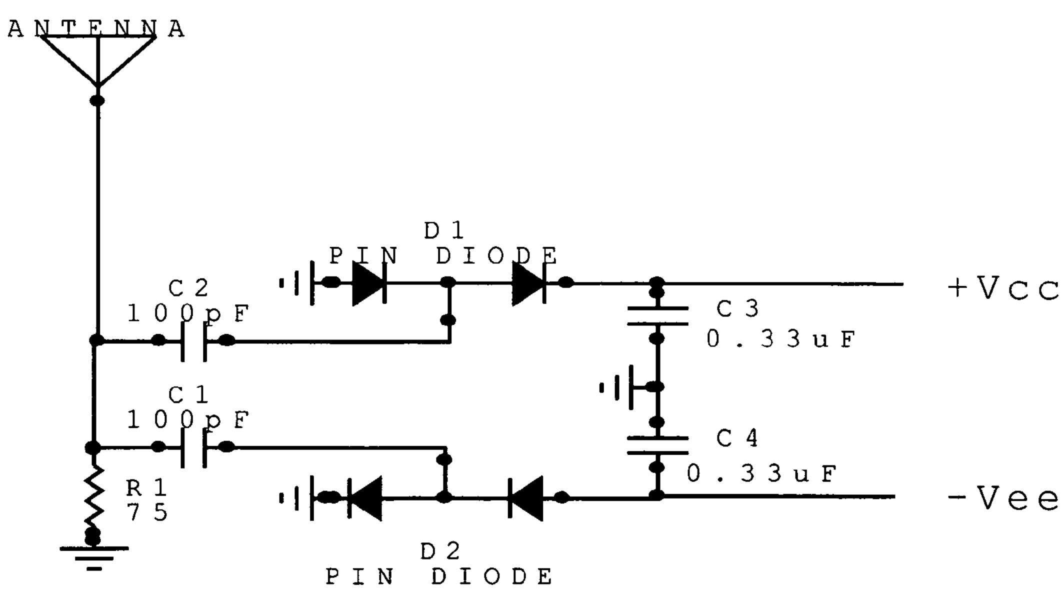

FIG. 184B is a circuit diagram of an RF operated power supply for the device of FIG. 184A.

FIG. 185 is a sketch showing a sensor assembly system in accordance with the invention.

Figure 186:
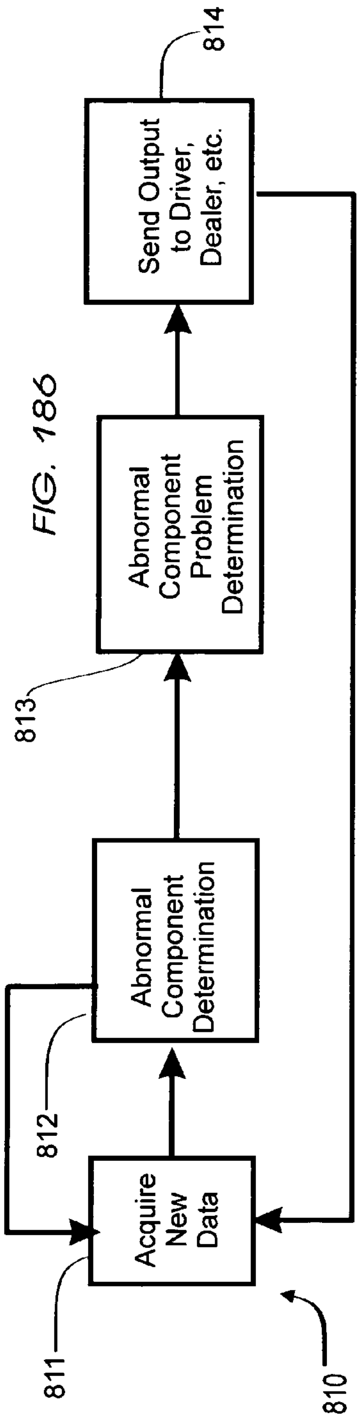

FIG. 186 is a diagram of a first combination neural network used to diagnose components in accordance with the invention.

Figure 187:
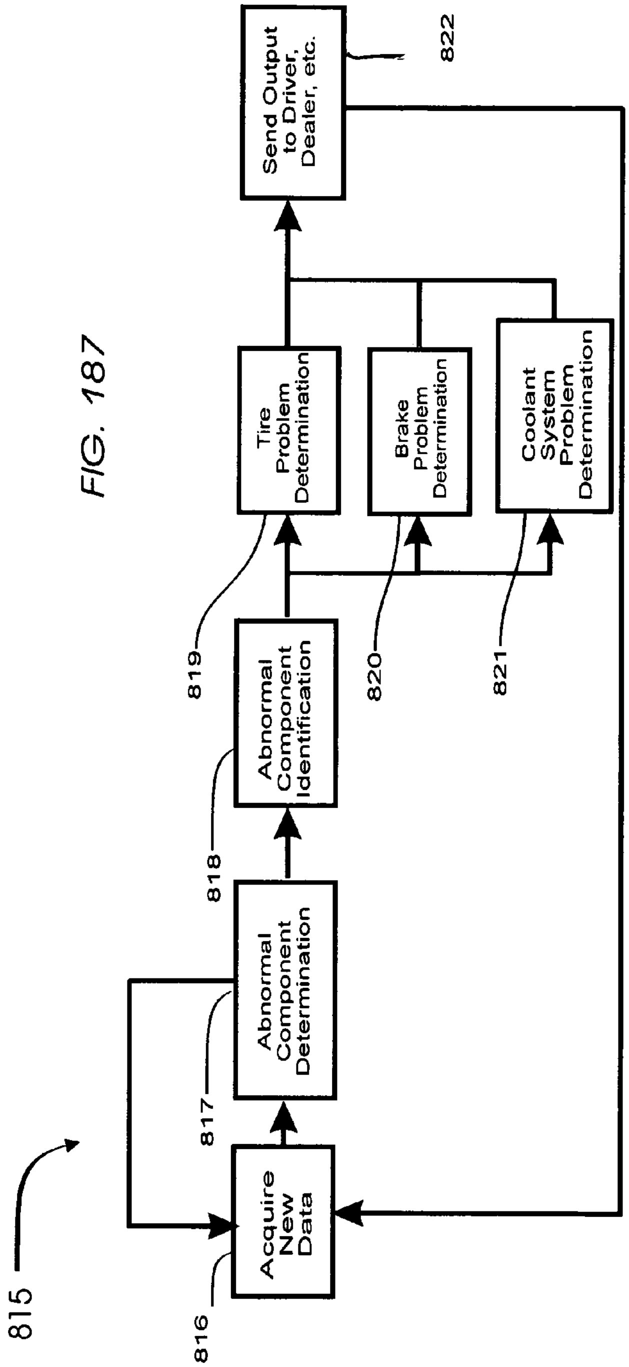

FIG. 187 is a diagram of a second combination neural network used to diagnose components in accordance with the invention.

DETAILED DESCRIPTION OF THE INVENTION

1.1 General Diagnostics and Prognostics

The output of a diagnostic system is generally the present condition of the vehicle or component. However the vehicle operator wants to repair the vehicle or replace the component before it fails, but a diagnosis system in general does not specify when that will occur. Prognostics is the process of determining when the vehicle or a component will fail. At least one of the inventions disclosed herein in concerned with prognostics. Prognostics can be based on models of vehicle or component degradation and the effects of environment and usage. In this regard it is useful to have a quantitative formulation of how the component degradation depends on environment, usage and current component condition. This formulation may be obtained by monitoring condition, environment and usage level, and by modeling the relationships with statistical techniques or pattern recognition techniques such as neural networks, combination neural networks and fuzzy logic. In some cases, it can also be obtained by theoretical methods or from laboratory experiments.

A preferred embodiment of the vehicle diagnostic and prognostic unit described below performs the diagnosis and prognostics, i.e., processes the input from the various sensors, on the vehicle using, for example, a processor embodying a pattern recognition technique such as a neural network. The processor thus receives data or signals from the sensors and generates an output indicative or representative of the operating conditions of the vehicle or its component. A signal could thus be generated indicative of an under-inflated tire, or an overheating engine.

For the discussion below, the following terms are defined as follows:

The term "component" as used herein generally refers to any part or assembly of parts which is mounted to or a part of a motor vehicle and which is capable of emitting a signal representative of its operating state. The following is a partial list of general automobile and truck components, the list not being exhaustive:

Engine; transmission; brakes and associated brake assembly; tires; wheel; steering wheel and steering column assembly; water pump; alternator; shock absorber; wheel mounting assembly; radiator; battery; oil pump; fuel pump; air conditioner compressor; differential gear assembly; exhaust system; fan belts; engine valves; steering assembly; vehicle suspension including shock absorbers; vehicle wiring system; and engine cooling fan assembly.

The term "sensor" as used herein generally refers to any measuring, detecting or sensing device mounted on a vehicle or any of its components including new sensors mounted in conjunction with the diagnostic module in accordance with the invention. A partial, non-exhaustive list of sensors that are or can be mounted on an automobile or truck is:

Airbag crash sensor; microphone; camera; chemical sensor; vapor sensor; antenna, capacitance sensor or other electromagnetic wave sensor; stress or strain sensor; pressure sensor; weight sensor; magnetic field sensor; coolant thermometer: oil pressure sensor; oil level sensor; air flow meter; voltmeter; ammeter; humidity sensor; engine knock sensor; oil turbidity sensor; throttle position sensor; steering wheel torque sensor; wheel speed sensor; tachometer; speedometer; other velocity sensors; other position or displacement sensors; oxygen sensor; yaw, pitch and roll angular sensors; clock; odometer; power steering pressure sensor; pollution sensor; fuel gauge; cabin thermometer; transmission fluid level sensor; gyroscopes or other angular rate sensors including yaw, pitch and roll rate sensors; accelerometers including single axis, dual axis and triaxial accelerometers; an inertial measurement unit; coolant level sensor; transmission fluid turbidity sensor; brake pressure sensor; tire pressure sensor; tire temperature sensor, tire acceleration sensor; GPS receiver; DGPS receiver; and coolant pressure sensor.

The term "signal" as used herein generally refers to any time-varying output from a component including electrical, acoustic, thermal, electromagnetic radiation or mechanical vibration.

Sensors on a vehicle are generally designed to measure particular parameters of particular vehicle components. However, frequently these sensors also measure outputs from other vehicle components. For example, electronic airbag crash sensors currently in use contain one or more accelerometers for determining the accelerations of the vehicle structure so that the associated electronic circuitry of the airbag crash sensor can determine whether a vehicle is experiencing a crash of sufficient magnitude so as to require deployment of the airbag. This or these accelerometers continuously monitors the vibrations in the vehicle structure regardless of the source of these vibrations. If a wheel is out of balance, or if there is extensive wear of the parts of the front wheel mounting assembly, or wear in the shock absorbers, the resulting abnormal vibrations or accelerations can, in many cases, be sensed by a crash sensor accelerometer. There are other cases, however, where the sensitivity or location of an airbag crash sensor accelerometer is not appropriate and one or more additional accelerometers or gyroscopes may be mounted onto a vehicle for the purposes of this invention. Some airbag crash sensors are not sufficiently sensitive accelerometers or have sufficient dynamic range for the purposes herein.

For example, a technique for some implementations of an invention disclosed herein is the use of multiple accelerometers and/or microphones that will allow the system to locate the source of any measured vibrations based on the time of flight, time of arrival, direction of arrival and/or triangulation techniques. Once a distributed accelerometer installation, or one or more IMUs, has been implemented to permit this source location, the same sensors can be used for smarter crash sensing as it can permit the determination of the location of the impact on the vehicle. Once the impact location is known, a highly tailored algorithm can be used to accurately forecast the crash severity making use of knowledge of the force vs. crush properties of the vehicle at the impact location.

Every component of a vehicle can emit various signals during its life. These signals can take the form of electromagnetic radiation, acoustic radiation, thermal radiation, vibrations transmitted through the vehicle structure and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes which typically contain information as to the state of the component, e.g., whether failure of the component is impending. Usually components do not fail without warning. However, most such warnings are either not perceived or if perceived, are not understood by the vehicle operator until the component actually fails and, in some cases, a breakdown of the vehicle occurs.

An important system and method as disclosed herein for acquiring data for performing the diagnostics, prognostics and health monitoring functions makes use of the acoustic transmissions from various components. This can involve the placement of one or more microphones, accelerometers, or other vibration sensors onto and/or at a variety of locations within the vehicle where the sound or vibrations are most effectively sensed. In addition to acquiring data relative to a particular component, the same sensors can also obtain data that permits analysis of the vehicle environment. A pothole, for example, can be sensed and located for possible notification to a road authority if a location determining apparatus is also resident on the vehicle.

In a few years, it is expected that various roadways will have systems for automatically guiding vehicles operating thereon. Such systems have been called "smart highways" and are part of the field of intelligent transportation systems (ITS). If a vehicle operating on such a smart highway were to breakdown due to the failure of a component, serious disruption of the system could result and the safety of other users of the smart highway could be endangered.

When a vehicle component begins to change its operating behavior, it is not always apparent from the particular sensors which are monitoring that component, if any. The output from any one of these sensors can be normal even though the component is failing. By analyzing the output of a variety of sensors, however, the pending failure can frequently be diagnosed. For example, the rate of temperature rise in the vehicle coolant, if it were monitored, might appear normal unless it were known that the vehicle was idling and not traveling down a highway at a high speed. Even the level of coolant temperature which is in the normal range could be in fact abnormal in some situations signifying a failing coolant pump, for example, but not detectable from the coolant thermometer alone.

The pending failure of some components is difficult to diagnose and sometimes the design of the component requires modification so that the diagnosis can be more readily made. A fan belt, for example, frequently begins failing as a result of a crack of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound can then be sensed by a general purpose microphone, for example.

Figure 1:
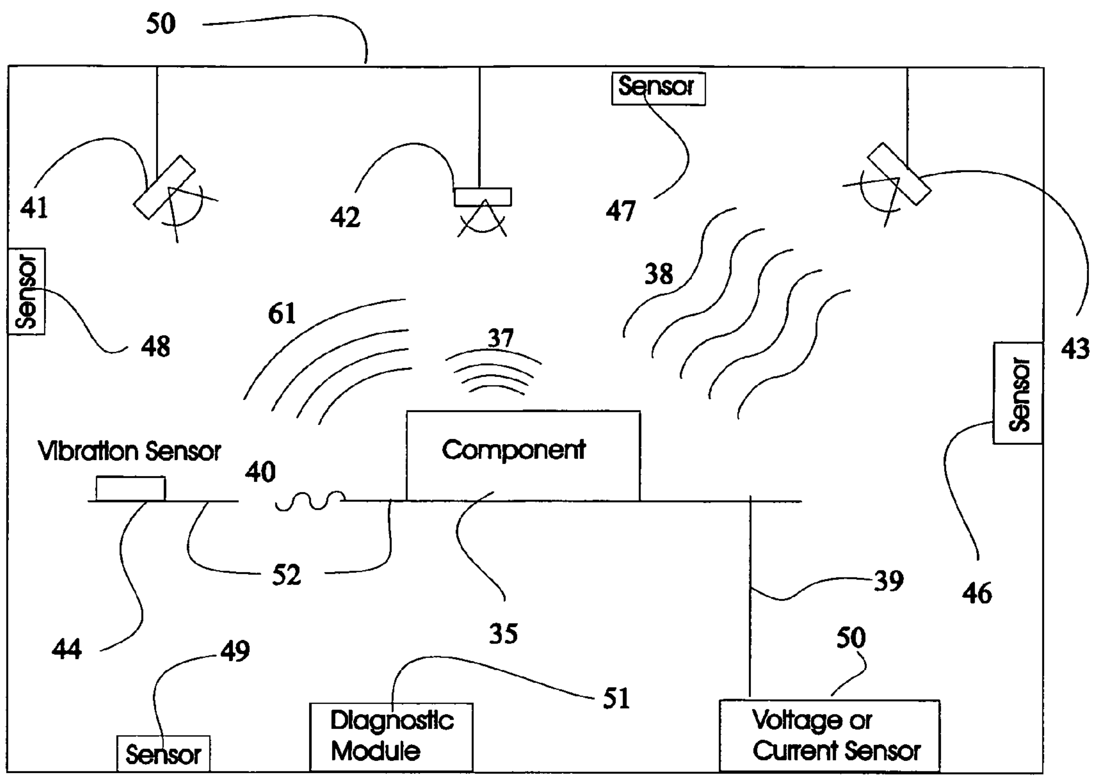
FIG. 1 is a schematic illustration of a generalized component with several signals being emitted and transmitted along a variety of paths, sensed by a variety of sensors and analyzed by the diagnostic module in accordance with the invention and for use in a method in accordance with the invention.

In FIG. 1, a generalized component 35 emitting several signals which are transmitted along a variety of paths, sensed by a variety of sensors and analyzed by the diagnostic device in accordance with the invention is illustrated schematically. Component 35 is mounted to a vehicle 52 and during operation it emits a variety of signals such as acoustic 36, electromagnetic radiation 37, thermal radiation 38, current and voltage fluctuations in conductor 39 and mechanical vibrations 40. Various sensors are mounted in the vehicle to detect the signals emitted by the component 35. These include one or more vibration sensors (accelerometers) 44, 46 and/or gyroscopes or one or more IMUs, one or more acoustic sensors 41, 47, electromagnetic radiation sensors 42, heat radiation sensors 43 and voltage or current sensors 45.

In addition, various other sensors 48, 49 measure other parameters of other components that in some manner provide information directly or indirectly on the operation of component 35. Each of the sensors illustrated in FIG. 1 can be connected to a data bus 50. A diagnostic module 51, in accordance with the invention, can also be attached to the vehicle data bus 50 and it can receive the signals generated by the various sensors. The sensors may however be wirelessly connected to the diagnostic module 51 and be integrated into a wireless power and communications system or a combination of wired and wireless connections. The wireless connection of one or more sensors to a receiver, controller or diagnostic module is an important teaching of one or more of the inventions disclosed herein.

The diagnostic module 51 will analyze the received data in light of the data values or patterns itself either statically or over time. In some cases, a pattern recognition algorithm as discussed below will be used and in others, a deterministic algorithm may also be used either alone or in combination with the pattern recognition algorithm. Additionally, when a new data value or sequence is discovered the information can be sent to an off-vehicle location, perhaps a dealer or manufacturer site, and a search can be made for other similar cases and the results reported back to the vehicle. Also additionally as more and more vehicles are reporting cases that perhaps are also examined by engineers or mechanics, the results can be sent to the subject vehicle or to all similar vehicles and the diagnostic software updated automatically. Thus, all vehicles can have the benefit from information relative to performing the diagnostic function. Similarly, the vehicle dealers and manufacturers can also have up-to-date information as to how a particular class or model of vehicle is performing. This telematics function is discussed in more detail elsewhere herein. By means of this system, a vehicle diagnostic system can predict component failures long before they occur and thus prevent on-road problems.

An important function that can be performed by the diagnostic system herein is to substantially diagnose the vehicle's own problems rather then, as is the case with the prior art, forwarding raw data to a central site for diagnosis. Eventually, a prediction as to the failure point of all significant components can be made and the owner can have a prediction that the fan belt will last another 20,000 miles, or that the tires should be rotated in 2,000 miles or replaced in 20,000 miles. This information can be displayed or reported orally or sent to the dealer who can then schedule a time for the customer to visit the dealership or for the dealer to visit the vehicle wherever it is located. If it is displayed, it can be automatically displayed periodically or when there is urgency or whenever the operator desires. The display can be located at any convenient place such as the dashboard or it can be a heads-up display. The display can be any convenient technology such as an LCD display or an OLED based display. This can permit the vehicle manufacturer to guarantee that the owner will never experience a vehicle breakdown provided he or she permits the dealer to service the vehicle at appropriate times based on the output of the prognostics system.

It is worth emphasizing that in many cases, it is the rate that a parameter is changing that can be as or more important than the actual value in predicting when a component is likely to fail. In a simple case when a tire is losing pressure, for example, it is a quite different situation if it is losing one psi per day or one psi per minute. Similarly for the tire case, if the tire is heating up at one degree per hour or 100 degrees per hour may be more important in predicting failure due to delamination or overloading than the particular temperature of the tire.

The diagnostic module, or other component, can also consider situation awareness factors such as the age or driving habits of the operator, the location of the vehicle (e.g., is it in the desert, in the arctic in winter), the season, the weather forecast, the length of a proposed trip, the number and location of occupants of the vehicle etc. The system may even put limits on the operation of the vehicle such as turning off unnecessary power consuming components if the alternator is failing or limiting the speed of the vehicle if the driver is an elderly woman sitting close to the steering wheel, for example. Furthermore, the system may change the operational parameters of the vehicle such as the engine RPM or the fuel mixture if doing so will prolong vehicle operation. In some cases where there is doubt whether a component is failing, the vehicle operating parameters may be temporarily varied by the system in order to accentuate the signal from the component to permit more accurate diagnosis.

In addition to the above discussion there are some diagnostic features already available on some vehicles some of which are related to the federally mandated OBD-II and can be included in the general diagnostics and health monitoring features of this invention. In typical applications, the set of diagnostic data includes at least one of the following: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine-performance tuning parameters, alarm status, accelerometer status, cruise-control status, fuel-injector performance, spark-plug timing, and a status of an anti-lock braking system.

The data parameters within the set describe a variety of electrical, mechanical, and emissions-related functions in the vehicle. Several of the more significant parameters from the set are:

Pending DTCs (Diagnostic Trouble Codes)
Ignition Timing Advance
Calculated Load Value
Air Flow Rate MAF Sensor
Engine RPM
Engine Coolant Temperature
Intake Air Temperature
Absolute Throttle Position Sensor
Vehicle Speed
Short-Term Fuel Trim
Long-Term Fuel Trim
MIL Light Status
Oxygen Sensor Voltage
Oxygen Sensor Location
Delta Pressure Feedback EGR Pressure Sensor
Evaporative Purge Solenoid Duty cycle
Fuel Level Input Sensor
Fuel Tank Pressure Voltage
Engine Load at the Time of Misfire
Engine RPM at the Time of Misfire
Throttle Position at the Time of Misfire
Vehicle Speed at the Time of Misfire
Number of Misfires
Transmission Fluid Temperature
PRNDL position (1,2,3,4,5=neutral, 6=reverse)
Number of Completed OBDII Trips, and
Battery Voltage.

When the diagnostic system determines that the operator is operating the vehicle in such a manner that the failure of a component is accelerated, then a warning can be issued to the operator. For example, the driver may have inadvertently placed the automatic gear shift lever in a lower gear and be driving at a higher speed than he or she should for that gear. In such a case, the driver can be notified to change gears.

Managing the diagnostics and prognostics of a complex system has been termed "System Health Management" and has not been applied to over the road vehicles such as trucks and automobiles. Such systems are used for fault detection and identification, failure prediction (estimating the time to failure), tracking degradation, maintenance scheduling, error correction in the various measurements which have been corrupted and these same tasks are applicable here.

Various sensors, both wired and wireless, will be discussed below. Representative of such sensors are those available from Honeywell which are MEMS-based sensors for measuring temperature, pressure, acoustic emission, strain, and acceleration. The devices are based on resonant microbeam force sensing technology. Coupled with a precision silicon microstructure, the resonant microbeams provide a high sensitivity for measuring inertial acceleration, inclination, and vibrations. Alternate designs based on SAW technology lend themselves more readily to wireless and powerless operation as discussed below. The Honeywell sensors can be networked wirelessly but still require power.

Since this system is independent of the dedicated sensor monitoring system and instead is observing more than one sensor, inconsistencies in sensor output can be detected and reported indicating the possible erratic or inaccurate operation of a sensor even if this is intermittent (such as may be caused by a lose wire) thus essentially eliminating many of the problems reported in the above-referenced article "What's Bugging the High-Tech Car". Furthermore, the software can be independent of the vehicle specific software for a particular sensor and system and can further be based on pattern recognition, to be discussed next, rendering it even less likely to provide the wrong diagnostic. Since the output from the diagnostic and prognostic system herein described can be sent via telematics to the dealer and vehicle manufacturer, the occurrence of a sensor or system failure can be immediately logged to form a frequency of failure log for a particular new vehicle model allowing the manufacturer to more quickly schedule a recall if a previously unknown problem surfaces in the field.

1.2 Pattern Recognition

In accordance with at least one invention, each of the signals emitted by the sensors can be converted into electrical signals and then digitized (i.e., the analog signal is converted into a digital signal) to create numerical time series data which is entered into a processor. Pattern recognition algorithms can be applied by the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

Frequently, the data entered into the pattern recognition algorithm needs to be preprocessed before being analyzed. The data from a wheel speed sensor, for example, might be used "as is" for determining whether a particular tire is operating abnormally in the event it is unbalanced, whereas the integral of the wheel speed data over a long time period (a preprocessing step), when compared to such sensors on different wheels, might be more useful in determining whether a particular tire is going flat and therefore needs air. This is the basis of some tire monitors now on the market. Such indirect systems are not permitted as a means for satisfying federal safety requirements. These systems generally depend on the comparison of the integral of the wheel speed to determine the distance traveled by the wheel surface and that system is then compared with other wheels on the vehicle to determine that one tire has relatively less air than another. Of course this system fails if all of the tires have low pressure. One solution is to compare the distance traveled by a wheel with the distance that it should have traveled. If the angular motion (displacement and/or velocity) of the wheel axle is known, than this comparison can be made directly. Alternately, if the position of the vehicle is accurately monitored so that the actual travel along its path can be determined through a combination of GPS and an IMU, for example, then again the pressure within a vehicle tire can be determined.

In some cases, the frequencies present in a set of data are a better predictor of component failures than the data itself. For example, when a motor begins to fail due to worn bearings, certain characteristic frequencies began to appear. In most cases, the vibrations arising from rotating components, such as the engine, will be normalized based on the rotational frequency. Moreover, the identification of which component is causing vibrations present in the vehicle structure can frequently be accomplished through a frequency analysis of the data. For these cases, a Fourier transformation of the data can be made prior to entry of the data into a pattern recognition algorithm. Wavelet transforms and other mathematical transformations are also made for particular pattern recognition purposes in practicing the teachings of this invention. Some of these include shifting and combining data to determine phase changes for example, differentiating the data, filtering the data and sampling the data. Also, there exist certain more sophisticated mathematical operations that attempt to extract or highlight specific features of the data. The inventions herein contemplate the use of a variety of these preprocessing techniques and the choice of which one or ones to use is left to the skill of the practitioner designing a particular diagnostic and prognostic module. Note, whenever diagnostics is used below it will be assumed to also include prognostics.

As shown in FIG. 1, the diagnostic module 51 has access to the output data of each of the sensors that are known to have or potentially may have information relative to or concerning the component 35. This data appears as a series of numerical values each corresponding to a measured value at a specific point in time. The cumulative data from a particular sensor is called a time series of individual data points. The diagnostic module 51 compares the patterns of data received from each sensor individually, or in combination with data from other sensors, with patterns for which the diagnostic module has been programmed or trained to determine whether the component is functioning normally or abnormally.

Important to some embodiments of the inventions herein is the manner in which the diagnostic module 51 determines a normal pattern from an abnormal pattern and the manner in which it decides what data to use from the vast amount of data available. This can be accomplished using pattern recognition technologies such as artificial neural networks and training and in particular, combination neural networks as described in U.S. patent application Ser. No. 10/413,426 (Publication 20030209893). The theory of neural networks including many examples can be found in several books on the subject including: (1) *Techniques And Application Of Neural Networks*, edited by Taylor, M. and Lisboa, P., Ellis Horwood, West Sussex, England, 1993; (2) *Naturally Intelligent Systems*, by Caudill, M. and Butler, C., MIT Press, Cambridge Mass., 1990; (3) J. M. Zaruda, *Introduction to Artificial Neural Systems*, West Publishing Co., N.Y., 1992, (4) *Digital Neural Networks*, by Kung, S. Y., PTR Prentice Hall, Englewood Cliffs, N.J., 1993, Eberhart, R., Simpson, P., (5) Dobbins, R., *Computational Intelligence PC Tools*, Academic Press, Inc., 1996, Orlando, Fla., (6) Cristianini, N. and Shawe-Taylor, J. *An Introduction to Support Vector Machines and other kernal-based learning methods*, Cambridge University Press, Cambridge England, 2000; (7) *Proceedings of the* 2000 *6th IEEE International Workshop on Cellular Neural Networks and their Applications* (*CNNA* 2000), IEEE, Piscataway N.J.; and (8) Sinha, N. K. and Gupta, M. M. *Soft Computing & Intelligent Systems*, Academic Press 2000 San Diego, Calif. The neural network pattern recognition technology is one of the most developed of pattern recognition technologies. The invention described herein frequently uses combinations of neural networks to improve the pattern recognition process, as discussed in detail in U.S. patent application Ser. No. 10/413,426.

The neural network pattern recognition technology is one of the most developed of pattern recognition technologies. The neural network will be used here to illustrate one example of a pattern recognition technology but it is emphasized that this invention is not limited to neural networks. Rather, the invention may apply any known pattern recognition technology including various segmentation techniques, sensor fusion and various correlation technologies. In some cases, the pattern recognition algorithm is generated by an algorithm-generating program and in other cases, it is created by, e.g., an engineer, scientist or programmer. A brief description of a particular simple example of a neural network pattern recognition technology is set forth below.

Neural networks are constructed of processing elements known as neurons that are interconnected using information channels called interconnects and are arranged in a plurality of layers. Each neuron can have multiple inputs but generally only one output. Each output however is usually connected to many, frequently all, other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition and handwriting analysis.

To train a neural network, data is provided in the form of one or more time series that represents the condition to be diagnosed, which can be induced to artificially create an abnormally operating component, as well as normal operation. In the training stage of the neural network or other type of pattern recognition algorithm, the time series data for both normal and abnormal component operation is entered into a processor which applies a neural network-generating program to output a neural network capable of determining abnormal operation of a component.

As an example, the simple case of an out-of-balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to tire unbalance (or imbalance) are also included such as, for example, the vehicle speed or wheel speed that can be determined from the anti-lock brake (ABS) system. Data is taken from a variety of vehicles where the tires were accurately balanced under a variety of operating conditions also for cases where varying amounts of tire unbalance was intentionally introduced. Once the data had been collected, some degree of pre-processing (e.g., time or frequency modification) and/or feature extraction is usually performed to reduce the total amount of data fed to the neural network-generating program. In the case of the unbalanced tire, the time period between data points might be selected such that there are at least ten data points per revolution of the wheel. For some other application, the time period might be one minute or one millisecond.

Once the data has been collected, it is processed by the neural network-generating program, for example, if a neural network pattern recognition system is to be used. Such programs are available commercially, e.g., from NeuralWare of Pittsburgh, Pa. or from International Scientific Research, Inc., of Panama for modular neural networks. The program proceeds in a trial and error manner until it successfully associates the various patterns representative of abnormal behavior, an unbalanced tire in this case, with that condition. The resulting neural network can be tested to determine if some of the input data from some of the sensors, for example, can be eliminated. In this manner, the engineer can determine what sensor data is relevant to a particular diagnostic problem. The program then generates an algorithm that is programmed onto a microprocessor, microcontroller, neural processor, FPGA, or DSP (herein collectively referred to as a microprocessor or processor). Such a microprocessor appears inside the diagnostic module 51 in FIG. 1.

Once trained, the neural network, as represented by the algorithm, is installed in a processor unit of a motor vehicle and will now recognize an unbalanced tire on the vehicle when this event occurs. At that time, when the tire is unbalanced, the diagnostic module 51 will receive output from the sensors, determine whether the output is indicative of abnormal operation of the tire, e.g., lack of tire balance, and instruct or direct another vehicular system to respond to the unbalanced tire situation. Such an instruction may be a message to the driver indicating that the tire should now be balanced, as described in more detail below. The message to the driver is provided by an output device coupled to or incorporated within the module 51, e.g., an icon or text display, and may be a light on the dashboard, a vocal tone or any other recognizable indication apparatus. A similar message may also be sent to the dealer, vehicle manufacturer or other repair facility or remote facility via a communications channel between the vehicle and the dealer or repair facility which is established by a suitable transmission device.

It is important to note that there may be many neural networks involved in a total vehicle diagnostic system. These can be organized either in parallel, series, as an ensemble, cellular neural network or as a modular neural network system. In one implementation of a modular neural network, a primary neural network identifies that there is an abnormality and tries to identify the likely source. Once a choice has been made as to the likely source of the abnormality, another, specific neural network of a group of neural networks can be called upon to determine the exact cause of the abnormality. In this manner, the neural networks are arranged in a tree pattern with each neural network trained to perform a particular pattern recognition task.

Discussions on the operation of a neural network can be found in the above references on the subject and are understood by those skilled in the art. Neural networks are the most well-known of the pattern recognition technologies based on training, although neural networks have only recently received widespread attention and have been applied to only very limited and specialized problems in motor vehicles such as occupant sensing (by the current assignee) and engine control (by Ford Motor Company). Other non-training based pattern recognition technologies exist, such as fuzzy logic. However, the programming required to use fuzzy logic, where the patterns must be determine by the programmer, usually render these systems impractical for general vehicle diagnostic problems such as described herein (although their use is not impossible in accordance with the teachings of the invention). Therefore, preferably the pattern recognition systems that learn by training are used herein. It should be noted that neural networks are frequently combined with fuzzy logic and such a combination is contemplated herein. The neural network is the first highly successful of what will be a variety of pattern recognition techniques based on training. There is nothing that suggests that it is the only or even the best technology. The characteristics of all of these technologies which render them applicable to this general diagnostic problem include the use of time-of frequency-based input data and that they are trainable. In most cases, the pattern recognition technology learns from examples of data characteristic of normal and abnormal component operation.

Figure 2:
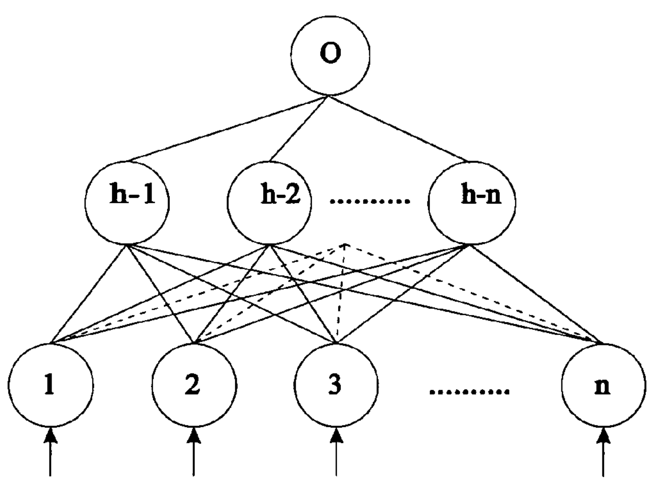
FIG. 2 is a schematic of one pattern recognition methodology known as a neural network which may be used in a method in accordance with the invention.

A diagram of one example of a neural network used for diagnosing an unbalanced tire, for example, based on the teachings of this invention is shown in FIG. 2. The process can be programmed to periodically test for an unbalanced tire. Since this need be done only infrequently, the same processor can be used for many such diagnostic problems. When the particular diagnostic test is run, data from the previously determined relevant sensor(s) is preprocessed and analyzed with the neural network algorithm. For the unbalanced tire, using the data from an accelerometer for example, the digital acceleration values from the analog-to-digital converter in the accelerometer are entered into nodes 1 through n and the neural network algorithm compares the pattern of values on nodes 1 through n with patterns for which it has been trained as follows.

Each of the input nodes is usually connected to each of the second layer nodes, h-1,h-2, . . . ,h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are, in a like manner, connected to the output layer node(s), which in this example is only a single node 0 representing the decision to notify the driver, and/or a remote facility, of the unbalanced tire. During the training phase, an output node value of 1, for example, is assigned to indicate that the driver should be notified and a value of 0 is assigned to not notifying the driver. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design. Also one particular preferred type of neural network has been discussed. Many other types exist as discussed in the above references and the inventions herein is not limited to the particular type discussed here.

Briefly, the neural network described above defines a method, using a pattern recognition system, of sensing an unbalanced tire and determining whether to notify the driver, and/or a remote facility, and comprises the steps of:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated-on value to a second series node is different from that operation performed on some other input node data (e.g., a different weight value can be used);

(e) combining the operated-on data from most or all of the input nodes into each second series node to form a value at each second series node;

(f) performing a mathematical operation on each of the values on the second series of nodes and inputting this operated-on data into an output series of nodes wherein the operation performed on each of the second series node data prior to inputting the operated-on value to an output series node is different from that operation performed on some other second series node data;

(g) combining the operated-on data from most or all of the second series nodes into each output series node to form a value at each output series node; and, (h) notifying a driver if the value on one output series node is within a selected range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver and/or a remote facility if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" can be defined as a system wherein the data to be processed is separated into discrete values which are then operated on and combined in at least a two stage process and where the operation performed on the data at each stage is in general different for each discrete value and where the operation performed is at least determined through a training process. A different operation here is meant any difference in the way that the output of a neuron is treated before it is inputted into another neuron such as multiplying it by a different weight or constant.

The implementation of neural networks can take on at least two forms, an algorithm programmed on a digital microprocessor, FPGA, DSP or in a neural computer (including a cellular neural network or support vector machine). In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 51 contains preprocessing and neural network algorithms for a number of component failures. The neural network algorithms are generally relatively simple, requiring only a relatively small number of lines of computer code. A single general neural network program can be used for multiple pattern recognition cases by specifying different coefficients for the various node inputs, one set for each application. Thus, adding different diagnostic checks has only a small affect on the cost of the system. Also, the system can have available to it all of the information available on the data bus.

During the training process, the pattern recognition program sorts out from the available vehicle data on the data bus or from other sources, those patterns that predict failure of a particular component. If more than one sensor is used to sense the output from a component, such as two spaced-apart microphones or acceleration sensors, then the location of the component can sometimes be determined by triangulation based on the phase difference, time of arrival and/or angle of arrival of the signals to the different sensors. In this manner, a particular vibrating tire can be identified, for example. Since each tire on a vehicle does not always make the same number of revolutions in a given time period, a tire can be identified by comparing the wheel sensor output with the vibration or other signal from the tire to identify the failing tire. The phase of the failing tire will change relative to the other tires, for example. This technique can also be used to associate a tire pressure monitor RF signal with a particular tire. An alternate method for tire identification makes use of an RFID tag or an RFID switch as discussed below.

In view of the foregoing, a method for diagnosing whether one or more components of a vehicle are operating abnormally would entail in a training stage, obtaining output from the sensors during normal operation of the components, adjusting each component to induce abnormal operation thereof and obtaining output from the sensors during the induced abnormal operation, and determining which sensors provide data about abnormal operation of each component based on analysis of the output from the sensors during normal operation and during induced abnormal operation of the component, e.g., differences between signals output from the sensors during normal and abnormal operation. The output from the sensors can be processed and pre-processed as described above. When obtaining output from the sensors during abnormal component operation, different abnormalities can be induced in the components, one abnormality in one component at each time and/or multiple abnormalities in multiple components at one time.

During operation of the vehicle, output from the sensors is received and a determination is made whether any of the components are operating abnormally by analyzing the output from those sensors which have been determined to provide data about abnormal operation of that component. This determination is used to alert a driver of the vehicle, a vehicle manufacturer, a vehicle dealer or a vehicle repair facility about the abnormal operation of a component. As mentioned above, the determination of whether any of the components are operating abnormally may involve considering output from only those sensors which have been determined to provide data about abnormal operation of that component. This could be a subset of the sensors, although it is possible when using a neural network to input all of the sensor data with the neural network being designed to disregard output from sensors which have no bearing on the determination of abnormal operation of the component operating abnormally.

When a combination neural network 810 is used, its training can involve multiple steps. With reference to FIG. 186, after data acquisition from the sensors 811, a first neural network 812 could be designed to determine whether the data from the sensors being input therein corresponds to data obtained during normal operation of the components. If so, the output from this first neural network 812 would be an indication of normal vehicular operation (possibly displayed to the driver) and which would cause the system to obtain new data 811 at a preset time interval or upon occurrence of a condition. If not, the existence of abnormal operation of at least one component is indicated (as well as a possible condition of entry of bad data). The combination neural network 810 includes a second neural network 813 which receives the data and is trained to output an indication of which component is operating abnormally and possibly the exact manner in which the component is operating abnormally, e.g., an unbalanced tire or an underinflated tire. This output can be sent to the driver, a vehicle dealer, manufacturer, repair facility, etc. 814 via a display device, transmission device and other notification, alert, alarm and/or warning systems. After a preset time interval or upon occurrence of a condition, new data is acquired.

With reference to FIG. 187, a second combination neural network 815, after data acquisition from the sensors 816, a first neural network 817 could be designed to determine whether the data from the sensors being input therein corresponds to data obtained during normal operation of the components. If so, the output from this first neural network 817 would be an indication of normal vehicular operation (possibly displayed to the driver) and which would cause the system to obtain new data 816 at a preset time interval or upon occurrence of a condition. If not, the existence of abnormal operation of at least one component is indicated (as well as a possible condition of entry of bad data). The combination neural network 815 includes a second neural network 818 which receives the data and is trained to output an indication of which component is operating abnormally. Depending on which component is determined to be operating abnormally, data is provided to one of a plurality of additional neural networks 819, 820, 821, each of which is trained to output an indication of the specific manner of abnormal operation of a specific component. Thus, neural network 819 is designed to be used only when a problem with the tires of the vehicle is output from neural network 818, neural network 820 is designed to be used only when a problem with the brakes of the vehicle is output from neural network 818, and neural network 821 is designed to be used only when a problem with the coolant system of the vehicle is output from neural network 818. Only three neural networks 819, 820, 821 are shown, but there could be one trained for each component or set of like components.

Neural networks 819, 820, 821 can be provided with only a subset of the data from all of the sensors, namely, data only from those sensors determined in the training stage to have an effect on the determination of the problem with the particular component the neural network is diagnosig a problem with.

The output of the specific problem from one of neural networks 819, 820, 821 is sent to the driver, a vehicle dealer, manufacturer, repair facility, etc. 822 via a display device, transmission device and other notification, alert, alarm and/or warning systems. After a preset time interval or upon occurrence of a condition, new data is acquired.

Figure 3:
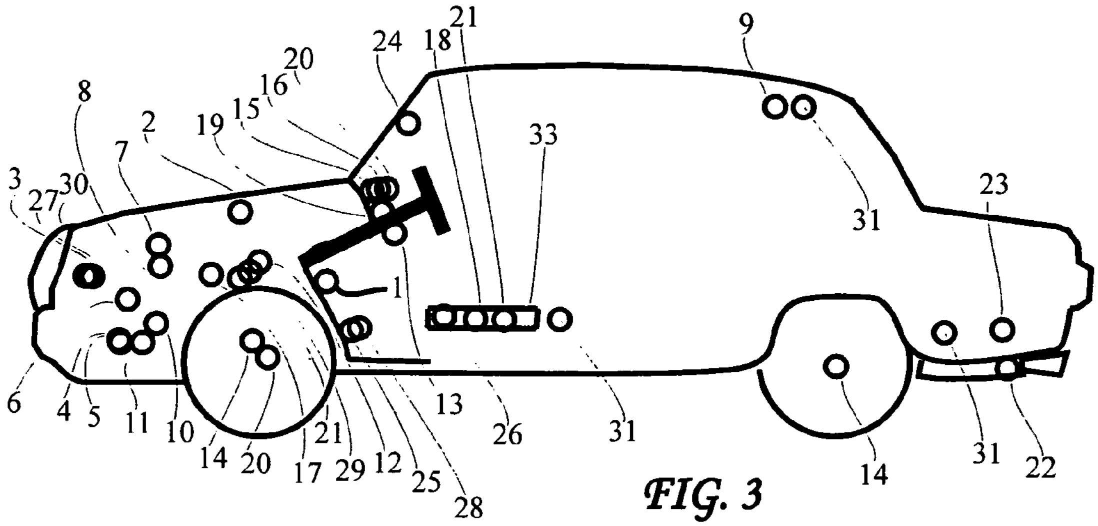
FIG. 3 is a schematic of a vehicle with several components and several sensors and a total vehicle diagnostic system in accordance with the invention utilizing a diagnostic module in accordance with the invention and which may be used in a method in accordance with the invention.
Figure 4:
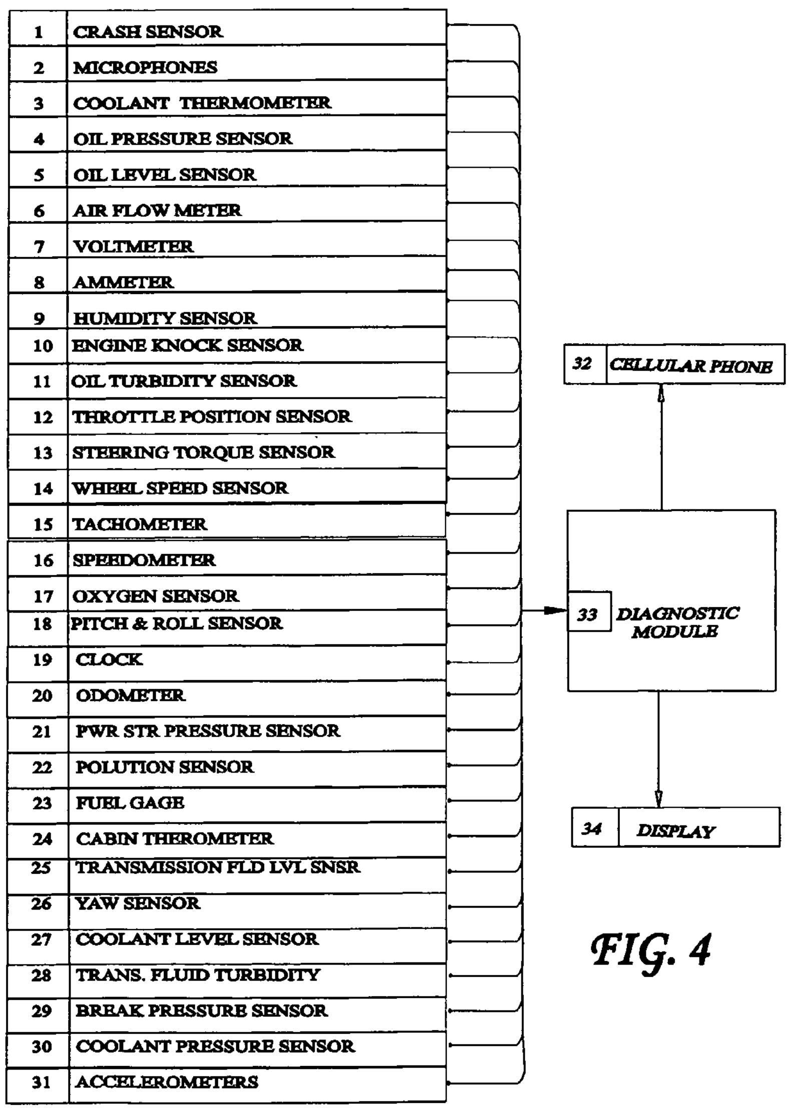
FIG. 4 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

To preclude the bad data situation, an additional neural network can be used in either combination eural network 810 or 815 to process the data and ascertain whether it is good or bad before providing the data to the neural network which determines abnormal operation of a component. In FIG. 3, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown in FIG. 3 onto the vehicle data bus, wireless communication system, wire harness or a combination thereof, and thereby into the diagnostic device in accordance with the invention is shown in FIG. 4 along with outputs to a display for notifying the driver and to the vehicle cellular phone, or other communication device, for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 4 also contains the names of the sensors shown numbered in FIG. 3.

Note, where applicable in one or more of the inventions disclosed herein, any form of wireless communication is contemplated for intra vehicle communications between various sensors and components including amplitude modulation, frequency modulation, TDMA, CDMA, spread spectrum, ultra wideband and all variations. Similarly, all such methods are also contemplated for vehicle-to-vehicle or vehicle-to-infrastructure communication.

Sensor 1 is a crash sensor having an accelerometer (alternately one or more dedicated accelerometers or IMUs 31 can be used), sensor 2 is represents one or more microphones, sensor 3 is a coolant thermometer, sensor 4 is an oil pressure sensor, sensor 5 is an oil level sensor, sensor 6 is an air flow meter, sensor 7 is a voltmeter, sensor 8 is an ammeter, sensor 9 is a humidity sensor, sensor 10 is an engine knock sensor, sensor 11 is an oil turbidity sensor, sensor 12 is a throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor, sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor 26 is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

If a distributed group of acceleration sensors or accelerometers are used to permit a determination of the location of a vibration source, the same group can, in some cases, also be used to measure the pitch, yaw and/or roll of the vehicle eliminating the need for dedicated angular rate sensors. In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, roll-over sensing etc.

Consider now some examples. The following is a partial list of potential component failures and the sensors from the list in FIG. 4 that might provide information to predict the failure of the component:

| | |
|---|---|
| Out of balance tires | 1, 13, 14, 15, 20, 21 |
| Front end out of alignment | 1, 13, 21, 26 |
| Tune up required | 1, 3, 10, 12, 15, 17, 20, 22 |
| Oil change needed | 3, 4, 5, 11 |
| Motor failure | 1, 2, 3, 4, 5, 6, 10, 12, 15, 17, 22 |
| Low tire pressure | 1, 13, 14, 15, 20, 21 |
| Front end looseness | 1, 13, 16, 21, 26 |
| Cooling system failure | 3, 15, 24, 27, 30 |
| Alternator problems | 1, 2, 7, 8, 15, 19, 20 |
| Transmission problems | 1, 3, 12, 15, 16, 20, 25, 28 |
| Differential problems | 1, 12, 14 |
| Brakes | 1, 2, 14, 18, 20, 26, 29 |
| Catalytic converter and muffler | 1, 2, 12, 15, 22 |
| Ignition | 1, 2, 7, 8, 9, 10, 12, 17, 23 |
| Tire wear | 1, 13, 14, 15, 18, 20, 21, 26 |
| Fuel leakage | 20, 23 |

-continued

| | |
|---|---|
| Fan belt slippage | 1, 2, 3, 7, 8, 12, 15, 19, 20 |
| Alternator deterioration | 1, 2, 7, 8, 15, 19 |
| Coolant pump failure | 1, 2, 3, 24, 27, 30 |
| Coolant hose failure | 1, 2, 3, 27, 30 |
| Starter failure | 1, 2, 7, 8, 9, 12, 15 |
| Dirty air filter | 2, 3, 6, 11, 12, 17, 22 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction (prognostics) undertaken at all. Second, many of the failure modes listed require information from more than one sensor. Third, information for many of the failure modes listed cannot be obtained by observing one data point in time as is now done by most vehicle sensors. Usually an analysis of the variation in a parameter as a function of time is necessary. In fact, the association of data with time to create a temporal pattern for use in diagnosing component failures in automobile is believed to be unique to the inventions herein as is the combination of several such temporal patterns. Fourth, the vibration measuring capability of the airbag crash sensor, or other accelerometer or IMU, is useful for most of the cases discussed above yet there is no such current use of accelerometers. The airbag crash sensor is used only to detect crashes of the vehicle. Fifth, the second most used sensor in the above list, a microphone, does not currently appear on any automobiles, yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that this and other chemical and biological sensors will be used more in the future. Such a sensor can be used to monitor the intake of air from outside the vehicle to permit such a flow to be cut off when it is polluted. Similarly, if the interior air is polluted, the exchange with the outside air can be initiated.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a plurality of sensors each receiving a different signal related to a specific component which are then analyzed by the processor to determine if that component is operating in an abnormal state. Neural networks can simultaneously analyze data from multiple sensors of the same type or different types (a form of sensor fusion).

As can be appreciated from the above discussion, an invention described herein brings several new improvements to vehicles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure prior to failure so that the expected failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally. Additionally, if a failure occurs which was not forecasted, provision can be made to record the output of some or all of the vehicle data and later make it available to the vehicle manufacturer for inclusion into the pattern recognition training database. Also, it is not necessary that a neural network system that is on a vehicle be a static system and some amount of learning can, in some cases, be permitted. Additionally, as the vehicle manufacturer updates the neural networks, the newer version can be downloaded to particular vehicles either when the vehicle is at a dealership or wirelessly via a cellular network or by satellite.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. Note that in some cases, simulations can be used to analytically generate the relevant data.

The discussion above has centered mainly on the blind training of a pattern recognition system, such as a neural network, so that faults can be discovered and failures forecast before they happen. Naturally, the diagnostic algorithms do not have to start out being totally dumb and in fact, the physics or structure of the systems being monitored can be appropriately used to help structure or derive the diagnostic algorithms. Such a system is described in a recent article "Immobots Take Control", MIT Technology Review December, 2002. Also, of course, it is contemplated that once a potential failure has been diagnosed, the diagnostic system can in some cases act to change the operation of various systems in the vehicle to prolong the time of a failing component before the failure or in some rare cases, the situation causing the failure might be corrected. An example of the first case is where the alternator is failing and various systems or components can be turned off to conserve battery power and an example of the second case is rollover of a vehicle may be preventable through the proper application of steering torque and wheel braking force. Such algorithms can be based on pattern recognition or on models, as described in the Immobot article referenced above, or a combination thereof and all such systems are contemplated by the invention described herein.

1.3 SAW and Other Wireless Sensors

Many sensors are now in vehicles and many more will be installed in vehicles. The following disclosure is primarily concerned with wireless sensors which can be based on MEMS, SAW and/or RFID technologies. Vehicle sensors include tire pressure, temperature and acceleration monitoring sensors; weight or load measuring sensors; switches; vehicle temperature, acceleration, angular position, angular rate, angular acceleration sensors; proximity; rollover; occupant presence; humidity; presence of fluids or gases; strain; road condition and friction, chemical sensors and other similar sensors providing information to a vehicle system, vehicle operator or external site. The sensors can provide information about the vehicle and/or its interior or exterior environment, about individual components, systems, vehicle occupants, subsystems, and/or about the roadway, ambient atmosphere, travel conditions and external objects.

For wireless sensors, one or more interrogators can be used each having one or more antennas that transmit energy at radio frequency, or other electromagnetic frequencies, to the sensors and receive modulated frequency signals from the sensors containing sensor and/or identification information. One interrogator can be used for sensing multiple switches or other devices. For example, an interrogator may transmit a chirp form of energy at 905 MHz to 925 MHz to a variety of sensors located within and/or in the vicinity of the vehicle. These sensors may be of the RFID electronic type and/or of the surface acoustic wave (SAW) type or a combination thereof. In the electronic type, information can be returned immediately to the interrogator in the form of a modulated backscatter RF signal. In the case of SAW devices, the information can be returned after a delay. RFID tags may also exhibit a delay due to the charging of the energy storage device. Naturally, one sensor can respond in both the electronic (either RFID or backscatter) and SAW delayed modes.

When multiple sensors are interrogated using the same technology, the returned signals from the various sensors can be time, code, space or frequency multiplexed. For example, for the case of the SAW technology, each sensor can be provided with a different delay or a different code. Alternately, each sensor can be designed to respond only to a single frequency or several frequencies. The radio frequency can be amplitude, code or frequency modulated. Space multiplexing can be achieved through the use of two or more antennas and correlating the received signals to isolate signals based on direction.

In many cases, the sensors will respond with an identification signal followed by or preceded by information relating to the sensed value, state and/or property. In the case of a SAW-based or RFID-based switch, for example, the returned signal may indicate that the switch is either on or off or, in some cases, an intermediate state can be provided signifying that a light should be dimmed, rather than or on or off, for example. Alternately or additionally, an RFID based switch can be associated with a sensor and turned on or off based on an identification code or a frequency sent from the interrogator permitting a particular sensor or class of sensors to be selected.

SAW devices have been used for sensing many parameters including devices for chemical and biological sensing and materials characterization in both the gas and liquid phase. They also are used for measuring pressure, strain, temperature, acceleration, angular rate and other physical states of the environment.

Economies are achieved by using a single interrogator or even a small number of interrogators to interrogate many types of devices. For example, a single interrogator may monitor tire pressure and temperature, the weight of an occupying item of the seat, the position of the seat and seatback, as well as a variety of switches controlling windows, door locks, seat position, etc. in a vehicle. Such an interrogator may use one or multiple antennas and when multiple antennas are used, may switch between the antennas depending on what is being monitored.

Similarly, the same or a different interrogator can be used to monitor various components of the vehicle's safety system including occupant position sensors, vehicle acceleration sensors, vehicle angular position, velocity and acceleration sensors, related to both frontal, side or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

Some specific examples of the use of interrogators and responsive devices will now be described.

The antennas used for interrogating the vehicle tire pressure transducers can be located outside of the vehicle passenger compartment. For many other transducers to be sensed the antennas can be located at various positions within passenger compartment. At least one invention herein contemplates, therefore, a series of different antenna systems, which can be electronically switched by the interrogator circuitry. Alternately, in some cases, all of the antennas can be left connected and total transmitted power increased.

There are several applications for weight or load measuring devices in a vehicle including the vehicle suspension system and seat weight sensors for use with automobile safety systems. As described in U.S. Pat. No. 04,096,740, U.S. Pat. No. 04,623,813, U.S. Pat. No. 05,585,571, U.S. Pat. No. 05,663,531, U.S. Pat. No. 05,821,425 and U.S. Pat. No. 05,910,647 and International Publication No. WO 00/65320(A1), SAW devices are appropriate candidates for such weight measurement systems, although in some cases RFID systems can also be used with an associated sensor such as a strain gage. In this case, the surface acoustic wave on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW or other strain device can be mounted to the center unthreaded section of the stud and the stud can be attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud other than for an antenna.

In use, the interrogator transmits a radio frequency pulse at, for example, 925 MHz that excites antenna on the SAW strain measuring system. After a delay caused by the time required for the wave to travel the length of the SAW device, a modified wave is re-transmitted to the interrogator providing an indication of the strain of the stud with the weight of an object occupying the seat corresponding to the strain. For a seat that is normally bolted to the slide mechanism with four bolts, at least four SAW strain sensors could be used. Since the individual SAW devices are very small, multiple devices can be placed on a stud to provide multiple redundant measurements, or permit bending and twisting strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW or RFID transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation can be considerably higher than that of the tire monitor, for example. However, if the seat is unoccupied, then the frequency of interrogation can be substantially reduced. For an occupied seat, information as to the identity and/or category and position of an occupying item of the seat can be obtained through the multiple weight sensors described. For this reason, and due to the fact that during the pre-crash event, the position of an occupying item of the seat may be changing rapidly, interrogations as frequently as once every 10 milliseconds or faster can be desirable. This would also enable a distribution of the weight being applied to the seat to be obtained which provides an estimation of the center of pressure and thus the position of the object occupying the seat. Using pattern recognition technology, e.g., a trained neural network, sensor fusion, fuzzy logic, etc., an identification of the object can be ascertained based on the determined weight and/or determined weight distribution.

There are many other methods by which SAW devices can be used to determine the weight and/or weight distribution of an occupying item other than the method described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Pat. No. 06,242,701 (which discloses multiple strain gage geometries) using SAW strain-measuring devices can also be constructed, e.g., any of the multiple strain gage geometries shown therein.

Generally there is an RFID implementation that corresponds to each SAW implementation. Therefore, where SAW is used herein the equivalent RFID design will also be meant where appropriate.

Although a preferred method for using the invention is to interrogate each of the SAW devices using wireless mechanisms, in some cases, it may be desirable to supply power to and/or obtain information from one or more of the SAW devices using wires. As such, the wires would be an optional feature.

One advantage of the weight sensors of this invention along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of 16 such gages. If the seat is supported by three legs, then this can be reduced to 12 gages. Naturally, a three-legged support is preferable to four since with four legs, the seat support is over-determined which severely complicates the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three, provided a good model of the seat structure is available. Unfortunately, this is usually not the case and most seats have four supports and the attachments to the vehicle not only introduce bending moments into the structure but these moments vary from one position to another and with temperature. The SAW strain gages of this invention lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

An additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

Some vehicle models provide load leveling and ride control functions that depend on the magnitude and distribution of load carried by the vehicle suspension. Frequently, wire strain gage technology is used for these functions. That is, the wire strain gages are used to sense the load and/or load distribution of the vehicle on the vehicle suspension system. Such strain gages can be advantageously replaced with strain gages based on SAW technology with the significant advantages in terms of cost, wireless monitoring, dynamic range, and signal level. In addition, SAW strain gage systems can be more accurate than wire strain gage systems.

A strain detector in accordance with this invention can convert mechanical strain to variations in electrical signal frequency with a large dynamic range and high accuracy even for very small displacements. The frequency variation is produced through use of a surface acoustic wave (SAW) delay line as the frequency control element of an oscillator. A SAW delay line comprises a transducer deposited on a piezoelectric material such as quartz or lithium niobate which is arranged so as to be deformed by strain in the member which is to be monitored. Deformation of the piezoelectric substrate changes the frequency control characteristics of the surface acoustic wave delay line, thereby changing the frequency of the oscillator. Consequently, the oscillator frequency change is a measure of the strain in the member being monitored and thus the weight applied to the seat. A SAW strain transducer can be more accurate than a conventional resistive strain gage.

Other applications of weight measuring systems for an automobile include measuring the weight of the fuel tank or other containers of fluid to determine the quantity of fluid contained therein as described in more detail below.

One problem with SAW devices is that if they are designed to operate at the GHz frequency, the feature sizes become exceeding small and the devices are difficult to manufacture, although techniques are now available for making SAW devices in the tens of GHz range. On the other hand, if the frequencies are considerably lower, for example, in the tens of megahertz range, then the antenna sizes become excessive. It is also more difficult to obtain antenna gain at the lower frequencies. This is also related to antenna size. One method of solving this problem is to transmit an interrogation signal in the high GHz range which is modulated at the hundred MHz range. At the SAW transducer, the transducer is tuned to the modulated frequency. Using a nonlinear device such as a Shocky diode, the modified signal can be mixed with the incoming high frequency signal and re-transmitted through the same antenna. For this case, the interrogator can continuously broadcast the carrier frequency.

Devices based on RFID or SAW technology can be used as switches in a vehicle as described in U.S. Pat. No. 06,078,252, U.S. Pat. No. 06,144,288 and U.S. Pat. No. 06,748,797. There are many ways that this can be accomplished. A switch can be used to connect an antenna to either an RFID electronic device or to a SAW device. This of course requires contacts to be closed by the switch activation. An alternate approach is to use pressure from an occupant's finger, for example, to alter the properties of the acoustic wave on the SAW material much as in a SAW touch screen. The properties that can be modified include the amplitude of the acoustic wave, and its phase, and/or the time delay or an external impedance connected to one of the SAW reflectors as disclosed in U.S. Pat. No. 06,084,503. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of an automobile, for example, without the need for wires. Since wires and connectors are the cause of most warranty repairs in an automobile, not only is the cost of switches substantially reduced but also the reliability of the vehicle electrical system is substantially improved.

The interrogation of switches can take place with moderate frequency such as once every 100 milliseconds. Either through the use of different frequencies or different delays, a large number of switches can be either time, code, space or frequency multiplexed to permit separation of the signals obtained by the interrogator. Alternately, an RF activated switch on some or all of the sensors can be used as discussed in more detail below.

Another approach is to attach a variable impedance device across one of the reflectors on the SAW device. The impedance can therefore be used to determine the relative reflection from the reflector compared to other reflectors on the SAW device. In this manner, the magnitude as well as the presence, of a force exerted by an occupant's finger, for example, can be used to provide a rate sensitivity to the desired function. In an alternate design, as shown U.S. Pat. No. 06,144,288, the switch is used to connect the antenna to the SAW device. Of course, in this case, the interrogator will not get a return from the SAW switch unless it is depressed.

Temperature measurement is another field in which SAW technology can be applied and the invention encompasses several embodiments of SAW temperature sensors.

U.S. Pat. No. 04,249,418 is one of many examples of prior art SAW temperature sensors. Temperature sensors are commonly used within vehicles and many more applications might exist if a low cost wireless temperature sensor is available such as disclosed herein. The SAW technology can be used for such temperature sensing tasks. These tasks include measuring the vehicle coolant temperature, air temperature within passenger compartment at multiple locations, seat temperature for use in conjunction with seat warming and cooling systems, outside temperatures and perhaps tire surface temperatures to provide early warning to operators of road freezing conditions. One example, is to provide air temperature sensors in the passenger compartment in the vicinity of ultrasonic transducers used in occupant sensing systems as described in the current assignee's U.S. Pat. No. 05,943,295 (Varga et al.), since the speed of sound in the air varies by approximately 20% from −40° C. to 85° C. Current ultrasonic occupant sensor systems do not measure or compensate for this change in the speed of sound with the effect of reducing the accuracy of the systems at the temperature extremes. Through the judicious placement of SAW temperature sensors in the vehicle, the passenger compartment air temperature can be accurately estimated and the information provided wirelessly to the ultrasonic occupant sensor system thereby permitting corrections to be made for the change in the speed of sound.

Since the road can be either a source or a sink of thermal energy, strategically placed sensors that measure the surface temperature of a tire can also be used to provide an estimate of road temperature.

Acceleration sensing is another field in which SAW technology can be applied and the invention encompasses several embodiments of SAW accelerometers.

U.S. Pat. No. 04,199,990, U.S. Pat. No. 04,306,456 and U.S. Pat. No. 04,549,436 are examples of prior art SAW accelerometers. Most airbag crash sensors for determining whether the vehicle is experiencing a frontal or side impact currently use micromachined accelerometers. These accelerometers are usually based on the deflection of a mass which is sensed using either capacitive or piezoresistive technologies. SAW technology has previously not been used as a vehicle accelerometer or for vehicle crash sensing. Due to the importance of this function, at least one interrogator could be dedicated to this critical function. Acceleration signals from the crash sensors should be reported at least preferably every 100 microseconds. In this case, the dedicated interrogator would send an interrogation pulse to all crash sensor accelerometers every 100 microseconds and receive staggered acceleration responses from each of the SAW accelerometers wirelessly. This technology permits the placement of multiple low-cost accelerometers at ideal locations for crash sensing including inside the vehicle side doors, in the passenger compartment and in the frontal crush zone. Additionally, crash sensors can now be located in the rear of the vehicle in the crush zone to sense rear impacts. Since the acceleration data is transmitted wirelessly, concern about the detachment or cutting of wires from the sensors disappears. One of the main concerns, for example, of placing crash sensors in the vehicle doors where they most appropriately can sense vehicle side impacts, is the fear that an impact into the A-pillar of the automobile would sever the wires from the door-mounted crash sensor before the crash was sensed. This problem disappears with the current wireless technology of this invention. If two accelerometers are placed at some distance from each other, the roll acceleration of the vehicle can be determined and thus the tendency of the vehicle to rollover can be predicted in time to automatically take corrective action and/or deploy a curtain airbag or other airbag(s). Other types of sensors such as crash sensors based on pressure measurements, such as supplied by Siemens, can also now be wireless.

Although the sensitivity of measurement is considerably greater than that obtained with conventional piezoelectric or micromachined accelerometers, the frequency deviation of SAW devices remains low (in absolute value). Accordingly, the frequency drift of thermal origin should be made as low as possible by selecting a suitable cut of the piezoelectric material. The resulting accuracy is impressive as presented in U.S. Pat. No. 04,549,436, which discloses an angular accelerometer with a dynamic a range of 1 million, temperature coefficient of 0.0051%/deg F, an accuracy of 1 microradian/sec$^2$, a power consumption of 1 milliwatt, a drift of 0.01% per year, a volume of 1 cc/axis and a frequency response of 0 to 1000 Hz. The subject matter of the '436 patent is hereby included in the invention to constitute a part of the invention. A similar design can be used for acceleration sensing.

In a similar manner as the polymer-coated SAW device is used to measure pressure, a device wherein a seismic mass is attached to a SAW device through a polymer interface can be made to sense acceleration. This geometry has a particular advantage for sensing accelerations below 1 G, which has proved to be very difficult for conventional micro-machined accelerometers due to their inability to both measure low accelerations and withstand high acceleration shocks.

Gyroscopes are another field in which SAW technology can be applied and the inventions herein encompass several embodiments of SAW gyroscopes.

SAW technology is particularly applicable for gyroscopes as described in International Publication No. WO 00/79217A2 to Varadan et al. The output of such gyroscopes can be determined with an interrogator that is also used for the crash sensor accelerometers, or a dedicated interrogator can be used. Gyroscopes having an accuracy of approximately 1 degree per second have many applications in a vehicle including skid control and other dynamic stability functions. Additionally, gyroscopes of similar accuracy can be used to sense impending vehicle rollover situations in time to take corrective action.

The inventors have represented that SAW gyroscopes of the type described in WO 00/79217A2 have the capability of achieving accuracies approaching about 3 degrees per hour. This high accuracy permits use of such gyroscopes in an inertial measuring unit (IMU) that can be used with accurate vehicle navigation systems and autonomous vehicle control based on differential GPS corrections. Such a system is described in U.S. Pat. No. 06,370,475. An alternate preferred technology for an IMU is described in U.S. Pat. No. 04,711,125 to Morrison discussed in more detail below. Such navigation systems depend on the availability of four or more GPS satellites and an accurate differential correction signal such as provided by the OmniStar Corporation, NASA or through the National Differential GPS system now being deployed. The availability of these signals degrades in urban canyon environments, in tunnels and on highways when the vehicle is in the vicinity of large trucks. For this application, an IMU system should be able to accurately control the vehicle for perhaps 15 seconds and preferably for up to five minutes. IMUs based on SAW technology, the technology of U.S. Pat. No. 04,549,436 discussed above or of the U.S. Pat. No. 04,711,125 are the best-known devices capable of providing sufficient accuracies for this application at a reasonable cost. Other accurate gyroscope technologies such as fiber optic systems are more accurate but can be cost-prohibitive, although recent analysis by the current assignee indicates that such gyroscopes can eventually be made cost-competitive. In high volume production, an IMU of the required accuracy based on SAW technology is estimated to cost less than about $100. A cost competing technology is that disclosed in U.S. Pat. No. 04,711,125 which does not use SAW technology.

What follows is a discussion of the Morrison Cube of U.S. Pat. No. 04,711,125 known as the QUBIK™. Let us review the typical problems that are encountered with sensors that try to measure multiple physical quantities at the same time and how the QUBIK solves these problems. These problems were provided by an IMU expert unfamiliar with the QUBIK and the responses are provided by Morrison.

1. Problem: Errors of measurement of the linear accelerations and angular speed are mutually correlated. Even if every one of the errors, taken separately, does not accumulate with integration (the inertial system's algorithm does that), the cross-coupled multiplication (such as one during re-projecting the linear accelerations from one coordinate system to another) will have these errors detected and will make them a systematic error similar to a sensor's bias.

Solution: The QUBIK IMU is calibrated and compensated for any cross axis sensitivity. For example: if one of the angular accelerometer channels has a sensitivity to any of the three of linear accelerations, then the linear accelerations are buffered and scaled down and summed with the buffered angular accelerometer output to cancel out all linear acceleration sensitivity on all three angular accelerometer channels. This is important to detect pure angular rate signals. This is a very common practice throughout the U.S. aerospace industry to make navigation grade IMU's. Even when individual gyroscopes and accelerometers are used in navigation, they have their outputs scaled and summed together to cancel out these cross axis errors. Note that competitive MEMS products have orders of magnitude higher cross axis sensitivities when compared to navigation grade sensors and they will undoubtedly have to use this practice to improve performance. MEMS angular rate sensors are advertised in degrees per second and navigation angular rate sensors are advertised in degrees per hour. MEMS angular rate sensors have high linear acceleration errors that must be compensated for at the IMU level.

2. Problem: The gyroscope and accelerometer channels require settings to be made that contradict one another physically. For example, a gap between the cube and the housing for the capacitive sensors (that measure the displacements of the cube) is not to exceed 50 to 100 microns. On the other hand, the gyroscope channels require, in order to enhance a Coriolis effect used to measure the angular speed, that the amplitude and the linear speed of vibrations are as big as possible. To do this, the gap and the frequency of oscillations should be increased. A greater frequency of oscillations in the nearly resonant mode requires the stiffness of the electromagnetic suspension to be increased, too, which leads to a worse measurement of the linear accelerations because the latter require that the rigidity of the suspension be minimal when there is a closed feedback.

Solution: The capacitive gap all around the levitated inner cube of the QUBIK is nominally 0.010 inches. The variable capacitance plates are excited by a 1.5 MHz 25 volt peak to peak signal. The signal coming out is so strong (five volts) that there is no preamp required. Diode detectors are mounted directly above the capacitive plates. There is no performance change in the linear accelerometer channels when the angular accelerometer channels are being dithered or rotated back and forth about an axis. This was discovered by having a ground plane around the electromagnets that eliminated transformer coupling. Dithering or driving the angular accelerometer which rotates the inner cube proof mass is a gyroscopic displacement and not a linear displacement and has no effect on the linear channels. Another very important point to make is the servo loops measure the force required to keep the inner cube at its null and the servo loops are integrated to prevent any displacements. The linear accelerometer servo loops are not being exercised to dither the inner cube. The angular accelerometer servo loop is being exercised. The linear and angular channels have their own separate set of capacitance detectors and electromagnets. Driving the angular channels has no effect on the linear ones.

The rigidity of an integrated closed loop servo is infinite at DC and rolls off at higher frequencies. The QUBIK IMU measures the force being applied to the inner cube and not the displacement to measure angular rate. There is a force generated on the inner cube when it is being rotated and the servo will not allow any displacement by applying equal and opposite forces on the inner cube to keep it at null. The servo readout is a direct measurement of the gyroscopic forces on the inner cube and not the displacement.

The servo gain is so high at the null position that one will not see the null displacement but will see a current level equivalent to the force on the cube. This is why integrated closed loop servos are so good. They measure the force required to keep the inner cube at null and not the displacement. The angular accelerometer channel that is being dithered will have a noticeable displacement at its null. The sensor does not have to be driven at its resonance. Driving the angular accelerometer at resonance will run the risk of over-driving the inner cube to the point where it will bottom out and bang around inside its cavity. There is an active gain control circuit to keep the alternating momentum constant.

Note that competitive MEMS based sensors are open loop and allow displacements which increase cross axis errors. MEMS sensors must have displacements to work and do not measure the Coriolis force, they measure displacement which results in huge cross axis sensitivity issues.

3. Problem: As the electromagnetic suspension is used, the sensor is going to be sensitive to external constant and variable (alternating) fields. Its errors will vary with its position, for example, with respect to the Earth's magnetic field or other magnetic sources.

Solution: The earths magnetic field varies from −0.0 to +0.3 gauss and the magnets have gauss levels over 10,000. The earth field can be shielded if necessary.

4. Problem: The QUBIT sensing element is relatively heavy so the sensor is likely to be sensitive to angular accelerations and impacts. Also, the temperature of the environment can affect the micron-sized gaps, magnetic fields of the permanent magnets, the resistance of the inductance coils etc., which will eventually increase the sensor errors.

Solution: The inner cube has a gap of 0.010 inches and does not change significantly over temperature.

The resistance of the coils is not a factor in the active closed loop servo. Anybody who make this statement does not know what they are talking about. There is a stable one PPM/C current readout resistor in series with the coil that measures the current passing through the coil which eliminates the temperature sensitivity of the coil resistance.

Permanent magnets have already proven themselves to be very stable over temperature when used in active servo loops used in navigation gyroscopes and accelerometers.

Note that the sensitivity that the QUBIK IMU has achieved 0.01 degrees per hour.

5. Problem: High Cost. To produce the QUBIK, one may need to maintain micron-sized gaps and highly clean surfaces for capacitive sensors; the devices must be assembled in a dust-free room, and the device itself must be hermetic (otherwise dust or moisture will put the capacitive sensor and the electromagnetic suspension out of operation), the permanent magnets must have a very stable performance because they're going to work in a feedback circuit, and so on. In our opinion, all these issues make the technology overly complex and expensive, so an additional metrological control will be required and no full automation can be ever done.

Solution: The sensor does not have micron size gaps and does not need to be hermetic unless the sensor is submerged in water! Most of the QUBIK IMU sensor is a cut out PCB's that can certainly be automated. The PCB design can keep dust out and does not need to be hermetic. Humidity is not a problem unless the sensor is submerged in water. The permanent magnets achieve parts per million stability at a cost of $0.05 each for a per system cost of under one dollar. There are may navigation grade gyroscopes and accelerometers that use permanent magnets.

Competitive MEMS sensors can of course have process contamination problems. To my knowledge, there are no MEMS angular rate sensors that do not require human labor and/or calibration. The QUBIK IMU can instead use programmable potentiometers at calibration instead of human labor.

Once an IMU of the accuracy described above is available in the vehicle, this same device can be used to provide significant improvements to vehicle stability control and rollover prediction systems.

Keyless entry systems are another field in which SAW technology can be applied and the invention encompasses several embodiments of access control systems using SAW devices.

A common use of SAW or RFID technology is for access control to buildings however, the range of electronic unpowered RFID technology is usually limited to one meter or less. In contrast, the SAW technology, when powered or boosted, can permit sensing up to about 30 meters. As a keyless entry system, an automobile can be configured such that the doors unlock as the holder of a card containing the SAW ID system approaches the vehicle and similarly, the vehicle doors can be automatically locked when the occupant with the card travels beyond a certain distance from the vehicle. When the occupant enters the vehicle, the doors can again automatically lock either through logic or through a current system wherein doors automatically lock when the vehicle is placed in gear. An occupant with such a card would also not need to have an ignition key. The vehicle would recognize that the SAW-based card was inside vehicle and then permit the vehicle to be started by issuing an oral command if a voice recognition system is present or by depressing a button, for example, without the need for an ignition key.

Although they will not be discussed in detail, SAW sensors operating in the wireless mode can also be used to sense for ice on the windshield or other exterior surfaces of the vehicle, condensation on the inside of the windshield or other interior surfaces, rain sensing, heat-load sensing and many other automotive sensing functions. They can also be used to sense outside environmental properties and states including temperature, humidity, etc.

SAW sensors can be economically used to measure the temperature and humidity at numerous places both inside and outside of a vehicle. When used to measure humidity inside the vehicle, a source of water vapor can be activated to increase the humidity when desirable and the air conditioning system can be activated to reduce the humidity when necessary or desirable. Temperature and humidity measurements outside of the vehicle can be an indication of potential road icing problems. Such information can be used to provide early warning to a driver of potentially dangerous conditions. Although the invention described herein is related to land vehicles, many of these advances are equally applicable to other vehicles such as airplanes and even, in some cases, homes and buildings. The invention disclosed herein, therefore, is not limited to automobiles or other land vehicles.

Road condition sensing is another field in which SAW technology can be applied and the invention encompasses several embodiments of SAW road condition sensors.

The temperature and moisture content of the surface of a roadway are critical parameters in determining the icing state of the roadway. Attempts have been made to measure the coefficient of friction between a tire and the roadway by placing strain gages in the tire tread. Naturally, such strain gages are ideal for the application of SAW technology especially since they can be interrogated wirelessly from a distance and they require no power for operation. As discussed herein, SAW accelerometers can also perform this function. The measurement of the friction coefficient, however, is not predictive and the vehicle operator is only able to ascertain the condition after the fact. Boosted SAW or RFID based transducers have the capability of being interrogated as much as 100 feet from the interrogator. Therefore, the judicious placement of low-cost powerless SAW or RFID temperature and humidity sensors in and/or on the roadway at critical positions can provide an advance warning to vehicle operators that the road ahead is slippery. Such devices are very inexpensive and therefore could be placed at frequent intervals along a highway.

An infrared sensor that looks down the highway in front of the vehicle can actually measure the road temperature prior to the vehicle traveling on that part of the roadway. This system also would not give sufficient warning if the operator waited for the occurrence of a frozen roadway. The probability of the roadway becoming frozen, on the other hand, can be predicted long before it occurs, in most cases, by watching the trend in the temperature. Once vehicle-to-vehicle communications are common, roadway icing conditions can be communicated between vehicles.

Some lateral control of the vehicle can also be obtained from SAW transducers or electronic RFID tags placed down the center of the lane, either above the vehicles and/or in the roadway, for example. A vehicle having two receiving antennas, for example, approaching such devices, through triangulation or direct proportion, is able to determine the lateral location of the vehicle relative to these SAW devices. If the vehicle also has an accurate map of the roadway, the identification number associated with each such device can be used to obtain highly accurate longitudinal position determinations. Ultimately, the SAW devices can be placed on structures beside the road and perhaps on every mile or tenth of a mile marker. If three antennas are used, as discussed herein, the distances from the vehicle to the SAW device can be determined. These SAW devices can be powered in order to stay below current FCC power transmission limits. Such power can be supplied by a photocell, energy harvesting where applicable, by a battery or power connection.

Electronic RFID tags are also suitable for lateral and longitudinal positioning purposes, however, the range available for current electronic RFID systems can be less than that of SAW-based systems unless either are powered. On the other hand, as disclosed in U.S. Pat. No. 06,748,797, the time-of-flight of the RFID system can be used to determine the distance from the vehicle to the RFID tag. Because of the inherent delay in the SAW devices and its variation with temperature, accurate distance measurement is probably not practical based on time-of-flight but somewhat less accurate distance measurements based on relative time-of-arrival can be made. Even if the exact delay imposed by the SAW device was accurately known at one temperature, such devices are usually reasonably sensitive to changes in temperature, hence they make good temperature sensors, and thus the accuracy of the delay in the SAW device is more difficult to maintain. An interesting variation of an electronic RFID that is particularly applicable to this and other applications of this invention is described in A. Pohl, L. Reindl, "New passive sensors", Proc. 16th IEEE Instrumentation and Measurement Technology Conf., IMTC/99, 1999, pp. 1251–1255.

Many SAW devices are based on lithium niobate or similar strong piezoelectric materials. Such materials have high thermal expansion coefficients. An alternate material is quartz that has a very low thermal expansion coefficient. However, its piezoelectric properties are inferior to lithium niobate. One solution to this problem is to use lithium niobate as the coupling system between the antenna and the material or substrate upon which the surface acoustic wave travels. In this manner, the advantages of a low thermal expansion coefficient material can be obtained while using the lithium niobate for its strong piezoelectric properties. Other useful materials such as Langasite™ have properties that are intermediate between lithium niobate and quartz.

The use of SAW tags as an accurate precise positioning system as described above would be applicable for accurate vehicle location, as discussed in U.S. Pat. No. 06,370,475, for lanes in tunnels, for example, or other cases where loss of satellite lock, and thus the primary vehicle location system, is common.

The various technologies discussed above can be used in combination. The electronic RFID tag can be incorporated into a SAW tag providing a single device that provides both a quick reflection of the radio frequency waves as well as a re-transmission at a later time. This marriage of the two technologies permits the strengths of each technology to be exploited in the same device. For most of the applications described herein, the cost of mounting such a tag in a vehicle or on the roadway far exceeds the cost of the tag itself. Therefore, combining the two technologies does not significantly affect the cost of implementing tags onto vehicles or roadways or side highway structures.

A variation of this design is to use an RFID circuit such as in an RFID to serve as an energy source. One design could be for the RFID to operate with directional antennas at a relatively high frequency such as 2.4 GHz. This can be primarily used to charge a capacitor to provide the energy for boosting the signal from the SAW sensor using circuitry such as a circulator discussed below. The SAW sensor can operate at a lower frequency, such as 400 MHz, permitting it to not interfere with the energy transfer to the RF circuit and also permit the signal to travel better to the receiver since it will be difficult to align the antenna at all times with the interrogator. Also, by monitoring the reception of the RF signal, the angular position of the tire can be determined and the SAW circuit designed so that it only transmits when the antennas are aligned or when the vehicle is stationary. Many other opportunities now present themselves with the RF circuit operating at a different frequency from the SAW circuit which will now be obvious to one skilled in the art.

An alternate method to the electronic RFID tag is to simply use a radar or lidar reflector and measure the time-of-flight to the reflector and back. The reflector can even be made of a series of reflecting surfaces displaced from each other to achieve some simple coding. It should be understood that RFID antennas can be similarly configured. An improvement would be to polarize the radiation and use a reflector that rotates the polarization angle allowing the reflector to be more easily found among other reflecting objects.

Another field in which SAW technology can be applied is for "ultrasound-on-a-surface" type of devices. U.S. Pat. No. 05,629,681, assigned to the current assignee herein and incorporated by reference herein, describes many uses of ultrasound in a tube. Many of the applications are also candidates for ultrasound-on-a-surface devices. In this case, a micro-machined SAW device will in general be replaced by a much larger structure.

Figure 5:
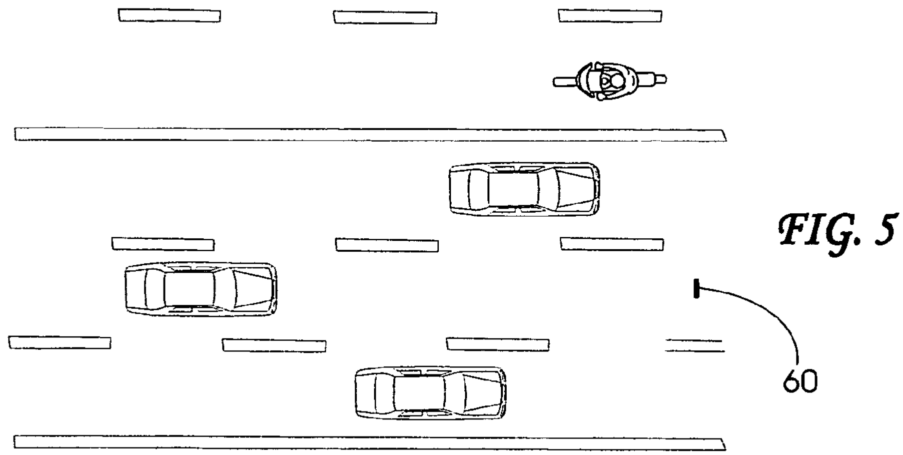
FIG. 5 is an overhead view of a roadway with vehicles and a SAW road temperature and humidity monitoring sensor.
Figure 5A:
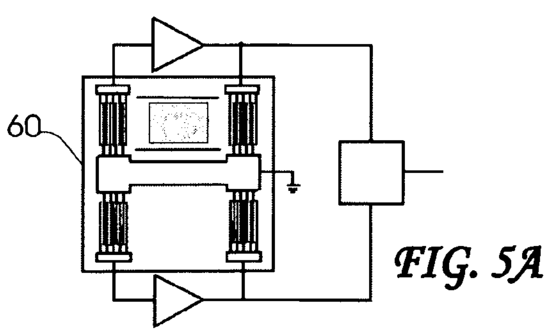
FIG. 5A is a detail drawing of the monitoring sensor of FIG. 5.

Based on the frequency and power available, and on FCC limitations, SAW or RFID or similar devices can be designed to permit transmission distances of many feet especially if minimal power is available. Since SAW and RFID devices can measure both temperature and humidity, they are also capable of monitoring road conditions in front of and around a vehicle. Thus, a properly equipped vehicle can determine the road conditions prior to entering a particular road section if such SAW devices are embedded in the road surface or on mounting structures close to the road surface as shown at 60 in FIG. 5. Such devices could provide advance warning of freezing conditions, for example. Although at 60 miles per hour such devices may only provide a one second warning if powered or if the FCC revises permitted power levels, this can be sufficient to provide information to a driver to prevent dangerous skidding. Additionally, since the actual temperature and humidity can be reported, the driver will be warned prior to freezing of the road surface. SAW device 60 is shown in detail in FIG. 5A. With vehicle-to-vehicle communication, the road conditions can be communicated as needed.

Figure 6:
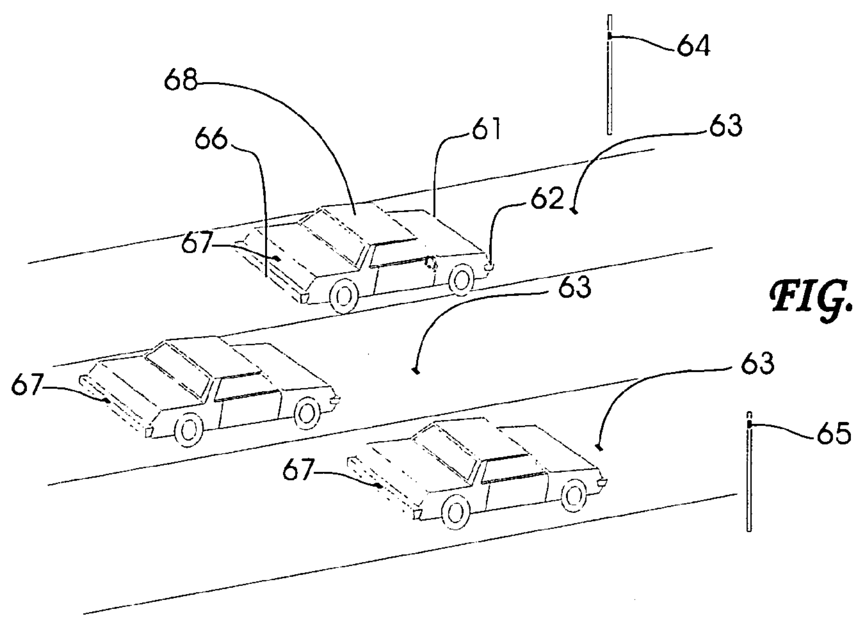
FIG. 6 is a perspective view of a SAW system for locating a vehicle on a roadway, and on the earth surface if accurate maps are available, and also illustrates the use of a SAW transponder in the license plate for the location of preceding vehicles and preventing rear end impacts.

If a SAW device 63 is placed in a roadway, as illustrated in FIG. 6, and if a vehicle 68 has two receiving antennas 61 and 62, an interrogator can transmit a signal from either of the two antennas and at a later time, the two antennas will receive the transmitted signal from the SAW device 63. By comparing the arrival time of the two received pulses, the position of vehicle 68 on a lane of the roadway can precisely calculated. If the SAW device 63 has an identification code encoded into the returned signal generated thereby, then a processor in the vehicle 68 can determine its position on the surface of the earth, provided a precise map is available such as by being stored in the processor's memory. If another antenna 66 is provided, for example, at the rear of the vehicle 68, then the longitudinal position of the vehicle 68 can also be accurately determined as the vehicle 68 passes the SAW device 63.

The SAW device 63 does not have to be in the center of the road. Alternate locations for positioning of the SAW device 63 are on overpasses above the road and on poles such as 64 and 65 on the roadside. For such cases, a source of power may be required. Such a system has an advantage over a competing system using radar and reflectors in that it is easier to measure the relative time between the two received pulses than it is to measure time-of-flight of a radar signal to a reflector and back. Such a system operates in all weather conditions and is known as a precise location system. Eventually, such a SAW device 63 can be placed every tenth of a mile along the roadway or at some other appropriate spacing. For the radar or laser radar reflection system, the reflectors can be active devices that provide environmental information in addition to location information to the interrogating vehicle.

If a vehicle is being guided by a DGPS and an accurate map system such as disclosed in U.S. Pat. No. 06,405,132 is used, a problem arises when the GPS receiver system looses satellite lock as would happen when the vehicle enters a tunnel, for example. If a precise location system as described above is placed at the exit of the tunnel, then the vehicle will know exactly where it is and can re-establish satellite lock in as little as one second rather than typically 15 seconds as might otherwise be required. Other methods making use of the cell phone system can be used to establish an approximate location of the vehicle suitable for rapid acquisition of satellite lock as described in G. M. Djuknic, R. E. Richton "Geolocation and Assisted GPS", Computer Magazine, February 2001, IEEE Computer Society, which is incorporated by reference herein in its entirety. An alternate location system is described in U.S. Pat. No. 06,480,788.

More particularly, geolocation technologies that rely exclusively on wireless networks such as time of arrival, time difference of arrival, angle of arrival, timing advance, and multipath fingerprinting, as is known to those skilled in the art, offer a shorter time-to-first-fix (TTFF) than GPS. They also offer quick deployment and continuous tracking capability for navigation applications, without the added complexity and cost of upgrading or replacing any existing GPS receiver in vehicles. Compared to either mobile-station-based, stand-alone GPS or network-based geolocation, assisted-GPS (AGPS) technology offers superior accuracy, availability and coverage at a reasonable cost. AGPS for use with vehicles can comprise a communications unit with a minimal capability GPS receiver arranged in the vehicle, an AGPS server with a reference GPS receiver that can simultaneously "see" the same satellites as the communications unit and a wireless network infrastructure consisting at least of base stations and a mobile switching center. The network can accurately predict the GPS signal the communication unit will receive and convey that information to the mobile unit such as a vehicle, greatly reducing search space size and shortening the TFF from minutes to a second or less. In addition, an AGPS receiver in the communication unit can detect and demodulate weaker signals than those that conventional GPS receivers require. Because the network performs the location calculations, the communication unit only needs to contain a scaled-down GPS receiver. It is accurate within about 15 meters when they are outdoors, an order of magnitude more sensitive than conventional GPS. Of course with the additional of differential corrections and carrier phase corrections, the location accuracy can be improved to centimeters.

Since an AGPS server can obtain the vehicle's position from the mobile switching center, at least to the level of cell and sector, and at the same time monitor signals from GPS satellites seen by mobile stations, it can predict the signals received by the vehicle for any given time. Specifically, the server can predict the Doppler shift due to satellite motion of GPS signals received by the vehicle, as well as other signal parameters that are a function of the vehicle's location. In a typical sector, uncertainty in a satellite signal's predicted time of arrival at the vehicle is about ±5 μs, which corresponds to ±5 chips of the GPS coarse acquisition (CIA) code. Therefore, an AGPS server can predict the phase of the pseudorandom noise (PRN) sequence that the receiver should use to despread the C/A signal from a particular satellite (each GPS satellite transmits a unique PRN sequence used for range measurements) and communicate that prediction to the vehicle. The search space for the actual Doppler shift and PRN phase is thus greatly reduced, and the AGPS receiver can accomplish the task in a fraction of the time required by conventional GPS receivers. Further, the AGPS server maintains a connection with the vehicle receiver over the wireless link, so the requirement of asking the communication unit to make specific measurements, collect the results and communicate them back is easily met. After despreading and some additional signal processing, an AGPS receiver returns back "pseudoranges" (that is, ranges measured without taking into account the discrepancy between satellite and receiver clocks) to the AGPS server, which then calculates the vehicle's location. The vehicle can even complete the location fix itself without returning any data to the server. Further discussion of cellular location-based systems can be found in Caffery, J. J. *Wireless Location in CDMA Cellular Radio Systems*. Kluwer Academic Publishers, 1999, ISBN:0792377036.

Sensitivity assistance, also known as modulation wipe-off, provides another enhancement to detection of GPS signals in the vehicle's receiver. The sensitivity-assistance message contains predicted data bits of the GPS navigation message, which are expected to modulate the GPS signal of specific satellites at specified times. The mobile station receiver can therefore remove bit modulation in the received GPS signal prior to coherent integration. By extending coherent integration beyond the 20-ms GPS data-bit period (to a second or more when the receiver is stationary and to 400 ms when it is fast-moving) this approach improves receiver sensitivity. Sensitivity assistance provides an additional 3-to-4-dB improvement in receiver sensitivity. Because some of the gain provided by the basic assistance (code phases and Doppler shift values) is lost when integrating the GPS receiver chain into a mobile system, this can prove crucial to making a practical receiver.

Achieving optimal performance of sensitivity assistance in TIA/EIA-95 CDMA systems is relatively straightforward because base stations and mobiles synchronize with GPS time. Given that global system for mobile communication (GSM), time division multiple access (TDMA), or advanced mobile phone service (AMPS) systems do not maintain such stringent synchronization, implementation of sensitivity assistance and AGPS technology in general will require novel approaches to satisfy the timing requirement. The standardized solution for GSM and TDMA adds time calibration receivers in the field (location measurement units) that can monitor both the wireless-system timing and GPS signals used as a timing reference.

Many factors affect the accuracy of geolocation technologies, especially terrain variations such as hilly versus flat and environmental differences such as urban versus suburban versus rural. Other factors, like cell size and interference, have smaller but noticeable effects. Hybrid approaches that use multiple geolocation technologies appear to be the most robust solution to problems of accuracy and coverage.

AGPS provides a natural fit for hybrid solutions since it uses the wireless network to supply assistance data to GPS receivers in vehicles. This feature makes it easy to augment the assistance-data message with low-accuracy distances from receiver to base stations measured by the network equipment. Such hybrid solutions benefit from the high density of base stations in dense urban environments, which are hostile to GPS signals. Conversely, rural environments, where base stations are too scarce for network-based solutions to achieve high accuracy, provide ideal operating conditions for AGPS because GPS works well there.

From the above discussion, AGPS can be a significant part of the location determining system on a vehicle and can be used to augment other more accurate systems such as DGPS and a precise positioning system based on road markers or signature matching as discussed above and in patents assigned to Intelligent Technologies International.

SAW transponders can also be placed in the license plates 67 (FIG. 6) of all vehicles at nominal cost. An appropriately equipped automobile can then determine the angular location of vehicles in its vicinity. If a third antenna 66 is placed at the center of the vehicle front, then a more accurate indication of the distance to a license plate of a preceding vehicle can also be obtained as described above. Thus, once again, a single interrogator coupled with multiple antenna systems can be used for many functions. Alternately, if more than one SAW transponder is placed spaced apart on a vehicle and if two antennas are on the other vehicle, then the direction and position of the SAW-equipped vehicle can be determined by the receiving vehicle. The vehicle-mounted SAW or RFID device can also transmit information about the vehicle on which it is mounted such as the type of vehicle (car, van, SUV, truck, emergency vehicle etc.) as well as its weight and/or mass. One problem with many of the systems disclosed above results from the low power levels permitted by the FCC. Thus changes in FCC regulations may be required before some of them can be implemented in a powerless mode.

Figure 7:
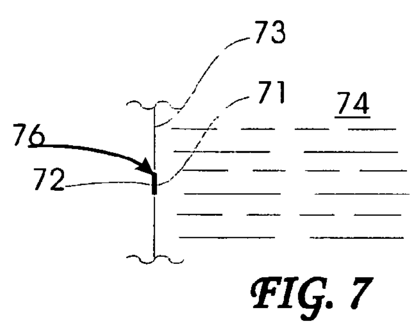
FIG. 7 is a partial cutaway view of a section of a fluid reservoir with a SAW fluid pressure and temperature sensor for monitoring oil, water, or other fluid pressure.

A general SAW temperature and pressure gage which can be wireless and powerless is shown generally at 70 located in the sidewall 73 of a fluid container 74 in FIG. 7. A pressure sensor 71 is located on the inside of the container 74, where it measures deflection of the container wall, and the fluid temperature sensor 72 on the outside. The temperature measuring SAW 70 can be covered with an insulating material to avoid the influence of the ambient temperature outside of the container 74.

Figure 8:
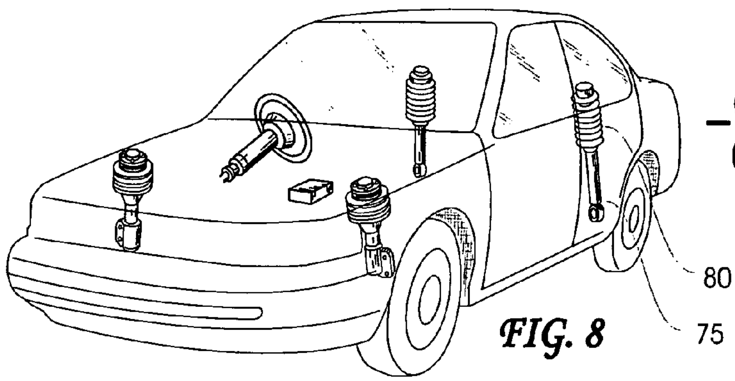
FIG. 8 is a perspective view of a vehicle suspension system with SAW load sensors.
Figure 8B:
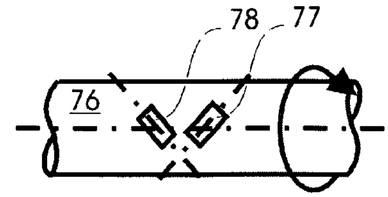
FIG. 8B is a detail view of a SAW torque sensor and shaft compression sensor arrangement for use with the arrangement of FIG. 8.
Figure 8A:
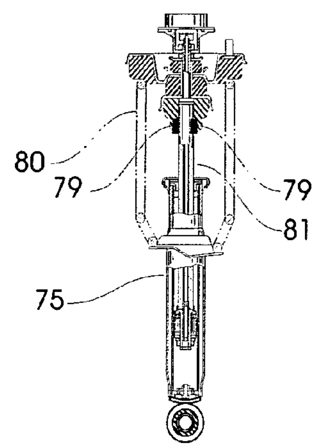
FIG. 8A is a cross section detail view of a vehicle spring and shock absorber system with a SAW torque sensor system mounted for measuring the stress in the vehicle spring of the suspension system of FIG. 8.

A SAW load sensor can also be used to measure load in the vehicle suspension system powerless and wirelessly as shown in FIG. 8. FIG. 8A illustrates a strut 75 such as either of the rear struts of the vehicle of FIG. 8. A coil spring 80 stresses in torsion as the vehicle encounters disturbances from the road and this torsion can be measured using SAW strain gages as described in U.S. Pat. No. 05,585,571 for measuring the torque in shafts. This concept is also described in U.S. Pat. No. 05,714,695. The use of SAW strain gages to measure the torsional stresses in a spring, as shown in FIG. 8B, and in particular in an automobile suspension spring has, to the knowledge of the inventor, not been previously disclosed. In FIG. 8B, the strain measured by SAW strain gage 78 is subtracted from the strain measured by SAW strain gage 77 to get the temperature compensated strain in spring 76.

Since a portion of the dynamic load is also carried by the shock absorber, the SAW strain gages 77 and 78 will only measure the steady or average load on the vehicle. However, additional SAW strain gages 79 can be placed on a piston rod 81 of the shock absorber to obtain the dynamic load. These load measurements can then be used for active or passive vehicle damping or other stability control purposes. Knowing the dynamic load on the vehicle coupled with measuring the response of the vehicle or of the load of an occupant on a seat also permits a determination of the vehicle's inertial properties and, in the case of the seat weight sensor, of the mass of an occupant and the state of the seat belt (is it buckled and what load is it adding to the seat load sensors).

Figure 9:
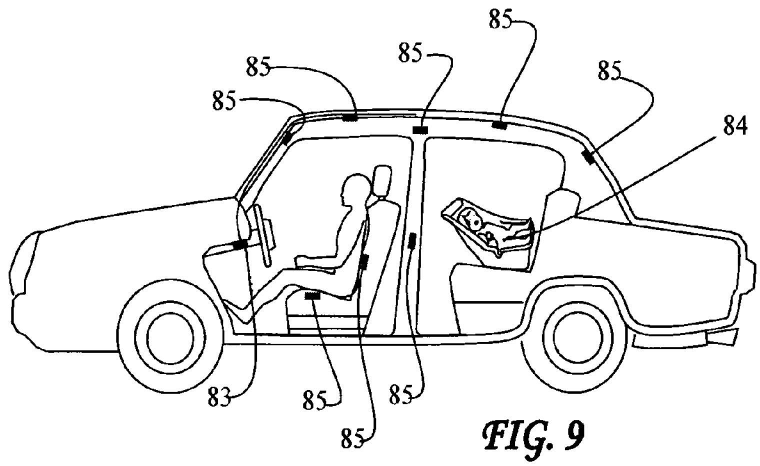
FIG. 9 is a cutaway view of a vehicle showing possible mounting locations for vehicle interior temperature, humidity, carbon dioxide, carbon monoxide, alcohol or other chemical or physical property measuring sensors.

FIG. 9 illustrates a vehicle passenger compartment, and the engine compartment, with multiple SAW or RFID temperature sensors 85. SAW temperature sensors can be distributed throughout the passenger compartment, such as on the A-pillar, on the B-pillar, on the steering wheel, on the seat, on the ceiling, on the headliner, and on the windshield, rear and side windows and generally in the engine compartment. These sensors, which can be independently coded with different IDs and/or different delays, can provide an accurate measurement of the temperature distribution within the vehicle interior. RFID switches as discussed below can also be used to isolate one device from another. Such a system can be used to tailor the heating and air conditioning system based on the temperature at a particular location in the passenger compartment. If this system is augmented with occupant sensors, then the temperature can be controlled based on seat occupancy and the temperature at that location. If the occupant sensor system is based on ultrasonics, then the temperature measurement system can be used to correct the ultrasonic occupant sensor system for the speed of sound within the passenger compartment. Without such a correction, the error in the sensing system can be as large as about 20 percent.

In one implementation, SAW temperature and other sensors can be made from PVDF film and incorporated within the ultrasonic transducer assembly. For the 40 kHz ultrasonic transducer case, for example, the SAW temperature sensor would return the several pulses sent to drive the ultrasonic transducer to the control circuitry using the same wires used to transmit the pulses to the transducer after a delay that is proportional to the temperature within the transducer housing. Thus, a very economical device can add this temperature sensing function using much of the same hardware that is already present for the occupant sensing system. Since the frequency is low, PVDF could be fabricated into a very low cost temperature sensor for this purpose. Other piezoelectric materials can of course also be used.

Note, the use of PVDF as a piezoelectric material for wired and wireless SAW transducers or sensors is an important disclosure of at least one of the inventions disclosed herein. Such PVDF SAW devices can be used as chemical, biological, temperature, pressure and other SAW sensors as well as for switches. Such devices are very inexpensive to manufacture and are suitable for many vehicle-mounted devices as well as for other non-vehicle-mounted sensors. Disadvantages of PVDF stem from the lower piezoelectric constant (compared with lithium niobate) and the low acoustic wave velocity thus limiting the operating frequency. The key advantage is very low cost. When coupled with plastic electronics (plastic chips), it now becomes very economical to place sensors throughout the vehicle for monitoring a wide range of parameters such as temperature, pressure, chemical concentration etc. In particular implementations, an electronic nose based on SAW or RFID technology and neural networks can be implemented in either a wired or wireless manner for the monitoring of cargo containers or other vehicle interiors (or building interiors) for anti-terrorist or security purposes. See, for example, Reznik, A. M. "Associative Memories for Chemical Sensing", IEEE 2002 ICONIP, p. 2630–2634 vol. 5. In this manner, other sensors can be combined with the temperature sensors 85, or used separately, to measure carbon dioxide, carbon monoxide, alcohol, biological agents, radiation, humidity or other desired chemicals or agents as discussed above. Note, although the examples generally used herein are from the automotive industry, many of the devices disclosed herein can be advantageously used with other vehicles including trucks, boats, airplanes and shipping containers.

The SAW temperature sensors 85 provide the temperature at their mounting location to a processor unit 83 via an interrogator with the processor unit 83 including appropriate control algorithms for controlling the heating and air conditioning system based on the detected temperatures. The processor unit 83 can control, e.g., which vents in the vehicle are open and closed, the flow rate through vents and the temperature of air passing through the vents. In general, the processor unit 83 can control whatever adjustable components are present or form part of the heating and air conditioning system.

In FIG. 9 a child seat 84 is illustrated on the rear vehicle seat. The child seat 84 can be fabricated with one or more RFID tags or SAW tags (not shown). The RFID and SAW tag(s) can be constructed to provide information on the occupancy of the child seat, i.e., whether a child is present, based on the weight, temperature, and/or any other measurable parameter. Also, the mere transmission of waves from the RFID or SAW tag(s) on the child seat 84 would be indicative of the presence of a child seat. The RFID and SAW tag(s) can also be constructed to provide information about the orientation of the child seat 84, i.e., whether it is facing rearward or forward. Such information about the presence and occupancy of the child seat and its orientation can be used in the control of vehicular systems, such as the vehicle airbag system or heating or air conditioning system, especially useful when a child is left in a vehicle. In this case, a processor would control the airbag or HVAC system and would receive information from the RFID and SAW tag(s) via an interrogator.

Figure 10A:
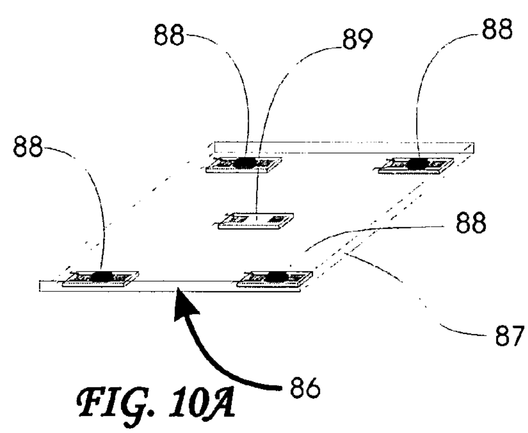
FIG. 10A is a perspective view of a SAW tilt sensor using four SAW assemblies for tilt measurement and one for temperature.

There are many applications for which knowledge of the pitch and/or roll orientation of a vehicle or other object is desired. An accurate tilt sensor can be constructed using SAW devices. Such a sensor is illustrated in FIG. 10A and designated 86. This sensor 86 can utilize a substantially planar and rectangular mass 87 and four supporting SAW devices 88 which are sensitive to gravity. For example, the mass 87 acts to deflect a membrane on which the SAW device 88 resides thereby straining the SAW device 88. Other properties can also be used for a tilt sensor such as the direction of the earth's magnetic field. SAW devices 88 are shown arranged at the corners of the planar mass 87, but it must be understood that this arrangement is an exemplary embodiment only and not intended to limit the invention. A fifth SAW device 89 can be provided to measure temperature. By comparing the outputs of the four SAW devices 88, the pitch and roll of the automobile can be measured. This sensor 86 can be used to correct errors in the SAW rate gyros described above. If the vehicle has been stationary for a period of time, the yaw SAW rate gyro can initialized to 0 and the pitch and roll SAW gyros initialized to a value determined by the tilt sensor of FIG. 10A. Many other geometries of tilt sensors utilizing one or more SAW devices can now be envisioned for automotive and other applications.

Figure 10B:
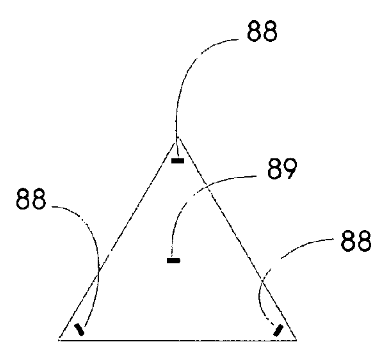
FIG. 10B is a top view of a SAW tilt sensor using three SAW assemblies for tilt measurement each one of which can also measure temperature.

In particular, an alternate preferred configuration is illustrated in FIG. 10B where a triangular geometry is used. In this embodiment, the planar mass is triangular and the SAW devices 88 are arranged at the corners, although as with FIG. 10A, this is a non-limiting, preferred embodiment.

Figure 11:
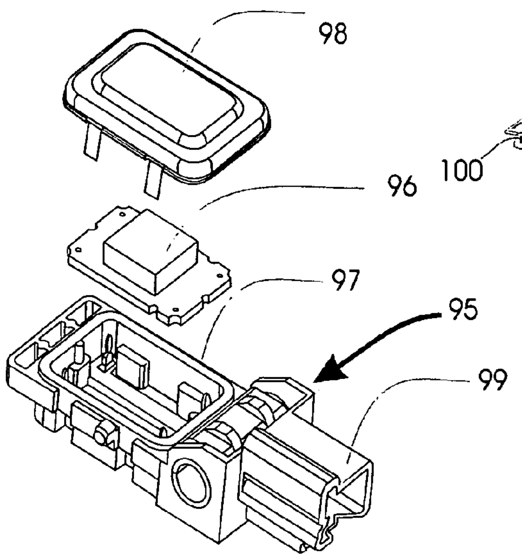
FIG. 11 is a perspective exploded view of a SAW crash sensor for sensing frontal, side or rear crashes.

Either of the SAW accelerometers described above can be utilized for crash sensors as shown in FIG. 11. These accelerometers have a substantially higher dynamic range than competing accelerometers now used for crash sensors such as those based on MEMS silicon springs and masses and others based on MEMS capacitive sensing. As discussed above, this is partially a result of the use of frequency or phase shifts which can be measured over a very wide range. Additionally, many conventional accelerometers that are designed for low acceleration ranges are unable to withstand high acceleration shocks without breaking. This places practical limitations on many accelerometer designs so that the stresses in the silicon are not excessive. Also for capacitive accelerometers, there is a narrow limit over which distance, and thus acceleration, can be measured.

The SAW accelerometer for this particular crash sensor design is housed in a container 96 which is assembled into a housing 97 and covered with a cover 98. This particular implementation shows a connector 99 indicating that this sensor would require power and the response would be provided through wires. Alternately, as discussed for other devices above, the connector 99 can be eliminated and the information and power to operate the device transmitted wirelessly. Also, power can be supplied thorough a connector and stored in a capacitor while the information is transmitted wirelessly thus protecting the system from a wire failure during a crash when the sensor is mounted in the crush zone. Such sensors can be used as frontal, side or rear impact sensors. They can be used in the crush zone, in the passenger compartment or any other appropriate vehicle location. If two such sensors are separated and have appropriate sensitive axes, then the angular acceleration of the vehicle can also be determined. Thus, for example, forward-facing accelerometers mounted in the vehicle side doors can be used to measure the yaw acceleration of the vehicle. Alternately, two vertical sensitive axis accelerometers in the side doors can be used to measure the roll acceleration of vehicle, which would be useful for rollover sensing.

Figure 12:
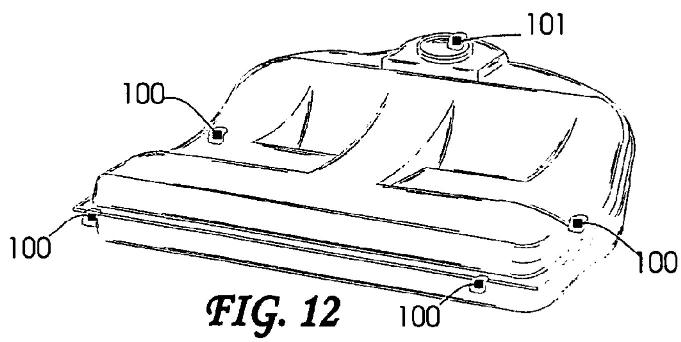
FIG. 12 is a perspective view with portions cutaway of a SAW based vehicle gas gage.
Figure 12A:
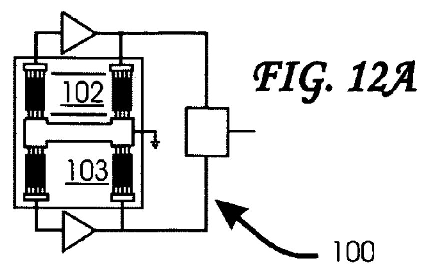
FIG. 12A is a top detailed view of a SAW pressure and temperature monitor for use in the system of FIG. 12.

U.S. Pat. No. 06,615,656, assigned to the current assignee of this invention, and the description below, provides multiple apparatus for determining the amount of liquid in a tank. Using the SAW pressure devices of this invention, multiple pressure sensors can be placed at appropriate locations within a fuel tank to measure the fluid pressure and thereby determine the quantity of fuel remaining in the tank. This can be done both statically and dynamically. This is illustrated in FIG. 12. In this example, four SAW pressure transducers 100 are placed on the bottom of the fuel tank and one SAW pressure transducer 101 is placed at the top of the fuel tank to eliminate the effects of vapor pressure within tank. Using neural networks, or other pattern recognition techniques, the quantity of fuel in the tank can be accurately determined from these pressure readings in a manner similar to that described the '656 patent and below. The SAW measuring device illustrated in FIG. 12A combines temperature and pressure measurements in a single unit using parallel paths 102 and 103 in the same manner as described above.

Figure 13A:
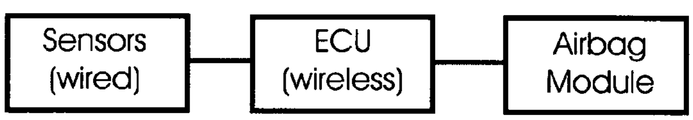
FIG. 13A is a schematic of a prior art deployment scheme for an airbag module.
Figure 13B:
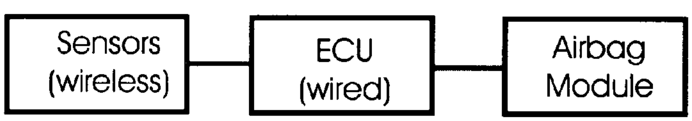
FIG. 13B is a schematic of a deployment scheme for an airbag module in accordance with the invention.

FIG. 13A shows a schematic of a prior art airbag module deployment scheme in which sensors, which detect data for use in determining whether to deploy an airbag in the airbag module, are wired to an electronic control unit (ECU) and a command to initiate deployment of the airbag in the airbag module is sent wirelessly. By contrast, as shown in FIG. 13B, in accordance with an invention herein, the sensors are wirelessly connected to the electronic control unit and thus transmit data wirelessly. The ECU is however wired to the airbag module. The ECU could also be connected wirelessly to the airbag module. Alternately, a safety bus can be used in place of the wireless connection.

SAW sensors also have applicability to various other sectors of the vehicle, including the powertrain, chassis, and occupant comfort and convenience. For example, SAW and RFID sensors have applicability to sensors for the powertrain area including oxygen sensors, gear-tooth Hall effect sensors, variable reluctance sensors, digital speed and position sensors, oil condition sensors, rotary position sensors, low pressure sensors, manifold absolute pressure/manifold air temperature (MAP/MAT) sensors, medium pressure sensors, turbo pressure sensors, knock sensors, coolant/fluid temperature sensors, and transmission temperature sensors.

SAW sensors for chassis applications include gear-tooth Hall effect sensors, variable reluctance sensors, digital speed and position sensors, rotary position sensors, non-contact steering position sensors, and digital ABS (anti-lock braking system) sensors. In one implementation, a Hall Effect tire pressure monitor comprises a magnet that rotates with a vehicle wheel and is sensed by a Hall Effect device which is attached to a SAW or RFID device that is wirelessly interrogated. This arrangement eliminates the need to run a wire into each wheel well.

SAW sensors for the occupant comfort and convenience field include low tire pressure sensors, HVAC temperature and humidity sensors, air temperature sensors, and oil condition sensors.

SAW sensors also have applicability such areas as controlling evaporative emissions, transmission shifting, mass air flow meters, oxygen, NOx and hydrocarbon sensors. SAW based sensors are particularly useful in high temperature environments where many other technologies fail.

SAW sensors can facilitate compliance with U.S. regulations concerning evaporative system monitoring in vehicles, through a SAW fuel vapor pressure and temperature sensors that measure fuel vapor pressure within the fuel tank as well as temperature. If vapors leak into the atmosphere, the pressure within the tank drops. The sensor notifies the system of a fuel vapor leak, resulting in a warning signal to the driver and/or notification to a repair facility, vehicle manufacturer and/or compliance monitoring facility. This application is particularly important since the condition within the fuel tank can be ascertained wirelessly reducing the chance of a fuel fire in an accident. The same interrogator that monitors the tire pressure SAW sensors can also monitor the fuel vapor pressure and temperature sensors resulting in significant economies.

A SAW humidity sensor can be used for measuring the relative humidity and the resulting information can be input to the engine management system or the heating, ventilation and air conditioning (HVAC) system for more efficient operation. The relative humidity of the air entering an automotive engine impacts the engine's combustion efficiency; i.e., the ability of the spark plugs to ignite the fuel/air mixture in the combustion chamber at the proper time. A SAW humidity sensor in this case can measure the humidity level of the incoming engine air, helping to calculate a more precise fuel/air ratio for improved fuel economy and reduced emissions.

Dew point conditions are reached when the air is fully saturated with water. When the cabin dew point temperature matches the windshield glass temperature, water from the air condenses quickly, creating frost or fog. A SAW humidity sensor with a temperature-sensing element and a window glass-temperature-sensing element can prevent the formation of visible fog formation by automatically controlling the HVAC system.

Figure 14:
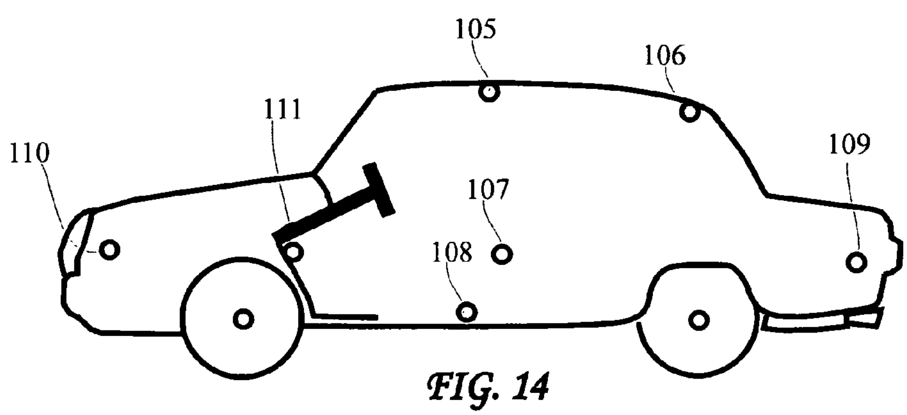
FIG. 14 is a schematic of a vehicle with several accelerometers and/or gyroscopes at preferred locations in the vehicle.

FIG. 14 illustrates the placement of a variety of sensors, primarily accelerometers and/or gyroscopes, which can be used to diagnose the state of the vehicle itself. Sensor 105 can be located in the headliner or attached to the vehicle roof above the side door. Typically, there can be two such sensors one on either side of the vehicle. Sensor 106 is shown in a typical mounting location midway between the sides of the vehicle attached to or near the vehicle roof above the rear window. Sensor 109 is shown in a typical mounting location in the vehicle trunk adjacent the rear of the vehicle. One, two or three such sensors can be used depending on the application. If three such sensors are used, preferably one would be adjacent each side of vehicle and one in the center. Sensor 107 is shown in a typical mounting location in the vehicle door and sensor 108 is shown in a typical mounting location on the sill or floor below the door. Sensor 110, which can be also multiple sensors, is shown in a typical mounting location forward in the crush zone of the vehicle. Finally, sensor 111 can measure the acceleration of the firewall or instrument panel and is located thereon generally midway between the two sides of the vehicle. If three such sensors are used, one would be adjacent each vehicle side and one in the center. An IMU would serve basically the same functions.

In general, sensors 105–111 provide a measurement of the state of the vehicle, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 105–111 above is merely exemplary and is not intended to limit the form of the sensor or its function. Thus, these sensors may or may not be SAW or RFID sensors and may be powered or unpowered and may transmit their information through a wire harness, a safety or other bus or wirelessly.

Each of the sensors 105–111 may be single axis, double axis or triaxial accelerometers and/or gyroscopes typically of the MEMS type. One or more can be IMUs. These sensors 105–111 can either be wired to the central control module or processor directly wherein they would receive power and transmit information, or they could be connected onto the vehicle bus or, in some cases, using RFID, SAW or similar technology, the sensors can be wireless and would receive their power through RF from one or more interrogators located in the vehicle. In this case, the interrogators can be connected either to the vehicle bus or directly to control module. Alternately, an inductive or capacitive power and/or information transfer system can be used.

One particular implementation will now be described. In this case, each of the sensors 105–111 is a single or dual axis accelerometer. They are made using silicon micromachined technology such as described in U.S. Pat. No. 05,121,180 and U.S. Pat. No. 05,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are believed to be expensive for automotive applications. However new developments by the current assignee are reducing this cost and such gyroscopes are likely to become cost effective in a few years. On the other hand, typical MEMS gyroscopes are not sufficiently accurate for many control applications unless corrected using location technology such as precise positioning or GPS-based systems as described elsewhere herein.

The angular rate function can be obtained by placing accelerometers at two separated, non-co-located points in a vehicle and using the differential acceleration to obtain an indication of angular motion and angular acceleration. From the variety of accelerometers shown in FIG. 14, it can be appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than uncorrected conventional MEMS gyroscopes. Alternately, it has been found that from a single package containing up to three low cost MEMS gyroscopes and three low cost MEMS accelerometers, when carefully calibrated, an accurate inertial measurement unit (IMU) can be constructed that performs as well as units costing a great deal more. Such a package is sold by Crossbow Technology, Inc. 41 Daggett Dr., San Jose, Calif. 95134. If this IMU is combined with a GPS system and sometimes other vehicle sensor inputs using a Kalman filter, accuracy approaching that of expensive military units can be achieved. A preferred IMU that uses a single device to sense both accelerations in three directions and angular rates about three axis is described in U.S. Pat. No. 04,711,125. Although this device has been available for many years, it has not been applied to vehicle sensing and in particular automobile vehicle sensing for location and navigational purposes.

Instead of using two accelerometers at separate locations on the vehicle, a single conformal MEMS-IDT gyroscope may be used. Such a conformal MEMS-IDT gyroscope is described in a paper by V. K. Varadan, "Conformal MEMS-IDT Gyroscopes and Their Comparison With Fiber Optic Gyro", Proceedings of SPIE Vol. 3990 (2000). The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures. Other SAW-based gyroscopes are also now under development.

The system of FIG. 14 using dual axis accelerometers, or the IMU Kalman filter system, therefore provides a complete diagnostic system of the vehicle itself and its dynamic motion. Such a system is far more accurate than any system currently available in the automotive market. This system provides very accurate crash discrimination since the exact location of the crash can be determined and, coupled with knowledge of the force deflection characteristics of the vehicle at the accident impact site, an accurate determination of the crash severity and thus the need for occupant restraint deployment can be made. Similarly, the tendency of a vehicle to rollover can be predicted in advance and signals sent to the vehicle steering, braking and throttle systems to attempt to ameliorate the rollover situation or prevent it. In the event that it cannot be prevented, the deployment side curtain airbags can be initiated in a timely manner. Additionally, the tendency of the vehicle to the slide or skid can be considerably more accurately determined and again the steering, braking and throttle systems commanded to minimize the unstable vehicle behavior. Thus, through the deployment of inexpensive accelerometers at a variety of locations in the vehicle, or the IMU Kalman filter system, significant improvements are made in vehicle stability control, crash sensing, rollover sensing and resulting occupant protection technologies.

As mentioned above, the combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 14 and simultaneously the dynamic strain gage measurements from seat-mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, a sensor, not shown, that can be one or more strain gage weight sensors, is mounted on the seat or in connection with the seat or its support structure. Suitable mounting locations and forms of weight sensors are discussed in the current assignee's U.S. Pat. No. 06,242,701 and contemplated for use in the inventions disclosed herein as well. The mass or weight of the occupying item of the seat can thus be measured based on the dynamic measurement of the strain gages with optional consideration of the measurements of accelerometers on the vehicle, which are represented by any of sensors 105–111.

A SAW Pressure Sensor can also be used with bladder weight sensors permitting that device to be interrogated wirelessly and without the need to supply power. Similarly, a SAW device can be used as a general switch in a vehicle and in particular as a seatbelt buckle switch indicative of seatbelt use. SAW devices can also be used to measure seatbelt tension or the acceleration of the seatbelt adjacent to the chest or other part of the occupant and used to control the occupant's acceleration during a crash. Such systems can be boosted as disclosed herein or not as required by the application. These inventions are disclosed in patents and patent applications of the current assignee.

The operating frequency of SAW devices has hereto for been limited to less that about 500 MHz due to problems in lithography resolution, which of course is constantly improving and currently SAW devices based on lithium niobate are available that operate at 2.4 GHz. This lithography problem is related to the speed of sound in the SAW material. Diamond has the highest speed of sound and thus would be an ideal SAW material. However, diamond is not piezoelectric. This problem can be solved partially by using a combination or laminate of diamond and a piezoelectric material. Recent advances in the manufacture of diamond films that can be combined with a piezoelectric material such as lithium niobate promise to permit higher frequencies to be used since the spacing between the inter-digital transducer (IDT) fingers can be increased for a given frequency. A particularly attractive frequency is 2.4 GHz or Wi-Fi as the potential exists for the use of more sophisticated antennas such as the Yagi antenna or the Motia smart antenna that have more gain and directionality. In a different development, SAW devices have been demonstrated that operate in the tens of GHz range using a novel stacking method to achieve the close spacing of the IDTs.

Figure 15A:
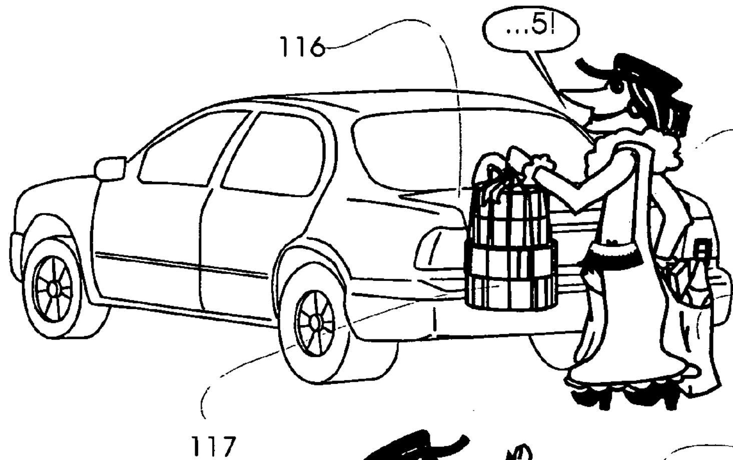
FIG. 15A illustrates a driver with a timed RFID standing with groceries by a closed trunk.
Figure 15B:
FIG. 15B illustrates the driver with the timed RFID 5 seconds after the trunk has been opened.

In a related invention, the driver can be provided with a keyless entry device, other RFID tag, smart card or cell phone with an RF transponder that can be powerless in the form of an RFID or similar device, which can also be boosted as described herein. The interrogator determines the proximity of the driver to the vehicle door or other similar object such as a building or house door or vehicle trunk. As shown in FIG. 15A, if a driver 118 remains within 1 meter, for example, from the door or trunk lid 116, for example, for a time period such as 5 seconds, then the door or trunk lid 116 can automatically unlock and ever open in some implementations. Thus, as the driver 118 approaches the trunk with his or her arms filled with packages 117 and pauses, the trunk can automatically open (see FIG. 15B). Such a system would be especially valuable for older people. Naturally, this system can also be used for other systems in addition to vehicle doors and trunk lids.

Figure 15C:
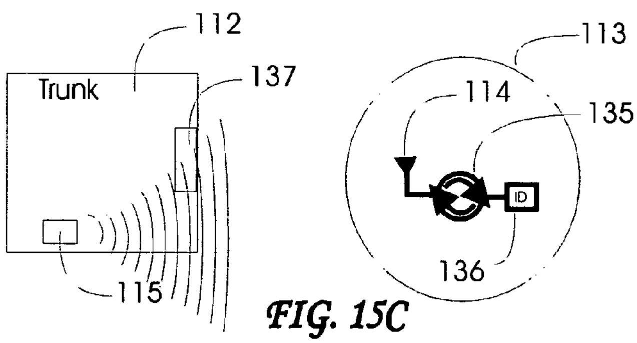
FIG. 15C illustrates a trunk opening arrangement for a vehicle in accordance with the invention.

As shown in FIG. 15C, an interrogator 115 is placed on the vehicle, e.g., in the trunk 112 as shown, and transmits waves. When the keyless entry device 113, which contains an antenna 114 and a circuit including a circulator 135 and a memory containing a unique ID code 136, is a set distance from the interrogator 115 for a certain duration of time, the interrogator 115 directs a trunk opening device 137 to open the trunk lid 116

Figure 16B:
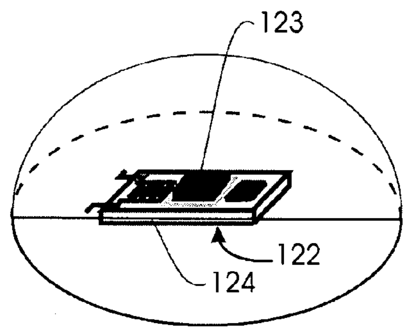
FIG. 16B is a detailed perspective view of the device of FIG. 16A with the force-transmitting member rendered transparent.
Figure 16A:
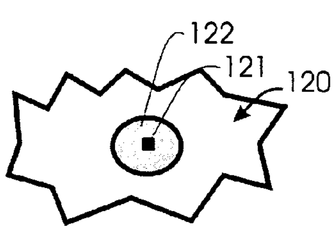
FIG. 16A is a view of a view of a SAW switch sensor for mounting on or within a surface such as a vehicle armrest.

A SAW device can also be used as a wireless switch as shown in FIGS. 16A and 16B. FIG. 16A illustrates a surface 120 containing a projection 122 on top of a SAW device 121. Surface material 120 could be, for example, the armrest of an automobile, the steering wheel airbag cover, or any other surface within the passenger compartment of an automobile or elsewhere. Projection 122 will typically be a material capable of transmitting force to the surface of SAW device 121. As shown in FIG. 20B, a projection 123 may be placed on top of the SAW device 124. This projection 123 permits force exerted on the projection 122 to create a pressure on the SAW device 124. This increased pressure changes the time delay or natural frequency of the SAW wave traveling on the surface of material. Alternately, it can affect the magnitude of the returned signal. The projection 123 is typically held slightly out of contact with the surface until forced into contact with it.

Figure 16C:
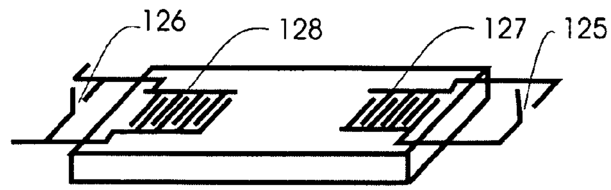
FIG. 16C is a detailed perspective view of an alternate SAW device for use in FIGS. 16A and 16B showing the use of one of two possible switches, one that activates the SAW and the other that suppresses the SAW.

An alternate approach is to place a switch across the IDT 127 as shown in FIG. 16C. If switch 125 is open, then the device will not return a signal to the interrogator. If it is closed, than the IDT 127 will act as a reflector sending a signal back to IDT 128 and thus to the interrogator. Alternately, a switch 126 can be placed across the SAW device.

In this case, a switch closure shorts the SAW device and no signal is returned to the interrogator. For the embodiment of FIG. 16C, using switch 126 instead of switch 125, a standard reflector IDT would be used in place of the IDT 127.

Most SAW-based accelerometers work on the principle of straining the SAW surface and thereby changing either the time delay or natural frequency of the system. An alternate novel accelerometer is illustrated FIG. 17A wherein a mass 130 is attached to a silicone rubber coating 131 which has been applied the SAW device. Acceleration of the mass in FIG. 17A in the direction of arrow X changes the amount of rubber in contact with the surface of the SAW device and thereby changes the damping, natural frequency or the time delay of the device. By this method, accurate measurements of acceleration below 1 G are readily obtained. Furthermore, this device can withstand high deceleration shocks without damage. FIG. 17B illustrates a more conventional approach where the strain in a beam 132 caused by the acceleration acting on a mass 133 is measured with a SAW strain sensor 134.

It is important to note that all of these devices have a high dynamic range compared with most competitive technologies. In some cases, this dynamic range can exceed 100,000 and up to 1,000,000 has been reported. This is the direct result of the ease with which frequency and phase can be accurately measured.

A gyroscope, which is suitable for automotive applications, is illustrated in FIG. 18 and described in detail in Varadan U.S. Pat. No. 06,516,665. This SAW-based gyroscope has applicability for the vehicle navigation, dynamic control, and rollover sensing among others.

Figure 19C:
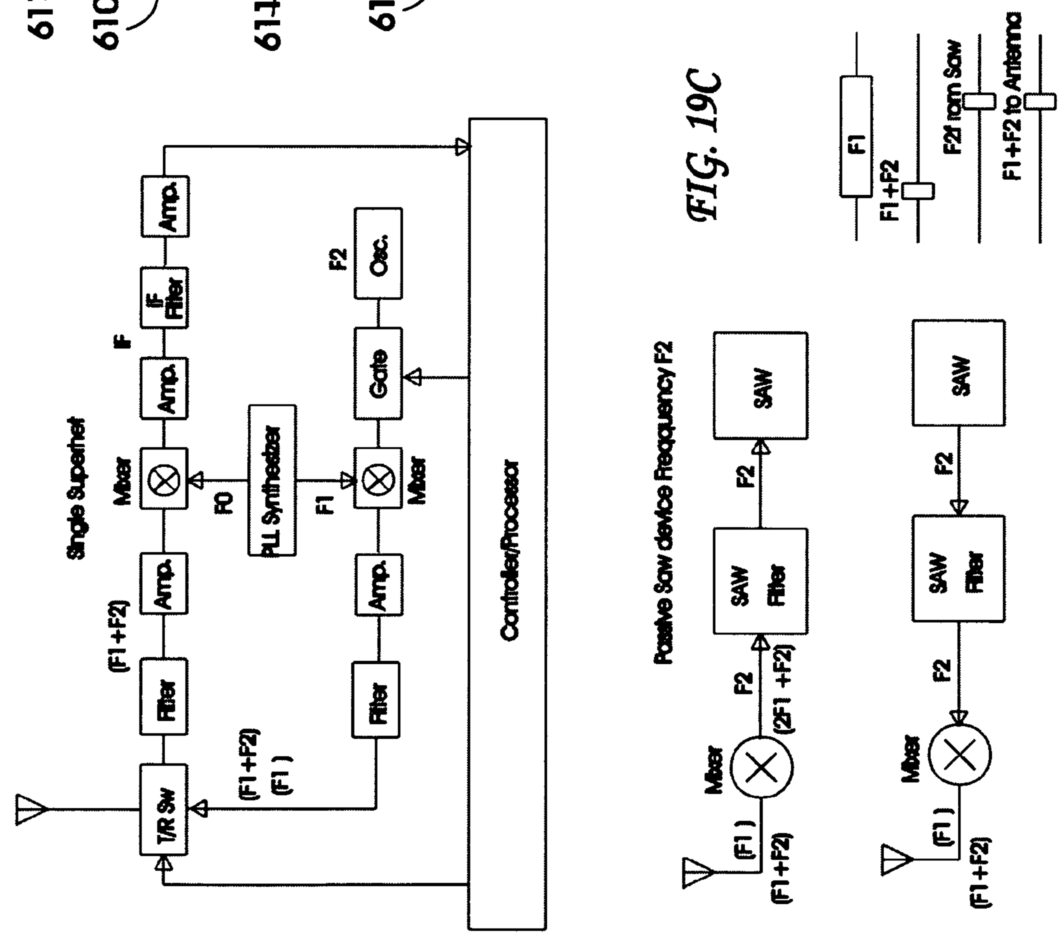

Note that any of the disclosed applications can be interrogated by the central interrogator of this invention and can either be powered or operated powerlessly as described in general above. Block diagrams of three interrogators suitable for use in this invention are illustrated in FIGS. 19A–19C. FIG. 19A illustrates a super heterodyne circuit and FIG. 19B illustrates a dual super heterodyne circuit. FIG. 19C operates as follows. During the burst time two frequencies, F1 and F1+F2, are sent by the transmitter after being generated by mixing using oscillator Osc. The two frequencies are needed by the SAW transducer where they are mixed yielding F2 which is modulated by the SAW and contains the information. Frequency (F1+F2) is sent only during the burst time while frequency F1 remains on until the signal F2 returns from the SAW. This signal is used for mixing. The signal returned from the SAW transducer to the interrogator is F1+F2 where F2 has been modulated by the SAW transducer. It is expected that the mixing operations will result in about 12 db loss in signal strength.

As discussed, theoretically a SAW can be used for any sensing function provided the surface across which the acoustic wave travels can be modified in terms of its length, mass, elastic properties or any property that affects the travel distance, speed, amplitude or damping of the surface wave. Thus, gases and vapors can be sensed through the placement of a layer on the SAW that absorbs the gas or vapor, for example (a chemical sensor or electronic nose). Similarly, a radiation sensor can result through the placement of a radiation sensitive coating on the surface of the SAW.

Normally, a SAW device is interrogated with a constant amplitude and frequency RF pulse. This need not be the case and a modulated pulse can also be used. If for example a pseudorandom or code modulation is used, then a SAW interrogator can distinguish its communication from that of another vehicle that may be in the vicinity. This doesn't totally solve the problem of interrogating a tire that is on an adjacent vehicle but it does solve the problem of the interrogator being confused by the transmission from another interrogator. This confusion can also be partially solved if the interrogator only listens for a return signal based on when it expects that signal to be present based on when it sent the signal. That expectation can be based on the physical location of the tire relative to the interrogator which is unlikely to come from a tire on an adjacent vehicle which only momentarily could be at an appropriate distance from the interrogator. The interrogator would of course need to have correlation software in order to be able to differentiate the relevant signals. The correlation technique also permits the interrogator to separate the desired signals from noise thereby improving the sensitivity of the correlator. An alternate approach as discussed elsewhere herein is to combine a SAW sensor with an RFID switch where the switch is programmed to open or close based on the receipt of the proper identification code.

As discussed elsewhere herein, the particular tire that is sending a signal can be determined if multiple antennas, such as three, each receive the signal. For a 500 MHz signal, for example, the wave length is about 60 cm. If the distance from a tire transmitter to each of three antennas is on the order of one meter, then the relative distance from each antenna to the transmitter can be determined to within a few centimeters and thus the location of the transmitter can be found by triangulation. If that location is not a possible location for a tire transmitter, then the data can be ignored thus solving the problem of a transmitter from an adjacent vehicle being read by the wrong vehicle interrogator. This will be discussed in more detail below with regard to solving the problem of a truck having 18 tires that all need to be monitored. Note also, each antenna can have associated with it some simple circuitry that permits it to receive a signal, amplify it, change its frequency and retransmit it either through a wire of through the air to the interrogator thus eliminating the need for long and expensive coax cables.

U.S. Pat. No. 06,622,567 describes a peak strain RFID technology based device with the novelty being the use of a mechanical device that records the peak strain experienced by the device. Like the system of the invention herein, the system does not require a battery and receives its power from the RFID circuit. The invention described herein includes the use of RFID based sensors either in the peak strain mode or in the preferred continuous strain mode. This invention is not limited to measuring strain as SAW and RFID based sensors can be used for measuring many other parameters including chemical vapor concentration, temperature, acceleration, angular velocity etc.

A key aspect of at least one of the inventions disclosed herein is the use of an interrogator to wirelessly interrogate multiple sensing devices thereby reducing the cost of the system since such sensors are in general inexpensive compared to the interrogator. The sensing devices are preferably based of SAW and/or RFID technologies although other technologies are applicable.

1.3.1 Antenna Considerations

Antennas are a very important aspect to SAW and RFID wireless devices such as can be used in tire monitors, seat monitors, weight sensors, child seat monitors, fluid level sensors and similar devices or sensors which monitor, detect, measure, determine or derive physical properties or characteristics of a component in or on the vehicle or of an area near the vehicle, as disclosed in the current assignee's patents and pending patent applications. In many cases, the location of a SAW or RFID device needs to be determined such as when a device is used to locate the position of a movable item in or on a vehicle such as a seat. In other cases, the particular device from a plurality of similar devices, such as a tire pressure and/or temperature monitor that is reporting, needs to be identified. Thus, a combination of antennas can be used and the time or arrival, angle of arrival, multipath signature or similar method used to identify the reporting device. One preferred method is derived from the theory of smart antennas whereby the signals from multiple antennas are combined to improve the signal-to-noise ratio of the incoming or outgoing signal in the presence of multipath effects, for example.

Additionally, since the signal level from a SAW or RFID device is frequently low, various techniques can be used to improve the signal-to-noise ratio as described below. Finally, at the frequencies frequently used such as 433 MHz, the antennas can become large and methods are needed to reduce their size. These and other antenna considerations that can be used to improve the operation of SAW, RFID and similar wireless devices are described below.

1.3.1.1 Tire Information Determination

Figure 20A:
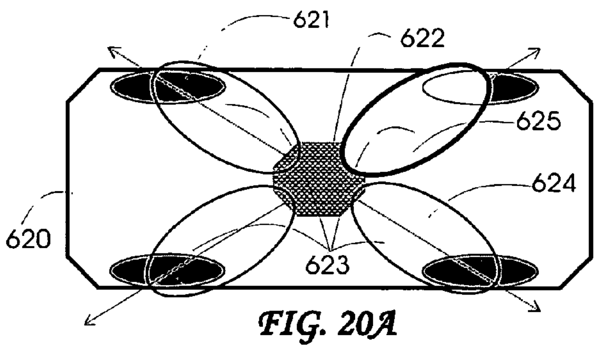
FIG. 20A is a top view of a system for obtaining information about a vehicle or a component therein, specifically information about the tires, such as pressure and/or temperature thereof.
Figure 20C:
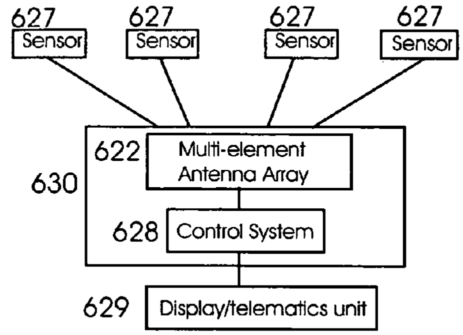
FIG. 20C is a schematic of the system shown in FIGS. 20A and 20B.
Figure 20B:
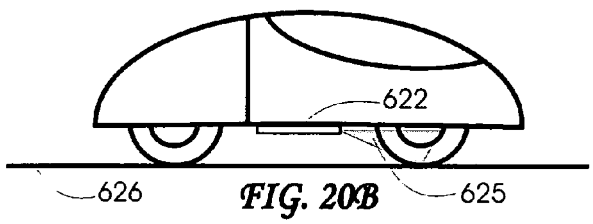
FIG. 20B is a side view of the vehicle shown in FIG. 20A.

One method of maintaining a single central antenna assembly while interrogating all four tires on a conventional automobile, is illustrated in FIGS. 20A and 20B. An additional antenna can be located near the spare tire, which is not shown. It should be noted that the system described below is equally applicable for vehicles with more than four tires such as trucks.

A vehicle body is illustrated as 620 having four tires 621 and a centrally mounted four element, switchable directional antenna array 622. The four beams are shown schematically as 623 with an inactivated beam as 624 and the activated beam as 625. The road surface 626 supports the vehicle. An electronic control circuit, not shown, which may reside inside the antenna array housing 622 or elsewhere, alternately switches each of the four antennas of the array 622 which then sequentially, or in some other pattern, send RF signals to each of the four tires 621 and wait for the response from the RFID, SAW or similar tire pressure, temperature, ID, acceleration and/or other property monitor arranged in connection with or associated with the tire 621. This represents a time domain multiple access system.

The interrogator makes sequential interrogation of wheels as follows:

Stage 1. Interrogator radiates 8 RF pulses via the first RF port directed to the 0 st wheel.

Pulse duration is about 0.8 μs.

Pulse repetition period is about 40 μs.

Pulse amplitude is about 8 V (peak to peak)

Carrier frequency is about 426.00 MHz.

(Of course, between adjacent pulses receiver opens its input and receives four-pulses echoes from transponder located in the first wheel).

Then, during a time of about 8 ms internal micro controller processes and stores received data.

Total duration of this stage is 32 μs+8 ms=8.032 ms.

Stage 2,3,4. Interrogator repeats operations as on stage 1 for $2^{nd}$, $3^{rd}$ and $4^{th}$ wheel sequentially via appropriate RF ports. Stage 5. Interrogator stops radiating RF pulses and transfers data stored during stages 1–4 to the external PC for final processing and displaying. Then it returns to stage 1. The time interval for data transfer equals about 35 ms.

Some notes relative to FCC Regulations:

The total duration of interrogation cycle of four wheels is $$8.032\text{ ms}*4+35\text{ ms}=67.12\text{ ms}.$$

During this time, interrogator radiates 8*4=32 pulses, each of 0.8 μs duration.

Thus, average period of pulse repetition is $$67.12\text{ ms}/32=2.09\text{ ms}=2090\ \mu\text{s}$$

Assuming that duration of the interrogation pulse is 0.8 μs as mentioned, an average repetition rate is obtained $$0.8\ \mu\text{s}/2090\ \mu\text{s}=0.38*10^{-3}$$

Finally, the radiated pulse power is $$Pp=(4\text{ V})^2/(2*50\text{ Ohm})=0.16\text{ W}$$

and the average radiated power is $$Pave=0.16*0.38*10^{-3}=0.42*10^{-3}\text{ W, or }0.42\text{ mW}$$

Figure 21:
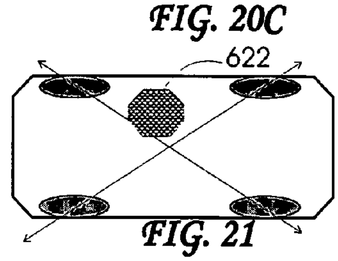
FIG. 21 is a top view of an alternate system for obtaining information about the tires of a vehicle.

In another application, the antennas of the array 622 transmit the RF signals simultaneously and space the returns through the use of a delay line in the circuitry from each antenna so that each return is spaced in time in a known manner without requiring that the antennas be switched. Another method is to offset the antenna array, as illustrated in FIG. 21, so that the returns naturally are spaced in time due to the different distances from the tires 621 to the antennas of the array 622. In this case, each signal will return with a different phase and can be separated by this difference in phase using methods known to those in the art.

In another application, not shown, two wide angle antennas can be used such that each receives any four signals but each antenna receives each signal at a slightly different time and different amplitude permitting each signal to be separated by looking at the return from both antennas since, each signal will be received differently based on its angle of arrival.

Additionally, each SAW or RFID device can be designed to operate on a slightly different frequency and the antennas of the array 622 can be designed to send a chirp signal and the returned signals will then be separated in frequency, permitting the four signals to be separated. Alternately, the four antennas of the array 622 can each transmit an identification signal to permit separation. This identification can be a numerical number or the length of the SAW substrate, for example, can be random so that each property monitor has a slightly different delay built in which permits signal separation. The identification number can be easily achieved in RFID systems and, with some difficulty and added expense, in SAW systems. Other methods of separating the signals from each of the tires 621 will now be apparent to those skilled in the art. One preferred method in particular will be discussed below and makes use of an RFID switch.

There are two parameters of SAW system, which has led to the choice of a four echo pulse system:

ITU frequency rules require that the radiated spectrum width be reduced to: $\Delta\phi \leqq 1.75$ MHz (in ISM band, F=433.92 MHz);

The range of temperature measurement should be from −40 F up to +260 F.

Figure 22:
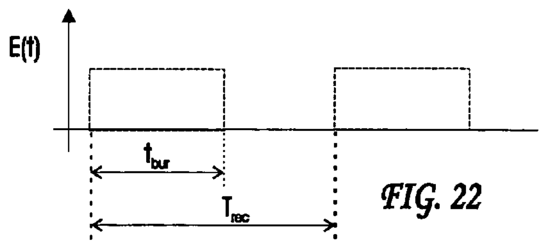
FIG. 22 is a plot which is useful to illustrate the interrogator burst pulse determination for interrogating SAW devices.

Therefore, burst (request) pulse duration should be not less than 0.6 microseconds (see FIG. 22).

$$\tau_{bur.} = \geqq 1/\Delta\phi \geqq 0.6\ \mu\text{s}$$

This burst pulse travels to a SAW sensor and then it is returned by the SAW to the interrogator. The sensor's antenna, interdigital transducer (IDT), reflector and the interrogator are subsystems with a restricted frequency pass band. Therefore, an efficient pass band of all the subsystems $H(f)_{\Sigma}$ will be defined as product of the partial frequency characteristic of all components:

$$H(f)_{\Sigma}=H(f)_1*H(f)_2* \ldots H(f)i$$

On the other hand, the frequency $H(\phi)_{\Sigma}$ and a time $I(\tau)_{\Sigma}$ response of any system are interlinked to each other by Fourier's transform. Therefore, the shape and duration ($\tau_{echo\ puls}$) an echo signal on input to the quadrature demodulator will differ from an interrogation pulse (see FIG. 23).

In other words, duration an echo signal on input to the quadrature demodulator is defined as mathematical convolution of a burst signal $\tau_{bur.}$ and the total impulse response of the system $I(t)_{\Sigma}$.

$$\tau_{echo}=\tau_{bur.}\otimes I(\tau)_{\Sigma}$$

Figure 23:
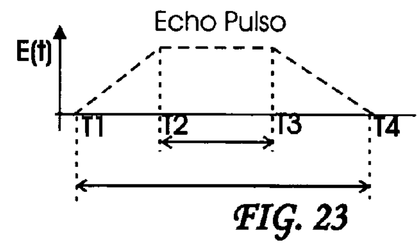
FIG. 23 illustrates the shape of an echo pulse on input to the quadrature demodulator from a SAW device.

The task is to determine maximum pulse duration on input to the quadrature demodulator $\tau_{echo}$ under a burst pulse duration $\tau_{bur}$ of 0.6 microseconds. It is necessary to consider in time all echo signals. In addition, it is necessary to take into account the following:

each subsequent echo signal should not begin earlier than the completion of the previous echo pulse. Otherwise, the signals will interfere with each other, and measurement will not be correct;

for normal operation of available microcircuits, it is necessary that the signal has a flat apex with a duration not less than 0.25 microseconds ($\tau_{meg}$=t3–t2, see FIG. 23). The signal's phase will be constant only on this segment;

the total sensor's pass band (considering double transit IDT and it's antenna as a reflector) constitutes 10 MHz;

the total pass band of the interrogator constitutes no more than 4 MHz.

Conducting the corresponding calculations yields the determination that duration of impulse front (t2–t1=t4–t3, see FIG. 23) constitutes about 0.35 microseconds. Therefore, total duration of one echo pulse is not less than:

$$\tau_{echo}=(t2-t1)+\tau_{meg.}+(t4-t3)=0.35+0.25+0.35=0.95\ \mu s$$

Figure 24:
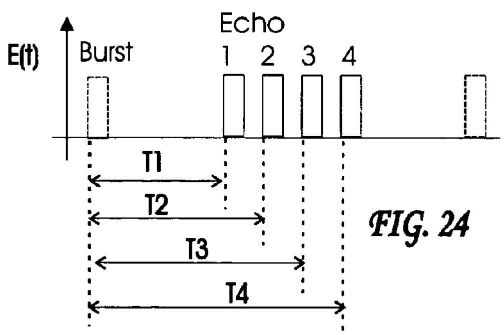
FIG. 24 illustrates the relationship between the burst and echo pulses for a 4 echo pulse SAW sensor.

Hence, the arrival time of each following echo pulse should be not earlier than 1.0 microsecond (see FIG. 24). This conclusion is very important.

In Appendix 1, it is shown that for correct temperature measuring in the required band it is necessary to meet the following conditions:

$$(T2-T1)=1/(72*10-61/K*(125°\ C.-(-40°\ C.))*434.92*106)=194\ ns$$

This condition is outrageous. If to execute ITU frequency rules, the band of correct temperature measuring will be reduced five times:

$$(125°\ C.-(-40°\ C.)*194\ ns)/1000\ ns=32°\ C.=58\ F$$

This is the main reason that it is necessary to add the fourth echo pulse in a sensor (see FIG. 24). The principle purpose of the fourth echo pulse is to make the temperature measurement unambiguous in a wide interval of temperatures when a longer interrogation pulse is used (the respective time intervals between the sensor's echo pulses are also longer). A mathematical model of the processing of a four-pulse echo that explains these statements is presented in Appendix 3.

The duration of the interrogation pulse and the time positions of the four pulses are calculated as:

$$T1>4*\tau_{echo}=4.00\ \mu s$$

$$T2=T1+\tau_{echo}=5.00\ \mu s$$

$$T3=T2+\tau_{echo}=6.00\ \mu s$$

$$T4=T3+\tau_{echo}+0.08\ \mu s=7.08\ \mu s$$

Figure 25:
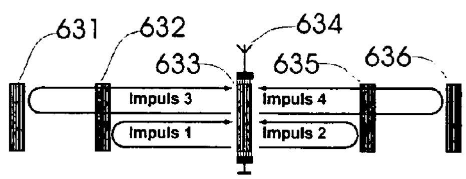
FIG. 25 illustrates the paths taken by various surface waves on a tire temperature and pressure monitoring device of one or more of the inventions disclosed herein.
Figure 26:
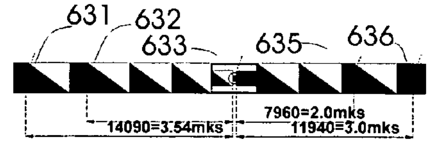
FIG. 26 is an illustration of a SAW tire temperature and pressure monitoring device.

The sensor's design with four pulses is exhibited in FIG. 25 and FIG. 26.

| | |
|---|---|
| $\tau_{bur}$ | 0.60 μs |
| T1 | 4.00 μs |
| T2 | 5.00 μs |
| T3 | 6.00 μs |
| T4 | 7.08 μs |

The reason that such a design was selected is that this design provides three important conditions:

1. It has the minimum RF signal propagation loss. Both SAW waves use for measuring (which are propagated to the left and to the right from IDT).

2. All parasitic echo signals (signals of multiple transits) are eliminated after the fourth pulse. For example, the pulse is excited by the IDT, then it is reflected from a reflector No. 1 and returns to the IDT. The pulse for the second time is re-emitted and it passes the second time on the same trajectory. The total time delay will be 8.0 microseconds in this case.

3. It has the minimum length.

Figure 27:
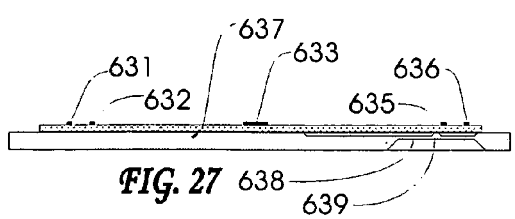
FIG. 27 is a side view of the SAW device of FIG. 26.

FIGS. 25–27 illustrate the paths taken by various surface waves on a tire temperature and pressure monitoring device of one or more of the inventions disclosed herein. The pulse form the interrogator is received by the antenna 634 which excited a wave in the SAW substrate 637 by way of the interdigital transducer (IDT) 633. The pulse travels in two directions and reflects off of reflectors 631, 632, 635 and 636. The reflected pulses return to the IDT 633 and are re-radiated from the antenna 634 back to the interrogator. The pressure in the pressure capsule causes the micro-membrane 638 to deflect causing the membrane to strain in the SAW through the point of application of the force 639.

The IDT 633, reflectors 632 and 631 are rigidly fastened to a base package. Reflectors 635 and 636 are disposed on a portion of the substrate that moves under the action of changes in pressure. Therefore, it is important that magnitudes of phase shift of pulses No. 2 and No. 4 were equal for a particular pressure.

For this purpose, the point of application of the force (caused by pressure) has been arranged between reflector 635 and the IDT 633, as it is exhibited in FIG. 27. Phase shifts of echo pulses No. 2 and No. 4 vary equally with changes in pressure. The area of strain is equal for echo pulses No. 2 and No. 4. Phase shifts of echo pulses No. 1 and No. 4 do not vary with pressure.

The phase shifts of all four echo pulses vary under temperature changes (proportionally to each time delay). All necessary computing of the temperature and pressure can be executed without difficulties in this case only.

This is taken into account in a math model, which is presented below.

Although the discussion herein concerns the determination of tire information, the same system can be used to determine the location of seats, the location of child seats when equipped with sensors, information about the presence of object or chemicals in vehicular compartments and the like.

1.3.1.2 Smart Antennas

Some of the shortcomings in today's wireless products can be overcome by using smart antenna technology. A smart antenna is a multi-element antenna that significantly improves reception by intelligently combining the signals received at each antenna element and adjusting the antenna characteristics to optimize performance as the transmitter or receiver moves and the environment changes.

Smart antennas can suppress interfering signals, combat signal fading and increase signal range thereby increasing the performance and capacity of wireless systems.

A method of separating signals from multiple tires, for example, is to use a smart antenna such as that manufactured by Motia. This particular Motia device is designed to operate at 433 MHz and to mitigate multipath signals at that frequency. The signals returning to the antennas from tires, for example, contain some multipath effects that, especially if the antennas are offset somewhat from the vehicle center, are different for each wheel. Since the adaptive formula will differ for each wheel, the signals can be separated (see "enhancing 802.11 WLANs through Smart Antennas", January 2004 available at motia.com). The following is taken from that paper.

"Antenna arrays can provide gain, combat multipath fading, and suppress interfering signals, thereby increasing both the performance and capacity of wireless systems. Smart antennas have been implemented in a wide variety of wireless systems, where they have been demonstrated to provide a large performance improvement. However, the various types of spatial processing techniques have different advantages and disadvantages in each type of system."

"This strategy permits the seamless integration of smart antenna technology with today's legacy WLAN chipset architecture. Since the 802.11 system uses time division duplexing (the same frequency is used for transmit and receive), smart antennas can be used for both transmit and receive, providing a gain on both uplink and downlink, using smart antennas on either the client or access point alone. Results show a 13 dB gain with a four element smart antenna over a single antenna system with the smart antenna on one side only, and an 18 dB gain with the smart antenna on both the client and access point. Thus, this "plug-and-play" adaptive array technology can provide greater range, average data rate increases per user, and better overall coverage.

"In the multibeam or phased array antenna, a beamformer forms several narrow beams, and a beam selector chooses the beam for reception that has the largest signal power. In the adaptive array, the signal is received by several antenna elements, each with similar antenna patterns, and the received signals are weighted and combined to form the output signal. The multibeam antenna is simpler to implement as the beamformer is fixed, with the beam selection only needed every few seconds for user movement, while the adaptive array must calculate the complex beamforming weights at least an order of magnitude faster than the fading rate, which can be several Hertz for pedestrian users."

"Finally, there is pattern diversity, the use of antenna elements with different patterns. The combination of these types of diversity permits the use of a large number of antennas even in a small form factor, such as a PCMCIA card or handset, with near ideal performance."

Through its adaptive beamforming technology, Motia has developed cost-effective smart antenna appliques that vastly improve wireless performance in a wide variety of wireless applications including Wi-Fi that can be incorporated into wireless systems without major modifications to existing products. Although the Motia chipset has been applied to several communication applications, it has yet to be applied to the monitoring applications as disclosed in the current assignee's patents and pending patent applications, and in particular vehicular monitoring applications such as tire monitoring.

The smart antenna works by determining a set of factors or weights that are used to operate on the magnitude and/or phase of the signals from each antenna before the signals are combined. However, since the geometry of a vehicle tire relative to the centralized antenna array does not change much as the tire rotates, but is different for each wheel, the weights themselves contain the information as to which tire signal is being received. In fact, the weights can be chosen to optimize signal transmission from a particular tire thus providing a method of selectively interrogating each tire at the maximum antenna gain.

1.3.1.3 Distributed Load Monopole

Recent antenna developments in the physics department at the University of Rhode Island have resulted in a new antenna technology. The antennas developed called DLM's (Distributed loaded monopole) are small efficient, wide bandwidth antennas. The simple design exhibits 50-ohm impedance and is easy to implement. They require only a direct feed from a coax cable and require no elaborate matching networks.

The prime advantage to this technology is a substantial reduction of the size of an antenna. Typically, the DLM antenna is about ⅓ the size of a normal dipole with only minor loss in efficiency. This is especially important for vehicle applications where space is always at a premium. Such antennas can be used for a variety of vehicle radar and communication applications as well for the monitoring of RFID, SAW and similar devices on a vehicle and especially for tire pressure, temperature, and/or acceleration monitoring as well as other monitoring purposes. Such applications have not previously been disclosed.

Although the DLM is being applied to several communication applications, it has yet to be applied to the monitoring applications as disclosed in the current assignee's patents and pending patent applications. The antenna gain that results and the ability to pack several antennas into a small package are attractive features of this technology.

1.3.1.4 Plasma Antenna

The following disclosure was taken from "Markland Technologies—Gas Plasma": (www.marklandtech.com)

"Plasma antenna technology employs ionized gas enclosed in a tube (or other enclosure) as the conducting element of an antenna. This is a fundamental change from traditional antenna design that generally employs solid metal wires as the conducting element. Ionized gas is an efficient conducting element with a number of important advantages. Since the gas is ionized only for the time of transmission or reception, "ringing" and associated effects of solid wire antenna design are eliminated. The design allows for extremely short pulses, important to many forms of digital communication and radars. The design further provides the opportunity to construct an antenna that can be compact and dynamically reconfigured for frequency, direction, bandwidth, gain and beamwidth. Plasma antenna technology will enable antennas to be designed that are efficient, low in weight and smaller in size than traditional solid wire antennas."

"When gas is electrically charged, or ionized to a plasma state it becomes conductive, allowing radio frequency (RF) signals to be transmitted or received. We employ ionized gas enclosed in a tube as the conducting element of an antenna. When the gas is not ionized, the antenna element ceases to exist. This is a fundamental change from traditional antenna design that generally employs solid metal wires as the conducting element. We believe our plasma antenna offers numerous advantages including stealth for military applications and higher digital performance in commercial applications. We also believe our technology can compete in many metal antenna applications."

"Initial studies have concluded that a plasma antenna's performance is equal to a copper wire antenna in every respect. Plasma antennas can be used for any transmission and/or modulation technique: continuous wave (CW), phase modulation, impulse, AM, FM, chirp, spread spectrum or other digital techniques. And the plasma antenna can be used over a large frequency range up to 20 GHz and employ a wide variety of gases (for example neon, argon, helium, krypton, mercury vapor and xenon). The same is true as to its value as a receive antenna."

"Plasma antenna technology has the following additional attributes:

No antenna ringing provides an improved signal to noise ratio and reduces multipath signal distortion.

Reduced radar cross section provides stealth due to the non-metallic elements.

Changes in the ion density can result in instantaneous changes in bandwidth over wide dynamic ranges.

After the gas is ionized, the plasma antenna has virtually no noise floor.

While in operation, a plasma antenna with a low ionization level can be decoupled from an adjacent high-frequency transmitter.

A circular scan can be performed electronically with no moving parts at a higher speed than traditional mechanical antenna structures.

It has been mathematically illustrated that by selecting the gases and changing ion density that the electrical aperture (or apparent footprint) of a plasma antenna can be made to perform on par with a metal counterpart having a larger physical size.

Our plasma antenna can transmit and receive from the same aperture provided the frequencies are widely separated.

Plasma resonance, impedance and electron charge density are all dynamically reconfigurable. Ionized gas antenna elements can be constructed and configured into an array that is dynamically reconfigurable for frequency, beamwidth, power, gain, polarization and directionality—on the fly.

A single dynamic antenna structure can use time multiplexing so that many RF subsystems can share one antenna resource reducing the number and size of antenna structures."

Several of the characteristics discussed above are of particular usefulness for several of the inventions herein including the absence of ringing, the ability to turn the antenna off after transmission and then immediately back on for reception, the ability to send very short pulses, the ability to alter the directionality of the antenna and to sweep thereby allowing one antenna to service multiple devices such as tires and to know which tire is responding. Additional advantages include, smaller size, the ability to work with chirp, spread spectrum and other digital technologies, improved signal to noise ratio, wide dynamic range, circular scanning without moving parts, and antenna sharing over differing frequencies, among others.

Some of the applications disclosed herein can use ultra wideband transceivers. UWB transceivers radiate most of the energy with its frequency centered on the physical length of the antenna. With the UWB connected to a plasma antenna, the center frequency of the UWB transceiver could be hopped or swept simultaneously.

A plasma antenna can solve the problem of multiple antennas by changing its electrical characteristic to match the function required—Time domain multiplexed. It can be used for high-gain antennas such as phase array, parabolic focus steering, log periodic, yogi, patch quadrafiler, etc. One antenna can be used for GPS, ad-hoc (such as car-to-car) communication, collision avoidance, back up sensing, cruse control, radar, toll identification and data communications.

Although the plasma antennas are being applied to several communication applications, they have yet to be applied to the monitoring applications as disclosed herein. The many advantages that result and the ability to pack several antenna functions into a small package are attractive features of this technology. Patents and applications that discuss plasma antennas include: U.S. Pat. No. 06,710,746, U.S. 20030160742 and U.S. 20040130497.

1.3.1.5 Dielectric Antenna

A great deal of work is underway to make antennas from dielectric materials. In one case, the electric field that impinges on the dielectric is used to modulate a transverse electric light beam. In another case, the reduction of the speed of electro magnetic waves due to the dielectric constant is used to reduce the size of the antenna. It can be expected that developments in this area will affect the antennas used in cell phones as well as in RFID and SAW-based communication devices in the future. Thus, dielectric antennas can be advantageously used with some of the inventions disclosed herein.

1.3.1.6 Nanotube Antenna

Antennas made from carbon nanotubes are beginning to show promise of increasing the sensitivity of antennas and thus increasing the range for communication devices based on RFID, SAW or similar devices where the signal strength frequently limits the range of such devices. The use of these antennas is therefore contemplated herein for use in tire monitors and the other applications disclosed herein.

Combinations of the above antenna designs in many cases can benefit from the advantages of each type to add further improvements to the field. Thus the inventions herein are not limited to any one of the above concepts nor is it limited to their use alone. Where feasible, all combinations are contemplated herein.

1.3.1.7 Summary

A general system for obtaining information about a vehicle or a component thereof or therein is illustrated in FIG. 20C and includes multiple sensors 627 which may be arranged at specific locations on the vehicle, on specific components of the vehicle, on objects temporarily placed in the vehicle such as child seats, or on or in any other object in or on the vehicle or in its vicinity about which information is desired. The sensors 627 may be SAW or RFID sensors or other sensors which generate a return signal upon the detection of a transmitted radio frequency signal. A multi-element antenna array 622 is mounted on the vehicle, in either a central location as shown in FIG. 20A or in an offset location as shown in FIG. 21, to provide the radio frequency signals which cause the sensors 627 to generate the return signals.

A control system 628 is coupled to the antenna array 622 and controls the antennas in the array 622 to be operative as necessary to enable reception of return signals from the sensors 627. There are several ways for the control system 628 to control the array 622, including to cause the antennas to be alternately switched on in order to sequentially transmit the RF signals therefrom and receive the return signals from the sensors 627 and to cause the antennas to transmit the RF signals simultaneously and space the return signals from the sensors 627 via a delay line in circuitry from each antennas such that each return signal is spaced in time in a known manner without requiring switching of the antennas. The control system can also be used to control a smart antenna array.

The control system 628 also processes the return signals to provide information about the vehicle or the component. The processing of the return signals can be any known processing including the use of pattern recognition techniques, neural networks, fuzzy systems and the like.

The antenna array 622 and control system 628 can be housed in a common antenna array housing 630.

Once the information about the vehicle or the component is known, it is directed to a display/telematics/adjustment unit 629 where the information can be displayed on a display 629 to the driver, sent to a remote location for analysis via a telematics unit 629 and/or used to control or adjust a component on, in or near the vehicle. Although several of the figures illustrate applications of these technologies to tire monitoring, it is intended that the principles and devices disclosed can be applied to the monitoring of a wide variety of components on and off a vehicle.

1.4 Tire Monitoring

The tire monitoring systems of some of the inventions herein comprises at least three separate systems corresponding to three stages of product evolution. Generation 1 is a tire valve cap that provides information as to the pressure within the tire as described below. Generation 2 requires the replacement of the tire valve stem, or the addition of a new stem-like device, with a new valve stem that also measures temperature and pressure within the tire or it may be a device that attaches to the vehicle wheel rim. Generation 3 is a product that is attached to the inside of the tire adjacent the tread and provides a measure of the diameter of the footprint between the tire and the road, the tire pressure and temperature, indications of tire wear and, in some cases, the coefficient of friction between the tire and the road.

As discussed above, SAW technology permits the measurement of many physical and chemical parameters without the requirement of local power or energy. Rather, the energy to run devices can be obtained from radio frequency electromagnetic waves. These waves excite an antenna that is coupled to the SAW device. Through various devices, the properties of the acoustic waves on the surface of the SAW device are modified as a function of the variable to be measured. The SAW device belongs to the field of microelectromechanical systems (MEMS) and can be produced in high-volume at low cost.

For the Generation 1 system, a valve cap contains a SAW material at the end of the valve cap, which may be polymer covered. This device senses the absolute pressure in the valve cap. Upon attaching the valve cap to the valve stem, a depressing member gradually depresses the valve permitting the air pressure inside the tire to communicate with a small volume inside the valve cap. As the valve cap is screwed onto the valve stem, a seal prevents the escape of air to the atmosphere. The SAW device is electrically connected to the valve cap, which is also electrically connected to the valve stem that can act as an antenna for transmitting and receiving radio frequency waves. An interrogator located in the vicinity of the tire periodically transmits radio waves that power the SAW device, the actual distance between the interrogator and the device depending on the relative orientation of the antennas and other factors. The SAW device measures the absolute pressure in the valve cap that is equal to the pressure in the tire.

The Generation 2 system permits the measurement of both the tire pressure and tire temperature. In this case, the tire valve stem can be removed and replaced with a new tire valve stem that contains a SAW device attached at the bottom of the valve stem.

This device preferably contains two SAW devices, one for measuring temperature and the second for measuring pressure through a novel technology discussed below. This second generation device therefore permits the measurement of both the pressure and the temperature inside the tire. Alternately, this device can be mounted inside the tire, attached to the rim or attached to another suitable location. An external pressure sensor is mounted in the interrogator to measure the pressure of the atmosphere to compensate for altitude and/or barometric changes.

The Generation 3 device can contain a pressure and temperature sensor, as in the case of the Generation 2 device, but additionally contains one or more accelerometers which measure at least one component of the acceleration of the vehicle tire tread adjacent the device. This acceleration varies in a known manner as the device travels in an approximate circle attached to the wheel. This device is capable of determining when the tread adjacent the device is in contact with road surface. In some cases, it is also able to measure the coefficient of friction between the tire and the road surface. In this manner, it is capable of measuring the length of time that this tread portion is in contact with the road and thereby can provide a measure of the diameter or circumferential length of the tire footprint on the road. A technical discussion of the operating principle of a tire inflation and load detector based on flat area detection follows:

When tires are inflated and not in contact with the ground, the internal pressure is balanced by the circumferential tension in the fibers of the shell. Static equilibrium demands that tension is equal to the radius of curvature multiplied by the difference between the internal and the external gas pressure. Tires support the weight of the automobile by changing the curvature of the part of the shell that touches the ground. The relation mentioned above is still valid. In the part of the shell that gets flattened, the radius of curvature increases while the tension in the tire structure stays the same. Therefore, the difference between the external and internal pressures becomes small to compensate for the growth of the radius. If the shell were perfectly flexible, the tire contact with the ground would develop into a flat spot with an area equal to the load divided by the pressure.

A tire operating at correct values of load and pressure has a precise signature in terms of variation of the radius of curvature in the loaded zone. More flattening indicates under-inflation or over-loading, while less flattening indicates over-inflation or under-loading. Note that tire loading has essentially no effect on internal pressure.

From the above, one can conclude that monitoring the curvature of the tire as it rotates can provide a good indication of its operational state. A sensor mounted inside the tire at its largest diameter can accomplish this measurement. Preferably, the sensor would measure mechanical strain. However, a sensor measuring acceleration in any one axis, preferably the radial axis, could also serve the purpose.

In the case of the strain measurement, the sensor would indicate a constant strain as it spans the arc over which the tire is not in contact with the ground and a pattern of increased stretch during the time when the sensor spans an arc in close proximity with the ground. A simple ratio of the times of duration of these two states would provide a good indication of inflation, but more complex algorithms could be employed where the values and the shape of the period of increased strain are utilized.

As an indicator of tire health, the measurement of strain on the largest inside diameter of the tire is believed to be superior to the measurement of stress, such as inflation pressure, because, the tire could be deforming, as it ages or otherwise progresses toward failure, without any changes in inflation pressure. Radial strain could also be measured on the inside of the tire sidewall thus indicating the degree of flexure that the tire undergoes.

The accelerometer approach has the advantage of giving a signature from which a harmonic analysis of once-per-revolution disturbances could indicate developing problems such as hernias, flat spots, loss of part of the tread, sticking of foreign bodies to the tread, etc.

As a bonus, both of the above-mentioned sensors (strain and acceleration) give clear once-per-revolution signals for each tire that could be used as input for speedometers, odometers, differential slip indicators, tire wear indicators, etc.

Tires can fail for a variety of reasons including low pressure, high temperature, delamination of the tread, excessive flexing of the sidewall, and wear (see, e.g., Summary Root Cause Analysis Bridgestone/Firestone, Inc." http:www.bridgestone-firestone.com/homeimgs/rootcause.htm, Printed March, 2001). Most tire failures can be predicted based on tire pressure alone and the TREAD Act thus addresses the monitoring of tire pressure. However, some failures, such as the Firestone tire failures, can result from substandard materials especially those that are in contact with a steel-reinforcing belt. If the rubber adjacent the steel belt begins to move relative to the belt, then heat will be generated and the temperature of the tire will rise until the tire fails catastrophically. This can happen even in properly inflated tires.

Finally, tires can fail due to excessive vehicle loading and excessive sidewall flexing even if the tire is properly inflated. This can happen if the vehicle is overloaded or if the wrong size tire has been mounted on the vehicle. In most cases, the tire temperature will rise as a result of this additional flexing, however, this is not always the case, and it may even occur too late. Therefore, the device which measures the diameter of the tire footprint on the road is a superior method of measuring excessive loading of the tire.

Generation 1 devices monitor pressure only while Generation 2 devices also monitor the temperature and therefore will provide a warning of imminent tire failure more often than if pressure alone is monitored. Generation 3 devices will provide an indication that the vehicle is overloaded before either a pressure or temperature monitoring system can respond. The Generation 3 system can also be augmented to measure the vibration signature of the tire and thereby detect when a tire has worn to the point that the steel belt is contacting the road. In this manner, the Generation 3 system also provides an indication of a worn out tire and, as will be discussed below, an indication of the road coefficient of friction.

Each of these devices communicates to an interrogator with pressure, temperature, and acceleration as appropriate. In none of these generational devices is a battery mounted within the vehicle tire required, although in some cases an energy generator can be used. In some cases, the SAW or RFID devices will optionally provide an identification number corresponding to the device to permit the interrogator to separate one tire from another.

Key advantages of the tire monitoring system disclosed herein over most of the currently known prior art are:

- very small size and weight eliminating the need for wheel counterbalance,
- cost competitive for tire monitoring alone and cost advantage for combined systems,
- high update rate,
- self-diagnostic,
- automatic wheel identification,
- no batteries required—powerless, and
- no wires required—wireless.

The monitoring of temperature and or pressure of a tire can take place infrequently. It can be adequate to check the pressure and temperature of vehicle tires once every ten seconds to once per minute. To utilize the centralized interrogator of this invention, the tire monitoring system would preferably use SAW technology and the device could be located in the valve stem, wheel, tire side wall, tire tread, or other appropriate location with access to the internal tire pressure of the tires. A preferred system is based on a SAW technology discussed above.

At periodic intervals, such as once every minute, the interrogator sends a radio frequency signal at a frequency such as 905 MHz to which the tire monitor sensors have been sensitized. When receiving this signal, the tire monitor sensors (of which there are five in a typical configuration) respond with a signal providing an optional identification number, temperature, pressure and acceleration data where appropriate. In one implementation, the interrogator would use multiple, typically two or four, antennas which are spaced apart. By comparing the time of the returned signals from the tires to the antennas, or by using smart antenna techniques, the location of each of the senders (the tires) can be approximately determined as discussed in more detail above. That is, the antennas can be so located that each tire is a different distance from each antenna and by comparing the return time of the signals sensed by the antennas, the location of each tire can be determined and associated with the returned information. If at least three antennas are used, then returns from adjacent vehicles can be eliminated. Alternately, a smart antenna array such as manufactured by Motia can be used.

Figure 28A:
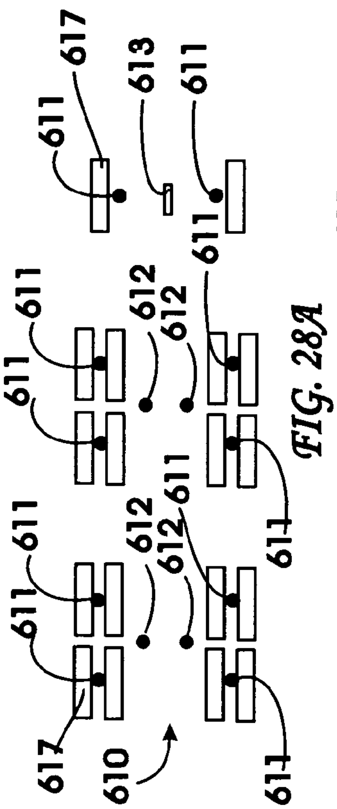
FIGS. 28A and 28B are schematic drawings showing two possible antenna layouts for 18 wheeler truck vehicles that permits the positive identification of a tire that is transmitting a signal containing pressure, temperature or other tire information through the use of multiple antennas arranged in a geometric pattern to permit triangulation calculations based on the time of arrival or phase of the received pulses.
Figure 28B:
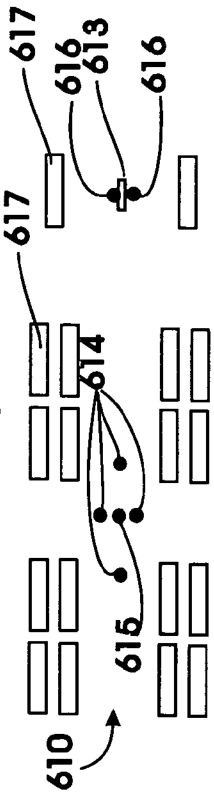

An illustration of this principle applied to an 18 wheeler truck vehicle is shown generally at 610 in FIGS. 28A and 28B. Each of the vehicle wheels is represented by a rectangle 617. In FIG. 28A, the antennas 611 and 612 are placed near to the tires due to the short transmission range of typical unboosted SAW tire monitor systems. In FIG. 28B, transmitters such as conventional battery operated systems or boosted SAW systems, for example, allow a reduction in the number of antennas and their placement in a more central location such as antennas 614, 615 and 616. In FIG. 28A, antennas 611, 612 transmit an interrogation signal generated in the interrogator 613 to tires in their vicinity. Antennas 611 and 612 then receive the retransmitted signals and based on the time of arrival or the phase differences between the arriving signals, the distance or direction from the antennas to the transmitters can be determined by triangulation or based on the intersection of the calculated vectors, the location of the transmitter can be determined by those skilled in the art. For example, if there is a smaller phase difference between the received signals at antennas 611 and 612, then the transmitter will be inboard and if the phase difference is larger, then the transmitter will be an outboard tire. The exact placement of each antenna 611, 612 can be determined by analysis or by experimentation to optimize the system. The signals received by the antennas 611, 612 can be transmitted as received to the interrogator 613 by wires (not shown) or, at the other extreme, each antenna 611, 612 can have associated circuitry to process the signal to change its frequency and/or amplify the received signal and retransmit it by wires or wirelessly to the transmitter. Various combinations of features can also be used. If processing circuitry is present, then each antenna with such circuitry would need a power source which can be supplied by the interrogator or by another power-supply method. If supplied by the interrogator, power can be supplied using the same cabling as is used to send the interrogating pulse which may be a coax cable. Since the power can be supplied as DC, it can be easily separated from the RF signal. Naturally, this system can be used with all types of tire monitors and is not limited to SAW type devices. Other methods exist to transmit data from the antennas including a vehicle bus or a fiber optic line or bus.

In FIG. 28B, the transmitting antenna 615 is used for 16 of the wheels and receiving antennas 614, and optionally antenna 615, are used to determine receipt of the TPM signals and determine the transmitting tire as described above. However, since the range of the tire monitors is greater in this case, the antennas 614, 615 can be placed in a more centralized location thereby reducing the cost of the installation and improving its reliability.

Other methods can also be used to permit tire differentiation including CDMA and FDMA, for example, as discussed elsewhere herein. If, for example, each device is tuned to a slightly different frequency or code and this information is taught to the interrogator, then the receiving antenna system can be simplified.

An identification number can accompany each transmission from each tire sensor and can also be used to validate that the transmitting sensor is in fact located on the subject vehicle. In traffic situations, it is possible to obtain a signal from the tire of an adjacent vehicle. This would immediately show up as a return from more than five vehicle tires and the system would recognize that a fault had occurred. The sixth return can be easily eliminated, however, since it could contain an identification number that is different from those that have heretofore been returned frequently to the vehicle system or based on a comparison of the signals sensed by the different antennas. Thus, when the vehicle tire is changed or tires are rotated, the system will validate a particular return signal as originating from the tire-monitoring sensor located on the subject vehicle.

This same concept is also applicable for other vehicle-mounted sensors. This permits a plug and play scenario whereby sensors can be added to, changed, or removed from a vehicle and the interrogation system will automatically adjust. The system will know the type of sensor based on the identification number, frequency, delay and/or its location on the vehicle. For example, a tire monitor could have an ID in a different range of identification numbers from a switch or weight-monitoring device. This also permits new kinds of sensors to be retroactively installed on a vehicle. If a totally new type of the sensor is mounted to the vehicle, the system software would have to be updated to recognize and know what to do with the information from the new sensor type. By this method, the configuration and quantity of sensing systems on a vehicle can be easily changed and the system interrogating these sensors need only be updated with software upgrades which could occur automatically, such as over the Internet and by any telematics communication channel including cellular and satellite.

Preferred tire-monitoring sensors for use with this invention use the surface acoustic wave (SAW) technology. A radio frequency interrogating signal can be sent to all of the tire gages simultaneously and the received signal at each tire gage is sensed using an antenna. The antenna is connected to the IDT transducer that converts the electrical wave to an acoustic wave that travels on the surface of a material such as lithium niobate, or other piezoelectric material such as zinc oxide, Langasite™ or the polymer polyvinylidene fluoride (PVDF). During its travel on the surface of the piezoelectric material, either the time delay, resonant frequency, amplitude or phase of the signal (or even possibly combinations thereof) is modified based on the temperature and/or pressure in the tire. This modified wave is sensed by one or more IDT transducers and converted back to a radio frequency wave that is used to excite an antenna for rebroadcasting the wave back to interrogator. The interrogator receives the wave at a time delay after the original transmission that is determined by the geometry of the SAW transducer and decodes this signal to determine the temperature and/or pressure in the subject tire. By using slightly different geometries for each of the tire monitors, slightly different delays can be achieved and randomized so that the probability of two sensors having the same delay is small. The interrogator transfers the decoded information to a central processor that determines whether the temperature and/or pressure of each of the tires exceed specifications. If so, a warning light can be displayed informing the vehicle driver of the condition. Other notification devices such as a sound generator, alarm and the like could also be used. In some cases, this random delay is all that is required to separate the five tire signals and to identify which tires are on the vehicle and thus ignore responses from adjacent vehicles.

With an accelerometer mounted in the tire, as is the case for the Generation 3 system, information is present to diagnose other tire problems. For example, when the steel belt wears through the rubber tread, it will make a distinctive noise and create a distinctive vibration when it contacts the pavement. This can be sensed by a SAW or other technology accelerometer. The interpretation of various such signals can be done using neural network technology. Similar systems are described more detail in U.S. Pat. No. 05,829,782. As the tread begins to separate from the tire as in the Bridgestone cases, a distinctive vibration is created which can also be sensed by a tire-mounted accelerometer.

As the tire rotates, stresses are created in the rubber tread surface between the center of the footprint and the edges. If the coefficient of friction on the pavement is low, these stresses can cause the shape of the footprint to change. The Generation 3 system, which measures the circumferential length of the footprint, can therefore also be used to measure the friction coefficient between the tire and the pavement.

Piezoelectric generators are another field in which SAW technology can be applied and some of the inventions herein can comprise several embodiments of SAW or other piezoelectric or other generators, as discussed extensively elsewhere herein.

An alternate approach for some applications, such as tire monitoring, where it is difficult to interrogate the SAW device as the wheel, and thus the antenna is rotating; the transmitting power can be significantly increased if there is a source of energy inside the tire. Many systems now use a battery but this leads to problems related to disposal, having to periodically replace the battery and temperature effects. In some cases, the manufacturers recommend that the battery be replaced as often as every 6 to 12 months. Batteries also sometimes fail to function properly at cold temperatures and have their life reduced when operated at high temperatures. For these reasons, there is a belief that a tire monitoring system should obtain its power from some source external of the tire. Similar problems can be expected for other applications.

One novel solution to this problem is to use the flexing of the tire itself to generate electricity. If a thin film of PVDF is attached to the tire inside and adjacent to the tread, then as the tire rotates the film will flex and generate electricity. This energy can then be stored on one or more capacitors and used to power the tire monitoring circuitry. Also, since the amount of energy that is generated depends of the flexure of the tire, this generator can also be used to monitor the health of the tire in a similar manner as the Generation 3 accelerometer system described above. Mention is made of using a bi-morph to generate energy in a rotating tire in U.S. Pat. No. 05,987,980 without describing how it is implemented other than to say that it is mounted to the sensor housing and uses vibration. In particular, there is no mention of attaching the bi-morph to the tread of the tire as disclosed herein.

As mentioned above, the transmissions from different SAW devices can be time-multiplexed by varying the delay time from device to device, frequency-multiplexed by varying the natural frequencies of the SAW devices, code-multiplexed by varying the identification code of the SAW devices or space-multiplexed by using multiple antennas. Additionally, a code operated RFID switch can be used to permit the devices to transmit one at a time as discussed below.

Considering the time-multiplexing case, varying the length of the SAW device and thus the delay before retransmission can separate different classes of devices. All seat sensors can have one delay which would be different from tire monitors or light switches etc. Such devices can also be separated by receiving antenna location.

Figure 29A:
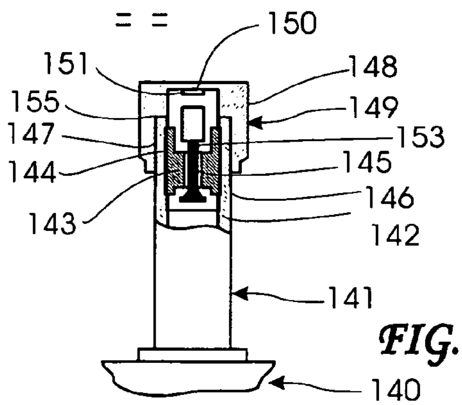
FIG. 29A is a partial cutaway view of a tire pressure monitor using an absolute pressure measuring SAW device.
Figure 29B:
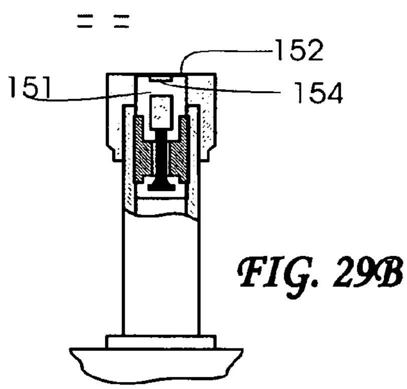
FIG. 29B is a partial cutaway view of a tire pressure monitor using a differential pressure measuring SAW device.

Referring now to FIGS. 29A and 29B, a first embodiment of a valve cap 149 including a tire pressure monitoring system in accordance with the invention is shown generally at 10 in FIG. 29A. A tire 140 has a protruding, substantially cylindrical valve stem 141 which is shown in a partial cutaway view in FIG. 29A. The valve stem 141 comprises a sleeve 142 and a tire valve assembly 144. The sleeve 142 of the valve stem 141 is threaded on both its inner surface and its outer surface. The tire valve assembly 144 is arranged in the sleeve 142 and includes threads on an outer surface which are mated with the threads on the inner surface of the sleeve 142. The valve assembly 144 comprises a valve seat 143 and a valve pin 145 arranged in an aperture in the valve seat 143. The valve assembly 144 is shown in the open condition in FIG. 29A whereby air flows through a passage between the valve seat 143 and the valve pin 145.

The valve cap 149 includes a substantially cylindrical body 148 and is attached to the valve stem 141 by means of threads arranged on an inner cylindrical surface of body 148 which are mated with the threads on the outer surface of the sleeve 142. The valve cap 149 comprises a valve pin depressor 153 arranged in connection with the body 148 and a SAW pressure sensor 150. The valve pin depressor 153 engages the valve pin 145 upon attachment of the valve cap 149 to the valve stem 141 and depresses it against its biasing spring, not shown, thereby opening the passage between the valve seat 143 and the valve pin 145 allowing air to pass from the interior of tire 140 into a reservoir or chamber 151 in the body 148. Chamber 151 contains the SAW pressure sensor 150 as described in more detail below.

Pressure sensor 150 can be an absolute pressure-measuring device. If so, it can function based on the principle that the increase in air pressure and thus air density in the chamber 151 increases the mass loading on a SAW device changing the velocity of surface acoustic wave on the piezoelectric material. The pressure sensor 150 is therefore positioned in an exposed position in the chamber 151. This effect is small and generally requires that a very thin membrane is placed over the SAW that absorbs oxygen or in some manner increases the loading onto the surface of the SAW as the pressure increases.

A second embodiment of a valve cap 10' in accordance with the invention is shown in FIG. 29B and comprises a SAW strain sensing device 154 that is mounted onto a flexible membrane 152 attached to the body 148 of the valve cap 149 and in a position in which it is exposed to the air in the chamber 151. When the pressure changes in chamber 151, the deflection of the membrane 152 changes thereby changing the strain in the SAW device 154. This changes the path length that the waves must travel which in turn changes the natural frequency of the SAW device or the delay between reception of an interrogating pulse and its retransmission.

Strain sensor 154 is thus a differential pressure-measuring device. It functions based on the principle that changes in the flexure of the membrane 152 can be correlated to changes in pressure in the chamber 151 and thus, if an initial pressure and flexure are known, the change in pressure can be determined from the change in flexure or strain.

FIGS. 29A and 29B therefore illustrate two different methods of using a SAW sensor in a valve cap for monitoring the pressure inside a tire. A preferred manner in which the SAW sensors 150,154 operate is discussed more fully below but briefly, each sensor 150,154 includes an antenna and an interdigital transducer which receives a wave via the antenna from an interrogator which proceeds to travel along a substrate. The time in which the waves travel across the substrate and return to the interdigital transducer is dependent on the temperature, the loading on the substrate (in the embodiment of FIG. 29A) or the flexure of membrane 152 (in the embodiment of FIG. 29B). The antenna transmits a return wave which is received and the time delay between the transmitted and returned wave is calculated and correlated to the pressure in the chamber 151. In order to keep the SAW devices as small as possible for the tire calve cap design, the preferred mode of SAW operation is the resonant frequency mode where a change in the resonant frequency of the device is measured.

Sensors 150 and 154 are electrically connected to the metal valve cap 149 that is electrically connected to the valve stem 141. The valve stem 141 is electrically isolated from the tire rim and can thus serve as an antenna for transmitting radio frequency electromagnetic signals from the sensors 150 and 154 to a vehicle mounted interrogator, not shown, to be described in detail below. As shown in FIG. 29A, a pressure seal 155 is arranged between an upper rim of the sleeve 142 and an inner shoulder of the body 148 of the valve cap 149 and serves to prevent air from flowing out of the tire 140 to the atmosphere.

The speed of the surface acoustic wave on the piezoelectric substrate changes with temperature in a predictable manner as well as with pressure. For the valve cap implementations, a separate SAW device can be attached to the outside of the valve cap and protected with a cover where it is subjected to the same temperature as the SAW sensors 150 or 154 but is not subject to pressure or strain. This requires that each valve cap comprise two SAW devices, one for pressure sensing and another for temperature sensing. Since the valve cap is exposed to ambient temperature, a preferred approach is to have a single device on the vehicle which measures ambient temperature outside of the vehicle passenger compartment. Many vehicles already have such a temperature sensor. For those installations where access to this temperature data is not convenient, a separate SAW temperature sensor can be mounted associated with the interrogator antenna, as illustrated below, or some other convenient place.

Figure 30:
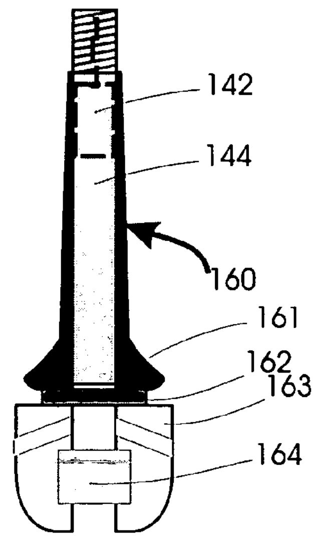
FIG. 30 is a partial cutaway view of an interior SAW tire temperature and pressure monitor mounted onto and below the valve stem.

Although the valve cap 149 is provided with the pressure seal 155, there is a danger that the valve cap 149 will not be properly assembled onto the valve stem 141 and a small quantity of the air will leak over time. FIG. 30 provides an alternate design where the SAW temperature and pressure measuring devices are incorporated into the valve stem. This embodiment is thus particularly useful in the initial manufacture of a tire.

The valve stem assembly is shown generally at 160 and comprises a brass valve stem 144 which contains a tire valve assembly 142. The valve stem 144 is covered with a coating 161 of a resilient material such as rubber, which has been partially removed in the drawing. A metal conductive ring 162 is electrically attached to the valve stem 144. A rubber extension 163 is also attached to the lower end of the valve stem 144 and contains a SAW pressure and temperature sensor 164. The SAW pressure and temperature sensor 164 can be of at least two designs wherein the SAW sensor is used as an absolute pressure sensor as shown in FIG. 30A or an as a differential sensor based on membrane strain as shown in FIG. 30B.

Figure 30A:
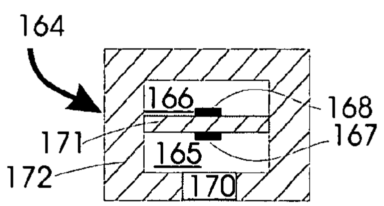
FIG. 30A is a sectioned view of the SAW tire pressure and temperature monitor of FIG. 30 incorporating an absolute pressure SAW device.

In FIG. 30A, the SAW sensor 164 comprises a capsule 172 having an interior chamber in communication with the interior of the tire via a passageway 170. A SAW absolute pressure sensor 167 is mounted onto one side of a rigid membrane or separator 171 in the chamber in the capsule 172. Separator 171 divides the interior chamber of the capsule 172 into two compartments 165 and 166, with only compartment 165 being in flow communication with the interior of the tire. The SAW absolute pressure sensor 167 is mounted in compartment 165 which is exposed to the pressure in the tire through passageway 170. A SAW temperature sensor 168 is attached to the other side of the separator 171 and is exposed to the pressure in compartment 166. The pressure in compartment 166 is unaffected by the tire pressure and is determined by the atmospheric pressure when the device was manufactured and the effect of temperature on this pressure. The speed of sound on the SAW temperature sensor 168 is thus affected by temperature but not by pressure in the tire.

The operation of SAW sensors 167 and 168 is discussed elsewhere more fully but briefly, since SAW sensor 167 is affected by the pressure in the tire, the wave which travels along the substrate is affected by this pressure and the time delay between the transmission and reception of a wave can be correlated to the pressure. Similarly, since SAW sensor 168 is affected by the temperature in the tire, the wave which travels along the substrate is affected by this temperature and the time delay between the transmission and reception of a wave can be correlated to the temperature. Similarly, the natural frequency of the SAW device will change due to the change in the SAW dimensions and that natural frequency can be determined if the interrogator transmits a chirp.

Figure 30B:
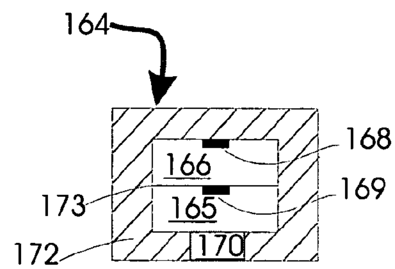
FIG. 30B is a sectioned view of the SAW tire pressure and temperature monitor of FIG. 30 incorporating a differential pressure SAW device.

FIG. 30B illustrates an alternate and preferred configuration of sensor 164 where a flexible membrane 173 is used instead of the rigid separator 171 shown in the embodiment of FIG. 30A, and a SAW device is mounted on flexible member 173. In this embodiment, the SAW temperature sensor 168 is mounted to a different wall of the capsule 172. A SAW device 169 is thus affected both by the strain in membrane 173 and the pressure in the tire. Normally, the strain effect will be much larger with a properly designed membrane 173.

The operation of SAW sensors 168 and 169 is discussed elsewhere more fully but briefly, since SAW sensor 168 is affected by the temperature in the tire, the wave which travels along the substrate is affected by this temperature and the time delay between the transmission and reception of a wave can be correlated to the temperature. Similarly, since SAW sensor 169 is affected by the pressure in the tire, the wave which travels along the substrate is affected by this pressure and the time delay between the transmission and reception of a wave can be correlated to the pressure.

In both of the embodiments shown in FIG. 30A and FIG. 30B, a separate temperature sensor is illustrated. This has two advantages. First, it permits the separation of the temperature effect from the pressure effect on the SAW device. Second, it permits a measurement of tire temperature to be recorded. Since a normally inflated tire can experience excessive temperature caused, for example, by an overload condition, it is desirable to have both temperature and pressure measurements of each vehicle tire The SAW devices 167, 168 and 169 are electrically attached to the valve stem 144 which again serves as an antenna to transmit radio frequency information to an interrogator. This electrical connection can be made by a wired connection; however, the impedance between the SAW devices and the antenna may not be properly matched. An alternate approach as described in Varadan, V. K. et al., "Fabrication, characterization and testing of wireless MEMS-IDT based micro accelerometers", Sensors and Actuators A 90 (2001) p. 7–19, 2001 Elsevier Netherlands, is to inductively couple the SAW devices to the brass tube.

Although an implementation into the valve stem and valve cap examples have been illustrated above, an alternate approach is to mount the SAW temperature and pressure monitoring devices elsewhere within the tire. Similarly, although the tire stem in both cases above can serve as the antenna, in many implementations, it is preferable to have a separately designed antenna mounted within or outside of the vehicle tire. For example, such an antenna can project into the tire from the valve stem or can be separately attached to the tire or tire rim either inside or outside of the tire. In some cases, it can be mounted on the interior of the tire on the sidewall.

Figure 31:
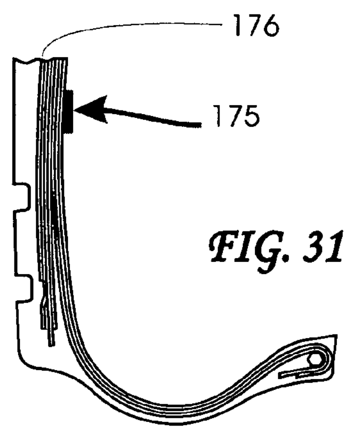
FIG. 31 is a view of an accelerometer-based tire monitor also incorporating a SAW pressure and temperature monitor and cemented to the interior of the tire opposite the tread.
Figure 31A:
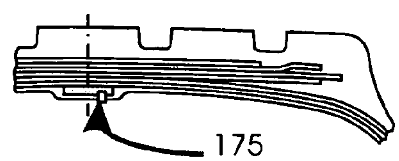
FIG. 31A is a view of an accelerometer-based tire monitor also incorporating a SAW pressure and temperature monitor and inserted into the tire opposite the tread during manufacture.

A more advanced embodiment of a tire monitor in accordance with the invention is illustrated generally at 40 in FIGS. 31 and 31A. In addition to temperature and pressure monitoring devices as described in the previous applications, the tire monitor assembly 175 comprises an accelerometer of any of the types to be described below which is configured to measure either or both of the tangential and radial accelerations. Tangential accelerations as used herein generally means accelerations tangent to the direction of rotation of the tire and radial accelerations as used herein generally means accelerations toward or away from the wheel axis.

In FIG. 31, the tire monitor assembly 175 is cemented, or otherwise attached, to the interior of the tire opposite the tread. In FIG. 31A, the tire monitor assembly 175 is inserted into the tire opposite the tread during manufacture.

Superimposed on the acceleration signals will be vibrations introduced into tire from road interactions and due to tread separation and other defects. Additionally, the presence of the nail or other object attached to the tire will, in general, excite vibrations that can be sensed by the accelerometers. When the tread is worn to the extent that the wire belts 176 begin impacting the road, additional vibrations will be induced.

Through monitoring the acceleration signals from the tangential or radial accelerometers within the tire monitor assembly 175, delamination, a worn tire condition, imbedded nails, other debris attached to the tire tread, hernias, can all be sensed. Additionally, as previously discussed, the length of time that the tire tread is in contact with the road opposite tire monitor 175 can be measured and, through a comparison with the total revolution time, the length of the tire footprint on the road can be determined. This permits the load on the tire to be measured, thus providing an indication of excessive tire loading. As discussed above, a tire can fail due to over-loading even when the tire interior temperature and pressure are within acceptable limits. Other tire monitors cannot sense such conditions.

In the discussion above, the use of the tire valve stem as an antenna has been discussed. An antenna can also be placed within the tire when the tire sidewalls are not reinforced with steel. In some cases and for some frequencies, it is sometimes possible to use the tire steel bead or steel belts as an antenna, which in some cases can be coupled to inductively. Alternately, the antenna can be designed integral with the tire beads or belts and optimized and made part of the tire during manufacture.

Although the discussion above has centered on the use of SAW devices, the configurations of FIGS. 31A and 31B can also be effectively accomplished with other pressure, temperature and accelerometer sensors particularly those based on RFID technology. One of the advantages of using SAW devices is that they are totally passive thereby eliminating the requirement of a battery. For the implementation of tire monitor assembly 175, the acceleration can also be used to generate sufficient electrical energy to power a silicon microcircuit. In this configuration, additional devices, typically piezoelectric devices, are used as a generator of electricity that can be stored in one or more conventional capacitors or ultra-capacitors. Other types of electrical generators can be used such as those based on a moving coil and a magnetic field etc. A PVDF piezoelectric polymer can also, and preferably, be used to generate electrical energy based on the flexure of the tire as described below.

Figure 32:
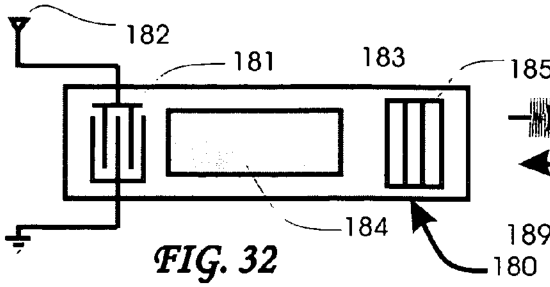
FIG. 32 is a detailed view of a polymer on SAW pressure sensor.

FIG. 32 illustrates an absolute pressure sensor based on surface acoustic wave (SAW) technology. A SAW absolute pressure sensor 180 has an interdigital transducer (IDT) 181 which is connected to antenna 182. Upon receiving an RF signal of the proper frequency, the antenna 182 induces a surface acoustic wave in the material 183 which can be lithium niobate, quartz, zinc oxide, or other appropriate piezoelectric material. As the wave passes through a pressure sensing area 184 formed on the material 183, its velocity is changed depending on the air pressure exerted on the sensing area 184. The wave is then reflected by reflectors 185 where it returns to the IDT 181 and to the antenna 182 for retransmission back to the interrogator. The material in the pressure sensing area 184 can be a thin (such as one micron) coating of a polymer that absorbs or reversibly reacts with oxygen or nitrogen where the amount absorbed depends on the air density.

Figure 32A:
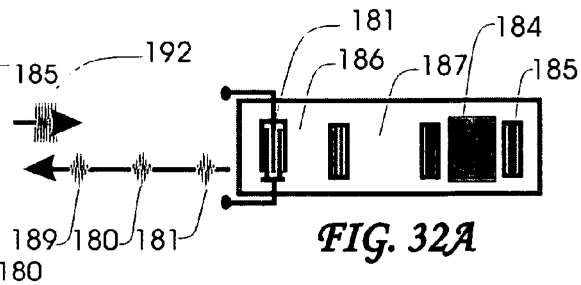
FIG. 32A is a view of a SAW temperature and pressure monitor on a single SAW device.

In FIG. 32A, two additional sections of the SAW device, designated 186 and 187, are provided such that the air pressure affects sections 186 and 187 differently than pressure sensing area 184. This is achieved by providing three reflectors. The three reflecting areas cause three reflected waves to appear, 189, 190 and 191 when input wave 192 is provided. The spacing between waves 189 and 190, and between waves 190 and 191 provides a measure of the pressure. This construction of a pressure sensor may be utilized in the embodiments of FIGS. 29A–31 or in any embodiment wherein a pressure measurement by a SAW device is obtained.

Figure 32B:
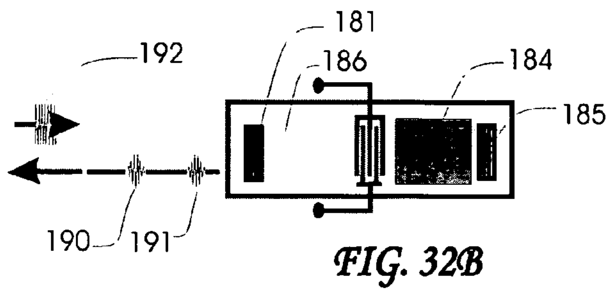
FIG. 32B is a view of an alternate design of a SAW temperature and pressure monitor on a single SAW device.

There are many other ways in which the pressure can be measured based on either the time between reflections or on the frequency or phase change of the SAW device as is well known to those skilled in the art. FIG. 32B, for example, illustrates an alternate SAW geometry where only two sections are required to measure both temperature and pressure. This construction of a temperature and pressure sensor may be utilized in the embodiments of FIGS. 29A–31 or in any embodiment wherein both a pressure measurement and a temperature measurement by a single SAW device is obtained.

Another method where the speed of sound on a piezoelectric material can be changed by pressure was first reported in Varadan et al., "Local/Global SAW Sensors for Turbulence" referenced above. This phenomenon has not been applied to solving pressure sensing problems within an automobile until now. The instant invention is believed to be the first application of this principle to measuring tire pressure, oil pressure, coolant pressure, pressure in a gas tank, etc. Experiments to date, however, have been unsuccessful.

In some cases, a flexible membrane is placed loosely over the SAW device to prevent contaminants from affecting the SAW surface. The flexible membrane permits the pressure to be transferred to the SAW device without subjecting the surface to contaminants. Such a flexible membrane can be used in most if not all of the embodiments described herein.

Figure 33B:
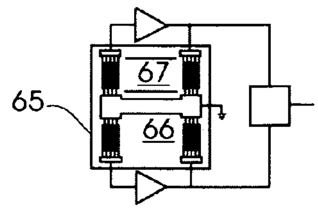
FIG. 33B is a top view of an alternate SAW device capable of determining two physical or chemical properties such as pressure and temperature.
Figure 33:
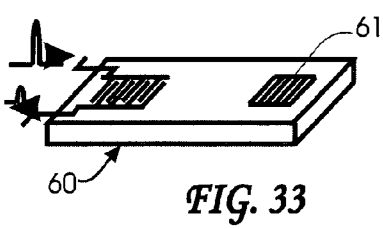
FIG. 33 is a perspective view of a SAW temperature sensor.

A SAW temperature sensor 195 is illustrated in FIG. 33. Since the SAW material, such as lithium niobate, expands significantly with temperature, the natural frequency of the device also changes. Thus, for a SAW temperature sensor to operate, a material for the substrate is selected which changes its properties as a function of temperature, i.e., expands with increasing temperature. Similarly, the time delay between the insertion and retransmission of the signal also varies measurably. Since speed of a surface wave is typically 100,000 times slower then the speed of light, usually the time for the electromagnetic wave to travel to the SAW device and back is small in comparison to the time delay of the SAW wave and therefore the temperature is approximately the time delay between transmitting electromagnetic wave and its reception.

Figure 33A:
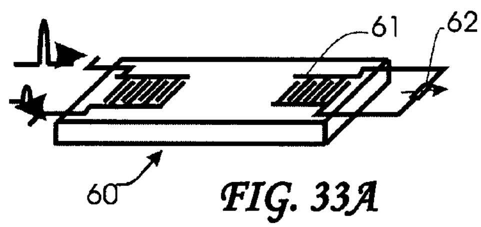
FIG. 33A is a perspective view of a device that can provide two measurements of temperature or one of temperature and another of some other physical or chemical property such as pressure or chemical concentration.

An alternate approach as illustrated in FIG. 33A is to place a thermistor 197 across an interdigital transducer (IDT) 196, which is now not shorted as it was in FIG. 33. In this case, the magnitude of the returned pulse varies with the temperature. Thus, this device can be used to obtain two independent temperature measurements, one based on time delay or natural frequency of the device 195 and the other based on the resistance of the thermistor 197.

When some other property such as pressure is being measured by the device 198 as shown in FIG. 33B, two parallel SAW devices can be used. These devices are designed so that they respond differently to one of the parameters to be measured. Thus, SAW device 199 and SAW device 200 can be designed to both respond to temperature and respond to pressure. However, SAW device 200, which contains a surface coating, will respond differently to pressure than SAW device 199. Thus, by measuring natural frequency or the time delay of pulses inserted into both SAW devices 199 and 200, a determination can be made of both the pressure and temperature, for example. Naturally, the device which is rendered sensitive to pressure in the above discussion could alternately be rendered sensitive to some other property such as the presence or concentration of a gas, vapor, or liquid chemical as described in more detail below.

Figure 34:
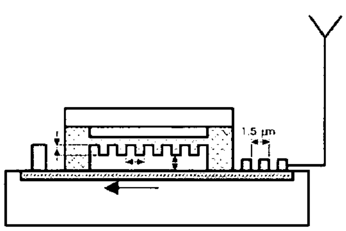
FIGS. 34 and 34A are views of a prior art SAW accelerometer that can be used for the tire monitor assembly of FIG. 31.
Figure 34A:
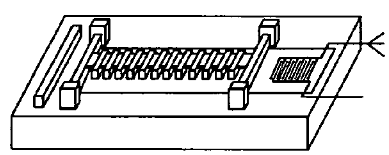

An accelerometer that can be used for either radial or tangential acceleration in the tire monitor assembly of FIG. 31 is illustrated in FIGS. 34 and 34A. The design of this accelerometer is explained in detail in Varadan, V. K. et al., "Fabrication, characterization and testing of wireless MEMS-IDT based microaccelerometers" referenced above and will not be repeated herein.

Figure 35:
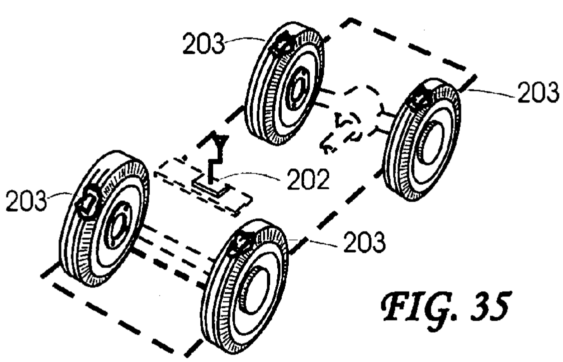
FIG. 35 is a perspective view of a SAW antenna system adapted for mounting underneath a vehicle and for communicating with the four mounted tires.

FIG. 35 illustrates a central antenna mounting arrangement for permitting interrogation of the tire monitors for four tires and is similar to that described in U.S. Pat. No. 04,237,728. An antenna package 202 is mounted on the underside of the vehicle and communicates with devices 203 through their antennas as described above. In order to provide for antennas both inside (for example for weight sensor interrogation) and outside of the vehicle, another antenna assembly (not shown) can be mounted on the opposite side of the vehicle floor from the antenna assembly 202. Devices 203 may be any of the tire monitoring devices described above.

Figure 35A:
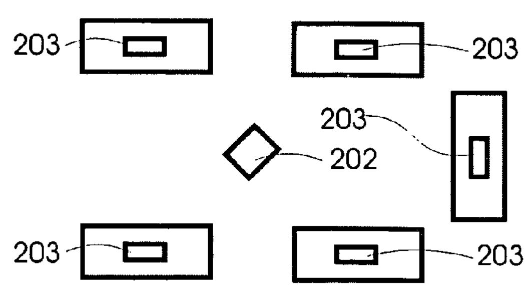
FIG. 35A is a detail view of an antenna system for use in the system of FIG. 35.

FIG. 35A is a schematic of the vehicle shown in FIG. 35. The antenna package 202, which can be considered as an electronics module, contains a time domain multiplexed antenna array that sends and receives data from each of the five tires (including the spare tire), one at a time. It comprises a microstrip or stripline antenna array and a microprocessor on the circuit board. The antennas that face each tire are in an X configuration so that the transmissions to and from the tire can be accomplished regardless of the tire rotation angle.

Figure 36:
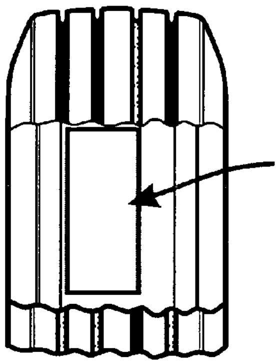
FIG. 36 is a partial cutaway view of a piezoelectric generator and tire monitor using PVDF film.
Figure 36A:
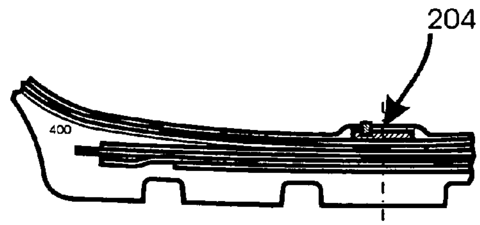
FIG. 36A is a cutaway view of the PVDF sensor of FIG. 36.

Although piezoelectric SAW devices normally use rigid material such as quartz or lithium niobate, it is also possible to utilize PVDF provided the frequency is low. A piece of PVDF film can also be used as a sensor of tire flexure by itself. Such a sensor is illustrated in FIGS. 36 and 36A at 204. The output of flexure of the PVDF film can be used to supply power to a silicon microcircuit that contains pressure and temperature sensors. The waveform of the output from the PVDF film also provides information as to the flexure of an automobile tire and can be used to diagnose problems with the tire as well as the tire footprint in a manner similar to the device described in FIG. 31. In this case, however, the PVDF film supplies sufficient power to permit significantly more transmission energy to be provided. The frequency and informational content can be made compatible with the SAW interrogator described above such that the same interrogator can be used. The power available for the interrogator, however, can be significantly greater thus increasing the reliability and reading range of the system. In order to obtain significant energy based on the flexure of a PVDF film, many layers of such a film may be required.

There is a general problem with tire pressure monitors as well as systems that attempt to interrogate passive SAW or electronic RFID type devices in that the FCC severely limits the frequencies and radiating power that can be used. Once it becomes evident that these systems will eventually save many lives, the FCC can be expected to modify their position. In the meantime, various schemes can be used to help alleviate this problem. The lower frequencies that have been opened for automotive radar permit higher power to be used and they could be candidates for the devices discussed above. It is also possible, in some cases, to transmit power on multiple frequencies and combine the received power to boost the available energy. Energy can of course be stored and periodically used to drive circuits and work is ongoing to reduce the voltage required to operate semiconductors. The devices of this invention will make use of some or all of these developments as they take place.

If the vehicle has been at rest for a significant time period, power will leak from the storage capacitors and will not be available for transmission. However, a few tire rotations are sufficient to provide the necessary energy.

Figure 37:
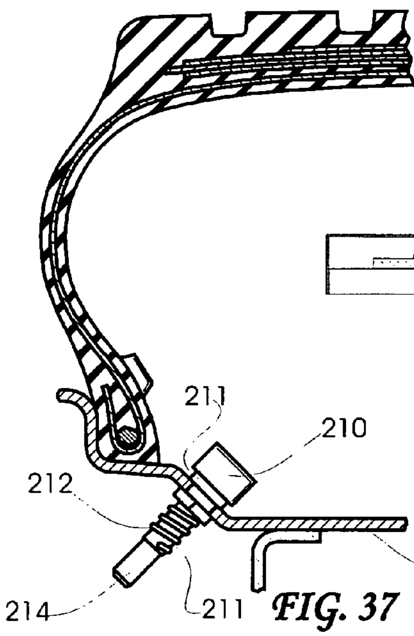
FIG. 37 is an alternate arrangement of a SAW tire pressure and temperature monitor installed in the wheel rim facing inside.

FIG. 37 illustrates another version of a tire temperature and/or pressure monitor 210. Monitor 210 may include at an inward end, any one of the temperature transducers or sensors described above and/or any one of the pressure transducers or sensors described above, or any one of the combination temperature and pressure transducers or sensors described above.

The monitor 210 has an elongate body attached through the wheel rim 213 typically on the inside of the tire so that the under-vehicle mounted antenna(s) have a line of sight view of antenna 214. Monitor 210 is connected to an inductive wire 212, which matches the output of the device with the antenna 214, which is part of the device assembly. Insulating material 211 surrounds the body which provides an air tight seal and prevents electrical contact with the wheel rim 213.

Figure 38:
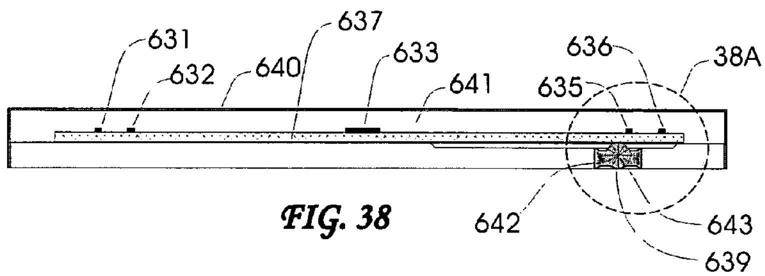
FIG. 38 illustrates an alternate method of applying a force to a SAW pressure sensor from the pressure capsule.
Figure 38A:
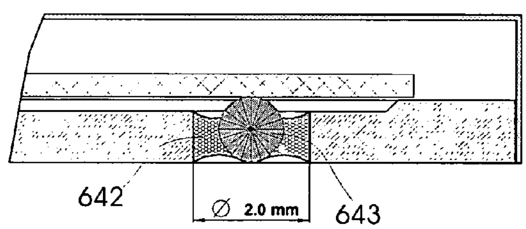
FIG. 38A is a detailed view of FIG. 38 of area 38A.

FIG. 38 illustrates an alternate method of applying a force to a SAW pressure sensor from the pressure capsule and FIG. 38A is a detailed view of area 38A in FIG. 38. In this case, the diaphragm in the pressure capsule is replaced by a metal ball 643 which is elastically held in a hole by silicone rubber 642. The silicone rubber 643 can be loaded with a clay type material or coated with a metallic coating to reduce gas leakage past the ball. Changes in pressure in the pressure capsule act on the ball 642 causing it to deflect and act on the SAW device 637 changing the strain therein.

Figure 39:
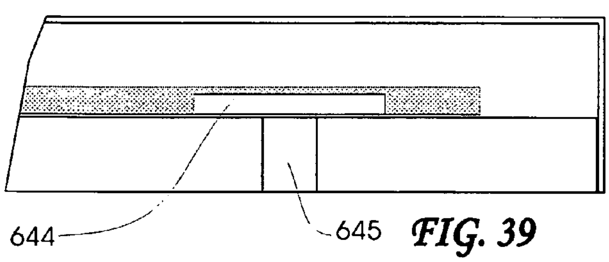
FIG. 39 is an alternate method of FIG. 38A using a thin film of Lithium Niobate

An alternate method to that explained with reference to FIG. 38A using a thin film of lithium niobate 644 is illustrated in FIG. 39. In both of these cases, the lithium niobate 644 is placed within the pressure chamber which also contains the reference air pressure 640. A passage 645 for pressure feed is provided. In the embodiments shown in FIGS. 38, 38A and 39, the pressure and temperature measurement is done on different parts of a single SAW device whereas in the embodiment shown in FIGS. 30A and 30B, two separate SAW devices are used.

Figure 40:
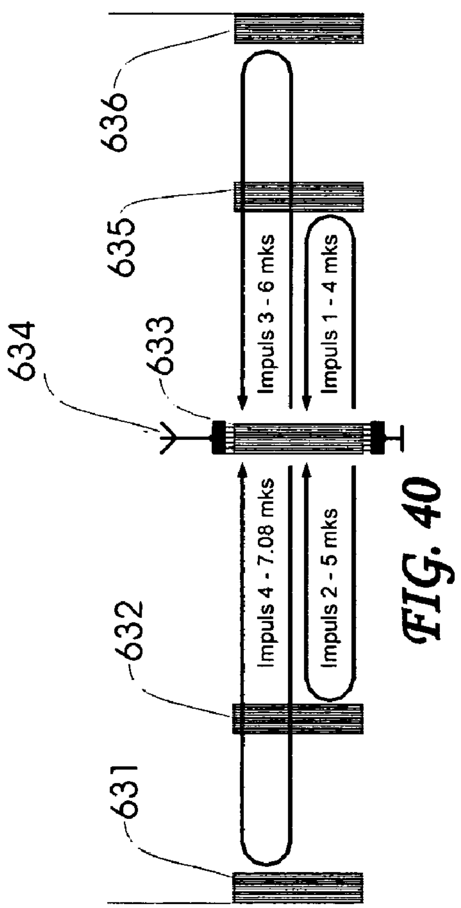
FIG. 40 illustrates a preferred four pulse design of a tire temperature and pressure monitor based on SAW.
Figure 40A:
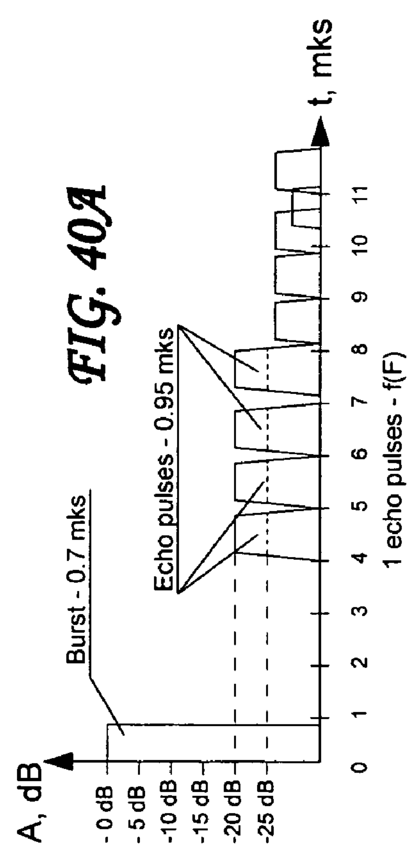
FIG. 40A illustrates the echo pulse magnitudes from the design of FIG. 40.

FIG. 40 illustrates a preferred four pulse design of a tire temperature and pressure monitor based on SAW and FIG. 40A illustrates the echo pulse magnitudes from the design of FIG. 40.

Figure 41:
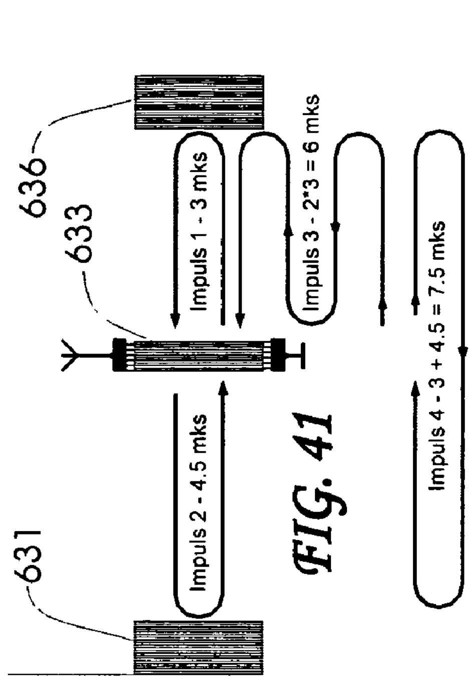
FIG. 41 illustrates an alternate shorter preferred four pulse design of a tire temperature and pressure monitor based on SAW.
Figure 41A:
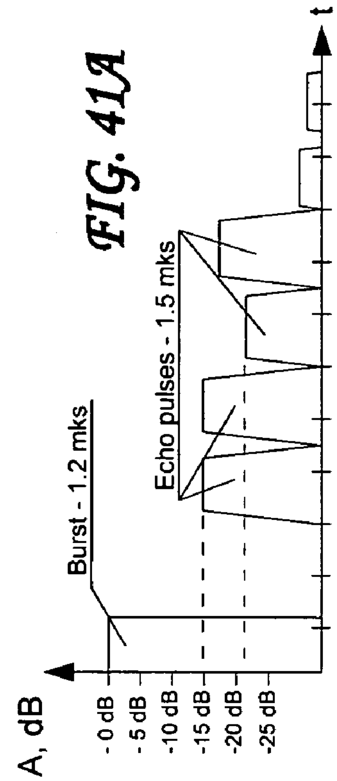
FIG. 41A illustrates the echo pulse magnitudes from the design of FIG. 41

FIG. 41 illustrates an alternate shorter preferred four pulse design of a tire temperature and pressure monitor based on SAW and FIG. 41A illustrates the echo pulse magnitudes from the design of FIG. 41. The innovative design of FIG. 41 is an improved design over that of FIG. 40 in that the length of the SAW is reduced by approximately 50%. This not only reduces the size of the device but also its cost.

1.4.1 Antenna Considerations

As discussed above in section 1.3.1, antennas are a very important part of SAW and RFID wireless devices such as tire monitors. The discussion of that section applies particularly to tire monitors but need not be repeated here.

1.4.2 Boosting Signals

Figure 42:
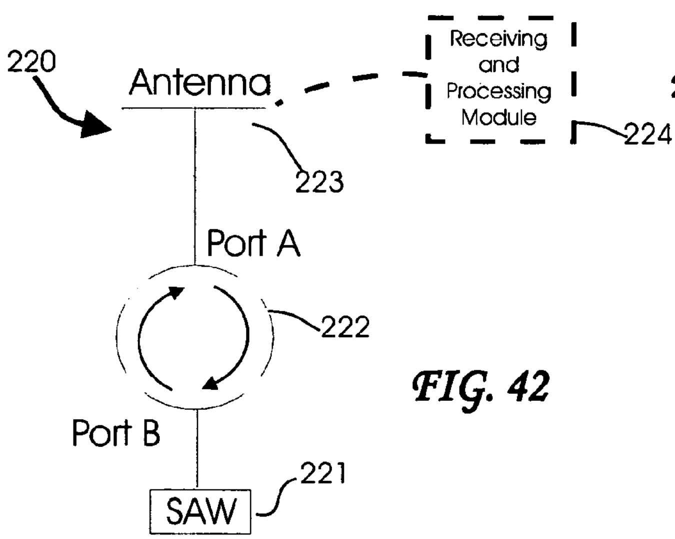
FIG. 42 is a schematic illustration of an arrangement for boosting signals to and from a SAW device in accordance with the invention.

FIG. 42 illustrates an arrangement for providing a boosted signal from a SAW device is designated generally as 220 and comprises a SAW device 221, a circulator 222 having a first port or input channel designated Port A and a second port or input channel designated Port B, and an antenna 223. The circulator 222 is interposed between the SAW device 221 and the antenna 223 with Port A receiving a signal from the antenna 223 and Port B receiving a signal from the SAW device 221.

In use, the antenna 16 receives a signal when a measurement from the SAW device 221 is wanted and a signal from the antenna 16 is switched into Port A where it is amplified and output to Port B. The amplified signal from Port B is directed to the SAW device 221 for the SAW to provide a delayed signal indicative of the property or characteristic measured or detected by the SAW device 221. The delayed signal is directed to Port B of the circulator 222 which boosts the delayed signal and outputs the boosted, delayed signal to Port A from where it is directed to the antenna 16 for transmission to a receiving and processing module 224.

The receiving and processing module 224 transmits the initial signal to the antenna 16 when a measurement or detection by the SAW device 221 is desired and then receives the delayed, boosted signal from the antenna 223 containing information about the measurement or detection performed by the SAW device 221.

Figure 43:
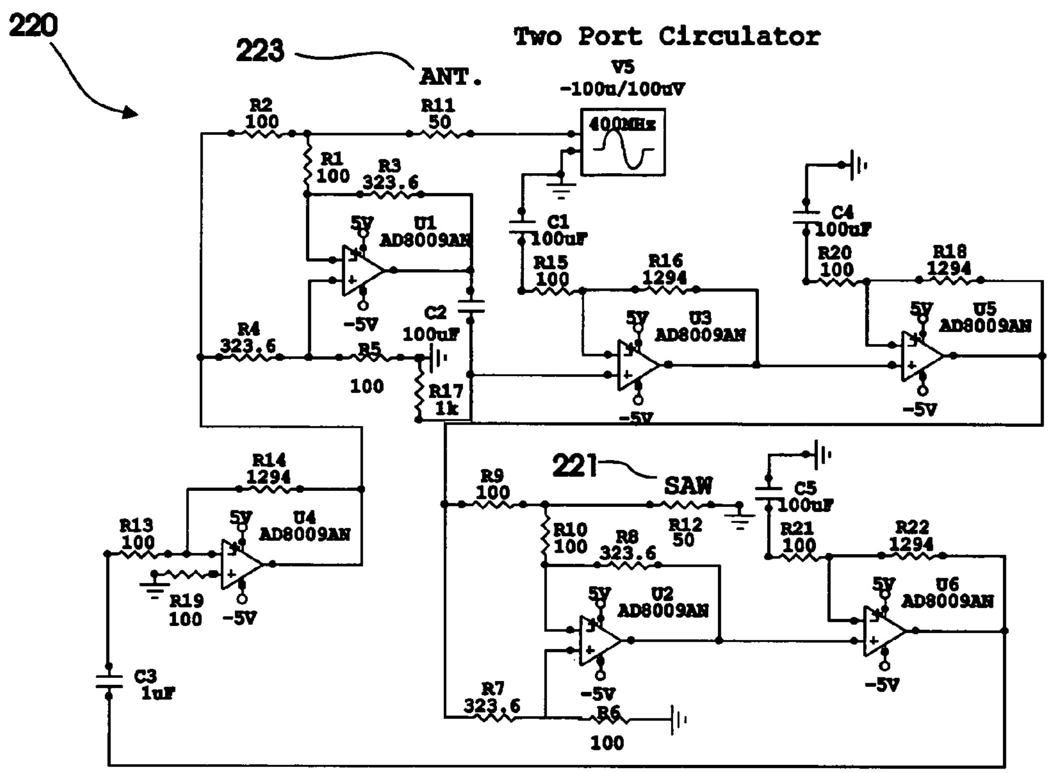
FIG. 43 is a schematic of a circuit used in the boosting arrangement of FIG. 42.

The circuit which amplifies the signal from the antenna 223 and the delayed signal from the SAW device 221 is shown in FIG. 43. As shown, the circuit provides an amplification of approximately 6 db in each direction for a total, round-trip signal gain of 12 db. This circuit requires power as described herein which can be supplied by a battery or generator. A detailed description of the circuit is omitted as it will be understood by those skilled in the art.

Figure 44:
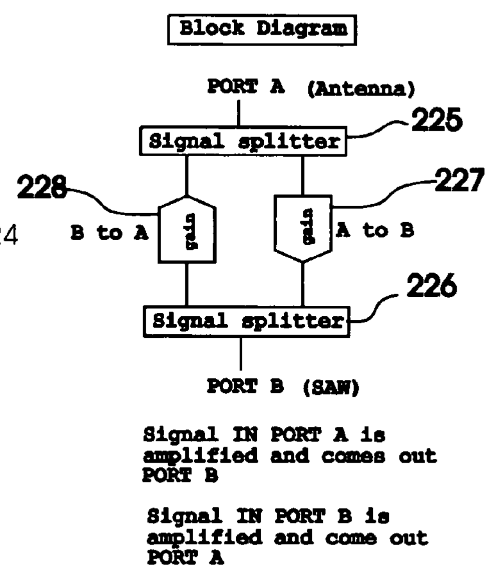
FIG. 44 is a block diagram of the components of the circuit shown in FIG. 43.

As shown in FIG. 44, the circuit of FIG. 43 includes electronic components arranged to form a first signal splitter 225 in connection with the first port Port A adjacent the antenna 223 and a second signal splitter 226 in connection with the second port Port B adjacent the SAW device 221. Electronic components are also provided to amplify the signal being directed from the antenna 223 to the SAW device 221 (gain component 227) and to amplify the signal being directed from the SAW device 221 to the antenna 223 (gain component 228).

The circuit is powered by a battery, of either a conventional type or an atomic battery (as discussed below), or, when used in connection with a tire of the vehicle, a capacitor, super capacitor or ultracapacitor (super cap) and charged by, for example, rotation of the tire or movement of one or more masses as described in more detail elsewhere herein. Thus, when the vehicle is moving, the circuit is in an active mode and a capacitor in the circuit is charged. On the other hand, when the vehicle is stopped, the circuit is in a passive mode and the capacitor is discharged. In either case, the pressure measurement in the tire can be transmitted to the interrogator.

Instead of a SAW device 221, Port B can be connected to an RFID (radio frequency identification) tag or another electrical component which provides a response based on an input signal and/or generates a signal in response to a detected or measured property or characteristic.

Also, the circuit can be arranged on other movable structures, other than a vehicle tire, whereby the movement of the structure causes charging of the capacitor and when the structure is not moving, the capacitor discharges and provides energy. Other movable structures include other parts of a vehicle including trailers and containers, boats, airplanes etc., a person, animal, wind or wave-operated device, tree or any structure, living or not, that can move and thereby permit a properly designed energy generator to generate electrical energy. Naturally other sources of environmental energy can be used consistent with the invention such as wind, solar, tidal, thermal, acoustic etc.

Figure 45:
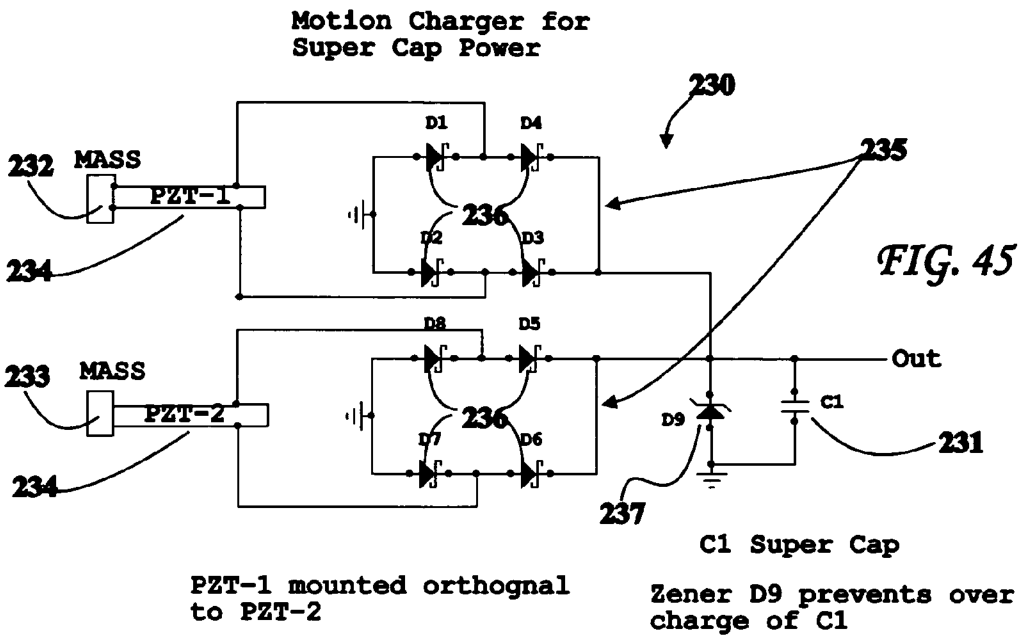
FIG. 45 is a schematic of a circuit used for charging a capacitor during movement of a vehicle which may be used to power the boosting arrangement of FIG. 42.
Figure 46:
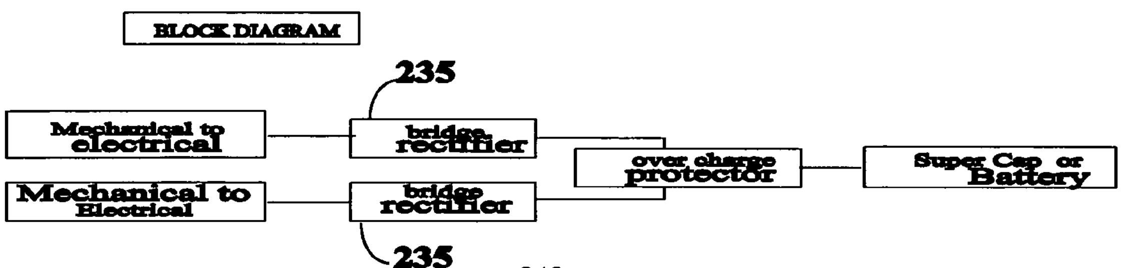
FIG. 46 is a block diagram of the components of the circuit shown in FIG. 45.

FIGS. 45 and 46 show a circuit used for charging a capacitor during movement of a vehicle which may be used to power the boosting arrangement of FIG. 42 or for any other application in which energy is required to power a component such as a component of a vehicle. The energy can be generated by the motion of the vehicle so that the capacitor has a charging mode when the vehicle is moving (the active mode) and a discharge, energy-supplying phase when the vehicle is stationary or not moving sufficient fast to enable charging (the passive mode).

As shown in FIGS. 45 and 46, the charging circuit 230 has a charging capacitor 231 and two masses 232,233 (FIG. 45) mounted perpendicular to one another (one in a direction orthogonal or perpendicular to the other). The masses 232, 233 are each coupled to mechanical-electrical converters 234 to convert the movement of the mass into electric signals and each converter 234 is coupled to a bridge rectifier 235. Bridge rectifiers 235 may be the same as one another or different and are known to those skilled in the art. As shown, the bridge rectifiers 235 each comprise four Zener diodes 236. The output of the bridge rectifiers 235 is passed to the capacitor 231 to charge it. A Zener diode 44 is arranged in parallel with the capacitor 231 to prevent overcharging of the capacitor 231. Instead of capacitor 231, multiple capacitors or a rechargeable battery or other energy-storing device or component can be used.

An RF MEMS or equivalent switch, not shown, can be added to switch the circulator into and out of the circuit slightly increasing the efficiency of the system when power is not present. Heretofore, RF MEMS switches have not been used in the tire, RFID or SAW sensor environment such as for TPM power and antenna switching. One example of an RF MEMS switch is manufactured by Teravicta Technologies Inc. The company's initial product, the TT612, is a 0 to 6 GHz RF MEMS single-pole, double-throw (SPDT) switch. It has a loss of 0.14-dB at 2-GHz, good linearity and a power handling capability of three watts continuous, all enclosed within a surface mount package.

1.4.3 Energy Generation

There are a variety of non-conventional battery and battery less power sources for the use with tire monitors, some of which also will operate with other SAW sensors. One method is to create a magnetic field near the tire and to place a coil within the tire that passes through the magnetic field and thereby generate a current. It may even be possible to use the earth's magnetic field. Another method is to create an electric field and capacitively couple to a circuit within the tire that responds to an alternating electric field external to the tire and thereby induce a current in the circuit within the tire. One prior art system uses a weight that responds to the cyclic change in the gravity vector as the tire rotates to run a small pump that inflates the tire. That principle can also be used to generate a current as the weight moves back and forth.

One interesting possibility is to use the principle of regenerative braking to generate energy within a tire in a manner similar to the way such systems are in use on electric vehicles. Such a device can generate energy within each tire every time the vehicle is stopped. Such a regenerative unit can be a small device used in conjunction with a primary regenerative unit that could reside on the vehicle. Such a unit can be designed to operate just as the brakes are being applied and make use of the slip between the fixed and movable surfaces of the brake, many other methods will now be obvious wherein the relative motion of the two engaging surfaces of a brake assembly can be used to generate power. Another method, for example, could be to generate energy inductively between the moving and fixed brake surfaces or other surfaces that move relative to each other. A further method to generate energy could be based on movement of the plates of a capacitor relative to each other to generate a current. Many of these methods could be part of or separate from the brake assembly as desired by the skilled-in-the-art designer.

A novel method is to use a small generator that can be based on MEMS or other principles in a manner to that discussed in Gilleo, Ken, "Never Need Batteries Again" appearing at http://www.e-insite.net/epp/index.asp?layout=article&articleid =CA219070. This article describes a MEMS energy extractor that can be placed on any vibrating object where it will extract energy from the vibrations. Such a device would need to be especially designed for use in tire monitoring, or other vehicle or non-vehicle application, in order to optimize the extraction of energy. The device would not be limited to the variations in the gravity vector, although it could make use of it, but can also generate electricity from all motions of the tire including those caused by bumps and uneven roadways. The greater the vibration, the more electric power that will be generated.

Figure 47A:
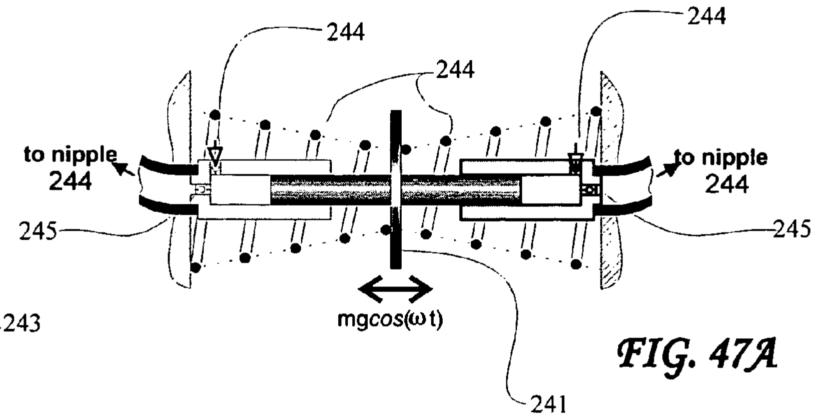
FIG. 47A is an enlarged view of the tire pumping system shown in FIG. 47.
Figure 47:
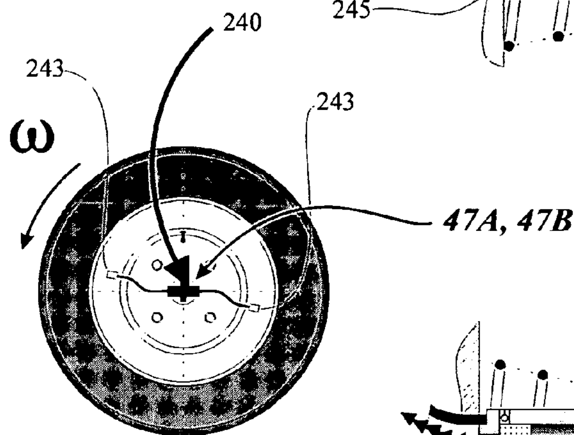
FIG. 47 is a view of a wheel including a tire pumping system in accordance with the invention.
Figure 47B:
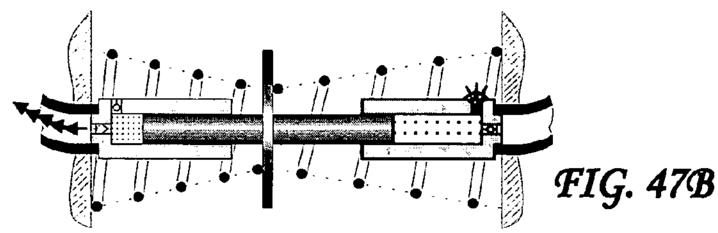
FIG. 47B is an enlarged view of the tire pumping system shown in FIG. 47 during a pumping stroke.

FIGS. 47, 47A and 47B illustrate a tire pumping system having a housing for mounting external to a tire, e.g., on the wheel rim. This particular design is optimized for reacting to the variation in gravitational vector as the wheel rotates and is shown in the pumping design implementation mode. The housing includes a mass 241 responsive to the gravitational vector as the wheel rotates and a piston rod connected to or formed integral with the mass 241. The mass 241 may thus have an annular portion (against which springs 242 bear) and an elongated cylindrical portion (movable in chambers) as shown. The mass alternately compresses the springs 242, one on each side of the mass 241, and draws in air through inlet valves 244 and exhausts air through exhaust valves 245 to enter the tire through nipples 243. Mass 241 is shown smaller that it would in fact be. To minimize the effects of centrifugal acceleration, the mass 241 is placed as close as possible to the wheel axis.

When the mass 241 moves in one direction, for example to the left in FIGS. 47A and 47B, the piston rod fixed to the mass 241 moves to the left so that air is drawn into a chamber defined in a cylinder through the inlet valve 244. Upon subsequent rotation of the wheel, the mass 241 moves to the right causing the piston rod to move to the right and force the air previously drawn into chamber through an exhaust valve 245 and into a tube leading to the nipple 243 and into the tire. During this same rightward movement of the piston rod, air is drawn into a chamber defined in the other cylinder through the other inlet valve 244. Upon subsequent rotation of the wheel, the mass 241 moves to the left causing the piston rod to move to the left and force the air previously drawn into chamber through an exhaust valve 245 and into a second tube leading to the other nipple 243 and into the tire. In this manner, the reciprocal movement of the mass 241 results in inflation of the tire.

Valves 244 are designed as inlet valves and do not allow flow from the chambers to the surrounding atmosphere. Valves 245 are designed as exhaust valves and do not allow flow from the tubes into the respective chamber.

In operation, other forces such as caused by the tire impacting a bump in the road will also effect the pump operation and in many cases it will dominate. As the wheel rotates (and the mass 241 moves back and forth for example at a rate of mg cos (ωt), the tire is pumped up.

In the illustrated embodiment, the housing includes two cylinders each defining a respective chamber, two springs 242, two tubes and an inlet and exhaust valve for each chamber. It is possible to provide a housing having only a single cylinder defining one chamber with an inlet and exhaust valve, and associated tube leading to a nipple of the tire. The mass would thus inflate the tire at half the inflation rate when two cylinders are provided (assuming the same size cylinder was to be provided). It is also contemplated that a housing having three cylinders and associated pumping structure could be provided. The number of cylinders could depend on the number of nipples on the tire. Also, it is possible to have multiple cylinders leading to a common tube leading to a common nipple.

Figure 47C:
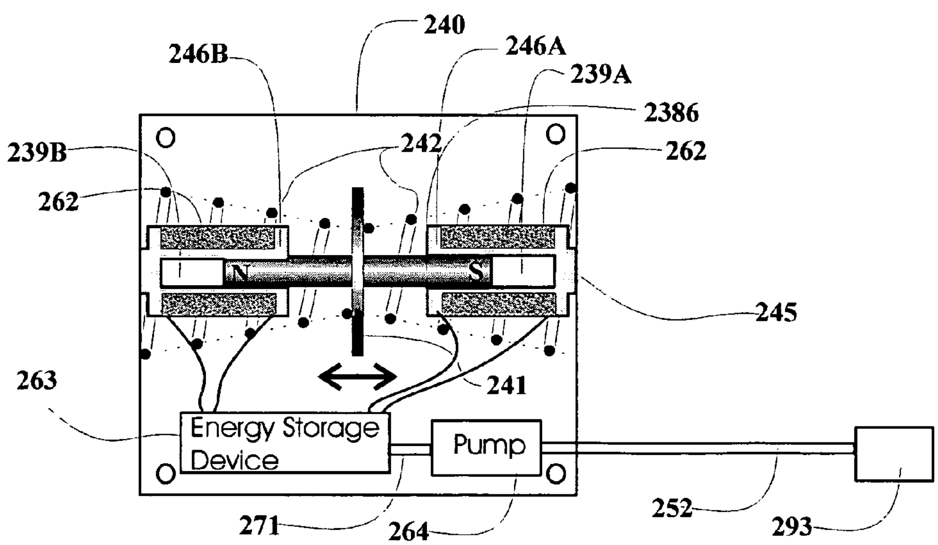
FIG. 47C is an enlarged view of an electricity generating system used for powering a pump.

Alternately, instead of a pump which is operated based on movement of the mass, an electricity generating system can be provided which powers a pump or other device on the vehicle. FIG. 47C shows an electricity generating system in which the mass 241 is magnetized and include a piston rod 238 and coils 262 are wrapped around cylinders 246A, 246B which define chambers 239A,239B in which the piston rod 238 moves. As the tire rotates, the system generates electricity and charges up a storage device 263 as described above. Thus, in this embodiment of an electricity generating system, the housing 240 is mounted external to the tire and includes one or more cylinders 246A, 246B each defining a chamber 239A, 239B. The mass 241 is movable in the housing 240 in response to rotation thereof and includes a magnetic piston rod 238 movable in each chamber 239A, 239B. The magnetic piston rod 238 may be formed integral with or separate from, but connected to, the mass 241. A spring is compressed by the mass 241 upon movement thereof and if two springs 242 are provided, each may be arranged between a respective side of the mass 241 and the housing 240 and compressed upon movement of the mass 241 in opposite directions. An energy storage or load device 263 is connected to each coil 262, e.g., by wires, so that upon rotation of the tire, the mass 241 moves causing the piston 238 to move in each chamber 239A,239B and impart a charge to each coil 262 which is stored or used by the energy storage or load device 263. When two coils 262 are provided, upon rotation of the tire, the mass 241 moves causing the piston rod 238 to alternately move in the chambers 239A,239B relative to the coils 262 and impart a charge alternatingly to one or the other of the coils 262 which is stored or used by the energy storage or load device 263.

The energy storage device 263 can be used to power a tire pump 264 and coupled thereto ca be a wire 271, and a tube 252 can be provided to coupled the pump 264 to the nipple 293 of the tire. Obviously, the pump 264 must communicate with the atmosphere through the housing walls to provide an intake air flow.

The housing 240 may be mounted to the wheel rim or tire via any type of connection mechanism, such as by bolts or other fasteners through the holes provided. In the alternative, the housing 240 may be integrally constructed with the wheel rim.

Non-linear springs 242 can be used to help compensate for the effects of centrifugal accelerations. Naturally, this design will work best at low vehicle speeds or when the road is rough.

Figure 48A:
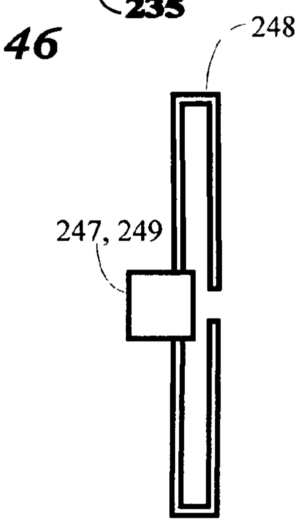
FIGS. 48A and 48B show an RFID energy generator.
Figure 48B:
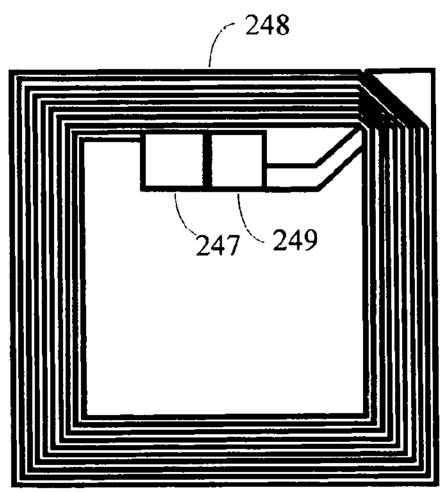

FIGS. 48A and 48B illustrate two versions of an RFID tag, FIG. 48A is optimized for high frequency operation such as a frequency of about 2.4 GHz and FIG. 48B is optimized for low frequency operation such as a frequency of about 13.5 MHz. The operation of both of these tags is described in U.S. Pat. No. 06,486,780 and each tag comprises an antenna 248, an electronic circuit 247 and a capacitor 249. The circuit 247 contains a memory that contains the ID portion of the tag. For the purposes herein, it is not necessary to have the ID portion of the tag present and the tag can be used to charge a capacitor or ultra-capacitor 249 which can then be used to boost the signal of the SAW TPM as described above. The frequency of the tag can be set to be the same as the SAW TPM or it can be different permitting a dual frequency system which can make better use of the available electromagnetic spectrum. For energy transfer purposes, a wideband or ultra-wideband system that allows the total amount of radiation within a particular band to be minimized but spreads the energy over a wide band can also be used.

Other systems that can be used to generate energy include a coil and appropriate circuitry, not shown, that cuts the lines of flux of the earth's magnetic field, a solar battery attached to the tire sidewall, not shown, and a MEMS or other energy-based generators which use the vibrations in the tire. The bending deflection of tread or the deflection of the tire itself relative to the tire rim can also be used as sources of energy, as disclosed below. Additionally, the use of a PZT or piezoelectric material with a weight, as in an accelerometer, can be used in the presence of vibration or a varying acceleration field to generate energy. All of these systems can be used with the boosting circuit with or without a MEMS RF or other appropriate mechanical or electronic switch.

Figure 49A:
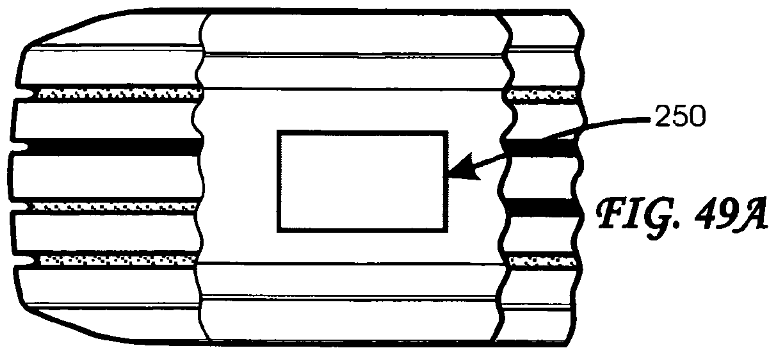
FIG. 49A shows a front view, partially broken away of a PVDF energy generator in accordance with the invention.
Figure 49B:
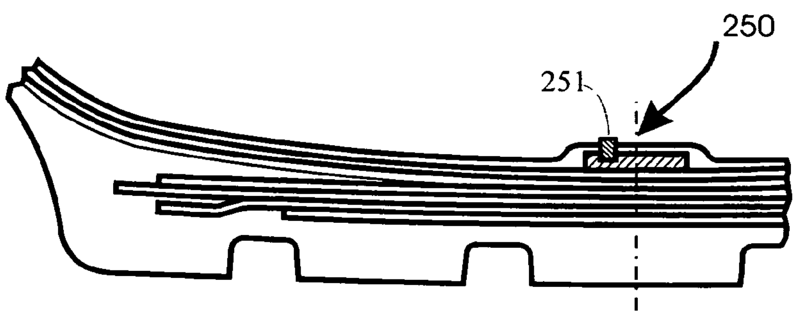
FIG. 49B is a cross-sectional view of the PVDF energy generator shown in FIG. 49A.
Figure 50B:
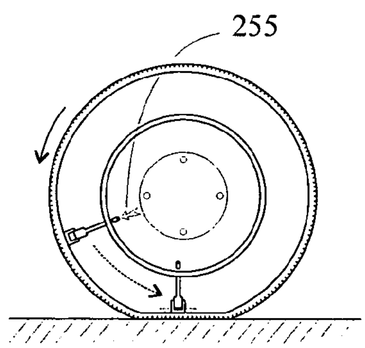
FIG. 50B shows a view of a first embodiment of a piston assembly of the energy generator shown in FIG. 50A.
Figure 50D:
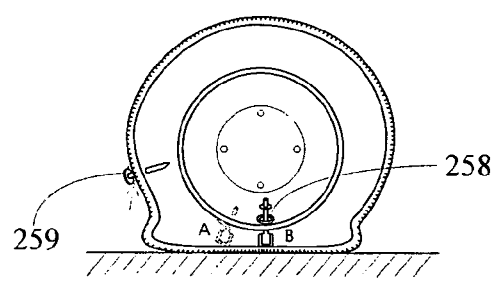
FIG. 50D shows a position of the energy generator shown in FIG. 50A when the tire is flat.
Figure 50A:
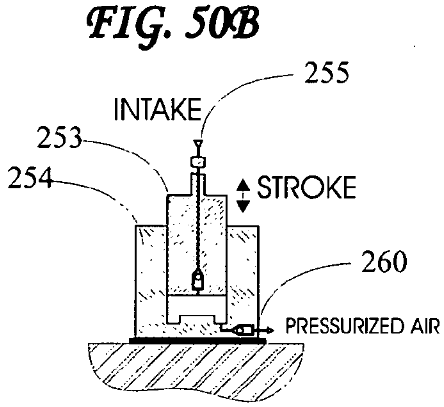
FIG. 50A is a front view of an energy generator based on changes in the distance between the tire tread and rim.
Figure 50C:
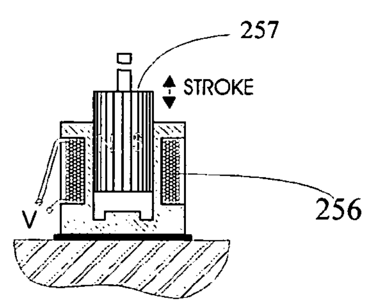
FIG. 50C shows a view of a second embodiment of a piston assembly of the energy generator shown in FIG. 50A.

FIGS. 49A and 49B illustrate a pad 250 made from a piezoelectric material such as polyvinylidene fluoride (PVDF) that is attached to the inside of a tire adjacent to the tread and between the side walls. Other PZT or piezoelectric materials can also be used instead of PVDF. As the material of the pad 250 flexes when the tire rotates and brings the pad 250 close to the ground, a charge appears on different sides of the pad 250 thereby creating a voltage that can be used along with appropriate circuitry, not shown, to charge an energy storage device or power a vehicular component. Similarly, as the pad 250 leaves the vicinity of the road surface and returns to its original shape, another voltage appears having the opposite polarity thereby creating an alternating current. The appropriate circuitry 251 coupled to the pad 250 then rectifies the current and charges the energy storage device, possibly incorporated within the circuitry 251.

Variations include the use of a thicker layer or a plurality of parallel layers of piezoelectric material to increase the energy generating capacity. Additionally, a plurality of pad sections can be joined together to form a belt that stretches around the entire inner circumference of the tire to increase the energy-generating capacity and allow for a simple self-supporting installation. Through a clever choice of geometry known or readily determinable by those skilled in the art, a substantial amount of generating capacity can be created and more than enough power produced to operate the booster as well as other circuitry including an accelerometer. Furthermore, PVDF is an inexpensive material so that the cost of this generator is small. Since substantial electrical energy can be generated by this system, an electrical pump can be driven to maintain the desired tire pressure for all normal deflation cases. Such a system will not suffice if a tire blowout occurs.

A variety of additional features can also be obtained from this geometry such as a measure of the footprint of the tire and thus, when combined with the tire pressure, a measure of the load on the tire can be obtained. Vibrations in the tire caused by exposed steel belts, indicating tire wear, a nail, bulge or other defect will also be detectable by appropriate circuitry that monitors the information available on the generated voltage or current. This can also be accomplished by the system that is powered by the change in distance between the tread and the rim as the tire rotates coupled with a measure of the pressure within the tire.

FIGS. 50A–50D illustrate another tire pumping and/or energy-generating system based on the principle that as the tire rotates the distance from the rim to the tire tread or ground changes and that fact can be used to pump air or generate electricity. In the embodiment shown in FIGS. 50A and 50B, air from the atmosphere enters a chamber in the housing or cylinder 254 through an inlet or intake valve 255 during the up-stroke of a piston 253, and during the down-stroke of the piston 253, the air is compressed in the chamber in the cylinder 254 and flows out of exhaust valve 260 into the tire. The piston 253 thus moves at least partly in the chamber in the cylinder 254. A conduit is provided in the piston 253 in connection with the inlet valve 255 to allow the flow of air from the ambient atmosphere to the chamber in the cylinder 254.

In the electrical energy-generating example (FIG. 50C), a piston 257 having a magnet that creates magnet flux travels within a coil 256 (the up and down stroke occur at least partly within the space enclosed by the coil 256) and electricity is generated. The electricity is rectified, processed and stored as in the above examples. Naturally, the force available can be substantial as a portion of the entire load on the tire can be used.

The rod connecting the rim to the device can be designed to flex under significant load so that the entire mechanism is not subjected to full load on the tire if the tire does start going flat. Alternately, a failure mode can be designed into the mechanism so that a replaceable gasket 258, or some other restorable system, permits the rod of the device to displace when the tire goes flat as, for example, when a nail 259 punctures the tire (see FIG. 50D). This design has a further advantage in that when the piston bottoms out indicating a substantial loss of air or failure of the tire, a once-per-revolution vibration that should be clearly noticeable to the driver occurs. Naturally, several devices can be used and positioned so that they remain in balance. Alternately this device, or a similar especially designed device, by itself can be used to measure tire deflection and thus a combination of tire pressure and vehicle load.

An alternate approach is to make use of a nuclear micro-battery as described in, A. Amit and J. Blanchard "The Daintiest Dynamos", (http:www.spectrum.ieee.org/WEB-ONLY/publicfeature/sep04/0904nuc.html#t1) IEEE Spectrum online 2004. Other energy harvesting devices include an inductive based technology from Ferro Solutions Inc. These innovative ideas and more to come are applicable for powering the devices described herein including tire pressure and temperature monitors, for example.

Ultra-capacitors are now being developed to replace batteries in laptop computers and other consumer electronic devices. They also have a unique role to play in tire monitors when energy harvesting systems are used and generally as replacement for batteries. A key advantage of an ultra-capacitor is its insensitivity to high temperatures that can destroy conventional batteries or to low temperatures that can temporarily render them non-functional. Ultra-capacitors also do not require replacement when their energy is exhausted and can be simply be recharged rather than requiring replacement as in the case of batteries.

1.4.4 Communication, RFID

One problem discussed in relevant patents and literature on tire monitoring is the determination of which tire has what pressure. A variety of approaches have been suggested in the current assignee's patents and patent applications including placing an antenna near each wheel, the use of highly directional antennas (one per wheel but centrally located), the use of multiple antennas and measuring the time of arrival or angle of arrival of the pulses and the use of an identification code, such as a number, that is transmitted along with the tire pressure and temperature readings. For this latter case, the combination of an RFID with a SAW TPM is suggested herein. Such a combination RFID and SAW in addition to providing energy to boost the SAW system, as described above, can also provide a tire ID to the interrogator. The ID portion of the RFID can be a number stored in memory or it can be in the form of another SAW device. In this case, a PVDF RFID Tag can be used that can be manufactured at low cost. Specifically, the PVDF ID inter-digital transducers (IDTs) can be printed onto the PVDF material using an ink jet printer, for example, or other printing method and thus create an ID tag at a low cost and remove the need for memory in the RFID electronic circuit.

The SAW-based tire monitor can preferably be mounted in a vertical plane to minimize the effects of centrifugal acceleration. This can be important with SAW devices due to the low signal level, unless boosted, and the noise that can be introduced into the system by mechanical vibrations, for example.

Use of a SAW-based TPM, and particularly a boosted SAW-based TPM as described herein, permits the aftermarket replacement for other battery-powered TPM systems, such as those manufactured by Schrader, which are mounted on the tire valves with a battery-less replacement product removing the need periodic replacement and solving the disposal problem.

Although in general, use of a single TPM per tire or wheel is discussed and illustrated above, it is also possible to place two or more such devices on a wheel thereby reducing the effect of angular position of the wheel on the transmission and reception of the signal. This is especially useful when passive SAW or RFID devices are used due to their limited range. Also, since the cost of such devices is low, the cost of adding this redundancy is also low.

U.S. Pat. No. 06,581,449 describes the use of an RFID-based TPM as also disclosed herein wherein a reader is associated with each tire. In the invention herein, the added cost associated with multiple interrogators, or multiple antennas connected with coax cable, is replaced with the lower cost solution of a single interrogator and multiple centrally located antennas.

The ability to monitor a variety of tires from a single location in or on a vehicle has been discussed above as being important for keeping the cost of the system low. The need to run a wire to each wheel well, and especially if this wire must be a coax cable, can add substantially to the installed system cost. One method of increasing the range of RFID is described in Karthaus, U. et al. "Fully integrated passive UHF RFID transponder IC with 16.7 microwatt Input Power" IEEE Journal of Solid-State Circuits, Vol. 38, No. 10, October 2003 and is applicable to the inventions disclosed herein. Another approach is to make use of the intermittent part of FCC Rule 15 wherein the transmissions per hour are limited to 2 seconds. In that case, the transmitted power can be increased substantially which can result in an 80 db gain which can very substantially increase the distance permitted from the antenna to the SAW or RFID device. Also, Niekerk describes an extended-range RFID that is useable with at least one invention disclosed herein as described in U.S. Pat. No. 06,463,798, U.S. Pat. No. 06,571,617 and U.S. patent application publication Nos. 20020092346 and 20020092347.

When using an RFID device as described herein, the frequency the RFID device transmits can be different from the frequency used to power the device and both can be different from the frequency used by a SAW device that may be present. Sometimes a low frequency in the KHz range can be used to pass energy to a tire-mounted device as the device can be in the near field which can be more efficient for energy transfer. On the other hand, a directional high frequency transmission, for example in the 900 MHz range, may be more efficient for information transfer. Also, FCC rules may permit higher transmit power for some frequencies such as Radar which can make these frequencies better for power transfer.

When a box, for example, contains 100 RFID tags (which may be passive tags), the RFID industry has developed methods to read and write to all 100 tags without data collision problems. This is partially due to the digital nature of the RFID communication protocols. See, for example GB2259227, WO9835327, WO0241650, U.S. Pat. No. 03,860,922, U.S. Pat. No. 04,471,345, U.S. Pat. No. 05,521,601, U.S. Pat. No. 05,266,925, U.S. Pat. No. 05,550,547, U.S. Pat. No. 05,521,601, U.S. Pat. No. 05,673,037, U.S. Pat. No. 05,515,053, U.S. Pat. No. 06,377,203, and U.S. patent application publication Nos. 20020063622 and 20030001009. When communicating with a SAW device, analogue information is received from each SAW making it more difficult to separate the transmissions from the four tires using a single, centrally mounted antenna system. Thus if the signals were purely RFID-based, then this separation can be achieved but with SAW systems, even thought they have a greater range than RFID systems, this separation is more difficult. Discussions above have addressed this problem using smart antennas, multiple antennas and other mechanisms that use information related to tire rotation etc. Others in the industry have solved the problem by putting an antenna in each wheel well which significantly increases the installation costs since the wires to each wheel well should be coax cables. The solution described below is thus a significant breakthrough in this field.

The following discussion is directed to a preferred embodiment of a tire pressure and temperature sensor based on SAW but using a companion RFID device in a novel and unique manner. In this design, sketched in FIG. 185, one or more RFID devices 302 each function as, controls or includes a switch 315 that turns on when it receives its appropriate code. This technique is equally applicable to other SAW-based sensors and is not limited to tire monitors. Each sensor assembly (tire pressure monitor or other) can include an antenna 303 in series with an RFID device 302/switch 315 in series with the SAW sensor 304. Each RFID device 302 has a programmable address (which may or may not come pre-programmed) and either has within, or can control externally, switch 315 that connects or disconnects the SAW sensor 304 from a circuit. The interrogator 309 can send either RFID device commands or can send SAW device interrogation pulses. RFID commands can be:

<Address>enable switch 315

All sensors disable

When the RFID device 302 receives the enable command from the interrogator 309, matched to its address, it can close the switch 315 and connect the SAW sensor 304 to the receive antenna 303. The interrogator 309 will then send a SAW interrogation signal to be received by the SAW sensor 304 (which can be part of a preferred pressure sensor) a single pulse and monitor the received transmission from the SAW sensor 304. After the transmission is received, the interrogator 309 will then send the disable command.

When the RFID device 302 sees the global disable command, it can open the switch 315, disconnecting the SAW sensor 304 from the circuit with the receive antenna 303. In this manner, only one SAW sensor 304 will respond at any given time. This can be advantageous for a tire pressure and temperature device, for example, in that coherent interference greatly influences the ability of the interrogator circuitry to accurately measure phase change, for example. This means that if multiple sensors responded at the same time, the accuracy of the system can be substantially degraded. Consider the following example:

Input information:

Radiated power of interrogator to remain within FCC requirements—$P_{burst}$=0.5 W;

Radiated frequency −433.92 MHz;

Total losses of a radio signal cycle −50 to 55 dB consisting of;

$IL_{sens}$=−20 dB—sensor losses;

$IL_{input}$=−15–17.5 dB—Losses in transmission from the interrogator to the sensor;

$IL_{out}$=−15–17.5 dB—Losses in transmission from the sensor to the interrogator.

Transponder's antenna impedance—$R_{sens}$=75 Ohm.

The pulse amplitude $U_{pic}$ in the sensor's antenna (input signal) is:

$$Upic.=1.4*\sqrt{Pburs.*ILinpt.*Rsens.}=1.144\text{–}1.525\text{ V}$$

Figure 51:
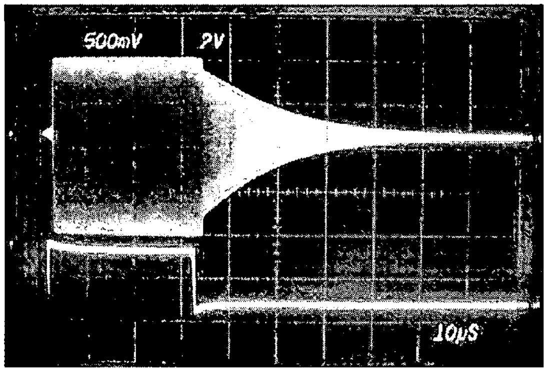
FIG. 51 is an oscilloscope trace by Transense Technologies, which one confirms correspondence between interrogator pulse and voltage at the saw antenna.

This is consistent with work of Transense Technologies in their published results where they show oscilloscope traces of a 500 mv interrogator pulse measured at the SAW antenna yielding a larger than 1 volt pulse in the SAW circuit as shown in FIG. 51.

Figure 52A:
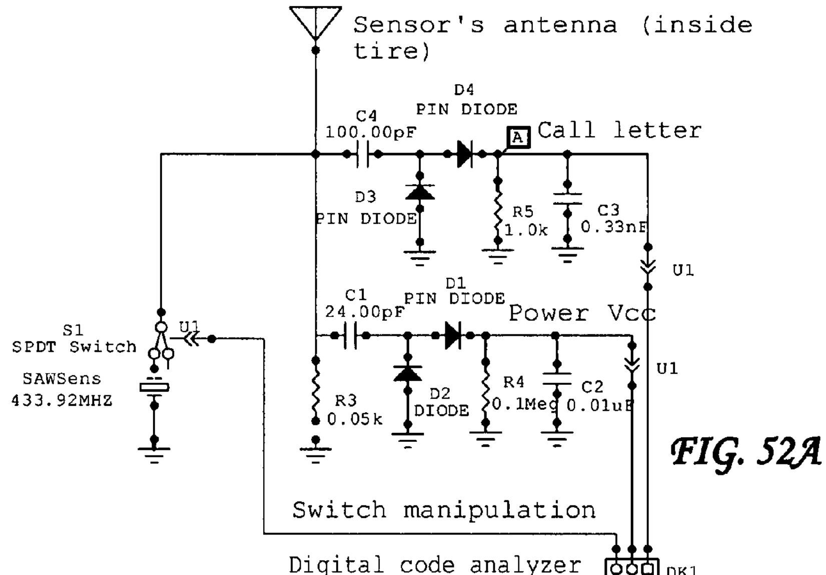
FIG. 52A illustrates an electronic circuit such as used by Transense Technologies for their SAW based tire temperature and pressure monitor.

An example of the electric circuit for such transponder is shown in FIG. 52A.

Figure 53:
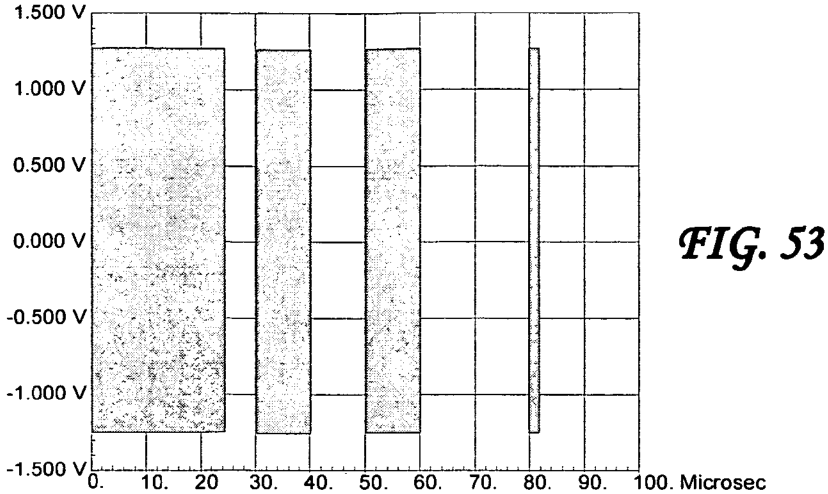
FIG. 53 is an oscillogram of RF pulses, which are radiated the interrogator.

An oscillogram of RF pulses, which are radiated by the interrogator, are illustrated in FIG. 53.

Figure 54:
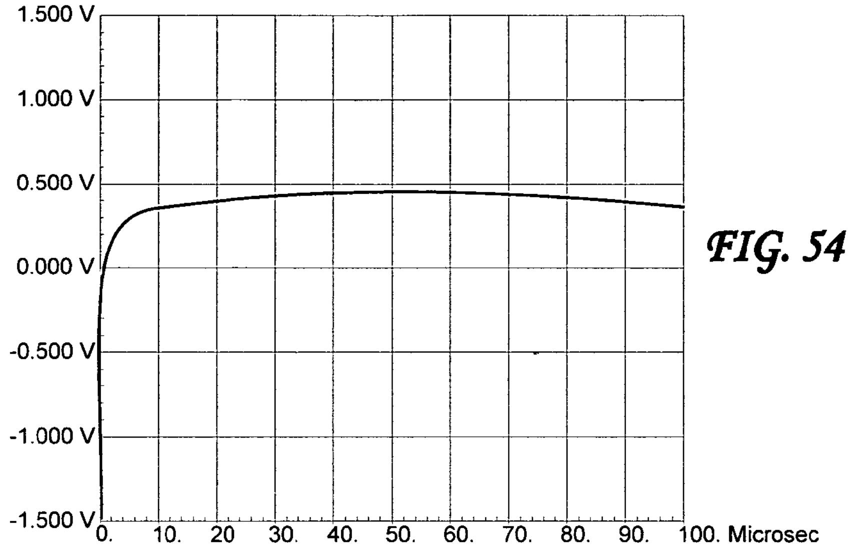
FIG. 54 show diodes which transpose any signal from the antenna to a supply voltage (approximately 1.2V) for a digital code analyzer and sensor's SPDT switch S1
Figure 55:
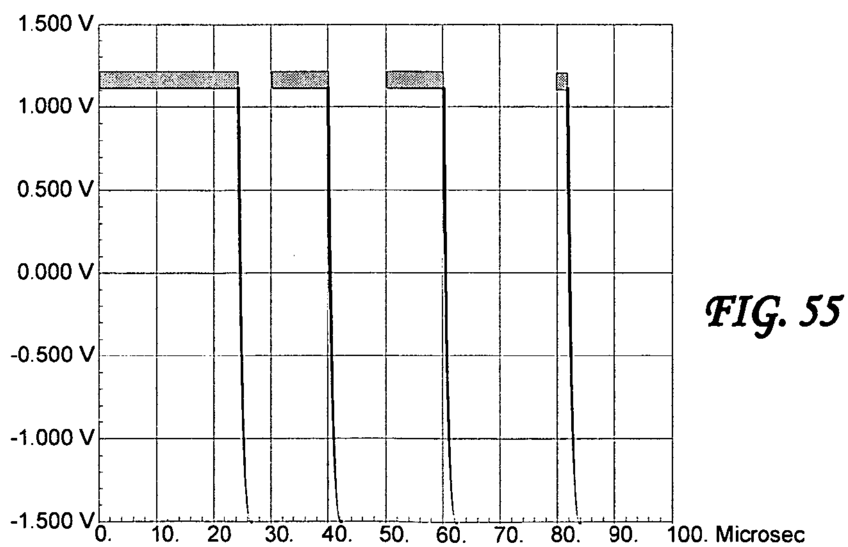
FIG. 55 shows diode detectors D3 and D4 which transpose signals from the antenna to digital code.

The transponder's antenna is connected to two diode detectors, D1 and D2, which transpose the signal from the antenna to create a supply voltage (approximately 1.2V) for the digital code analyzer DK1 and sensor's SPDT switch S1 as shown in FIG. 54. FIG. 55 illustrated the output from diode detectors D3 and D4 which transpose signals from the antenna to digital code.

If the code sequence from the interrogator corresponds to an individual code of the given sensor, the digital code analyzer causes a switch to be turned on. In the illustrated example, the code sequence consists of two pulses. The number of pulses can of course be increased and, as discussed below, a 32 or 64 bit switch is contemplated for some implementations.

Generally, the pulse duration of the power excitation and call letter signals can be 70 to 80 microseconds as shown. During this time period, the supply voltage is relatively constant and the sensor is not connected to the antenna. Thus there are no echo pulses excited in the sensor.

If the code sequence is correct and a turn-on voltage for the switch is received, the sensor is connected to the antenna. This state remains for a long time such as hundreds of microseconds. The SAW sensor is thus ready to measure the temperature and pressure. After sensing an interrogation pulse to the SAW sensor, it is necessary to pause before for approximately 20 microseconds (in this case) before sending a new interrogating pulse. This pause is necessary in order to let the echo pulses which still remain from the previous interrogating pulse to die out or dissipate. Thus, it is possible to execute sequentially 10 to 30 cycles of independent measurements since the retention time of a supply voltage is 300 to 500 microseconds.

A sensor can be disconnected from the antenna for one of two reasons:

1. When a special code sequence is received, the turn off all sensors code. This code sequence is the same for all sensors.
2. If the supply voltages has decreased below a threshold and no pulses come from the antenna which can happen, for example, when the vehicle is parked. In the illustrated example, this will happen in approximately 10 milliseconds.

Modeling of the circuit design has been done with the "CircuitMaker 2000" software package. It was assumed that a special microcircuit chip with a 1 to 1.5 V supply voltage and approximately a 10 microampere current mode is used. It conforms to the equivalent resistance which is connected to power supply, 10 K. Such microcircuit chips are used in electronic watches and micro calculators. Note that for a particular design if the supply voltage proves insufficient, it is possible to use diode voltage multipliers (in the circuit's schematic, a doubling diode detector is shown).

The above discussion assumes that the interrogator knows the switch ID for each wheel or other such device on the vehicle. Initially or after a tire rotation, for example, or the addition of additional similar devices, the vehicle interrogator will not know the switch IDs and thus a general method is required to teach the interrogator this information. Many schemes exist or can be developed to accomplish this goal. Each of the devices can be manually activated, for example, under an interrogator learning mode or through the use of a manual switch on each tire. An alternate and preferred method is to have this accomplished automatically as in plug-and-play. One way of accomplishing this will now be described but this invention is not limited to this particular method and encompasses any and all methods of automatically locating an RFID, SAW or similar sensing device including tire temperature and pressure monitors, other temperature, liquid level, switch, chemical etc. sensors as discussed anywhere else herein and other similar type devices that are not discussed herein. See also, for example, U.S. Pat. No. 06,577,238.

In a preferred implementation, each device is also provided with a conventional RFID tag which can be read with a general command in a similar method as conventional RFID tags. These tags may operate at a different frequency than the RFID switch discussed above. The RFID tag associated with a particular device will have either the same code as the RFID switch or one where the switch code is derivable from the tag code. The interrogator on key on, or at some other convenient time, will interrogate all RFID tags that are resident on the vehicle and record the returned identification numbers. During this process it will also determine the location of each tag based on time of flight, time of arrival at different elements of an antenna array, angle of arrival, coefficients of a smart antenna (such as Motia), or any other similar method. This is possible since the tags will be sending digital information according to a fixed protocol. This can be much more difficult to achieve with analogue data sent by a SAW transponder or sensor where the exact format can depend on the value of the measurements being made. Thus, by this method, the interrogator can determine the ID of the RFID switch and its location in a simple manner. Since this is a very infrequent event and in fact the interrogator can be designed to only conduct this polling operation once per hour or even no more than once per day, the power that can be transmitted by the interrogator can be the maximum allowable for the chosen frequency by the FCC. RFID readers can now read tags at a distance exceeding 3 meters, for example, can sort out 100 or more tags simultaneously. Note, that by using this method, the high power that is only intermittently allowed by FCC regulations is only needed to determine what devices are on the vehicle and where they are located. After this is known, a much lower power operation is used for switching the RFID switch and interrogating the SAW sensor.

The switching component that accompanies the RFID switch can be a FET, MEMS, PIN diode or CMOS device or equivalent (see, e.g., Prophet, G "MEMS flex their tiny muscles" pp. 63–72, EDN Magazine, Feb. 7, 2002). RF switches are designed to switch Radio Frequency signals, usually from the antenna. They must have low losses and be able to match the impedances to keep the standing ware ratio low. Some are designed to switch specific impedances e.g. 50 ohm, or 75 ohms and others are wide band and can switch from DC to GH signals. The three common types are:

1. MEMS which are mechanical. Wide band, low loss, can switch watts and requires milliwatts of Power to operate. The switching speed is in the microsecond to milliseconds range. One example switches in microseconds and requires (5 volts @ 1 ma) 5 mw DC power to operate. Others exist with lower switching voltage and power.

2. PIN Diode switches. Wide band, medium switching loss, switches watts and requires low power to operate. The switching speed is fast. Some are designed for specific impedances e.g. 50 ohm etc.

3. GaAs FET. These provide very fast switching with medium switching losses, microwatts of power are required to switch. Some require dual supply voltages to control switch.

The RF switch switches on and off the sensor which can be a SAW sensor to the antenna under control of a signal that comes from identification device. Desirable properties of the RF switch are:

Minimal level of required control voltage (1 V–2V is preferred);

Minimal current consumption (less then 1 microampere is preferred);

High off isolation (should be not less then 30 dB) when drive signal is absent on control input pins;

Two types of RF switches have been tested for use in transponder. They are: ADG936BRU (absorptive) and ADG936BRU-R (reflective) ICs from Analog Devices (See specifications of RF-switches ADG936BRU иADG936BRU-R from Analog Devices).

Figure 52B:
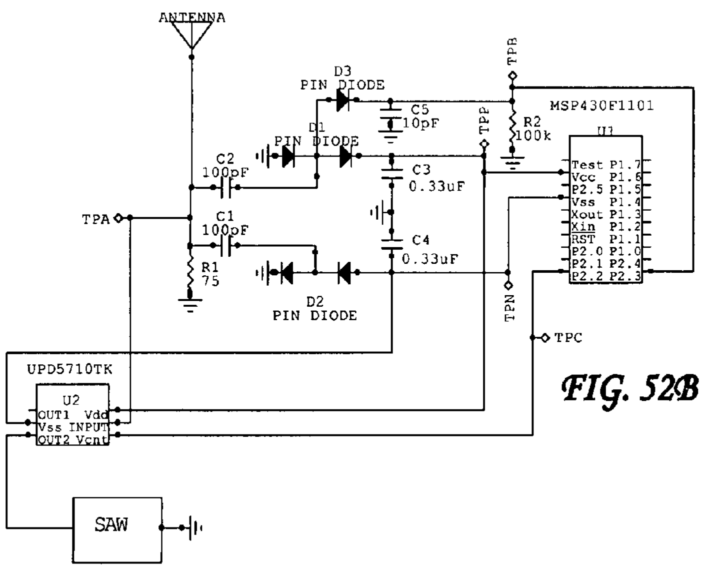
FIG. 52B illustrates an improved electronic circuit for use with an FID switch.
Figure 52C:
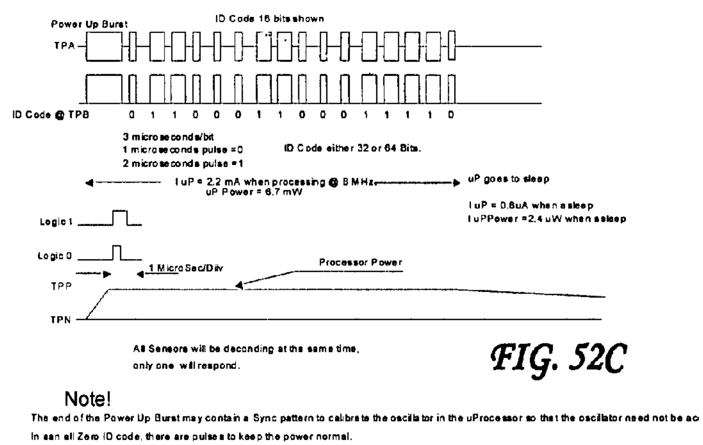
FIG. 52C is the timing diagram corresponding to FIG. 52B.

FIG. 52B illustrates an electronic circuit that can be used with the RFID switch discussed above and FIG. 52C illustrates an example of its timing diagram. The circuit operates as follows. The interrogator (not shown) transmits a high power RF pulse train which is received by all sensors. The power pulse is rectified by PIN diode circuits D1 and D2 charging Capacitors C3 and C4. This is the power source for the transponder. The voltage TPN to TPP is the supply voltage. The ID code is shown at TPB, this is the input to the comparator in the microprocessor. The microprocessor decodes the signal, the one and only one which has the matching Code will switch the CMOS switch U2 connecting the antenna to the SAW device which will respond. Note the normal interrogator pulses follow the ID code and are not shown on the above timing diagram.

All sensors not having the sent code will immediately go to sleep at the end of the ID code, only the one with matching code will switch its U2 CMOS switch. The microprocessor with the matching code will turn off U2 and go to sleep at the end of the SAW sensor's response. Since all SAW sensors receive the Power UP and ID code signal, all sensors will remain powered up at normal interrogation times. If there is a long time between interrogations, the Power UP and ID code will put all sensors in operation.

It is also proposed that an output from the microprocessor be made available so that, before the sensor is installed or put into the tire in the case of the TPM, the interrogator can read and store the ID code for the unit. This would eliminate the housekeeping chore of keeping track of codes. Each sensor will have a unique ID number, for a 64 bit code there are 1.8447×E19 codes available. That's about 4 k codes per each person in the world!

Power can also be supplied by a PZT circuit, or other energy harvesting method as discussed herein, which can generate voltage for an ultracapacitor by the motion of the tire. The microprocessor will operate with a supply voltage from 2.2 to 3.6 volts. There are others that will operate below this level but the selected CMOS switch won't operate below about 2.2 volts. The MSP430F is a low cost 16 bit microprocessor from Texas Instruments. The above assumes a Pburst of at least 0.5 Watts from the interrogator as per FIG. 51.

This universal concept can now be used for all situations where a device is to be turned on wirelessly when the ID code is not initially known. This concept can be used with RFID tags that operate at any frequency from 12 KHz to 24 GHz and beyond. It can be at the same frequency as the RFID switch or at a different frequency. If the same frequency is used then the switch code can be different but derivable from the RFID tag. For example, the tag code can always be an odd number and the switch code equal the tag code plus 1. Any code length can be used but the preferred code length is 32 bits since it provides 4.3 billion unique codes which is sufficient for dozens of devices per vehicle.

The above discussion has covered SAW transponders and RFID transponders and the combination of an RFID switch with SAW and RFID tag transponders. RFID tags can send data as well as their ID. The SAW device, however, provides an analogue output which in general is interpreted by the interrogator to determine the tire pressure and temperature, for example. The incorporation of a typical analogue to digital converter generally requires more power than is readily available in the systems that have been described herein. However, the SAW device can and does in some of the above TPM examples provide a series of pulses that relate to the temperature and pressure, for example, that can also be interpreted as digital codes. These codes, with appropriate circuitry, can be converted into bits of data and communicated by an RFID tag thus eliminating the need to send data to the SAW from the interrogator. This also eliminates the need for the RFID switch. The drawback of such a system is that now the power sufficient to operate an RFID tag at a distance of two or more meters can exceed the limitations of Rule 15 of the FCC regulations which allows an occasional high powered transmission but not a continuous periodic transmission. However, this problem can disappear with improvements in circuitry and/or changes in or special exceptions allowed to the FCC rules.

In addition to SAW devices for temperature and pressure measurement, other low power devices exist such as capacitive, inductive or resistive-based temperature and pressure sensors and their use in conjunction with an RFID tag is contemplated by the invention disclosed herein. For a similar application of a combined passive RFID tag and a sensor see D. Watters "Wireless Sensors Will Monitor Bridge Decks", Better Roads Magazine, February 2003. Previously, combined RFID tags and sensors that are passive have not been used on vehicles for tire temperature and pressure monitoring or for any other purpose. With the exception of the bridge deck monitor, when sensors have been used with passive RFID tags, only the tag has obtained its power from the RF signal while the sensor has been separately battery or otherwise powered (see, e.g., U.S. Pat. No. 06,377,203).

An alternate SAW based tire pressure and temperature monitor is illustrated in FIGS. 184A and 184B. This design uses a very low power circuit such that the power can be supplied by radio frequency in the same way that RFID tags are powered. Alternately the power can be supplied by an energy harvesting device or even a very long life battery or ultracapacitor. A block diagram is shown in FIG. 184A where:

Oscillator A can be either a delay line or resonator depending on how the sensor, for example a SAW, is used.

Oscillator B can be either a delay line or resonator depending on how the sensor, for example a SAW, is used.

F1 is the frequency which is determined by the sensor, for example the SAW.

F2 is the frequency which is determined by F1 but also varies with temperature.

F3 is the frequency which is determined by F1 but also varies with temperature and pressure.

1 is a signal point in FIG. 184A at the mixer A output and is equal to (F2+F1)+(F2−F1)

4 is a signal point in FIG. 184A at the mixer A after filtering output and is equal (F2−F1) which is a function of temperature.

2 is a signal point in FIG. 184A at the mixer B output and is equal to=(F3+F2)+(F3−F2)

3 a signal point in FIG. 184A at the mixer B after filtering output and is equal (F3−F2) which is a function of temperature.

The microprocessor measures frequency 3 and 4 by counting. It also stores a 32, for example, bit ID codes and the pressure and temperature calibration constants.

The operation is as follows. The Oscillator A and Oscillator B may be delay line oscillators or resonator oscillators. The SAW device is connected to low power Oscillator A and Oscillator B. The SAW determines the frequency of the Oscillator A and Oscillator B. The frequency, F2 of Oscillator A, changes with temperature. The frequency, F3 of Oscillator B, changes with temperature and with pressure. The frequency F1 (Crystal Controlled) for the microprocessor is stable with temperature. Mixer (MIX A) multiplies F2 and F1 giving an output of (F2+F1) and (F2−F1), the LP Filter (low pass filter) eliminates the (F2+F1) frequency leaving the output at 4 of (F2−F1) which is a function of the temperature. The temperature function is measured by counting with the microprocessor. The scale factor correction (stored in the microprocessor) sets the scale for temperature. The value is a digital number stored in the microprocessor.

Mixer (MIX B) multiplies frequencies F2 and F3 having an output of (F3+F2) and (F3−F2), the low pass filter (LP Filter) removes the (frequency (F3+F2) leaving the output at 3 of (F3−F2) which is the F(PSI) which is measured by the microprocessor by counting. The scale factor correction for PSI is stored in the microprocessor at calibration time. The resulting output is the corrected PSI which is stored in the microprocessor. The microprocessor controls an RF transmitter which transmits the ID (identification code) of the unit along with temperature and pressure to the receiver. The transmission is pseudo random. Between readings, the RF transmitter is OFF, and the microprocessor is in the sleep mode so that the average power is very low.

There is a connection to the microprocessor for calibration. At manufacture, the ID code typically 32 bits is stored in the microprocessor. Controlled temperature and pressure is applied to the unit, scale factors are determined and stored in the microprocessor. This allows for variation in SAW devices to be compensated. Before the unit is put into operation (into a tire etc.) the unit is plugged into the display unit which reads and stored the ID code. This is done using the Cal and install connector.

The central unit, the Display unit has an RF receiver which listens for a response, it reads the ID code, checks the ID against its stored codes and if the code agrees displays the readings. If two codes arrive at the same time, they are disregarded and since the units talk at random the next readings will arrive at different times and there will be no contention. The transmitter sends the ID and data at frequency F(x) which is totally independent of the frequency of the SAW device. The transmitted signal is more tolerant to noise since the signal transmitted is digital and not low level analog. Also the transmitted path is one way so signal losses are lower. All components except the SAW are low power and low cost CMOS parts. Power is supplied circuit 2 at a frequency independent of the F(x) frequency.

1.4.5 Exterior Tire Temperature Monitor

Figure 56:
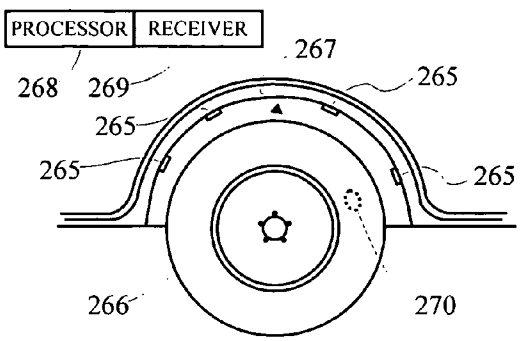
FIG. 56 shows an arrangement for measuring tire temperature in accordance with a preferred embodiment of the present invention.

An externally-mounted tire temperature sensor will now be discussed. FIG. 56 illustrates a tire temperature sensor that is not mounted on the tire in accordance with an embodiment of one of the inventions herein. The tire temperature sensor 265 is mounted on the vehicle in a position to receive thermal radiation from the tire 266, e.g., situated in a tire well 267 of the vehicle. Each tire well of the vehicle can include one or more temperature sensors 265. If more than one tire is present in a well, e.g., on trucks, then the placement of a plurality of sensors would be advantageous for the reasons discussed below.

Figure 56A:
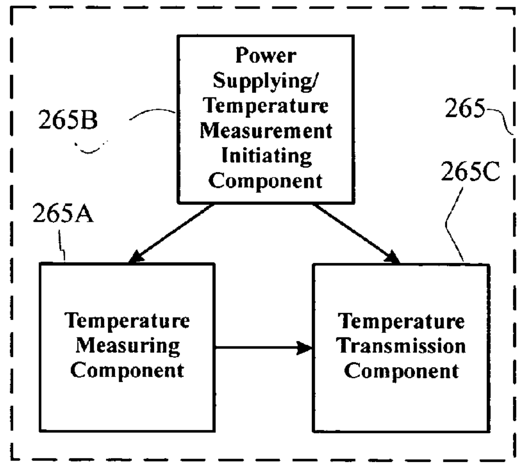
FIG. 56A schematically illustrates the elements of a tire temperature sensor in accordance with the invention.

As shown in FIG. 56A, temperature sensor 265 includes a temperature measuring component 265A, a power supplying/temperature measurement initiating component 265B coupled to the temperature measuring component 265A and a temperature transmission component 265C also coupled to the temperature measuring component 265A.

Temperature measuring component 265A may be a transducer capable of measuring temperature within about 0.25 degrees (Centigrade). This becomes a very sensitive measure, therefore, of the temperature of the tire if the measuring component 265A is placed where it has a clear view of the tire tread or sidewall, i.e., the tire is in the field of view of the measuring component 265A. The status of a tire, for example whether it is worn and needs to be replaced, damaged or operating normally, can then be determined in a processor or central control module 268 by comparing it to one or more mating tires on the vehicle. In the case of a truck trailer, the mating tire would typically be the adjacent tire on the same axle. In an automobile, the mating tire could be the other tire at the front or back of the vehicle. Thus, for a sport utility vehicle (SUV), the temperature of the two rear tires of the SUV can be compared and if one is hotter than the other than it can be assumed that if this temperature differential persists that the hotter tire is under-inflated, delaminating, has a damaged carcass or is otherwise defective.

Temperature measuring component 265A will usually require power to enable it to function. Power is therefore supplied by the power supplying/temperature measurement initiating component 265B which may be in the form of appropriate circuitry. When inductively powering sensor 265, power supplying component 265B is located proximate the pair of parallel wires carrying high frequency alternating current through the vehicle and is designed to receive power inductively from the pair of wires. Communication with sensor 265 could be over the same pair of parallel wires, i.e., a single bus on the vehicle provides both communications and power, and sensor 265 would have a dedicated address to enable communication only with sensor 265 when desired. This concept is discussed, for example, in U.S. Pat. No. 06,326,704 and elsewhere herein. Power supplying component 265B can also be designed to be activated upon the transmission of radio frequency energy of a specific frequency. Thus, when such radio frequency energy is transmitted, power supplying component 265B is activated and provides sufficient power to the temperature measuring component 265A to conduct a measurement of the temperature of the tire and enable the transmission of the detected temperature to a processor or central control module of the vehicle via temperature transmission component 265C.

Power supplying component 265B can also be integrated with a battery in the event that the circuitry for receiving power inductively or through radio frequency energy is inoperable.

An electric circuit for inductively receiving power and an electric circuit for supplying power upon being activated upon transmission of a certain radio frequency are well-known in the art and can be any of those in the prior art or any improvements thereto. Also, the power supplying component 265B can be any component which is designed to receive power (electricity) wirelessly or receive an activation signal wirelessly or by wire.

The processor 268 is mounted in the vehicle and includes any necessary circuitry and components to perform the reception function, i.e., the reception of the transmitted temperature from the temperature transmission component 265C of each sensor 265, and the comparison function, i.e., to compare mated tires, or to compare the temperature of the tire to a threshold. The reception function may be performed by a receiver 269 mounted in connection with the processor 268.

The threshold to which the temperature of the tire is compared may be a predetermined threshold value for the specific tire, or it may be variable depending on the vehicle on which the tire is mounted. For example, it may depend on the weight of the vehicle, either in its unloaded state or in its loaded state. It could also vary based on the driving conditions, weather conditions or a combination of the previously mentioned factors.

Upon the processor 268 making such a determination based on the comparison of the data obtained from two tire temperature sensors, it can activate or direct the activation of a responsive system to alert the driver by displaying a warning light, sound an audible alarm or activate another type of alarm or warning system. A display can also be provided to display, e.g., to the vehicle occupant, an indication or representation of the determination by the processor. In general, such a display, alarm or warning device will be considered a response unit or responsive system. Another response unit may be a telecommunications unit which is operative to notify a vehicle service facility of the need to inflate one or more of the tires, or repair or replace one or more of the tires. In this regard, the invention can be integrated or incorporated into a remote vehicle diagnostic system as disclosed in U.S. Pat. No. 05,684,701 to the current assignee.

The tire temperature sensor 265 can also be used to warn of a potential delamination, as have occurred on many tires manufactured by Firestone. Long before the delamination causes a catastrophic tire failure, the tire begins to heat and this differential temperature can be measured by the tire temperature sensor 265 and used to warn the driver of a pending problem (via the response unit). Similarly, the delamination that accompanies retreaded tires on large trucks even when they are properly inflated can be predicted if the temperature of the tread of the vehicle is monitored. The more common problem of carcass failure from any cause can also be detected as either the defective tire or its mate, in the case of paired tires, will exhibit a temperature increase before ultimate failure occurs. The output of the tire temperature monitors can also be recorded so that if a warning went unheeded by the driver, he or she can be later held accountable. With the large quantity of tire debris littering roadways and the resulting accidents, a monitor, recording and warning system such as described herein which can eliminate this hazard may very well be mandated by governmental authorities.

One disadvantage of an external temperature measuring system is that it can be prone to being occluded by snow, ice, and dirt. This problem is particularly troublesome when a single external sensor is used but would be alleviated if multiple external sensors are used such as shown in FIG. 56. An alternate approach is to place a temperature sensor within the vehicle tire as with the pressure sensor, as described above. The resulting temperature measurement data can be then transmitted to the vehicle either inductively or by radio frequency, or other similar suitable method. A diagnostic system can be provided to inform the driver of a malfunctioning monitor. Such a diagnostic system can include a source of IR radiation that would irradiate a tire as a test for detection by the monitor.

In accordance with the invention, it is therefore possible to use both types of sensors, i.e., an externally-mounted sensor (external to the tire) and an internally-mounted tire, i.e., a sensor mounted in connection with the tire. FIG. 56 thus shows a sensor 270 is placed within the tire 266 for those situations in which it is desirable to actually measure the pressure or temperature within a tire (or for when the external sensor 265 is occluded). Sensor 270 can be designed to measure the temperature of the air within the tire, the temperature of the tire tread and/or the pressure of the air in the tire. Sensor 270 can be any of those described above.

Preferably, sensor 270 receives its operational power either inductively or through radio frequency. Previously, inductively-powered tire-mounted sensors have taken place at very low frequencies, e.g., about 100 Hz, and no attempt has been made to specifically design the inductive pickup so that the efficiency of power transfer is high. In contrast, the present invention operates at much higher frequencies, in some cases as high as 10 kHz or higher, and approaches 99 percent efficiency. Additionally, many systems have attempted to transmit tire pressure to the vehicle cab wirelessly with poor results due to the intervening metal surfaces of the vehicle. A preferred approach in the present invention is to transmit the information over the inductive power source wires.

Figure 57A:
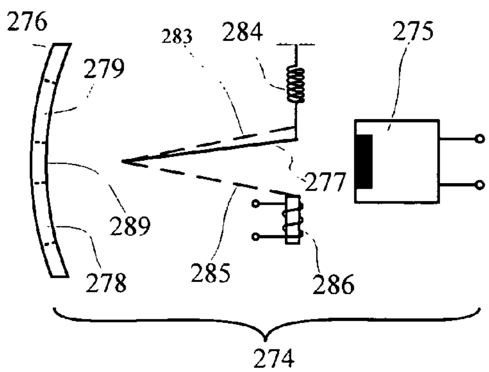
FIG. 57A shows a thermal emitted radiation detecting device in accordance with a preferred embodiment of the invention.
Figure 57B:
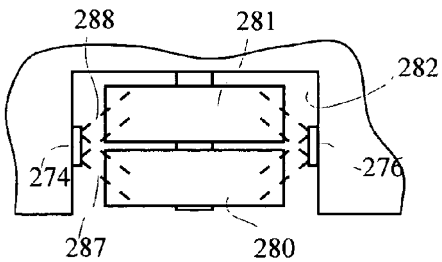
FIG. 57B is a cross-sectional, partial view of a tire well of a truck trailer showing the placement of the thermal emitted radiation detecting device shown in FIG. 57A.

FIGS. 57A and 57B show an embodiment for detecting a difference in temperature between two tires situated alongside one another, for example on a truck trailer. A difference in temperature between two tires operating alongside one another may be indicative of a pressure loss in one tire since if the tires are not inflated to the same pressure, the tire at the higher pressure will invariably carry more load than the under-inflated tire and therefore, the temperature of the tire at the higher pressure will be higher than the temperature of the under-inflated tire. It can also predict if one tire is delaminating.

In this embodiment, the tire temperature/pressure measuring system 274 includes a thermal emitted radiation detector 275, a Fresnel lens 276 in spaced relationship from the thermal emitted radiation detector 275 and a shutter 277 arranged between the thermal emitted radiation detector 275 and the Fresnel lens 276. The Fresnel lens 276 includes lens elements equal in number to the number of tires 280,281 situated alongside one another, two in the illustrated embodiment (lens elements 278,279). Each lens elements 278 and 279 defines a field of view for the detector 275 corresponding to the associated tire 280,281. The shutter 277 is operated between a first position 283, and is biased toward that position by a return spring 284, and a second position 285 and is attracted toward that second position by an electromagnet 286. In the first position 283, the shutter 277 blocks the field of view from the lens element 279 corresponding to tire 281 and allows the field of view from the lens element 278 corresponding to the tire 281. In the second position 285, on energizing electromagnet 286, the shutter 277 blocks the field of view from the lens element 278 and allows the fields of view from lens element 279. As the detector 275 is sensitive to changes in temperature, the switching between fields of view from one tire to the other tire will provide a difference if the temperature of one tire differs from the temperature of the other.

Referring to FIG. 57B, the detector 275 establishes fields of view 287 and 288 generally directed toward the tires 280,281, respectively. The fields of view 287 and 288 correspond to the Fresnel lens elements 278 and 279, respectively. The thermal emitted radiation detector 275, for the 8–14 micron range, may be a single element pyroelectric detector such as the Hamamatsu P4736. As an alternative, a pyroelectric detector having two sensing elements, for example, a Hynman LAH958 may be used with one of the detecting elements covered. Alternatively, a semi custom device could be used. Such devices are usually manufactured with a large resistor, e.g., 100 GOhm, in parallel to the detecting elements. A lower value of this resistor provides a wider effective bandwidth with a tradeoff of less sensitivity at lower frequencies. If a lower frequency cutoff of about 10 Hz is desired, a resistor value of about 100 MOhm would be appropriate. These types of pyroelectric detectors are sensitive to changes in temperature and not to absolute temperature, thus the detector must see a change in temperature in order to generate an output signal. This change in temperature will occur when one tire is at a higher or lower pressure than the adjacent tire indicating under-inflation of one of the tires, a failing carcass or is delaminating. The measurement of the change in temperature between the tires may be accomplished by a shutter mechanism as described above. The shutter could be driven at a constant rate of about 10 Hz. The rate of operation must be slow enough to come within the band pass of the pyroelectric detector used. The preceding and following discussions were taken largely from U.S. Pat. No. 05,668,549 where a more detailed discussion of the operation of pyroelectric detectors can be found.

Figure 58:
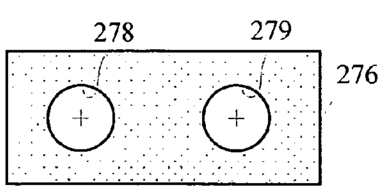
FIG. 58 schematically shows a compound Fresnel lens used in the thermal emitted radiation detecting device of FIG. 57A.

FIG. 58 illustrates a Fresnel lens 276 in accordance with one embodiment of the present invention. The Fresnel lens 276 includes lens elements 278 and 279 which are aligned with the tires 280,281. The lens elements 278 and 279 are offset from each other to provide different fields of view, as illustrated in FIG. 57B. The Fresnel lens 276 also includes a thermal emitted radiation opaque mask 289 around the lens areas. The lens elements 278 and 279 are dimensioned to ensure that the thermal emitted radiation collected by the lens elements 278,279 when the pressure of the tires is substantially the same will be the same, that is, no temperature difference will be detected.

Figure 59:
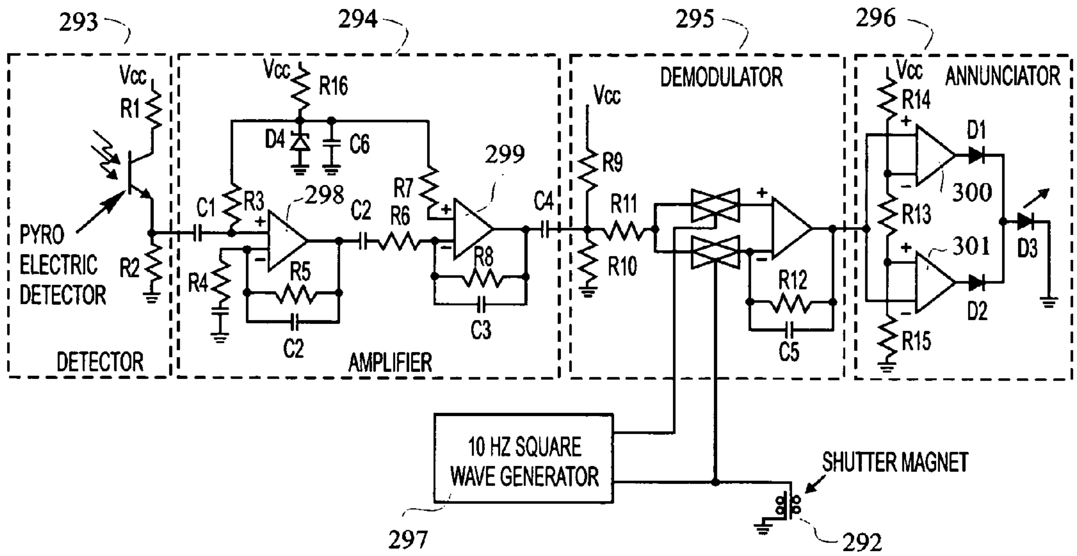
FIG. 59 schematically illustrates a circuit for deriving an indication of a temperature imbalance between two tires using tire temperature sensor of FIGS. 57A and 57B.

Referring to FIG. 59, a circuit for driving the shutter mechanism and for driving from the detector to provide an indication of a temperature difference between a mated pair of tires situated alongside one another is shown. In this non-limiting embodiment, the circuit includes a detector circuit 293 providing input to an amplifier circuit 294 which provides input to a demodulator circuit 295 which provides input to an enunciator circuit 296. The demodulator circuit 295 is driven by a 10 Hz square wave generator 297 which also drives the shutter electromagnet 292. The detector circuit 293 includes the pyroelectric detector. Output from the detector is capacitively coupled via capacitor C1 to the amplifier circuit 293 provided with two amplification stages 298 and 299. The amplifier circuit 294 acts as a high pass filter with a cut off frequency of about 10 Hz. The output of the amplifier circuit 294 is applied as input to the demodulator circuit 295. The demodulator circuit 295 is operated at a frequency of 10 Hz by applying the output of the 10 Hz square wave generator 297 to switches within the modulator circuit. The enunciator circuit 296 has comparators 300 and 301 which compare the output of the demodulator circuit 295 to threshold values to determine a temperature difference between the mated tires above a threshold value and in response, e.g., provides an output indication in the form of a drive signal to an LED D3.

Figure 60:
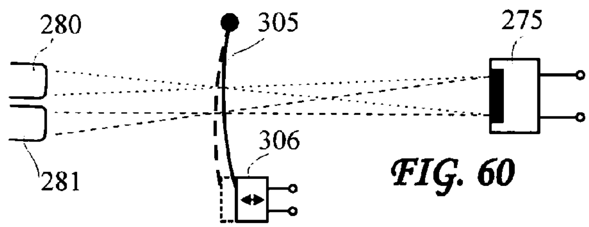
FIG. 60 illustrates another embodiment of the thermal emitted radiation detector for use in the method and apparatus in accordance with the invention.
Figure 61:
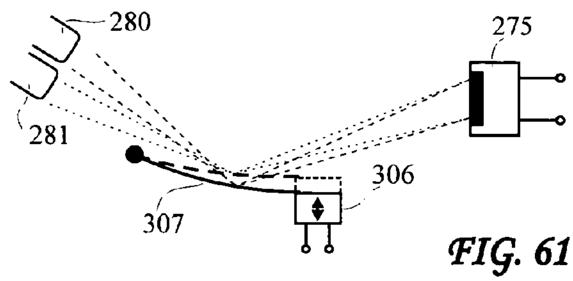
FIG. 61 illustrates another embodiment of the thermal emitted radiation detector for use in the method and apparatus in accordance with the invention.
Figure 62:
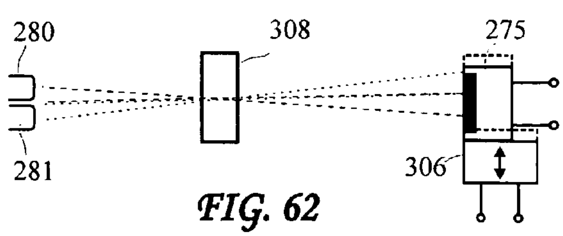
FIG. 62 illustrates another embodiment of the thermal emitted radiation detector for use in the method and apparatus in accordance with the invention.

FIGS. 60–62 illustrate alternative embodiments of the thermal emitted radiation detector 274. In the preferred embodiment of FIGS. 57A and 57B, the reference fields of view of the tires 280, 281 are defined by Fresnel lens elements 278 and 279, respectively, with selection of the field of view being determined by the shutter 277. It is possible to provide various mechanical shutter arrangements, for example vibrating reeds or rotating blades. A LCD used as a shutter can work with thermal emitted radiation. It is also possible to change the field of view of the detector 275 by other means as described below.

Referring to FIG. 60, a single Fresnel lens 305 is provided and supported at one side by a vibrating device 306. Other types of lenses can be used. The vibrating device 306 may be electromechanical or piezoelectric in nature. On application of the drive signal to the vibrating device 306, the Fresnel lens 305 can be rocked between two positions, corresponding to a field of view of tire 280 and a field of view of tire 281. As the detector 275 is sensitive to change in temperature, the change in fields of view results in an output signal being generated when there is a difference in temperature between tires 280 and 281. Operation of the rest of the detector is as described with regard to the preferred embodiment. As is well known in the art, the optical elements lenses and the optical elements mirrors may be interchanged. The Fresnel lens of FIG. 60 may thus be replaced by a concave mirror or other type of lens.

FIG. 61 illustrates such an arrangement in another embodiment of the invention. In this embodiment, the Fresnel lens 305, of FIG. 60, is replaced by a concave mirror 307. The mirror 307 is mounted in a similar manner to the Fresnel lens, and in operation vibrates between two fields of view.

The embodiment of FIG. 62 uses fixed optics 308, i.e., a lens or a mirror, but imparts relative movement to the detector to define two fields of view. While the embodiments of FIGS. 60–62 have been described using the square wave generator of a preferred embodiment of FIGS. 57A and 57B, other waveforms are possible. The embodiments of FIGS. 60–62 define fields of view based on relative position and would capable of continuous movement between positions if the detector has sufficient bandwidth. For example, either an MCT (HgCdTe) detector or a pyroelectric with a relatively low parallel resistor (about 1 MOhm) would have sufficient bandwidth. A saw-tooth waveform could thus be used to drive the vibration device 306 to cause the field of view to sweep an area covering both tires 280,281.

Instead of using the devices shown in FIGS. 57A, 57B and 60–62 for determining a temperature difference between mated tires, it is possible to substitute a heat generating or radiating element (as a reference source) for one of the tires whereby the heat generating element is heated to a predetermined temperature which should equal the temperature of a normally operating tire, or possibly the temperature of a tire in the same driving conditions, weather conditions, vehicle loading conditions, etc. (i.e., the temperature can be varied depending on the instantaneous use of the tire). Thus, the field of view would be of a single tire and the heat generating element. Any difference between the temperature of the heat generating element and the tire in excess of a predetermined amount would be indicative of, e.g., an under-inflated tire or an over-loaded tire. In this method, the sensor detects the absolute temperature of the tire rather than the relative temperature. It is also possible to construct the circuit using two detectors, one always looking at the reference source and the other at a tire and thereby eliminate the need for a moving mirror or lens etc.

Figure 63:
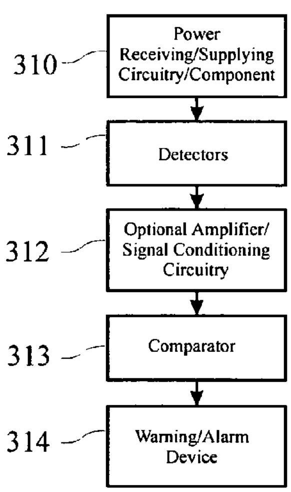
FIG. 63 is a schematic illustration showing a basic apparatus for monitoring tires in accordance with the invention.

FIG. 63 shows a schematic illustration of the system in accordance with the invention. Power receiving/supplying circuitry/component 310 is that portion of the arrangement which supplies electricity to the thermal radiation detectors 311, e.g., the appropriate circuitry for wired power connection, inductive reception of power or radio frequency energy transfer. Detectors 311 are the temperature sensors which measure, for example, the temperature of the tire tread or sidewall. For example, detector 311 may be the thermal emitted radiation detecting device described with reference to FIGS. 56, 57A and 57B. Amplifiers and/or signal conditioning circuitry 312 are preferably provided to condition the signals provided by the detectors 311 indicative of the measured temperature. The signals are then forwarded to a comparator 313 for a comparison in order to determine whether the temperature of the tire treads for mating tires differs by a predetermined amount. Comparator 313 may be resident or part of a microprocessor or other type of automated processing device. The temperature difference which would be indicative of a problem with one of the tires is obtained through analysis and investigation prior to manufacturing of the system and construction of the system. Comparator 313 provides a signal if the difference is equal to or above the predetermined amount. A warning/alarm device 314 or other responsive system is coupled to the comparator 313 and acts upon the signal provided by the comparator 313 indicative of a temperature difference between the mating tires which is greater than or equal to the predetermined amount. The amplifiers and signal conditioning circuitry 314 may be associated with the detectors 311, i.e., at the same location, or associated with the processor within which the comparator 313 is resident.

Figure 64:
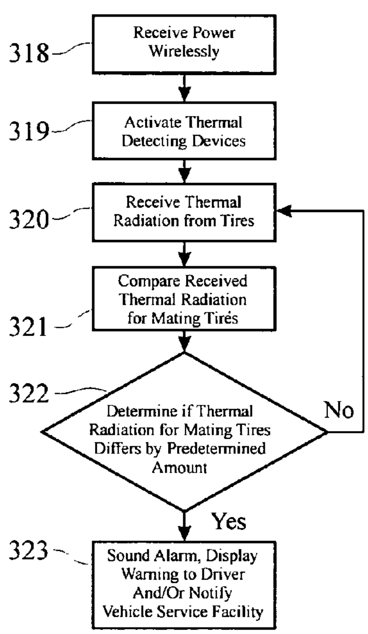
FIG. 64 is a schematic illustration showing one basic method for monitoring tires in accordance with the invention.

FIG. 64 shows a schematic illustration of the process for monitoring tire pressure in accordance with the invention. At step 318, power is provided wirelessly to a power supplying component associated with the thermal radiation detecting devices. At step 319, the thermal detecting devices are activated upon the reception of power by the power supplying component. At step 320, the thermal radiation from the tires is detected at a location external of and apart from the tires. The thermal radiation for mating tires is compared at step 321 and a determination made if the thermal radiation for mating tires differs by a predetermined amount at step 322. If so, an alarm will sound, a warning will be displayed to the driver and/or a vehicle service facility will be notified at step 323. If not, the process will continue with additional detections of thermal radiation from the tire(s) and comparisons.

Figure 65:
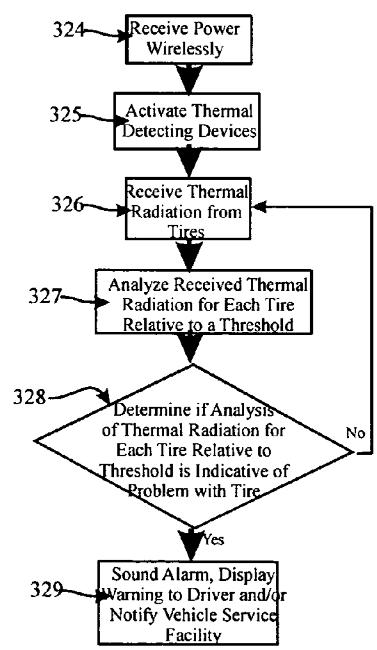
FIG. 65 is a schematic illustration showing another basic method for monitoring tires in accordance with the invention.

Instead of designating mating tires and performing a comparison between the mated tires, the invention also encompasses determining the absolute temperature of the tires and analyzing the determined absolute temperatures relative to a fixed or variable threshold. This embodiment is shown schematically in FIG. 65. At step 324, power is provided wirelessly (alternately wires can be used) to a power supplying component associated with the thermal radiation detecting devices. At step 325, the thermal detecting devices are activated upon the reception of power by the power supplying component. At step 326, the thermal radiation from the tires is detected at a location external of and apart from the tires. The thermal radiation for each tire is analyzed relative to a fixed or variable threshold at step 327 and a determination is made based on the analysis of the thermal radiation for each tire relative to the threshold at step 328 as to whether the tire is experiencing a problem or is about to experience a problem, e.g., carcass failure, delaminating, running out of air, etc. The analysis may entail a comparison of the temperature, or a representation thereof, to the threshold, e.g., whether the temperature differs from the threshold by a predetermined amount. If so, an alarm will sound, a warning will be displayed to the driver and/or a vehicle service facility will be notified at step 329. If not, the process will continue with additional detections of thermal radiation from the tire(s) and analysis.

As noted above, the analysis may be a simple comparison of the determined absolute temperatures to the threshold. In this case, the thermal radiation detecting system, e.g., infrared radiation receivers, may also arranged external of and apart from the tires for detecting the temperature of the tires and a processor is coupled to the thermal radiation detecting system for receiving the detected temperature of the tires and analyze the detected temperature of the tires relative to a threshold. The infrared radiation receivers may be arranged in any location which affords a view of the tires. A response system is coupled to the processor and responds to the analysis of the detected temperature of the tires relative to the threshold. The response system may comprise an alarm for emitting noise into the passenger compartment, a display for displaying an indication or representation of the detected temperature or analysis thereof, a warning light for emitting light into the passenger compartment from a specific location and/or a telecommunications unit for sending a signal to a remote vehicle service facility.

Referring now to FIG. 66, in this embodiment, instead of comparing the temperature of one tire to the temperature of another tire or to a threshold, the temperature of a single tire at several circumferential locations is detected or determined and then the detected temperatures are compared to one another or to a threshold.

As shown in FIG. 66, a tire temperature detector 330, which may be any of those disclosed herein and in the prior art, detects the temperature of the tire 331 at the circumferential location designated A when the tire 331 is in the position shown. As the tire 331 rotates, other circumferential locations are brought into the detecting range of the detector 330 and the temperature of the tire 331 at those locations is then determined. In this manner, as the tire 331 completes one rotation, the temperature at all designated locations A–H is detected. The tire temperature detector 330 can also be designed to detect the temperature of a plurality of different circumferential locations, i.e., have multiple fields of view each encompassing one or more different circumferential locations. Two or more tire temperature detectors 330 could also be provided, all situated in the tire well around the tire 331.

The temperatures obtained by the tire temperature detector 330, such as those in the table in FIG. 67, are then analyzed, for example, to determine variations or differences between one another. An excessive high temperature at one location, i.e., a hot spot, may be indicative of the tire 331 being in the process of delamination or of the carcass failing. By detecting the high temperature at that location prior to the delamination, the delamination could be prevented if the tire 331 is removed or fixed.

The analysis to determine a hot spot may be a simple analysis of comparing each temperature to an average temperature or to a threshold. In FIG. 67, the average temperature is 61° so that the temperature at location F varies from the average by 14°, in comparison to a 1° variation from the average for other locations. As such, location F is a relative hot spot and may portend delamination or carcass failure. The existence of the hot spot at location F may be conveyed to the driver via a display, or to a remote vehicle maintenance facility, or in any of the other methods described above for notifying someone or something about a problem with a tire. The number of degrees above the average for a location to be considered a hot spot may be determined by experimental results or theoretical analysis.

Instead of using the average temperature, the difference between the temperature at each circumferential location and the temperature at the other circumferential locations is determined and this difference is analyzed relative to a threshold. For the temperatures set forth in FIG. 67, the variation between the temperatures range from about 0–14°. A processor can be designed to activate a warning system when any variation of the temperature at any two locations is above 10°. Using this criterion, again, location F would be considered a hot spot. The threshold variation can be determined based on experimental results or theoretical analysis.

As also shown in FIG. 67, a threshold of 70° is determined as a boundary between a normal operating temperature of a tire and an abnormal operating temperature possibly indicative of delamination. The temperature of the tire 331 at each circumferential location is compared to the threshold, e.g., in a processor, and it is found that the temperature at location F is above the threshold. This fact is again provided to the driver, remote facility, etc. to enable repair or replacement of the tire 331 prior to actual delamination or other failure.

Additional details about the construction, operation and use of the technique for measuring the temperature and pressure of a tire and the design of sensors capable of being positioned to measure the temperature of the tire can be found in Appendices 1–5 attached hereto.

The thermal radiation detecting system may be provided with power and information in any of the ways discussed above, e.g., via a power receiving system which receive power by wires or wirelessly (inductively, through radio frequency energy transfer techniques and/or capacitively) and supply power to the thermal radiation detecting system. Further, the thermal radiation detecting system can be coupled to the processor. This may involve a transmitter mounted in connection with the thermal radiation detecting system and a receiver mounted in connection with or integrated into the processor such that the detected temperature of the tires is transmitted wirelessly from the thermal radiation detecting system to the processor.

In a similar manner, a method for monitoring tires mounted to a vehicle comprises the steps of detecting the temperature of the tires from locations external of and apart from the tires, analyzing the detected temperature of the tires relative to a threshold, and responding to the analysis of the detected temperature of the tires relative to the threshold. The temperature of the tires is detected by one or more thermal radiation detecting devices and power may be supplied wirelessly to the thermal radiation detecting device (s), e.g., inductively, through radio frequency energy transfer, capacitively.

The threshold may be a set temperature or a value relating to a set temperature. Also, the threshold may be fixed or variable based on for example, the environment in which the tires are situated, the vehicle on which the tire is situated, and the load of the vehicle on the tires. As noted above, the thermal radiation detecting devices may be wirelessly coupled to the processor central control module of the vehicle and adapted to receive power inductively, capacitively or through radio frequency energy transfer.

Thus, disclosed above is a vehicle including an arrangement for monitoring tires in accordance with the invention comprises a thermal radiation detecting system arranged external of and apart from the tires for detecting the temperature of the tires, a processor coupled to the thermal radiation detecting system for receiving the detected temperature of the tires and determining whether a difference in thermal radiation is present between associated mated pairs of the tires, and a response system coupled to the processor for responding to the determined difference in thermal radiation between mated pairs of the tires. Instead of determining whether a difference in thermal radiation is present between associated mated pairs of tires, a comparison or analysis may be made between the temperature of the tires individually and a predetermined value or threshold to determine the status of the tires, e.g., properly inflated, under inflated or delaminated, and appropriate action by the response system is undertaken in light of the comparison or analysis. The analysis may be in the form of a difference between the absolute temperature and the threshold temperature. Even simpler, an analysis of the detected temperature of each tire may be used and considered in a determination of whether the tire is experiencing or is about to experience a problem. Such an analysis would not necessarily entail comparison to a threshold.

The determination of which tires constitute mated pairs is made on a vehicle-by-vehicle basis and depends on the location of the tires on the vehicle. It is important to determine which tires form mated pairs because such tires should ideally have the same pressure and thus the same temperature. As a result, a difference in temperature between tires of a mated pair will usually be indicative of a difference in pressure between the tires. Such a pressure difference might be the result of under-inflation of the tire or a leak. One skilled in the art of tire inflation and maintenance would readily recognize which tires must be inflated to the same pressure and carry substantially the same load so that such tires would form mated pairs.

For example, for a conventional automobile with four tires, the mated pairs of tires would be the front tires and the rear tires. The front tires should be inflated to the same tire pressure and carry the same load so that they would have the same temperature, or have different temperatures within an allowed tolerance. Similarly, the rear tires should be inflated to the same tire pressure and carry the same load so that they would have the same temperature, or have different temperatures within an allowed tolerance.

It is also conceivable that three or more tires on the vehicle should be at the same temperature and thus form a plurality of mated pairs, i.e., the designation of one tire as being part of one mated pair does not exclude the tire from being part of another mated pair. Thus, if three tires should be at the same temperature and they each have a different temperature, this would usually be indicative of different pressures and thus would give rise to a need to check each tire.

The thermal radiation detecting system is coupled to the processor, preferably in a wireless manner, however wires can also be used alone or in combination with a wireless technique. For example, a suitable coupling may include a transmitter mounted in connection with the thermal radiation detecting device and a receiver mounted in connection with or integrated into the processor. Any of the conventions for wired or wirelessly transmitting data from a plurality of tire pressure-measuring sensors to a common receiver or multiple receivers associated with a single processor, as discussed in the U.S. patents above, may be used in accordance with the invention.

The thermal radiation detecting system may comprise infrared radiation receivers each arranged to have a clear field of view of at least one tire. The receivers may be arranged in any location on the vehicle from which a view of at least a part of the tire surface can be obtained. For example, the receivers may be arranged in the tire wells around the tires, on the side of the vehicle and on side mounted rear view mirrors.

In order to supply power to the thermal radiation detecting systems or devices described herein, several innovative approaches are possible in addition to directly connected wires. Preferably, power is supplied wirelessly, e.g., inductively, through radio frequency energy transfer or capacitively. In the inductive power supply arrangement, the vehicle is provided with a pair of looped wires arranged to pass within a short distance from a power receiving system electrically coupled to the thermal radiation detecting devices, i.e., the necessary circuitry and electronic components to enable an inductive current to develop between the pair of looped wires and a wire of the power receiving system such as disclosed in U.S. Pat. No. 05,293,308, U.S. Pat. No. 05,450,305, U.S. Pat. No. 05,528,113, U.S. Pat. No. 05,619,078, U.S. Pat. No. 05,767,592, U.S. Pat. No. 05,821,638, U.S. Pat. No. 05,839,554, U.S. Pat. No. 05,898,579 and U.S. Pat. No. 06,031,737.

1.5 Fuel Gage

FIG. 68 illustrates, in an idealized schematic form, an apparatus 650 constructed in accordance with one implementation of the present invention for use in measuring the volume or level of fuel 651 in a fuel tank 652 that is subject to changing external forces caused by movement or changes in the pitch or roll angles of tank 652. Instead of a tank, any type of fluid reservoir can be used in accordance with the invention and therefore the term "tank" will refer to any type of reservoir or receptacle which stores a fluid.

At least one, and preferably a plurality, of tank strain gage load cells 653 are provided for tank 652, as described below. These strain gage load cells 653 normally operate in either compression or tension mode in response to external load forces acting on the cell in conjunction with an applied direct current voltage to provide analog voltage outputs that correspond, in known proportion, to the load forces applied to each load cell 653. Alternately, a SAW-based load cell can be used where the strain on the strain sensing element results in a change in the natural frequency of the SAW device or a change in the time delay between the reception and retransmission of an RF interrogating pulse. For a more detailed explanation, reference is made to U.S. provisional patent application Ser. No. 60/461,648 and related non-provisional patent application Ser. No. 10/701,361 filed Nov. 3, 2004. In some implementations of the SAW load cell, power and information wires do not need be attached to the SAW device and the device becomes both wireless and powerless (i.e., does not require power via wires).

Tank load cells 653 are placed between different portions of containment tank 652 and a solid or rigid portion of a common reference surface, normally a substantially horizontal surface such as the floor-pan 654 of the vehicle, which, in the preferred embodiment, is an automotive land vehicle. Load cells 653 are aligned to be sensitive to load forces generally parallel along an axis 655 that is substantially normal to the common reference surface 654. In most instances, the axis 655 will be parallel to a vertical axis, or to an axis that is normal to the axis of usual forward motion of the tank or vehicle. As an example, in an automobile, tank load cells 653 will normally be placed so as to be sensitive along the yaw or vertical axis of the automobile.

Referring once again to FIG. 68, a device 657 retains data descriptive of the known tank empty weight for use as better described below in determining the level of liquid in the tank. Devices for this data retention for use with systems employing a processor may include a Random Access Memory (RAM) or Read-Only Memory (ROM) device, operatively coupled with the processing unit in the usual fashion, that include data representing the known tank empty weight.

A computational device 658, such as a processing unit (or an equivalent circuit formed from a coupled series of operational amplifiers as illustrated in FIG. 2 of U.S. Pat. No. 05,133,212), is connected to receive the analog voltage outputs from load cells 653 and pitch and roll angle sensor 656, and converts these analog signals, essentially simultaneously, into output information of the volume of the liquid in the fuel tank 652. The plurality of tank load cell outputs are summed, in one implementation of this invention, to form a tank gage sum signal from which is subtracted the known tank empty weight to form a tank net weight signal. This signal is then used to generate a liquid volume signal based on known weight volume relationships.

A preferred embodiment of a system in accordance with the present invention would further include means for averaging out short term transients appearing in the analog voltage output signals from the load cells as a result of inertial forces caused by the contents of the tank. This would eliminate measurement errors caused by "sloshing" of the liquid in the tank due to short term or violent movements of the tank itself and the inertia inherent in a dynamically moving contained liquid. Such averaging means are most easily accommodated within the processing unit through the use of a computer algorithm, however, it could also be accommodated using appropriate electrical circuitry operating on the analog signals.

Finally, to present the signal representing the volume or level of the liquid in the tank to an observer, it is preferred that at least one tank liquid level readout device 660, such as a dial, LCD or LED display, be operatively linked to computational device 653 for displaying the volume and/or level of the liquid contained in the tank. This device may also record this data for readout at a later date, or store the information for use by other devices. In many implementations, the link between the display device 660 and the computational unit or microprocessor 658 is through a second processing unit 659 which controls the instrument panel displays and is sometimes called an instrument panel computer.

In the embodiment of FIG. 68, processor 658 also contains one or more devices for the conversion of the analog voltage output signals from the load cells and angle sensors or gages to digital form for further processing in a processing unit. Accordingly, this preferred embodiment would require one or more analog-to-digital converters (ADCs) which, in any of the usual ways, convert the analog voltage signal outputs from the load cells and angle gages into digital signals for processing by the computational device of the system. In most microprocessor implementations, multiple ADCs are accomplished by using a single ADC combined with a multiplexing circuit which cyclically switches the ADC to different inputs. Thus, when referring to multiple ADCs below, this will mean either the actual use of multiple single ADC units or one ADC in combination with a multiplexing circuit. Other circuits are used in the SAW implementation of this invention as explained in U.S. patent application Ser. No. 10/701,361.

The present invention also includes a method for measuring the quantity of a fuel in a fuel tank subject to varying external forces caused by movement or changes in the pitch or roll angles of the tank. This method includes the steps of:

a) mounting a fuel tank to the vehicle so that it is movable along the yaw or vertical axis of the vehicle;

b) providing at least one analog signal in proportion respectively to the load on at least one tank load cell, each cell being mounted or placed between a portion of the fuel tank and a portion of a reference surface of the vehicle, and each cell being sensitive along an axis substantially normal to the reference surface and generally parallel to the yaw axis of the vehicle;

c) providing signals proportionally representing the pitch or roll angles of the vehicle; and, d) converting the analog load cell signal and the pitch and roll angle signals into output information representative of the volume of the liquid in the fuel tank by, in some embodiments, converting the analog load cell signal to a digital signal and inputting the digital signal and the pitch and roll signals into a processor having an algorithm, the algorithm using (i) the inputted load cell signal and the pitch and roll signals independently (ii) with a derived relationship between the signals and the fuel volume to output the fuel volume information.

In general, the algorithm used in this method can take the form of a look-up table where intermediate fuel volumes are derived by interpolation from the recorded values in the table, or of an equation which is an approximation to empirical test results. Alternately, and most preferably, the algorithm can be in the form of a neural network or fuzzy logic system, or other pattern recognition system, which can either be software or hardware based. The neural network is trained by conducting a series of tests measuring the load on the tank load cells and associated these measured loads with the known volume of fuel in the tank. After a significant number of tests are conducted, the data is input into a pattern recognition algorithm generating program to generate a neural network. In use, it is possible to provide the neural network with the readings on the load cells and obtain therefrom an accurate indication of the volume of fuel in the tank.

Figure 69:
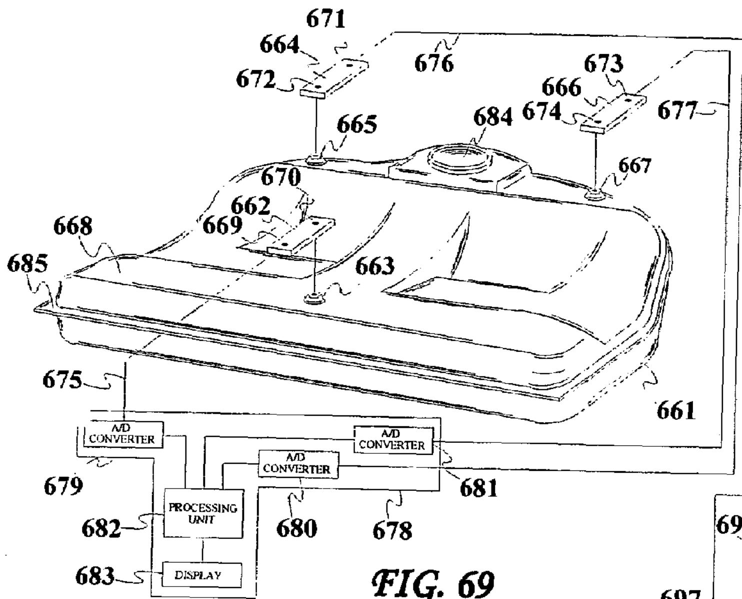
FIG. 69 is a perspective view of an automobile fuel tank supported by three load cells shown prior to attachment to the tank and using three analog to digital converters shown schematically.

In FIG. 69, a perspective view of an automobile fuel tank supported by three load cells is shown prior to attachment of the load cells to the tank. In this configuration, three analog to digital converters, shown schematically, are used. For the purposes of illustration, the load cells are shown as the cantilevered beam-type load cells. Other geometries, as described below, such as simply supported beam or tubular load cells could be used. In the device disclosed in the above-referenced Grills et al. patent, the load cell signals are summed to create a single signal which is proportional to the entire weight of the fuel tank. In contrast, in the device shown in FIG. 69, each load cell signal is individually digitized and analyzed. In this regard, a neural network can be trained to convert values from these three load cells to an indication of the volume of fuel in the tank, i.e., by conducting tests measuring the load on each cell for numerous different known volumes of fuel in the tank and then inputting this data into a pattern recognition algorithm generating program.

When the fuel tank is tilted through a rotation about either the pitch or roll axes, the load cells will no longer measure the true weight of the fuel but will instead measure the component of the weight along the axis perpendicular to the fuel tank horizontal plane or the vehicle yaw axis. Compensation for this error is achieved in the above-referenced Grills et al. patent by using a separate reference mass and load cell. In contrast, in the invention as illustrated in FIG. 69, a measure of the tank rotation is achieved by analyzing the individual load cell readings rather than summing them as done in the Grills patent. If used, the neural network can be trained on data representing the fuel tank at different inclinations, which would directly affect the readings of the load cells. As such, the neural network would still provide an accurate indication of the fuel volume in the tank in spite of the inclination of the tank during use. In this regard, it should be mentioned that the neural network can be trained on any three items of information concerning the fuel tank, i.e., three parameters from the following: the load at a first load cell, the load at a second fuel cell, the load at a third fuel cell, the angular rotation about the pitch axis and the angular rotation about the yaw axis. With the knowledge of any of these three parameters, the neural network can accurately provide the volume of fuel in the tank (provided it is trained accordingly).

The tank and weighing system is shown generally at 661 in FIG. 69. Cantilevered load cells 662, 664 and 666 are mounted to the floor-pan of an automobile, not shown, through the use of appropriate mounting hardware and mounting holes 669, 671 and 673 respectively. The load cells similarly are mounted to the fuel tank 668 using mounting hardware, not shown, through mounting holes 670, 672 and 674 and through flexible attachment grommets 663, 665 and 667. The weight of the fuel tank 668 causes cantilevered beams 662, 664 and 666 to bend. The amount of this bending is related to the weight of the fuel tank 668 and fuel therein as explained in more detail below. The cantilevered beam load cells 662, 664 and 666 are shown schematically connected to the fuel gage electronic package 678 by wires 675, 676 and 677 respectively. In particular, the outputs of load cells 662, 664 and 666 are inputs to ADCs 679, 680 and 681 respectively.

In the system illustrated in FIG. 69, the heavy portion of the fuel tank, i.e., the portion which contains the greater amount of fuel when the fuel tank is full, is toward the rear of the vehicle and is supported by load cells 664 and 666. Similarly the lighter portion of the fuel tank is more forward in the vehicle and is supported by load cell 662. Hole 684 is provided in the heavier portion of the fuel tank to receive the fuel pump. Another hole, not shown, also exists generally for filling the tank. The particular tank shown in FIG. 69 is made from two metal stampings and joined at lip 685 by welding.

If the vehicle on which the fuel gage system 661 is mounted is traveling at a constant velocity on a level road, then the summation of the individual signals from load cells 662, 664 and 666 will give an accurate indication of the weight of the fuel and fuel tank. If the weight of the empty fuel tank is known and previously stored in a memory device located in the processing unit 682, the weight of fuel in the tank can be determined by subtracting the empty tank weight from this sum of the load cell readings multiplied by an appropriate gage factor to translate the load cell signal sum into a weight. This result can then be displayed on display 683 indicating to the vehicle operator the amount of fuel which remains in the tank.

If the vehicle on which the fuel tank system 661 is mounted begins descending a steep hill, a summation of the signals from load cells 662, 664 and 666 no longer accurately represents the weight of the fuel tank and fuel therein. As explained above, this is a result of the fact that the load cells are sensitive to forces along the vehicle yaw axis which now is different from the vertical or gravitational axis. In addition, unless the fuel tank is either full or empty, the forces on the load cells will also be affected by the movement of fuel within the tank. When the vehicle is descending a hill, for example, the fuel will tend to move within the tank toward the front of the vehicle. These combined effects create a unique set of signals from the three load cells from which the angle of the fuel tank as well as the weight of the tank and fuel therein can be uniquely determined. In other words, for every particular set of load cell readings there is only one corresponding combination of vehicle pitch and roll angles and quantity of fuel in the tank. Therefore, if the load cell readings are known, the quantity of fuel in the tank can be determined.

Since this concept is central to this invention and applies whether load cells, angle gages and/or level gages are used, consider the following illustration. It is assumed that all parts both above and below the fuel surface are connected so that both air and fuel can flow freely from any part to any other part of the tank. If the tank at time T1 has a quantity of fuel Q1 and is tilted at a roll angle of R1 and a pitch angle of P1, then the three load cells will measure loads L1, M1 and N1 respectively. If the roll angle of the tank is now changed by a small amount to R2 with the pitch angle and quantity of fuel remaining the same, then the load cells will register a new set of loads L2, M2 and N2 where each load reading will either increase or decrease depending on the direction of the roll and the placement of the load cells. The sum of the three load cell readings after correction for the roll and pitch angles, must still add up to the weight of the fuel in the tank.

If the tank is empty it is easily proven from simple static equations that there is a unique set of loads Li, Mi and Ni for every pitch and roll angle P1 and R1. Alternately, if Li, Mi and Ni are known and if the weight of the empty tank is known, the angles Pi and Ri can be easily found. If a small quantity of fuel is now added to the tank and the angles held constant, then all of the load cells will measure an increase in load which will depend on the angles and the shape of the tank. Thus, for a given set of angles, there is a unique relationship between the three load cell readings and the quantity of fuel in the tank. If the fuel is held constant and the roll angle of the tank is changed, the sum of the load cell readings, when corrected for the angles, must remain the same but the distribution of the loads will change as the fuel moves within the tank. This distribution, however, follows a function determined by the shape of the tank. If the roll increases to R2 and then increases to R3, and if L2 is greater than L1 after correction for the angles, then L3 must be greater than L2 after correction for the angles. The same holds true for the M and N load cell readings.

The distribution of the load cell readings L, M and N can in fact be used to determine the angle of the tank and thus provide the information as to what the angle corrections need to be. This latter calculation need not be made directly since the relationship between the fuel quantity and the individual load cell readings must be determined for all but the simplest cases by deriving an empirical relationship from experiments. Most appropriately, the empirical relationship between the three load cell readings, the pitch and roll angles and the fuel quantity is trained into a neural network The same argument holds for changes in the pitch angles of the tank and it follows, therefore, that for every value of L, M and N, there is a unique quantity of fuel, pitch angle and roll angle for the tank. This argument fails if there is more than one distribution of fuel in the tank for a given pitch or roll angle which would happen if the fuel and air volumes are not connected. If, for example, a quantity of fuel or a quantity of air can become trapped in some part of the tank for a particular sequence of motions but not for another sequence where both sequences end at the same pitch and roll angles, then the problem would be indeterminate using the methods so far described unless the motion sequence were recorded and taken into account in the calculations. This is not an insurmountable problem and will be discussed below.

A similar argument holds for the case where the pitch and roll angles are measured but only a single load cell is used to measure the load at one point or a single level gage is used to measure the level at one point in the tank, provided the level measured is neither empty nor full. This is a preferred implementation when an IMU is present on the vehicle for other purposes with the pitch and roll data available on a vehicle bus. An even more refined measurement can result if the linear and angular accelerations and velocities are also used in the calculation where appropriate. To this end, sensors and processors for detecting and/or determining the linear and angular accelerations could be provided, to the extent the determination of the linear and angular accelerations cannot be determined by devices already present on the vehicle.

For some simple tank geometries, this relationship can be analytically determined. As the complexity of the tank shape increases, it becomes more difficult to obtain an analytical relationship and it must be empirically determined.

The empirical determination of the relationship between the true weight of the vehicle tank and its contents can be determined for a particular tank as follows. A test apparatus or rig is constructed which supports the gas tank from the three load cells, for one preferred implementation, in a manner identical to which it is supported by the floor-pan of the candidate vehicle. The supporting structure of the rig, however, is mounted on gimbaled frames which permit the tank to be rotated about either of the roll or pitch axes of the tank or any combination thereof. Stepping motors are then attached to the gimbaled frames to permit precise rotation of the tank about the aforementioned roll and pitch axes. Under computer control of the stepping motors, the tank to be tested is rotated to all positions representing all combinations of pitch and roll angles where each rotation is performed in discrete steps of, for example, one degree. For each position of the tank, the computer samples the signals from each of the load cells and records the data along with the pitch and roll angles. The maximum pitch and roll angles used for this experiment are typically ±15 degrees.

To illustrate the operation of the experiment, the first reading of the three load cells would be taken when the roll and pitch angles are at zero degrees and the tank is empty. The second reading would be taken when the pitch angle is one degree and the roll angle is zero degrees and the third reading when the pitch angle is two degrees and so on until a pitch angle of fifteen degrees had been achieved. This process would then be repeated for pitch angles starting at −1 degree and decreasing until the pitch angle is −15 degrees. The next series of readings would be identical to the first series with the roll angle now held at 1 degree. The process would be repeated for roll angles up to 15 degrees and then from −1 degree to −15 degrees. Since there are 31 different pitch angles and 31 different roll angles, a total of 961 different sets of load cell readings will be taken and stored by the computer system.

The process now must be repeated for various quantities of fuel in the tank. If the full tank contains 20 gallons of fuel, therefore, and if increments of one gallon are chosen, the entire process of collecting 961 sets of data must be taken for each of the 21 quantities of fuel ranging from 0 to a full tank. In addition to the load cell readings, it is also desirable to accurately measure the angle of the fuel tank through the use of angle gages in order to verify the stepping motor positioning system. Thus, for each position and fuel quantity discussed above there will be two additional data representing the pitch and roll angles of the gas tank. This leads to a total of 100,905 data elements.

From this data, a variety of different fuel gage designs based on the use of load cell transducers can be made. The same process can also be done for designs using other types of transducers such as the conventional float system, the ultrasonic system, the rod-in-tube capacitor system and the parallel plate capacitor system described below.

Although a considerable quantity of data is obtained in the above described empirical system, this is not a complex task for a standard personal computer with appropriate data acquisition hardware and software. The resulting data provides in tabular form the relationship between the quantity of fuel in the tank and the readings from the three load cells 662, 664 and 666. This data, or a subset of it, can be programmed directly as a look-up table into the computer algorithm. The algorithm would then take the three load cell readings and using interpolation formulas, determine the quantity of fuel in the tank. However, at the present time, the data can be used to train a neural network.

The particular quantity of data taken, the pitch and roll angle steps and the fuel quantity steps are for illustrative purposes only and an empirical relationship can be found using different experimental techniques.

If one or more equations are desired to represent the data, then the next step in the process is to analyze the data to find a mathematical expression which approximately represents the relationship between the load cell readings and the fuel in the tank. It has been found, for example, that a simple fifth order polynomial is sufficient to accurately relate the load cell readings to the fuel tank weight within an accuracy equivalent to 0.1 gallons of fuel for the particular tank of simple geometry analyzed. A more complex mathematical function would give a more accurate representation and a less complex relationship would give a less accurate representation. A fifth order polynomial requires the storage of approximately 200 coefficients. However, because of tank symmetry it has been found that approximately half of these coefficients are sufficiently close to zero that they can be ignored. An alternate approach is to use a neural network which can be trained to give the quantities of fuel based on the three load cell inputs.

In the above discussion, it has been shown that the reference mass used in the Grills et al. patent can be eliminated if the individual load cell readings are analyzed independently rather than using their sum, as in the Grills patent, and an empirically determined relationship is used to relate the individual load cell readings to the weight of the tank. By substituting an algorithm for the physical components in the Grills patent, a significant system cost reduction results. Although the system described above is quite appropriate for use with land operated vehicles where the pitch and roll angles are limited to 15 degrees, such a system may not work as well for aircraft which are subjected to substantially higher inertial forces and greater pitch and roll angles.

Figure 70:
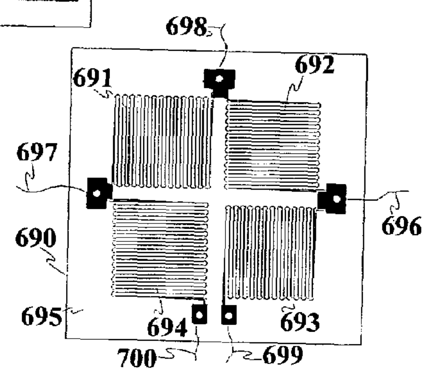
FIG. 70 is a detailed view of a four element strain gage prior to mounting to a metal beam to form a load cell.

A discussion of various load cell and other transducer designs appears below. All of the load cell designs make use of a strain gage as the basic load measuring element. An example of a four element metal foil strain gage is shown as 690 in FIG. 70. In this example, the gage is about one centimeter on each side thus the entire assembly of the four elements occupies about one square centimeter of area of the beam on which it is mounted. In this case, the assembly is mounted so that elements 691 and 693 are aligned with the conductive pattern parallel with the axis of the beam, and elements 692 and 694 are aligned with their conductive pattern transverse to the beam. The elements are wired as shown with the two free ends 699 and 700 left unconnected so that an external resistor can be used to provide the final balance to the bridge circuit. The elements thus form a Wheatstone bridge which when balanced, results in a zero current in the indicator circuit as is well known to those skilled in the art.

When the beam is bent so that the surface on which the strain gage is mounted experiences tensile strain, elements 691 and 693 are stretched which increases their resistance while elements 682 and 694 are compressed by virtue of the lateral contraction of the beam due to the Poisson's ratio effect. Due to the manner in which the elements are wired, all of the above strains result in an increase in the current through the indicator circuit, not shown, thus maximizing the indicator current and the sensitivity of the measurement. If the temperature of the beam and strain element changes and if there is a mismatch in the thermal coefficient of expansion between the material of the strain gage and the beam material, all of the gage elements will experience the same resistance change and thus it will not affect the current in the indicator circuit. Thus, this system automatically adjusts for changes in temperature.

The metal material which forms the strain gage is photo-etched from thin foil and bonded onto a plastic substrate 695. Substrate 695 is then bonded onto the beam using appropriate adhesives as is well understood by those skilled in the strain gage art. A similar geometry can be used for SAW strain gages.

Figure 71:
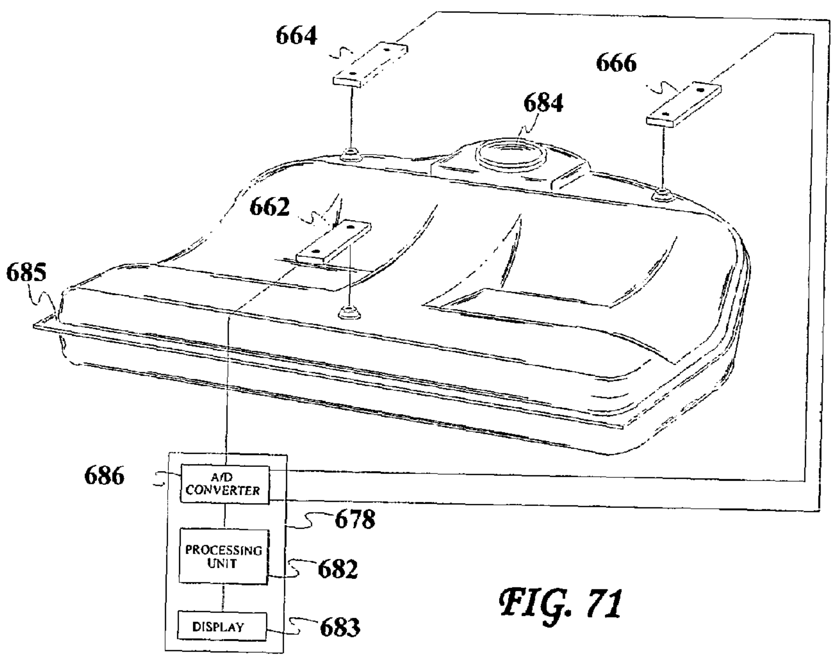
FIG. 71 is a perspective view of an automobile fuel tank supported by three load cells shown prior to attachment to the tank as in FIG. 69 but using only one analog to digital converter shown schematically.

The tank weighing system illustrated in FIG. 69 is highly accurate with a root mean square error of typically less than 0.1 gallons out of a 20 gallon tank. This corresponds to a travel distance of approximately 2 to 3 miles which is about 3 to 5 kilometers. For many cases, accuracy of this order is not necessary and a simpler system such as shown in FIG. 71 can be used. In this case, the load cell signals are merely summed as in the case of the Grills et al. patent but without the use of a reference mass. In this case, no attempt is made to compensate for the pitch or roll of the vehicle. The maximum grade on a highway in the U.S. is about 15 degrees and any grade above 5 degrees is unusual. When the vehicle is on a 15 degree grade, the weighing system of FIG. 71 will be in error by about 3.4% and for a 5 degree grade the error is about 0.4%. As discussed below, the variation in specific gravity of fuel is about 5%. Fuel energy content and thus usage is more closely related to the fuel weight than to volume and thus the mere use of volume instead of weight as the measure of the quantity of fuel in a vehicle by itself results in an error in the distance that a vehicle can travel of up to 5%.

In FIG. 71, the load cells 662, 664 and 666 are electrically connected to a summing circuit, not shown, which is part of the electronic package 678. The summed signal is then fed into ADC 686 and from there to the processing unit 682.

Figure 72:
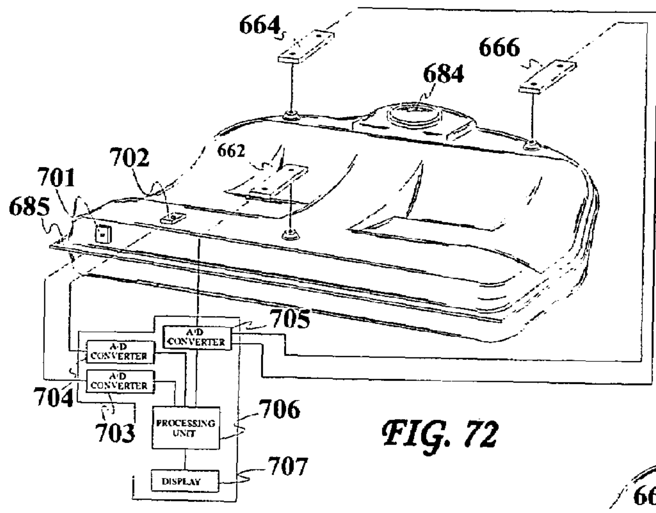
FIG. 72 is a perspective view of an automobile fuel tank supported by three load cells shown prior to attachment to the tank as in FIG. 71 using one analog to digital converter for the three load cells and also using pitch and roll angle sensors with associated analog to digital converters shown schematically.

The accuracy of the system shown in FIG. 71 can be improved through the use of a roll sensor 701 and a pitch sensor 702 as shown in FIG. 72. The addition of these two sensors regains the accuracy lost in going from the system of FIG. 69 to the system of FIG. 71. The roll and pitch sensors are shown mounted to the fuel tank in FIG. 72 so that they accurately measure the angles of the fuel tank. For most applications, it would be sufficient to mount these sensors within the electronic package 678 as described in more detail below. In FIG. 72, the roll and pitch sensors 701 and 702 are electrically connected to ADCs 703 and 704 respectively which are in turn connected to processing unit 706.

Figure 73:
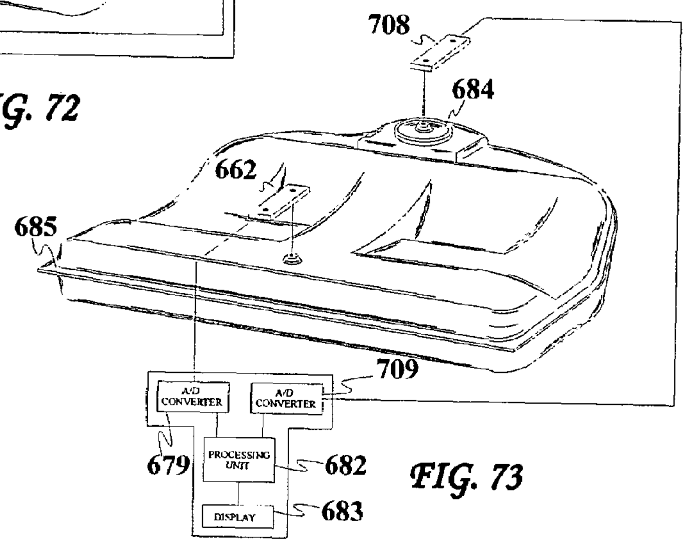
FIG. 73 is a perspective view of an automobile fuel tank supported by two load cells shown prior to attachment to the tank and using two analog to digital converters shown schematically.

The design of the system shown in FIG. 69 can also be simplified if it is assumed that the effects of roll can be ignored or averaged out over time and that only corrections for pitch need be made. Such a system is illustrated in FIG. 73 where only two load cells 662 and 708 are used. These load cells are electrically connected to ADCs 679 and 709 respectively in a similar manner as described above.

Figure 74:
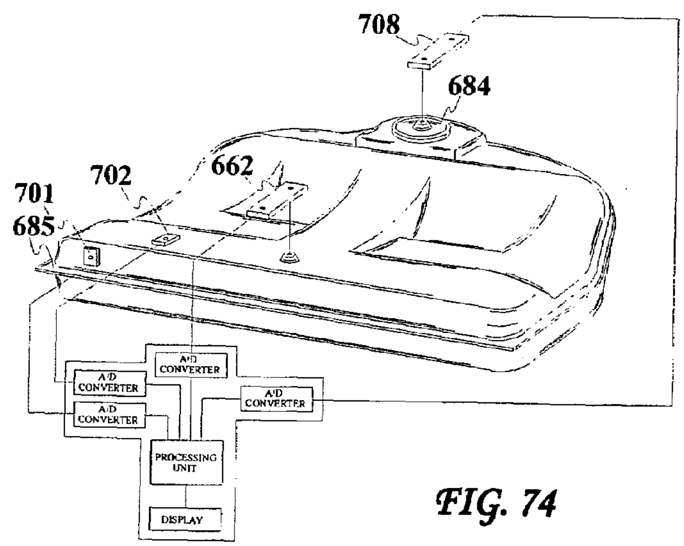
FIG. 74 is a perspective view of an automobile fuel tank supported by two load cells shown prior to attachment to the tank and using two analog to digital converters shown schematically as in FIG. 73 but with additional pitch and roll angle sensors with their associated analog to digital converters shown schematically.

Once again, all of the accuracy lost in going from the FIG. 69 design to the FIG. 73 design can be regained through the addition of pitch and roll sensors 701 and 702, an IMU, or for that matter with the addition of just roll sensor 702, as illustrated in FIG. 74 (i.e., so that a minimum of three parameters are used-the pitch angle, the roll angle and the load at the single load cell). In a similar manner as in the FIG. 69 case, a rig is required to test a particular tank and determine the proper empirical relationship which relates the angle measurements from roll and pitch gages 701 and 702 and the load measurements from load cells 708 and 662 to the volume of fuel in the tank.

In all of the cases described above including the case described in the Grills et al. patent, provision must be made to arrest the lateral and longitudinal vibrations which will occur as a vehicle travels down the road. This is usually accomplished by placing devices which impose lateral and longitudinal forces onto the tank to counteract similar forces caused by the motion of the vehicle and the inertia of the tank. Care must be taken in the design of these devices so that they do not impose forces onto the tank in the vertical or yaw direction; otherwise, errors will be introduced into the weight measurements. As a minimum, these devices add complexity and thus cost to the system.

Figure 75:
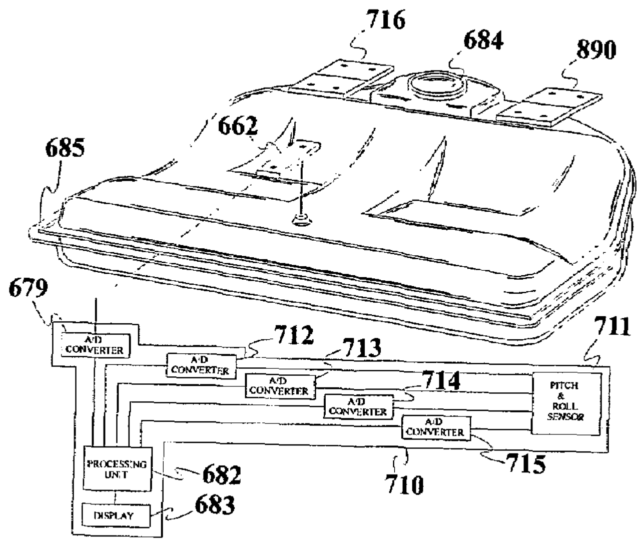
FIG. 75 is a perspective view of an automobile fuel tank supported by one load cell shown prior to attachment to the tank and using one analog to digital converter shown schematically with additional hinge supports for the fuel tank and pitch and roll sensors shown schematically mounted separate from the tank and each having two analog to digital converters.

This problem of constraining the tank so that it can only move in the vertical direction is accomplished by the system shown in FIG. 75 which is the preferred implementation of this invention using load cell transducers. In the embodiment shown in FIG. 75, a single load cell 662 is used to obtain a weight measurement of a portion of the tank. A significant portion of the tank weight is now supported by a hinge system 716 which effectively resists any tendency of the tank to move in either the lateral or longitudinal directions thus eliminating the need for special devices to oppose these motions.

Since there is only a single load cell 662 which only supports a portion of the weight of the tank, significant errors would occur if this weight alone were used to estimate the weight of the tank. Nevertheless, as before, there is a unique relationship between the volume of fuel in the tank and the weight as measured by load cell 662 plus the roll and pitch angles as measured by the roll and pitch sensor 711, or an IMU. For a particular load cell signal and a particular roll angle and pitch angle, there is only one corresponding volume of fuel and thus the system is determined from these three measurements. Once again, the rig described for the FIG. 69 system could be employed to determine the proper mathematical relationship to relate these three measured values to the fuel volume and once again, the accuracy which resulted from performing such a procedure on a particular fuel tank design is a root mean square error of about 0.1 gallons using a fifth order polynomial approximation or even less using a look-up table.

The system of FIG. 75 is thus the simplest and least expensive system and also about the most accurate system of those described thus far in this specification. The pitch and roll sensor is now a single device providing both measurements and is mounted within the electronic package 720, again an IMU can be used for even greater accuracy. One particular pitch and roll sensor which has been successfully used in this application is manufactured by Fredricks of Huntingdon, Pa. and is known as the Fredricks tilt sensor. It is an inexpensive device which uses the variation in resistance caused by tilting the device of a resistance element using an electrolyte. This resistance also varies with temperature which can be compensated for but requires additional ADCs. When this is done, the roll and pitch angles can be accurately measured to within about 0.1 degree regardless of the temperature. The requirement to compensate for temperature changes, however, requires that outputs be taken across both sides of the two angle measuring elements necessitating the use of four ADCs rather than two. Low cost microprocessors are now available with up to eight ADCs integral with the processor so that the added requirement for the resistance measurement can be accommodated at little additional expense. In FIG. 75, therefore, the pitch and roll angle sensor 711 is electrically connected to ADCs 712, 713, 714 and 715 and from there to processing unit 682 as described above.

Figure 76:
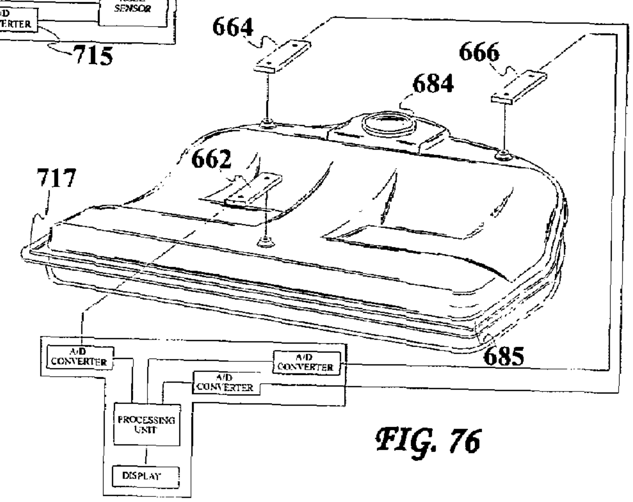
FIG. 76 is a perspective view of the apparatus as in FIG. 69 with the addition of a protective skirt under the tank to prevent the buildup of mud and ice on the tank.

In many vehicles, the fuel tank is exposed to the under side of the vehicle and therefore to the mud, ice and snow which is thrown up as the vehicle travels down the roadway. If the tank is exposed, some of this mud can collect on the tank and particularly on top of the tank. This mud will necessarily add to the tank weight and introduce an error in the weighing system. The magnitude of this error will depend on the geometry of a particular tank design. Nevertheless, in many applications this error could be significant and therefore the tank should be protected from such an event. This can be accomplished as shown in FIG. 76 through the addition of a skirt 717 which is below the tank and which seals it preventing mud, ice or snow from getting into contact with the tank. If the addition of such a skirt is not practical, then a system using one or more fuel level gages or measuring devices as described below is preferred.

As discussed above, the specific gravity of automobile gasoline varies by about ±14% depending on the amount of alcohol added, the grade and the weather related additives. The energy content of gasoline is more closely related to its weight than to its volume and therefore the weight of fuel in a tank is a better measure of its contents. Fuel weight is commonly used in the aircraft industry for this reason but the automobile driving public is more accustomed to thinking of fuel by volume measurements such as gallons or liters. To correct for this perceived error, a device can be added to any of the above systems to measure the specific gravity of the fuel and then make an appropriate adjustment in the reported volume of fuel in the tank.

Figure 77:
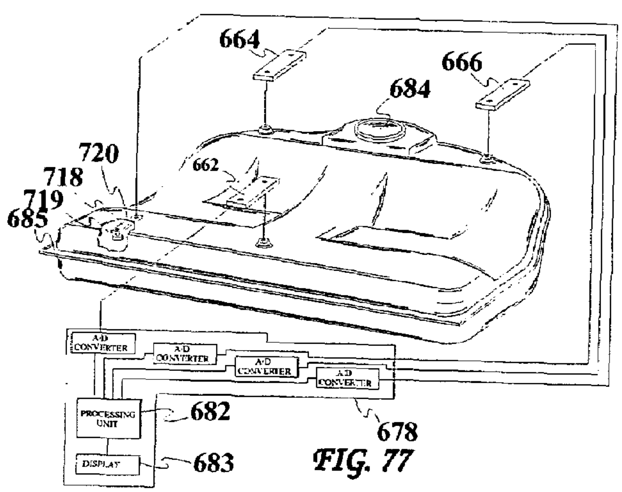
FIG. 77 is a perspective view of the apparatus as in FIG. 69 with the addition of a specific gravity measuring system comprising a mass and load cell with its associated analog to digital converter.

Such a device is shown generally as 718 in FIG. 77 and includes a mass 719 having a known specific gravity and a cantilevered beam load cell 720. By measuring the weight of mass 719 when it is submerged in fuel, a calculation of the specific gravity of the fuel can be made. The tank must have sufficient fuel to entirely cover the mass 719 and the load cell 720 in order to get an accurate reading. Therefore, the processing unit 682 will utilize information from the specific gravity measuring device 718 when the weighing system confirms that the fuel tank has sufficient fuel to submerge mass 719.

A cantilevered beam load cell design using a half bridge strain gage system is shown in FIG. 77. The remainder of the Wheatstone bridge system is provided by fixed resistors mounted within the electronic package which is not shown in this drawing. The half bridge system is frequently used for economic reasons and where some sacrifice in accuracy is permissible. The strain gage 721 includes strain measuring elements 722 and 723. The longitudinal element 722 measures the tensile strain in the beam when it is loaded by the fuel tank, not shown, which is attached to end 725 of bolt 724. The load cell is mounted to the vehicle using bolt 726. Temperature compensation is achieved in this system since the resistance change in strain elements 722 and 723 will vary the same amount with temperature and thus the voltage across the portions of the half bridge will remain the same.

Figure 78:
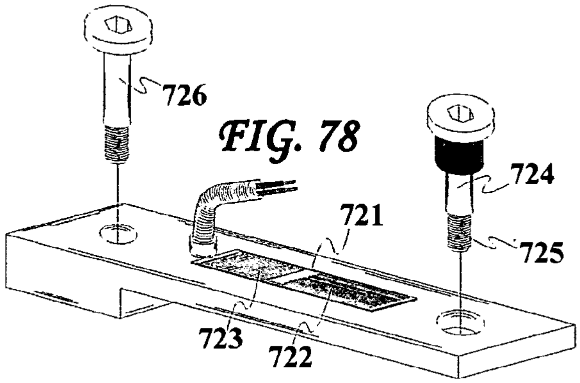
FIG. 78 is a perspective view of a cantilevered beam type load cell for use with the fuel gage system of this invention.
Figure 78A:
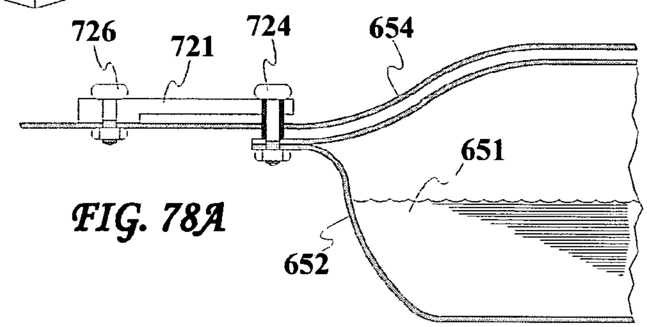
FIG. 78A is a planar cross section view with parts cutaway and removed of the load cell of FIG. 78 shown mounted onto the vehicle floor-pan and attached to the fuel tank.

FIG. 78A illustrates how the load cell of FIG. 78 can be mounted to the vehicle floor-pan 654 and the fuel tank 652 by bolts 726 and 724 respectively.

One problem with using a cantilevered load cell is that it imparts a torque to the member on which it is mounted. A preferred mounting member on an automobile is the floor-pan which will support significant vertical loads but is poor at resisting torques since floor-pans are typically about 1 mm (0.04 inches) thick. This problem can be overcome by using a simply supported load cell design as shown in FIG. 79.

Figure 79:
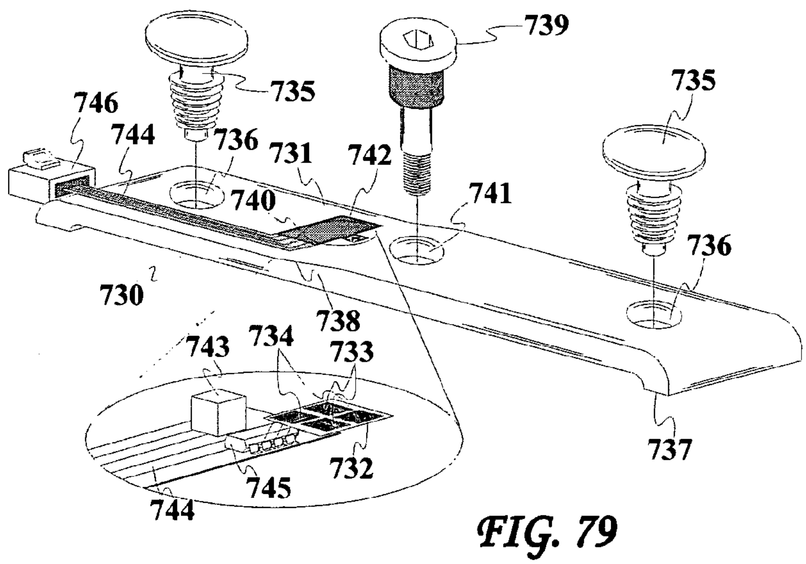
FIG. 79 is a perspective view of a simply supported beam type load cell for use with the fuel gage system of this invention.

In FIG. 79, a full bridge strain gage system 732 is used with all four elements mounted on the top of the beam 731. Elements 733 are mounted parallel to the beam and elements 734 are mounted perpendicular to it. Since the maximum strain is in the middle of the beam, strain gage 732 is mounted close to that location. The load cell, shown generally as 730, is supported by the floor-pan, not shown, at supports 737 which are formed by bending the beam 731 downward at its ends. Plastic fasteners 735 fit through holes 736 in the beam and serve to hold the load cell 730 to the floor-pan without putting significant forces on the load cell. Holes are provided in the floor-pan for bolt 739 and for fasteners 735. Bolt 739 is attached to the load cell through hole 741 of the beam 731 which serves to transfer the force from the fuel tank to the load cell.

The electronics package is potted within hole 742 using urethane or silicone potting compound 740 and includes a pitch and roll dual angle sensor or IMU 743, a microprocessor with integral ADCs 745 and a flex circuit 744. The flex circuit 744 terminates at an electrical connector 746 for connection to other vehicle electronics. The beam 731 is slightly tapered at location 738 so that the strain is constant in the strain gage 732. If an IMU is used, the ADCs relative to the IMU could be part of the IMU and if SAW strain gages are used, the ADCs may be part of the general interrogator.

Figure 79A:
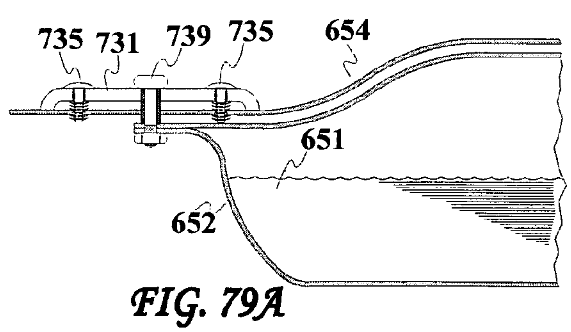
FIG. 79A is a planar cross section view with parts cutaway and removed of the load cell of FIG. 79 shown mounted onto the vehicle floor-pan and attached to the fuel tank.

FIG. 79A illustrates how the load cell of FIG. 79 can be mounted to the vehicle floor-pan 654 and the fuel tank 652 by plastic fasteners 735 and bolt 739 respectively.

Although thus far only beam type load cells have been described, other geometries can also be used. One such geometry is a tubular type load cell. Such a tubular load cell as shown generally at 750 in FIG. 80 can be placed either above or below the floor-pan. It includes a plurality of strain sensing elements 751 for measuring tensile and compressive strains in the tube as well as other elements, not shown, which are placed perpendicular to the elements 751 to provide for temperature compensation. Temperature compensation is achieved in this manner, as is well known to those skilled in the art of the use of strain gages in conjunction with a Wheatstone bridge circuit, since temperature changes will affect each of the strain gage elements identically and the total effect thus cancels out in the circuit. The same bolt 752 can be used in this case for mounting the load cell to the floor-pan and for attaching the fuel tank to the load cell.

Figure 80:
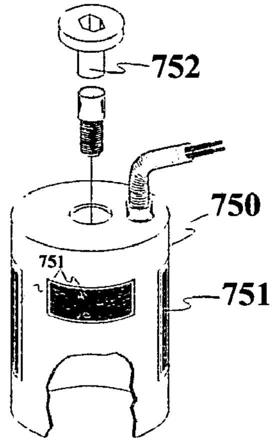
FIG. 80 is a perspective view of a tubular load cell for use with the fuel gage system of this invention.
Figure 80A:
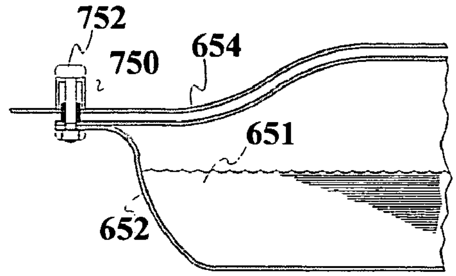

FIG. 80A illustrates how the load cell of FIG. 80 can be mounted to the vehicle floor-pan 654 and the fuel tank 652 by bolt 752.

Figure 81:
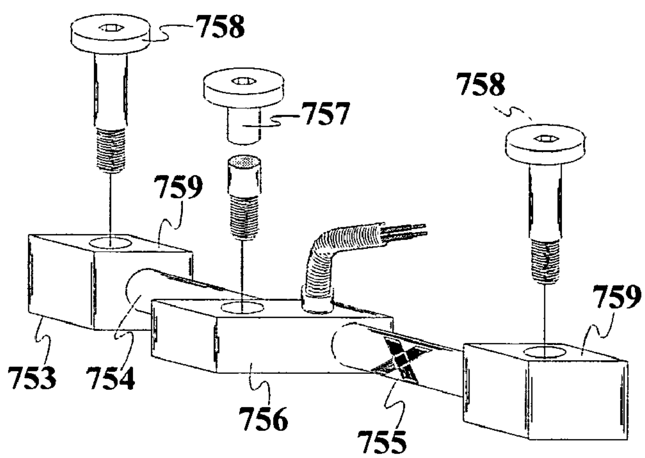
Figure 81A:
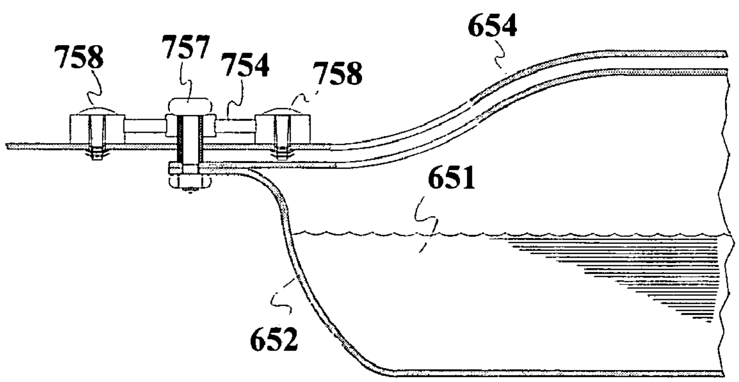

Another alternate load cell design shown generally in FIG. 81 as 753 makes use of a torsion bar 754 and appropriately placed torsional strain sensing elements 755. A torque is imparted to the bar 754 by means of lever 756 and bolt 757 which attaches to the fuel tank (not shown). Bolts 758 attach the mounting blocks 759 to the vehicle floor-pan. FIG. 81A illustrates how the load cell of FIG. 81 can be mounted to the vehicle floor-pan 654 and the fuel tank 652 by bolts 758 and 759 respectively.

A torsional system is described in the Kitagawa et al. patent referenced above, however, a very complicated electronic system not involving strain gage elements is used to determine the motion of the lever arm. Torsional systems in general suffer from the same problems as cantilevered systems in that they impart a torque to the mounting surface. If that surface is the floor-pan, undesirable deformations could take place in the floor-pan and the direction of the load cell sensitive axis cannot be guaranteed.

Figure 82:
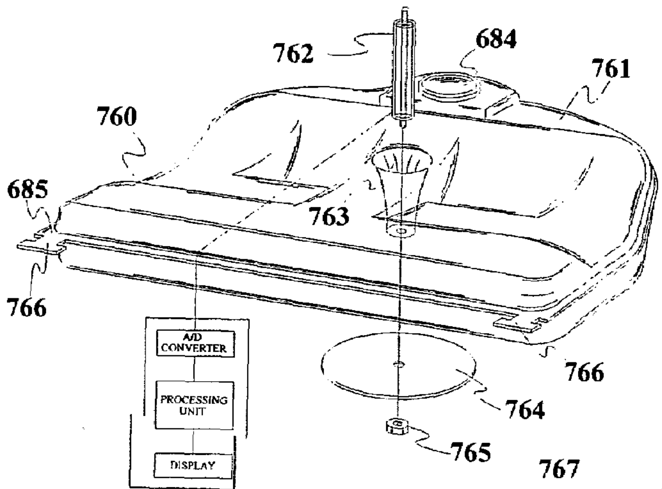

Until recently, most automobile fuel tanks were made from metal and load cells could be most readily attached to the fuel tank using bolts or metal fasteners. With the advent of plastic fuel tanks, other attachment mechanisms are preferred. One such method is shown in FIG. 82 where the fuel tank support is designed into the tank. This design, shown generally as 760 in FIG. 82, permits the load cell 762 to be placed approximately on the center of gravity of the fuel tank when it is full of fuel. When the gas tank 761 is formed, a hole 763 is provided through the tank. An extended tubular load cell 762 passes through this hole and connects to plate 764 at the bottom of the tank by means of a nut 765 or other appropriate fastener. Plate 764 has sufficient size to support the entire tank. Tabs 766, located at appropriate positions around the periphery of the tank, snap into corresponding cooperating receptors, not shown, placed on the vehicle and serve to give lateral and longitudinal support to the tank to minimize vibrations without loading the tank in the vertical direction.

The load cells illustrated above are typically of the foil strain gage type. Other types of strain gages exist which would work equally which include wire strain gages and strain gages made from silicon. Silicon strain gages have the advantage of having a much larger gage factor and the disadvantage of greater temperature effects. Other strain gage materials and load cell designs can be incorporated within the teachings of this invention and those using SAW technology in particular.

When pitch and roll sensors have been used herein, it was assumed that they would be dedicated devices to this tank gauging system. Other systems which are either already on vehicles or are planned for future introduction also have need for pitch and roll information and may require devices which are either more accurate or have a faster response than the devices required for this application. These other angle sensors may be usable by the systems disclosed herein thereby eliminating the need for dedicated angle gages and further reducing the cost of the system. In particular, an IMU that will probably be on future vehicles fits this description.

It is contemplated that the algorithms used for relating the various measured parameters to the volume of fuel in the tank will be independent of the particular vehicle on which the system is used as long as the fuel tank shape is the same. Fuel tanks even of the same design will vary in weight due to manufacturing tolerances and therefore, in some cases, it is desirable to weigh the tank after it is mounted onto the vehicle and just before it is filled with fuel. This can be programmed into the processing unit so that when it is first activated it will store the tank weight for later calculations.

Generally, the Wheatstone bridge is balanced with no load on the strain elements. An alternate method is to balance the bridge with the weight of the empty tank loading the load cell and therefore straining the strain gage elements. This results in the maximum accuracy and removes the requirement to subtract out the weight of the empty tank in the weight calculations. In a similar vein, the entire system can be designed to operate using dynamic measurements rather than static measurements, or in addition to static measurements, thus eliminating the effect of residual stresses.

The invention disclosed herein has been illustrated above in connection with embodiments using load cell transducers. Other types of transducers can also be used in conjunction with a derived algorithm or relationship providing certain advantages and disadvantages over weighing systems. A key problem with weighing systems is that the tank must be free to move in the vertical direction. Current gas tank systems are frequently strapped against the underside of the automobile, and in fact for modern plastic tanks this represents an important part of the gas tank supporting system. As the temperature changes within the gas tank, significant pressures can build up and cause the tank to expand if it is not restrained. A system using weighing transducers, therefore, would also need to provide for additional structure to prevent this expansion. This additional structure adds to the cost of the system and, at least when plastic tanks are used, favors the use of non-weighing transducers such as the conventional float system.

Figure 83:
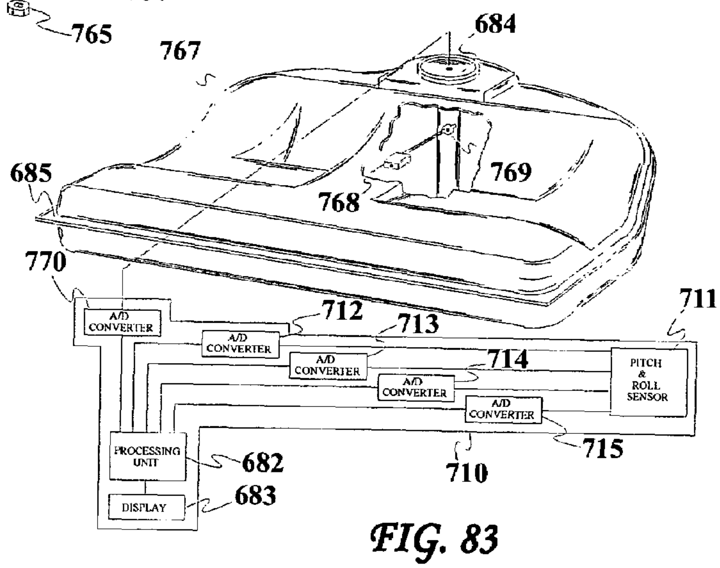

Such a system is illustrated in FIG. 83 which is a perspective view with portions cut away of an automobile fuel tank 767 with a conventional float 768, shown schematically, and variable resistor mechanism 769 used in combination with a pitch and roll angle measuring transducer 711, ADCs 712, 713, 714, 715 and 770 and an associated processor 682. The addition of the angle measuring transducer 711 and the processor 682 and appropriate algorithm relating the transducer outputs to the fuel level (which may be replaced by a trained neural network), significantly increases the accuracy of the conventional float level measuring device. Nevertheless, the variable resistor does not have the resolution of the load cell transducers described above and the float, by virtue of its height, is subject in conventional designs to topping and bottoming out making it impossible to achieve accurate measurements when the tank is almost full or almost empty. Thus, significant improvements are obtained with this system but significant limitations relating to the float system remain. The main advantage of this system and the ones described below is that the tank (whether plastic or metal) does not need to be modified.

Before continuing with a description of other preferred embodiments of the fuel gage of an invention herein, a summary of the above developments is in order. The initial system which was considered was somewhat similar to the one disclosed in the Grills et al. patent. This system was judged overly complicated for use in automobiles and it was found that similar accuracy could be achieved by eliminating the reference mass and load cell and by treating the three supporting load cells independently thereby extracting more information from each load cell at the expense of a more complicated electronic system involving a microprocessor and algorithm. Nevertheless, this was an important step, going from a system which would theoretically give an exact answer to one which involved less hardware but which would theoretically only give an approximate solution, albeit one which could be made as accurate as desired. Once it was decided that an approximate method was feasible, the next step was to further simplify the hardware by eliminating two more of the load cells and substitute a far less expensive dual angle sensor or better to use an IMU that already existed on the vehicle. Once again, it was found that the approximate solution could be made as accurate as desired using the single load cell output plus the angle sensor outputs as data.

The next step was to realize that once the exact solution had been abandoned, many other transducer types could be used as long as they give a continuous reading of some measure of the fuel in the tank as the tank goes from full to empty. The natural choice was the conventional float system which, when coupled with the dual angle gage, or IMU, would provide a significant improvement over the current float system alone. Note that if an IMU is used, it can be the same IMU that is used in navigation and safety systems thus simplifying the overall system and reducing its cost. In fact, such an IMU is already on a vehicle, its output may already be on a vehicle bus and thus easily accessible by the fuel gage system. The float system suffers from its inability to measure the fuel level when the tank is either near empty or near full since, because of its thickness in the vertical direction, it will necessarily top out or bottom out.

The need to consider other transducer types in place of weighing stems from the peculiarities of modern fuel tanks and their supporting systems. There is a movement toward plastic tanks not only because of their lighter weight and lower manufacturing costs but also because they are less likely to rupture in rear and side impacts, that is they are also safer. Also, fuel tanks are frequently exposed to the environment underneath the vehicle where they can accumulate mud, ice and snow which affects the weight of the tank and thus the accuracy of the system. Finally, automobile operators are accustomed to thinking of fuel by volume while weighing systems naturally measure weight. This naturally leads to additional errors unless the density of the fuel is also measured which adds cost and complexity to the system. For the above reasons, the progression was to take what was learned about approximate methods and apply it to systems using other fuel level measuring systems as discussed below.

Figure 84:
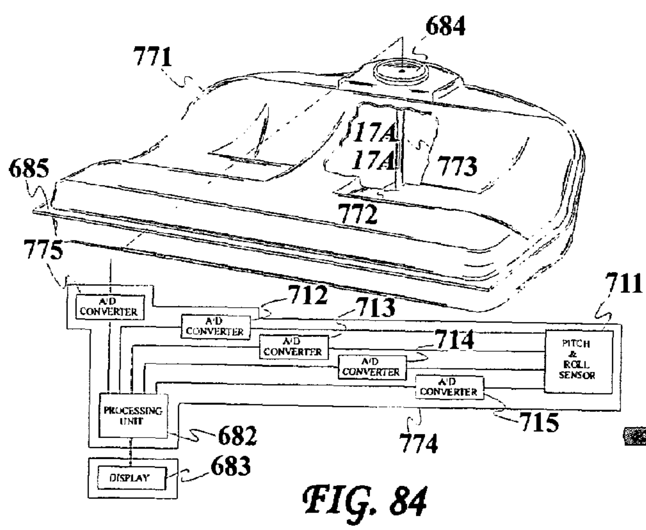

An alternate method to the use of a float for determining the level of fuel in a gas tank uses the fact that the dielectric constant of gasoline is higher than air. Thus, if the space between two plates of a capacitor is progressively filled as the level of gas in the tank rises, the capacitance increases. One method of implementing this is illustrated in FIG. 84 which is a perspective view with portions cut away of an automobile fuel tank 771 with a rod-in-tube capacitive fuel level measuring device 772 used in combination with pitch and roll angle measuring transducers or IMU 711 as described above in FIG. 83. The dielectric constant of gasoline is about two and the capacitance for a typical rod and tube design goes from about 60 picofarads for an empty tank to 120 picofarads for a full tank. Capacitances of this magnitude can be measured using technologies familiar to those skilled in the art but generally require that the measuring circuitry 774 be adjacent to the device since the capacitance between the wires would otherwise be significant. All of the electronics including the ADCs, angle gage and processor are thus encapsulated into a single package 774 and attached to the tube 773.

Figure 84A:
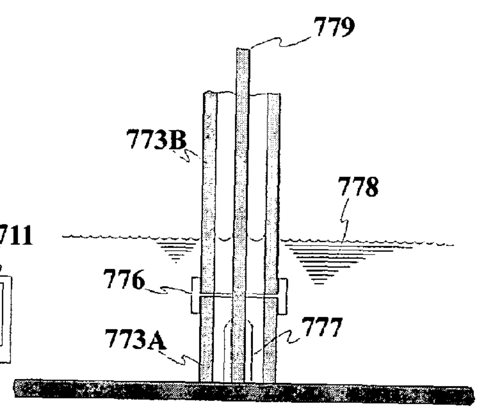

The capacitor is formed by the rod 779 and tube 773 of FIG. 84A with the fuel partially filling the space in between. In some applications, the tube 773 is actually formed from two tubes 773*a* and 773*b* which are electrically insulated from each other by spacer 776. Tube 773*a* is located at the bottom of the tank where it is likely to be completely filled when the tank is filled. This portion is used to determine the dielectric constant of the gasoline and the combination of the two tubes 773*a* and 774*b* are used to determine the level of fuel. The processor remembers the dielectric constant of the fuel which was measured when the tank was filled to a point that tube 773*a* was known to be full of gasoline. That dielectric constant is then used as the tank level falls below the interface 776 between tube 773*a* and tube 773*b*. Although the dielectric constant of most constituents of gasoline is about 2, the addition of alcohol or other additives to gasoline can have an effect on the dielectric constant. One or more openings 777 are provided in the base of the tube 773A in order to provide easy access for the fuel into and out of the gage.

The system shown in FIG. 84 thus has all of the advantages of the float system of FIG. 83 with the additional advantages of permitting measurement of the fuel level from full to empty and with significantly greater resolution resulting from the no moving part capacitance measurement compared to the low resolution sliding contact rheostat of the float system.

Figure 85:
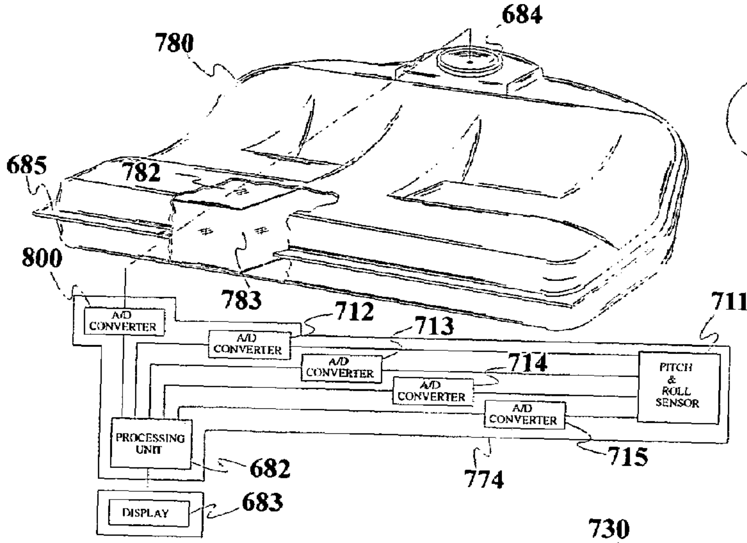

An alternate method of using capacitance to measure the fuel in the tank is shown in FIG. 85 which is a perspective view with portions cut away of an automobile fuel tank 780 with a parallel plate capacitive fuel level measuring device, where the plates are integral with the top and bottom of the fuel tank. This system can also be used in combination with pitch and roll angle measuring transducers or IMU 711 and associated electronic circuitry as in the preceding two examples. In this design, the tank top 782 and bottom 783 are partially metalized so that they form the two plates of an approximately parallel plate capacitor. If the tank is symmetrical with a constant distance between the top and bottom, the capacitance will not change as the angle of the vehicle changes and the angle gages would not be required. All real tanks, however, have significant asymmetries requiring the use of the angle gages or IMU 711 as above.

Figure 85A:
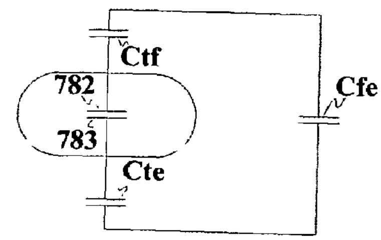

The system of FIG. 85 has one additional error source, illustrated schematically by the circuit diagram shown in FIG. 85A, which prevents its use in some vehicles. The bottom plate 783 will also have a capacitance to the earth, shown as Cfe, the earth will have a capacitance to the floor-pan of the automobile, shown as Cfe, and the automobile floor-pan will have a capacitance to the tank top plate 782, shown as Ctf. These three capacitances act in series to shunt the capacitance between the tank plates 782 and 783 with a total capacitance of (Cte*Cfe*Ctf)/(Cte*Cfe+Cte*Ctf+Cfe*Ctf). This would not be a problem except that the capacitances to the earth will vary depending on vehicle ground clearance and the constituents of the earth below the vehicle. In some cases, it is possible to measure one of the capacitances to the earth and compensate for this effect, in others the effect is too large and another fuel gage design is required.

Figure 86:
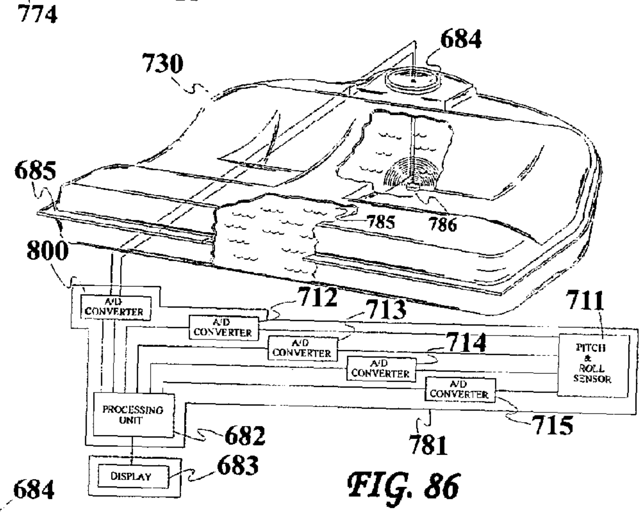

An alternate fuel level measuring system is shown in FIG. 86 and uses a transducer 786 which produces waves which reflect off of the fuel/air surface 785 and are received by the same transducer 786 or, alternately by another receiver. Preferred waves are ultrasonic at a frequency above 100 KHz, although an infrared laser system can also be designed to accomplish the same task. Although the system shown in FIG. 86 uses only a single transmitting and receiving transducer, multiple such transmitters can be used in different parts of the tank. This is a particularly advantageous system when the tank has a complex shape such as those now being developed for various automobile models.

As efforts are intensifying to make use of all available space within the automobile exterior envelope, fuel tanks are being designed and built with very complex shapes. The use of blow molded plastic tanks has made it easier to construct such complex shapes. In some cases, it is possible to place an additional float system within such a tank but only with great difficulty. The placement of multiple ultrasonic transducers, on the other hand, is relatively easy. If two such transducers are used than one of the angle gages can be eliminated and if three such transducers are used, then neither the pitch or roll angle gages are required (i.e., a minimum of three parameters must be known to accurately determine the volume of fuel in the tank-the three parameters being selected from the group consisting of the first, second and third transducers, the pitch angle gage and the roll angle gage). Alternately, with some loss of accuracy, two transducers will still give increased accuracy over current float-based systems.

Figure 86A:
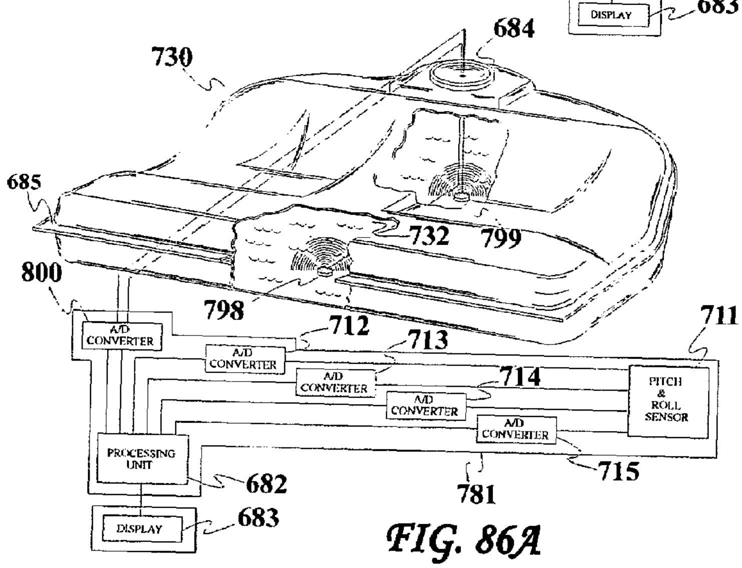

In the embodiment shown in FIG. 86A, ultrasonic transducers 797 and 798, both of which both send and receive ultrasonic waves, are placed at different points on the bottom of the fuel tank 784. Ultrasonic waves from the transducer are reflected off of the fuel surface 785 thus giving a measurement of the height of fuel above the transducers 797, 798. Outputs from these transducers 798, 799 are fed into ADCs 800 and combined with outputs from the pitch and roll angle sensors or IMU, if present, are processed by processing unit 682 to output a signal representative of the volume of fuel in the tank. Once again, processor 682 uses a derived relationship which may be a look-up table, one or more mathematical formulae, or a pattern recognition system comprising a neural network, fuzzy logic or other such system.

So far, the discussion using ultrasonic transducers has been limited to the measurement of liquid level at a particular place in the fuel tank. The combination of ultrasonic transducers and neural networks can also be used in a much more powerful manner. When an ultrasonic transducer sends waves through the liquid fuel, reflections occur from not only the nearest surface but also from all other surfaces which interact with the waves. Each wavelet on the surface of the fluid potentially can reflect waves back toward the transducer giving information as to the location of the surface. If the transducer is of the type which transmits over a wide angle, then reflections will be received from a significant portion of the liquid surface. One such transducer, for example, operates at 40 kilohertz transmits with a 3 db rolloff at about 60 degrees from the transmit axis of the device. When this transducer is placed at the bottom of the fuel tank when the vehicle and fuel is at rest, the primary reflection will occur from the nearest surface and three such transducers can accurately measure the fuel level at all three positions. From these three measurements, in conjunction with a neural network, the quantity of fuel in the tank can be readily determined. If the fuel is in motion, sloshing around within the tank, the problem is not as simple. These surface waves, on the other hand, now reflect back toward the transducer and provide information as to where the surface is everywhere within the tank.

When multiple reflections occur, they are spaced in time according to the distance from the reflecting object or surface wave and the transducer. Thus, if for example, the transducer sends out four cycles of ultrasound, the transmitted cycles will reflect off of various surfaces, or wavelets, with the reflections spaced in time. That is, the receiver will receive a return pulse which is many times longer than the transmitted pulse and which contains information as to the shape of the surface. If several such transducers are used and the received signals are used to train a neural network, the resulting algorithm created by the neural network program will accurately represent the relationship between the reflected wave pattern and the quantity of fuel in the tank.

The process therefore is as follows. For a particular tank and vehicle, a known amount of fuel is placed into the tank and reflected wave patterns are collected from the vehicle under various conditions from at rest to driving over a variety of road surfaces, curves, hills etc. Then the quantity of fuel is changed and the process repeated. After data is collected from the entire range of driving situations, including at rest at various angles, and fuel quantity, the data is fed into a neural network program which derives an algorithm which accurately relates the quantity of fuel to the echo patterns. The resulting algorithm is then made apart of a system for vehicle installation thereby providing the quantity of fuel from the echo patterns of the transducers as the vehicle is at rest or being operated.

Modem plastic fuel tanks have a somewhat indeterminate shape in that the internal volume depends, among other things, on the force applied to the tank by the mounting straps when the tank is assembled to the vehicle. The system described here can also be used to determine the tank volume before fuel is introduced into the tank by analyzing the return echoes from the tank surfaces. Once again, the neural network would need first to be trained to do this function by taking data on installations with varying amounts of mounting force. After that, the network can determine the fuel capacity of the tank and thereby know the quantity of fuel in the tank based on an analysis of the return echoes.

One important feature of neural networks is that they can be trained on data from diverse sources. If, for example, information can be provided as to the rate of fuel consumption such as provided by knowing the RPM of the vehicle engine, then, it can be also used by the neural network in the process of determining the amount of fuel in the tank. Such information can be quite important if coupled with information as to the last estimate made while the vehicle was at rest. Thus the history of the fuel measurements can also be used by the neural network to further improve the current estimate of fuel quantity.

This system can also solve the problem of occluded volumes. As long as the situations are included in the data on which the system is trained, it can be recognized later and thereby provide the correct fuel volume based on the echo patterns.

Other fuel gages using a capacitor as the measuring transducer can now be designed by those skilled in the art and therefore this invention is not limited to those specific designs illustrated and described above. In addition, other level measuring transducers can also be used in conjunction with angle gages, or an IMU, and an algorithm developed by those skilled in the art and therefore this invention is not limited to those specific methods illustrated and described above. In particular, although not illustrated herein, level sensors based on ultrasonic or electromagnetic principles could be used along with angle gages and an algorithm according to the teachings of this invention.

Generally, when it is desirable to digitize different analog signals, different ADCs are used. An alternate method is to use fewer ADCs and a method of either multiplexing the signals for later separation or to switch the ADCs from one analog input to another.

Figure 87:
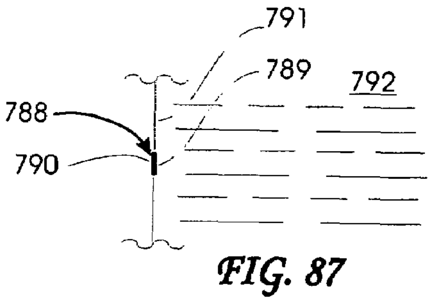

A general SAW temperature and pressure gage which can be wireless and powerless is shown generally at 788 located in a sidewall 791 of a fluid container or reservoir 792 in FIG. 87. A pressure sensor 789 is located on the inside of the container or reservoir 792, where it measures deflection of the reservoir wall, or of a specially constructed diaphragm inserted into the sidewall 791 of the reservoir 792, and the fluid temperature sensor 790 on the outside. The temperature measuring SAW 788 can be covered with an insulating material to avoid influence from the ambient temperature outside of the container 792.

Disclosed above are multiple means for determining the amount of fuel in a fuel tank. Using the SAW pressure devices of this invention, multiple pressure sensors can be placed at appropriate locations within a fuel tank to measure the fluid pressure and thereby determine the quantity of fuel remaining in the tank. This is illustrated in FIG. 88. In this example, four SAW pressure transducers 794 are placed on the bottom of the fuel tank and one SAW pressure transducer 795 is placed at the top of the fuel tank to eliminate the effects of vapor pressure within tank. Using neural networks, or other pattern recognition techniques, the quantity of fuel in the tank can be accurately determined from pressure readings from transducers 794, 795 in a manner similar that described above.

The SAW measuring system illustrated in FIG. 88A combines temperature and pressure measurements in a single unit using parallel paths 796 and 797 in the same manner as described above.

Finally, the Grills et al. and Kitagawa et al. patents discuss the problem of fuel sloshing in the tank and disclose various averaging times and techniques for eliminating sloshing and other transient effects. Similar methods can be used in the invention disclosed herein for similar purposes and are included in the scope of this invention.

1.6 Occupant Sensing

Occupant or object presence and position sensing is another field in which SAW and/or RFID technology can be applied and the inventions herein encompasses several embodiments of SAW and RFID occupant or object presence and/or position sensors.

Many sensing systems are available to identify and locate occupants or other objects in a passenger compartment of the vehicle. Such sensors include ultrasonic sensors, chemical sensors (e.g., carbon dioxide), cameras and other optical sensors, radar systems, heat and other infrared sensors, capacitance, magnetic or other field change sensors, etc. Most of these sensors require power to operate and return information to a central processor for analysis. An ultrasonic sensor, for example, may be mounted in or near the headliner of the vehicle and periodically it transmits a burst of ultrasonic waves and receives reflections of these waves from occupying items of the passenger seat. Current systems on the market are controlled by electronics in a dedicated ECU.

FIG. 89 is a side view, with parts cutaway and removed of a vehicle showing the passenger compartment containing a rear-facing child seat 342 on a front passenger seat 343 and one mounting location for a first embodiment of a vehicle interior monitoring system in accordance with the invention. The interior monitoring system is capable of detecting the presence of an object, determining the type of object, determining the location of the object, and/or determining another property or characteristic of the object. A property of the object could be the presence or orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out-of-position relative to the airbag.

In this embodiment, six transducers 344, 345, 346, 347, 348 and 349 are used, although any number of transducers may be used. Each transducer 344, 345, 346, 347, 348, 349 may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

Such transducers or receivers 344–349 may be of the type which emit or receive a continuous signal, a time varying signal (such as a capacitor or electric field sensor) or a spatial varying signal such as in a scanning system. One particular type of radiation-receiving receiver for use in the invention is a receiver capable of receiving electromagnetic waves.

When ultrasonic energy is used, transducer 345 can be used as a transmitter and transducers 344,346 as receivers. Naturally, other combinations can be used such as where all transducers are transceivers (transmitters and receivers). For example, transducer 345 can be constructed to transmit ultrasonic energy toward the front passenger seat, which is modified, in this case by the occupying item of the passenger seat, i.e., the rear-facing child seat 342, and the modified waves are received by the transducers 344 and 346, for example. A more common arrangement is where transducers 344, 345 and 346 are all transceivers. Modification of the ultrasonic energy may constitute reflection of the ultrasonic energy as the ultrasonic energy is reflected back by the occupying item of the seat. The waves received by transducers 344 and 346 vary with time depending on the shape of the object occupying the passenger seat, in this case, the rear-facing child seat 342. Each object will reflect back waves having a different pattern. Also, the pattern of waves received by transducer 344 will differ from the pattern received by transducer 346 in view of its different mounting location. This difference generally permits the determination of the location of the reflecting surface (i.e., the rear-facing child seat 342) through triangulation. Through the use of two transducers 344,346, a sort of stereographic image is received by the two transducers and recorded for analysis by processor 340, which is coupled to the transducers 344,345, 346. This image will differ for each object that is placed on the vehicle seat and it will also change for each position of a particular object and for each position of the vehicle seat. Elements 344,345,346, although described as transducers, are representative of any type of component used in a wave-based analysis technique.

For ultrasonic systems, the "image" recorded from each ultrasonic transducer/receiver, is actually a time series of digitized data of the amplitude of the received signal versus time. Since there are two receivers, two time series are obtained which are processed by the processor 340. The processor 340 may include electronic circuitry and associated, embedded software. Processor 340 constitutes one form of a generating system in accordance with the invention which generates information about the occupancy of the passenger compartment based on the waves received by the transducers 344,345,346.

When different objects are placed on the front passenger seat, the two images from transducers 344,346, for example, are different but there are also similarities between all images of rear-facing child seats, for example, regardless of where on the vehicle seat they are placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear-facing child seat images. The similarities of these images for various child seats are frequently not obvious to a person looking at plots of the time series and thus computer algorithms are developed to sort out the various patterns. For a more detailed discussion of pattern recognition, see U.S. Pat. No. 05,943,295 to Varga et al.

The determination of these rules is important to the pattern recognition techniques used in this invention. In general, three approaches have been useful, artificial intelligence, fuzzy logic and artificial neural networks (including cellular and modular or combination neural networks and support vector machines) (although additional types of pattern recognition techniques may also be used, such as sensor fusion). In some embodiments of this invention, such as the determination that there is an object in the path of a closing window as described below, the rules are sufficiently obvious that a trained researcher can sometimes look at the returned signals and devise an algorithm to make the required determinations. In others, such as the determination of the presence of a rear-facing child seat or of an occupant, artificial neural networks are used to determine the rules. One such set of neural network software for determining the pattern recognition rules is available from the International Scientific Research, Inc. of Panama City, Panama and Kyiv, Ukraine.

The system used in a preferred implementation of inventions herein for the determination of the presence of a rear-facing child seat, of an occupant or of an empty seat is the artificial neural network. In this case, the network operates on the two returned signals as sensed by transducers 344 and 346, for example. Through a training session, the system is taught to differentiate between the three cases. This is done by conducting a large number of experiments where all possible child seats are placed in all possible orientations on the front passenger seat. Similarly, a sufficiently large number of experiments are run with human occupants and with boxes, bags of groceries and other objects (both inanimate and animate). Sometimes, as many as 1,000,000 such experiments are run before the neural network is sufficiently trained so that it can differentiate among the three cases and output the correct decision with a very high probability. Of course, it must be realized that a neural network can also be trained to differentiate among additional cases, e.g., a forward-facing child seat.

Once the network is determined, it is possible to examine the result using tools supplied International Scientific Research, for example, to determine the rules that were finally arrived at by the trial and error techniques. In that case, the rules can then be programmed into a microprocessor resulting in a fuzzy logic or other rule-based system. Alternately, a neural computer, or cellular neural network, can be used to implement the net directly. In either case, the implementation can be carried out by those skilled in the art of pattern recognition. If a microprocessor is used, a memory device is also required to store the data from the analog-to-digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

Electromagnetic energy-based occupant sensors exist that use various portions of the electromagnetic spectrum. A system based on the ultraviolet, visible or infrared portions of the spectrum generally operate with a transmitter and a receiver of reflected radiation. The receiver may be a camera, focal plane array, or a photo detector such as a pin or avalanche diode as described in detail in above-referenced patents and patent applications. At other frequencies, the absorption of the electromagnetic energy is primarily and at still other frequencies, the capacitance or electric field influencing effects are used. Generally, the human body will reflect, scatter, absorb or transmit electromagnetic energy in various degrees depending on the frequency of the electromagnetic waves. All such occupant sensors are included herein.

In the embodiment wherein electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 344,345,346 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupants of the vehicle prior to the accident. In this manner, it can be ascertained whether the driver was falling asleep, talking on the phone, etc.

To aid in the detection of the presence of child seats as well as their orientation, a device 341 can be placed on the child seat in some convenient location where its presence can be sensed by a vehicle-mounted sensor that can be in the seat, dashboard, headliner or any other convenient location depending on the system design. The device 341 can be a reflector, resonator, RFID tag, SAW device, or any other tag or similar device that permits easy detection of its presence and perhaps its location or proximity. Such a device can also be placed on any other component in the vehicle to indicate the presence, location or identity of the component. For example, a vehicle may have a changeable component where the properties of that component are used by another system within the vehicle and thus the identification of the particular object is needed so that the proper properties are used by the other system. An occupant monitoring system (e.g. ultrasonic, optical, electric field, etc.) may perform differently depending on whether the seat is made from cloth or leather or a weight sensor may depend on the properties of a particular seat to provide the proper occupant weight. Thus, incorporation of an RFID, SAW, barcode or other tag or mark on any object that can be interrogated by an interrogator is contemplated herein.

A memory device for storing the images of the passenger compartment, and also for receiving and storing any of the other information, parameters and variables relating to the vehicle or occupancy of the vehicle, may be in the form a standardized "black box" (instead of or in addition to a memory part in a processor 340). The IEEE Standards Association is currently beginning to develop an international standard for motor vehicle event data recorders. The information stored in the black box and/or memory unit in the processor 340, can include the images of, or other information related to, the interior of the passenger compartment as well as the number of occupants and the health state of the occupants. The black box would preferably be tamper-proof and crash-proof and enable retrieval of the information after a crash. The use of wave-type sensors as the transducers 344,345,346 as well as electric field sensors is discussed above. Electric field sensors and wave sensors are essentially the same from the point of view of sensing the presence of an occupant in a vehicle. In both cases, a time-varying electric field is disturbed or modified by the presence of the occupant. At high frequencies in the visual, infrared and high frequency radio wave region, the sensor is based on its capability to sense change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between/near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus, for the purposes of this invention, capacitance, electric field or electromagnetic wave sensors are equivalent and although they are all technically "field" sensors they can be considered as "wave" sensors herein. What follows is a discussion comparing the similarities and differences between two types of field or wave sensors, electromagnetic wave sensors and capacitive sensors as exemplified by Kithil in U.S. Pat. No. 05,602,734 (see also U.S. Pat. No. 06,275,146, U.S. Pat. No. 06,014, 602, U.S. Pat. No. 05,844,486, U.S. Pat. No. 05,802,479, U.S. Pat. No. 05,691,693 and U.S. Pat. No. 05,366,241).

An electromagnetic field disturbed or emitted by a passenger in the case of an electromagnetic wave sensor, for example, and the electric field sensor of Kithil, for example, are in many ways similar and equivalent for the purposes of this invention. The electromagnetic wave sensor is an actual electromagnetic wave sensor by definition because it senses parameters of a wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5–7): "The proximity sensor 12 each function by creating an electrostatic field between oscillator input loop 54 and detector output loop 56, which is affected by presence of a person near by, as a result of capacitive coupling, . . . ". It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/near the plates of the capacitor.

Kithil declares that his capacitance sensor uses a static electric field. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasistatic electric field in the space between the capacitor plates, and a detector to reveal an informative change of the sensor capacitance caused by the presence of an occupant (see FIG. 7 and its description in the '734 patent). In this case, the system becomes a "wave sensor" in the sense that it starts generating actual time-varying electric field that certainly originates electromagnetic waves according to the definition above. That is, Kithil's sensor can be treated as a wave sensor regardless of the shape of the electric field that it creates a beam or a spread shape.

As follows from the Kithil patent, the capacitor sensor is likely a parametric system where the capacitance of the sensor is controlled by the influence of the passenger body. This influence is transferred by means of the near electromagnetic field (i.e., the wave-like process) coupling the capacitor electrodes and the body. It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares the coupling is due to a static electric field, such a situation is not realized in his system because an alternating electromagnetic field ("quasi-wave") exists in the system due to the oscillator. Thus, the sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. *Physics*. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean in the presence of water waves. The presence of a dielectric body between the plates causes the waves to get bigger as more electrons flow to and from the plates of the capacitor. Thus, an occupant affects the magnitude of these waves which is sensed by the capacitor circuit. The electromagnetic field is a material agent that carries information about a passenger's position in both Kithil's and a beam-type electromagnetic wave sensor.

Considering now a general occupant sensor and its connection to the rest of the system, an alternate method as taught herein is to use an interrogator to send a signal to the headliner-mounted ultrasonic sensor, for example, causing that sensor to transmit and receive ultrasonic waves. The sensor in this case could perform mathematical operations on the received waves and create a vector of data containing perhaps twenty to forty values and transmit that vector wirelessly to the interrogator. By means of this system, the ultrasonic sensor need only be connected to the vehicle power system and the information can be transferred to and from the sensor wirelessly (either by electromagnetic or ultrasonic waves or equivalent). Such a system significantly reduces the wiring complexity especially when there may be multiple such sensors distributed in the passenger compartment. Then, only a power wire needs to be attached to the sensor and there does not need to be any direct connection between the sensor and the control module. The same philosophy applies to radar-based sensors, electromagnetic sensors of all kinds including cameras, capacitive or other electromagnetic field change sensitive sensors etc. In some cases, the sensor itself can operate on power supplied by the interrogator through radio frequency transmission. In this case, even the connection to the power line can be omitted. This principle can be extended to the large number of sensors and actuators that are currently in the vehicle where the only wires that are needed are those to supply power to the sensors and actuators and the information is supplied wirelessly.

Such wireless powerless sensors can also be used, for example, as close proximity sensors based on measurement of thermal radiation from an occupant. Such sensors can be mounted on any of the surfaces in the passenger compartment, including the seats, which are likely to receive such radiation.

A significant number of people are suffocated each year in automobiles due to excessive heat, carbon dioxide, carbon monoxide, or other dangerous fumes. The SAW sensor technology is particularly applicable to solving these kinds of problems. The temperature measurement capabilities of SAW transducers have been discussed above. If the surface of a SAW device is covered with a material which captures carbon dioxide, for example, such that the mass, elastic constants or other property of surface coating changes, the characteristics of the surface acoustic waves can be modified as described in detail in U.S. Pat. No. 04,637,987 and elsewhere based on the carbon dioxide content of the air. Once again, an interrogator can sense the condition of these chemical-sensing sensors without the need to supply power. The interrogator can therefore communicate with the sensors wirelessly. If power is supplied then this communication can be through the wires. If a concentration of carbon monoxide is sensed, for example, an alarm can be sounded, the windows opened, and/or the engine extinguished. Similarly, if the temperature within the passenger compartment exceeds a certain level, the windows can be automatically opened a little to permit an exchange of air reducing the inside temperature and thereby perhaps saving the life of an infant or pet left in the vehicle unattended.

In a similar manner, the coating of the surface wave device can contain a chemical which is responsive to the presence of alcohol. In this case, the vehicle can be prevented from operating when the concentration of alcohol vapors in the vehicle exceeds some predetermined limit. Such a device can advantageously be mounted in the headliner above the driver's seat.

Each year, a number of children and animals are killed when they are locked into a vehicle trunk. Since children and animals emit significant amounts of carbon dioxide, a carbon dioxide sensor connected to the vehicle system wirelessly and powerlessly provides an economic way of detecting the presence of a life form in the trunk. If a life form is detected, then a control system can release a trunk lock thereby opening the trunk. Alarms can also be sounded or activated when a life form is detected in the trunk. An infrared or other sensor can perform a similar function.

FIG. 90 illustrates a SAW strain gage as described above, where the tension in the seat belt 350 can be measured without the requirement of power or signal wires. FIG. 90 illustrates a powerless and wireless passive SAW strain gage-based device 357 for this purpose. There are many other places that such a device can be mounted to measure the tension in the seatbelt at one place or at multiple places. Additionally, a SAW-based accelerometer can be located on the seatbelt adjacent the chest of an occupant as a preferred measure of the stress placed on the occupant by the seatbelt permitting that stress to be controlled.

In FIG. 91, a bolt 360 is used to attach a vehicle seat to a support structure such as a slide mechanism as illustrated in FIGS. 21 and 22, among others, in U.S. Pat. No. 06,242,701. The bolt 360 is attached to the seat or seat structure (not shown) by inserting threaded section 361 containing threads 362 and then attaching a nut (not shown) to secure the bolt 360 to the seat or seat structure. Similarly, the lower section of the bolt 360 is secured to the slide mechanism (not shown) by lower bolt portion 363 by means of a nut (not shown) engaging threads 364. Four such bolts 360 are typically used to attach the seat to the vehicle.

As the weight in the seat increases, the load is transferred to the vehicle floor by means of stresses in bolts 360. The stress in the bolt section 365 is not affect by stresses in the bolt sections 361 and 363 caused by the engagement of the nuts that attach the bolts 360 to the seat and vehicle respectively.

The silicon strain gage 366 is attached, structured and arranged to measure the strain in bolt section 365 caused by loading from the seat and its contents. Silicon strain gage 366 is selected for its high gage factor and low power requirements relative to other strain gage technologies. Associated electronics 367 are typically incorporated into a single chip and may contain connections/couplings for wires, not shown, or radio frequency circuits and an antenna for radio frequency transfer of power and signals from the strain gage 366 to an interrogator mounted on the vehicle, not shown. In this manner, the interrogator supplies power and receives the instantaneous strain value that is measured by the strain gage 366.

Although a single strain element 366 has been illustrated, the bolt 360 may contain 1, 2, or even as many as 4 such strain gage assemblies on various sides of bolt section 365. Other stain gage technologies can also be used.

Figure 92A:
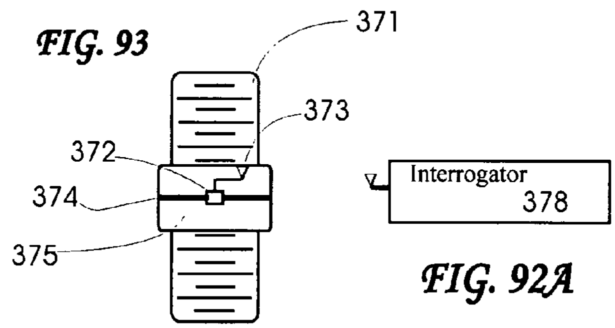

Another example of a stud which is threaded on both ends and which can be used to measure the weight of an occupant seat is illustrated in FIGS. 92A–92D. The operation of this device is disclosed in U.S. Pat. No. 06,653,577 wherein the center section of stud 371 is solid. It has been discovered that sensitivity of the device can be significantly improved if a slotted member is used as described in U.S. Pat. No. 05,539,236. FIG. 92A illustrates a SAW strain gage 372 mounted on a substrate and attached to span a slot 374 in a center section 375 of the stud 371. This technique can be used with any other strain-measuring device.

Figure 92B:
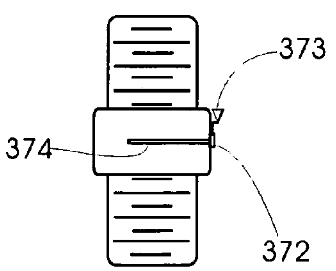

FIG. 92B is a side view of the device of FIG. 92A.

Figure 92C:
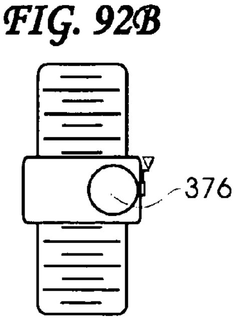

FIG. 92C illustrates use of a single hole 376 drilled off-center in the center section 375 of the stud 371. The single hole 376 also serves to magnify the strain as sensed by the strain gage 372. It has the advantage in that strain gage 372 does not need to span an open space. The amount of magnification obtained from this design, however, is significantly less than obtained with the design of FIG. 92A.

Figure 92D:
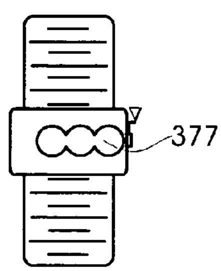
Figure 92E:
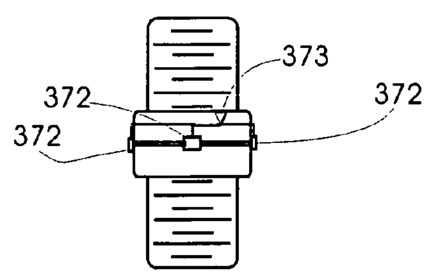

To improve the sensitivity of the device shown in FIG. 92C, multiple smaller holes 377 can be used as illustrated in FIG. 92D. FIG. 92E in an alternate configuration showing three of four gages 372 for determining the bending moments as well as the axial stress in the support member.

In operation, the SAW strain gage 372 receives radio frequency waves from an interrogator 378 and returns electromagnetic waves via a respective antenna 373 which are delayed based on the strain sensed by strain gage 372.

Occupant weight sensors can give erroneous results if the seatbelt is pulled tight pushing the occupant into the seat. This is particularly a problem when the seatbelt is not attached to the seat. For such cases, it has been proposed to measure the tension in various parts of the seatbelt. Conventional technology requires that such devices be hard-wired into the vehicle complicating the wire harness.

Other components of the vehicle can also be wirelessly coupled to the processor or central control module for the purposes of data transmission and/or power transmission. A discussion of some components follows.

Seat Systems

In more enhanced applications, it is envisioned that components of the seat will be integrated into the power transmission and communication system. In many luxury cars, the seat subsystem is becoming very complicated. Seat manufacturers state that almost all warranty repairs are associated with the wiring and connectors associated with the seat. The reliability of seat systems can therefore be substantially improved and the incidence of failures or warranty repairs drastically reduced if the wires and connectors can be eliminated from the seat subsystem.

Today, there are switches located on the seat or at other locations in the vehicle for controlling the forward and backward motions, up and down motions, and rotation of the seat and seat back. These switches are connected to the appropriate motors by wires. Additionally, many seats now contain an airbag that must communicate with a sensor located, for example, in the vehicle, B-pillar, sill or door. Many occupant presence sensors and weight sensing systems are also appearing on vehicle seats. Finally, some seats contain heaters and cooling elements, vibrators, and other comfort and convenience devices that require wires and switches.

As an example, let us now look at weight sensing. Under the teachings of an invention disclosed herein, silicon strain gage weight sensors can be placed on the bolts that secure each seat to the slide mechanism as shown in FIG. 91. These strain gage subsystems can contain sufficient electronics and inductive pickup coils so as to receive their operational energy from a pair of wires appropriately placed beneath the seats. The seat weight measurements can then be superimposed on the power frequency or transmitted wirelessly using RF or other convenient wireless technology. Other weight sensing technologies such as bladders and pressure sensors or two-dimensional resistive deflection sensing mats can also be handled in a similar manner.

Other methods of seat weight sensing include measuring the deflection of a part of the seat or the deflection of the bolts that connect the seat to the seat slide. For example, the strain in a bolt can be readily determined using, for example, SAW, wire or silicon strain gages, optical fiber strain gages, time of flight or phase of ultrasonic waves traveling through the strained bolt, or the capacitive change of two appropriately position capacitor plates.

Using the loosely coupled inductive system described above, power in excess of a kilowatt can be readily transferred to operate seat position motors without the use of directly connected wires. The switches can also be coupled into the inductive system without any direct wire connections and the switches, which now can be placed on the door armrest or on the seat as desired, can provide the information to control the seat motors. Additionally, since microprocessors will now be present on every motor and switch, the classical problem of the four-way seat system to control three degrees of freedom can be easily solved.

In current four-way seat systems, when an attempt is made to vertically raise the seat, the seat also rotates. Similarly, when an attempt is made to rotate the seat, it also invariably moves either up or down. This is because there are four switches to control three degrees of freedom and thus there is an infinite combination of switch settings for each seat position setting. This problem can be easily solved with an algorithm that translates the switch settings to the proper motor positions. Thus only three switches are needed.

The positions of the seat, seatback and headrest, can also be readily monitored without having direct wire connections to the vehicle. This can be done in numerous ways beginning with the encoder system that is currently in use and ending with simple RFID radar reflective tags that can be interrogated by a remote RFID tag reader. Based on the time of flight of RF waves, the positions of all of the desired surfaces of the seat can be instantly determined wirelessly.

1.7 Vehicle or Component Control

At least one invention herein is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the guidance system of the vehicle which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module.

The automatic guidance systems for vehicles traveling on highways may be any existing system or system being developed, such as one based on satellite positioning techniques or ground-based positioning techniques. It can also be based on vision systems such as those used to provide lane departure warning. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver (on a heads-up or other display for example) and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

FIG. 93 is a flow chart of some of the methods for directing a vehicle off of a roadway if a component is operating abnormally. The component's operation is monitored at step 380 and a determination is made at step 381 whether its operation is abnormal. If not, the operation of the component is monitored further. If the operation of the component is abnormal, the vehicle can be directed off the roadway at step 382. More particularly, this can be accomplished by generating a signal indicating the abnormal operation of the component at step 383, directing this signal to a guidance system in the vehicle at step 384 that guides movement of the vehicle off of the roadway at step 385. Also, if the component is operating abnormally, the current position of the vehicle and the location of a site off of the roadway can be determined at step 386, e.g., using satellite-based or ground-based location determining techniques, a path from the current location to the off-roadway location determined at step 387 and then the vehicle directed along this path at step 388. Periodically, a determination is made at step 389 whether the component's abnormality has been satisfactorily addressed and/or corrected and if so, the vehicle can re-enter the roadway and operation of the component begins again. If not, the re-entry of the vehicle onto the roadway is prevented at step 390.

FIG. 94 schematically shows the basic components for performing this method, i.e., a component operation monitoring system 391 (such as described above), an optional satellite-based or ground-based positioning system 392 and a vehicle guidance system 393.

2.0 Telematics 2.1 Transmission of Vehicle and Occupant Information

Described herein is a system for determining the status of occupants in a vehicle, and/or of the vehicle, and in the event of an accident or at any other appropriate time, transmitting the status of the occupants and/or the vehicle, and optionally additional information, via a communications channel or link to a remote monitoring facility. In addition to the status of the occupant, it is also important to be able to analyze the operating conditions of the vehicle and detect when a component of the vehicle is about to fail. By notifying the driver, a dealer or other repair facility and/or the vehicle manufacturer of the impending failure of the component, appropriate corrective action can be taken to avoid such failure.

As noted above, at least one invention herein relates generally to telematics and the transmission of information from a vehicle to one or more remote sites which can react to the position or status of the vehicle or occupant(s) therein.

Initially, sensing of the occupancy of the vehicle and the optional transmission of this information, which may include images, to remote locations will be discussed. This entails obtaining information from various sensors about the occupant(s) in the passenger compartment of the vehicle, e.g., the number of occupants, their type and their motion, if any. Thereafter, general vehicle diagnostic methods will be discussed with the diagnosis being transmittable via a communications device to the remote locations. Finally, a discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations.

FIG. 95 shows schematically the interface between a vehicle interior monitoring system in accordance with the invention and the vehicle's cellular or other telematics communication system. An adult occupant 395 is shown sitting on the front passenger seat 343 and four transducers 344, 345, 347 and 348 are used to determine the presence (or absence) of the occupant on that seat 343. One of the transducers 345 in this case acts as both a transmitter and receiver while transducer 344 can act only as a receiver or as both a transmitter and receiver. Alternately, transducer 344 could serve as both a transmitter and receiver or the transmitting function could be alternated between the two transducers 344, 345. Also, in many cases more than two transmitters and receivers are used and in still other cases, other types of sensors, such as electric field, capacitance, self-tuning antennas (collectively represented by 347 and 348), weight, seatbelt, heartbeat, motion and seat position sensors, are also used in combination with the radiation sensors.

For a general object, transducers 344, 345, 347, 348 can also be used to determine the type of object, determine the location of the object and/or determine another property or characteristic of the object. A property of the object could be the presence and/or orientation of a child seat, the velocity of an adult and the like. For example, the transducers 344, 345, 347, 348 can be designed to enable a determination that an object is present on the seat, that the object is a child seat and that the child seat is rear-facing.

The transducers 344 and 345 are attached to the vehicle buried in the A-pillar trim, where their presence can be disguised, and are connected to processor 340 that may also be hidden in the trim as shown (this being a non-limiting position for the processor 340). Other mounting locations can also be used. For example, transducers 344, 345 can be mounted inside the seat (along with or in place of transducers 347 and 348), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in the above-referenced patents and patent applications and all of these mounting locations are contemplated for use with the transducers described herein.

The cellular phone or other communications system 396 outputs to an antenna 397. The transducers 344, 345, 347 and 348 in conjunction with the pattern recognition hardware and software, which is implemented in processor 340 and is packaged on a printed circuit board or flex circuit along with the transducers 344 and 345, determine the presence of an occupant within a few seconds after the vehicle is started, or within a few seconds after the door is closed. Similar systems located to monitor the remaining seats in the vehicle also determine the presence of occupants at the other seating locations and this result is stored in the computer memory which is part of each monitoring system processor 340.

Periodically and in particular in the event of or in anticipation of an accident, the electronic system associated with the cellular phone or other telematics system 396 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials or otherwise contacts the EMS operator (such as 911 or through a telematics service such as OnStar®) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator, for example.

An alternate preferred communications system is the use of satellite internet or Wi-Fi internet such is expected to be operational on vehicles in a few years. In this manner, the vehicle will always have communications access regardless of its location on the earth. This is based on the premise that Wi-Fi will be in place for all those locations where satellite communication is not available such as in tunnels, urban canyons and the like.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating locations or at multiple seating locations with a provision being made to eliminate repetitive count of occupants. A determination can also be made using the transducers as to whether the life forms are humans, or more specifically, adults, children in child seats, etc. As noted above, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number, type and position of transducers and training of the pattern recognition algorithm.

In addition to the use of transducers to determine the presence and location of occupants in a vehicle, other sensors could also be used. For example, a heartbeat sensor which determines the number and presence of heartbeats can also be arranged in the vehicle, which would thus also determine the number of occupants as the number of occupants would be equal to the number of heartbeats. Conventional heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat, if such a human occupant is present. The output of the heartbeat sensor is input to the processor of the interior monitoring system. One heartbeat sensor for use in the invention may be of the types as disclosed in McEwan (U.S. Pat. No. 05,573,012 and U.S. Pat. No. 05,766,208). The heartbeat sensor can be positioned at any convenient position relative to the seats where occupancy is being monitored. A preferred location is within the vehicle seat back.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system heretofore is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micropower impulse radar (MIR) system is disclosed, for example, in McEwan (U.S. Pat. No. 05,361,070), as well as many other patents by the same inventor. Motion sensing is accomplished by monitoring a particular range from the sensor, as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency is also possible. Additionally, multiple MIR sensors can be used when high speed tracking of the motion of an occupant during a crash is required since they can be individually pulsed without interfering with each through time division multiplexing.

An alternative way to determine motion of the occupant (s) is to monitor the weight distribution of the occupant whereby changes in weight distribution after an accident would be highly suggestive of movement of the occupant. A system for determining the weight distribution of the occupants could be integrated or otherwise arranged in the right center and left, front and back vehicle seats such as 343 and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth. Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar®).

FIG. 96 shows a schematic diagram of an embodiment of the invention including a system for determining the presence and health state of any occupants of the vehicle and a telecommunications link. This embodiment includes a system for determining the presence of any occupants 400 which may take the form of a heartbeat sensor or motion sensor as described above and a system for determining the health state of any occupants 401. The health state determining system may be integrated into the system for determining the presence of any occupants, i.e., one and the same component, or separate therefrom. Further, a system for determining the location, and optionally velocity, of the occupants or one or more parts thereof 402 are provided and may be any conventional occupant position sensor or preferably, one of the occupant position sensors as described herein (e.g., those utilizing waves. electromagnetic radiation or electric fields) or as described in the current assignee's patents and patent applications referenced above.

A processor 403 is coupled to the presence determining system 400, the health state determining system 401 and the location determining system 402. A communications unit 404 is coupled to the processor 403. The processor 403 and/or communications unit 404 can also be coupled to microphones 405 that can be distributed throughout the vehicle and include voice-processing circuitry to enable the occupant(s) to effect vocal control of the processor 403, communications unit 404 or any coupled component or oral communications via the communications unit 404. The processor 403 is also coupled to another vehicular system, component or subsystem 406 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 407 could be coupled to the processor 403 and provides an indication of the absolute position of the vehicle, preferably using satellite-based positioning technology (e.g., a GPS receiver).

In normal use (other than after a crash), the presence determining system 400 determines whether any human occupants are present, i.e., adults or children, and the location determining system 402 determines the occupant's location. The processor 403 receives signals representative of the presence of occupants and their location and determines whether the vehicular system, component or subsystem 406 can be modified to optimize its operation for the specific arrangement of occupants. For example, if the processor 403 determines that only the front seats in the vehicle are occupied, it could control the heating system to provide heat only through vents situated to provide heat for the front-seated occupants.

Another possible vehicular system, component or subsystem is a navigational aid, i.e., a route display or map. In this case, the position of the vehicle as determined by the positioning system 407 is conveyed through processor 403 to the communications unit 404 to a remote facility and a map is transmitted from this facility to the vehicle to be displayed on the route display. If directions are needed, a request for the same could be entered into an input unit 408 associated with the processor 403 and transmitted to the facility. Data for the display map and/or vocal instructions could be transmitted from this facility to the vehicle.

Moreover, using this embodiment, it is possible to remotely monitor the health state of the occupants in the vehicle and most importantly, the driver. The health state determining system 401 may be used to detect whether the driver's breathing is erratic or indicative of a state in which the driver is dozing off. The health state determining system 401 could also include a breath-analyzer to determine whether the driver's breath contains alcohol. In this case, the health state of the driver is relayed through the processor 403 and the communications unit 404 to the remote facility and appropriate action can be taken. For example, it would be possible to transmit a command (from the remote facility) to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 406.

In use after a crash, the presence determining system 400, health state determining system 401 and location determining system 402 can obtain readings from the passenger compartment and direct such readings to the processor 403. The processor 403 analyzes the information and directs or controls the transmission of the information about the occupant(s) to a remote, manned facility. Such information would include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making noise. Moreover, the communications link through the communications unit 404 can be activated immediately after the crash to enable personnel at the remote facility to initiate communications with the vehicle.

An occupant sensing system can also involve sensing for the presence of a living occupant in a trunk of a vehicle or in a closed vehicle, for example, when a child is inadvertently left in the vehicle or enters the trunk and the trunk closes. To this end, a SAW-based chemical sensor 410 is illustrated in FIG. 97A for mounting in a vehicle trunk as illustrated in FIG. 97. The chemical sensor 410 is designed to measure carbon dioxide concentration through the mass loading effects as described in U.S. Pat. No. 04,895,017 with a polymer coating selected that is sensitive to carbon dioxide. The speed of the surface acoustic wave is a function of the carbon dioxide level in the atmosphere. Section 412 of the chemical sensor 410 contains a coating of such a polymer and the acoustic velocity in this section is a measure of the carbon dioxide concentration. Temperature effects are eliminated through a comparison of the sonic velocities in sections 412 and 411 as described above.

Thus, when the trunk lid 409 is closed and a source of carbon dioxide such as a child or animal is trapped within the trunk, the chemical sensor 410 will provide information indicating the presence of the carbon dioxide producing object to the interrogator which can then release a trunk lock permitting the trunk lid 409 to automatically open. In this manner, the problem of children and animals suffocating in closed trunks is eliminated. Alternately, information that a person or animal is trapped in a trunk can be sent by the telematics system to law enforcement authorities or other location or facility remote from the vehicle.

A similar device can be distributed at various locations within the passenger compartment of vehicle along with a combined temperature sensor. If the car has been left with a child or other animal while owner is shopping, for example, and if the temperature rises within the vehicle to an unsafe level or, alternately, if the temperature drops below an unsafe level, then the vehicle can be signaled to take appropriate action which may involve opening the windows or starting the vehicle with either air conditioning or heating as appropriate. Alternately, information that a person or animal is trapped within a vehicle can be sent by the telematics system to law enforcement authorities or other location remote from the vehicle. Thus, through these simple wireless powerless sensors, the problem of suffocation either from lack of oxygen or death from excessive heat or cold can all be solved in a simple, low-cost manner through using an interrogator as disclosed in the current assignee's U.S. patent application Ser. No. 10/079,065.

Additionally, a sensitive layer on a SAW can be made to be sensitive to other chemicals such as water vapor for humidity control or alcohol for drunk-driving control. Similarly, the sensitive layer can be designed to be sensitive to carbon monoxide thereby preventing carbon monoxide poisoning. Many other chemicals can be sensed for specific applications such as to check for chemical leaks in commercial vehicles, for example. Whenever such a sensor system determines that a dangerous situation is developing, an alarm can be sounded and/or the situation can be automatically communicated to an off-vehicle location through the internet, telematics, a cell phone such as a 911 call, the Internet or though a subscriber service such as OnStar®.

The operating conditions of the vehicle can also be transmitted along with the status of the occupants to a remote monitoring facility. The operating conditions of the vehicle include whether the motor is running and whether the vehicle is moving. Thus, in a general embodiment in which information on both occupancy of the vehicle and the operating conditions of the vehicle are transmitted, one or more properties or characteristics of occupancy of the vehicle are determined, such constituting information about the occupancy of the vehicle, and one or more states of the vehicle or of a component of the vehicle is determined, such constituting information about the operation of the vehicle. The information about the occupancy of the vehicle and operation of the vehicle are selectively transmitted, possibly the information about occupancy to an emergency response center and the information about the vehicle to a dispatcher, a dealer or repair facility and/or the vehicle manufacturer.

Transmission of the information about the operation of the vehicle, i.e., diagnostic information, may be achieved via a satellite and/or via the Internet. The vehicle would thus include appropriate electronic hardware and/or software to enable the transmission of a signal to a satellite, from where it could be re-transmitted to a remote location (for example via the Internet), and/or to enable the transmission to a web site or host computer. In the latter case, the vehicle could be assigned a domain name or e-mail address for identification or transmission origination purposes.

The diagnostic discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail. As envisioned when the diagnostic module 33 detects a potential failure it not only notifies the driver through a display 34 (as shown in FIGS. 3 and 4), but also automatically notifies the dealer through a vehicle cellular phone 32 or other telematics communication link such as the internet via satellite or Wi-Fi. The dealer can thus contact the vehicle owner and schedule an appointment to undertake the necessary repair at each party's mutual convenience. Contact by the dealer to the vehicle owner can occur as the owner is driving the vehicle, using a communications device. Thus, the dealer can contact the driver and inform him of their mutual knowledge of the problem and discuss scheduling maintenance to attend to the problem. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the diagnostic system could send a signal to another vehicle system to turn off all non-essential devices which use electricity thereby conserving electrical energy and maximizing the time and distance that the vehicle can travel before exhausting the energy in the battery. Additionally, this system can be coupled to a system such as OnStar® or a vehicle route guidance system, and the driver can be guided to the nearest open repair facility or a facility of his or her choice.

FIG. 98 shows a schematic of the integration of the occupant sensing with a telematics link and the vehicle diagnosis with a telematics link. As envisioned, the occupant sensing system 415 includes those components which determine the presence, position, health state, and other information relating to the occupants, for example the transducers discussed above with reference to FIGS. 89 and 96 and the SAW device discussed above with reference to FIG. 97. Information relating to the occupants includes information as to what the driver is doing, talking on the phone, communicating with OnStar®, the internet or other route guidance, listening to the radio, sleeping, drunk, drugged, having a heart attack, etc. The occupant sensing system may also be any of those systems and apparatus described in any of the current assignee's above-referenced patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, ultrasonic sensors, MIR sensors, microphones and optical sensors.

A crash sensor 416 is provided and determines when the vehicle experiences a crash. Crash sensor 416 may be any type of crash sensor.

Vehicle sensors 417 include sensors which detect the operating conditions of the vehicle such as those sensors discussed with reference to FIG. 97 and others above. Also included are tire sensors such as disclosed in U.S. Pat. No. 06,662,642. Other examples include velocity and acceleration sensors, and angular and angular rate pitch, roll and yaw sensors or an IMU. Of particular importance are sensors that tell what the car is doing: speed, skidding, sliding, location, communicating with other cars or the infrastructure, etc.

Environment sensors 418 include sensors which provide data concerning the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident either involving the vehicle or another vehicle, etc. Possible sensors include optical sensors which obtain images of the environment surrounding the vehicle, blind spot detectors which provide data on the blind spot of the driver, automatic cruise control sensors that can provide images of vehicles in front of the host vehicle, and various radar and lidar devices which provide the position of other vehicles and objects relative to the subject vehicle.

The occupant sensing system 415, crash sensors 416, vehicle sensors 417, and environment sensors 418 can all be coupled to a communications device 419 which may contain a memory unit and appropriate electrical hardware to communicate with all of the sensors, process data from the sensors, and transmit data from the sensors. The memory unit could be useful to store data from the sensors, updated periodically, so that such information could be transmitted at set time intervals.

The communications device 419 can be designed to transmit information to any number of different types of facilities. For example, the communications device 419 could be designed to transmit information to an emergency response facility 420 in the event of an accident involving the vehicle. The transmission of the information could be triggered by a signal from the crash sensor 416 that the vehicle was experiencing a crash or had experienced a crash. The information transmitted could come from the occupant sensing system 415 so that the emergency response could be tailored to the status of the occupants. For example, if the vehicle was determined to have ten occupants, more ambulances might be sent than if the vehicle contained only a single occupant. Also, if the occupants are determined not be breathing, then a higher priority call with living survivors might receive assistance first. As such, the information from the occupant sensing system 415 could be used to prioritize the duties of the emergency response personnel.

Information from the vehicle sensors 417 and environment sensors 418 could also be transmitted to law enforcement authorities 422 in the event of an accident so that the cause(s) of the accident could be determined. Such information can also include information from the occupant sensing system 415, which might reveal that the driver was talking on the phone, putting on make-up, or another distracting activity, information from the vehicle sensors 417 which might reveal a problem with the vehicle, and information from the environment sensors 418 which might reveal the existence of slippery roads, dense fog and the like.

Information from the occupant sensing system 415, vehicle sensors 417 and environment sensors 418 could also be transmitted to the vehicle manufacturer 423 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 417 relating to component failure could be transmitted to a dealer/repair facility 421 which could schedule maintenance to correct the problem.

The communications device 419 could be designed to transmit particular information to each site, i.e., only information important to be considered by the personnel at that site. For example, the emergency response personnel have no need for the fact that the tire pressure was too low but such information is important to the law enforcement authorities 422 (for the possible purpose of issuing a recall of the tire and/or vehicle) and the vehicle manufacturer 423.

The communication device can be a cellular phone, DSRC, OnStar®, or other subscriber-based telematics system, a peer-to-peer vehicle communication system that eventually communicates to the infrastructure and then, perhaps, to the Internet with e-mail or instant message to the dealer, manufacturer, vehicle owner, law enforcement authorities or others. It can also be a vehicle to LEO or Geostationary satellite system such as SkyBitz which can then forward the information to the appropriate facility either directly or through the Internet or a direct connection to the internet through a satellite or 802.11 Wi-Fi link or equivalent.

The communication may need to be secret so as not to violate the privacy of the occupants and thus encrypted communication may, in many cases, be required. Other innovations described herein include the transmission of any video data from a vehicle to another vehicle or to a facility remote from the vehicle by any means such as a telematics communication system such as DSRC, OnStar®, a cellular phone system, a communication via GEO, geocentric or other satellite system and any communication that communicates the results of a pattern recognition system analysis. Also, any communication from a vehicle can combine sensor information with location information.

When optical sensors are provided as part of the occupant sensing system 415, video conferencing becomes a possibility, whether or not the vehicle experiences a crash. That is, the occupants of the vehicle can engage in a video conference with people at another location 424 via establishment of a communications channel by the communications device 419.

The vehicle diagnostic system described above using a telematics link can transmit information from any type of sensors on the vehicle.

In one particular use of the invention, a wireless sensing and communication system is provided whereby the information or data obtained through processing of input from sensors of the wireless sensing and communication system is further transmitted for reception by a remote facility.

Thus, in such a construction, there is an intra-vehicle communications between the sensors on the vehicle and a processing system (control module, computer or the like) and remote communications between the same or a coupled processing system (control module, computer or the like). The electronic components for the intra-vehicle communication may be designed to transmit and receive signals over short distances whereas the electronic components which enable remote communications should be designed to transmit and receive signals over relatively long distances.

The wireless sensing and communication system includes sensors that are located on the vehicle or in the vicinity of the vehicle and which provide information which is transmitted to one or more interrogators in the vehicle by wireless radio frequency means, using wireless radio frequency transmission technology. In some cases, the power to operate a particular sensor is supplied by the interrogator while in other cases, the sensor is independently connected to either a battery, generator (piezo electric, solar etc.), vehicle power source or some source of power external to the vehicle.

One particular system requires mentioning which is the use of high speed satellite or Wi-Fi internet service such as supplied by Wi-Fi hot spots or KVH Industries, Inc. for any and all vehicle communications including vehicle telephone, TV and radio services. With thousands of radio stations available over the internet, for example (see shoutcast.com), a high speed internet connection is clearly superior to satellite radio systems that are now being marketed. Similarly, with ubiquitous internet access that KVH supplies throughout the country, the lack of coverage problems with cell phones disappears. This capability becomes particularly useful for emergency notification when a vehicle has an accident or becomes disabled.

2.2 Docking Stations and PDAs

There is a serious problem developing with vehicles such as cars, trucks, boats and private planes and computer systems. The quality and lifetime of vehicles is increasing and now many vehicles have a lifetime that exceeds ten or more years. On the other hand, computer and related electronic systems, which are proliferating on such vehicles, have shorter and shorter life spans as they are made obsolete by the exponential advances in technology. Owners do not want to dispose of their vehicles just because the electronics have become obsolete. Therefore, a solution as proposed in this invention, whereby a substantial portion of the information, programs, processing power and memory are separate from the vehicle, will increasingly become necessary. One implementation of such a system is for the information, programs, processing power and memory to be resident in a portable device that can be removed from the vehicle. Once removed, the vehicle may still be operable but with reduced functionality. The navigation system, for example, may be resident on the removable device which hereinafter will be referred to as a Personal Information Device (PID) including a GPS subsystem and perhaps an IMU along with appropriate maps allowing a person to navigate on foot as well as in the vehicle. The telephone system which can be either internet or cell phone-based and if internet-based, can be a satellite internet, Wi-Fi or equivalent system which could be equally operable in a vehicle or on foot. The software data and programs can be kept updated including all of the software for diagnostic functions, for example, for the vehicle through the internet connection. The vehicle could contain supplemental displays (such as a heads-up display), input devices including touch pads, switches, voice recognition and cameras for occupant position determination and gesture recognition, and other output devices such as speakers, warning lights etc., for example.

As computer hardware improves it can be an easy step for the owner to replace the PID with the latest version which may even be supplied to the owner under subscription by the Cell Phone Company, car dealership, vehicle manufacturer, computer manufacturer etc. Similarly, the same device can be used to operate the home computer system or entertainment system. In other words, the owner would own one device, the PID, which would contain substantially all of the processing power, software and information that the owner requires to operate his vehicles, computer systems etc. The system can also be periodically backed up (perhaps also over the Internet), automatically providing protection against loss of data in the event of a system failure. The PID can also have a biometrics-based identification system (fingerprint, voiceprint, face or iris recognition etc.) that prevents unauthorized users from using the system and an automatic call back location system based on GPS or other location technologies that permits the owner to immediately find the location of the PID in the event of misplacement or theft.

The PID can also be the repository of credit card information permitting instant purchases without the physical scanning of a separate credit card, home or car door identification system to eliminate keys and conventional keyless entry systems, and other information of a medical nature to aid emergency services in the event of a medical emergency. The possibilities are limitless for such a device. A PID, for example, can be provided with sensors to monitor the vital functions of an elderly person and signal if a problem occurs. The PID can be programmed and provided with sensors to sense fire, cold, harmful chemicals or vapors, biological agents (such as smallpox or anthrax) for use in a vehicle or any other environment. An automatic phone call, or other communication, can be initiated when a hazardous substance (or any other dangerous or hazardous situation or event) is detected to inform the authorities along with the location of the PID. Since the PID would have universal features, it could be taken from vehicle to vehicle allowing each person to have personal features in whatever vehicle he or she was operating. This would be useful for rental vehicles, for example, seats, mirrors, radio stations, HVAC can be automatically set for the PID owner. The same feature can apply to offices, homes, etc.

The same PID can also be used to signal the presence of a particular person in a room and thereby to set the appropriate TV or radio stations, room temperature, lighting, wall pictures etc. For example, the PID could also assume the features of a remote when a person is watching TV. A person could of course have more than one PID and a PID could be used by more than one person provided a means of identification is present such as a biometric based ID or password system. Thus, each individual would need to learn to operate one device, the PID, instead of multiple devices. The PID could even be used to automatically unlock and initiate some action such as opening a door or turning on lights in a vehicle, house, apartment or building. Naturally, the PID can have a variety of associated sensors as discussed above including cameras, microphones, accelerometers, an IMU, GPS receiver, Wi-Fi receiver etc.

Other people could also determine the location of a person carrying the PID, if such a service is authorized by the PID owner. In this manner, parents can locate their children or friends can locate each other in a crowded restaurant or airport. The location or tracking information can be made available on the Internet through the Skybitz or similar low power tracking system. Also, the batteries that operate the PID can be recharged in a variety of ways including fuel cells and vibration-based power generators, solar power, induction charging systems etc. For further background, see N. Tredennick "031201 Go Reconfigure", IEEE Spectrum Magazine, p. 37–40, December 2003 and D. Verkest "Machine Cameleon" ibid p. 41–46, which describe some of the non-vehicle related properties envisioned here for the PID. Also for some automotive applications see P. Hansen "Portable electronics threaten embedded electronics", Automotive Industries Magazine, December 2004. Such a device could also rely heavily on whatever network it had access to when it is connected to a network such as the Internet. It could use the connected network for many processing tasks which exceed the capability of the PID or which require information that is not PID-resident. In a sense, the network can become the computer for these more demanding tasks. Using the Internet as the computer gives the automobile companies more control over the software and permits a pricing model based on use rather than a one time sale. Such a device can be based on microprocessors, FPGAs or programmable logical devices or a combination thereof. This is the first disclosure of vehicular uses of such a device to solve the mismatched lifetimes of the vehicle and its electronic hardware and software as discussed above.

When brought into a vehicle, the PID can connect (either by a wire of wirelessly using Bluetooth, Zigbee or 802.11 protocols, for example) to the vehicle system and make use of resident displays, audio systems, antennas and input devices. In this case, the display can be a heads-up display (HUD) and the input devices can be by audio, manual switches, touchpad, joystick, or cameras as disclosed in section 4 and elsewhere herein.

2.3 Satellite and Wi-Fi Internet

Ultimately vehicles will be connected to the Internet with a high speed connection. Such a connection will still be too slow for vehicle-to-vehicle communications for collision avoidance purposes but it should be adequate for most other vehicle communication purposes. Such a system will probably obsolete current cell phone systems and subscriber systems such as OnStar™. Each user can have a single identification number (which could be his or her phone number) which locates his or her address, phone number, current location etc. The vehicle navigation system can guide the vehicle to the location based on the identification number without the need to input the actual address.

The ubiquitous Internet system could be achieved by a fleet of low earth orbiting satellites (LEOs) or transmission towers transmitting and receiving signals based on one of the 802.11 protocols having a radial range of 50 miles, for example. Thus, approximately 500 such towers could cover the continental United States.

A high speed Internet connection can be used for software upgrade downloading and for map downloading as needed. Each vehicle can become a probe vehicle that locates road defects such as potholes, monitors traffic and monitors weather and road conditions. It can also monitor for terrorist activities such as the release of chemical or biological agents as well as provide photographs of anomalies such as traffic accidents, mud slides or fallen trees across the road, etc., any or all of this information can be automatically fed to the appropriate IP address over the Internet providing for ubiquitous information gathering and dissemination. The same or similar system can be available on other vehicles such as planes, trains, boats, trucks etc.

Today, high speed Internet access is available via GEO satellite to vehicles using the KVH system. It is expected that more and more cities will provide citywide internet services via 802.11 systems including Wi-Fi, Wi-Max and Wi-Mobile or their equivalents. Eventually, it is expected that such systems will be available in rural areas thus making the Internet available nationwide and eventually worldwide through one or a combination of satellite and terrestrial systems. Although the KVH system is based on GEO satellites, it is expected that eventually LEO satellites will offer a similar service at a lower price and requiring a smaller antenna. Such an antenna will probably be based on phase array technology.

3.0 Wiring and Busses

In the discussion above, the diagnostic module of this invention assumes that a vehicle data bus exists which is used by all of the relevant sensors on the vehicle. Most vehicles today do not have a data bus although it is widely believed that most vehicles will have one in the future. In lieu of such a bus, the relevant signals can be transmitted to the diagnostic module through a variety of coupling systems other than through a data bus and this invention is not limited to vehicles having a data bus. For example, the data can be sent wirelessly to the diagnostic module using the Bluetooth™, ZIGBEE or 802.11 or similar specification. In some cases, even the sensors do not have to be wired and can obtain their power via RF from the interrogator as is well known in the RFID radio frequency identification field (either silicon or surface acoustic wave (SAW)-based)). Alternately, an inductive or capacitive power transfer system can be used.

Several technologies have been described above all of which have the objective of improving the reliability and reducing the complexity of the wiring system in an automobile and particularly the safety system. Most importantly, the bus technology described has as its objective simplification and increase in reliability of the vehicle wiring system. The safety system wiring was first conceived of as a method for permitting the location of airbag crash sensors at locations where they can most effectively sense a vehicle crash and yet permit that information to be transmitted to the airbag control circuitry which may be located in a protected portion of the interior of the vehicle or may even be located on the airbag module itself. Protecting this transmission requires a wiring system that is far more reliable and resistant to being destroyed in the very crash that the sensor is sensing. This led to the realization that the data bus that carries the information from the crash sensor must be particularly reliable. Upon designing such a data bus, however, it was found that the capacity of that data bus far exceeded the needs of the crash sensor system. This then led to a realization that the capacity, or bandwidth, of such a bus would be sufficient to carry all of the vehicle information requirements. In some cases, this requires the use of high bandwidth bus technology such as twisted pair wires, shielded twisted pair wires, or coax cable. If a subset of all of the vehicle devices is included on the bus, then the bandwidth requirements are less and simpler bus technologies can be used instead of a coax cable, for example. The economics that accompany a data bus design which has the highest reliability, highest bandwidth, is justified if all of the vehicle devices use the same system. This is where the greatest economies and greatest reliability occur. As described above, this permits, for example, the placement of the airbag firing electronics into or adjacent the housing that contains the airbag inflator. Once the integrity of the data bus is assured, such that it will not be destroyed during the crash itself, then the proper place for the airbag intelligence can be in, or adjacent to, the airbag module itself. This further improves the reliability of the system since the shorting of the wires to the airbag module will not inadvertently set off the airbag as has happened frequently in the past.

When operating on the vehicle data bus, each device should have a unique address. For most situations, therefore, this address must be predetermined and then assigned through an agreed-upon standard for all vehicles. Thus, the left rear tail light must have a unique address so that when the turn signal is turned to flash that light, it does not also flash the right tail light, for example. Similarly, the side impact crash sensor which will operate on the same data bus as the frontal impact crash sensor, must issue a command, directly or indirectly, to the side impact airbag and not to the frontal impact airbag.

One of the key advantages of a single bus system connecting all sensors in the vehicle together is the possibility of using this data bus to diagnose the health of the entire safety system or of the entire vehicle, as described in the detail above. Thus, there are clear synergistic advantages to all the disparate technologies described above.

The design, construction, installation, and maintenance a vehicle data bus network requires attention to many issues, including: an appropriate communication protocol, physical layer transceivers for the selected media, capable microprocessors for application and protocol execution, device controller hardware and software for the required sensors and actuators, etc. Such activities are known to those skilled in the art and will not be described in detail here.

An intelligent distributed system as described above can be based on the CAN Protocol, for example, which is a common protocol used in the automotive industry. CAN is a full function network protocol that provides both message checking and correction to insure communication integrity. Many of the devices on the system will have their own special diagnostics. For instance, an inflator control system can send a warning message if its backup power supply has insufficient charge. In order to assure the integrity and reliability of the bus system, most devices will be equipped with bi-directional communication as described above. Thus, when a message is sent to the rear right taillight to turn on, the light can return a message that it has executed the instruction.

In a refinement of this embodiment, more of the electronics associated with the airbag system can be decentralized and housed within or closely adjacent to each of the airbag modules. Each module can have its own electronic package containing a power supply and diagnostic and sometimes also the occupant sensor electronics. One sensor system is still used to initiate deployment of all airbags associated with the frontal impact. To avoid the noise effects of all airbags deploying at the same time, each module sometimes has its own delay. The modules for the rear seat, for example, can have a several millisecond firing delay compared with the module for the driver and the front passenger module can have a lesser delay. Each of the modules can also have its own occupant position sensor and associated electronics. In this configuration, there is a minimum reliance on the transmission of power and data to and from the vehicle electrical system which is the least reliable part of the airbag system, especially during a crash. Once each of the modules receives a signal from the crash sensor system, it is on its own and no longer needs either power or information from the other parts of the system. The main diagnostics for a module can also reside within the module which transmits either a ready or a fault signal to the main monitoring circuit which now needs only to turn on a warning light, and perhaps record the fault, if any of the modules either fails to transmit a ready signal or sends a fault signal.

Thus, the placement of electronic components in or near the airbag module can be important for safety and reliability reasons. The placement of the occupant sensing as well as the diagnostics electronics within or adjacent to the airbag module has additional advantages to solving several current important airbag problems. For example, there have been numerous inadvertent airbag deployments caused by wires in the system becoming shorted. Then, when the vehicle hits a pothole, which is sufficient to activate an arming sensor or otherwise disturb the sensing system, the airbag can deploy. Such an unwanted deployment of course can directly injure an occupant who is out-of-position or cause an accident resulting in occupant injuries. If the sensor were to send a coded signal to the airbag module rather than a DC voltage with sufficient power to trigger the airbag, and if the airbag module had stored within its electronic circuit sufficient energy to initiate the inflator, then these unwanted deployments could be prevented. A shorted wire cannot send a coded signal and the short can be detected by the module resident diagnostic circuitry.

This would require that the airbag module contain, or have adjacent to it, a power supply (formerly the backup power supply) which further improves the reliability of the system since the electrical connection to the sensor, or to the vehicle power, can now partially fail, as might happen during an accident, and the system will still work properly. It is well known that the electrical resistance in the "clock-spring" connection system, which connects the steering wheel-mounted airbag module to the sensor and diagnostic system, has been marginal in design and prone to failure. The resistance of this electrical connection must be very low or there will not be sufficient power to reliably initiate the inflator squib. To reduce the resistance to the level required, high quality gold-plated connectors are preferably used and the wires should also be of unusually high quality. Due to space constraints, however, these wires frequently have only a marginally adequate resistance thereby reducing the reliability of the driver airbag module and increasing its cost. If, on the other hand, the power to initiate the airbag were already in the module, then only a coded signal needs to be sent to the module rather than sufficient power to initiate the inflator. Thus, the resistance problem disappears and the module reliability is increased. Additionally, the requirements for the clockspring wires become less severe and the design can be relaxed reducing the cost and complexity of the device. It may even be possible to return to the slip ring system that existed prior to the implementation of airbags.

Under this system, the power supply can be charged over a few seconds, since the power does not need to be sent to the module at the time of the required airbag deployment because it is already there. Thus, all of the electronics associated with the airbag system except the sensor and its associated electronics, if any, could be within or adjacent to the airbag module. This includes optionally the occupant sensor, the diagnostics and the (backup) power supply, which now becomes the primary power supply, and the need for a backup disappears. When a fault is detected, a message is sent to a display unit located typically in the instrument panel.

The placement of the main electronics within each module follows the development path that computers themselves have followed from a large centralized mainframe base to a network of microcomputers. The computing power required by an occupant position sensor, airbag system diagnostics and backup power supply can be greater than that required by a single point sensor or of a sensor system employing satellite sensors. For this reason, it can be more logical to put this electronic package within or adjacent to each module. In this manner, the advantages of a centralized single point sensor and diagnostic system fade since most of the intelligence will reside within or adjacent to the individual modules and not the centralized system. A simple and more effective CrushSwitch sensor such as disclosed in U.S. Pat. No. 05,441,301, for example, now becomes more cost effective than the single point sensor and diagnostic system which is now being widely adopted. Finally, this also is consistent with the migration to a bus system where the power and information are transmitted around the vehicle on a single bus system thereby significantly reducing the number of wires and the complexity of the vehicle wiring system. The decision to deploy an airbag is sent to the airbag module sub-system as a signal not as a burst of power. Although it has been assumed that the information would be sent over a wire bus, it is also possible to send the deploy command by a variety of wireless methods either using wires or wirelessly.

A partial implementation of the system as just described is depicted schematically in FIG. 99 which shows a view of the combination of an occupant position sensor and airbag module designed to prevent the deployment of the airbag for a seat which is unoccupied or if the occupant is too close to the airbag and therefore in danger of deployment-induced injury. The module, shown generally at 430, includes a housing which comprises an airbag 431, an inflator assembly 432 for the airbag 431, an occupant position sensor comprising an ultrasonic transmitter 433 and an ultrasonic receiver 434. Other occupant position sensors can also be used instead of the ultrasonic transmitter/receiver pair to determine the position of the occupant to be protected by the airbag 431, and also the occupant position sensor (433,434) may be located outside of the housing of the module 430. A preferred alternative occupant sensor system uses a camera as disclosed in several of the assignee's patents such as U.S. Pat. No. 05,748,473, U.S. Pat. No. 05,835,613, U.S. Pat. No. 06,141,432, U.S. Pat. No. 06,270,116, U.S. Pat. No. 06,324,453 and U.S. Pat. No. 06,856,873. In the ultrasonic example, the housing of the module 430 also can contain an electronic module or package 435 coupled to each of the inflator assembly 432, the transmitter 433 and the receiver 434 and which performs the functions of sending the ultrasonic signal to the transmitter 433 and processing the data from the occupant position sensor receiver 434. Electronics module 435 may be arranged within the housing of the module 430 as shown or adjacent or proximate the housing of the module 430. Module 430 can also contain a power supply (not shown) for supplying power upon command by the electronics module 435 to the inflator assembly 432 to cause inflation of the airbag 431. Thus, electronics module 435 controls the inflation or deployment of the airbag 431 and may sometimes herein be referred to as a controller or control unit. In addition, the electronic module 435 can monitor the power supply voltage, to assure that sufficient energy is stored to initiate the inflator assembly 432 when required, and power the other processes, and can report periodically over the vehicle bus 436 to the central diagnostic module, shown schematically at 437, to indicate that the module is ready, i.e., there is sufficient power of inflate or deploy the airbag 431 and operate the occupant position sensor transmitter/receiver pair 433, 434, or sends a fault code if a failure in any component being monitored has been detected. A CrushSwitch sensor is also shown schematically at 438, which can be the only discriminating sensor in the system. Sensor 438 is coupled to the vehicle bus 436 and can transmit a coded signal over the bus to the electronics module 435 to cause the electronics module 435 to initiate deployment of the airbag 431 via the inflator assembly 432. The vehicle bus 436 connects the electronic package 435, the central sensor and diagnostic module 437 and the CrushSwitch sensor 438. Bus 436 may be the single bus system, i.e., consists of a pair of wires, on which power and information are transmitted around the vehicle as noted immediately above. Instead of CrushSwitch sensor 438, other crash sensors may be used.

When several crash sensors and airbag modules are present in the vehicle, they can all be coupled to the same bus or discrete portions of the airbag modules and crash sensors can be coupled to separate buses. Other ways for connecting the crash sensors and airbag modules to an electrical bus can also be implemented in accordance with the invention such as connecting some of the sensors and/or modules in parallel to a bus and others daisy-chained onto the bus. This type of bus architecture is described in U.S. Pat. No. 06,212,457.

It should be understood that airbag module 430 is a schematic representation only and thus, may represent any of the airbag modules described above in any of the mounting locations. For example, airbag module 430 may be arranged in connection with the seat 525 as module 510 is in FIG. 100, as a side curtain airbag or as a passenger side airbag or elsewhere. For the seat example, the bus, which is connected to the airbag module 510, would inherently extend at least partially into and within the seat.

Another implementation of the invention incorporating the electronic components into and adjacent to the airbag module as illustrated in FIG. 101 which shows the interior front of the passenger compartment generally at 445. Driver airbag module 446 is partially cutaway to show an electronic module 447 incorporated within the airbag module 446. Electronic module 447 may be comparable to electronic module 435 in the embodiment of FIG. 99 in that it can control the deployment of the airbag in airbag module 446. Electronic airbag module 446 is connected to an electronic sensor illustrated generally as 451 by a wire 448. The electronic sensor 451 can be, for example, an electronic single point crash sensor that initiates the deployment of the airbag when it senses a crash. Passenger airbag module 450 is illustrated with its associated electronic module 452 outside of but adjacent or proximate to the airbag module. Electronic module 452 may be comparable to electronic module 439 in the embodiment of FIG. 99 in that it can control the deployment of the airbag in airbag module 450. Electronic module 452 is connected by a wire 449, which could also be part of a bus, to the electronic sensor 451. One or both of the electronic modules 447 and 452 can contain diagnostic circuitry, power storage capability (either a battery or a capacitor), occupant sensing circuitry, as well as communication electronic circuitry for either wired or wireless communication.

It should be understood that although only two airbag modules 446,450 are shown, it is envisioned that an automotive safety network may be designed with several and/or different types of occupant protection devices. Such an automotive network can comprise one or more occupant protection devices connected to the bus, each comprising a housing and a component deployable to provide protection for the occupant, at least one sensor system for providing an output signal relevant to deployment of the deployable component(s) (such as the occupant sensing circuitry), a deployment determining system for generating a signal indicating for which of the deployable components deployment is desired (such as a crash sensor) and an electronic controller arranged in, proximate or adjacent each housing and coupled to the sensor system(s) and the deployment determining system. The electrical bus electrically couples the sensor system(s), the deployment determining system and the controllers so that the signals from one or more of the sensor systems and the deployment determining system are sent over the bus to the controllers. Each controller controls deployment of the deployable component of the respective occupant protection device in consideration of the signals from the sensor system(s) and the deployment determining system. The crash sensor(s) may be arranged separate and at a location apart from the housings and generate a coded signal when deployment of any one of the deployable components is desired. Thus, the coded signal varies depending on which of deployment components are to be deployed. If the deployable component is an airbag associated with the housing, the occupant protection device would comprise an inflator assembly arranged in the housing for inflating the airbag.

The safety bus, or any other vehicle bus, may use a coaxial cable. A connector for joining two coaxial cables 457 and 458 is illustrated in FIGS. 102A, 102B, 102C and 102D generally at 455. A cover 456 can be hingably attached to a base 459. A connector plate 461 can be slidably inserted into base 459 and can contain two abrasion and connection sections 463 and 464. A second connecting plate 465 can contain two connecting pins 462, one corresponding to each cable to be connected. To connect the two cables 457 and 458 together is this implementation, they are first inserted into their respective holes 466 and 467 in base 459 until they are engaged by pins 462. Sliding connector plate 461 is then inserted and cover 460 rotated pushing connector plate 461 downward until the catch 468 snaps over mating catch 469. Other latching devices are of course usable in accordance with the invention. During this process, the serrated part 463 of connector plate 461 abrades the insulating cover off of the outside of the respective cable exposing the outer conductor. The particle coated section 464 of connector plate 461 then engages and makes electrical contact with the outer conductor of the coaxial cables 457 and 458. In this manner, the two coaxial cables 457,458 are electrically connected together in a very simple manner.

Consider now various uses of a bus system.

3.1 Airbag Systems

The airbag system currently involves a large number of wires that carry information and power to and from the airbag central processing unit. Some vehicles have sensors mounted in the front of the vehicle and many vehicles also have sensors mounted in the side structure (the door, B-Pillar, sill, or any other location that is rigidly connected to the side crush zone of the vehicle). In addition, there are sensors and an electronic control module mounted in the passenger compartment. All cars now have passenger and driver airbags and some vehicles have as many as eight airbags considering the side impact torso airbag and head airbags as well as knee bolster airbags.

To partially cope with this problem, there is a movement to connect all of the safety systems onto a single bus (see for example U.S. Pat. No. 06,326,704). Once again, the biggest problem with the reliability of airbag systems is the wiring and connectors. By practicing the teachings of this invention, one single pair of wires can be used to connect all of the airbag sensors and airbags together and, in one preferred implementation, to do so without the use of connectors. Thus, the reliability of the system is substantially improved and the reduced installation costs more than offsets the added cost of having a loosely coupled inductive network, for example, described elsewhere herein.

With such a system, more and more of the airbag electronics can reside within or adjacent to the airbag module with the crash sensor and occupant information fed to the electronics modules for the deploy decision. Thus, all of the relevant information can reside on the vehicle safety or general bus with each airbag module making its own deploy decision locally.

3.2 Steering Wheel

The steering wheel of an automobile is becoming more complex as more functions are incorporated utilizing switches and/or a touch pad, for example, on the steering wheel or other haptic or non-haptic input or even output devices. Many vehicles have controls for heating and air conditioning, cruise control, radio, etc.

Although previously not implemented, a steering can also be an output device by causing various locations on the steering wheel to provide a vibration, electrical shock or other output to the driver. This is in contrast to vibrating the entire steering wheel which has been proposed for an artificial rumble strip application when a vehicle departs from its lane. Such a local feedback can be used to identify for the driver which button he or she should press to complete an action such as dialing a phone number, for example (see H Kajimoto et al., "SmartTouch: Electric Skin to Touch the Untouchable" IEEE Computer Graphics and Applications, pp 36–43, January–February, 2004, IEEE).

Additionally, the airbag must have a very high quality connection so that it reliably deploys even when an accident is underway.

This has resulted in the use of clockspring ribbon cables that make all of the electrical connections between the vehicle and the rotating steering wheel. The ribbon cable must at least able to carry sufficient current to reliably initiate airbag deployment even at very cold temperatures. This requires that the ribbon cable contain at least two heavy conductors to bring power to the airbag. Under the airbag network concept, a capacitor or battery can be used within the airbag module and kept charged thereby significantly reducing the amount of current that must pass through the ribbon cable. Thus, the ribbon cable can be kept considerably smaller, as discussed above.

An alternate and preferred solution uses the teachings of this invention to inductively couple the steering wheel with the vehicle thus eliminating all wires and connectors. All of the switch functions, control functions, and airbag functions are multiplexed on top of the inductive carrier frequency. This greatly simplifies the initial installation of the steering wheel onto the vehicle since a complicated ribbon cable is no longer necessary. Similarly, it reduces warranty repairs caused by people changing steering wheels without making sure that the ribbon cable is properly positioned.

As described elsewhere herein, an input device such as a mouse pad, joy stick or even one or more switches can be placed on the steering wheel and used to control a display such as a heads-up display thus permitting the vehicle operator to control many functions of a vehicle without taking his or her eyes off of the road. BMW recently introduced the IPOD haptic interface which attempts to permit the driver to control many vehicle functions (HVAC, etc.) but it lacks the display feedback and thus has been found confusing to vehicle operators. This problem disappears when such a device is coupled with a display and particularly a heads-up display as taught herein. Although a preferred location for the input device is the steering wheel, it can be placed at other locations in the vehicle as is the IPOD.

The use of a haptic device can be extended to give feedback to the operator. If the phone rings, for example, a particular portion of the steering wheel can be made to vibrate indicating where the operator should depress a switch to answer the phone. The display can also indicate to the driver that the phone is ringing and perhaps indicate to him or her the location of the switch or that a oral command should be given to answer the phone.

As one example of the implementation of this concept consider the following description used in conjunction with FIGS. 170–171. FIG. 170A is a front view of a steering wheel having two generalized switches located at 3 and 9 o'clock on the steering wheel rim. FIG. 170B is a view similar to FIG. 170A with the addition of a thumb switch option and FIG. 170C is a rear view of the steering wheel of FIG. 170B with a finger trigger option.

Starting with the assumptions that:

The driver should be able to control various systems in the automobile without looking away from the road The driver should be able to control these systems without taking his/her hands away from the steering wheel All system control interfaces fundamentally will be menu-driven Some sort of cursor on a heads-up or other easily visible display coupled with a mouse pad or joystick, as discussed below, might be distracting, it would be better to simply highlight and select from menu options.

Menus can easily be traversed with three buttons, one to move the selection up, one to move it down, and one to select. Since the driver should keep his/her hands on the steering wheel at all times, these buttons, 801, 802 and 803 should be placed so they can be accessed at the standard 3 o'clock and 9 o'clock hand positions.

Buttons could be placed on the front of the steering wheel such that the driver's thumbs can press them, or probably better, buttons could be placed on the rear of the steering wheel such that fingers could use them as triggers.

To prevent accidental menu launch (which could be distracting), all three buttons, 801, 802, and 803 could be pressed simultaneously to summon the menu on the heads-up display, or some similar scheme could be devised. If the driver presses on the brakes or makes a fast turn as an evasive maneuver, the menu can be designed to disappear so that the driver is not distracted when driving requires his/her attention.

In both FIG. 170 and FIG. 171, the two button cluster, 801, 803 (accessed by the left hand in the images, but side does not matter) can be, for example, menu option up and menu option down. The single button can be menu option select.

A press-knob could also be a good solution, but it has the disadvantage that it can't be placed in the optimal steering wheel driving position (3 or 9). This concept is likely similar to the IPOD input device now found on some BMW's, namely, a rotary knob that when turned highlights different menu options and when pressed selects the currently highlighted option. An advantage to this is that it is a better interface for temperature and volume controls in the car since it can be simply turned to adjust the parameter rather than pressed repeatedly, or pressed and held down as switches would be. This continuously varying function can also be achieved with a scroll wheel. FIG. 171 illustrates the addition of a mouse type scroll wheel 805 for the left hand.

Another solution would be a partial combination of the two. The menu item select function could be implemented as a wheel 805, similar to the scroll wheel on modern computer mice. Option select could be implemented with a wheel press or with a separate switch. The menu select wheel would be thumb-accessible, and a select switch could be a finger trigger switch.

All of the steering wheel mounted switched discussed above and below can be wireless and powerless devices such as those discussed herein based of RFID and SAW technologies.

3.3 Door Subsystem

More and more electrical functions are also being placed into vehicle doors. This includes window control switches and motors as well as seat control switches, airbag crash sensors, etc. As a result the bundle of wires that must pass through the door edge and through the A-pillar has become a serious assembly and maintenance problem in the automotive industry. Using the teachings of this invention, a loosely coupled inductive system could pass anywhere near the door and an inductive pickup system placed on the other side where it obtains power and exchanges information when the mating surfaces are aligned. If these surfaces are placed in the A-pillar, then sufficient power can be available even when the door is open. Alternately, a battery or capacitive storage system can be provided in the door and the coupling can exist through the doorsill, for example. This eliminates the need for wires to pass through the door interface and greatly simplifies the assembly and installation of doors. It also greatly reduces warranty repairs caused by the constant movement of wires at the door and car body interface.

3.4 Blind Spot Monitor

Many accidents are caused by a driver executing a lane change when there is another vehicle in his blind spot. As a result, several firms are developing blind spot monitors based on radar, optics, or passive infrared, to detect the presence of a vehicle in the driver's blind spot and to warn the driver should he attempt such a lane change. These blind spot monitors are typically placed on the outside of the vehicle near or on the side rear view mirrors. Since the device is exposed to rain, salt, snow etc., there is a reliability problem resulting from the need to seal the sensor and to permit wires to enter the sensor and also the vehicle. Special wire, for example, should be used to prevent water from wicking through the wire. These problems as well as similar problems associated with other devices which require electric power and which are exposed to the environment, such as forward-mounted airbag crash sensors, can be solved utilizing an inductive coupling techniques of this invention.

3.5 Truck-to-Trailer Power and Information Transfer

A serious source of safety and reliability problems results from the flexible wire connections that are necessary between a truck and a trailer. The need for these flexible wire connections and their associated connector problems can be eliminated using the inductive coupling techniques of this invention. In this case, the mere attachment of the trailer to the tractor automatically aligns an inductive pickup device on the trailer with the power lines imbedded in the fifth wheel, for example.

3.6 Wireless Switches

Switches in general do not consume power and therefore they can be implemented wirelessly according to the teachings of this invention in many different modes. For a simple on-off switch, a one bit RFID tag similar to what is commonly used for protecting against shoplifting in stores with a slight modification can be easily implemented. The RFID tag switch would contain its address and a single accessible bit permitting the device to be interrogated regardless of its location in the vehicle without wires. A SAW-based switch as disclosed elsewhere herein can also be used and interrogated wirelessly.

As the switch function becomes more complicated, additional power may be required and the options for interrogation become more limited. For a continuously varying switch, for example the volume control on a radio, it may be desirable to use a more complicated design where an inductive transfer of information is utilized. On the other hand, by using momentary contact switches that would set the one bit on only while the switch is activated and by using the duration of activation, volume control type functions can still be performed even though the switch is remote from the interrogator.

This concept then permits the placement of switches at arbitrary locations anywhere in the vehicle without regard to the placement of wires. Additionally, multiple switches can be easily used to control the same device or a single switch can control many devices.

For example, a switch to control the forward and rearward motion of the driver seat can be placed on the driver door-mounted armrest and interrogated by an RFID reader or SAW interrogator located in the headliner of the vehicle. The interrogator periodically monitors all RFID or SAW switches located in the vehicle which may number over 100. If the driver armrest switch is depressed and the switch bit is changed from 0 to 1, the reader knows based on the address or identification number of the switch that the driver intends to operate his seat in a forward or reverse manner. A signal can then be sent over the inductive power transfer line to the motor controlling the seat and the motor can thus be commanded to move the seat either forward based on one switch ID or backward based on another switch ID. Thus, the switch in the armrest could actually contain two identification RFIDs or SAW switches, one for forward movement of seat and one for rearward movement of the seat. As soon the driver ceases operating the switch, the switch state returns to 0 and a command is sent to the motor to stop moving the seat. The RFID or SAW device can be passive or active.

By this process as taught by this invention, all of the 100 or so switches and other simple sensors can become wireless devices and vastly reduce the number of wires in a vehicle and increase the reliability and reduce warranty repairs. One such example is the switch that determines whether the seatbelt is fastened which can now be a wireless switch.

3.7 Wireless Lights

In contrast to switches, lights require power. The power required generally exceeds that which can be easily transmitted by RF or capacitive coupling. For lights to become wireless, therefore, inductive coupling or equivalent can be required. Now, however, it is no longer necessary to have light sockets, wires and connectors. Each light bulb could be outfitted with an inductive pickup device and a microprocessor. The microprocessor can listen to the information coming over the inductive pickup line, or wirelessly, and when it recognizes its address, it activates an internal switch which turns on the light. If the information is transferred wirelessly, the RFID switch described in section 1.4.4 above can be used. The light bulb becomes a totally sealed, self-contained unit with no electrical connectors or connections to the vehicle. It is automatically connected by mounting in a holder and by its proximity, which can be as far away as several inches, to the inductive power line. It has been demonstrated that power transfer efficiencies of up to about 99 percent can be achieved by this system and power levels exceeding about 1 kW can be transferred to a device using a loosely coupled inductive system described above.

This invention therefore considerably simplifies the mounting of lights in a vehicle since the lights are totally self-contained and not plugged into the vehicle power system. Problems associated with sealing the light socket from the environment disappear vastly simplifying the installation of headlights, for example, into the vehicle. The skin of the vehicle need not contain any receptacles for a light plug and therefore there is no need to seal the light bulb edges to prevent water from entering behind the light bulb. Thus, the reliability of vehicle exterior lighting systems is significantly improved. Similarly, the ease with which light bulbs can be changed when they burn out is greatly simplified since the complicated mechanisms for sealing the light bulb into the vehicle are no longer necessary. Although headlights were discussed, the same principles apply to all other lights mounted on a vehicle exterior.

Since it is contemplated that the main power transfer wire pair will travel throughout the automobile in a single branched loop, several light bulbs can be inductively attached to the inductive wire power supplier by merely locating a holder for the sealed light bulb within a few inches of the wire. Once again, no electrical connections are required.

Consider for example the activation of the right turn signal. The microprocessor associated with the turn switch on the steering column is programmed to transmit the addresses of the right front and rear turn light bulbs to turn them on. A fraction of a second later, the microprocessor sends a signal over the inductive power transfer line, or wirelessly, to turn the light bulbs off. This is repeated for as long as the turn signal switch is placed in the activation position for a right turn. The right rear turn signal light bulb receives a message with its address and a bit set for the light to be turned on and it responds by so doing and similarly, when the signal is received for turning the light off. Once again, all such transmissions occur over a single power and information inductive line and no wire connections are made to the light bulb. In this example, all power and information is transferred inductively.

3.8 Keyless Entry

The RFID technology is particularly applicable to keyless entry. Instead of depressing a button on a remote vehicle door opener, the owner of vehicle need only carry an RFID card in his pocket. Upon approaching the vehicle door, the reader located in the vehicle door, activates the circuitry in the RFID card and receives the identification number, checks it and unlocks the vehicle if the code matches. It can even open the door or trunk based on the time that the driver stands near the door or trunk. Simultaneously, the vehicle now knows that this is driver No. 3, for example, and automatically sets the seat position, headrest position, mirror position, radio stations, temperature controls and all other driver specific functions including the positions of the petals to adapt the vehicle to the particular driver. When the driver sits in the seat, no ignition key is necessary and by merely depressing a switch which can be located anywhere in the vehicle, on the armrest for example, the vehicle motor starts. The switch can be wireless and the reader or interrogator which initially read the operator's card can be connected inductively to the vehicle power system.

U.S. Pat. No. 05,790,043 describes the unlocking of a door based on a transponder held by a person approaching the door. By adding the function of measuring the distance to the person, by use of the backscatter from the transponder antenna for example, the distance from the vehicle-based transmitter and the person can be determined and the door opened when the person is within 5 feet, for example, of the door as discussed elsewhere herein.

Using the RFID switch discussed above, for example, the integration of the keyless entry system with the tire monitor and all other similar devices can be readily achieved.

3.9 In-vehicle Mesh Network, Intra-Vehicle Communications

The use of wireless networks within a vehicle has been discussed elsewhere herein. Of particular interest here is the use of a mesh network (or mesh) wherein the various wireless elements are connected via a mesh such that each device can communicate with each other to thereby add information that might aid a particular node. In the simplest case, nodes on the mesh can merely aid in the transfer of information to a central controller. In more advanced cases, the temperature monitored by one node can be used by other nodes to compensate for the effects of temperature on the node operation. In another case, the fact that a node has been damaged or is experiencing acceleration can be used to determine the extent of and to forecast the severity of an accident. Such a mesh network can operate in the discrete frequency or in the ultra wideband mode.

3.10 Road Conditioning Sensing—Black Ice Warning

A frequent cause of accidents is the sudden freezing of roadways or bridge surfaces when the roadway is wet and temperatures are near freezing. Sensors exist that can detect the temperature of the road surface within less than one degree either by direct measurement or by passive IR. These sensors can be mounted in locations on the vehicle where they have a clear view of the road and thus they are susceptible to assault from rain, snow, ice, salt etc. The reliability of connecting these sensors into the vehicle power and information system is thus compromised. Using the teachings of this invention, black ice warning sensors, for example, can be mounted on the exterior of the vehicle and coupled into the vehicle power and information system inductively, thus removing a significant cause of failure of such sensors. Also the use of appropriate cameras and sensors along with multispectral analysis of road surfaces can be particularly useful to discover icing.

Similar sensors can also used to detect the type of roadway on which the car is traveling. Gravel roads, for example, have typically a lower effective coefficient of friction than do concrete roads. Knowledge of the road characteristics can provide useful information to the vehicle control system and, for example, warn the driver when the speed driven is above what is safe for the road conditions, including the particular type of roadway.

3.11 Antennas Including Steerable Antennas

As discussed above, the antennas used in the systems disclosed herein can contribute significantly to the operation of the systems. In one case, a silicon or gallium arsenide (for higher frequencies) element can be placed at an antenna to process the returned signal as needed. High gain antennas such as the yagi antenna or steerable antennas such as electronically controllable (or tunable) dielectric constant phased array antennas are also contemplated. For steerable antennas, reference is made to U.S. Pat. No. 06,452,565 "Steerable-beam multiple-feed dielectric resonator antenna". Also contemplated, in addition to those discussed above, are variable slot antennas and Rotman lenses. All of these plus other technologies go under the heading of smart antennas and all such antennas are contemplated herein.

The antenna situation can be improved as the frequency increases. Currently, SAW devices are difficult to make that operate much above about 2.4 GHz. It is expected that as lithography systems improve that eventually these devices will be made to operate in the higher GHz range permitting the use of antennas that are even more directional.

3.12 Other Miscellaneous Sensors

Many new sensors are now being adapted to an automobile to increase the safety, comfort and convenience of vehicle occupants. Each of the sensors currently requires separate wiring for power and information transfer. Under the teachings of this invention, these separate wires can become unnecessary and sensors could be added at will to the automobile at any location within a few inches of the inductive power line system or, in some cases, within range of an RF interrogator. Even sensors that were not contemplated by the vehicle manufacturer can be added later with a software change to the appropriate vehicle CPU as discussed above.

Such sensors include heat load sensors that measure the sunlight coming in through the windshield and adjust the environmental conditions inside the vehicle or darken the windshield to compensate. Seatbelt sensors that indicate that the seatbelt is buckled and the tension or acceleration experienced by the seatbelt can now also use RFID and/or SAW technology as can low power microphones. Door-open or door-ajar sensors also can use the RFID and/or SAW technology and would not need to be placed near an inductive power line. Gas tank fuel level and other fluid level sensors which do not require external power and are now possible thus eliminating any hazard of sparks igniting the fuel in the case of a rear impact accident which ruptures the fuel tank, for example.

Capacitive proximity sensors that measure the presence of a life form within a few meters of the automobile can be coupled wirelessly to the vehicle. Cameras or other vision or radar or lidar sensors that can be mounted external to the vehicle and not require unreliable electrical connections to the vehicle power system permitting such sensors to be totally sealed from the environment are also now possible. Such sensors can be based on millimeter wave radar, passive or active infrared, or optical or any other portion of the electromagnetic spectrum that is suitable for the task. Radar, passive sound or ultrasonic backup sensors or rear impact anticipatory sensors also are now feasible with significantly greater reliability.

The use of passive audio requires additional discussion. One or more directional microphones aimed from the rear of the vehicle can determine from tire-produced audio signals, for example, that a vehicle is approaching and might impact the target vehicle which contains the system. The target vehicle's tires as well as those to the side of the target vehicle will also produce sounds which need to be cancelled out of the sound from the directional microphones using well-known noise cancellation techniques. By monitoring the intensity of the sound in comparison with the intensity of the sound from the target vehicle's own tires, a determination of the approximate distance between the two vehicles can be made. Finally, a measurement of the rate of change in sound intensity can be used to estimate the time to collision. This information can then be used to pre-position the headrest, for example, or other restraint device to prepare the occupants of the target vehicle for the rear end impact and thus reduce the injuries therefrom. A similar system can be used to forecast impacts from other directions. In some cases, the microphones will need to be protected in a manner so as to reduce noise from the wind such as with a foam protection layer. This system provides a very inexpensive anticipatory crash system.

Previously, the use of radio frequency to interrogate an RFID tag has been discussed. Other forms of electromagnetic radiation are possible. For example, an infrared source can illuminate an area inside the vehicle and a pin diode or CMOS camera can receive reflections from corner cube or dihedral corner (as more fully descried below) reflectors located on objects that move within the vehicle. These objects would include items such as the seat, seatback, and headrest. Through this technique, the time of flight, by pulse or phase lock loop technologies, can be measured or modulated IR radiation and phase measurements can be used to determine the distance to each of the corner cube or dihedral corner reflectors.

The above discussion has concentrated on applications primarily inside of the vehicle (although mention is often made of exterior monitoring applications). There are also a significant number of applications concerning the interaction of a vehicle with its environment. Although this might be construed as a deviation from the primary premise of this invention, which is that the device is either powerless in the sense that no power is required other than perhaps that which can be obtained from a radio frequency signal or a powered device and where the power is obtained through induction coupling, it is encompassed within the invention.

When looking exterior to the vehicle, devices that interact with the vehicle may be located sufficiently far away that they will require power and that power cannot be obtained from the automobile. In the discussion below, two types of such devices will be considered, the first type which does not require infrastructure-supplied power and the second which does.

A rule of thumb is that an RFID tag of normal size that is located more than about a meter away from the reader or interrogator must have an internal power source. Exceptions to this involve cases where the only information that is transferred is due to the reflection off of a radar reflector-type device and for cases where the tag is physically larger. For those cases, a purely passive RFID can be five and sometimes more meters away from the interrogator. Nevertheless, we shall assume that if the device is more than a few meters away that the device must contain some kind of power supply.

An interesting application is a low-cost form of adaptive cruise control or forward collision avoidance system. In this case, a purely passive RFID tag could be placed on every rear license plate in a particular geographical area, such as a state. The subject vehicle would contain two readers, one on the forward left side of the vehicle and one on the forward right side. Upon approaching the rear of a car having the RFID license plate, the interrogators in the vehicle would be able to determine the distance, by way of reflected signal time of flight, from each reader to the license plate transducer. If the license plate RFID is passive, then the range is limited to about 5 meters depending on the size of the tag. Nevertheless, this will be sufficient to determine that there is a vehicle in front of or to the right or left side of the subject vehicle. If the relative velocity of the two vehicles is such that a collision will occur, the subject vehicle can automatically have its speed altered so as to prevent the collision, typically a rear end collision. Alternately, the front of the vehicle can have two spaced-apart tags in which case, a single interrogator could suffice.

The following explanation is from Prof G. Khlopov of the *Institute of RadioPhysics and Electronics of National Academy of Science of Ukraine.*

General

The dihedral corner reflector is widely used as a standard target for calibration of radar. Such reflector consists of two planes by dimensions a×b that cross at right angles as shown in FIGS. 178 and 178A.

In the general case, the properties of such a target are described by scattering pattern power (angle dependence of power reflected), value of radar cross section (RCS), which determines its radar visibility and dependence of RCS on polarization of the incident wave.

Scattering power pattern

In the azimuth plane the RCS for horizontal $-\sigma_{xx}(\phi)$ and vertical $\sigma_{yy}(\phi)$ polarizations is determined by the expression (1), which is valid for a quite large reflector in comparison with the radar wavelength a>>λ

$$\sigma_{xx}(\varphi)=\sigma_{yy}(\varphi)=2\sigma_m\left|\cos\left(\frac{\pi}{4}+|\varphi|\right)-\frac{1}{2}\cos\left(\frac{\pi}{4}+\varphi^2\right)\frac{\sin\left[ka\sin\left(\frac{\pi}{4}-|\varphi|\right)\right]}{ka\sin\left(\frac{\pi}{4}-|\varphi|\right)}\times e^{-j\frac{ka}{2}\cos\left(\frac{\pi}{4}+|\varphi|\right)}\right|^2, \tag{1}$$

where ϕis the azimuth angle $$\left(-\frac{\pi}{4}\le\varphi\le\frac{\pi}{4}\right),\ \sigma_m=8\pi\left(\frac{ab}{\lambda}\right)^2$$

—value of RCS in the boresight of scattering pattern (ϕ=0)

$$k=\frac{2\pi}{\lambda}$$

—wave number. For example, the scattering pattern is shown for a=6.4λ in FIG. 179, which slightly depends on value of a/λ

As shown, the scattering pattern is approximately of 30 degrees width at level −3 dB (independently of value a/λ for a≧2) and has two side lobes at −3 dB level.

In the vertical plane (along Y axis), the scattering pattern is determined by the expression $$\sigma_{xx}(\theta)=\sigma_{yy}(\theta)=8\pi\left(\frac{ab}{\lambda}\right)^2\left[\frac{\sin[kb\sin\theta]}{kb\sin\theta}\right]^2, \tag{2}$$

where θ— elevation angle.

The shape of scattering pattern in the vertical plane is presented in FIG. 180 and its width is approximately $$25\frac{\lambda}{b}$$

degrees at level −3 dB.

Radar cross section

The RCS of dihedral corner reflector in boresight of scattering pattern power (θ=ϕ=0) is described by the formulas when its dimensions are more than radar wavelength a,b≧λ. When the incidence field is polarized in the principal planes (horizontal and vertical planes), the RCS is determined by the expression $$\sigma_{xx}(\theta) = \sigma_{yy}(\theta) = 8\pi\left(\frac{ab}{\lambda}\right)^2 \tag{3}$$

Polarization properties.

When the plane of polarization of incidence field does not coincide with the principal planes of dihedral corner and is inclined at the angle α—FIG. 181, then reflector scattered the incident field also at the orthogonal polarization. In other words the total power reflected can be represented as the sum of two components—vertical and horizontal, according to the following expression (for θ=0)

$$\sigma_{Ver}(\alpha, \varphi) = 2\sigma_m \cos^2 2\alpha \cdot \cos^2\left(\frac{\pi}{4} + |\varphi|\right), \tag{4}$$

$$\sigma_{Hor}(\alpha, \varphi) = 2\sigma_m \sin^2 2\alpha \cdot \cos^2\left(\frac{\pi}{4} + |\varphi|\right).$$

For this reason, the total vector of the reflected field is linear polarized and its plane is rotated on angle β=2α relatively to the principal plane of dihedral corner—FIG. 181.

This property is widely used in microwave devices for rotating of linear polarization on angle 90 deg, when the plane of polarization of incidence field is oriented at 45 deg. to the principal plane of the corner—FIG. 182.

Nevertheless, it is not only the possibility of polarization angles that are produced. There are no limits on the rotation angle and, for example, it is possible to obtain the rotation angle β=±45 deg when the angle α is equal to ±22,5 deg.

Application of Dihedral Corner Reflector in Development of Radar Precise Positioning System of Vehicles In the project "Radar development for Precise Positioning System of Vehicles" developed jointly with Orion Company (Kiev, Ukraine) in the interests of the current assignee, the principal problem is to select signals, scattered from corner reflectors S1 and S2 (FIG. 182), which are located along the road in a special way. Actually, such signals usually are masked by clutter from terrain because any objects may appear within the radar beam (buildings, constructions, trees etc.).

The simplest way to solve the problem is to provide a large signal-to-clutter ratio that is quite hard in the case under consideration. As the research shows, most anthropogenic objects (buildings, constructions etc.) are of spatial distributed type, their dimensions are essentially larger than the diameter of the radar beam and its RCS in millimeter wave band is about tens of $m^2$. The RCS of traditional trihedral corner reflector is equal to $$\sigma_0 = \frac{4\pi\alpha^4}{3\lambda^2}$$

(α—size of the edge, λ—wavelength) and it is practically impossible to provide values of RCS more than 50–100 $m^2$ in 4 mm millimeter wavelengths because of the following reasons:

- the necessary dimensions of corner reflector are quite large≈200×200×200 mm;
- the necessary accuracy of producing is too high—angle between the corner edges must be equal 90±0.1 deg.

That's why the application of usual trihedral corner reflectors cannot stand out over the background of the clutter. On the other hand, the application of dihedral angle reflector can provide an effective polarization selection of such reflector on the background of clutter from terrain.

As is well known for composite targets, including anthropogenic objects (buildings, constructions, background clutters etc.), the main reflected power is concentrated on co-polarized component, i.e. plane of polarization of which is coincident with the polarization of incident wave. For this reason, it is possible to decrease their influence if the reflector provides rotation of polarization plane of scattered field at 90 degrees. In that case the radar receiver also must be turned on reception of cross-polarized component that provides significant decreasing of clutter power.

Such a property may be provided by using a dihedral corner reflector, which is oriented at 45 degrees relative to the plane of polarization of the incident field—FIG. 183.

When the incident field $E_{in}$ is transformed to the orthogonal polarized reflected field—$E_S$, on which the RCS of composite targets usually does not exceed 0.01–0.015 $m^2$.

Therefore, the dihedral corner reflector enables the signal-to-clutter ratio more than 10 dB (a=30 mm, b=90 mm) and this is enough to provide reliable selection of signals from the reflectors on the clutter background. As a result, the reception of reflected signals on cross-polarized component also provides high isolation between transmitter and receiver that improves signal-to-noise ratio for CW FM radar.

This leads to a novel addition or substitution to putting an RFID tag onto a license plate is to emboss the license plate or otherwise attach to it or elsewhere on the vehicle a corner cube or dihedral corner reflector which can yield a bright reflection from a radar or ladar (laser radar) transmitter from a following vehicle, for example. Further, the reflector can be designed to rotate the polarization of a beam by 90 degrees, thus the potential problem of the receiver being blinded by another vehicle's system is reduced. Additionally, a reflector can be designed as described above to reflect a polarized beam from a non-polarized beam or better to rotate a polarized beam through an arbitrary angle. In this manner, some information about the vehicle such as its mass class can be conveyed to the interrogating vehicle. A polarization on only 0 degrees can signify a passenger car, only 90 degrees an SUV or other large passenger vehicle or pickup truck, 45 degrees a small truck, both 0 and 45 degrees (using two reflectors) a larger truck, 45 and 90 degrees a larger truck etc. yielding 7 or more classifications. Thus using a very low cost reflector, a great deal of information can be conveyed including the range to the vehicle based on time-of-flight or phase angle comparison if the transmitted beam is modulated. Noise or pseudo-noise modulated radar would also be applicable as a modulation based system for distance measurement.

Additions to an RFID-based system that can be used alone or along with the reflector system discussed above include the addition of an energy harvesting system such as solar power or power from vibrations. Thus the tag can start out as a pure passive tag providing up to about 10 meters range and grow to an active tag providing a 30 or more meter range. With the use of RFID, a great deal of additional information can be transmitted such as the vehicle weight, license plate number, tolling ID etc. Once a tire pressure interrogator as discussed above is on the vehicle, the cost to add one or more license plate interrogating antennas is small and the cost addition to a license plate can be as low as 1–5 US dollars. Since no electrical connection need be made to the vehicle, the installation cost is no more than for an ordinary license plate.

An alternate approach is to visually scan license plates using an imager such as a camera. An infrared imager and a source of infrared illumination can be used. Using such a system, the characters (numbers and letters) can be read and if the license plate-issuing authority has coded the properties (type of vehicle, weight, etc.) into these characters, a vehicle can identify those properties of a vehicle that it may soon impact and that information can be a factor in the vehicle control algorithm or restraint deployment decision.

Systems are under development that will permit an automobile to determine its absolute location on the surface of the earth. These systems are being developed in conjunction with intelligent transportation systems. Such location systems are frequently based on differential GPS (DGPS). One problem with such systems is that the appropriate number of GPS satellites is not always within view of the automobile. For such cases, it is necessary to have an earth-based system which will provide the information to the vehicle permitting it to absolutely locate itself within a few centimeters. One such system can involve the use of RFID tags placed above, adjacent or below the surface of the highway.

For the cases where the RFID tags are located more than a few meters from the vehicle, a battery or other poser source will probably be required and this will be discussed below. For the systems without batteries, such as placing the RFID tag in the concrete, with two readers located one on each side of the vehicle, the location of the tag embedded in the concrete can be precisely determine based on the time of flight of the radar pulse from the readers to the tag and back. Using this method, the precise location of the vehicle relative to a tag within a few centimeters can be readily determined and since the position of the tag will be absolutely known by virtue of an in-vehicle resident digital map, the position of the vehicle can be absolutely determined regardless of where the vehicle is. For example, if the vehicle is in a tunnel, then it will know precisely its location from the RFID pavement embedded tags. Note that the polarization rotation reflector discussed above will also perform this task excellently.

It is also possible to determine the relative velocity of the vehicle relative to the RFID tag or reflector using the Doppler Effect based on the reflected signals. For tags located on license plates or elsewhere on the rear of vehicles, the closing velocity of the two vehicles can be determined and for tags located in or adjacent to the highway pavement, the velocity of the vehicle can be readily determined. The velocity can in both cases be determined based on differentiating two distance measurements.

In many cases, it may be necessary to provide power to the RFID tag since the distance to the vehicle will exceed a few meters. This is currently being used in reverse for automatic tolling situations where the RFID tag is located on the vehicle and interrogated using readers located at the toll both.

When the RFID tag to be interrogated by vehicle-mounted readers is more than a few meters from the vehicle, the tag in many cases must be supplied with power. This power can come from a variety of sources including a battery which is part of the device, direct electrical connections to a ground wire system, solar batteries, generators that generate power from vehicle or component vibration, other forms of energy harvesting or inductive energy transfer from a power line.

For example, if an RFID tag were to be placed on a light post in downtown Manhattan, sufficient energy could be obtained from an inductive pickup from the wires used to power the light to recharge a battery in the RFID. Thus, when the lights are turned on at night, the RFID battery could be recharged sufficiently to provide power for operation 24 hours a day. In other cases, a battery or ultracapacitor could be included in the device and replacement or recharge of the battery would be necessitated periodically, perhaps once every two years.

An alternate approach to having a vehicle transmit a pulse to the tag and wait for a response, would be to have the tag periodically broadcast a few waves of information at precise timing increments. Then, the vehicle with two receivers could locate itself accurately relative to the earth-based transmitter.

For example, in downtown Manhattan, it would be difficult to obtain information from satellites that are constantly blocked by tall buildings. Nevertheless, inexpensive transmitters could be placed on a variety of lampposts that would periodically transmit a pulse to all vehicles in the vicinity. Such a system could be based on a broadband micropower impulse radar system as disclosed in several U.S. patents. Alternately, a narrow band signal can be used.

Once again, although radar type microwave pulses have been discussed, other portions of the electromagnetic spectrum can be utilized. For example, a vehicle could send a beam of modulated infrared toward infrastructure-based devices such as poles which contain corner or polarization modifying reflectors. The time of flight of IR radiation from the vehicle to the reflectors can be accurately measured and since the vehicle would know, based on accurate maps, where the reflector is located, there is the little opportunity for an error.

The invention is also concerned with wireless devices that contain transducers. An example is a temperature transducer coupled with appropriate circuitry which is capable of receiving power either inductively or through radio frequency energy transfer or even, and some cases, capacitively. Such temperature transducers may be used to measure the temperature inside the passenger compartment or outside of the vehicle. They also can be used to measure the temperature of some component in the vehicle, e.g., the tire. A distinctive feature of some embodiments of this invention is that such temperature transducers are not hard-wired into the vehicle and do not rely solely on batteries. Such temperature sensors have been used in other environments such as the monitoring of the temperature of domestic and farm animals for health monitoring purposes.

Upon receiving power inductively or through the radio frequency energy transfer, the temperature transducer conducts its temperature measurement and transmits the detected temperature to a process or central control module in the vehicle.

The wireless communication within a vehicle can be accomplished in several ways. The communication can be through the same path that supplies power to the device, or it can involve the transmission of waves that are received by another device in the vehicle. These waves can be either electromagnetic (radio frequency, microwave, infrared, etc) or ultrasonic. If electromagnetic, they can be sent using a variety of protocols such as CDMA, FDMA, TDMA or ultrawideband (see, e.g., Hiawatha Bray, "The next big thing is actually ultrawide", Boston Globe, Jun. 25, 2004).

Many other types of transducers or sensors can be used in this manner. The distance to an object from a vehicle can be measured using a radar reflector type RFID (Radio Frequency Identification) tag which permits the distance to the tag to be determined by the time of flight of radio waves. Another method of determining distance to an object can be through the use of ultrasound wherein the device is commanded to emit an ultrasonic burst and the time required for the waves to travel to a receiver is an indication of the displacement of the device from the receiver.

Although in most cases the communication will take place within the vehicle, and some cases such as external temperature transducers or tire pressure transducers, the source of transmission will be located outside of the compartment of the vehicle.

A discussion of RFID technology including its use for distance measurement is included in the *RFID Handbook*, by Klaus Finkenzeller, John Wiley & Sons, New York 1999.

In one simple form, the invention can involve a single transducer and system for providing power and receiving information. An example of such a device would be an exterior temperature monitor which is placed outside of the vehicle and receives its power and transmits its information through the windshield glass. At the other extreme, a pair of parallel wires carrying high frequency alternating current can travel to all parts of the vehicle where electric power is needed. In this case, every device could be located within a few inches of this wire pair and through an appropriately designed inductive pickup system, each device receives the power for operation inductively from the wire pair. A system of this type which is designed for use in powering vehicles is described in several U.S. patents listed above.

In this case, all sensors and actuators on the vehicle can be powered by the inductive power transfer system. The communication with these devices could either be over the same system or, alternately, could be take place via RF, ultrasound, infrared or other similar communication system. If the communication takes place either by RF or over a modulated wire system, a protocol such as the Bluetooth™ or Zigbee protocol can be used. Other options include the Ethernet and token ring protocols.

The above system technology is frequently referred to as loosely coupled inductive systems. Such systems have been used for powering a vehicle down a track or roadway but have not been used within the vehicle. The loosely coupled inductive system makes use of high frequency (typically 10,000 Hz) and resonant circuits to achieve a power transfer approaching 99 percent efficiency. The resonant system is driven using a switching amplifier. As discussed herein, this is believed to be the first example of a high frequency power system for use within vehicles.

Every device that utilizes the loosely coupled inductive system would contain a microprocessor and thus would be considered a smart device. This includes every light, switch, motor, transducer, sensor etc. Each device could have an address and would respond only to information containing its address.

It is now contemplated that the power systems for next generation automobiles and trucks will change from the current standard of 12 volts to a new standard of 42 volts. The power generator or alternator in such vehicles will produce alternating current and thus will be compatible with the system described herein wherein all power within the vehicle will be transmitted using AC.

It is contemplated that some devices will require more power than can be obtained instantaneously from the inductive, capacitive or radio frequency source. In such cases, batteries, capacitors or ultra-capacitors may be used directly associated with a particular device to handle peak power requirements. Such a system can also be used when the device is safety critical and there is a danger of disruption of the power supply during a vehicle crash, for example. In general, the battery or capacitor would be charged when the device is not being powered.

In some cases, the sensing device may be purely passive and require no power. One such example is when an infrared or optical beam of energy is reflected off of a passive reflector to determine the distance to that reflector. Another example is a passive reflective RFID tag.

As noted above, several U.S. patents describe arrangements for monitoring the pressure inside a rotating tire and to transmit this information to a display inside the vehicle. A preferred approach for monitoring the pressure within a tire is to instead monitor the temperature of the tire using a temperature sensor and associated power supplying circuitry as discussed above and to compare that temperature to the temperature of other tires on the vehicle, as discussed above. When the pressure within a tire decreases, this generally results in the tire temperature rising if the vehicle load is being carried by that tire. In the case where two tires are operating together at the same location such as on a truck trailer, just the opposite occurs. That is, the temperature of the fully inflated tire can increase since it is now carrying more load than the partially inflated tire.

4.0 Displays and Inputs to Displays

Touch screens based on surface acoustic waves are well known in the art. The use of this technology for a touch pad for use with a heads-up display is disclosed in the current assignee's U.S. patent application Ser. No. 09/645,709 filed Aug. 14, 2000. The use of surface acoustic waves in either one or two dimensional applications has many other possible uses such as for pinch protection on window and door closing systems, crush sensing crash sensors, occupant presence detector and butt print measurement systems, generalized switches such as on the circumference or center of the steering wheel, etc. Since these devices typically require significantly more power than the micromachined SAW devices discussed above, most of these applications will require a power connection. On the other hand, the output of these devices can go through a SAW micromachined device or, in some other manner, be attached to an antenna and interrogated using a remote interrogator thus eliminating the need for a direct wire communication link. Other wireless communications systems can also be used.

One example is to place a surface acoustic wave device on the circumference of the steering wheel. Upon depressing a section of this device, the SAW wave would be attenuated. The interrogator could notify the acoustic wave device at one end of the device to launch an acoustic wave and then monitor output from the antenna. Depending on the phase, time delay, and/or amplitude of the output wave, the interrogator would know where the operator had depressed the steering wheel SAW switch and therefore know the function desired by the operator.

A section of the passenger compartment of an automobile is shown generally as 475 in FIG. 103. A driver 476 of the automobile sits on a seat 477 behind a steering wheel 478 that contains an airbag assembly 479 with a touch pad data entry device, not shown. A heads-up display (HUD) 489 is positioned in connection with instrument panel 488 and reflects off of windshield 490. Three transmitter and/or receiver assemblies (transducers) 481, 482, 483 are positioned at various places in the passenger compartment to determine the height and location of the head of the driver relative to the heads-up display 489. Only three such transducers are illustrated in FIG. 103. In general, four such transducers are used for ultrasonic implementation, however, in some implementations as few as two and as many as six are used for a particular vehicle seat. For optical implementations, a single camera can be used.

FIG. 103 illustrates several of the possible locations of such occupant position devices. For example, transmitter and receiver 481 emits ultrasonic or infrared waves which illuminate the head of the driver. In the case of ultrasonic transducers, periodically a burst of ultrasonic waves at typically 40–50 kilohertz is emitted by the transmitter of the transducer and then the echo, or reflected signal, is detected by the receiver of the same transducer (or a receiver of a different device). An associated electronic circuit measures the time between the transmission and the reception of the ultrasonic waves and thereby determines the distance in the Z direction from the transducer to the driver based on the velocity of sound. When an infrared system is used, the receiver is a CCD, CMOS or similar device and measures the position of the occupant's head in the X and Y directions. The X, Y and Z directions make up an orthogonal coordinate system with Z lying along the axis of the transducer and X and Y lying in the plane of the front surface of the transducer.

It is contemplated that devices which use any part of the electromagnetic spectrum can be used to locate the head of an occupant and herein a CCD will be defined as any device that is capable of converting electromagnetic energy of any frequency, including infrared, ultraviolet, visible, radar, and lower frequency radiation capacitive devices, into an electrical signal having information concerning the location of an object within the passenger compartment of a vehicle. In some applications, an electric field occupant sensing system can locate the head of the driver.

The information form the transducers is then sent to an electronics control module that determines if the eyes of the driver are positioned at or near to the eye ellipse for proper viewing of the HUD 489. If not, either the HUD 489 is adjusted or the position of the driver is adjusted to better position the eyes of the driver relative to the HUD 489, as described in more detail below. Although a driver system has been illustrated, a system for the passenger would be identical for those installations where a passenger HUD is provided. The details of the operation of the occupant position system can be found in U.S. Pat. No. 05,653,462, U.S. Pat. No. 05,829,782, U.S. Pat. No. 05,845,000, U.S. Pat. No. 05,822,707, U.S. Pat. No. 05,748,473, U.S. Pat. No. 05,835,613, U.S. Pat. No. 05,943,295, and U.S. Pat. No. 05,848,802 among others. Although a HUD is disclosed herein, other displays are also applicable and this invention is not limited to HUD displays.

In addition to determining the location of the eyes of the driver, his or her mouth can also be simultaneously found. This permits, as described more detail below, the adjustment of a directional microphone to facilitate accurate voice input to the system.

Electromagnetic or ultrasonic energy can be transmitted in three modes in determining the position of the head of an occupant. In most of the cases disclosed in the above referenced patents, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. Generally, reflections from multiple points are used and this is the preferred ultrasonic implementation. The second mode uses several narrow beams that are aimed in different directions toward the occupant from a position sufficiently away from the occupant that interference is unlikely. A single receptor can be used provided the beams are either cycled on at different times or are of different frequencies. However, multiple receptors are in general used to eliminate the effects of signal blockage by newspapers etc. Another approach is to use a single beam emanating from a location that has an unimpeded view of the occupant such as the windshield header or headliner. If two spaced-apart CCD array receivers are used, the angle of the reflected beam can be determined and the location of the occupant can be calculated. The third mode is to use a single beam in a manner so that it scans back and forth and/or up and down, or in some other pattern, across the occupant. In this manner, an image of the occupant can be obtained using a single receptor and pattern recognition software can be used to locate the head, chest, eyes and/or mouth of the occupant. The beam approach is most applicable to electromagnetic energy but high frequency ultrasound can also be formed into a beam. The above-referenced patents provide a more complete description of this technology. One advantage of the beam technology is that it can be detected even in the presence of bright sunlight at a particular frequency.

Each of these methods of transmission or reception can be used, for example, at any of the preferred mounting locations shown in FIG. 103.

Directional microphone 485 is mounted onto mirror assembly 484 or at another convenient location. The sensitive direction of the microphone 485 can also be controlled by the occupant head location system so that, for voice data input to the system, the microphone 485 is aimed in the approximate direction of the mouth of the driver. A description of various technologies that are used in constructing directional microphones can be found in U.S. Pat. No. 04,528,426, U.S. Pat. No. 04,802,227, U.S. Pat. No. 05,216,711, U.S. Pat. No. 05,381,473, U.S. Pat. No. 05,226,076, U.S. Pat. No. 05,526,433, U.S. Pat. No. 05,673,325, U.S. Pat. No. 05,692,060, U.S. Pat. No. 05,703,957, U.S. Pat. No. 05,715,319, U.S. Pat. No. 05,825,898 and U.S. Pat. No. 05,848,172. A preferred design will be discussed in detail below.

FIG. 104 is a view of the front of a passenger compartment 493 of an automobile with portions cut away and removed, having dual airbags 494, 495 and an electronic control module 498 containing a HUD control system comprising various electronic circuit components shown generally as 499, 500, 501, 502 and microprocessor 503. The exact selection of the circuit components depends on the particular technology chosen and functions performed by the occupant sensor and HUDs 491,492. Wires 505 and 506 lead from the control module 498 to the HUD projection units, not shown, which projects the information onto the HUDs 491 and 492 for the driver and passenger, respectively. Wire 497 connects a touch pad 496 located on the driver steering wheel to the control module 498. A similar wire and touch pad are provided for the passenger but are not illustrated in FIG. 104.

The microprocessor 503 may include a determining system for determining the location of the head of the driver and/or passenger for the purpose of adjusting the seat to position either occupant so that his or her eyes are in the eye ellipse or to adjust the HUD 491,492 for optimal viewing by the occupant, whether the driver or passenger. The determining system would use information from the occupant position sensors such as 481, 482, 483 or other information such as the position of the vehicle seat and seat back. The particular technology used to determine the location of an occupant and particularly of his or her head is preferably based on pattern recognition techniques such as neural networks, combination neural networks or neural fuzzy systems, although other probabilistic, computational intelligence or deterministic systems can be used, including, for example, pattern recognition techniques based on sensor fusion. When a neural network is used, the electronic circuit may comprise a neural network processor. Other components on the circuit include analog to digital converters, display driving circuits, etc.

FIG. 105A is a view of a heads-up display shown on a windshield but seen by a driver projected in front of the windshield and FIGS. 105B–105G show various representative interactive displays that can be projected onto the heads-up display.

The heads-up display projection system 510 projects light through a lens system 511 through holographic combiner or screen 512, which also provides columniation, which reflects the light into the eyes 515 of driver. The focal point of the display makes it appear that it is located in front of the vehicle at 513. An alternate, preferred and equivalent technology that is now emerging is to use a display made from organic light emitting diodes (OLEDs). Such a display can be sandwiched between the layers of glass that make up the windshield and does not require a projection system.

The informational content viewed by the driver at 513 can take on the variety of different forms examples of which are shown in FIGS. 105B–105G. Naturally, many other displays and types of displays can be projected onto the holographic screen 512 in addition to those shown in FIGS. 105B–105G. The displays that are generally on the instrument panel such as the fuel and oil levels, engine temperature, battery condition, the status of seatbelts, doors, brakes, lights, high beams, and turn signals as well as fuel economy, distance traveled, average speed, distance to empty, etc. can be optionally displayed. Other conventional HUD examples include exception messages such as shut off engine, overheating, etc.

Figure 105B:
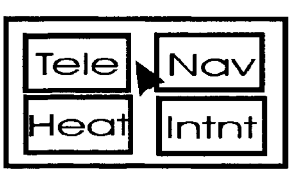

FIG. 105B illustrates the simplest of the types of displays that are contemplated by this invention. In this display, the driver can select between the telephone system (Tele), heating system (Heat), navigation system (Nav) or Internet (Intnt). This selection can be made by either pressing the appropriate section of the touch pad or by using a finger to move the cursor to where it is pointing to one of the selections (see FIG. 105B), then by tapping on the touch pad at any location or by pushing a dedicated button at the side of the touch pad, or at some other convenient location. Alternately, a voice or gesture input can be used to select among the four options. The switch system can be located on the steering wheel rim, or at some other convenient place, as described above with reference to FIGS. 170A–171. The operation of the voice system will be described in more detail below. If the voice system is selected, then the cursor may automatically move to the selection and a momentary highlighting of the selection can take place indicating to the operator what function was selected.

For this elementary application of the heads-up display, a choice of one of the buttons may then result in a new display having additional options. If the heating option is selected, for example, a new screen perhaps having four new buttons would appear. These buttons could represent the desired temperature, desired fan level, the front window-defrost and the rear window defrost. The temperature button could be divided into two halves one for increasing the temperature and the other half for decreasing the temperature. Similarly, the fan button can be set so that one side increases the fan speed and the other side decreases it. Similar options can also be available for the defrost button. Once again, the operator could merely push at the proper point on the touch pad or could move the cursor to the proper point and tap anywhere on the touch pad or press a pre-assigned button on the steering wheel hub or rim, arm rest or other convenient location. When a continuous function is provided, for example, the temperature of the vehicle, each tap could represent one degree increase or decrease of the temperature.

Figure 105C:
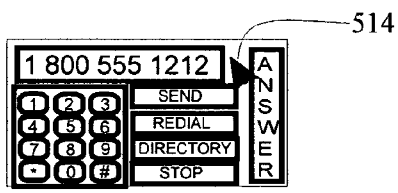
Figure 105D:
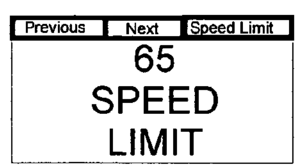

A more advanced application is shown in FIG. 105C where the operator is presented with a touch pad for dialing phone numbers after he or she has selected the telephone (Tele) from the first screen. The operator can either depress the numbers to the dial a phone number, in which case, the keypad or touch pad, or steering wheel rim, may be pretextured to provide a tactile feel for where the buttons are located, or the driver can orally enunciated the numbers. In either case, as the numbers are selected they would appear in the top portion of the display. Once the operator is satisfied that the number is correct, he or she can push SEND to initiate the call. If the line is busy, a push of the STOP button stops the call and later a push of the REDIAL button can reinitiate the call. An automatic redial feature can also be included. A directory feature is also provided in this example permitting the operator to dial a number by selecting or saying a rapid-dial code number or by a mode such as the first name of the person. Depressing the directory button, or by saying "directory", would allow the directory to appear on the screen.

In congested traffic, bad weather, or other poor visibility conditions, a driver, especially in an unknown area, may fail to observe important road signs along the side of the road. Also, such signs may be so infrequent that the driver may not remember what the speed limit is on a particular road, for example. Additionally, emergency situations can arise where the driver should be alerted to the situation such as "icy road ahead", "accident ahead", "construction zone ahead", etc. There have been many proposals by the Intelligent Transportation Systems community to provide signs on the sides of roads that automatically transmit information to a car equipped with the appropriate reception equipment. In other cases, a vehicle which is equipped with a route guidance system would have certain unchanging information available from the in-vehicle map database. When the driver missed reading a particular sign, the capability can exist for the driver to review previous sign displays (see FIG. 105D). Similarly, when the driver wants to become aware of approaching signs, he or she can view the contents of signs ahead provided that information is in the route guidance database within the vehicle. This system permits the vehicle operator to observe signs with much greater flexibility, and without concern of whether a truck is blocking the view of signs on a heads-up display that can be observed without interfering with the driver's ability to drive the vehicle. This in-vehicle signage system can get its information from transmissions from road signs or from vehicle resident maps or even from an Internet connection if the vehicle is equipped with a GPS system so that it knows its location. If necessary, the signs can be translated into any convenient language.

Figure 105E:
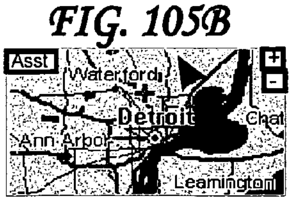

FIG. 105E is a more sophisticated application of the system. In this case, the driver desires route guidance information which can be provided in many forms. A map of the area where the driver is driving appears on the heads-up or other display along with various options such as zoom-in (+) and zoom-out (−). With the map at his ready view, the driver can direct himself following the map and, if the vehicle has a GPS system or preferably a differential GPS system, he can watch his progress displayed on the map as he drives. When the driver needs assistance, he or she can activate the assistance button which will notify an operator, such as an OnStar™ operator, and send the vehicle location as well as the map information to the operator. The operator then can have the capability of taking control of the map being displayed to the driver and indicate on that map, the route that the driver is to take to get to his or her desired destination. The operator could also have the capability of momentarily displaying pictures of key landmarks that the driver should look for and additionally be able to warn the driver of any approaching turns, construction zones, etc. There are route guidance programs that can perform some of these functions and it is anticipated that in general, these programs would be used in conjunction with the heads-up display map system as taught herein. For drivers who prefer the assistance of an individual, the capability described above can be provided.

All of the commands that are provided with the cursor movement and buttons that would be entered through the touch pad can also be entered as voice or gesture commands. In this case, the selections could be highlighted momentarily so that the operator has the choice of canceling the command before it is executed. Another mouse pad or voice or gesture input can cause an e-mail to be read aloud to the vehicle occupant (see the discussion of FIG. 105F below). The heads-up display thus gives valuable feedback to the voice system again without necessitating the driver to look away from the road.

Figure 105F:
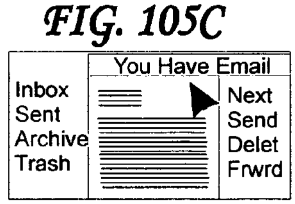
Figure 105G:
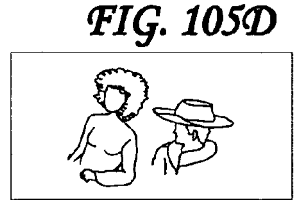

If the Internet option was chosen, the vehicle operator would have a virtually unlimited number of choices as to what functions to perform as he surfs the Internet. One example is shown in FIG. 105F where the operator has been informed that he has e-mail. It is possible, for example, to have as one of the interrupt display functions on the heads-up display at all times, an indicator that an e-mail has arrived. Thus, for example, if the driver was driving without the heads-up display activated, the receipt of the e-mail could cause activation of the heads-up display and a small message indicating to the driver that he or she had received e-mail. This is an example of a situation interrupt. Other such examples include the emergency in-vehicle signage described above. Another vehicle resident system can cause the HUD or other display to be suspended if the vehicle is in a critical situation such as braking, lane changing etc. where the full attention of the driver is required to minimize driver distraction.

Once the operator has selected e-mail as an option, he or she would then have the typical choices available on the Internet e-mail programs. Some of these options are shown on the display in FIG. 105F. There may be concern that drivers should not be reading e-mail while driving a vehicle. On the other hand, drivers have no problem reading signs as they drive down the highway including large numbers of advertisements. If the e-mail is properly formatted so that it is easy to read, a normal driver should have no problem reading e-mail any more than reading billboards as he or she operates the vehicle in a safe manner. It could also be read aloud to the driver using text-to-speech software. He or she can even respond to an e-mail message by orally dictating an answer into a speech to text program.

In the future when vehicles are autonomously guided, a vehicle operator may wish to watch his favorite television show or a movie while the trip is progressing. This is shown generally in FIG. 105G.

The above are just a few examples of the incredible capability that becomes available to the vehicle operator, and also to a vehicle passenger, through the use of an interactive heads-up display along with a device to permit interaction with heads-up display. The interactive device can be a touch pad or switches as described above or a similar device or a voice or gesture input system that will be described in more detail below.

Although the touch pad described above primarily relates to a device that resides in the center of the steering wheel. This need not be the case and a touch pad is generally part of a class of devices that rely on touch to transfer information to and from the vehicle and the operator. These devices are generally called haptic devices and such devices can also provide feedback to the operator. Such devices can be located at other convenient locations in association with the steering wheel and can be in the form of general switches that derive their function from the particular display that has been selected by the operator. In general, for the purposes herein, all devices that can have changing functions and generally work in conjunction with a display are contemplated. One example would be a joystick located at a convenient place on the steering wheel, for example, in the form of a small tip such as is commonly found of various laptop computers. Another example is a series of switches that reside on the steering wheel rim. Also contemplated is a voice input in conjunction with a HUD.

An audio feedback can be used along with or in place of a HUD display. As a person presses the switches on the steering wheel to dial a phone number, the audio feedback could announce the numbers that were dialed.

Many other capabilities and displays can be provided a few of which will now be discussed. In-vehicle television reception was discussed above which could come from either satellite transmissions or through the Internet. Similarly, video conferencing becomes a distinct possibility in which case, a miniature camera would be added to the system. Route guidance can be facilitated by various levels of photographs which depict local scenes as seen from the road. Additionally, tourist spots can be highlighted with pictures that are nearby as the driver proceeds down the highway. The driver could have the capability of choosing whether or not he or she wishes to hear or see a description of upcoming tourist attractions.

Various functions that enhance vehicle safety can also make use of the heads-up display. These include, for example, images of or icons representing objects which occupy the blind spots which can be supplemented by warning messages should the driver attempt to change lanes when the blind spot is occupied. Many types of collision warning aids can be provided including images or icons which can be enhanced along with projected trajectories of vehicles on a potential collision path with the current vehicle. Warnings can be displayed based on vehicle-mounted radar systems, for example, those which are used with intelligent cruise control systems, when the vehicle is approaching another vehicle at too high a velocity. Additionally, when passive infrared sensors are available, images of or icons representing animals that may have strayed onto the highway in front of the vehicle can be projected on the heads-up display along with warning messages. In more sophisticated implementations of the system, as described above, the position of the eyes of the occupant will be known and therefore the image or icon of such animals or other objects which can be sensed by the vehicle's radar or infrared sensors, can be projected in the proper size and at the proper location on the heads-up display so that the object appears to the driver approximately where it is located on the highway ahead. This capability is difficult to accomplish without an accurate knowledge of the location of the eyes of the driver.

In U.S. Pat. No. 05,845,000, and other related patents on occupant sensing, the detection of a drowsy or otherwise impaired or incapacitated driver is discussed. If such a system detects that the driver may be in such a condition, the heads-up display can be used to test the reaction time of the driver by displaying a message such as "Touch the touch pad" or "sound the horn". If the driver fails to respond within a predetermined time, a warning signal can be sounded and the vehicle slowly brought to a stop with the hazard lights flashing. Additionally, the cellular phone or other telematics system can be used to summon assistance.

There are a variety of other services that can be enhanced with the heads-up display coupled with the data input systems described herein. These include the ability using either steering wheel switches, the touch pad or the voice or gesture input system to command a garage door to be opened. Similarly, lights in a house can be commanded either orally, through gestures or through the touch pad or switches to be turned on or off as the driver approaches or leaves the house. When the driver operates multiple computer systems, one at his or her house, another in the automobile, and perhaps a third at a vacation home or office, upon approaching one of these installations, the heads-up display can interrogate the computer at the new location, perhaps through Bluetooth™ or other wireless system to determine which computer has the latest files and then automatically synchronize the files. A system of this type would be under a security system that could be based on recognition of the driver's voiceprint, or other biometric measure for example. A file transfer would be initiated then either orally, by gesture or through the touch pad or switches prior to the driver leaving the vehicle that would synchronize the computer at the newly arrived location with the computer in the vehicle. In this manner, as the driver travels from location to location, wherever he or she visits as long as the location has a compatible computer, the files on the computers can all be automatically synchronized.

There are many ways that the information entered into the touch pad or switches can be transmitted to the in-vehicle control system or in-vehicle computer. All such methods including multiple wire, multiplex signals on a single wire pair, infrared or radio frequency are contemplated by this invention. Similarly, it is contemplated that this information system will be part of a vehicle data bus that connects many different vehicle systems into a single communication system.

In the discussion above, it has been assumed that the touch pad or switches would be located on the steering wheel, at least for the driver, and that the heads-up display would show the functions of the steering wheel touch pad areas, which could be switches, for example. With the heads-up display and touch pad technology it is also now possible to put touch pads or appropriate switches at other locations in the vehicle and still have their functions display on the heads-up display. For example, areas of the perimeter of steering wheel could be designed to act as touch pads or as switches and those switches can be displayed on the heads-up display and the functions of those switches can be dynamically assigned. Therefore, for some applications, it would be possible to have a few switches on the periphery of steering wheel and the functions of those switches could be changed depending upon the display of the heads-up display and of course the switches themselves can be used to change contents of that display. Through this type of a system, the total number of switches in the vehicle can be dramatically reduced since a few switches can now perform many functions. Similarly, if for some reason one of the switches becomes inoperable, another switch can be reassigned to execute the functions that were executed by the inoperable switch. Furthermore, since the touch pad technology is relatively simple and unobtrusive, practically any surface in the vehicle can be turned into a touch pad. In the extreme, many if not most of the surfaces of the interior of the vehicle could become switches as a sort of active skin for the passenger compartment. In this manner, the operator could choose at will where he would like the touch pad or switches to be located and could assign different functions to that touch pad or switch and thereby totally customize the interior of the passenger compartment of the vehicle to the particular sensing needs of the individual. This could be especially useful for people with disabilities.

The communication of the touch pad with the control systems in general can take place using wires. As mentioned above, however, other technologies such as wireless technologies using infrared or radio frequency can also be used to transmit information from the touch pad or switches to the control module (both the touch pad and control module thereby including a wireless transmission/reception unit which is known in the art). In the extreme, the touch pad or switches can in fact be totally passive devices that receive energy to operate from a radio frequency or other power transmission method from an antenna within the automobile. In this manner, touch pads or switches can be located at many locations in the vehicle without necessitating wires. If a touch pad were energized for the armrest, for example, the armrest can have an antenna that operates very much like an RFID or SAW tag system as described in U.S. Pat. No. 06,662,642. It would receive sufficient power from the radio waves broadcast within the vehicle, or by some other wireless method, to energize the circuits, charge a capacitor and power the transmission of a code represented by pressing the touch pad switch back to the control module. In some cases, a cable can be placed so that it encircles the vehicle and used to activate many wireless input devices such as tire gages, occupant seat weight sensors, seat position sensors, temperature sensors, switches etc. In the most advanced cases, the loop can even provide power to motors that run the door locks and seats, for example. In this case, an energy storage device such as a rechargeable battery or ultra-capacitor could, in general, be associated with each device.

When wireless transmission technologies are used, many protocols exist for such information transmission systems with Bluetooth™ or Wi-Fi as preferred examples. The transmission of information can be at a single frequency, in which case, it could be frequency modulated or amplitude modulated, or it could be through a pulse system using very wide spread spectrum technology or any other technology between these two extremes.

When multiple individuals are operators of the same vehicle, it may be necessary to have some kind of password or security system such that the vehicle computer system knows or recognizes the operator. The occupant sensing system, especially if it uses electromagnetic radiation near the optical part of spectrum, can probably be taught to recognize the particular operators of the vehicle. Alternately, a simple measurement of morphological characteristics such as weight, height, fingerprint, voiceprint and other such characteristics, could be used to identify the operator. Alternately, the operator can orally enunciate the password or use the touch pad or switches to enter a password. More conventional systems, such as a coded ignition key or a personal RFID card, could serve the same purpose. By whatever means, once the occupant is positively identified, then all of the normal features that accompany a personal computer can become available such as bookmarks or favorites for operation of the Internet and personalized phonebooks, calendars, agendas etc. Then, by the computer synchronization system described above, all computers used by a particular individual can contain the same data. Updating one has the effect of updating them all. One could even imagine that progressive hotels would have a system to offer the option to synchronize a PC in a guest's room to the one in his or her vehicle.

One preferred heads-up projection system will now be described. This system is partially described in U.S. Pat. No. 05,473,466 and U.S. Pat. No. 05,051,738. A schematic of a preferred small heads-up display projection system 510 is shown in FIG. 106. A light source such as a high-power monochromatic coherent laser is shown at 520. Output from this laser 520 is passed through a crystal 521 of a material having a high index of refraction such as the acoustic-optical material paratellurite. An ultrasonic material 522 such as lithium niobate is attached to two sides of the paratellurite crystal, or alternately two in series crystals. When the lithium niobate 522 is caused to vibrate, the ultrasonic waves are introduced into the paratellurite 521 causing the laser beam to be diffracted. With a properly chosen set of materials, the laser beam can be caused to diffract by as much as about 3 to 4 degrees in two dimensions. The light from the paratellurite crystal 521 then enters lens 523 which expands the scanning angle to typically 10 degrees where it is used to illuminate a 1 cm square garnet crystal 524. The garnet crystal 524 contains the display to be projected onto the heads-up display as described in the aforementioned patents. The laser light modulated by the garnet crystal 524 now enters lens 525 where the scanning angle is increased to about 60 degrees. The resulting light travels to the windshield that contains a layer of holographic and collimating material 512 that has the property that it totally reflects the monochromatic laser light while passing light of all other frequencies. The light thus reflects off the holographic material into the eyes of the driver 515 (see FIG. 105A).

The intensity of light emitted by light source 520 can be changed by manually adjustment using a brightness control knob, not shown, or can be set automatically to maintain a fixed display contrast ratio between the display brightness and the outside world brightness independent of ambient brightness. The automatic adjustment of the display contrast ratio is accomplished by one or more ambient light sensors, not shown, whose output current is proportional to the ambient light intensity. Appropriate electronic circuitry is used to convert the sensor output to control the light source 520. In addition, in some cases it may be necessary to control the amount of light passing through the combiner, or the windshield for that matter, to maintain the proper contrast ratio. This can be accomplished through the use of electrochromic glass or a liquid crystal filter, both of which have the capability of reducing the transmission of light through the windshield either generally or at specific locations. Another technology that is similar to liquid crystals is "smart glass" manufactured by Frontier Industries.

Naturally, corrections must be made for optical aberrations resulting from the complex aspheric windshield curvature and to adjust for the different distances that the light rays travel from the projection system to the combiner so that the observer sees a distortion free image. Methods and apparatus for accomplishing these functions are described in assignee's patents mentioned above. Thus, a suitable optical assembly can be designed in view of the disclosure above and in accordance with conventional techniques by those having ordinary skill in the art.

Most of the heads-up display systems described in the prior art patents can be used with the invention described herein. The particular heads-up display system illustrated in FIG. 106 has advantages when applied to automobiles. First, the design has no moving parts such as rotating mirrors, to create the laser scanning pattern. Second, it is considerably smaller and more compact than all other heads-up display systems making it particularly applicable for automobile instrument panel installation where space is at a premium. The garnet crystal 524 and all other parts of the optics are not significantly affected by heat and therefore sunlight which happens to impinge on the garnet crystal 524, for example, will not damage it. A filter (not shown) can be placed over the entire system to eliminate all light except that of the laser frequency. The garnet crystal display system has a further advantage that when the power is turned off, the display remains. Thus, when the power is turned on the next time the vehicle is started, the display will be in the same state as it was when the vehicle was stopped and the ignition turned off.

U.S. Pat. No. 05,414,439 states that conventional heads-up displays have been quite small relative to the roadway scene due to the limited space available for the required image source and projection mirrors. The use of the garnet crystal display as described herein permits a substantial increase in the image size solving a major problem of previous designs. There are additional articles and patents that relate to the use of OLEDs for display purposes. The use of OLEDs for automotive windshield displays is unique to the invention herein and contemplated for use with any and all vehicle windows.

An airbag-equipped steering wheel 528 containing a touch pad 529 according to the teachings of this invention is shown in FIG. 107. A variety of different touch pad technologies will now be described.

A touch pad based on the principle of reflection of ultrasonic waves is shown in FIG. 108 where once again the steering wheel is represented by reference numeral 528 and the touch pad in general is represented by reference numeral 529. In FIG. 108A, a cross-section of the touch pad is illustrated. The touch pad 529 comprises a semi-rigid material 530 having acoustic cavities 531 and a film of PVDF 533 containing conductors, i.e., strips of conductive material with one set of strips 532 running in one direction on one side of the film 533 and the other set of strips 534 running in an orthogonal direction on the opposite side of the film 533. Foam 535 is attached to the film 533. When a voltage difference is applied across the film 533 by applying a voltage drop across an orthogonal pair of conductors, the area of the film 533 where the conductors 532,534 cross is energized. If a 100 kHz signal is applied across that piece of film, it is caused to vibrate at 100 kHz emitting ultrasound into the foam 535. If the film 533 is depressed by a finger, for example, the time of flight of the ultrasound in the foam 535 changes, which also causes the impedance of the film 533 to change at that location. This impedance change can be measured across the two exciting terminals and the fact that the foam 535 was depressed can thereby be determined. A similar touch pad geometry is described in U.S. Pat. No. 04,964,302. The basic principles of operation of such a touch pad are described in detail in that patent and therefore will not be repeated here. FIG. 108A also shows a portion of the film and conductive strips of the touch pad including the film 533 and conductive strips 532 and 534. The film 533 is optionally intentionally mechanically weakened at 536 to facilitate opening during the deployment of the airbag.

Another touch pad design based on ultrasound in a tube as disclosed in U.S. Pat. No. 05,629,681 is shown generally at 529 in the center of steering wheel 528 in FIG. 109. In FIG. 109, the cover of the touch pad 529 has been removed to permit a view of the serpentine tube 537. The tube 537 is manufactured from rubber or another elastomeric material. The tube 537 typically has an internal diameter between about ⅛ and about ¼ inches. Two ultrasonic transducers 538 and 539 are placed at the ends of the tube 537 such as Murata 40 kHz transducer part number MA40S4R/S. Periodically and alternately, each transducer 538,539 will send a few cycles of ultrasound down the tube 537 to be received by the other transducer if the tube 537 is not blocked. If a driver places a finger on the touch pad 529 and depresses the cover sufficiently to began collapsing one or more of the tubes 537, the receiving transducer will receive a degraded signal or no signal at all at the expected time. Similarly, the depression will cause a reflection of the ultrasonic waves back to the sending transducer. By measuring the time of flight of the ultrasound to the depression and back, the location on the tube 537 where the depression occurs can be determined. During the next half cycle, the other transducer will attempt to send ultrasound to the first transducer. If there is a partial depression, a reduced signal will be received at the second transducer and if the tube 537 is collapsed, then no sound will be heard by the second transducer. With this rather simple structure, the fact that a small depression takes place anywhere in the tube labyrinth can be detected sufficiently to activate the heads-up display. Then, when the operator has chosen a function to be performed and depressed the cover of the touch pad sufficiently to substantially or completely close one or more tubes 537, indicating a selection of a particular service, the service may be performed as described in more detail above. This particular implementation of the invention does not readily provide for control of a cursor on the heads-up display. For this implementation, therefore, only the simpler heads-up display's involving a selection of different switching functions can be readily performed.

In FIGS. 110 and 111A, a force sensitive touch pad is illustrated generally at 529 and comprises a relatively rigid plate which has been pre-scored at 540 so that it opens easily when the airbag is deployed. Load or force sensing pads 541 are provided at the four corners of the touch pad 529 (FIG. 110A). Pressing on the touch pad 529 causes a force to be exerted on the four load sensing pads 541 and by comparing the magnitudes of the force, the position and force of a finger on the touch pad 529 can be determined as described in U.S. Pat. No. 05,673,066.

In FIG. 111, a thin capacitive mounted touch pad is illustrated and is similar to the touch pad described in FIG. 3A of U.S. Pat. No. 05,565,658. Steering wheel 528 contains the touch pad assembly 529. The touch pad assembly 529 comprises a ground conductor 547, a first insulating area 546, which can be in the form of a thin coating of paint or ink, a first conducting layer or member 545, which can be a screen printed conducting ink, a second insulating area of 544 which also can be in the form of a paint or ink and a second conducting layer or member 543, which again can be a screen printed ink. The two conducting layers 543, 545 are actually strips of conducting material and are placed orthogonal to each other. Finally, there is an insulating overlay 542 which forms the cover of the touch pad assembly 529. Although the assembly 529 is very thin, typically measuring less than about 0.1 inches thick, one area of the assembly at 548 is devoid of all of the layers except the conductive layer 545. In this manner, when the airbag (mounted under the tough pad 529) deploys, the assembly 529 will easily split (at 548) permitting the airbag cover to open and the airbag to be deployed. The operation of capacitive touch pads of this type is adequately described in the above referenced patent and will not be repeated here.

FIGS. 112 and 112A show an alternate touch pad design similar to FIG. 12 of U.S. Pat. No. 04,198,539. This touch pad design 529 comprises an insulating area 549, a conductive area 550, a semi-conductive or pressure sensitive resistive layer 551, a thin conducting foil 552 and an insulating cover 553, which forms the cover of the airbag assembly. The operation of touch pads of this type is disclosed in detail in the above referenced patent and will not be repeated here.

The interior of a passenger vehicle is shown generally at 560 in FIGS. 113A and 113B. These figures illustrate two of the many alternate positions for touch pads, in this case for the convenience of the passenger. One touch pad 561 is shown mounted on the armrest within easy reach of the right hand of the passenger (FIG. 113A). The second installation 562 is shown projected out from the instrument panel 563. When not in use, this assembly can be stowed in the instrument panel 563 out of sight. When the passenger intends on using the touch pad 562, he or she will pull the touch pad assembly 562 by handle 564 bringing the touch pad 562 toward him or her. For prolonged use of the touch pad 562, the passenger can remove the touch pad 562 from the cradle and even stow the cradle back into the instrument panel 563. The touch pad 562 can then be operated from the lap of the passenger. In this case, the communication of the touch pad 562 to the vehicle is done by either infrared or radio frequency transmission or by some other convenient wireless method or with wires.

Referring now to FIG. 114, an automatic seat adjustment system is shown generally at 570 with a movable headrest 572 and ultrasonic sensor 573 and ultrasonic receiver 574 for measuring the height of the occupant of the seat as taught in U.S. Pat. No. 05,822,707. Motors 592, 593, and 594 connected to the seat for moving the seat, a control circuit or module 577 connected to the motors and a headrest actuation mechanism using motors 578 and 586, which may be servo-motors, are also illustrated. The seat 571 and headrest 572 are shown in phantom. Vertical motion of the headrest 572 is accomplished when a signal is sent from control module 577 to servo motor 578 through a wire 575. Servo motor 578 rotates lead screw 580 which engages with a threaded hole in member 581 causing it to move up or down depending on the direction of rotation of the lead screw 580. Headrest support rods 582 and 583 are attached to member 581 and cause the headrest 572 to translate up or down with member 581. In this manner, the vertical position of the headrest can be controlled as depicted by arrow A—A.

Wire 576 leads from control module 577 to servo motor 586 which rotates lead screw 588. Lead screw 588 engages with a threaded hole in shaft 589 which is attached to supporting structures within the seat shown in phantom. The rotation of lead screw 588 rotates servo motor support 579, upon which servo-motor 578 is situated, which in turn rotates headrest support rods 582 and 583 in slots 584 and 585 in the seat 571. Rotation of the servo motor support 579 is facilitated by a rod 587 upon which the servo motor support 579 is positioned. In this manner, the headrest 572 is caused to move in the fore and aft direction as depicted by arrow B—B. There are other designs which accomplish the same effect in moving the headrest up and down and fore and aft.

The operation of the system is as follows. When an occupant is seated on a seat containing the headrest and control system described above, the ultrasonic transmitter 573 emits ultrasonic energy which reflects off of the head of the occupant and is received by receiver 574. An electronic circuit in control module 577 contains a microprocessor which determines the distance from the head of the occupant based on the time between the transmission and reception of an ultrasonic pulse. The headrest 572 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 571, the headrest 572 moves to find the top of the occupant's head as discussed above. This is accomplished using an algorithm and a microprocessor which is part of control circuit 577. The headrest 572 then moves to the optimum location for rear impact protection as described in U.S. Pat. No. 05,694,320. Once the height of the occupant has been measured, another algorithm in the microprocessor in control circuit 577 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, as well as a good view of the HUD.

Once the proper position has been determined by control circuit 577, signals are sent to motors 592, 593, and 594 to move the seat to that position. The seat 571 also contains two control switch assemblies 590 and 591 for manually controlling the position of the seat 571 and headrest 572. The seat control switches 590 permits the occupant to adjust the position of the seat if he or she is dissatisfied with the position selected by the algorithm.

U.S. Pat. No. 05,329,272 mentions that by the methods and apparatus thereof, the size of the driver's binocular or eye box is 13 cm horizontal by 7 cm vertical. However, the chances of the eyes of the driver being in such an area are small, therefore, for proper viewing, either the driver will need to be moved or the heads-up display adjusted.

As an alternative to adjusting the seat to properly position the eyes of the driver or passenger with respect to the heads-up display, the heads-up display itself can be adjusted as shown in FIG. 115. The heads-up display assembly 595 is adapted to rotate about its attachment to an upper surface of the instrument panel 596 through any of a variety of hinging or pivoting mechanisms. The bottom of the heads-up display assembly 595 is attached to an actuator 597 by means of activating rod 598 and an appropriate attachment fastener. Control module 486, in addition to controlling the content of the heads-up display, also contains circuitry which adjusts the angle of projection of the heads-up display assembly 595 based on the determined location of the occupant's eyes. Other means for enabling displacement of the heads-up display assembly 595 are also within the scope of the invention.

There are many cases in a vehicle where it is desirable to have a sensor capable of receiving an information signal from a particular signal source where the environment includes sources of interference signals at locations different from that of the signal source. The view through a HUD is one example and another is use of a microphone for hands-free telephoning or to issue commands to various vehicle systems.

If the exact characteristics of the interference are known, then a fixed-weight filter can be used to suppress it. Such characteristics are usually not known since they may vary according to changes in the interference sources, the background noise, acoustic environment, orientation of the microphone with respect to the driver's mouth, the transmission paths from the signal source to the microphone, and many other factors. Therefore, in order to suppress such interference, an adaptive system that can change its own parameters in response to a changing environment is needed. The concept of an adaptive filter is discussed in detail in U.S. Pat. No. 05,825,898.

The use of adaptive filters for reducing interference in a received signal, as taught in the prior art, is known as adaptive noise canceling. It is accomplished by sampling the noise independently of the source signal and modifying the sampled noise to approximate the noise component in the received signal using an adaptive filter. For an important discussion on adaptive noise canceling, see B. Widrow et al., Adaptive Noise Canceling: Principles and Applications, Proc. IEEE 63:1692–1716, 1975.

In a typical configuration, a primary input is received by a microphone directed to or oriented toward a desired signal source and a reference input is received independently by another microphone oriented in a different direction. The primary signal contains both a source component and a noise component.

The independent microphone, due to its angular orientation, is less sensitive to the source signal. The noise components in both microphones are correlated and of similar magnitude since both originate from the same noise source. Thus, a filter can be used to filter the reference input to generate a canceling signal approximating the noise component. The adaptive filter does this dynamically by generating an output signal that is the difference between the primary input and the canceling signal, and by adjusting its filter weights to minimize the mean-square value of the output signal. When the filter weights converge, the output signal effectively replicates the source signal substantially free of the noise component.

What is presented here, as part of this invention, is an alternative but similar approach to the adaptive filter that is particularly applicable to vehicles such as automobiles and trucks. The preferred approach taken here will be to locate the mouth of the driver and physically aim the directional microphone toward the driver's mouth. Alternately, a multi-microphone technique known in the literature as "beam-forming", which is related to phase array theory, can be used. Since the amount of motion required by the microphone is in general small, and for some vehicle applications it can be eliminated altogether, this is the preferred approach. The beam-forming microphone array can effectively be pointed in many directions without it being physically moved and thus it may have applicability for some implementations.

The sources of the background noise in an automobile environment are known and invariant over short time periods. For example wind blowing by the edge of the windshield at high speed is known to cause substantial noise within most vehicles. This noise is quite directional and varies significantly depending on vehicle speed. Therefore the noise cancellation systems of U.S. Pat. No. 05,673,325 cannot be used in its simplest form but the adaptive filter with varying coefficients that take into account the directivity of sound can be used, as described in U.S. Pat. No. 05,825,898. That is, a microphone placed on an angle may hear a substantially different background noise then the primary microphone because of the directionality of the sources of the noise. When the speaker is not speaking and the vehicle is traveling at a constant velocity, these coefficients perhaps can be determined. Therefore, one approach is to characterize the speech of the speaker so that it is known when he or she is speaking or not. Since most of the time he or she will not be speaking, most of the time, the correlation coefficients for an adaptive filter can be formed and the noise can be substantially eliminated.

If two or more microphones have different directional responses, then the direction of sound can be determined by comparing the signals from the different microphones. Therefore, it is theoretically possible to eliminate all sound except that from a particular direction. If six microphones are used on the six faces of a cube, it is theoretically possible to eliminate all sound except that which is coming from a particular direction. This can now be accomplished in a very small package using modern silicon microphones.

An alternate approach, and the preferred approach herein, is to use two microphones that are in line and separated by a known amount such as about 6 inches. This is similar to but simpler than the approach described in U.S. Pat. No. 05,715,319.

U.S. Pat. No. 05,715,319 describes a directional microphone array including a primary microphone and two or more secondary microphones arranged in line and spaced predetermined distances from the primary microphone. Two or more secondary microphones are each frequency filtered with the response of each secondary microphone limited to a predetermined band of frequencies. The frequency filtered secondary microphone outputs are combined and inputted into a second analog-to-digital converter. Further aspects of this invention involve the use of a ring of primary microphones which are used to steer the directionality of the microphones system toward a desired source of sound. This patent is primarily concerned with developing a steerable array of microphones that allow electronics to determine the direction of the preferred signal source and then to aim the microphones in that general direction. The microphone signals in this patent are linearly combined together with complex weights selected to maximize the signal to noise ratio.

In contrast to U.S. Pat. No. 05,715,319, the microphone of the present invention merely subtracts all signals received by both the first and the second microphones which are not at the precise calculated phase indicating that the sound is coming from a different direction, rather than a direction in line with the microphones. Although in both cases the microphones are placed on an axis, the method of processing the information is fundamentally different as described in more detail below.

If it is known that the microphone assembly is pointing at the desired source, then both microphones will receive the same signals with a slight delay. This delay will introduce a known phase shift at each frequency. All signals that do not have the expected phase shift can then be eliminated resulting in the cancellation of all sound that does not come from the direction of the speaker.

For the purposes of telephoning and voice recognition commands, the range of frequencies considered can be reduced to approximately 800 Hz to 2000 Hz. This further serves to eliminate much of the noise created by the sound of tires on the road and wind noise that occurs mainly at lower and higher frequencies. If further noise reduction is desired, a stochastic approach based on a sampling of the noise when the occupant is not talking can be effective.

By looking at the phases of each of the frequencies, the direction of the sound at that frequency can be determined. The signals can then be processed to eliminate all sound that is not at the exact proper phase relationship indicating that it comes from the desired particular direction. With such a microphone arrangement, it does not in general require more than two microphones to determine the radial direction of the sound source.

A directional microphone constructed in accordance with this invention is shown generally at 600 in FIG. 116. Two microphones 601 and 602 are displaced an appropriate distance apart which can vary from about 0.5 to about 9 inches depending on the application and the space available, with a preferred spacing of about 3 inches. The two microphones 601, 602 are surrounded by acoustic transparent foam 603 and the assembly is held by a holder 604. Wire 605 connects the microphones to the appropriate electronic circuitry (not shown).

5. Summary

Among the inventions disclosed above is an arrangement for obtaining and conveying information about occupancy of a passenger compartment of a vehicle comprises at least one wave-receiving sensor for receiving waves from the passenger compartment, a generating system coupled to the wave-receiving sensor(s) for generating information about the occupancy of the passenger compartment based on the waves received by the wave-receiving sensor(s) and a communications system coupled to the generating system for transmitting the information about the occupancy of the passenger compartment. As such, response personnel can receive the information about the occupancy of the passenger compartment and respond appropriately, if necessary. There may be several wave-receiving sensors and they may be, e.g., ultrasonic wave-receiving sensors, electromagnetic wave-receiving sensors, capacitance or electric field sensors, or combinations thereof. The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. One or more memory units may be coupled to the generating system for storing the information about the occupancy of the passenger compartment and to the communications system. The communications system then can interrogate the memory unit(s) upon a crash of the vehicle to thereby obtain the information about the occupancy of the passenger compartment. In one particularly useful embodiment, the health state of at least one occupant is determined by a sensor or sensor system, e.g., by a heartbeat sensor, a motion sensor such as a micropower impulse radar sensor for detecting motion of the at least one occupant and motion sensor for determining whether the occupant(s) is/are breathing, and provided to the communications system. The communications system can interrogate the health state determining sensor(s) upon a crash of the vehicle to thereby obtain and transmit the health state of the occupant(s). The health state determining sensor(s) can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant(s), or an analysis of waves from the space occupied by the occupant(s). Each wave-receiving sensor generates a signal representative of the waves received thereby and the generating system may comprise a processor for receiving and analyzing the signal from the wave-receiving sensor in order to generate the information about the occupancy of the passenger compartment. The processor can comprise pattern recognition means for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating means is an indication of whether the occupant is breathing. Also, the wave-receiving sensor may generate a signal representative of the waves received thereby and the generating means receive this signal over time and determine whether any occupants in the passenger compartment are moving. As such, the information about the occupancy of the passenger compartment generated by the generating system includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

All of the above-described methods and apparatus, as well as those further described below, may be used in conjunction with one another and in combination with the methods and apparatus for optimizing the driving conditions for the occupants of the vehicle described herein.

Also described above is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, a processor coupled to the sensors for receiving and processing the electrical signals and for determining if the component is operating abnormally based on the electrical signals, and output means coupled to the processor for affecting another system within the vehicle if the component is operating abnormally. The processor preferably comprises pattern recognition means such as a trained pattern recognition algorithm, a neural network, modular neural networks, an ensemble of neural networks, a cellular neural network, or a support vector machine. In some cases, fuzzy logic will be used which can be combined with a neural network to form a neural fuzzy algorithm. The another system may be a display for indicating the abnormal state of operation of the component arranged in a position in the vehicle to enable a driver of the vehicle to view the display and thus the indicated abnormal operation of the component. At least one source of additional information, e.g., the time and date, may be provided and the additional information input into the processor. The another system may also be a warning device including a transmitter for transmitting information related to the component abnormal operating state to a site remote from the vehicle, e.g., a vehicle repair facility.

In another embodiment of the component diagnostic system discussed above, at least one sensor detects a signal containing information as to whether the component is operating normally or abnormally and outputs a corresponding electrical signal. A processor or other computing device is coupled to the sensor(s) for receiving and processing the electrical signal(s) and for determining if the component is operating abnormally based thereon. The processor preferably comprises or embodies a pattern recognition algorithm for analyzing a pattern within the signal detected by each sensor. An output device (or multiple output devices) is coupled to the processor for affecting another system within the vehicle if the component is operating abnormally. The other system may be a display as mentioned above or a warning device.

A method for automatically monitoring one or more components of a vehicle during operation of the vehicle on a roadway entails, as discussed above, the steps of monitoring operation of the component in order to detect abnormal operation of the component, e.g., in one or the ways described above, and if abnormal operation of the component is detected, automatically directing the vehicle off of the restricted roadway. For example, in order to automatically direct the vehicle off of the restricted roadway, a signal representative of the abnormal operation of the component may be generated and directed to a guidance system of the vehicle that guides the movement of the vehicle. Possibly the directing the vehicle off of the restricted roadway may entail applying satellite positioning techniques or ground-based positioning techniques to enable the current position of the vehicle to be determined and a location off of the restricted highway to be determined and thus a path for the movement of the vehicle. Re-entry of the vehicle onto the restricted roadway may be prevented until the abnormal operation of the component is satisfactorily addressed.

In other embodiments disclosed above, the state of the entire vehicle is diagnosed whereby two or more sensors, preferably acceleration sensors and gyroscopes, detect the state of the vehicle and if the state is abnormal, an output system is coupled to the processor for affecting another system in the vehicle. The another system may be the steering control system, the brake system, the accelerator or the frontal or side occupant protection system. An exemplifying control system for controlling a part of the vehicle in accordance with the invention thus comprises a plurality of sensor systems mounted at different locations on the vehicle, each sensor system providing a measurement related to a state of the sensor system or a measurement related to a state of the mounting location, and a processor coupled to the sensor systems and arranged to diagnose the state of the vehicle based on the measurements of the sensor system, e.g., by the application of a pattern recognition technique. The processor controls the part based at least in part on the diagnosed state of the vehicle. At least one of the sensor systems may be a high dynamic range accelerometer or a sensor selected from a group consisting of a single axis acceleration sensor, a double axis acceleration sensor, a triaxial acceleration sensor and a gyroscope, and may optionally include an RFID response unit. The gyroscope may be a MEMS-IDT gyroscope including a surface acoustic wave resonator which applies standing waves on a piezoelectric substrate. If an RFID response unit is present, the control system would then comprise an RFID interrogator device which causes the RFID response unit(s) to transmit a signal representative of the measurement of the sensor system associated therewith to the processor.

The state of the vehicle diagnosed by the processor may be the vehicle's angular motion, angular acceleration and/or angular velocity. As such, the steering system, braking system or throttle system may be controlled by the processor in order to maintain the stability of the vehicle. The processor can also be arranged to control an occupant restraint or protection device in an attempt to minimize injury to an occupant.

The state of the vehicle diagnosed by the processor may also be a determination of a location of an impact between the vehicle and another object. In this case, the processor can forecast the severity of the impact using the force/crush properties of the vehicle at the impact location and control an occupant restraint or protection device based at least in part on the severity of the impact.

The system can also include a weight sensing system coupled to a seat in the vehicle for sensing the weight of an occupying item of the seat. The weight sensing system is coupled to the processor whereby the processor controls deployment or actuation of the occupant restraint or protection device based on the state of the vehicle and the weight of the occupying item of the seat sensed by the weight sensing system.

A display may be coupled to the processor for displaying an indication of the state of the vehicle as diagnosed by the processor. A warning device may be coupled to the processor for relaying a warning to an occupant of the vehicle relating to the state of the vehicle as diagnosed by the processor. Further, a transmission device may be coupled to the processor for transmitting a signal to a remote site relating to the state of the vehicle as diagnosed by the processor.

The state of the vehicle diagnosed by the processor may include angular acceleration of the vehicle whereby angular velocity and angular position or orientation is derivable from the angular acceleration. The processor can then be arranged to control the vehicle's navigation system based on the angular acceleration of the vehicle.

A method for controlling a part of the vehicle in accordance with the invention comprises the step of mounting a plurality of sensor systems at different locations on the vehicle, measuring a state of the sensor system or a state of the respective mounting location of the sensor system, diagnosing the state of the vehicle based on the measurements of the state of the sensor systems or the state of the mounting locations of the sensor systems, and controlling the part based at least in part on the diagnosed state of the vehicle. The state of the sensor system may be any one or more of the acceleration, angular acceleration, angular velocity or angular orientation of the sensor system. Diagnosis of the state of the vehicle may entail determining whether the vehicle is stable or is about to rollover or skid and/or determining a location of an impact between the vehicle and another object. Diagnosis of the state of the vehicle may also entail determining angular acceleration of the vehicle based on the acceleration measured by accelerometers if multiple accelerometers are present as the sensor systems.

Another control system for controlling a part of the vehicle in accordance with the invention comprises a plurality of sensor systems mounted on the vehicle, each providing a measurement of a state of the sensor system or a state of the mounting location of the sensor system and generating a signal representative of the measurement, and a pattern recognition system for receiving the signals from the sensor systems and diagnosing the state of the vehicle based on the measurements of the sensor systems. The pattern recognition system generates a control signal for controlling the part based at least in part on the diagnosed state of the vehicle. The pattern recognition system may comprise one or more neural networks. The features of the control system described above may also be incorporated into this control system to the extent feasible.

The state of the vehicle diagnosed by the pattern recognition system may include a state of an abnormally operating component whereby the pattern recognition system is designed to identify a potentially malfunctioning component based on the state of the component measured by the sensor systems and determine whether the identified component is operating abnormally based on the state of the component measured by the sensor systems.

In one preferred embodiment, the pattern recognition system may comprise a neural network system and the state of the vehicle diagnosed by the neural network system includes a state of an abnormally operating component. The neural network system includes a first neural network for identifying a potentially malfunctioning component based on the state of the component measured by the sensor systems and a second neural network for determining whether the identified component is operating abnormally based on the state of the component measured by the sensor systems.

Modular or combination neural networks can also be used whereby the neural network system includes a first neural network arranged to identify a potentially malfunctioning component based on the state of the component measured by the sensor systems and a plurality of additional neural networks. Each of the additional neural networks is trained to determine whether a specific component is operating abnormally so that the measurements of the state of the component from the sensor systems are input into that one of the additional neural networks trained on a component which is substantially identical to the identified component.

Another method for controlling a part of the vehicle comprises the steps of mounting a plurality of sensor systems on the vehicle, measuring a state of the sensor system or a state of the respective mounting location of the sensor system, generating signals representative of the measurements of the sensor systems, inputting the signals into a pattern recognition system to obtain a diagnosis of the state of the vehicle and controlling the part based at least in part on the diagnosis of the state of the vehicle.

In one notable embodiment, a potentially malfunctioning component is identified by the pattern recognition system based on the states measured by the sensor systems and the pattern recognition system determine whether the identified component is operating abnormally based on the states measured by the sensor systems. If the pattern recognition system comprises a neural network system, identification of the component entails inputting the states measured by the sensor systems into a first neural network of the neural network system and the determination of whether the identified component is operating abnormally entails inputting the states measured by the sensor systems into a second neural network of the neural network system. A modular neural network system can also be applied in which the states measured by the sensor systems are input into a first neural network and a plurality of additional neural networks are provided, each being trained to determine whether a specific component is operating abnormally, whereby the states measured by the sensor systems are input into that one of the additional neural networks trained on a component which is substantially identical to the identified component.

Another control system for controlling a part of the vehicle based on occupancy of the seat in accordance with the invention comprises a plurality of strain gages mounted in connection with the seat, each measuring strain of a respective mounting location caused by occupancy of the seat, and a processor coupled to the strain gages and arranged to determine the weight of an occupying item based on the strain measurements from the strain gages over a period of time, i.e., dynamic measurements. The processor controls the part based at least in part on the determined weight of the occupying item of the seat. The processor can also determine motion of the occupying item of the seat based on the strain measurements from the strain gages over the period of time. One or more accelerometers may be mounted on the vehicle for measuring acceleration in which case, the processor may control the part based at least in part on the determined weight of the occupying item of the seat and the acceleration measured by the accelerometer(s).

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, a characterization can be made of the occupancy of the seat. Not only can the weight of an object occupying the seat be determined, but also the gross motion of such an object can be ascertained and thereby an assessment can be made as to whether the object is a life form such as a human being. Strain gage weight sensors are disclosed in U.S. Pat. No. 06,242,701 (corresponding to International Publication No. WO 00/29257). In particular, the inventor contemplates the combination of all of the ideas expressed in this patent application with those expressed in the current inventions.

Also disclosed above is a vehicle including a diagnostic system arranged to diagnose the state of the vehicle or the state of a component of the vehicle and generate an output indicative or representative thereof and a communications device coupled to the diagnostic system and arranged to transmit the output of the diagnostic system. The diagnostic system may comprise a plurality of vehicle sensors mounted on the vehicle, each sensor providing a measurement related to a state of the sensor or a measurement related to a state of the mounting location, and a processor coupled to the sensors and arranged to receive data from the sensors and process the data to generate the output indicative or representative of the state of the vehicle or the state of a component of the vehicle. The sensors may be wirelessly coupled to the processor and arranged at different locations on the vehicle. The processor may embody a pattern recognition algorithm trained to generate the output from the data received from the sensors, such as a neural network, fuzzy logic, sensor fusion and the like, and be arranged to control one or more parts of the vehicle based on the output indicative or representative of the state of the vehicle or the state of a component of the vehicle. The state of the vehicle can include angular motion of the vehicle. A display may be arranged in the vehicle in a position to be visible from the passenger compartment. Such as display is coupled to the diagnostic system and arranged to display the diagnosis of the state of the vehicle or the state of a component of the vehicle. A warning device may also be coupled to the diagnostic system for relaying a warning to an occupant of the vehicle relating to the state of the vehicle or the state of the component of the vehicle as diagnosed by the diagnostic system. The communications device may comprise a cellular telephone system including an antenna as well as other similar or different electronic equipment capable of transmitting a signal to a remote location, optionally via a satellite. Transmission via the Internet, i.e., to a web site or host computer associated with the remote location is also a possibility for the invention. If the vehicle is considered its own site, then the transmission would be a site-to-site transmission via the Internet.

An occupant sensing system can be provided to determine at least one property or characteristic of occupancy of the vehicle. In this case, the communications device is coupled to the occupant sensing system and transmits the determined property or characteristic of occupancy of the vehicle. In a similar manner, at least one environment sensor can be provided, each sensing a state of the environment around the vehicle. In this case, the communications device is coupled to the environment sensor(s) and transmits the sensed state of the environment around the vehicle. Moreover, a location determining system, optionally incorporating GPS technology, could be provided on the vehicle to determine the location of the vehicle and transmitted to the remote location along with the diagnosis of the state of the vehicle or its component. A memory unit may be coupled to the diagnostic system and the communications device. The memory unit receives the diagnosis of the state of the vehicle or the state of a component of the vehicle from the diagnostic system and stores the diagnosis. The communications device then interrogates the memory unit to obtain the stored diagnosis to enable transmission thereof, e.g., at periodic intervals.

The sensors may be any known type of sensor including, but not limited to, a single axis acceleration sensor, a double axis acceleration sensor, a triaxial acceleration sensor, an IMU and a gyroscope. The sensors may include an RFID response unit and an RFID interrogator device which causes the RFID response units to transmit a signal representative of the measurement of the associated sensor to the processor. In addition to or instead or an RFID-based system, one or more SAW sensors can be arranged on the vehicle, each receiving a signal and returning a signal modified by virtue of the state of the sensor or the state of the mounting location of the sensor. For example, the SAW sensor can measure temperature and/or pressure of a component of the vehicle or in a certain location or space on the vehicle, or the concentration and/or presence of a chemical.

A method for monitoring a vehicle comprises diagnosing the state of the vehicle or the state of a component of the vehicle by means of a diagnostic system arranged on the vehicle, generating an output indicative or representative of the diagnosed state of the vehicle or the diagnosed state of the component of the vehicle, and transmitting the output to a remote location. Transmission of the output to a remote location may entail arranging a communications device comprising a cellular telephone system including an antenna on the vehicle. The output may be to a satellite for transmission from the satellite to the remote location. The output could also be transmitted via the Internet to a web site or host computer associated with the remote location.

It is important to note that raw sensor data is not generally transmitted from the vehicle the remote location for analysis and processing by the devices and/or personnel at the remote location. Rather, in accordance with the invention, a diagnosis of the vehicle or the vehicle component is performed on the vehicle itself and this resultant diagnosis is transmitted. The diagnosis of the state of the vehicle may encompass determining whether the vehicle is stable or is about to rollover or skid and/or determining a location of an impact between the vehicle and another object. A display may be arranged in the vehicle in a position to be visible from the passenger compartment in which case, the state of the vehicle or the state of a component of the vehicle is displayed thereon. Further, a warning can be relayed to an occupant of the vehicle relating to the state of the vehicle. In addition to the transmission of vehicle diagnostic information obtained by analysis of data from sensors performed on the vehicle, at least one property or characteristic of occupancy of the vehicle may be determined (such as the number of occupants, the status of the occupants-breathing or not, injured or not, etc.) and transmitted to a remote location, the same or a different remote location to which the diagnostic information is sent. The information can also be sent in a different manner than the information relating to the diagnosis of the vehicle.

Additional information for transmission by the components on the vehicle may include a state of the environment around the vehicle, for example, the temperature, pressure, humidity, etc. in the vicinity of the vehicle, and the location of the vehicle. A memory unit may be provided in the vehicle, possibly as part of a microprocessor, and arranged to receive the diagnosis of the state of the vehicle or the state of the component of the vehicle and store the diagnosis. As such, this memory unit can be periodically interrogated to obtain the stored diagnosis to enable transmission thereof.

Diagnosis of the state of the vehicle or the state of the component of the vehicle may entail mounting a plurality of sensors on the vehicle, measuring a state of each sensor or a state of the mounting location of each sensor and diagnosing the state of the vehicle or the state of a component of the vehicle based on the measurements of the state of the sensors or the state of the mounting locations of the sensors. These functions can be achieved by a processor which is wirelessly coupled to the sensors. The sensors can optionally be provided with RFID technology, i.e., an RFID response unit, whereby an RFID interrogator device is mounted on the vehicle and signals transmitted via the RFID interrogator device causes the RFID response units of any properly equipped sensors to transmit a signal representative of the measurements of that sensor to the processor. SAW sensors can also be used, in addition to or instead of RFID-based sensors.

One embodiment of the diagnostic module in accordance with the invention utilizes information which already exists in signals emanating from various vehicle components along with sensors which sense these signals and, using pattern recognition techniques, compares these signals with patterns characteristic of normal and abnormal component performance to predict component failure, vehicle instability or a crash earlier than would otherwise occur if the diagnostic module was not utilized. If fully implemented, this invention is a total diagnostic system of the vehicle. In most implementations, the module is attached to the vehicle and electrically connected to the vehicle data bus where it analyzes data appearing on the bus to diagnose components of the vehicle. In some implementations, multiple distributed accelerometers and/or microphones are present on the vehicle and, in some cases, some of the sensors will communicate using wireless technology to the vehicle bus or directly to the diagnostic module.

One embodiment of the vehicle electrical system in accordance with the invention discussed above includes a plurality of electrical devices used in the operation of the vehicle, a single communication bus, all of the devices being connected to the communication bus and a single power bus, all of the devices being connected to the power bus (which may be one and the same as the communication bus). The devices are preferably provided with individual device addresses such that each device will respond only to its device address. Each bus may comprise a pair of wires connected to all of the devices. The devices are, e.g., actuators, sensors, airbag modules, seatbelt retractors, lights and switches. If each device is assigned a unique address, the communication bus may be arranged to transfer data in the form of messages each having an address of a respective device such that only the respective device assigned to that address is responsive to the message having the address. Each device thus includes means for determining whether the messages of the communication bus include the address assigned to the device, e.g., a microprocessor. The communication bus may also include a token ring network to provide a protocol for the transfer of messages through the communication bus. Each device may be arranged to acknowledge receipt of a communication via the communication bus and indicate operability of the device upon ignition of the vehicle.

Another electrical system for a vehicle in accordance with the invention comprises a plurality of devices used in the operation of the vehicle, and a single network constituting both a power distribution and a communication/information bus. The network may be a time multiplex network or a code division multiple access or other shared network and consists of a single wire, or a pair of wires, connecting all of the devices. For the single wire case, each device is grounded to an adjacent part of the vehicle.

Still another electrical system for a vehicle in accordance with the invention comprises a plurality of sensors, each detecting a physical characteristic, property or state of the vehicle, and a data bus, all of the sensors being connected to the data bus. A module is also preferably connected to the data bus and arranged to receive signals from the sensors and process the signals to provide information derived from the physical characteristics, properties or states detected by the sensors. The module may be arranged to process the physical characteristics, properties or states detected by the sensors to determine whether a component in the vehicle is operating normally or abnormally. A display, e.g., a light on the vehicle dashboard, may be coupled to the module for displaying the information derived from the physical characteristics, properties or states detected by the sensors. A telecommunications device may also be coupled to the module for communicating with a remote station to provide the remote station with the information derived from the physical characteristics, properties or states detected by the sensors, e.g., impending failure of a specific vehicle component or a vehicle crash. More specifically, the sensors may generate signals containing information as to whether the component is operating normally or abnormally whereby the module comprises pattern recognition means for receiving the signals and ascertaining whether the signals contain patterns representative of normal or abnormal operation of the component.

With a single pair of wires in a twisted pair or coaxial configuration for the communication bus, and perhaps another for the power bus, the connector problem can now be addressed as a single design can be used for all connections on the bus and each connector will only be connecting at most two wires. A great deal of effort can thus be applied to substantially improve the reliability of such a connector.

In another embodiment of a vehicle electrical wiring system in accordance with the invention, substantially all of the devices, and especially substantially all of the safety devices, are connected together with a single communication bus and a single power bus. In the preferred case, a single wire pair will serve as both the power and communication buses. When completely implemented each device on the vehicle will be coupled to the power and communication buses so that they will now have an intelligent connection and respond only to data that is intended for that device, that is, only that data with the proper device address.

The benefits to be derived from the vehicle electrical system described herein include at least at 50% cost saving when fully implemented compared with current wire harnesses. A weight savings of at least 50% is also expected. Most importantly, a multi-fold improvement in reliability will result. The assembly of the system into the vehicle is greatly simplified as is the repair of the system in the event that there is a failure in the wiring harness. Most of the connectors are eliminated and the remaining ones are considerably more reliable. Diagnostics on all devices on key-on can now be accomplished over the network with a single connection from the diagnostic circuit.

In contrast to other multiplexing systems based on zone modules, the communication to and from each device in the instant invention is bi-directional.

It is now believed that for side impacts, the airbag crash sensor should be placed in the door. There is reluctance to do so by the automobile manufacturers since in a crash into the A-pillar of the vehicle, for example, the wires leading to and form the door may be severed before the crash sensor activates. By using the two wire network as described herein, only two, or possibly four if a separate pair is used for power, of wires will pass from the door into the A-pillar instead of the typically fifty or more wires. In this case, the wires can be protected so that they are stronger than the vehicle metal and therefore will not sever during the early stages of the accident and thus the door mounted sensor can now communicate with the airbag in the seat, for example.

In the preferred system then, the power line or distribution network in the vehicle is used to simultaneously carry both power and data to all switches, sensors, lights, motors, actuators and all other electrical and electronic devices (hereinafter called devices) within the vehicle and especially all devices related to deployable restraints. The same system will also work for vehicles having different voltages such as 48 volts. Also a subset of all vehicle devices can be on a net. Initially, for example, an automotive manufacturer may elect to use the system of this invention for the automobile safety system and later expand it to include other devices. The data, in digital form, is carried on a carrier frequency, or as pulse data as in the Ethernet protocol, and is separated at each device using either a microprocessor, "high-side driver" or other similar electronic circuit. Each device will have a unique, individualized address and be capable of responding to a message sent with its address. A standard protocol will be implemented such as SAE J1850 where applicable. The return can be through vehicle ground comprising the vehicle sheet metal and chassis or through a wire.

The advantages of such a system when fully implemented are numerous, among which the following should be mentioned:

1. The amount of wire in the vehicle will be substantially reduced. There is currently about 500 or more meters of wire in a vehicle.

2. The number and complexity of connectors will be substantially reduced. There are currently typically about 1000 pin connections in a vehicle. When disconnection is not required, a sealed permanent connector will be used to join wires in, for example, a T connection. On the other hand, when disconnection is required, a single or dual conductor connector is all that is required and the same connector can be used throughout the vehicle. Thus, there will be only one or two universal connector designs on the vehicle.

3. The number of electronic modules will be substantially reduced and maybe even be completely eliminated. Since each device will have its own microprocessor, zone modules, for example, will be unnecessary.

4. Installation in the vehicle will be substantially easier since a single conductor, with branches where required, will replace the multi-conductor wire harnesses currently used. Wire "choke points" will be eliminated.

5. Reliability will be increased based on system simplicity.

6. Two way or bi-directional communication is enabled between all devices. This simplifies OBD-II (On Board Diagnostic Level 11 now required by the US Government for pollution control) installation, for example.

7. All devices on the vehicle are diagnosed on key-on. The driver is made aware of all burned out lamps, for example before he or she starts the vehicle.

8. Devices can be located at optimum places. A side impact sensor can be placed within the vehicle door and still communicate with an airbag module located in the seat, for example, with high reliability and without installation of separate wiring. In fact, only a single or dual wire is required to connect all of the switches, sensors, actuators and other devices in the vehicle door with the remainder of the vehicle electrical system.

9. Electro-magnetic interference (EMI) Problems are eliminated. The driver airbag system, for example would have the final circuit that deploys the airbag located inside the airbag module and activated when the proper addressed signal is received. Such a circuit would have an address recognition as well as diagnostic capabilities and might be known as a "smart inflator". EMI, which can now cause an inadvertent airbag deployment, ceases to be a problem.

10. Vehicle repair is simplified and made more reliable.

It is important that any wire used in this embodiment of the invention be designed so that it won't break even in an accident since if the single bus breaks the results can be catastrophic. Additionally, the main bus wire or pair of wires can be in the form of a loop around the vehicle with each device receiving its messages from either direction such that a single major break can be tolerated. Alternately, a tree or other convenient structure can be used and configured so that at most a single branch of the network is disabled.

It should be understood that with all devices having access to the network, there is an issue of what happens if many devices are attempting to transmit data and a critical event occurs, such as a crash of the vehicle, where time is critical, i.e., will the deployment of an airbag be delayed by this process. However, it is emphasized that although the precise protocol has not yet been determined pending consultation with a customer, protocols do exist which solve this problem. For example, a token ring or token slot network where certain critical functions are given the token more frequently than non-critical functions and where the critical device can retain the token when a critical event is in progress is one solution. A crash sensor, for example, knows that a crash is in progress before it determines that the crash severity requires airbag deployment. That information can then be used to allocate the bandwidth to the crash sensor. An alternate approach is to use a spread spectrum system whereby each device sends and is responsive to a pattern of data that is sorted out using correlation techniques permitting any device to send and receive at anytime regardless of the activity of any other device on the network.

Another issue of concern is the impact of vehicle noise on the network. In this regard, since every device will be capable of bi-directional communication, standard error checking and correction algorithms are employed. Each device is designed to acknowledge receipt of a communication or the communication will be sent again until such time as receipt thereof by the device is acknowledged. Calculations show that the bandwidth available on a single or dual conductor is much greater than required to carry all of the foreseeable communication required within an automobile. Thus, many communication failures can be tolerated.

Furthermore, an airbag deployment system for a vehicle in accordance with the invention disclosed above comprises a module housing, an airbag associated with the housing, an inflator or inflator assembly arranged in the housing for inflating the airbag, and an inflation determining system for generating a signal indicative of whether deployment of the airbag is desired. The inflation determining system preferably comprise one or more crash sensors, at least one of which is arranged separate and at a location apart from the housing. An electronic controller is arranged in or adjacent the housing and coupled to the inflation determining means. The controller controls inflation of the airbag by the inflator assembly in response to the signal generated by the inflation determining system. An electrical bus electrically couples the controller and the inflation determining system whereby the signal from the inflation determining system is sent over the bus to the controller to enable inflation of the airbag. The bus may consist of a single pair of wires over which power and information is conveyed. A sensor and diagnostic module is also coupled to the bus for monitoring the controller. The inflation determining system, e.g., crash sensor, is designed to preferably generate a coded signal when deployment of the airbag is desired which coded signal is conveyed over the bus to the controller to enable the controller to control inflation of the airbag by the inflator assembly based thereon. The controller will preferably include a power supply for enabling initiation of the inflator assembly. An occupant position sensor, e.g., an ultrasonic transmitter/receiver pair, may be arranged to detect the position of the occupant to be protected by the airbag in which case, the controller would control inflation of the airbag by the inflator assembly in consideration of the detected position of the occupant. The occupant position sensor may be arranged in the same housing as the inflator assembly, airbag and controller.

An embodiment of an occupant protection system in accordance with the invention comprises a plurality of occupant protection devices, each comprising a housing and a component deployable to provide protection for the occupant (such as an airbag), and a deployment determining device for generating a signal indicating for which of the deployable components deployment is desired, e.g., one or more crash sensors which may be located around the vehicle and preferably separate and at locations apart from the same housings as the deployable components. An electronic controller is arranged in, proximate or adjacent each housing and coupled to the deployment determining device. Each controller controls deployment of the deployable component of the respective occupant protection device in response to the signal generated by the deployment determining device. An electrical bus electrically couples the controllers and deployment determining device so that the signal from the deployment determining device is sent over the bus to the controllers to enable deployment of the deployable components. A sensor and diagnostic module may be coupled to the bus for monitoring the controllers. The deployment determining device preferably generates a coded signal when deployment of one or more of the deployable components is desired so that since each controller initiates deployment of the respective deployable component only if the coded signal contains a specific initiation code associated with the controller. An occupant position sensor could also be provided to detect the position of the occupant to be protected by the deployable components so that the controller of any of the deployable components would control deployment thereof in consideration of the detected position of the occupant.

One embodiment of an occupant protection system, for a vehicle in accordance with the invention comprises an occupant protection device for protecting an occupant in the event of a crash involving the vehicle, an initiation system for initiating deployment of the occupant protection device, a power device for storing sufficient energy to enable the initiation system to initiate deployment of the occupant protection device, an electronic controller connected to the power means for monitoring voltage of the power device and controlling the initiation system, a diagnostic module arranged to receive a signal from the controller as to whether the voltage of the power device is sufficient to enable the initiation system to initiate deployment of the occupant protection device, and an electrical bus electrically coupling the controller and the diagnostic module. The controller is arranged to generate a fault code in the event of a failure of the power means or the initiation system, which fault code is sent to the diagnostic module over the bus. One or more crash sensors or other deployment determining devices are preferably coupled to the bus for generating a (coded) signal indicative of whether deployment of the occupant protection device is desired, the signal being sent from the deployment determining devices over the bus to the controller. The controller may be arranged in the housing or adjacent the housing.

Another embodiment of an occupant protection system in accordance with the invention comprises a deployable occupant protection device, one or more deployment determining devices for generating a coded signal indicative of whether deployment of the occupant protection device is desired, and an electrical bus electrically coupling the occupant protection device and the deployment determining device(s). The coded signal from the deployment determining device(s) is sent over the bus to the occupant protection device to enable deployment of the occupant protection device. The deployment determining device(s) may comprise one or more crash sensors arranged separate and at locations apart from the occupant protection device. A controller may be coupled to the deployment determining device(s), the occupant protection device and the bus, and controls deployment of the occupant protection device in response to the coded signal generated by the deployment determining device(s). The coded signal from the deployment determining device(s) is sent over the bus to the controller to enable deployment of the occupant protection device.

A method for controlling deployment of an occupant protection system for protecting an occupant in a vehicle comprises the steps of arranging a deployable occupant protection device in the vehicle, generating a coded signal indicative of whether deployment of the occupant protection device is desired, electrically coupling the occupant protection device and the crash sensor by means of an electrical bus, and directing the coded signal from the crash sensor over the bus to the occupant protection device to enable deployment of the occupant protection device. The coded signal may be generated by a crash sensor in response to a crash of the vehicle for which deployment of the occupant protection device might be required.

Note as stated at the beginning this application is one in a series of applications covering safety and other systems for vehicles and other uses. The disclosure herein goes beyond that needed to support the claims of the particular invention that is being claimed herein. This is not to be construed that the inventor is thereby releasing the unclaimed disclosure and subject matter into the public domain. Rather, it is intended that patent applications have been or will be filed to cover all of the subject matter disclosed above.

The inventions described above are, of course, susceptible to many variations, combinations of disclosed components, modifications and changes, all of which are within the skill of the art. It should be understood that all such variations, modifications and changes are within the spirit and scope of the inventions and of the appended claims. Similarly, it will be understood that applicant intends to cover and claim all changes, modifications and variations of the examples of the preferred embodiments of the invention herein disclosed for the purpose of illustration which do not constitute departures from the spirit and scope of the present invention as claimed.

Although several preferred embodiments are illustrated and described above, there are possible combinations using other geometries, sensors, materials and different dimensions for the components that perform the same functions. This invention is not limited to the above embodiments and should be determined by the following claims.

Appendix 1—Saw Tire Pressure Monitor System Development SAW Tire Pressure Monitor Requirements 1) Product description. A device resident in the vehicle that automatically measures the tire pressure and temperature of all four tires using SAW technology.
2) Operational/design parameters
   1. Air pressure accuracy—+/−1 PSI
   2. Temperature accuracy—+/−5 degrees C. (air in the tire)
   3. Interrogation frequency—All tires once per second
   4. Wireless
   5. One device per tire
   6. No battery required
   7. Mounting method—TBD by customer
   8. Pressure range −0 to 100 PSI
   9. Temperature range—−40 C to 125 C
   10. Frequency-433.05 to 434.79 MHz
3) Environmental parameters
   1. Temperature range of operation—−40 to 125 C
   2. Product storage—−40 C to 85 C
   3. Humidity−0 to 100%
   4. Vibration—TBD by customer
   5. Dust—TBD by customer
   6. Salt spray—TBD by customer
   7. Ice—TBD by customer
   8. Chemical—TBD by customer
   9. EMI—TBD by customer
   10. RFI—TBD by customer
   11. Thermal shock—TBD by customer
   12. Mechanical shock—Static acceleration **1000*g***
4) Interface—TBD by customer
5) Package characteristics
   1. Size—POC: Sensor: 3 cubic cm max/Interrogator: NA, Production 300 cm3
   2. Weight—POC: Sensor: 10 grams or less/Interrogator: NA, Production: same as other systems on market
6) Life
   1. Activation for 86,000 ignition-on events,
   2. Ignition-on time of 8,550 hours,
   3. 150,000 vehicle miles,
   4. 15 years vehicle life A brief Review of Possible Solutions The problem can be solved using surface acoustic wave (SAW) pressure and temperature sensors installed on wheel rims or valve stems and exposed to pressure and temperature of the interior tire environment. These sensors, when connected to antennas, become transponders of radio signals that carry information about physical magnitudes being measured. A wireless reading of information given by the SAW sensors can be done by at least two presently known methods.

The first method is based on using temperature/pressure sensitive SAW resonators. The temperature/pressure sensitive element of the sensor can be, for example, a frequency defining element (resonator) of the RF oscillator at the same time. A harmonic signal excited by this oscillator will contain a phase component that will carry information about pressure and temperature of the environment. Three such generators can be used whose frequency defining elements are subject to: (i) temperature only (first and second) and (ii) both pressure and temperature (third) will radiate signals containing appropriate phase components. Evaluation of the phase of such signals in a processing device will enable obtaining data for calculation of both temperature and pressure within the wheel tire. Generators of RF signals can create either continuous harmonic waves or RF pulse signals radiated under control of the pulse generator.

Advantages of the first method: The problem of calculating the phase difference of three harmonic radio signals separated from each other in frequency domain can be solved by well-developed electronic circuitry technologies, which makes the design of an onboard receiver simple. As a result, its cost, weight and volume are small. This effect is especially dramatic when using continuously generated signals from sensors. In this case a frequency band occupied by RF signals is very narrow and complies with the requirements of devices working in the ISM band. Another advantage is that this design does not require an interrogative pulse to be sent from an onboard interrogator to the sensor, and the interrogator becomes only a receiver of continuous harmonic oscillations. Either of these advantages results in the good energy transfer by the RF link used between the sensor and the central receiver/analyzer because this link remains just a one direction communication link rather than a link requiring bidirectional communication.

Disadvantages of the first method: The design of SAW sensors within the tires becomes complicated. This is due to the need for a battery to supply power to the sensor inside the tire. Secondly the simultaneous presence of many continuous RF oscillations transmitted into the air from the wheels of other vehicles on the road. This can cause a high level of interference.

An attempt to eliminate the power source for the sensors inside the tire while keeping multiple SAW resonators as sensitive elements of TPM is demonstrated today by engineers at Transense Technologies pic (see V. Kalinin, Modeling of a Wireless SAW System for Multiple Parameter Measurement, 2001 IEEE Ultrasonic Symposium, pp. 1790–1793). In their developments, a few pressure and temperature sensitive SAW resonators are excited by a request pulse the spectrum width of which covers the working frequencies of all used resonators. In response to the request pulse, each resonator radiates a subsiding RF pulse with its carrier frequency conveying information from measured parameters. The result is that SAW TPM becomes a radar-type system, which is discussed. The most crucial disadvantage is the necessity of coherent accumulation of echo pulses from the SAW resonators in order to achieve the desired measurement accuracy. Calculations published by Transense Technologies experts show that the measurement of echo pulse frequencies with the accuracy of up to 1 kHz at the carrier frequency of 433 MHz requires at least 10 echo pulses to be accumulated coherently. Only this number of accumulated pulses raises the signal-to-noise ratio up to 30 dB which is minimally sufficient to measure with the desired accuracy. At the same time, in real systems the working SNR value is only 20 dB.

The second method uses the SAW reflective time delay lines. This method has been studied for many years by Leonhard Reindl and associates (see, for example, L. Reindl et al., "Theory and Application of Passive SAW Radio Transponders as Sensors", IEEE Transactions on UFFC, vol. 45, N5, 1998, pp. 1281–1292). The pressure/temperature sensor is a passive SAW delay line that includes an input converter, or an interdigital transducer (IDT), of electromagnetic oscillations to surface waves and vice versa, and a system of reflectors installed along the SAW propagation path. If the input IDT is connected to an antenna, the sensor can be remotely interrogated by an interrogating RF pulse generated by an onboard special-purpose interrogator. Due to the sensitivity of the sensor's acoustic line to environmental temperature and pressure, the interrogating radio signal goes through the time-delay line, is reflected and then radiated backwards contains a phase shift, evaluating which will give the values of interest.

The process is as follows:

a) the SAW delay line used as a pressure sensor which changes its delay time under the stress of pressure;

b) the RF pulse radiated by the transmitter of the interrogator passes through the delay line stressed by pressure and adds a phase shift to the RF carrier. Thus the total value of the RF carrier phase shift includes a pressure component caused by gas pressure inside the tire;

c) after the return of the RF pulse from the SAW sensor to the interrogator's receiver, the additional phase shift is extracted and processed to give the magnitude of the pressure.

Advantages of the second method: The SAW sensor's design becomes very simple. The sensor becomes passive (powerless). No semiconductor elements or power supply are needed and thus the sensor becomes more reliable.

Disadvantages of the second method: The design of the interrogator becomes complicated because it is transformed from a receiver to a transmitter/receiver (or a transceiver). So the interrogator becomes a radar-like device that includes a transmitting and a receiving section, a synchronization system, a frequency synthesizer, a processor of received signals by amplitude and phase etc. The RF link between the sensor and the interrogator is transformed into a radar type link. This causes the deterioration of the RF link energy measures because:

the readout distance between the sensor and the interrogator according to the radar equation is the fourth root of the transmitting power against the square root in the case of a communication type RF link;

the reflectors of the SAW delay lines insert additional losses as compared to the usual SAW TDL.

Another method implemented in TPM by Smartire Corp. uses the SAW resonator solely as a frequency-defining element in the carrier frequency generator of the transmitter installed inside the wheel. In this application, the SAW resonator is not a sensitive component with respect to the pressure and temperature of the environment.

The sensor's functions are performed by a specialized chip that generates a code sequence with its structure defined by the pressure and temperature of the gas inside the tire.

This sensor together with its electronic circuitry inside the wheel is powered by lithium batteries. This is the key disadvantage of the method.

Elements of the system. interrogating device.

Based on the discussion above, the interrogator sends and receives radio pulses to and from the SAW sensor. The carrier wave of these pulses will contain phase shifts that correspond to the temperature and pressure of air within the tire. The output signals of the interrogator are the measured values of the phase shifts represented in a digital form to be processed by an onboard processor.

A typical design of a pulse radar utilizes a heterodyne receiver architecture with IF stage and a limiter amplifier with the radio signal strength indicator output as shown in FIG. 117.

With an exchangeable IF SAW filter, various system bandwidths can be achieved. To compensate for the coherent cross-talk, the mixer's DC-offset and the DC-offset of the A/D-converter, a switching element is inserted between the IF-filter and the log-amplifier.

Short bursts are produced by switching the output of the IF local oscillator. With a frequency synthesizer, the bursts are up-converted into the RF band. If there is a SAW sensor within the detection range, it reflects a pulse after a delay time. The incoming sensor pulses are first amplified and then heterodyned in the IF band. The log-amplifier following the SAW filter has one output for the amplitude and another with the limited signal for detecting the pulse information.

A quadrature demodulation is employed to get the in-phase and quadrature components out of the limited signal. After demodulation and digitizing, the signal is evaluated by a microprocessor.

During the development of the operational algorithm and a circuit diagram of the interrogator's signal processing unit, some modifications were made.

The configuration of the SAW TPM System developed at Stage 1 POC is shown in FIG. 118. It consists of an interrogator unit and a passive SAW sensor.

The interrogator consists of transmitter and receiver parts, a channel of frequency comparison and a data processing and clock system.

The transmitter part of the block diagram mentioned above is shown in FIG. 119.

The reference crystal oscillator shapes a continuous carrier frequency at $f_o$=433.92 MHz and feeds it to one port of the burst switch. The rectangular pulse from the clock system A(t) acts on another switch port. As a result, at the switch output, a sequence of rectangular RF pulses S(t) with duration T, which follow with period $T_4$, as shown in FIG. 120 was obtained.

In this figure and further assuming: A(t)=1, $(-\tau/2+nT)<t<(\tau/2+nT)$,

A(t)=0, $(\tau/2+nT)<t<(-\tau/2+nT)$, n=0, 1, 2, 3 . . . , then the burst is: $S(t)=A(t)\sin(\omega_o t)$, $(\omega_o=2\pi f_o)$.

As the answer to the request pulse, after an appropriate delay time the SAW-sensor retransmits a sequence of echo RF pulses, as shown in FIG. 121. The echo sequence consists of three pulses numbered 1, 2 and 3, respectively. No. 4 is assigned to the burst.

Commonly, the RF echo signal that comes from the sensor contains three unknown additional phase components compared to the reference request pulse of the interrogator. These components are caused by the influence of pressure, temperature and current properties of the RF link that exist at the moment of data readout. These properties may be changing under the influence of the wheel vibration, electromagnetic environmental conditions and other factors. Therefore, the number of the echo pulses should be at least three for the purpose of eliminating the influence of the RF link and extracting phase component of pressure from the total temperature phase shift.

In order to perform that elimination, only the phase differences of the three echo pulses, i.e. $(\omega_r T_2-\omega_r T_1)$ and $(\omega_r T_3-\omega_r T_2)$, is operated on. In this case, the obtained information does not depend on the radio link properties, which affect each of the echo pulses equally.

The first phase difference $(\omega_r T_2-\omega_r T_1)$ contains information about the current value of only the temperature because the pressure does not deform the respective fragments of the SAW sensor substrate due to the sensor's design.

The second phase difference $(\omega_r T_3-\omega_r T_2)$ contains information about both the temperature and the pressure because the SAW line with delay time $T_3$ is affected both by the pressure and the temperature due to the sensor's design. If the sensor is designed in such fashion that:

$$(T_3-T_2)=(T_2-T_1),$$

it is then easy to determine the pressure contribution, because the phase shift under the temperature influence is equal for both components.

Finally, the phase shift caused by the pressure is defined as a difference:

$$(\omega_r T_3-\omega_r T_2)-(\omega_r T_2-\omega_r T_1).$$

For this reason, three echo pulses are needed as shown in FIG. 121. The time positions of echo pulses $T_1$, $T_2$ and $T_3$ are calculated in sections that follow. A mathematical model of the TPM system is described in Appendix 2.

The sequence of the echo RF pulses from the SAW sensor comes to the input of the interrogator's receiver the schematic of which is shown in FIG. 122.

The SAW sensor echo acts on the input of the interrogator receiver when the window of the Rx/Tx switch is open. Thus, at point 1 of the diagram in FIG. 122, a full echo signal shown in FIG. 121 is obtained. Then, driving the next switch with one of strobes 1, 2 or 3, skipping to point 2 of the diagram with the first, second or third echo pulse, respectively. Note that at the closed input switch, it is possible to supply the signal from the reference oscillator to point 2, using the strobe 4 to open the switch in the channel of the reference frequency.

Thus, at the input of LNA, a sequence consisting of the echo pulses of the first, second or third type can be generated. It is possible to generate a sequence of bursts also. It is important that in any of these sequences the pulses will follow with the same period equal to the burst period $T_4$. This fact opens the possibility of their further accumulation.

Thus at point 3 of the diagram in FIG. 122, the following equation is obtained:

$$E(t)=A(t)\sin(\omega_r t+\Delta\phi_i)$$

in all modes of operation.

Assuming the initial equality $\omega_0=\omega_r$, after multiplying E(t) by the signal of the local oscillator $R(t)=\cos(\omega_r t)$, the equations obtained are:

at point 4:

$$E(t)\times R_{cos}(t)=A(t)\sin(\omega_o t+\Delta\phi_i)\times\cos(\omega_r t)=0.5A(t)\times[\sin\Delta\phi_i+\sin\Delta\phi_i+\sin(2\phi_i+\sin(2\omega_r t+\Delta\phi_i)]$$

at point 5:

$$E(t)\times R_{sin}(t)=A(t)\sin(\omega_o t+\Delta\phi_i)\times\sin(\omega_r t)=0.5A(t)\times[\cos\Delta\phi_i+\cos(2\phi_i+\cos(2\omega_r t+\Delta\phi_i)]$$

After the signal passes through the low pass filter (LPF) and after the filtering of double frequency harmonics, the equations are:

at point 6:

$$E(t)\times R_c(t)=0.5\ A(t)\sin\Delta\phi_i,$$

and at point 7:

$$E(t)\times R_s(t)=0.5A(t)\cos\Delta\phi_i.$$

Then at point 8:

$$[E(t)\times R_c(t)]\times[E(t)\times R_s(t)]\ 0.25A^2(t)\sin 2\ \Delta\phi_i$$

This is an output signal of PLL which affects the LO frequency converting it to the sync mode.

In the sync mode, the frequency of LO is rigidly pegged to the frequency of the reference oscillator of the transmitter and reaches the new value $\omega_r$ which satisfies the equation $$\omega_r t=\omega_o t+\Delta\phi_i.$$

Assuming the crystal stabilization of $\omega_o$, any change of the LO frequency happens only as a result of change in the SAW-sensor delay time under the effect of temperature or pressure oscillation. Thus, having a totally powerless SAW-sensor, a continuous carrier oscillation in the receiver is obtained similar to that radiated by powered sensor systems.

The comparison of recovered frequency $\omega_r$ and reference frequency $\omega_o$ performed by the channel of frequency comparison and data processing, gives information about pressure and temperature in the tire.

The system operates by steps listed below.

Step one: "Calibration". Only strobe 4 (see FIG. 122) is switched on. Other strobes are out of operation. The LO frequency ($\omega_{r4}$) is pegged to the reference frequency and then compared to it. The outcome of the comparison is metered and stored in the channel of frequency comparison and data processing.

Step two: "Temperature metering". Only strobe 1 is switched on. Other strobes are out of operation. The LO frequency ($\omega_{r1}$) is compared, metered and stored as in Step 1, but during the reception of pulses 1 (FIG. 121) sequence. These pulses carry the information about the "absolute" temperature.

Step three: "Relative temperature metering". Only strobe 2 is switched on. Other strobes are out of operation. The LO frequency ($\omega_{r2}$) is processed as earlier, but during the reception of pulse 2 sequence. These pulses carry the information about the changes caused by the influence of temperature in the pressure sensitive channel of the SAW sensor.

Step four: "Pressure metering". Only strobe 3 is switched on. Other strobes are out of operation. The LO frequency ($\omega_{r3}$) is processed in the same way, but during the reception of the pulse 3 sequence. These pulses carry the information about both the temperature and the pressure changes in the pressure sensitive channel of the SAW sensor.

Step five: "Calculations". Based on the data stored during Steps 1–4 and known SAW sensor substrate properties, the values of pressure P and temperature t° are evaluated and monitored. The above cycle of measurements are then iterated to refine the values of P and t° which may have varied during the previous cycle. The estimated duration of one cycle is about 1 s.

In this manner the SAW TPM system is created based on a principle of a feedback closed loop, which included the remote moving SAW sensor and tracked its varying properties. The system considered is a single-channel and processes each pulse of the triple-pulse echo sequentially. It uses an average reading method based on a principle of coherent detection coupled with the post detector accumulation.

Calculation of Sensor-Interrogator Radio Link Energy Measures.

According to radar equation, the read-out distance r between the SAW-sensor (transponder) antenna and the antenna of interrogator is given by:

$$r=\left(\frac{\lambda}{4*\pi}\right)*\sqrt[4]{\frac{P_o*G_i^2*G_t^2}{k*T_o*F*B*\left(\frac{S}{N}\right)*L}}$$

where:

- $\lambda$ is an electromagnetic wavelength of the carrier frequency;

$P_o$ is the equivalent isotropic radiation power (EIRP) of the interrogator transmitter;

$G_i$ is the gain of the interrogator antenna;

$G_t$ is the gain of the SAW transponder antenna;

$k=1.38^x10^{-23}$ J/K, the Bolzmann constant;

$T_o$=293 K, the temperature under normal conditions (room temperature);

F is the system noise figure;

B is the system bandwidth;

(S/N) is a signal-to-noise ratio on the receiver input of the interrogator;

L is an insertion loss of the SAW sensor.

The electromagnetic wavelength at a frequency of 434 MHz is determined as $$\lambda=3*10^8/434*10^6=0.69\text{ m.}$$

The equivalent isotropic radiation power (EIRP) of the interrogator transmitter $P_o$ is given by $$P_o=P_t*G_i,$$

where $P_t$ is the power fed to the antenna of the interrogator's transmitter and $G_i$ is the gain of the interrogator's antenna.

The allowed EIRP in the ISM band (433.00 MHz–443 MHZ), particularly at frequency of 434 MHz, is equal to 25 mW=$25*10^{-3}$ W).

A classic $\lambda/2$ dipole is used as an antenna of interrogator giving $G_i$=0.616 (−2.1 dB).

Thus it follows, that the output amplifier of the transmitter should give to an antenna of interrogator RF power equal to:

$$P_t=P_o\cdot G_i=15.2\text{ mW }(15.2*10^{-3}\text{ W}).$$

Taking into account, that the sensor's antenna during operation changes its position relative to the antenna of interrogator, assume therefore $G_t$=1 (0 dB).

Defining a system bandwidth B, a delay time in the sensor should not exceed several microseconds. The duration of a burst should be even less. Therefore, radio link measures are calculated recognizing a burst average length equal to 0.1 microseconds, which corresponds to B=$10*10^6$ MHz.

The noise figure in ISM band has a rated value F=3.2 (5 dB).

The losses of a signal in radio link L inserted by a SAW-sensor can oscillate over a wide range depending on design of a delay line and degree of its matching to an antenna. Based on the preliminary experimental results, it is possible to expect values L in range from 20 up to 50 dB. The worse value L=$1*10^{-2}$ (20 dB) was selected. Then, under a typical value of a signal to noise ratio S/N=40 dB, the following is obtained:

$$r=\left(\frac{0.69}{4*\pi}\right)*\sqrt[4]{\frac{0.025*0.38*1}{1.38*10^{-23}*293*3.16*10*10^{6}*10^{4}*10^{2}}}=1.356 \quad (2)$$

Even if in equation (2) the radio link losses increase to the value of 30 dB, the read-out distance will not fall below than value of 0.7 m.

| Insertion Loss of the SAW Sensors | Read-out distance (m) |
|---|---|
| −25 dB | 1.017 |
| −30 dB | 0.763 |
| −35 dB | 0.572 |
| −40 dB | 0.429 |

The dependence of read-out distance on a system bandwidth, calculated under change of value B in the equation (2) shows, that it is possible to use bursts with duration of $\tau$=1/B=50 ns without decreasing the read-out distance below the 1 meter.

These estimated calculations allow us to formulate the following requirements for the main parameters of the TPM System.

| | |
|---|---|
| Operation Rx/Tx frequency, fo | 433.92 MHz |
| Transmit power on the input of the interrogator's antenna, | $16 * 10^{-3}$ W |
| Interrogator's antenna gain, Gi | −2.1 dB |
| SAW transponder antenna gain, Gt | 0 dB |
| System noise figure, F | 5 dB |
| Signal to noise ratio in the input of the interrogator's receiver S/N | 40 dB |
| System bandwidth, B | 2–14 Mhz |
| SAW sensor insertion loss, L, no more than, | 30 dB |

The SAW pressure and temperature sensor, choosing a material for the SAW sensor substrate.

With the limited energy transmissions of the radar type SAW TPM mentioned above, the level of RF losses inserted by the SAW sensor into the RF link between the sensor and interrogator becomes the main parameter. In our case, the maximum power of the interrogation pulse may not exceed 20 mW at the frequency of 433.92 MHz according to international regulations for the ISM band. Our calculations based on this limitation and listed below shows that the losses inserted by a sensor must not exceed the value of −25 to −30 dB.

Work done in our laboratory enabled us to find the minimum allowable signal loss of the SAW sensor. The following loss values have been obtained for quartz and lithium niobate substrates typically used in SAW devices:

−40 to −50 dB for a quartz based sensor;

−20 to −26 dB for a lithium niobate ($LINbO_3$) based sensor.

The second important parameter is the temperature dependence of the SAW time delay in the crystal. For a crystalline quartz of ST-cut used in SAW devices, this dependence is nearly zero only in a narrow range near +28° C. In a wide temperature range, from −40° C. to +125° C., as in our case, the temperature dependence is defined as $20\times10^{-6}$ 1/K that is only 3 to 5 times better than that of lithium niobate. In addition, the temperature coefficient in quartz is described by non-linear relationships. For often-used cuts of lithium niobate crystals, the temperature dependence in this range is linear, being $-72--94\times10^{-6}$ 1/K.

These are the principal reasons for selecting lithium niobate as the substrate material.

Structure of the SAW Sensor

Now that the echo structure and substrate have been decided, the time positions $T_1$, $T_2$ and $T_3$ of the echo pulses need to be determined.

Briefly considering the factors that define the delay times of the components of echo signal, a problem is to determine three time values: $(T_3-T_2)=(T_2-T_1)$, then $T_3$ and, finally, the duration of the interrogation pulse $\tau_{req}$. The first value, i.e. $(T_3-T_2)=(T_2-T_1)$ is calculated by the temperature coefficient of delay in the $LiNbO_3$, working temperature range and working frequency:

$$(T_2-T_1)=(T_3-T_2)=1/(k_t\cdot\Delta t^{\circ} f_0)=200 \text{ ns}; \ (1)$$

where:

$k_t=72^{-}10^{-6}$ 1/K—the temperature coefficient of time delay of $LiNbO_3$ (Y+127.86°,X)-cut substrate;

$\Delta t°$=165° C. (from −40° C. to +125° C.)—the measured temperature range;

$f_0$=433.92 MHz—the working frequency.

The delay time $T_3$ is solely defined by the sensor's sensitivity to pressure. With the value $T_3$=2000 ns, in pressure sensor prototypes made in our laboratory, this value provides the sensor sensitivity of about 10–30 degrees of phase shift per 1 atm of pressure. In addition, it enables a decrease in the substrate length of the pressure sensor to about 7–8 mm.

Therefore, T3=2000 ns and assuming (1), T2=1800 ns and T1=1600 ns are obtained.

Therefore, the full length of the combined sensor's substrate is 16 mm as shown in FIGS. 123 and 124. If it is necessary to increase (decrease) the pressure sensitivity of the sensor, the delay value $T_3$ can be easily altered at later stages of development.

It is clear that interrogation pulse duration must be less then $(T_2-T_1)=(T_3-T_2)$. In this case every delay line shown in FIGS. 123 and 124 will produce appropriate pulse echo of its own. For better separation of these pulses in full echo signal, we assume $$\tau_{req}<0.5\cdot(T_2-T_1)=0.5\cdot(T_3-T_2)=100 \text{ ns} \quad (2)$$

Thus, the values of $T_1$, $T_2$, $T_3$ and $\tau_{req}$ mentioned above in a table of FIG. 121 are obtained.

The structure of the echo signal stated above contains a critical contradiction. On one hand, according to ITU Radio Regulations the frequency bandwidth available in the ISM band for the SAW TPM at the frequency 433 MHz is just 1.75 MHz. On the other hand, the SAW TPM must measure the temperature in the range of 165° C. (from −40° C. to +125° C.) which has been stated in the SAW TPM preliminary requirements document. Proceeding from this value, it is established that, on the basis of the relationships (1) and (2), the duration of the request pulse is not to exceed 100 ns. This means that the frequency bandwidth occupied by the spectrum of the request pulse in the air will be $1/\tau_{req}>10$ MHz.

This contradiction is either glossed over by authors of numerous publications dedicated to the subject, or is advanced by developers as the main reason that bars the development and implementation of a TPM equipped with a passive SAW sensor.

Actually, it is possible to resolve this conflict without violating the ITU requirement in the ISM band. It is clear that an increase in the duration of the request pulse at least up to 570–600 ns is needed in order to meet the requirements. This would narrow the frequency bandwidth occupied in the air down to the required value of 1.75 MHz. To do that, it would suffice to change the design of the time delay lines of the sensor so as to increase the differences ($T_2-T_1$) and ($T_3-T_2$) up to the value $$0.5(T_2-T_1)=0.5(T_3-T_2)>\tau_{req.}=570\ldots600\ \text{нс}.$$

Though, in this case the measurable temperature interval $\Delta t°$ would narrow in accordance with the relationship $$(T_2-T_1)=1/k_t f_0 \Delta t°$$

So, it would have to fall down to 30–35° C., otherwise (if the temperature varies in wider limits) the phase difference $\omega_r(T_2-T_1)$ would exceed 360°, and ambiguity appears in the calculations.

To fight this ambiguity, a fourth pulse is introduced into the echo signal of the sensor. The principal purpose of the fourth echo pulse is to make the temperature measurement remains unambiguous over a wide interval of temperatures when a longer interrogation pulse is used (and the respective time intervals between the sensor's echo pulses are longer as well). A mathematical model processing a four-pulse echo that explains these statements is presented in Appendix 3.

Of course, the introduction of the additional echo pulse will elongate the sensor a bit. Calculations presented below show that the sensor will now be 30 mm in length. It won't exceed the length of the transponder's "SPLATCH" antenna currently used. The new structure of the sensor's pulse echo is shown in FIG. 125.

The duration of the interrogation pulse and the time positions of the four pulses are calculated as:

$$\tau_{req}>1/\Delta f=1/1.75\ \text{(MHz)}=570\ \text{ns}$$

$$T_1>4\tau_{req}=2400\ \text{ns}$$

$$T_2=T_1+\tau_{req}-50\ \text{ns}=2950\ \text{ns}$$

$$T_3=T_2+\tau_{req}=3550\ \text{ns}$$

$$T_4=T_3+\tau_{req}-50\ \text{ns}=4100\ \text{ns}$$

The additional echo pulse will enable us to keep the required range of temperature sensitivity, and also:

- will reduce the noise bandwidth of the system from 10 MHz to 1.75 MHz, thus increasing the sensitivity of the receiver. Eventually, this will increase the range of the system;
- will lower the level of phase distortion introduced into the RF link by the antenna system because the frequency response of the existing antennas will cause lower distortions in the echo signal with the narrowed spectrum. This will improve the accuracy of the measurement;
- will increase the time interval available for processing of each echo pulse, thus essentially simplifying the interrogator's structure (and making it much less expensive) by changing the three-channel parallel scheme of signal processing at the quadrature demodulator's output into a single-channel sequential scheme.

During development, several designs of the temperature and pressure SAW sensor have been studied. First, there were designs with a single SAW substrate or two SAW substrates that correspond to the temperature and the pressure sensing elements separately and combined into single case.

Second, sensor designs can differ in the way they transmit air pressure to the substrate. This can be a direct pressure of air on the substrate (the latter is the elastic element). Another option is to transmit pressure via an additional elastic element (such as a membrane in the case of the sensor) and to optimize the pressure force application point. In all sensor designs, substantially identical substrates made of lithium Niobate were used. It has enabled a minimum loss of energy to be achieved in the sensor, a combination of temperature and pressure sensors on a single substrate, and use of materials commonly used in SAW devices.

The SAW Sensor with Separate Substrates.

The SAW sensor is placed in a sealed metallic-glass DIP-14 case of the dimensions 20.4×12.8×5.3 mm. The weight of the sensor together with the case does not exceed 2 gram. Inside the case there are two lithium niobate SAW substrates as shown in FIG. 126.

The first substrate at the surface of which two SAW delay lines are formed is a temperature sensor only (see FIG. 124 also), i.e. variations of the delay time of signals in its delay line depend solely on the variation of the environment's temperature. The substrate is firmly fixed at the bottom of the case along its whole length and insulated against the air pressure in the tire.

The second substrate is a sensing element of both pressure and temperature. A single SAW delay line is formed at its surface (see FIG. 123 also). One end of the substrate is firmly attached to the case's bottom. The other end is in mechanical contact with a miniature membrane that flexes under the air pressure within the vehicle's tire. Thus, a variation of the air pressure within the tire makes the membrane deform and flexes the substrate by a certain magnitude. As a result, the delay time $T_3$ of the signal in the line changes due to the external pressure as well as the temperature. The inputs and outputs of all delay lines are connected to the antenna via the case terminals.

The double substrate sensor design was chosen for the following reasons. First, it allows us to not use acoustic reflector mirrors in the SAW delay lines, which insert an additional loss into the RF link between the interrogator and the sensor. SAW reflectors were not used in the delay lines because reflectors reduce effectiveness in a limited band-pass of frequency response. Instead, a system of electrically coupled SAW interdigital transducers was used. Despite increasing the total length of the SAW substrate by a factor of 2, a 3 dB reduction of the SAW sensor's RF losses was achieved. This is more important than increasing the sensor's dimensions.

As a result, the energy measures of a whole system were improved.

Second, a separate installation of the pressure-sensing delay line and temperature-sensing delay line in the case facilitates the assemblage and its step-by-step monitoring.

In order to protect the sensor substrates against mechanical shock and abrupt temperature changes, an organic silicon compound (silicone) is used. The temperature sensor substrate is glued by silicone to the bottom of the case along the full length. In the pressure sensor, silicone fills the space under the SAW substrate inside the interval from the pedestal of the stiff attachment to the membrane. Silicone is a plastic material that does not hinder the substrate's flexure under the influence of the micro-membrane. A cyanoacrylate adhesive is used to rigidly attach the end of the pressure sensor substrate to the case's bottom.

The miniature membrane made of thin nickel (0.04 mm thick) is hermetically welded to the case's bottom by means of girth pressure welding. Under the membrane in the bottom of the case there is an orifice 0.8 mm in diameter through which the air pressure can affect the micro-membrane. The small diameter of the orifice damps abrupt pressure changes and improves the reliability of the sensor.

The inputs of the SAW delay lines are connected to the case terminals by a wire 0.03 mm in diameter using split-tip welding. It allows the operational temperature of the sensor to increase to +200° C. (including the mounting of the sensor to its antenna via welding). Places where the micro-wire is welded to the substrates and terminals are reinforced by epoxy adhesive in order to improve the mechanical strength of the welded joints.

The ends of both substrates are covered by a special paint to reduce a surface wave reflection.

Once the sensor is assembled, its bottom is covered. The seam that appears is sealed using laser welding at atmospheric pressure.

SAW Sensor with a Single Substrate.

Tests of the temperature/pressure sensors based on two separate substrates have shown that the substrates are heated and cooled at different speeds. This effect introduces a noticeable error into the pressure measurement. It can be observed during quick temperature changes. The temperature sensor substrate has a much better thermal contact with the case, thus it changes its temperature much faster. The pressure sensor substrate is divided by an air gap from the case. Therefore, it changes its temperature with a small retardation. When the case's temperature is changing quickly, the phase shifts are compensated incompletely in two substrates. This causes the pressure measurement error to appear. To decrease this error, a single-substrate design of the temperature/pressure sensor as shown in FIG. 127 was developed.

Manufacturing of particular units of SAW TPM.

SAW sensors

Manufactured SAW sensors of two types are shown in FIGS. 128 and 129. The single substrate sensor is not different from a double substrate sensor by its electric performance.

SAW TPM Interrogator

In conformance with the block diagram of the SAW TPM developed (see FIG. 118), some sample units of the system were fabricated.

First, the transmitter unit was made and tested, including the a approach of the modified transmitting dipole antenna (see FIG. 130). Since that time, a correct and wireless excitation of the SAW sensor by RF pulses (bursts) radiated at the carrier frequency 433.92 MHz (see FIG. 131—time scale is 1 μs/div; $V_{pp}$=1.3 V) has been accomplished.

Second, the synchronizer/frequency synthesizer was fabricated as a part of the clock system. Thus, gating pulses (see upper traces in the pictures of FIG. 132) to produce the transmitter modulation and to generate the bursts mentioned above were obtained. At the same time, the possibility to move the strobe pulses along the time scale for the appropriate driving of the receiver input switch (see lower traces in the pictures of FIG. 132 and, in a compressed form, in the picture of FIG. 133) was realized.

Further, the α-iteration of the moving sensor antenna was fabricated and its impedance matched to 50 Ohm together with the wheel cap as the antenna's ground plane (see FIGS. 134 and 135). Finally, all the devices mentioned above were installed into the laboratory simulator as shown in FIG. 136, and prepared for launching the experimental study of the system.

Proceeding from the SAW TPM System circuit diagram, the fabrication and adjustment of the quadrature demodulator, which was the key element of RF Signal Processing Unit of interrogator (see FIG. 137), was completed. This quadrature demodulator was fabricated using discrete components, though appropriate chips existed (e.g., the TDA8042M (Philips Semiconductors), SRF-2016 (Sirenca Microdevices) and U2791B and U2794B (ATMEL).) Later, it was the last demodulator type which we used to improve the interrogator. At that time, a segment of an RF cable was used instead of the 90° phase shifter in the quadrature demodulator. Alternative components can be used, such as the JSPHS family of Mini Circuits. Eventually, the receiver turned out to be non-optimal from an engineering standpoint, though functionally complete.

The Low Noise Amplifier remained as a critical component, as our attempts to replace it had not yet led to a proper result. As a result of the above, the I and Q parts of the input SAW sensor RF echo signal containing information about phase shifts in the SAW sensor caused by variations of pressure and temperature of air in the tire were extracted. Since then, it has been possible to coherently detect the echo pulses of the SAW sensor and recover the frequency corresponding to the mentioned phase shifts.

In addition, the transmitter unit was revised and re-engineered to increase the modulation depth and shorten the pulse duration of the burst signal. The goal was to depress the level of spurious carrier frequency in the time intervals between bursts. Greater than a 60 dB reduction of the spurious signal was achieved by making use of the serial connection of three SA630 switches separated by loss-compensating transistor amplifiers. The controller unit, containing a S/H Amplifier, A/D Converter, controller board and LC Display, were fabricated and adjusted. Finally, the process of adjustment of both the interrogator concept rev. 1 based on the method of average reading and SAW TPM System as a whole was completed (see FIGS. 138 and 139). Thus, it was possible to estimate temperature and pressure changes in a pressure chamber installed on the rim of a laboratory simulator using a real existing SAW sensor.

The technical specifications of the Interrogator Rev. 1 are presented below.

Technical Specifications of the Interrogator Concept Rev.1.

| | |
|---|---|
| Transmitter unit. | |
| Tx Antenna Type | Modified Dipole (see ESR2002.1280.002/ATSH) |
| Tx Antenna Gain | 0 dB; |
| Tx Antenna input impedance | 50 Ohm; |
| Amplitude of Burst in Tx antenna | 0.8 V (1.6 Vpp); |
| Burst Duration | 100 ns; |
| Burst Period | 6.4 μs; |
| RF Carrier frequency | 433.9 MHz. |
| Receiver Unit. | |
| Rx Antenna Type | Modified Dipole (see Appendix 2) |
| Rx Antenna Gain | 0 dB; |
| Rx Antenna input impedance | 50 Ohm; |

-continued

| Technical Specifications of the Interrogator Concept Rev.1. | |
|---|---|
| Sensitivity | 60 dBm (Without LNA) |
| The required bandwidth of SAW pulses is $\Delta F = 1/\tau_r$ | 10 Mhz |

The SAW TPM System Concept Testing

The system to be tested consisted of one interrogator and one SAW sensor installed on a single wheel. The operating read-out distance between the sensor and the interrogator was up to 0.5 m (without LNA). Typical temperature/pressure sensitivity properties of developed sensors measured under stationary conditions are shown in FIGS. 140 and 141.

Some conclusions from tests of the SAW TPM:

Pressure Measurement

By means of a wireless SAW pressure sensor and interrogated by RF pulses.

The SAW pressure sensor is, by its nature, a SAW delay line for an RF pulse.

The delay line changes its delay time under a stress caused by pressure.

The RF pulse passed through the delay line stressed by pressure will gain an additional phase shift of the RF carrier.

Thus the value of the RF carrier phase shift becomes coupled with the magnitude of the gas pressure in the tire.

After the RF pulse that was transmitted to the SAW sensor by the interrogator comes back to the interrogator's receiver, the additional phase shift is extracted and processed to give the actual magnitude of pressure.

Temperature Measurement

Similar to the measurement of pressure, the only difference is how the delay time changes.

The gas pressure affects the sensor's delay line forcing the diaphragm of the delay line substrate to bend and thus changing the distance (and the time) of the SAW propagation through the delay line. Thus the delay time change is strictly related to the magnitude of the substrate deformation and to the effectiveness of the diaphragm.

The gas temperature changes either the dimensions of the substrate or the velocity of the SAW propagation along the surface of the delay line substrate. This results in a linear dependence between the time delay and the temperature.

The attenuation of the RF pulse passed from the transmitter antenna through the SAW sensor back to the receiver antenna is experimentally estimated as 100 dB in the worst case.

The receiver sensitivity that is required for various locations of antenna is about 90 dBm using one antenna per one wheel.

The interrogator's circuit diagram was revised in order to depress spurious phase shifts that occur under the influence of the wheel environment and wheel rotation. Another modification was to hide the SAW sensor's antenna in the tire and simplify the antenna system of the interrogator. For this reason we chose a "splatch" planar antenna made by LINX Technologies, USA as the antenna of SAW sensor instead of a whip used earlier.

The renewed block diagram of SAW TPM Interrogator, rev.2 is shown in FIG. 142.

This version implements a "single shot reading" operational algorithm which suppresses spurious phase shifts caused by the wheel environment and rotation.

The single pulse request and triple pulse response data readout protocol

According to this design, the pressure monitor has the following sequence of interaction between the interrogator and the sensor.

1. The interrogator's transmitter radiates a request RF pulse 100 ns long at the frequency 433.92 MHz. The period of the pulse repetition is defined by a synchronizer and is equal to 19.2 μs. This period has been widened from the one recently used in the average readings algorithm with the purpose to provide an additional time interval for data transmission to PC and processing.

2. The sensor's antenna receives the request RF pulse and excites surface waves in the delay lines of sensor. The full phase of the excitation signal at the input of the delay lines contains the $\phi_{req}$ component generated in the course of the RF pulse propagation through the air from the interrogator antenna input to the sensor antenna output. Note that the $\phi_{req}$ component depends on a few factors including the mutual arrangement of the antennas, the electromagnetic environment etc.

3. As the surface waves propagate along the delay line substrates, they acquire additional phase shifts $\phi_{T2}$, $\phi_{T3}$, $\phi_{T4}$ depending on current values of the delay time in each of the three delay lines. These phase shifts carry information on pressure and temperature of the sensor's environment.

4. When the wave reaches the output transducers of the delay line, the surface waves excite their sensor's response RF pulses with the delay 1.6; 1.8; and 2.0 μs with respect to the request pulse as shown in FIG. 143. As the outputs of all delay lines are connected to the sensor's antenna, the pulses are radiated to the air successively thus forming a triple pulse echo in the response channel. The phase of the first response pulse differs from that of the request pulse by a value of $(\phi_{req}+\phi_{T1})$, that of the second one by $(\phi_{req}+\phi_{T2})$ and that of the third one by $(\phi_{req}+\phi_{T3})$.

5. When propagating via the response RF channel from the sensor antenna output through the interrogator antenna and receiver to the input of its quadrature demodulator, each of the three response RF pulses acquires an additional phase shift $\phi_{res}$ the nature of which is the same as that of $\phi_{req}$. Thus the full phase increment with respect to the request RF pulse is: in the first response pulse $(\phi_{req}+\phi_{T1}+\phi_{res})$, in the second one $(\phi_{req}+\phi_{T2}+\phi_{res})$, and in the third one $(\phi_{req}+\phi_{T3}+\phi_{res})$.

6. The quadrature demodulator of the interrogator compares the carrier frequency phase of each of the three echo pulses with the phase of the carrier frequency of the local oscillator (LO) successively in time, which is equivalent to a comparison with the phase of the request RF pulse carrier frequency. The result is that at the quadrature demodulator output gating pulses are generated, with their amplitude and polarity defined unambiguously by the sign and the magnitude of this pulse's carrier phase from the LO carrier phase. At the output of the sine channel, the dependence of the gating pulse on the phase difference $\Phi_i$ (i=1,2,3) is described by the function $\sin\Phi_i$, and at the output of the quadrature channel by the function $\cos\Phi_i$.

7. When a maximum signal-to-noise ratio is achieved at the outputs of the in-phase and quadrature channels of the demodulator, i.e. at the moments of time that correspond to amplitude values of the gating pulses, sample-and-hold amplifiers (SHA) perform the storing of those values taking into account their polarity. Thus at the output of SHA connected to the output of the demodulator in-phase channel a constant voltage level appears and is kept until the next comparison, with its value defined as $U_{si\_}=U_i \sin\Phi_i$. Simultaneously, at the SHA output in the quadrature channel a constant voltage appears at the level of $U_{ci\_}=U_i \cos\Phi_i$;

8. Couples of values $U_{si\_}$ and $U_{ci}$, having been digitized, are stored in the memory of the interrogator's processor. After processing the three echo pulses, the interrogator's processor stores six readouts or three couples of numbers equal to $U_{s2}$, $U_{c2}$; $U_{s3}$, $U_{c3\_}$ and $U_{s4}$, $U_{c4}$, respectively.

9. The process of requesting, reading and storing the mentioned numbers continues permanently until an array of N sets $\{U_{s2}, U_{c2}; U_{s3}, U_{c3}; U_{s4}, U_{c4}\}$ is accumulated in the memory of the processor. For example, N can be 60 or any other convenient number that leads to the desired accuracy.

10. After filling the array, its contents are transferred from the interrogator via the RS-232 interface to an external PC for final data processing and display. Note, an external PC was used in this development but in production a microprocessor within the interrogator would most likely be used. Of course this invention is not limited by the choice or location of the processor. With a microprocessor the timing of the various operations would be substantially improved.

11. The external PC can perform a statistical processing of the array of numbers and calculates the values of $\Phi_i$ for i=2, 3, 4 by performing the following operation and making use of couples of numbers of selected M (M<N) sets $\{U_{s2\_}, U_{c2\_}; U_{s3\_}, U_{c3\_}; U_{s4\_}, U_{c4}\}$:

$$\Phi_i=arctg2((U_{si\_}=U_i \sin\Phi_i)/(U_{ci\_}=U_i \cos\Phi_i))=(\sin\Phi_i/\cos\Phi_i)$$

This method of finding the phase difference angle renders negligible the influence of the amplitude value of the pulse $U_i$ on the credibility of the $\Phi_i$ calculation. This fact enables us to weaken the requirements of uniformity of the amplitudes of each of the three pulses within the full echo of the SAW sensor and eventually increase the percentage of valid sensors in their mass serial production. In addition, this feature of an algorithm depresses a measurement error caused by wheel rotation. It is clear that the readout time equal to 0.8 μs is so short that we can consider the wheel unmoving even at the automobile speed of 110 mph.

Nonetheless, the effect of the wheel rotation may cause an additional error of tire pressure measurement through a deformation of the piezoelectric substrate of the SAW sensor under the centrifugal acceleration. This effect can be eliminated by placing the sensor so that its substrate's plane is located in the plane of the wheel rotation.

12. The obtained array of sets $\{\Phi_2, \Phi_3, \Phi_4\}$ is used to calculate the value of the air temperature and pressure in the vehicle tire. The difference of the phase shifts $(\Phi_3-\Phi_2)=\Delta\Phi_t$ related to the pulses of the temperature sensing element gives an information to calculate the air temperature by the relation:

$$t°=t°_o+(1/k_t)(1-(\Phi_2-\Phi_1)/2\pi f_o(T_2-T_1)),$$

where:

- t° is the temperature of the air in the tire being measured;
- $k_t$ is temperature coefficient of time delay of $LiNbO_3$ (Y+127.86°,X)—cut substrate;
- $T_1$ and $T_2$ are respective constants of nominal signal delay time in 1st and 2nd SAW delay lines formed on a temperature-sensible substrate of the sensor at a known nominal temperature $t°_o$;
- $f_o$ is the carrier frequency of the request pulse 433.92 MHz.

The difference of the phase increments $(\Phi_3-\Phi_2)-(\Phi_2-\Phi_1)=\Delta\Phi_p$ is used to calculate the air pressure by the formula:

$$p=p°_o+\Delta\Phi_p/2\pi f_o k_p(T_3-T_2)^*,$$

where:

- p is the air pressure in the tire being measured;
- $k_p$ is a constant of the DL delay time v. pressure dependence coefficient determined by the design of the sensor;
- $T_2$ is a constant of the nominal signal delay time in the second SAW delay line formed on a temperature-sensitive substrate of the sensor at a known nominal temperature $t°_o$;
- $T_3$ is a constant of the nominal signal delay time in the delay line formed on a pressure-sensitive substrate of the sensor at a known nominal temperature $t°_o$ and atmospheric pressure $p_o$.
- $f_o$ is a carrier frequency of the request pulse, 433.92 MHz.
- *the formula has been derived from the equality $(T_3-T_2)=(T_2-T_1)$ defined by the design of the sensor's delay elements.

Particular attention should be paid to the fact that the differences of phase increments $\Delta\Phi_t$ and $\Delta\Phi_p$ used for the final calculation do not contain phase shifts $\phi_{req}$ and $\phi_{res}$, which are eliminated by this calculation. Therefore the influence of the request/response RF channel properties upon the accuracy of the pressure/temperature measurement is negligibly small. Further elimination of instrumental errors is explained in Appendixes 4 and 5. This is the principal advantage of the single shot readings algorithm implemented by the SAW TPM Interrogator rev.2 from the average readings algorithm employed by us previously with the Interrogator rev.1.

13. The obtained values are displayed by the external PC as plots and numbers.

Procedure of data processing by the external PC and output of the final information.

To obtain instant information on the pressure and temperature in the car's tire, we developed a simplified program to process data accumulated in a built-in controller of the interrogator. To speed up the development, we divided the functions of the SAW TPM control and the result calculation between the controller of the interrogator and an external PC. They were to communicate via a standard RS 232 connection using the COM1 or COM2 serial port.

Since the software for the SAW sensor data processing had not been completely debugged, at that stage of the project all computational operations were committed to the external PC. As practical data were going to accumulate, an ever-increasing part of the calculations would be imposed on the built-in microprocessor of the interrogator thus decreasing the amount of data transferred to PC.

For now, the tasks performed by the interrogator's controller are limited to the following:

- generation of micro-commands for controlling the hardware of the interrogator;
- preliminary analysis of correctness of signals received from the sensor;
- control of the analog-to-digital conversion of analog signals stored in six sample and hold amplifiers;
- accumulation of primary data in the controller's memory;
- transmission of the accumulated data to the external PC (by command of the external PC).

After the data has been transmitted to the external PC, the controller of the interrogator repeats the data accumulation cycle. At the same time, the external PC performs the processing of the received data.

Taking a closer look at the operational algorithm of the interrogator's controller during the data accumulation cycle, one cycle starts by the generation of a micro-command that triggers the pulse transmitter of the interrogator. After receiving three response pulses from the sensor echo, gating pulses separated in time appear at two outputs of the quadrature demodulator, with their amplitudes proportional to in phase (I) and quadrature (O) components of three input RF pulses. Each of the in phase (I) and quadrature (O) channels has three sample and hold amplifiers (SHA) the inputs of which receive signals from the respective outputs of the quadrature demodulator.

According to the known time intervals, the controller gives out three sequential sample pulses of information and feeds them to control inputs of SHA. Each of the three sample pulses is fed to two SHA inputs only, into the in phase (I) and quadrature (O) channels at the same time. Thus, six SHA register analog information about the sine (I) and cosine (O) components of the three input pulses. These operations are performed by the controller after each request pulse of the transmitter whether the sensor's echo is received or not.

Further micro-commands for analog-to-digital conversion of six analog signals stored in SHA are generated by the controller only after the levels of the received signals have been analyzed. An analog comparator in the RSSI device can be used for this purpose. If the amplitude of the sensor's echo exceeds a given value, then the controller proceeds with the signal processing. Otherwise the recorded information is deleted, and the whole cycle is repeated from the beginning.

If the input signals have sufficiently big amplitudes, the six analog signals stored in SHA are A/D-converted sequentially in time. This information is then stored in the controller's memory. The micro-array of six values contains the full information regarding instantaneous phases of the three echo pulses of the sensor (three sine and three cosine components). Then the sensor request cycle is repeated. There are typically 60 repetitions of the request cycle.

Four calibration request cycles can then be sent. The difference in these cycles from the information cycles is that the pulses of the analog information recording to SHA are shifted along the time axis and set in time intervals where there are no echo pulses from the sensor. The information registered at those moments contains data about the amplitudes of DC offsets at the outputs of the quadrature demodulator. In the course of further processing, these DC offsets are subtracted from the signals being processed in order to reduce the measurement error. This is the way to perform self-calibration of the read-out system.

After the controller's memory has accumulated 64 micro-arrays of information (60 informational micro-arrays and 4 calibration micro-arrays), the controller gives out the READY signal to indicate that it's ready to transmit the data to the external PC.

The accumulation time is about 0.002 seconds. After completing this transmission, the controller's memory is cleared and the request cycle is repeated. The length of the data transmission to PC is about 0.7 sec. Further processing of the data is performed by PC.

First, it corrects the data stored in the informational micro-arrays by subtracting the DC offsets stored in the 4 self-calibration micro-arrays. The next step is to calculate three values of instantaneous phase shifts for each of the 60 micro-arrays. This is equivalent to measuring instantaneous phases of the sensor's three echo pulses in a single request cycle: $\Phi_1$, $\Phi_2$, $\Phi_3$. Then, the differences ($\Phi_2-\Phi_1$) and ($\Phi_3-\Phi2$) are calculated to obtain data about the pressure and the temperature.

Note two important points in these calculations. First, the information about the current state of the sensor in one interrogation cycle is obtained for less than one microsecond. This time is so small that the sensor installed on the rotating wheel can be treated as one standing still with respect to the interrogator's antenna even if the car moves at greater than 110 mph. Remember that this is true only for a single interrogation of the sensor, so all calculations have to be repeated independently for each of the micro-arrays.

Second, all values of the $\Phi_i$ phase are calculated by a standard routine a tan 2 that finds an angle by known sine (I) and cosine (Q) components. It determines the angle unambiguously within the interval −180 to +180 degrees and lets us reduce the calculation error caused by variations of the input pulse's amplitude.

In the production version, these calculations would be done by a microprocessor as part of the interrogator and the amount of data transmitted from the internal microprocessor to the external PC will be three times less. The performance of the system will triple as well.

The calculations described above for 60 micro-arrays yield 60 couples of the phase differences ($\Phi_2-\Phi_1$) and ($\Phi_3-\Phi2$). Each of the couples ($\Phi_2-\Phi_1$) and ($\Phi_3-\Phi2$) is used to calculate the current values of pressure and temperature in the tire.

Independent average values over the array of the sixty data pieces ($\Phi_2-\Phi_1$) and ($\Phi_3-\Phi2$) will reduce the measurement error. This operation could also be done by the interrogator microprocessor. This will decrease the amount of the transferred data 60 times again, and the calculation time will become comparable to that spent for the data readout (about 0.005 sec). The data refreshing period will reduce to about 0.01 sec.

Thus, the pressure and temperature data from the tire is sent to the external PC in the development system which:

- records the incoming information;
- generates appropriate commands or warnings when the parameters deviate from their normal values;
- displays the pressure and temperature information on the monitor.

In the development system, when the interrogator operates, the program operates as follows.

If no calibration has been performed, the program proposes to perform the calibration. The user is requested to specify the following data:

- the current temperature inside the tire (the limits are −40 to +125° C.);
- the current air pressure inside the tire (the limits are 0 to 6.0 atmosphere);
- the pressure sensitivity scale factor of a particular sensor specified by the manufacturer plant (the only limitation is >0).

If the calibration data are valid, the program saves it to disk and uses it in its further operation without any additional requests.

The further operation of the program takes place automatically. Having read a new data array from the interrogator, the program performs an analysis of the received data.

The current information is saved to a log file and displayed on the screen as plots and numbers of the pressure and temperature, and is duplicated by three light warnings. Two light indicators display the pressure and temperature when beyond the allowable limits by color and numbers.

The third indicator shows the current status of the radio link between the interrogator and SAW transponder ("no signal", "bad signal", or "good signal"). General view of screen is shown in FIG. 144.

TPM Interrogator rev.2. Specifications.

The interrogator rev.2 has eliminated some drawbacks possessed by the early design. In particular, the electronic circuitry of the interrogator, its case and electromagnetic screening elements are engineered as a single device. The developed SAW TPM interrogator generally consists of the radio request unit (transmitter) and the sensor response evaluation unit (receiver +controller). The request signal and the sensor's response signal have to be separated. The separation issue becomes the most important one because the characteristics of the receiver sensitivity and the transmitter output power are growing together with their max values. To solve the problem, we separated the receiver and transmitter PCBs with the purpose to get rid of spurious signal levels. We then mounted the PCBs of receiver and transmitter in separated and electrically insulated cells of the interrogator case.

The next step was to combine the controller unit and RSSI in the single PCB with the purpose to reduce the number of interconnections. That PCB must occupy the third cell of the interrogator case. Finally, the last cell is allocated to the synchronizer unit. The result is that the effect of mutual electromagnetic disturbances during the operation of the device's components has become minimal.

These features enable us to improve the sensitivity of the interrogator's receiver and reduce the radiated power of its transmitter. Below is a specification of the interrogator.

| | |
|---|---|
| Tx/Rx frequency | 433.92 MHz |
| Request/response division method | TDM |
| Interface (to external PC) | RS-232 |
| Supply voltage | 12 V |
| Supply current | 600 mA |
| Dimensions | 245 × 100 × 28 mm |
| Antenna | |
| Rx/Tx Antenna Type | Modified Dipole* |
| Rx/Tx Antenna Gain | 0 dB; |
| Rx/Tx Antenna input impedance | 50 Ohm; |
| Transmitter unit. | |
| Amplitude of Burst in antenna | 900 mVpp (can be increased up to 1.6 Vpp); |
| Burst Duration | 100 ns; |
| Burst Rep Time | 19.2 μs; |
| Receiver Unit. | |
| System bandwidth (−3 dB) | 10 MHz; |
| Sensitivity | 100 dBm |

*The receiver and the transmitter share the antenna

SAW TPM rev.2 tests on a rotating wheel.

Check of manufactured saw TPM before tests.

First, we had checked the operation of the manufactured SAW TPM using the circuit of the block diagram of Interrogator rev.2, shown in FIG. 142. The system signals are shown in FIGS. 145–148.

Step 1. The transmitter of the interrogator has generated a pulse) and has radiated it from an antenna to the SAW sensor, as shown in FIG. 145. The burst parameters are: time duration −100 ns; amplitude −1.4 Vpp. It is possible to increase the burst amplitude up to 2.5 Vpp. Time scale: 500 ns/div; Amplitude scale: 0.2 V/div Step 2. The SAW sensor has received the burst signal and has returned the echo signal as shown in FIG. 146. The echo consists of three RF pulses mentioned above. The design of sensor has used a pulse duration of 200 ns.

Step 3. After receiving and processing the echo, on the outputs of the Quadrature Demodulator, three I and Q components are obtained corresponding to the each of the RF pulses of the echo signal as shown in FIG. 147. After sample/holding and A/D conversion they are sent to the controller unit for calculation of the phase angles corresponding to the temperature and pressure values. The I and Q components are also sent to the input of the RSSI. This unit has transformed them as ($I^2$+$Q^2$) with the purpose to obtain of the output signal, which is independent of the phase shifts as shown in FIG. 148.

Note that the pulses in FIGS. 146 and 148 correspond to each other. Meantime the RSSI output pulses do not depend on the RF phase shifts as do the I and Q components of FIG. 147.

SAW transponder antenna design.

Recently, a SAW transponder was engineered as a unit embedded in rubber (or another elastic material) and strapped onto the wheel rim under the tire using braids. This opens a possibility to use a modified dipole antenna embedded in the braid. The reason is to improve the energy of the RF link between the sensor and the interrogator at least by 6 dB. This design was experimentally tested and showed an excellent result until the rim was covered by the tire, because the RF signals did not pass through the cord of the tire if the long side of the antenna and wires of the cord are parallel. So, during of the primary checking, a miniature planar "SPLATCH" antenna was used as the SAW sensor antenna. The current design uses a "SPLATCH" in the transponder and a dipole in the interrogator. General and undercover views of "SPLATCH" are shown in FIG. 149.

The transfer frequency response of RF link that has been formed by this antenna together with modified dipole antenna of interrogator (see FIG. 130) is shown in FIG. 150. Both antennas give approximately 20 MHz of frequency bandwidth with a 3 dB rejection. The flesh mark corresponds to the displayed frequency of 434 MHz (see the right upper corner of picture).

Measurement of RF attenuation inserted by a wheel tire.

During the development of SAW TPM, papers that describe experimental results regarding measurement of RF losses inserted by the tire into the radio link between the TPM interrogator and the SAW sensor were sought but none were obtained.

For this reason, the cycle of measurements is as described below. The goal of the experiment was to measure the RF signal attenuation level caused by an uninflated wheel tire.

A block diagram of the measurement system is shown in FIG. 151. On the transmitting side, it consists of a laboratory oscillator and a planar miniature "SPLATCH" antenna. The antenna is installed on the wheel rim and is connected to the oscillator by an RF cable as shown in FIG. 152. On the receiving side, it consists of a modified dipole antenna connected to the RF amplifier through a band-pass filter and an oscilloscope. The dipole antenna is mounted at the distance of 11 cm from the edge of the transmitting antenna as shown in FIG. 153. This distance is chosen to allow for the need to achieve a minimum level of the RF attenuation in the air.

The band-pass LC-filter is adjusted to the central frequency of 433 MHz and has a wideband equal to 10 MHz at the edge of −3 dB. This filter's wideband is approximately matched to the width of the interrogator's burst spectrum.

First, the minimum distance between the antennas is adjusted to be about 11 cm. Then, the lab oscillator was switched on and adjusted to the frequency of about 433.92 MHz in the pulse modulation mode. The pulse duration was adjusted to about 100 ns and the period of pulses' repetition was adjusted to about 20 μs. After completion of the adjustment process, the amplitude of the received pulses on the oscilloscope screen was measured. Next, a slow rotation of the wheel was started and the dependence of the received pulses' amplitude on the value of the rotation angle was fixed. Finally, the transmission part was covered with the tire as shown in FIG. 154 and the measurement described above repeated.

A key discovery of the project was the unexpected effect of placing the antenna transverse to the tire cords which gave the unexpected result of increasing the transmission angle and essentially eliminating the shielding of the antenna by the tire rim.

The results obtained are summarized in Tables 1, 2 and 3.

TABLE 1

| Parameter | Without the tire | With the tire | Tire insertion loss, dB |
|---|---|---|---|
| Amplitude level of the received RF Pulses, Vpp, mV | 100 | 100 | |
| Output level of Lab Oscillator, Vpp, mV | 52 | 100 | 20 lg (100/52) = 5.8 |

TABLE 2

| Wheel without the tire | | | | | |
|---|---|---|---|---|---|
| Value of the rotation angle, deg | −90 | −45 | 0 | +45 | +90 |
| Output level of Lab Oscillator, Vpp, mV | 52 | 52 | 52 | 52 | 52 |
| Amplitude level of the received RF Pulses, Vpp, mV | 24 | 32 | 100 | 32 | 24 |
| Relative attenuation as 20 lg (Vpp/100 mv), dB | −12.4 | −9.9 | 0 | −9.9 | −12.4 |
| The cross correlation pattern width of the Rx/Tx antennas (−6 dB), deg | | | +/−30 | | |

TABLE 3

| Wheel with the tire | | | | | |
|---|---|---|---|---|---|
| Value of the rotation angle, deg | −90 | −45 | 0 | +45 | +90 |
| Output level of Lab Oscillator, Vpp, mV | 100 | 100 | 100 | 100 | 100 |
| Amplitude level of the received RF Pulses, Vpp, mV | 44 | 66 | 100 | 66 | 44 |
| Relative attenuation as 20 lg (Vpp/100 mv), dB | −7.1 | −3.6 | 0 | −3.6 | −7.1 |
| The cross correlation pattern width of the Rx/Tx antennas (−6 dB), deg | | | +/−80 | | |

The wheel tire attenuation inserted in the RF interrogation link of the SAW TPM has been measured and is equal to 6 dB. This value was used in a development.

Measurement of a dependence of the sensor's echo amplitude on the wheel rotating angle.

In addition, a SAW transponder (antenna+SAW sensor) was installed on the wheel rim and the cross correlation pattern width of the Rx and Tx antennas of TPM system was measured using an interrogator as a source of requested pulse. An amplitude gain control loop had been disconnected during experiment. The angles were measured as shown in FIG. 155.

The zero value of the tire rotation angle conformed to the position of the wheel in which the SAW transponder was at a minimal distance from the interrogator's antenna.

The results obtained are summarized in FIG. 156.

In order to determine the effect of the tire steel cord, measurements both without (see the second column of the table) and with (the third column) the tire covering the wheel were performed.

When working without the tire, the signal's disappearance in the range of the wheel rotation angles from ±(110)° to ±(180)° (see FIG. 156) can be explained by the shielding effect of the wheel rim. In this sector, the sensor enters a zone of a perfect radio shadow where the antennas of the sensor and the interrogator cease to communicate.

When there is a tire, things change. In the shadow sector, the signal does not disappear totally but even increases a little bit (up to 10 dB) at the rotation angle close to ±180°. This might be explained by a dispersing and reflecting effect of the tire steel cord. In this sector of the rotation, the steel cord and the wheel rim together could behave as a waveguide.

The obtained results show that cord of the tire dissipated the RF signal energy and thus broadened the working angle sector of interaction of the interrogator's and SAW sensor antennas. Its value is estimated at +/−80 degrees.

In addition, it has been determined that it is preferable to place the sensor's antenna on the steel wheel rim exactly as shown in FIGS. 152 and 153.

At this orientation of the antenna with respect to steel threads of the cord woven inside the tire (see FIG. 157), the RF oscillations radiated by the antenna will easily penetrate to the tire and reach the interrogator antenna. In its turn, the interrogator's antenna should be oriented by its longer side perpendicularly to the cord threads as shown in FIG. 157.

This orientation of the two antennas with respect to each other and to the cord threads yields the weakest attenuation of the RF signal in the radio link between the interrogator and the SAW transponder. Other orientations can also be made to work as long as the orientation is not parallel to the tire cords with the antennas on either side of the cords.

It is possible to make the antenna through the valve stem but this design will have a few drawbacks:

a) a valve stem to be used as a rod radiator of the antenna outside the tire must be at least λ/4=17.2 cm long (see FIG. 158*b*). Also, it must be used jointly with a second electrode working as a ground plane;

b) the perfect diameter of the ground plane is also λ/4=17.2 cm, and the radiating rod is very desirable to place in the center of the ground plane (see FIG. 158*a*). Any deviation from this arrangement will cause substantially greater attenuation of the RF signal in the radio link between the sensor and the interrogator. That is, such deviation will eventually require the interrogator's receiver sensitivity and the transmitter power to be improved again. Experiments done by us with the valve stem as a shortened rod radiator of the antenna have shown this solution is worse by at least 20 dB by its level of attenuation introduced to the RF link.

c) the sensor's antenna placed outside the wheel will be subject to external effects (such as mechanical damage, moisture, dust, dirt) much more than one hidden inside the tire.

The complexity of the listed factors would compromise the operability and the fidelity of the SAW TPM system.

Further, we shall return to the discussion on a valve steam as a part of SAW TPM from another point of view.

Other antenna designs can now be used by those skilled in the art. A transmission through the sidewall of the tire where the steel cords are absent is also a possibility, for example.

Car Tests of SAW TPM.

At the beginning of car tests, some improvements in SAW sensors were obtained.

Improvement of SAW Devices.

First, we measured parameters of the single substrate SAW sensors using an interrogator that worked in different modes of operation. As a result, we found spurious signals in sensor's echo that introduced distortions to the pressure/temperature measurements. The source of these signals was unknown. Either a breakthrough of transmitter carrier to the receiver input or spurious cross channel excitation of SAW in the single substrate SAW sensor could cause these results.

At the beginning, we had used an external tunable RF oscillator as a local oscillator in the interrogator's receiver. Since then, we looked at the possibility of making the interrogator a tool for verifying the SAW sensor properties in the course of their manufacturing. By changing the external generator's frequency (FIG. 159) and observing the echo signal on the oscilloscope display we can measure the Frequency Response of the SAW Sensor and the whole SAW TPM system.

The measurement scheme suggested this would be a good tool for an investigation of the SAW TPM system as a whole. With this, we could state that spurious signals did not appear as a mismatch between the request pulse frequency and the sensor's working frequency.

Moving a central frequency of burst to the center of the system's frequency response we minimized distortions on the echo and established that the last residual source of distortion has to do with the spectrum width of the burst pulse. Width of the burst spectrum and the associated sensor's echo spectrum were too big to be correctly processed in the SAW sensor and then in the interrogator. A simple increase of pulse time duration did not give a solution because the SAW sensor's delay lines have fixed and limited delay times.

So we decided to try to change both the time duration of burst to 300–400 ns with an appropriate increase of delay in the SAW sensor and to change the strobe time positions in the interrogator's receiver.

According to this plan we manufactured and tested SAW sensors of two types. One of them had a widened (multiplied by 2) frequency bandwidth of the interdigital transducers of the SAW delay lines with the same time delays as earlier. The sensor of the second type had been manufactured with the widened frequency bandwidth and with delay times twice as long between the echo pulses.

The reason for the experiment was to obtain the flat-topped echo pulses and to estimate the influence of ripples on the pulse on the accuracy of sampling in Sample/Hold amplifiers (see interrogator's circuit in FIG. 142). Finally, we established that the reading accuracy strongly depends on flatness of the pulse top.

Consequence: pulses on the quadrature demodulator outputs of the SAW TPM must have very little ripple during variations amplitude caused by phase differences of the pulses in the RF echo. We believe it to be expedient to make the appropriate changes in SAW TPM design.

The current status of pulse timing in SAW TPM is shown in FIG. 160. This chart applies to present single substrate SAW sensor that we are using now in vehicle testing.

$T_2$=1.2 μs; $T_3$=1.6 μs; $T_4$=2.0 μs. Duration of every pulse is approximately 370 ns.

The influence of thermal expansion of the sensor's case.

We have detected that thermal dilatation of sensors case causes additional irregular deformations of the SAW substrate and leads to measurement errors. This confirms that the sensor's case material is important. It would be good if both the temperature coefficient of linear expansion of SAW substrate and the coefficient of sensor's case were equal. If not, a separator between SAW substrate and sensor's case could improve the sensor's operating characteristics.

The design of the pressure/temperature sensor with a silicon micro-membrane.

The phase of the echo pulse in the pressure measurement channel changes due to the lithium niobate substrate being bent by a force applied at the point where the micro-membrane touches the substrate. In this situation the lithium niobate substrate is an elastic element of the pressure measurement system and the micro-membrane is a device that transfers the force. The mechanical properties of the micro-membrane should not contribute significantly to the overall stiffness of the pressure measurement system. The bending of the single-crystal lithium niobate substrate should be determined only by the force applied and the properties of the substrate. Therefore, the micro-membrane should be 10 to 20 times thinner than the lithium niobate substrate. The change of the echo signal's phase will then be strictly proportional to the air pressure upon the membrane.

In actual sensors having metallic micro-membranes, these requirements are not exactly met. There are three key reasons for this:

non-uniform thickness of the micro-membrane after the profile has been formed;

poor repeatability of the micro-membrane's formed profile (the lack of special equipment at microelectronics plants);

difficulties with the technology of forming a thin and hermetic welded joint between the micro-membrane and the base of the sensor's case. An additional complication is that the thickness of the case's base and the micro-membrane differ by more than a factor of 30.

The result is that the sensitivity of the pressure sensors vary 1.5 to 2 times from one sensor to another.

We have begun working on replacing the metallic micro-membrane with one made of silicon. The single-crystal silicon micro-membranes are known to surpass all other common micro-membranes in their performance (see, for example, "Proceedings of the IEEE, volume 70, number 5, May 1982, pp. 5–49"). Traditional microelectronic engineering technologies are used to produce these membranes. The silicon micro-membranes are better in their properties of repeatability and manufacturing precision. We have fabricated and tested a few sensor prototypes with various silicon micro-membranes.

The results of the testing have confirmed that this micro-membrane type is quite promising. Therefore we have decided to make a sensor prototype with the silicon micro-membrane. In addition to the micro-membrane, another important component is made of silicon in this design: a pedestal under the lithium niobate substrate. A precise arrangement of the pedestal's border and the micro-membrane with respect to each other is another important parameter that defines the repeatability of the sensor's performance. In the new design, both the pedestal and the micro-membrane are made in a single production cycle on the same single-crystal silicon plate. The precision of the pedestal and the micro-membrane is provided by the production technology of the whole base, which is the photolithography. Therefore we expect a much better repeatability of the sensors' performance.

The design of the silicon base (the micro-membrane and the pedestal) is presented in FIG. 161. The general view of both sides manufactured Si-membrane prototype is shown in FIG. 162.

We have solved the problem of antenna's protection against salt/water by use of silicone potting compound. The compound has been spread on the surface of the interrogator's antenna. A compound layer prevents a short circuit contact between dipole electrodes of antenna due to salt water film. We used an antenna covered with Si-layer in road tests of SAW TPM. No failures or increasing of signal attenuation have been seen. Details of the in-vehicle tests can be found in the provisional application which is included herein by reference.

A wheel identification method.

For vehicles with many wheels, such as trucks, some method to differentiate between the wheels is needed. A hybrid method for the SAW sensor's passive wireless switching with the purpose of serially interrogating the different wheels on a truck can be used as a wheel identification method. The idea is to switch on a sensor in the desired wheel and simultaneously to switch off all of the sensors in the other wheels. It can be done with adding of a small receiver to the present SAW transponder as shown in FIG. 163.

Note that a receiver of the RF drive signal is a passive unit that could be installed in a valve steam separately and connected with the present SAW transponder through a single short wire. Therefore, we have identical SAW transponders in all of the wheels, but the activation of the desired wheel can be done through the transmission of a control signal matched with the appropriate unique receiver.

Another important feature is that the control signal occupies a narrow frequency band so we satisfy the ISM frequency band limitation and simultaneously improve the energy measures of the RF drive link.

A passive receiver that can act as a driver for the SAW transponder in the chosen wheel is shown in FIG. 164. Wheel identification is based on the principle of frequency division multiple access (FDMA) and is possible due to use of a passive narrow-band resonator at the front end of the receiver.

The receiver is a simple crystal receiver (see FIG. 164). The drive RF oscillation of a desirable carrier frequency received by its antenna passes through SAW resonator to the diode rectifier. After being rectified, it charges a capacitor on the receiver output. A DC voltage integrated on output RC is a driver signal that switches on the RF switch coupled with sensor (see FIG. 163) and makes it possible to interrogate a SAW sensor by the burst pulse radiated from an interrogator in usual manner.

A fundamental difference of every receiver from is the resonant frequency of the SAW resonator. Resonators with different working frequencies can be manufactured for operation in the ISM band. This poses a potential problem as to how to avoid randomly having two tires with the same resonant frequency on the same vehicle as using a single frequency does not provide for enough distinct frequencies to cover the potential vehicle population. One solution is to use the combination of a code and a frequency or another is to use more than one frequency in a tire.

This simple receiver inserted into a valve steam will give each wheel an identification. Note that at the same time all of the SAW sensors installed in the various wheels stay identical. The problems of analysis and experiments are to develop of an appropriate RF switch and appropriate circuitry etc.

Appendix 2—Mathematical Model of the TPM System $T := -40, -39.0 \ldots 125$ Working temperature range ° C.

$kt := -0.00007$ Temperature coefficient of delay of lithium niobate.

$f0 = 433.92$ Working frequency (MHz).

$$FP := 60 \cdot \frac{(2 \cdot \pi)}{360}$$ Phase shift called by pressure.

$t1 := 1.6$ $t2 := 1.0$ $t3 := 2.0$ Time position echo impuls, μs.

$a1(T) := \sin[2 \cdot \pi \cdot f0 \cdot t1 \cdot (1 + kt \cdot T)]$ $b1(T) := \cos[2 \cdot \pi \cdot f0 \cdot t1 \cdot (1 + kt \cdot T)]$ $$\phi 1(T) := 180 \cdot \frac{\operatorname{atan2}(b1(T), a1(T))}{\pi}$$

Absolute phase of the first impulse.

$a2(T) := \sin[2 \cdot \pi f0 \cdot t2 \cdot (1 + kt \cdot T)]$ $b2(T) := \cos[2 \cdot \pi \cdot f0 \cdot t2 \cdot (1 + kt \cdot T)]$ $$\phi 2(T) := 180 \cdot \frac{\operatorname{atan2}(b2(T), a2(T))}{\pi}$$

Absolute phase of the second impulse.

See FIG. 165.

$dF(T) := \phi 2(T) - \phi 1(T)$

Calculated phase shift called by temperature.

$$dF(T) := \left| \begin{array}{l} f \leftarrow dF(T) \\ \text{while } |f| > 180. \\ \quad f \leftarrow \left| \begin{array}{l} f \text{ if } -180 \le f \le 180 \\ (f + 360) \text{ if } f < -180 \\ (f - 360) \text{ if } f > 180 \end{array} \right. \\ f \end{array} \right.$$

$a3(T) := \sin[2 \cdot \pi \cdot f0 \cdot t3 \cdot (1 + kt \cdot T) + FP]$ $b3(T) := \cos[2 \cdot \pi \cdot f0 \cdot t3 \cdot (1 + kt \cdot T) + FP]$ $$\phi 3(T) := 180 \cdot \frac{\operatorname{atan2}(b3(T), a3(T))}{\pi}$$

Absolute phase of the third impulse.

$dFP(T) := \phi 3(T) - \phi 2(T) - dF(T)$ Calculated phase shift called by pressure.

$$dFP(T) := \left| \begin{array}{l} f \leftarrow dFP(T) \\ \text{while } |f| > 180. \\ f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

See FIG. 166.

Appendix 3—Mathematical Model of the NEW TPM System

T:=−40, −39.0 . . . 125 Working temperature range ° C.

kt:=−0.0007 Temperature coefficient of delay of lithium niobate.

fO:=433.92 Working frequency (MHz).

$$FP := 60 \cdot \frac{(2 \cdot \pi)}{360}$$

Phase shift called by pressure.

t1:2.4 t2:=2.95 t3:=3.55 t4:=4.10 Time position echo impuls, µs.

$a1(T) := \sin[2 \cdot \pi \cdot f0 \cdot t1 \cdot (1 + kt \cdot T)]$ $b1(T) := \cos[2 \cdot \pi \cdot f0 \cdot t1 \cdot (1 + kt \cdot T)]$ $$\phi 1(T) := 180 \cdot \frac{\operatorname{atan2}(b1(T), a1(T))}{\pi}$$

Absolute phase of the first impulse (only temperature).

$a2(T) := \sin[2 \cdot \pi \cdot f0 \cdot t2 \cdot (1 + kt \cdot T)]$ $b2(T) := \cos[2 \cdot \pi \cdot f0 \cdot t2 \cdot (1 + kt \cdot T)]$ $$\phi 2(T) := 180 \cdot \frac{\operatorname{atan2}(b2(T), a2(T))}{\pi}$$

-continued

Absolute phase of the second impulse (only temperature).

$a3(T) := \sin[2 \cdot \pi \cdot f0 \cdot t3 \cdot (1 + kt \cdot T)]$ $b3(T) := \cos[2 \cdot \pi \cdot f0 \cdot t3 \cdot (1 + kt \cdot T)]$ $$\phi 3(T) := 180 \cdot \frac{\operatorname{atan2}(b3(T), a3(T))}{\pi}$$

Absolute phase of the third impulse (only temperature).

See FIG. 167.

$dF(T) := \phi 3(T) - 2 \cdot \phi 2(T) + \phi 1(T)$ Calculated phase shift called by temperature.

$$dF(T) := \left| \begin{array}{l} f \leftarrow dF(T) \\ \text{while } |f| > 180. \\ f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

$a4(T) := \sin[2 \cdot \pi \cdot f0 \cdot t4 \cdot (1 + kt \cdot T) + FP]$ $b4(T) := \cos[2 \cdot \pi f0 \cdot t4 \cdot (1 + kt \cdot T) + FP]$ $$\phi 4(T) := 180 \cdot \frac{\operatorname{atan2}(b4(T), a4(T))}{\pi}$$

Absolute phase of the fourth impulse (temperature and pressure).

$$dFP(T) := \phi 4(T) - \phi 3(T) - \frac{(t4 - t3) \cdot (dF(T))}{(t3 + t1 - 2 \cdot t2)}$$

Calculated phase shift called by pressure.

$$dFP(T) := \left| \begin{array}{l} f \leftarrow dFP(T) \\ \text{while } |f| > 180. \\ f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

See FIG. 168.

Appendix 4—Calculation of the Error Involved in the Measurement of the Echo Pulse Phase Difference by the U2794B Quadrature Demodulator.

The car tire pressure/temperature measurement system is based on a differential principle which lets us improve the accuracy of the measurement to a great extent. The explanation for this is that most sources of the error are common for all pulses being analyzed. Consequently, the introduced errors are subtracted from one another (compensated) during the calculation of the phase difference between the two pulses. Theoretically, all components of the SAW TPM system should introduce the same errors into the phase of each of the sensor's three echo pulses. In this case the total measurement error would be zero after the differences ($\Phi_3-\Phi_2$) and ($\Phi_2-\Phi_1$) were found. Though, there are always a few elements of the measuring system that have errors that are not mutually compensated. In this case the only way to reduce the total measurement error is to improve the accuracy of a particular system's unit.

In the SAW TPM system, this unit is the quadrature demodulator. The part played by the demodulator is to determine instantaneous values of the cosine (Q) and sine (I) components of the sensor's three echo pulses. Values of absolute phases of these pulses $\Phi_3$, $\Phi_2$, $\Phi_1$ vary independently from one another between 0 and 360 degrees. Therefore the error introduced by the quadrature demodulator will be different for each of them. So, the phase differences ($\Phi_3-\Phi_2$) and ($\Phi_2-\Phi_1$) found further will also contain the introduced error.

The U2794B quadrature demodulator that we use is of high quality but even it introduces errors when calculating phase and amplitude, and this deteriorates the measurement accuracy. In order to improve the measurement accuracy, we average the results over many interrogation cycles (64 cycles in the present design). In the stationary measurement mode, when the phases of the echo pulses remain practically invariable, it does not improve the accuracy to any noticeable extent.

Quite different results can be obtained in the case when the phases of all echo pulses vary dynamically at the input of the receiving section of the system (see Appendix 2). It has been noticed that variations like these take place when the car moves because of a mutual displacement of the sensor and the interrogator antennas. In this case the phase of each of the three pulses $\Phi_3$, $\Phi_2$, $\Phi_1$ vary synchronously while their differences ($\Phi_3-\Phi_2$) and ($\Phi_2-\Phi_1$) remain invariable. Averaging 64 values of two phase differences ($\Phi_3-\Phi_2$) and ($\Phi_2-\Phi_1$) can make the measurement error negligibly small. To illustrate this, in Appendix 5 we present calculations of the measurement error for one of the phase differences, ($\Phi_2-\Phi_1$). The calculations for the second phase difference ($\Phi_2-\Phi_1$) are made in the same way. We propose to use this effect and change the phases of all echo pulses at the receiver's input by a phase shifter driven electrically. The similar result can be obtained by changing the phase of the reference oscillation at the LO input of the quadrature demodulator.

It can be proved easily that if the phase changes by 360 degrees during the time $T_{rot}$ needed to process and average the data received from 64 request cycles:

$$T_{rot}=64*19.2\ \mu s=1.228\ ms,$$

where 19.2 μs is the burst repetition period and
64 is the number of the averaging periods;

then the measurement error can be made negligible (as shown in Appendix 5). The period of the request pulse repetition and the number of averaging operations may vary. The important thing is that the phase of all pulses must change by an exact multiple of 360 degrees during the averaging period.

Appendix 5—Calculation of an Error of a Phase Difference in the Quadrature Demodulator U2794B.

$a0:=0.021$ $b0=-0.021$ $\epsilon:=1.5$ $m:=1$ $k:=0.023;$ a0, b0, ϵ, m, k—values of errors, which one are given in documents on the quadrature demodulator U2794B.

$n:=63$ n—number of reading, θ-phase (variable in n reading).

$i:=0, 1 \ldots n$

θ Initial phase shift of the first impulse. It is a random quantity which depends on many variables, but primarily on changes of parameters in the radio-frequency line. The quantity can vary from −180 to +180 degrees. These changes take place at rotation of a tire and in time.

$$\theta(i) := 360 \cdot \frac{i}{(n+1)}$$

$\Psi:=60$

Ψ—Additional phase shift in the second impulse under activity of pressure. The quantity can vary from 0 to 360 degrees. For an example 1 have taken 60 degrees.

Variable with index 1 relate to the first impulse. Variable with index 2 relate to the second impulse (channel of pressure).

$$a1(\theta) := m \cdot \sin\left(\theta \cdot \frac{\pi}{180}\right)$$

$$b1(\theta) := m \cdot (1+k) \cdot \cos\left[(\theta+\varepsilon) \cdot \frac{\pi}{180}\right]$$

Absolute phase of the first impulse.

$$\phi1(\theta) := 180 \cdot \frac{\operatorname{atan2}(b0 + b1(\theta),\ a0 + a1(\theta))}{\pi}$$

$$a2(\theta, \psi) := m \cdot \sin\left[(\theta+\psi) \cdot \frac{\pi}{180}\right]$$

$$b2(\theta, \psi) := m \cdot (1+k) \cdot \cos\left[(\theta+\varepsilon+\psi) \cdot \frac{\pi}{180}\right]$$

Absolute phase of the second impulse.

$$\phi2(\theta, \psi) := 180 \cdot \frac{\operatorname{atan2}(b0 + b2(\theta, \psi),\ a0 + a2(\theta, \psi))}{\pi}$$

$$\delta(\theta, \Psi):=\Phi2(\theta, \Psi)-\Phi1(\theta)$$

δ(θ, Ψ)—Evaluation of a difference in phase between the first and second impulse at one impulse of interrogation (the quantity θ is arbitrary).

$$\delta(\theta, \psi) := \left| \begin{array}{l} f \leftarrow \delta(\theta, \psi) \\ \text{while } |f| > 180 \\ \quad f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

It is a reference computational procedure.

-continued $$\sigma(\psi) := \frac{1}{(n+1)}\sum_{i=0}^{n}\delta(\theta(i),\psi)$$

σ(Ψ)— Average of quantity on several impulses of interrogation. It is equivalent to an average at time (at a motion of the automobile). Quantity θ varies on 360 degrees multiply.

$$\zeta := \Psi - \sigma(\Psi)$$

ζ—Total value error of definition of phase shift Ψ. We shall define more accurately minimum time of an average after readiness above system of pulsing interrogation.

$$\zeta = -7.105\times10^{-15}$$

$$\Psi = 60$$

See FIG. 169.

Appendix 6—Sensor Concept Comparison Report

1. Phase description—Reduced length SAW TPM sensor

| | Longer sensor | Shortened sensor |
|---|---|---|
| $\tau_{bur}$ | 0.70 µs | 1.20 µs |
| Width radiated spectrum, MHz | 1.43 MHz | 0.83 MHz |
| T1 | 4.00 µs | 3.00 µs |
| T2 | 5.00 µs | 4.50 µs |
| T3 | 6.00 µs | 6.00 µs |
| T4 | 7.08 µs | 7.50 µs |
| IL max. | 22 . . . 25 dB | 20 . . . 23 dB |
| Length sensor's substrate | 28.2 mm | 16.2 mm |

The goal of following experiments was to estimate a possibility of a reduced length SAW sensor. Another purpose of was to decide between a micro diaphragm made with a silicone compound or with an ultrasonically drilled diaphragm.

2. Activities During this Phase.

Development of the design of the shortened sensor.

FIG. 40 provides the previous design and FIG. 41 the design with the length reduced by about 50%. An oscilloscope trace is illustrated in FIGS. 172A and 172B.

Mathematical analysis of the shortened sensor.

A mathematical analysis below demonstrates that scaling the pressure and temperatures has been obtained. Accordingly, necessary software changes are made in the interrogator and external PC.

Mathematical modeling of strains and mechanical loads in the substrates are made of both sensor types, the micro diaphragm made with silicone compound and the ultrasonically drilled diaphragm.

Shortened SAW sensor.

P:=0, 1 . . . 6 Working pressure range, Bar.

$T$=−40, −39.5 . . . 125 Working temperature range °C.

$kt := -83\cdot10^{-6}$ Temperature coefficient of delay the lithium niobate.

f0:=433.92 Working frequency (MHz).

kp:=20.0 Pressure sensitivity (coefficient of pressure, degree/Bar).

$$m(P) := \frac{(3-P)\cdot kp}{360 f0}$$ Time shift the impulse #2 and #4, called by pressure, (µs).

t1:=3.0500 t2:=4.5000 t3:=2·$t1$ t4:=$t1$+$t2$ Time position of echo impulses # 1 . . . 4, (µs).

Absolute magnitudes of phase and phase differences, which interrogator are measured.

$$a1(T) := \sin[2\cdot\pi\cdot f0\cdot t1\cdot[1+kt\cdot(T-42.5)]]$$

$$b1(T) := \cos[2\cdot\pi\cdot f0\cdot t1\cdot[1+kt\cdot(T-42.5)]]$$

$$\phi1(T) := 180\cdot\frac{\operatorname{atan2}(b1(T), a1(T))}{\pi}$$

SIN & COS, absolute phase of the first impulse, temperature only.

$$a2(T,P) := \sin\lfloor 2\cdot\pi\cdot f0\cdot(t2+m(P))\cdot[1+kt\cdot(T-42.5)]\rfloor$$

$$b2(T,P) := \cos\lfloor 2\cdot\pi f0\cdot(t2+m(P))\cdot[1+kt\cdot(T-42.5)]\rfloor$$

$$\phi2(T,P) := 180\cdot\frac{\operatorname{atan2}(b2(T,P), a2(T,P))}{\pi}$$

SIN & COS, absolute phase of the second impulse, temperature and pressure.

$$a3(T) := \sin\lfloor 2\cdot\pi f0\cdot t3\cdot[1+kt\cdot(T-42.5)]\rfloor$$

$$b3(T) := \cos[2\cdot\pi\cdot f0\cdot t3[1+kt\cdot(T-42.5)]]$$

$$\phi3(T) := 180\cdot\frac{\operatorname{atan2}(b3(T), a3(T))}{\pi}$$

SIN & COS, absolute phase of the third impulse, temperature, only.

$$a4(T, P)\ \sin[2\cdot\pi\cdot f0\cdot(t4+m(P))\cdot[1+kt\cdot(T-42.5)]]$$

$$b4(T,P)\ \cos\lfloor 2\cdot\pi\cdot f0\cdot(t4+m(P))\cdot[1+kt\cdot(T-42.5)]\rfloor$$

$$\phi4(T,P) := 180\cdot\frac{\operatorname{atan2}(b4(T,P), a4(T,P))}{\pi}$$

SIN & COS, absolute phase of the fourth impulse, temperature and pressure.

$$a21\ (T,P)\ a2(T,P)\ b1\ (T) - b2(T,P)\cdot a1\ (T)$$

$b21(T,P)$ $b2(T,P)\cdot b1(T)+a2(T,P)\cdot a1(T)$ $$F21(T, P) := 180 \cdot \frac{\operatorname{atan2}(b21(T, P), a21(T, P))}{\pi}$$

SIN & COS, phase shift for temperature and pressure measuring.

$a31\ (T) := a3(T) - b1\ (T) - b3(T).a1\ (T)$ $b31\ (T) := b3(T)\cdot b1\ (T) + a3(T)\cdot a1\ (T)$ $$F31(T) := 180 \cdot \frac{\operatorname{atan2}(b31(T), a31(T))}{\pi}$$

SIN & COS, phase shift for accurately temperature measuring.

$a43(T,P) := a4(T,P)\cdot b3(T) - b4(T,P)\cdot a3(T)$ $b43(T,P) := b4(T,P)\cdot b3(T) + a4(T,P)\cdot a3(T)$ $$F43(T, P) := 180 \cdot \frac{\operatorname{atan2}(b43(T, P), a43(T, P))}{\pi}$$

SIN & COS, phase shift for coarse temperature measuring.

Coarse Scale of Temperature.

For this measurement, two-phase differences can be used. In each of them, the effect of pressure is absent (F31) or it is compensated (F42). It is possible to use two other differences phase: F43–F21. Therefore, their difference F31–F42 or F43–F21 does not depend on pressure. However, both differences are equal among themselves any case. The reason is the following: t3–t1=t4–t2=t1

Therefore, the phase difference always is equal to null:

$F31 - F42 = 0$

Coarse(T, P):=F43(T, P)—F31 (T, P)

$$\text{Coarse}(T, P) := \left| \begin{array}{l} f \leftarrow \text{Coarse}(T, P) \\ \text{while } |f| > 180. \\ \quad f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

For the phase shift for course measurement of temperature see FIG. 173.

$$N(T) := \left[ \frac{(t3 - t1)\cdot \text{Coarse}(T)}{dt \cdot 360} \right]$$

$$a(T) := \left| \begin{array}{l} 1 \text{ if } [(N(T) - trunc(N(T))) > 0.5] \wedge (N(T) > 0) \\ 0 \text{ if } [(N(T) - trunc(N(T))) \le 0.5] \wedge (N(T) > 0) \\ -1 \text{ if } [(N(T) - trunc(N(T))) < -0.5] \wedge (N(T) < 0) \\ -0 \text{ otherwise} \end{array} \right.$$

N(T):=trunc(N(T))+a(T) Number of complete revolutions (N(T)*2*π) of the accurately channel temperature measurement.

Accurately scale of temperature.

The precise scale is necessary both for measuring temperature, and for a temperature compensation of the pressure channel (Temp_Comp).

$$F31(T) := F31(T) - F31(42.5)$$

$$F31(T) := \left| \begin{array}{l} f \leftarrow F31(T) \\ \text{while } |f| > 180. \\ \quad f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

$Facc(T) := F31(T) + N(T)\cdot 360$

The phase shift for accurate temperature measurement and compensation.

$$Tmeg(T) := 42.5 - \frac{Facc(T)}{360 \cdot f0 \cdot (t3 - t1) \cdot kt}$$

The measured temperature.

Pressure measuring with compensation of temperature.

$$\text{Temp\_Comp}(T) := Facc(T) \cdot \frac{(t2 - t1)}{(t3 - t1)}$$

Phase shift for compensation of temperature in pressure measuring $dP(T,P) := F21(T,P) - F21(42.5,3) - \text{Temp\_Comp}(T)$ Phase shift for pressure measuring.

$$dP(T, P) := \left| \begin{array}{l} f \leftarrow dP(T, P) \\ \text{while } |f| > 180. \\ \quad f \leftarrow \left| \begin{array}{l} f \text{ if } -180 \le f \le 180 \\ (f+360) \text{ if } f < -180 \\ (f-360) \text{ if } f > 180 \end{array} \right. \\ f \end{array} \right.$$

$$Pmeg(T, P) := 3 - \frac{dP(T, P)}{kp}$$

The measured pressure.

Experiments with Prototype of Shortened Sensor.

The proof-of-concept sensors, which have used the reduced length substrate, had the following dimensions: 16.2×2.1×0.5 mm (with micro diaphragm made with silicone compound) and 16.2×8.0×0.5 mm (with ultrasonically drilled diaphragm) in contrast of 28×2.1×0.5 mm of the original device. These dimensions are suitable for installation into a SIP-6 or DIP-14 (respectively) housing. This approach will help reduce the costs of further sensor production.

3. Testing of Two Sensor's Types.

Concept. The concept of decreasing sensor's length consisted of the following.

In an existing sensor's design, four independent echo pulses come from the four separate acoustical reflectors (see left side of FIG. 40). The distance between reflectors (and length of a sensor as a whole) is defined by duration of an inquiry signal. The main advantage of this design is that the amplitudes of all four-echo pulses can be equal. Tests have shown that the precision of measuring is within the tolerance limits if the amplitudes of the echo pulses do not vary in magnitude by more than ¼. The principal difference of the shortened design is that the third and fourth echo pulses result from a double transit of the SAW transducer and double reflection from acoustical mirrors. Therefore, the sensor's length decreases approximately by a factor of two.

Amplitudes of the third and fourth pulses cannot be more than half of amplitudes of the first and second pulses (at the maximum electrical matching of the SAW transducer with the antenna). It is necessary to note that pressure is calculated by results of measuring a phase difference between the first and second pulse. Amplitudes of first and second an echo pulses are equal approximately, therefore, the maximum accuracy of a phase difference exists.

Another problem of new sensor's design is that the coarse temperature scale cannot be as simply implemented, as in the longer sensor's design. Methods of solving this problem are under development.

Micro diaphragm made with silicone compound or ultrasonically drilled diaphragm. These are two alternative solutions to the pressure measurement problem.

The micro diaphragm made with silicone compound as shown in FIG. 38 and FIG. 38A. The length of the acoustical channel, which is strained by pressure, has not changed in comparison with the longer sensor design. Therefore, the basic mechanical characteristics have also not changed. A mathematical analysis has been done of the mechanical loads and strains of this design. These calculations have permitted the determination of the optimum diameter of a micro diaphragm and sensors sensitivity to air pressure. A micro diaphragm having a diameter of 2–2.5 mm is being used. In this case, the force, which is applied on the end of substrate, constitutes 1.884–2.944 N (0.192–0.3 kilogram-force) at 6.0 Bar. The sensor's sensitivity to pressure is 30–45 degree/atmosphere. These results were observed with good reproducibility.

The micro diaphragm, which is manufactured by ultrasonic drilling in $LiNbO_3$ substrate, is another solution (see FIG. 39). This design has one important advantage in that almost all of the area of the substrate has the equal thermal contact to the housing compared with a previous design where only half of the substrate contacted the housing. Therefore, the temperature gradient on the surface is insignificant. The short-time pressure measuring error then decreases at sharp changes of temperature.

Calculations have permitted the determination of the diameter of a micro diaphragm and sensor's sensitivity to air pressure. A rule used was that the sensor sensitivity to pressure should be not less than 30–45 degree/atmosphere. The results of the mathematical analysis are the following.

The diameter of a micro diaphragm should be 6–7 mm at a thickness of a micro diaphragm 0.11–0.12 mm, respectively. In this case force, which is applied on the center of micro diaphragm, constitutes 16.956–23.079 N (1.73–2.355 kilogram-force) at 6.0 Bar. The results of this calculation are in good agreement with experiments.

4. Conclusions and Potential Problems.

Decreasing the sensor's length allows using serial types of housings (DIP-14, DIP-16 or SIP-6, for example). It enables making a sensor more reliable through the use of state-of-the-art methods of hermetic encapsulation (laser welding). The cost of a sensor will significantly decline during serial manufacture.

The inquiry pulse duration from the interrogator can be increased almost twice. In this case 93% of a radiant energy occupies a frequency band 1.65 MHz, which fully complies with existing rules. Only 50% of energy was radiated in this band earlier.

Coarse definition of temperature is not implemented as well as in the longer design and an efficient solution of this problem is under test.

The micro diaphragm made with silicone compound.

This method is well tested. The process of manufacture of a micro diaphragm is simple. The force tending to separate the $LiNbO_3$ substrate from the pedestal is small. Therefore, the rigid attachment of a substrate to the pedestal does not cause major difficulties. The use of a thinner substrate (0.35 mm) will enable to reduce load from the micro diaphragm. It is possible to use a narrow housing SIP-6, which is weakly deformed by air pressure.

However, the short-time pressure measuring error increases at sharp changes of temperature. The effect of vibrations on the free part of a substrate is a possible concern as it can reduce pressure measurement accuracy. So far this effect has not been detected.

The micro diaphragm, which is manufactured by ultrasonic drilling in LiNbO3.

The short-time pressure measuring error decreases at sharp changes of temperature. Effects of vibrations are minimal as both ends of a substrate are attached to the housing. The hysteresis of the micro diaphragm is minimal as it is made in the material of the monocrystal.

The manufacture of a micro diaphragm with a thickness of 0.1–0.12 mm is a composite process that is occasionally used in the acoustic-electronics field. As an alternative to ultrasonic drilling the sensor can be built on a substrate which has an initial thickness of 0.15 mm. It is an intricate operation since the sensor's sensitivity to pressure strongly depends from thickness of the micro diaphragm. One possible problem is that the position of the acoustical reflectors can influence the sensor's sensitivity.

The invention claimed is:

1. A method for diagnosing whether one or more components of a vehicle are operating abnormally, comprising:

arranging a plurality of sensors on a vehicle;

in a training stage, receiving output from the sensors during normal operation of the components, adjusting each component to induce abnormal operation thereof and receiving output from the sensors during the induced abnormal operation, and determining which sensors provide data about abnormal operation of each component based on analysis of the output from the sensors during normal operation and during induced abnormal operation of the component; and during operation of the vehicle, receiving output from the sensors; and determining whether any of the components are operating abnormally by analyzing the output from those sensors which have been determined to provide data about abnormal operation of that component.

2. The method of claim 1, further comprising alerting a driver of the vehicle, a vehicle manufacturer, a vehicle dealer or a vehicle repair facility upon a determination of abnormal operation of a component.

3. The method of claim 1, wherein the output from the sensors is a signal, the step of determining which sensors provide data about abnormal operation of each component comprising analyzing differences between the signals from the sensors during normal operation or absence thereof and the signals from the sensors during induced abnormal operation of the component.

4. The method of claim 3, wherein the step of determining whether any of the components are operating abnormally comprises deriving numerical time series data from the signals from the sensors, entering the numerical time series data into a processor, applying at least one pattern recognition algorithm to identify and classify patterns in the numerical time series indicative of abnormal operation of a component.

5. The method of claim 4, further comprising applying a mathematical transformation on, a feature extraction technique to or a Fourier transformation to the numerical time series data prior to application of the at least one pattern recognition algorithm.

6. The method of claim 4, wherein the step of deriving numerical time series data comprises converting the signals from the sensors into electrical signals and digitizing the electrical signals to create the numerical time series data.

7. The method of claim 1, further comprising pre-processing the output from the sensors, wherein the output from the sensors and the pre-processed output are both used to determine whether any of the components are operating abnormally.

8. The method of claim 1, wherein the step of determining whether any of the components are operating abnormally comprises comparing patterns of data derived from the output from those sensors which have been determined to provide data about abnormal operation of that component with patterns derived from the output of the same sensors during normal operation of the component and abnormal operation of the component.

9. The method of claim 1, further comprising:

in the training stage, generating a neural network which operatively determines abnormal operation of the components, the neural network being generated from output from sensors during normal operation and output from the sensors during induced abnormal operation of the component; and the step of determining whether any of the components are operating abnormally comprising inputting the output from the sensors into the neural network which, for each component, considers the output from those sensors which have been determined to provide data about abnormal operation of that component and outputs an indication of normal or abnormal operation of the component.

10. The method of claim 9, wherein the neural network is a combination neural network.

11. The method of claim 1, wherein the step of determining which sensors provide data about abnormal operation of each component comprises identifying at least two sensors which provide data about abnormal operation of the component such that each condition of abnormal operation of each component is reflected in output from a plurality of sensors.

12. The method of claim 1, further comprising:

adjusting a plurality of components simultaneously to induce abnormal operation thereof and receiving output from the sensors during the induced abnormal operation of the components; and determining which sensors provide data about abnormal operation of the components based on analysis of the output from the sensors during normal operation and during induced abnormal operation of the components.

13. The method of claim 1, further comprising adjusting operation of another component when a determination is made of abnormal operation of one of the components being diagnosed.

14. A vehicle including a system for diagnosing whether one or more components of a vehicle are operating abnormally, comprising:

a plurality of sensors arranged on the vehicle; and a processor coupled to said sensors and including a pattern recognition algorithm which receives output from said sensors and determines whether each component is operating abnormally by analyzing output from specific ones of said sensors determined to provide data about abnormal operation of that component, said pattern recognition algorithm being generated by analyzing output from said sensors during normal operation of the components and during induced abnormal operation of the components.

15. The vehicle of claim 14, wherein said pattern recognition algorithm is generated in consideration of which specific sensors provide data about abnormal operation of each component based on the output from said sensors.

16. The vehicle of claim 14, further comprising a notification device coupled to said processor for notifying a driver of the vehicle of abnormal operation of one of the components being diagnosed.

17. The vehicle of claim 14, further comprising a transmission device coupled to said processor for wirelessly notifying a vehicle manufacturer, a dealer or repair facility of abnormal operation of a component.

18. The vehicle of claim 14, wherein said pattern recognition algorithm is a neural network.

19. The vehicle of claim 14, wherein said pattern recognition algorithm is a combination neural network.

20. The vehicle of claim 14, wherein at least one of the components has no dedicated sensor associated therewith.

21. A method for diagnosing whether one or more components of a vehicle are operating abnormally, comprising:

arranging a plurality of sensors on a vehicle;

in a training stage, receiving output from the sensors during normal operation of the components, adjusting the components to induce abnormal operation thereof and receiving output from the sensors during the induced abnormal operation, and generating a neural network which operatively determines abnormal operation of the components, the neural network being generated from the output from sensors during normal operation and the output from the sensors during induced abnormal operation of the components; and during operation of the vehicle, receiving output from the sensors; and providing data derived from the output from the sensors to the neural network which outputs an indication of abnormal operation of any of the components.

22. The method of claim 21, wherein the neural network is a combination neural network.

23. The method of claim 22, wherein the step of providing data to the combination neural network comprises providing data to a first neural network which determines whether the data corresponds to data received during normal operation of the components; and when the data does not correspond to data received during normal operation of the components, providing the data to a second neural network which determines whether any of the components are operating abnormally.

24. The method of claim 23, wherein the step of providing data to the combination neural network further comprises, when the second neural network determines that one of the components is operating abnormally, providing all of the data or a subset of the data to a third neural network which determines the particular manner in which that component is operating abnormally.

25. The method of claim 22, wherein the step of providing data to the combination neural network comprises providing the data to a first neural network which outputs an indication of the normal or abnormal operation of the components and when an indication of abnormal operation of a component is output, selecting a subset of the sensors based on the component, and inputting data derived from the output of the sensors in the subset of sensors into a second neural network to determine the particular manner in which that component is operating abnormally.

26. The method of claim 21, further comprising alerting a driver of the vehicle, a vehicle manufacturer, a vehicle dealer or a vehicle repair facility upon a determination of abnormal operation of any of the components being diagnosed.

27. The method of claim 21, further comprising adjusting operation of another component when a determination is made of abnormal operation of any of the components being diagnosed.

28. The method of claim 21, wherein the output from the sensors are signals, the step of generating the neural network comprising deriving numerical time series data from the signals from the sensors, pre-processing the numerical time series data, entering the numerical time series data into a neural network generating program to thereby generate the neural network.

29. The method of claim 28, wherein the step of pre-processing of the numerical time series data comprises applying a mathematical transformation on, a feature extraction technique to or a Fourier transformation to the numerical time series data.

* * * * *